(12) United States Patent
Hetcher et al.

(10) Patent No.: US 7,574,950 B2
(45) Date of Patent: Aug. 18, 2009

(54) BEVEL ADJUSTMENT ASSEMBLY FOR A SAW

(75) Inventors: Jason D. Hetcher, Waukesha, WI (US); Mark D. Willer, Brookfield, WI (US); Dennis J. Cerney, Mukwonago, WI (US); William A. Elger, West Bend, WI (US); Harold L. Papenfuss, Menomonee Falls, WI (US); Daryl S. Richards, Sussex, WI (US); David R. Bauer, Delafield, WI (US); Edward T. Gisske, Mt. Horeb, WI (US); Edward A. Raleigh, Lodi, WI (US); Michael E. Weber, Hartland, WI (US); Eric Fernandes, Franklin, WI (US); David Hlavac, Germantown, WI (US); Troy C. Thorson, Waukesha, WI (US); Michael L. Welliver, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 396 days.

(21) Appl. No.: 11/107,314

(22) Filed: Apr. 15, 2005

(65) Prior Publication Data
US 2005/0262983 A1 Dec. 1, 2005

Related U.S. Application Data

(60) Provisional application No. 60/562,592, filed on Apr. 15, 2004, provisional application No. 60/608,851, filed on Sep. 10, 2004.

(51) Int. Cl.
*B23D 45/04* (2006.01)

(52) U.S. Cl. .................. 83/473; 83/490; 83/522.18

(58) Field of Classification Search .................. 83/473, 83/490, 522.17, 522.18, 471.3, 581
See application file for complete search history.

(56) References Cited

U.S. PATENT DOCUMENTS 4,641,557 A 2/1987 Steiner et al.

(Continued)

FOREIGN PATENT DOCUMENTS

CA 2 370 645 2/2003

(Continued)

OTHER PUBLICATIONS

International Search Report and Written Opinion for International Application No. PCT/US05/12861 mailed Sep. 6, 2006.

(Continued)

*Primary Examiner*—Kenneth E. Peterson
(74) *Attorney, Agent, or Firm*—Michael Best & Friedrich LLP

(57) ABSTRACT

A saw, such as a chop saw, a miter saw, a sliding saw, a compound miter saw, etc. In some constructions, the saw may include a miter adjustment assembly including a coarse adjustment assembly and a fine adjustment assembly. In some constructions, the saw may include a bevel adjustment assembly including a brake mechanism and a bevel detent assembly. In some constructions, the saw may include a dust collection assembly including a dust chute defining a dust both around the bevel arm. In some constructions, the saw may include a table having a top wall with a peripheral rim and a side wall depending from the top wall, and a base defining an opening in which the side wall is received and a ledge above which the rim is positioned. In some constructions, the saw may include elastomeric material covering a portion of the base, such as a bottom surface, a lateral surface, a grip surface, etc.

20 Claims, 226 Drawing Sheets

U.S. PATENT DOCUMENTS

| | | | |
|---|---|---|---|
| 4,934,233 | A | 6/1990 | Brundage et al. |
| 5,020,406 | A | 6/1991 | Sasaki et al. |
| 5,054,352 | A | 10/1991 | Fushiya et al. |
| 5,060,548 | A | 10/1991 | Sato et al. |
| 5,216,964 | A | 6/1993 | Sato et al. |
| 5,235,889 | A | 8/1993 | Brickner et al. |
| 5,241,888 | A | 9/1993 | Chen |
| 5,357,834 | A | 10/1994 | Ito et al. |
| 5,392,678 | A | 2/1995 | Sasaki et al. |
| 5,421,228 | A | 6/1995 | Fukinuki |
| 5,425,294 | A | 6/1995 | Ushiwata et al. |
| 5,437,214 | A | 8/1995 | Sasaki et al. |
| 5,623,860 | A | 4/1997 | Schoene et al. |
| 5,778,747 | A | 7/1998 | Chen |
| 5,802,943 | A | 9/1998 | Brunson et al. |
| D399,856 | S | 10/1998 | Price et al. |
| 5,829,333 | A | 11/1998 | Itzov |
| 5,862,734 | A | 1/1999 | Brunson et al. |
| 5,870,938 | A | 2/1999 | Brunson et al. |
| 5,907,987 | A | 6/1999 | Stumpf et al. |
| 6,032,562 | A | 3/2000 | Brunson et al. |
| 6,173,635 | B1 | 1/2001 | Chang |
| 6,459,226 | B1 * | 10/2002 | Zettel et al. ............... 318/560 |
| 6,474,206 | B1 * | 11/2002 | Brunson ............... 83/471.3 |
| 6,532,853 | B1 | 3/2003 | Kakimoto et al. |
| RE38,122 | E | 5/2003 | Kondo et al. |
| 6,615,701 | B2 | 9/2003 | Hollinger et al. |
| 6,658,977 | B2 | 12/2003 | Chang |
| 6,662,697 | B1 | 12/2003 | Chen |
| 6,758,123 | B2 | 7/2004 | Svetlik et al. |
| 2001/0000856 | A1 * | 5/2001 | O'Banion ............... 83/76.9 |
| 2003/0056632 | A1 | 3/2003 | Ng et al. |
| 2003/0088986 | A1 | 5/2003 | Ushiwata et al. |
| 2003/0110914 | A1 | 6/2003 | Brazell et al. |
| 2003/0150311 | A1 | 8/2003 | Carroll et al. |
| 2004/0045422 | A1 | 3/2004 | Parks et al. |
| 2004/0074362 | A1 | 4/2004 | Svetlik et al. |
| 2004/0089125 | A1 | 5/2004 | Schoene et al. |
| 2004/0112190 | A1 | 6/2004 | Hollis et al. |
| 2005/0045013 | A1 * | 3/2005 | Stumpf et al. ............... 83/581 |
| 2006/0000331 | A1 | 1/2006 | Ozawa et al. |
| 2007/0234864 | A1 | 10/2007 | Bettacchini |

FOREIGN PATENT DOCUMENTS

| | | |
|---|---|---|
| CA | 2 397 120 | 2/2003 |
| CA | 2 437 192 | 5/2004 |
| EP | 0 570 903 | 11/1993 |
| EP | 1 000 717 | 5/2000 |
| EP | 1 398 123 | 3/2004 |
| JP | 63-049901 U | 4/1988 |
| JP | 05-049302 U | 6/1993 |
| JP | 5318401 | 12/1993 |
| JP | 8336802 | 12/1996 |

OTHER PUBLICATIONS

Milwaukee Electric Sales Catalog 194 "Heavy-Duty Electric Tools for Contractors & Industry", 1994, pp. 60-61, 76.

Delta Machinery, Sidekick 10" Compound Slide Saw (Models 36-240 and 36-250) Instruction Manual, 2001, U.S.A.

Hitachi, C12FSA 12" Sliding Dual Compound Miter Saw, Official Hitachi Sell Sheet, http://www.hitachi.us/Apps/hitachicom/content.jsp?page=WoodworkingTools/MiterSaws/details/C12FSA, at least as early as Sep. 15, 2003.

Makita, LS1212-12" Dual Slide Compound Saw, Instruction Manual, 1999, and http://www.makita.com/tools_Item_View.asp?id=299, Sep. 15, 2003, USA.

Dewalt, Heavy-Duty 12" (305mm) Double-Bevel Sliding Compound Miter Saw—DW708, http://www.dewalt.com//us/products/tool_detail_print.asp?productID+4741, Sep. 15, 2003.

* cited by examiner

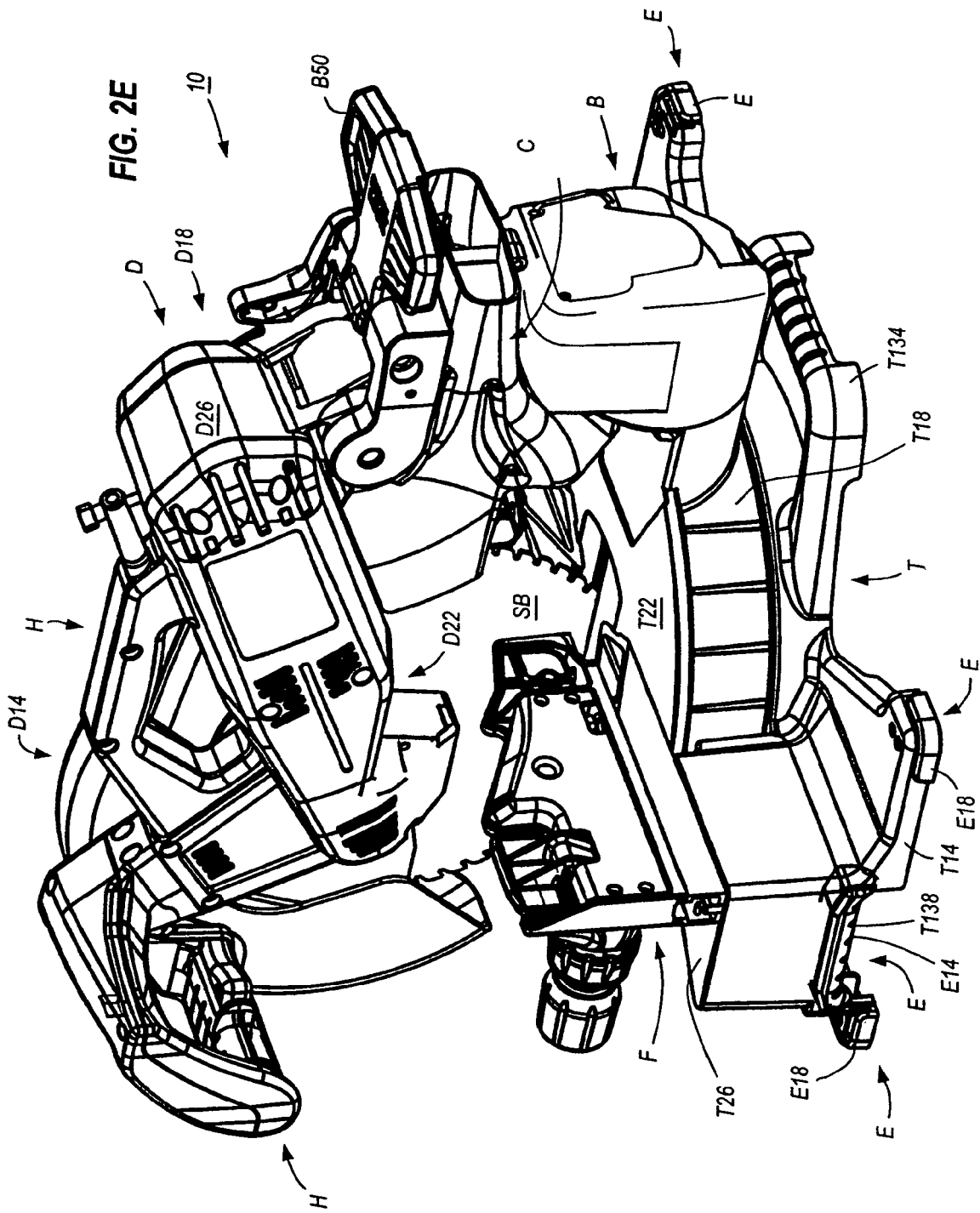

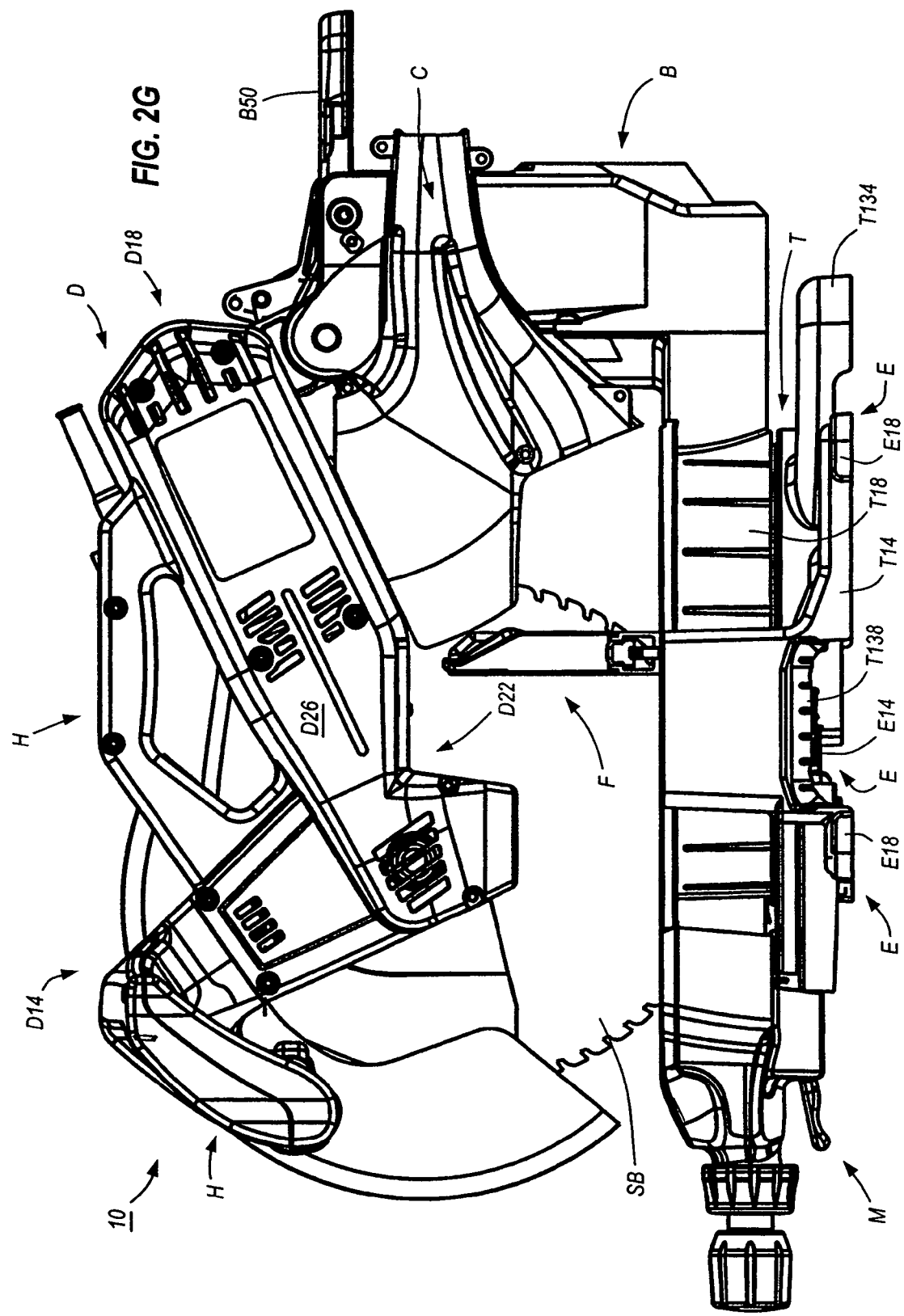

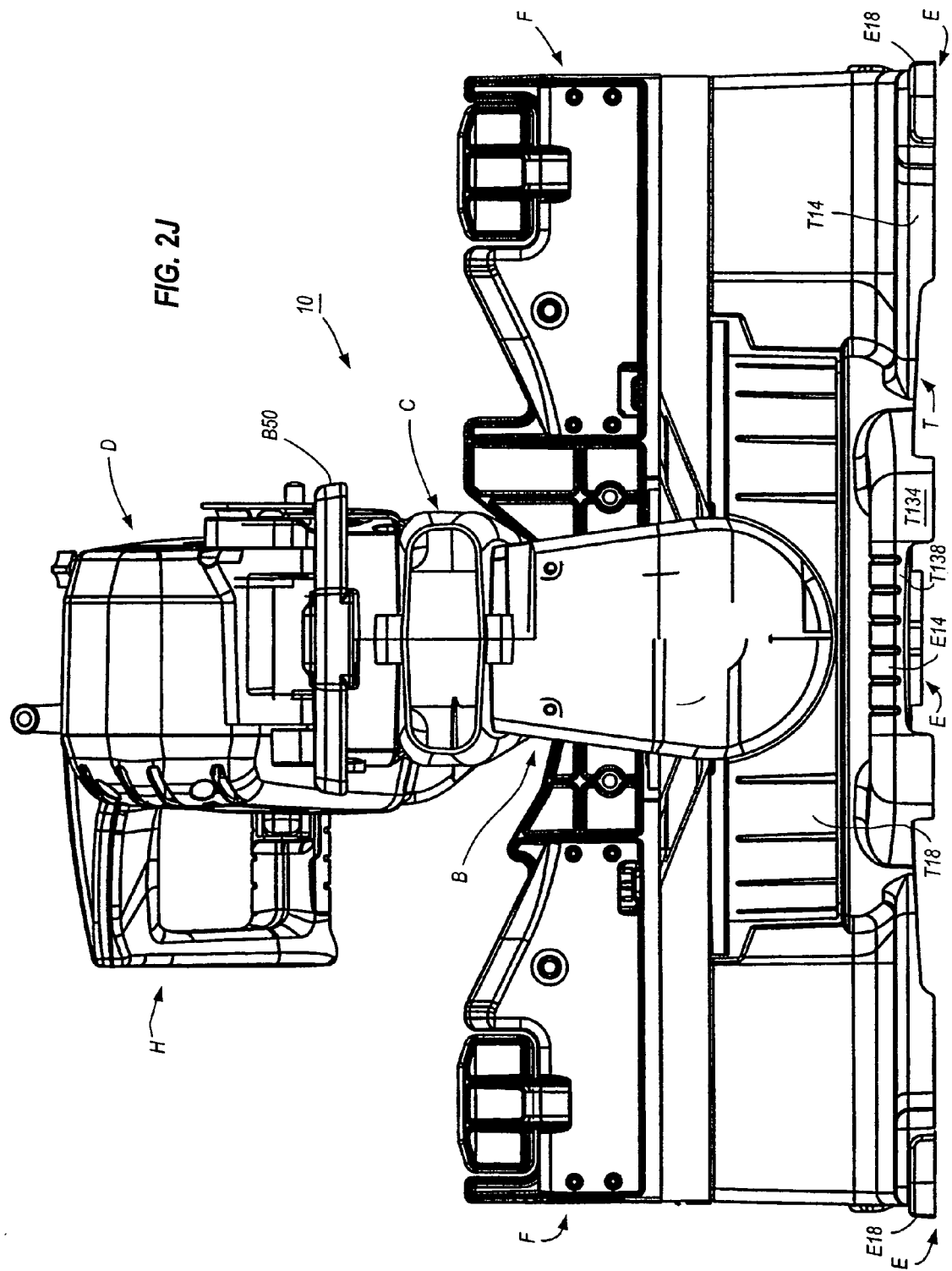

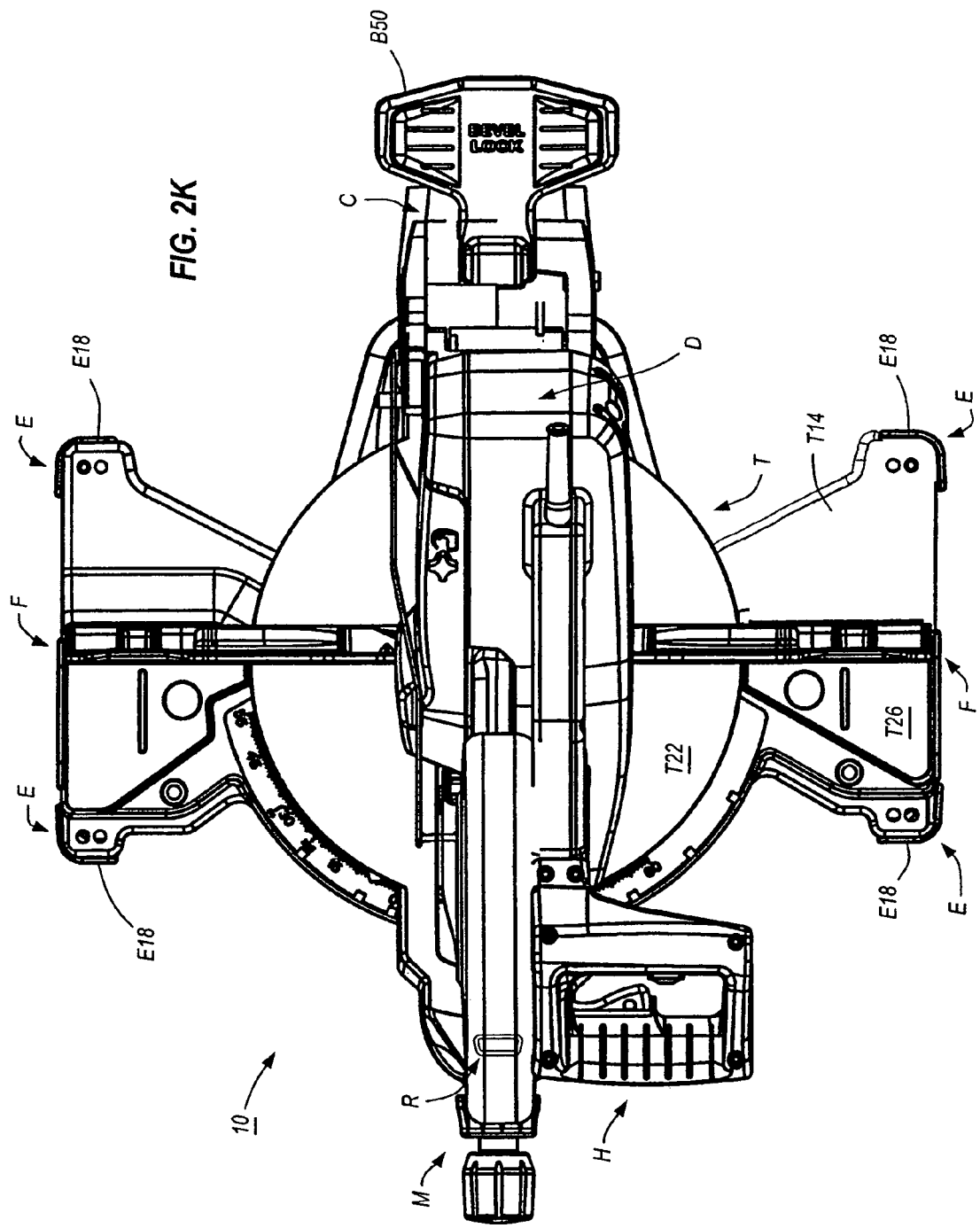

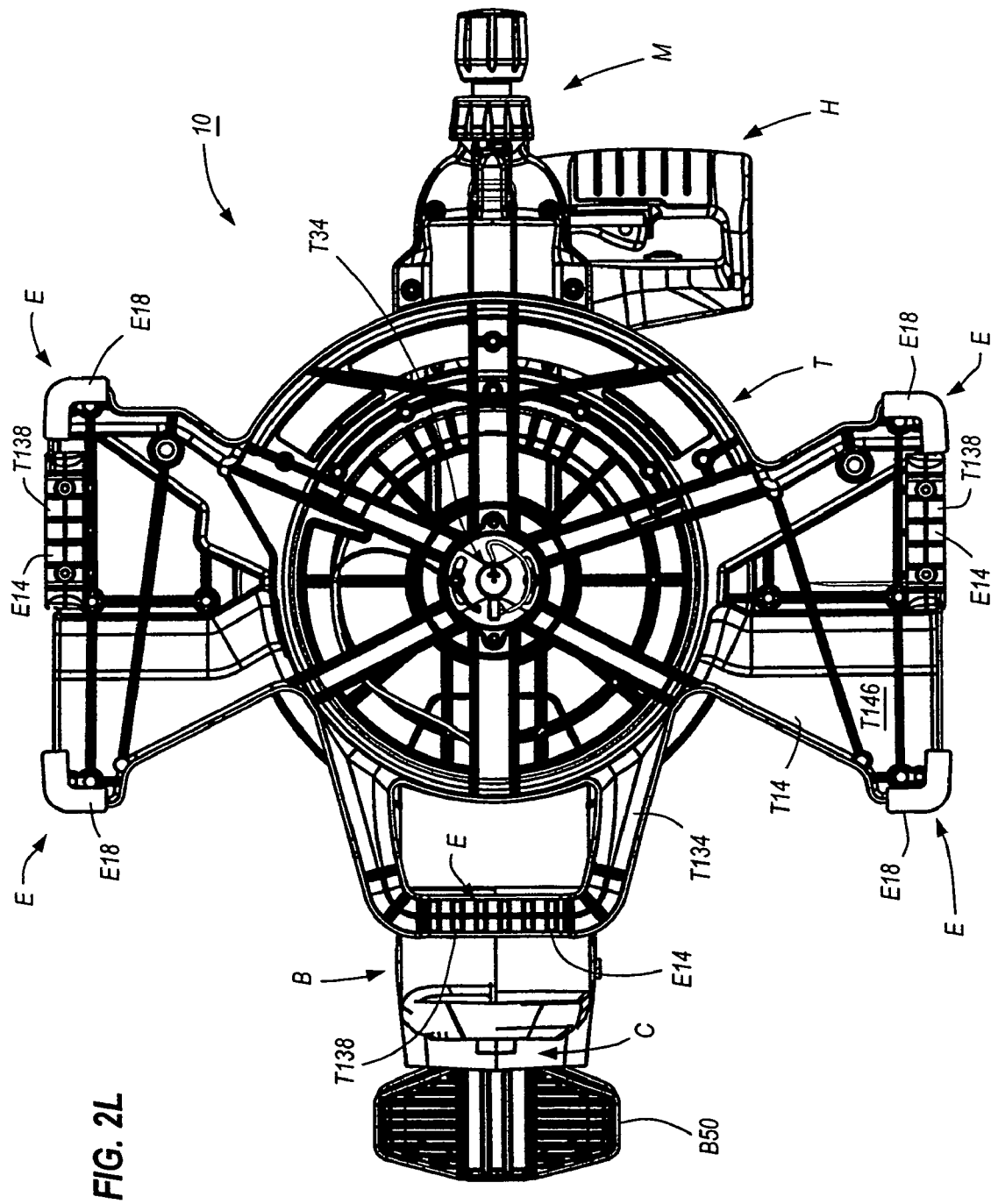

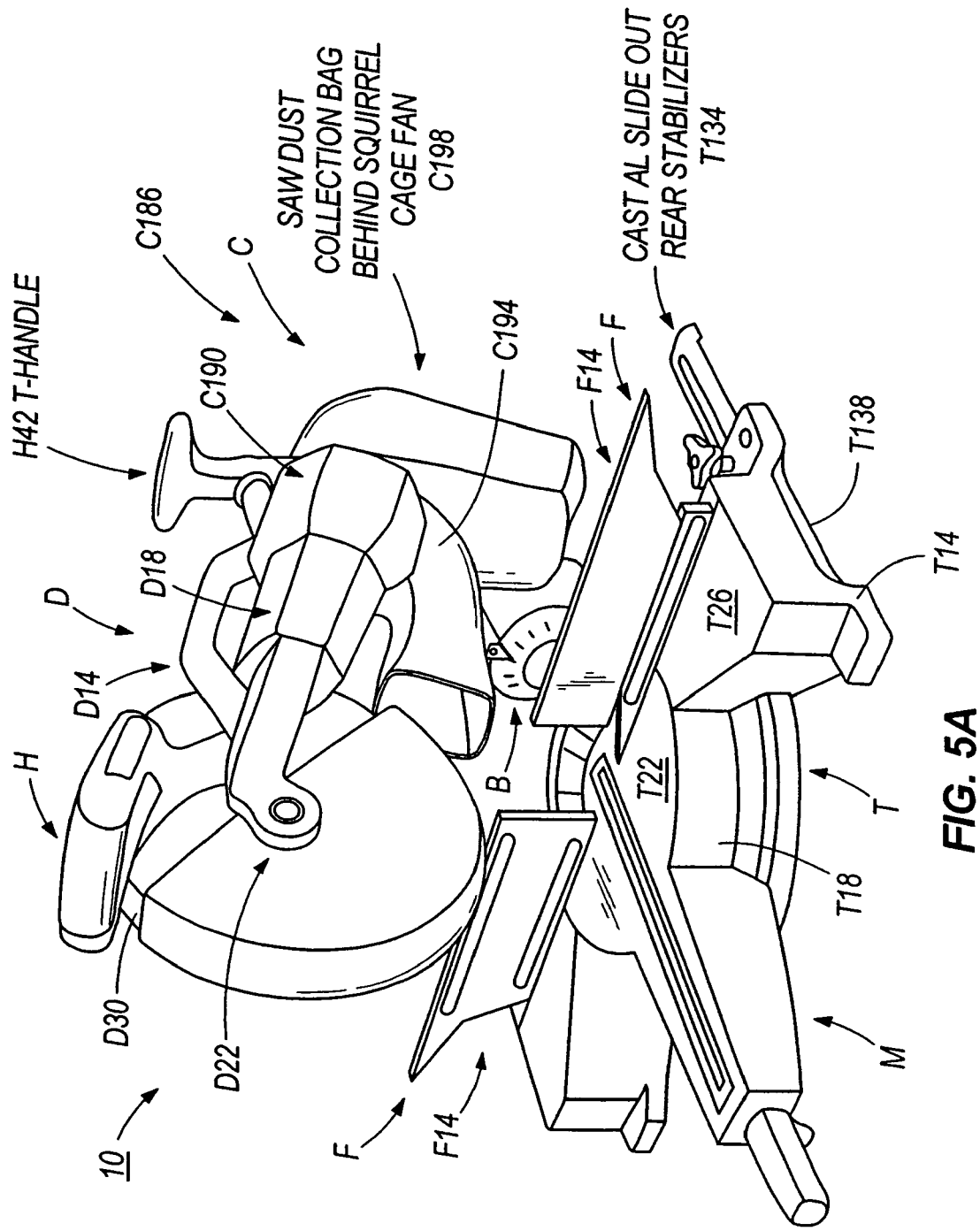

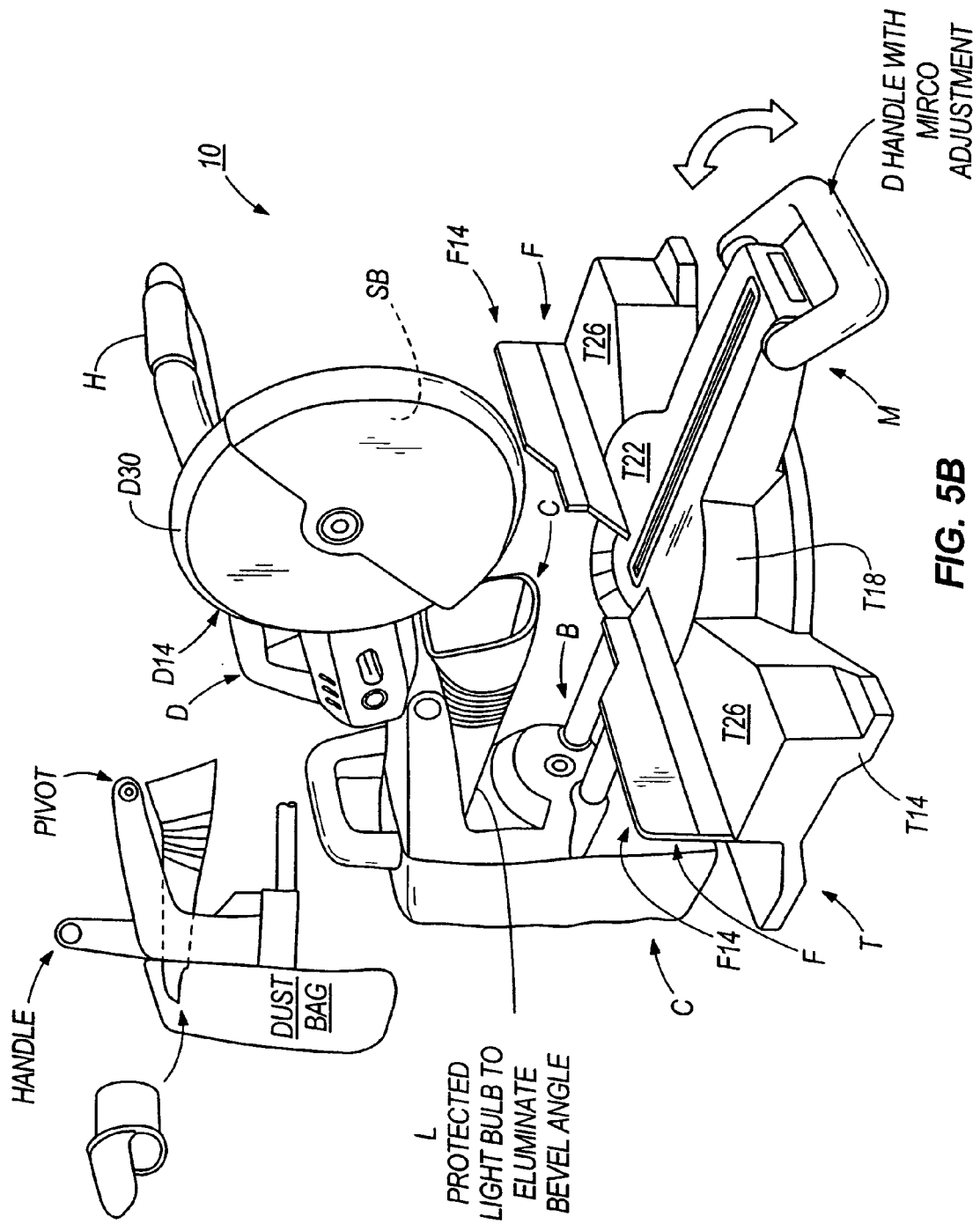

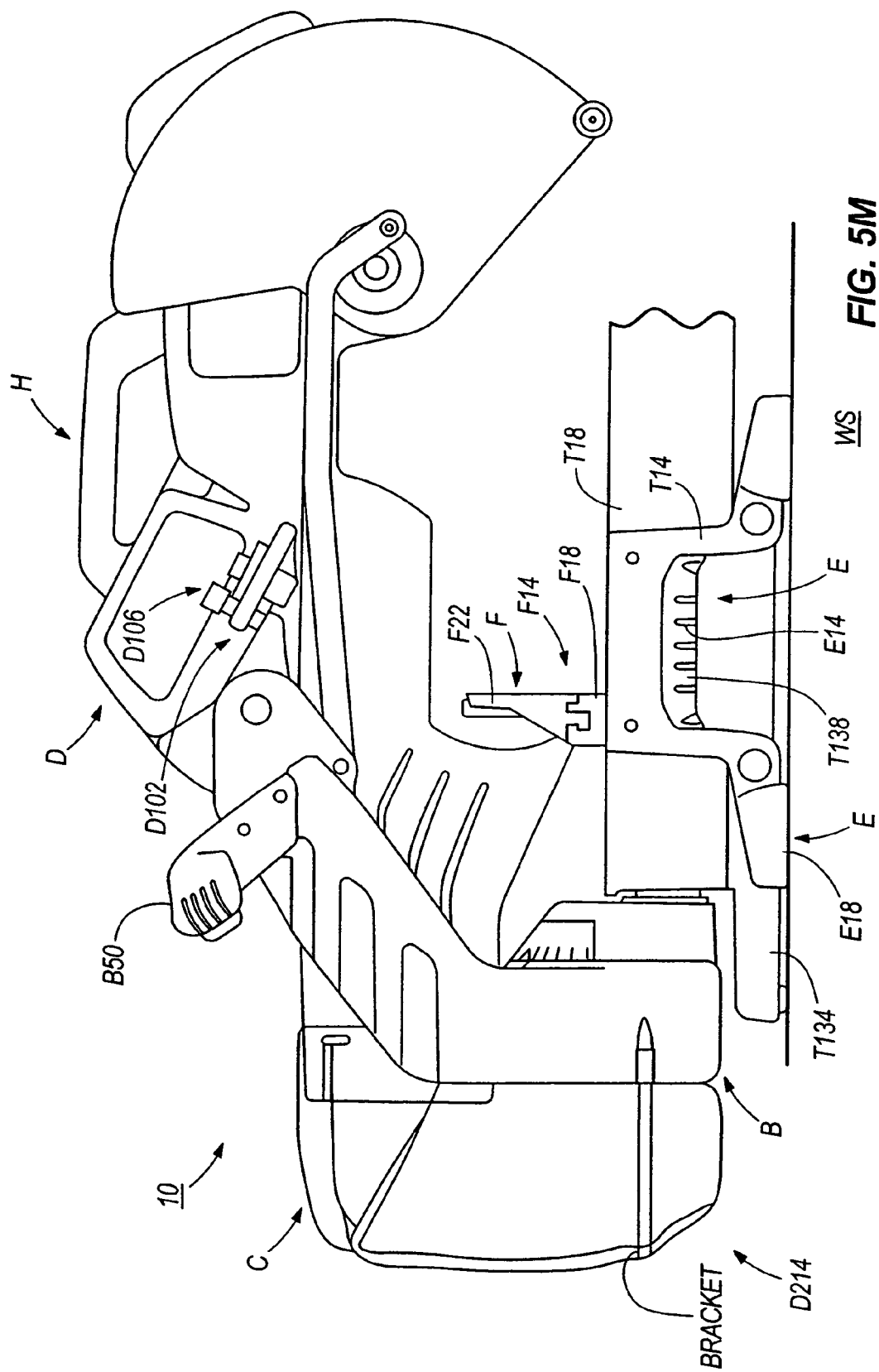

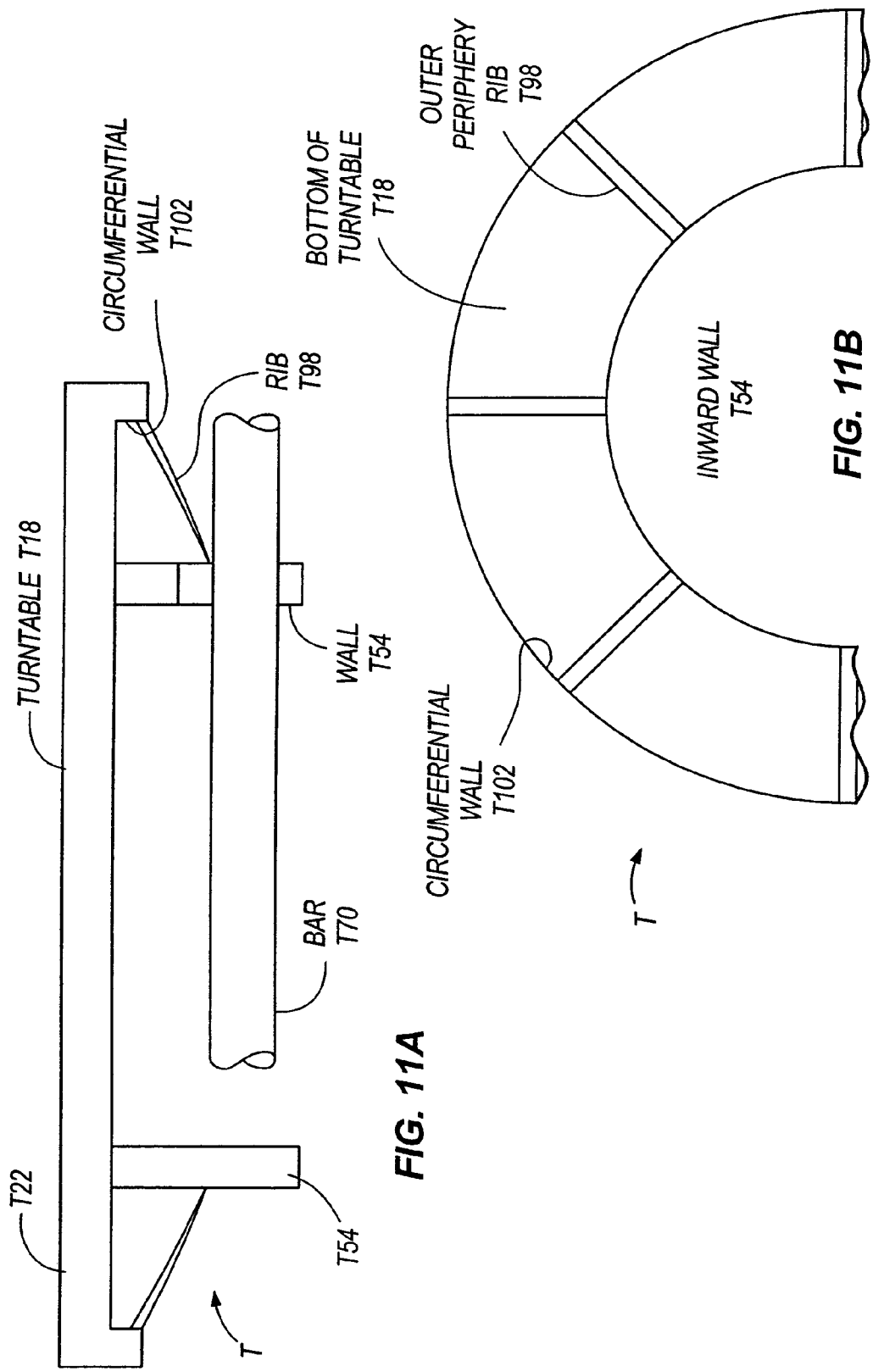

SLIDING FENCE WITH HANDLE FEATURES WEDGE AND FULCRUM TO LOCK FENCE IN PLACE.

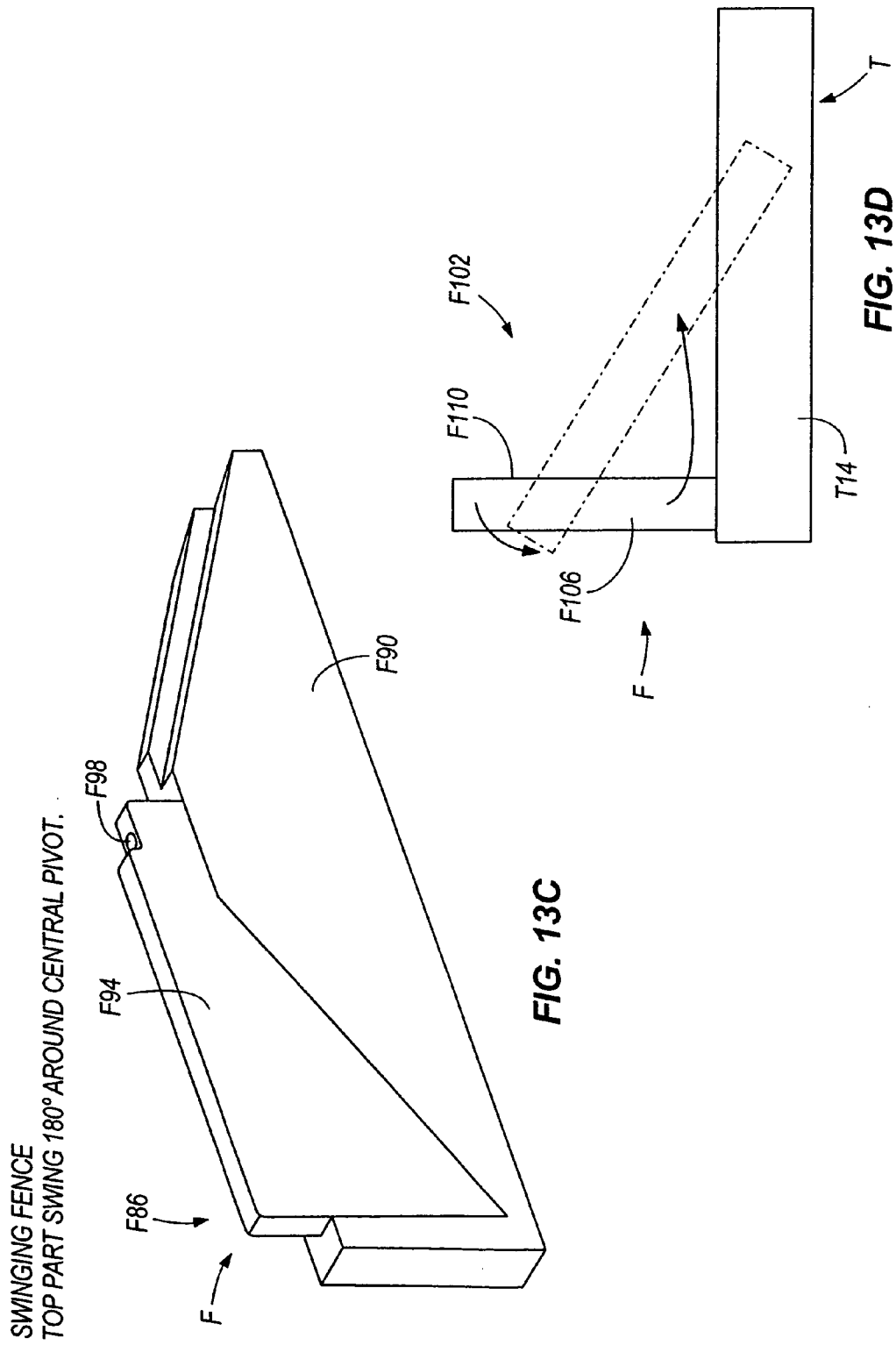

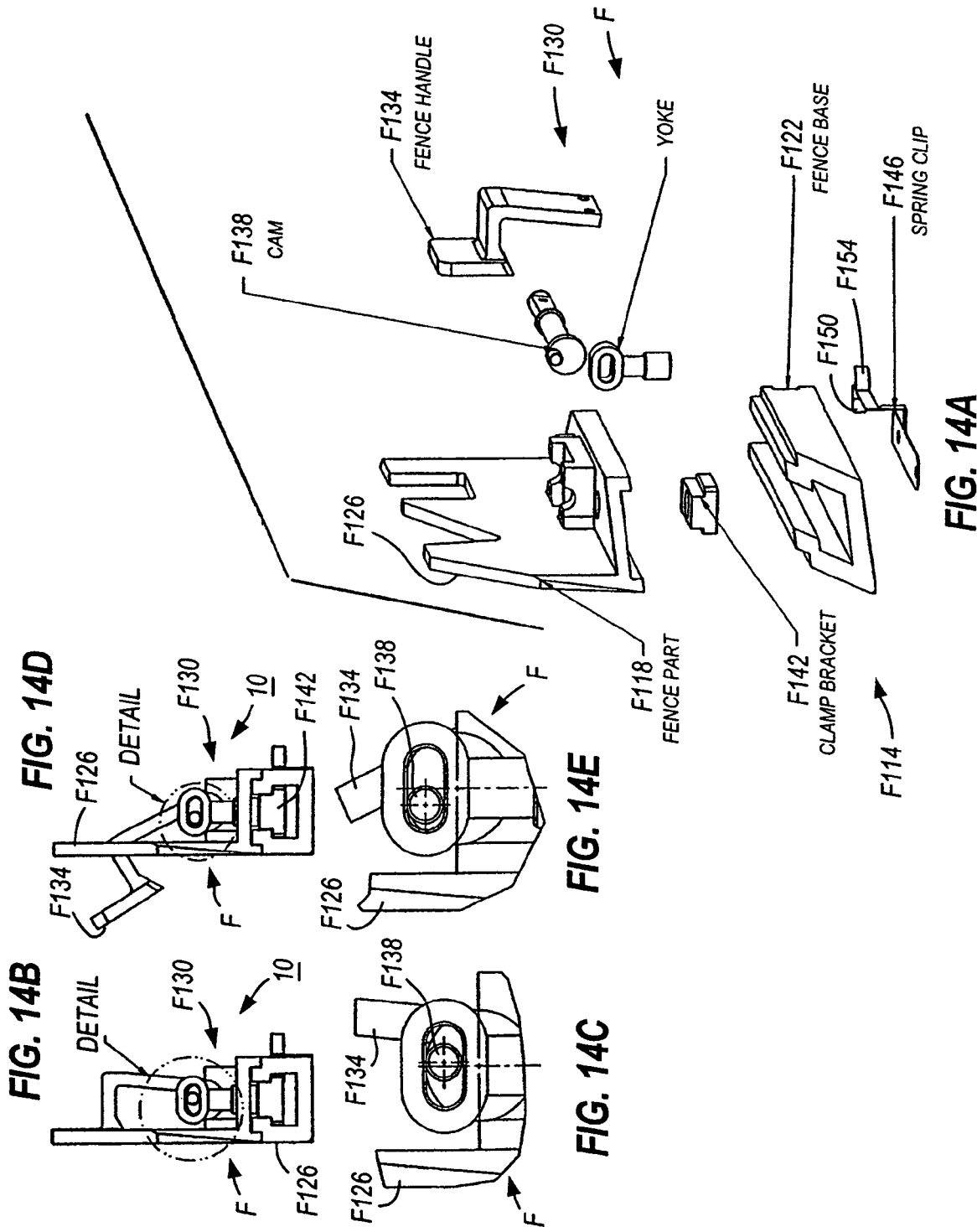

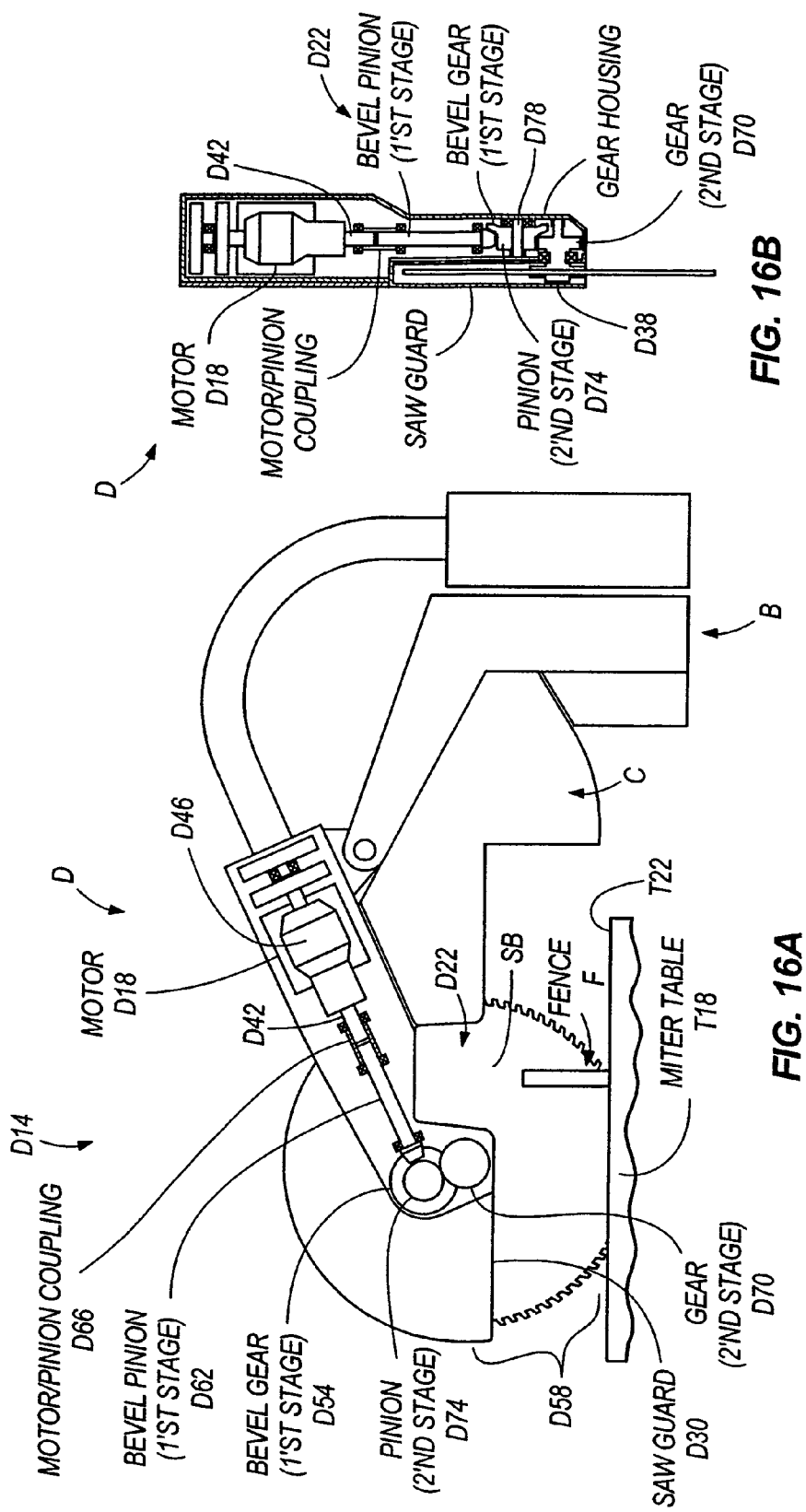

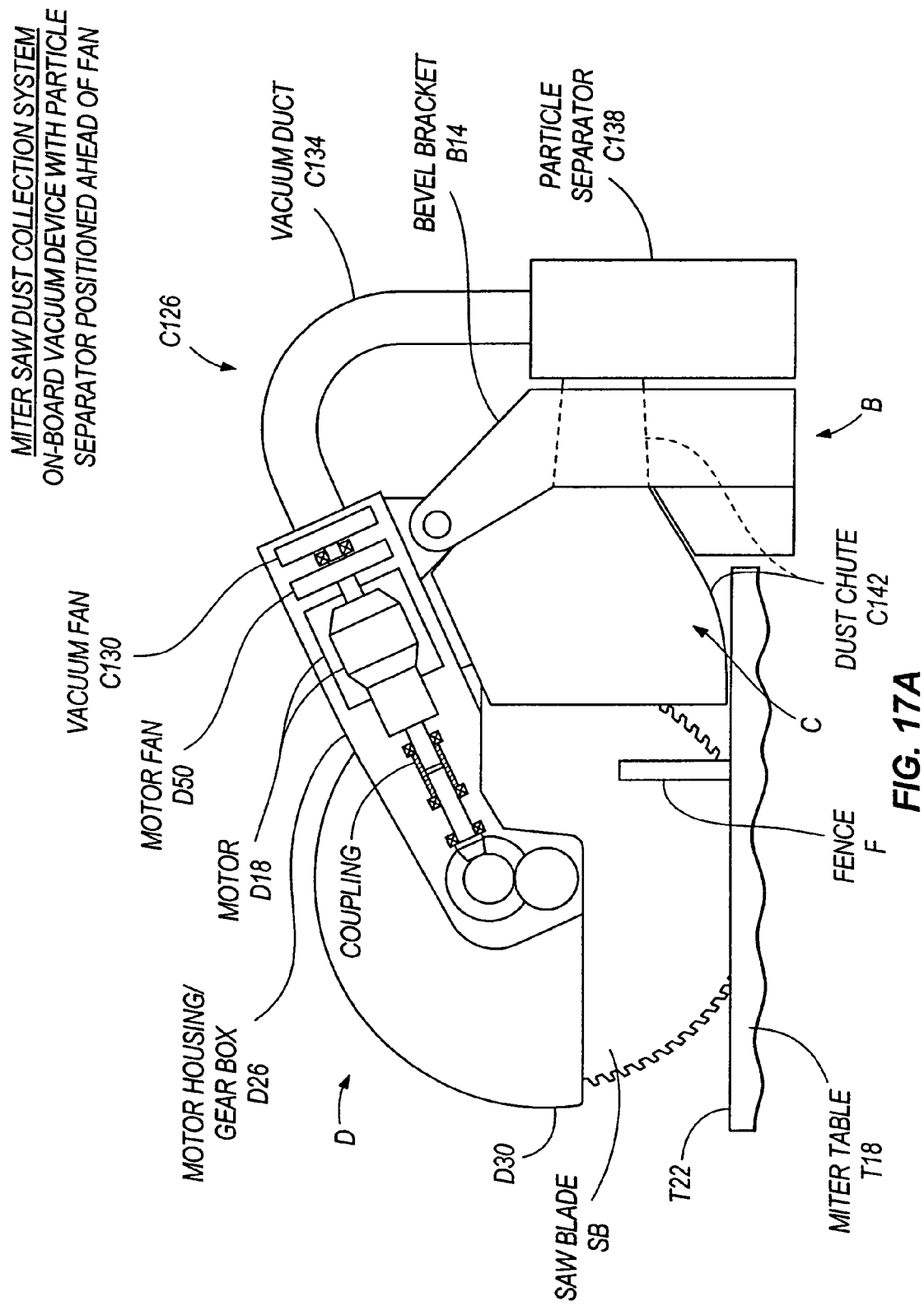

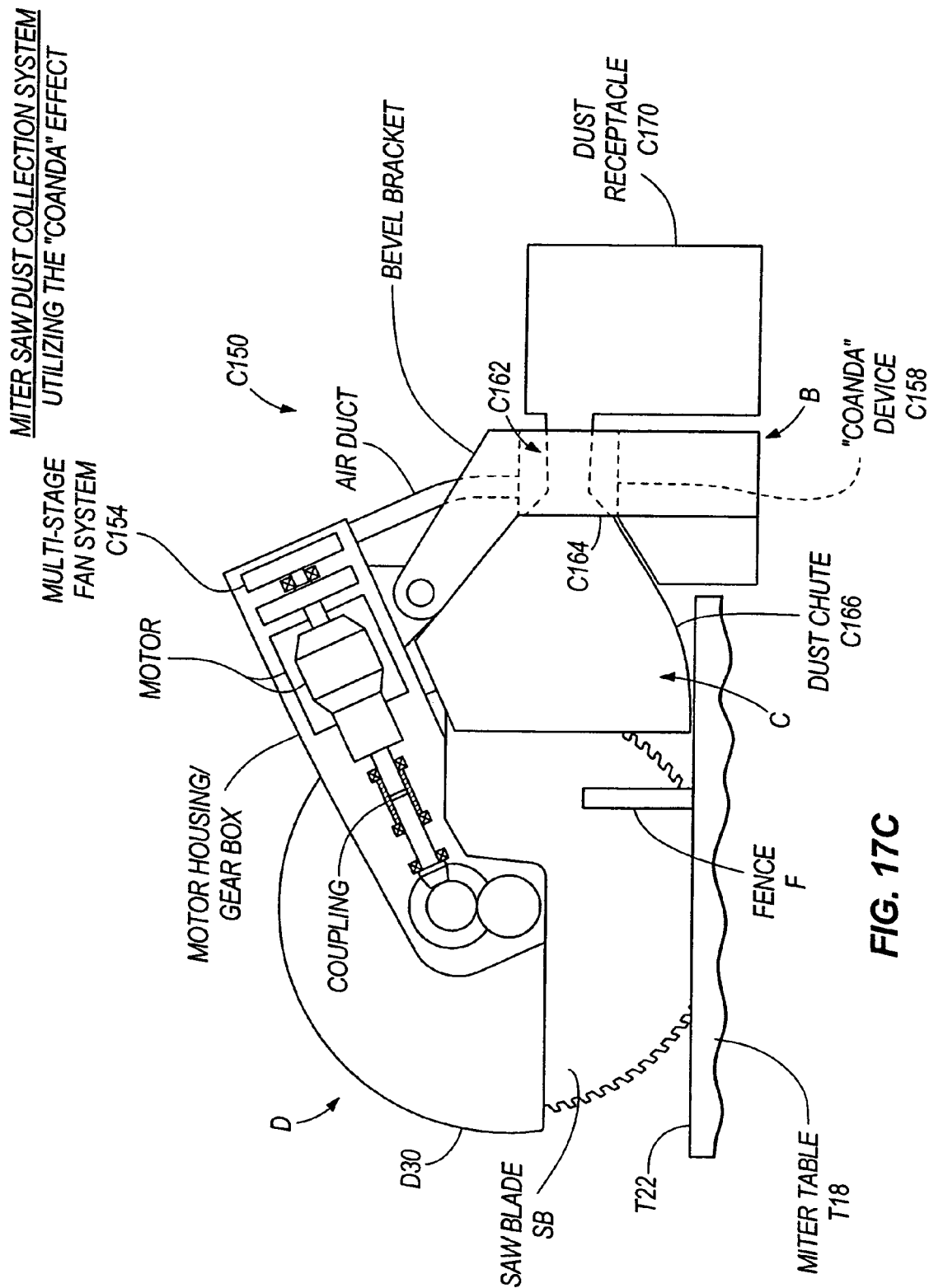

WHERE:
A  INPUT POWER PREFERABLY ALTERNATING CURRENT
B  FULLWAVE BRIDGE RECTIFIER
C1 NORMALLY OPEN CONTACT OF A 2 POLE SWITCH
C2 NORMALLY CLOSED CONTACT OF A 2 POLE SWITCH
D  RESISTOR OR OTHER ELECTRONICS TO REDUCE BRAKING CURRENT
E  WOUND ARMATURE WITH BRUSHES CONTACTING A COMMUTATOR
F  RESISTOR OR OTHER ELECTRONICS TO LIMIT INRUSH CURRENT

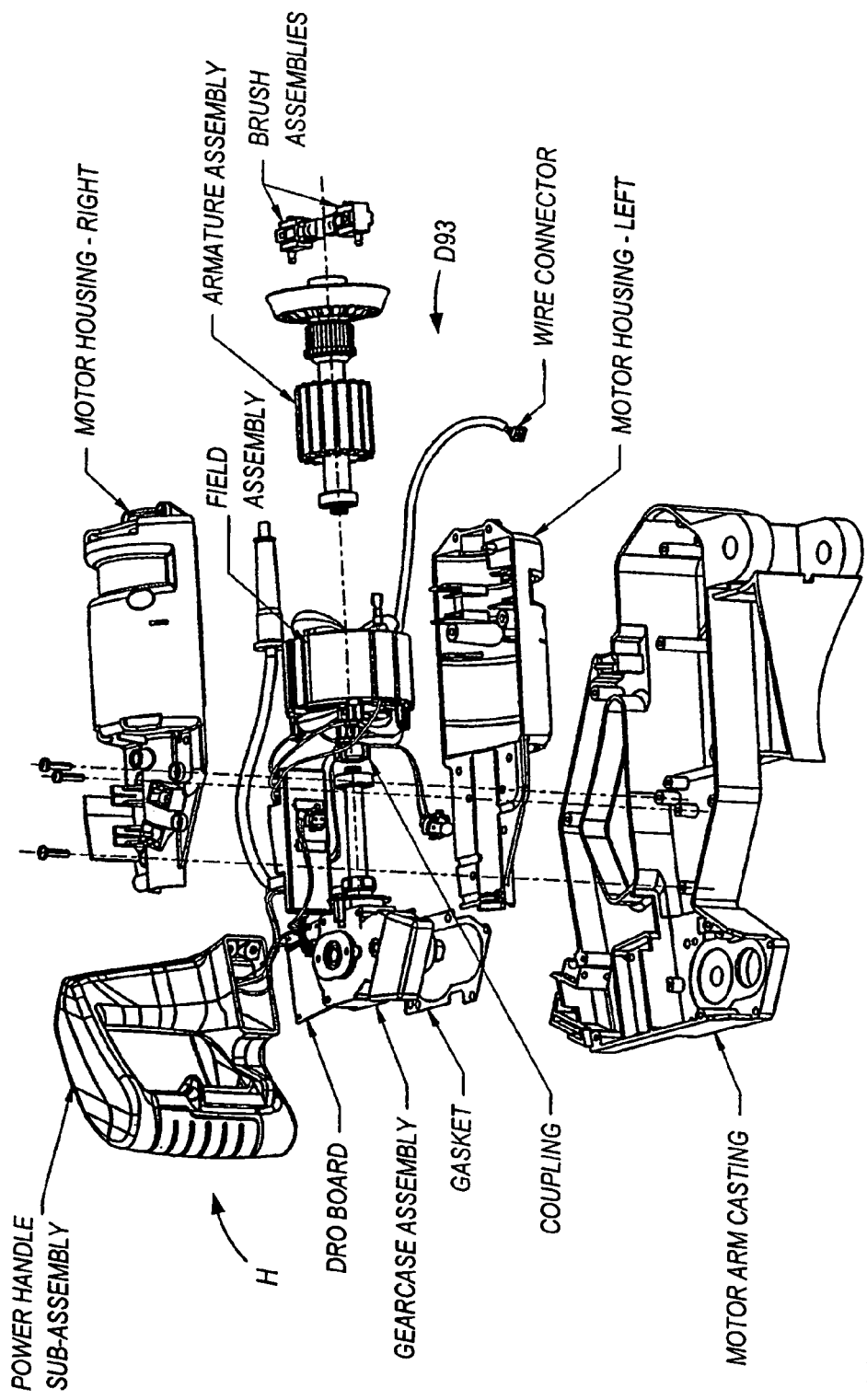
FIG. 20B  MOTOR ARM ASSEMBLY - MOTOR SIDE

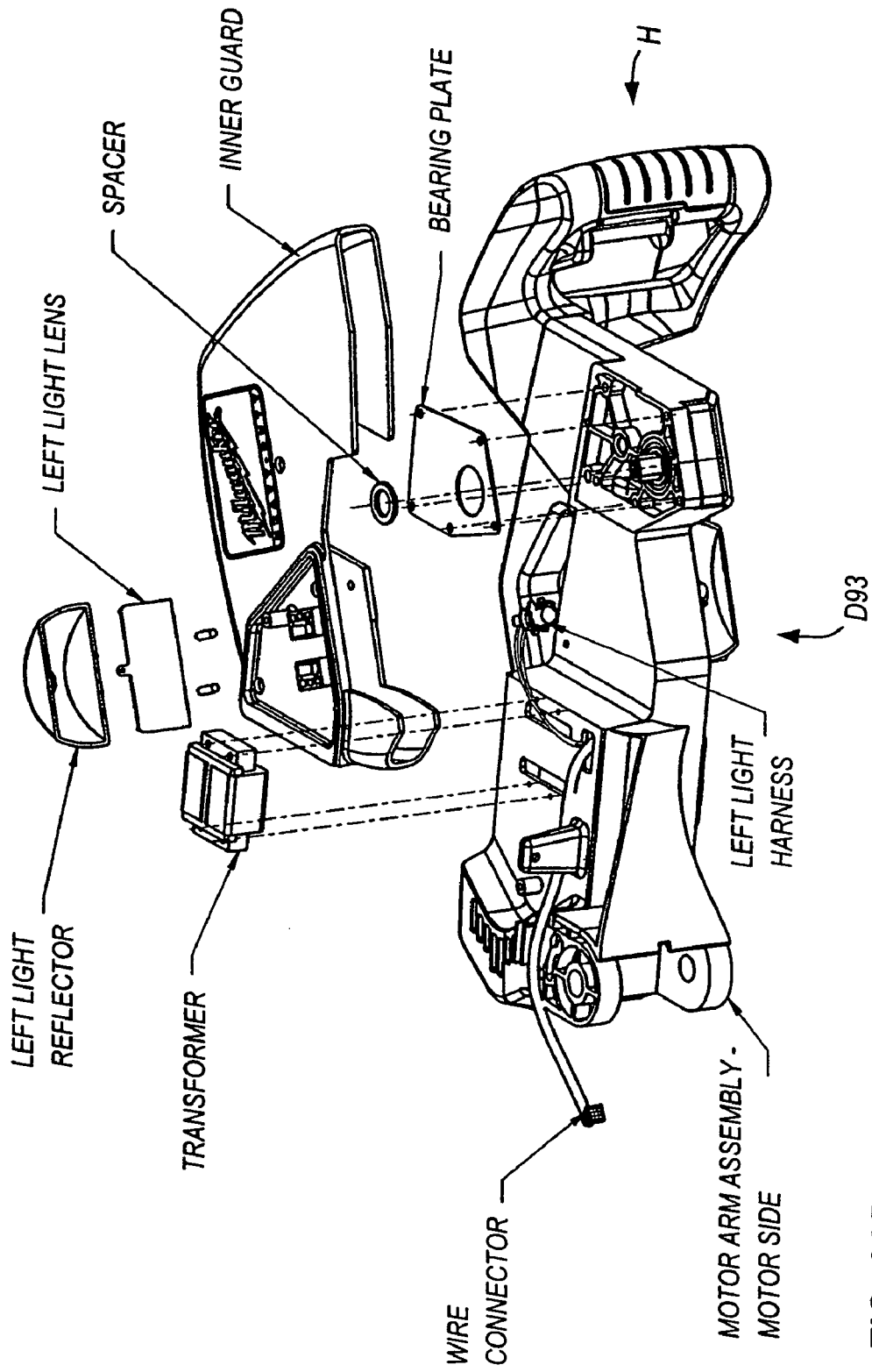
FIG. 20D  MOTOR ARM ASSEMBLY-BLADE SIDE

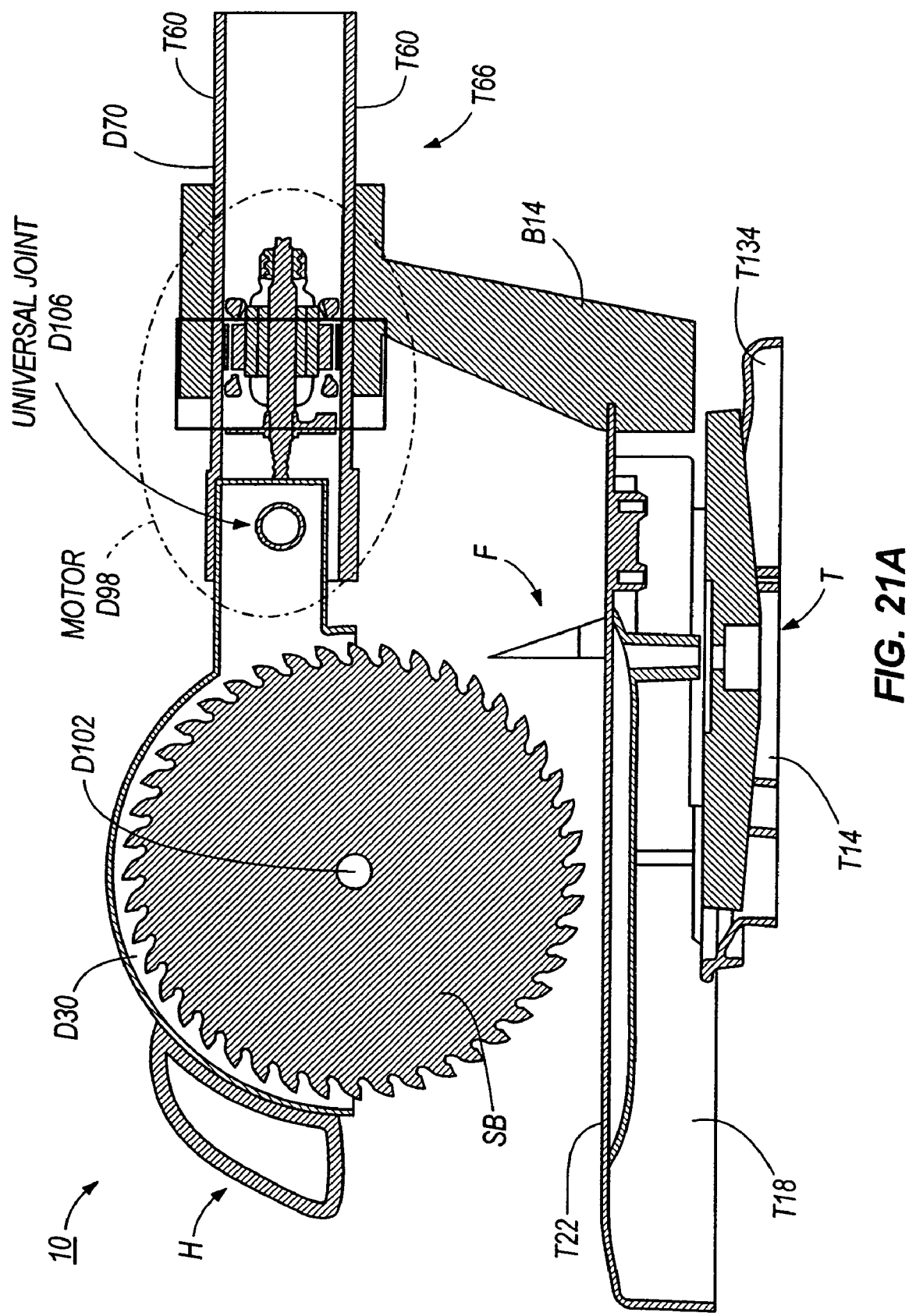

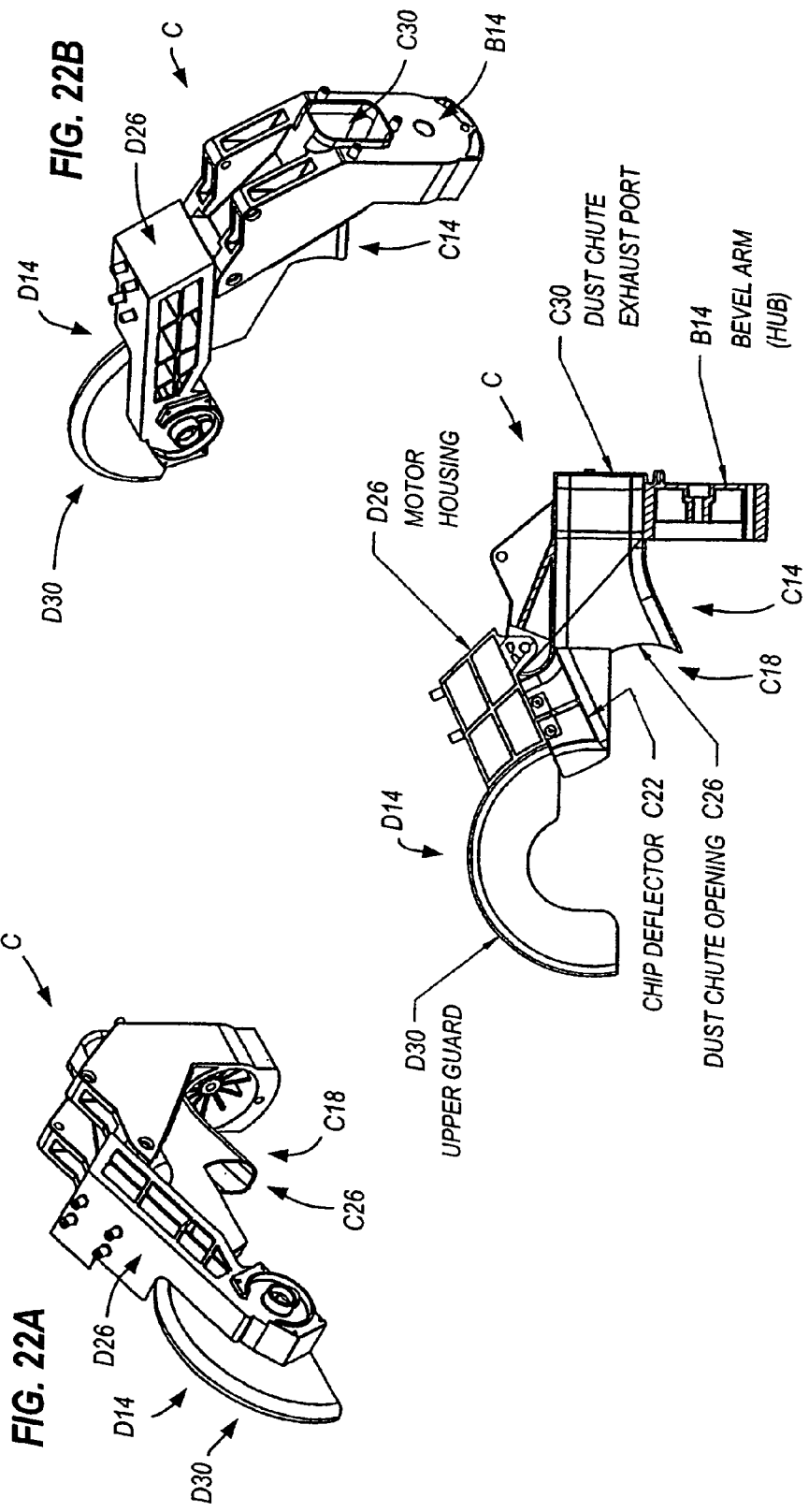

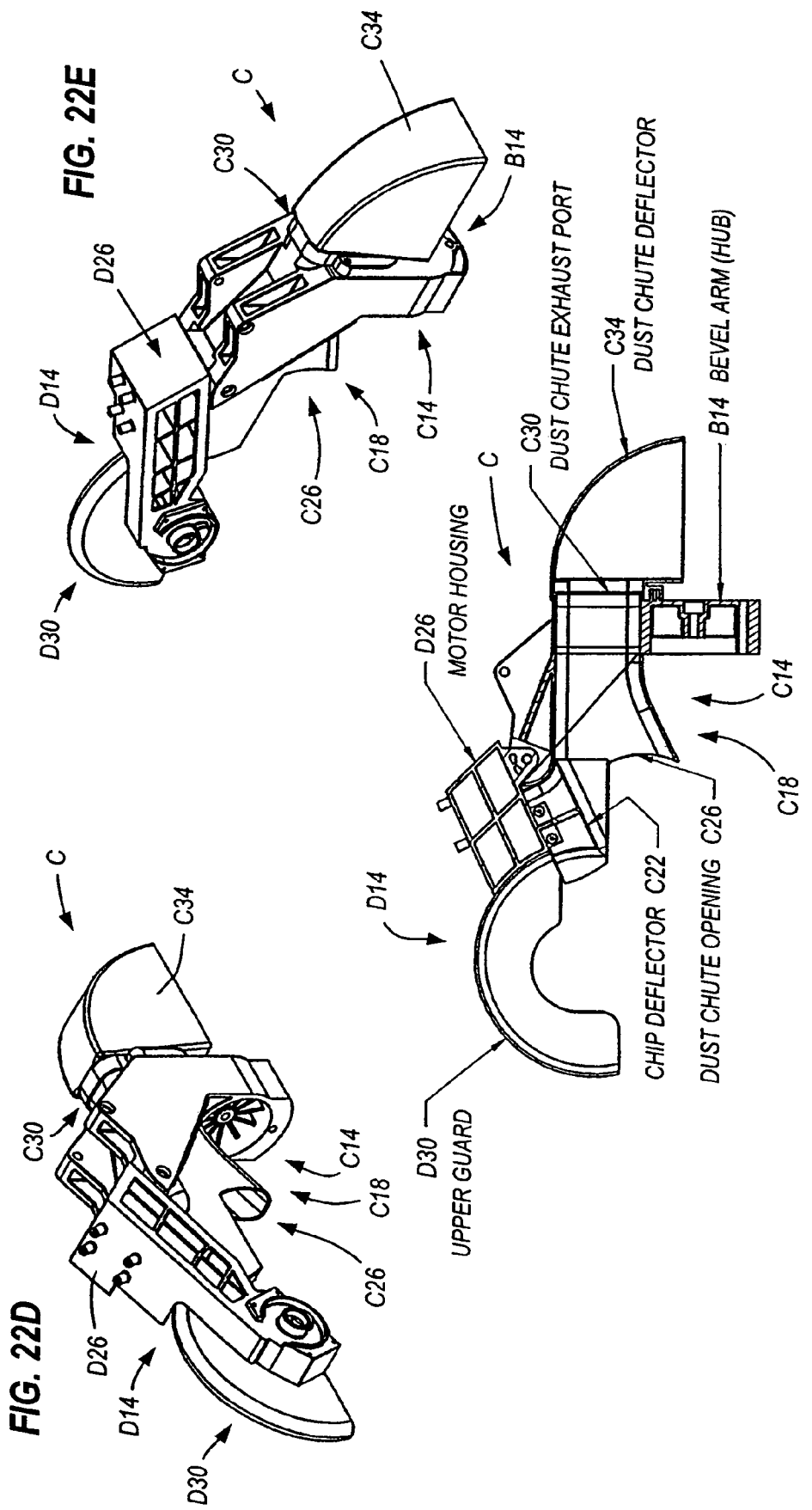

DUST CHUTE / BEVEL ARM ASSEMBLY

DUST CHUTE ASSEMBLY

BEVEL ARM

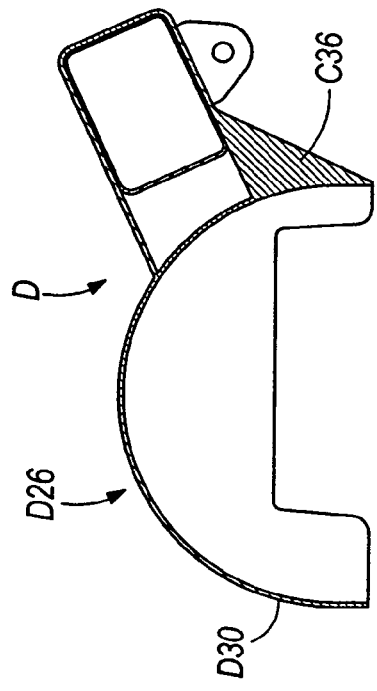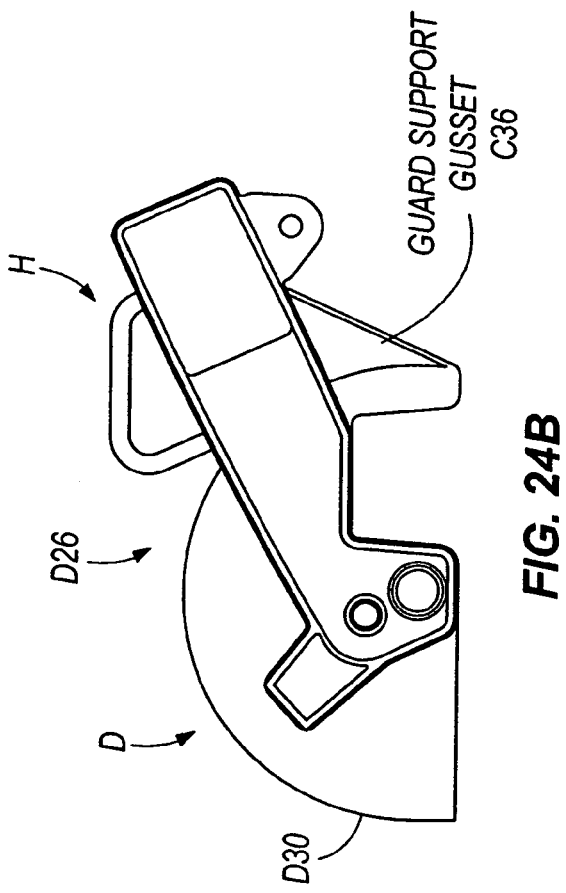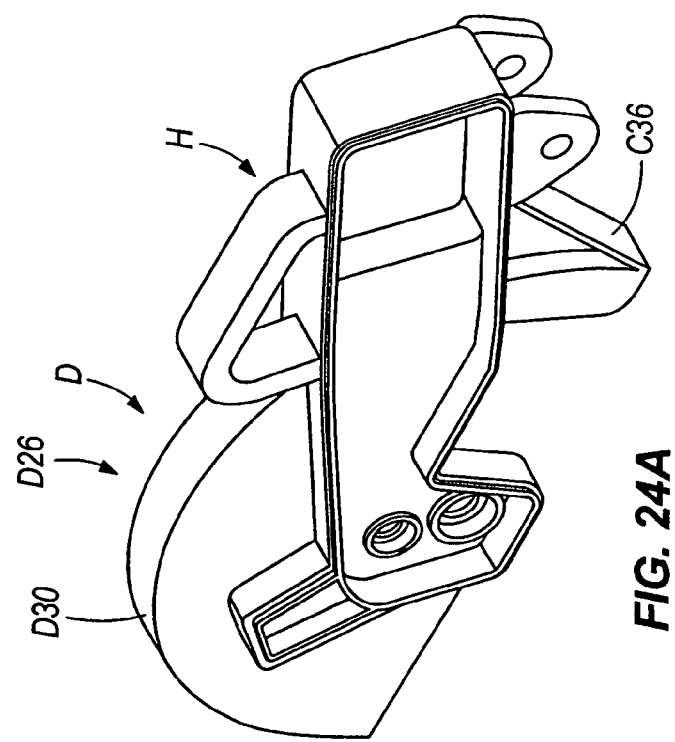
FIG. 24C
FIG. 24B
FIG. 24A

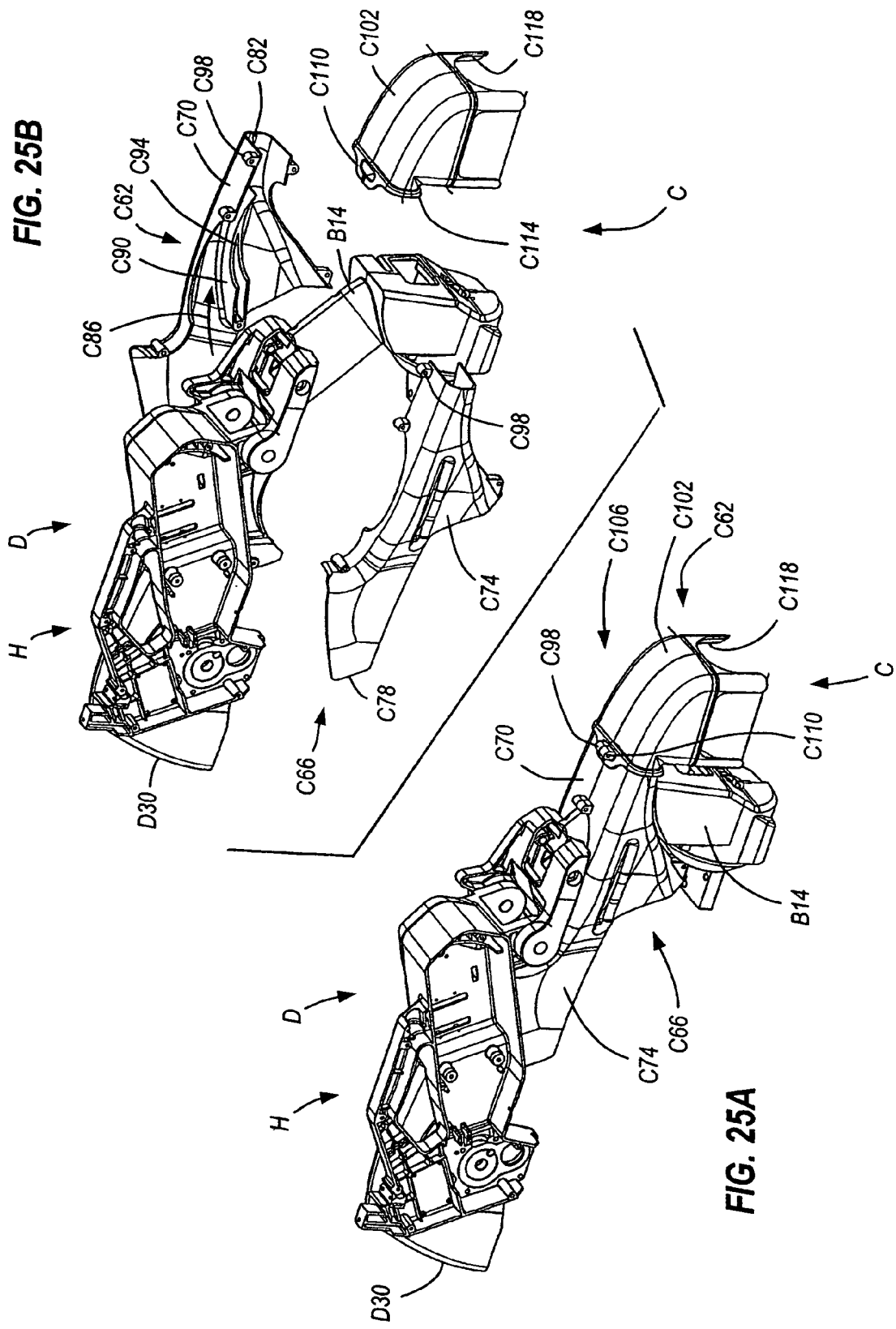

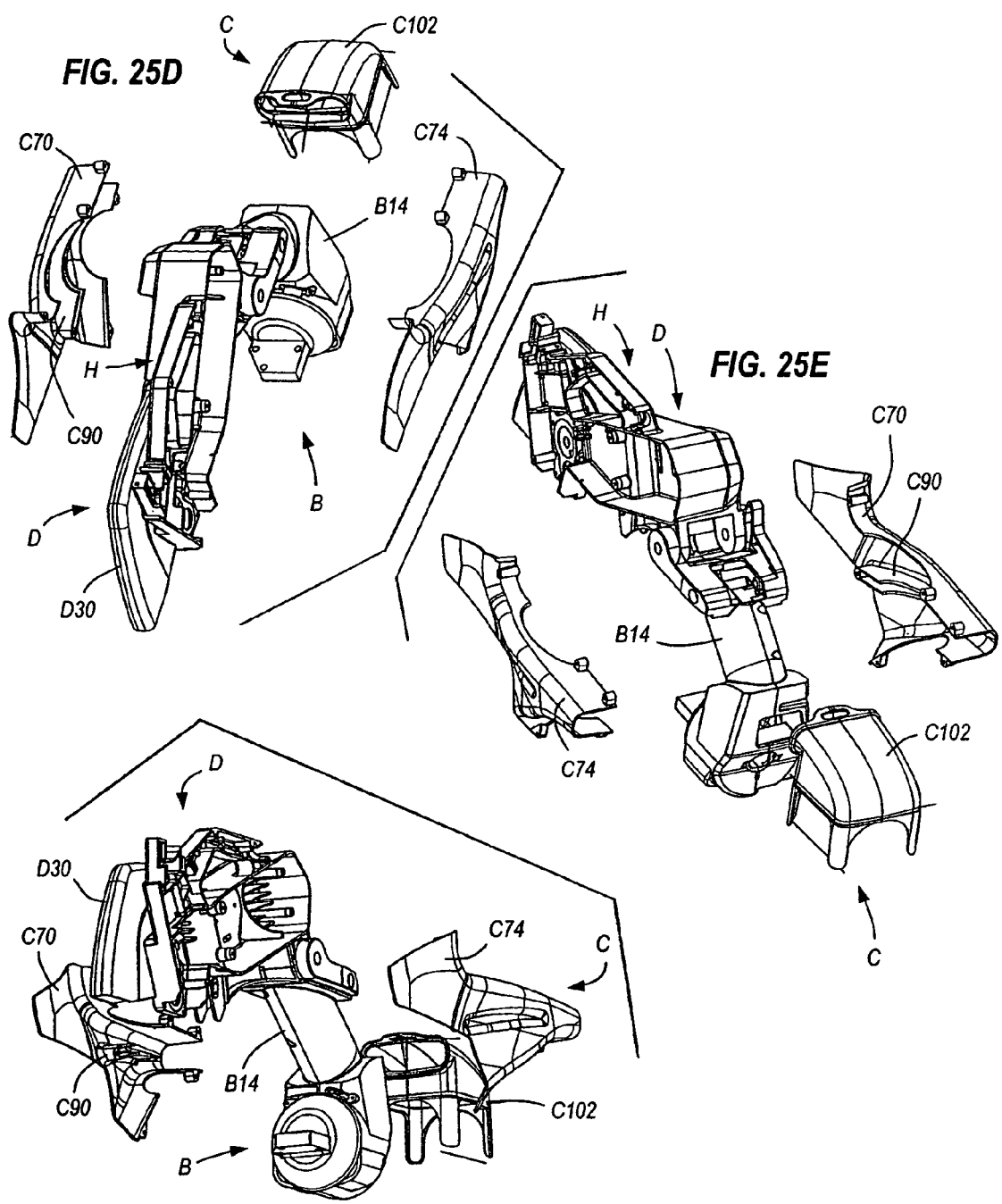

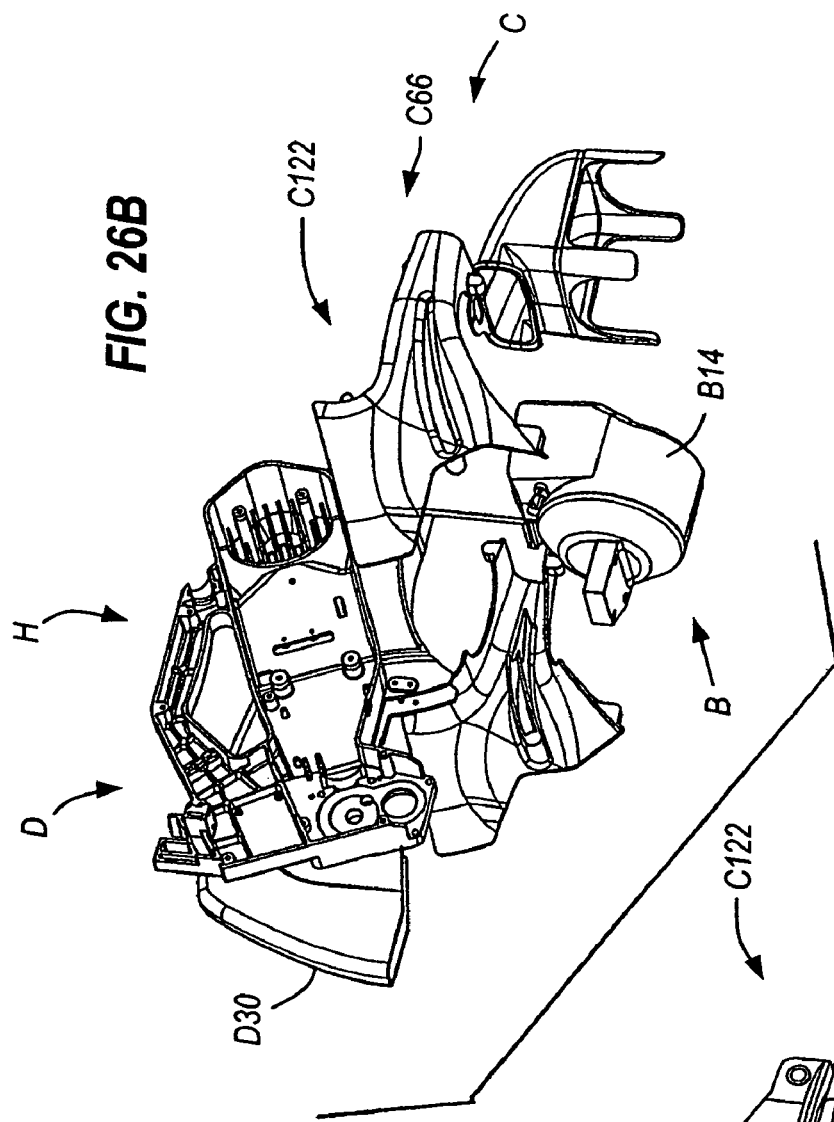
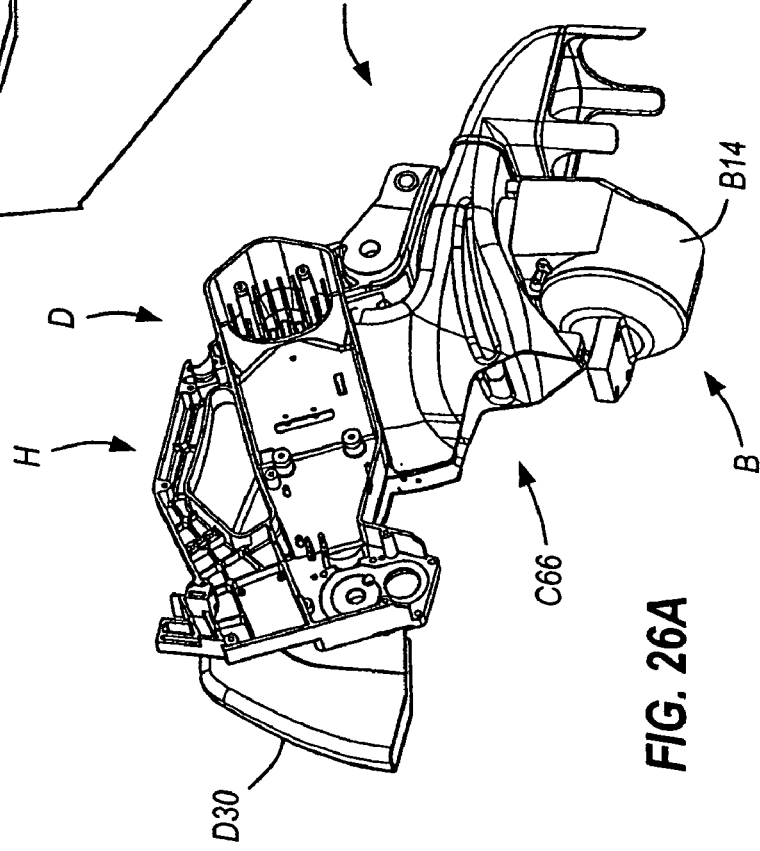
FIG. 26B
FIG. 26A

FIG. 26C
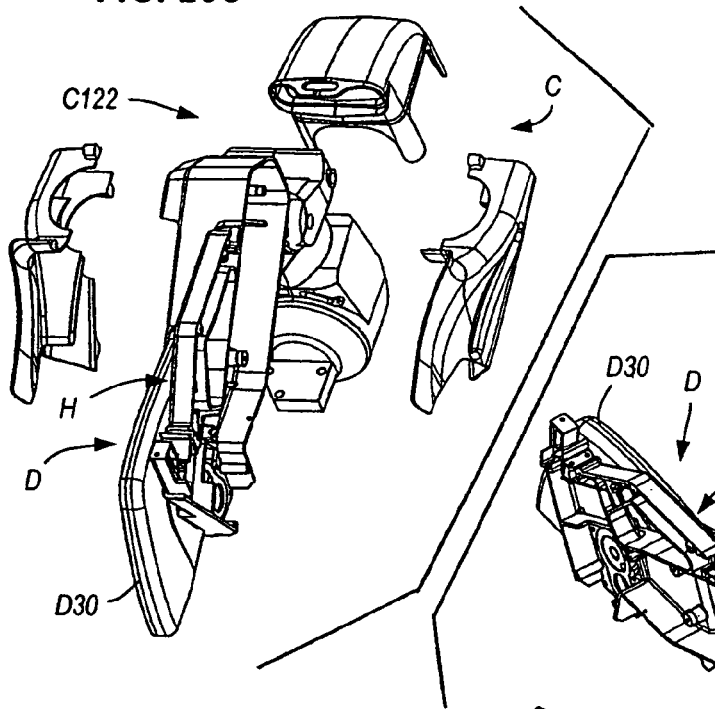
FIG. 26D
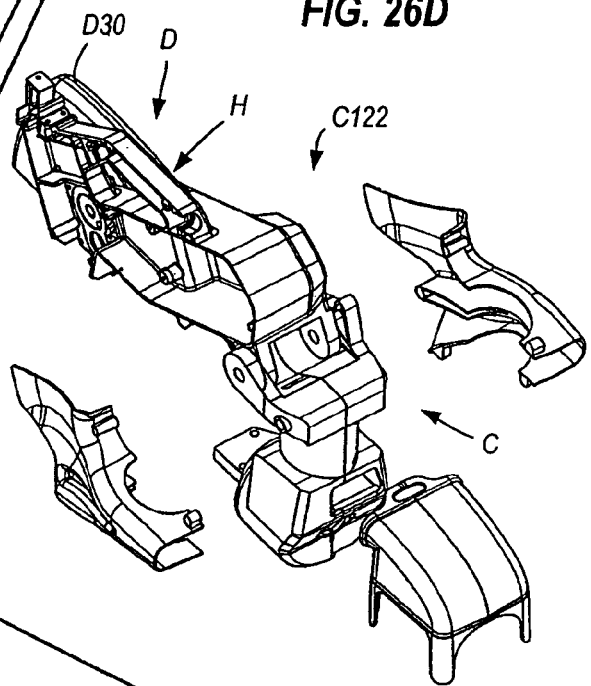
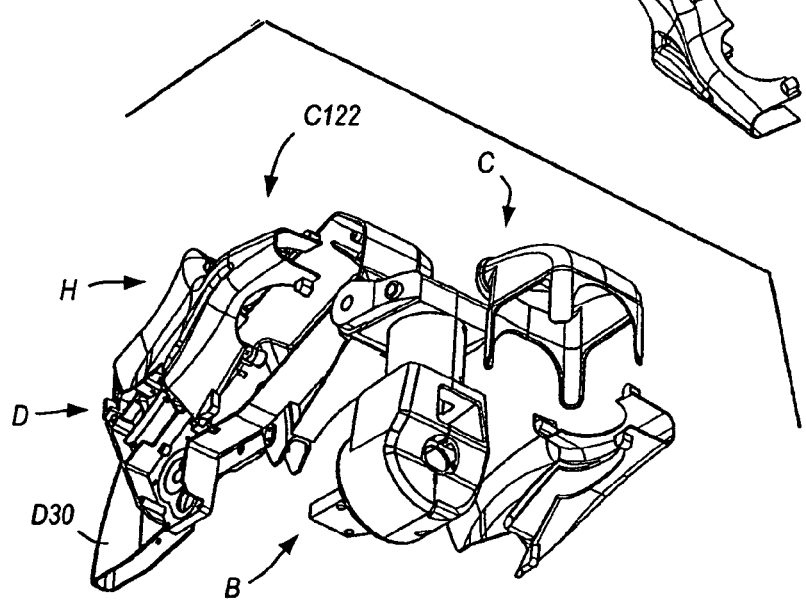
FIG. 26E

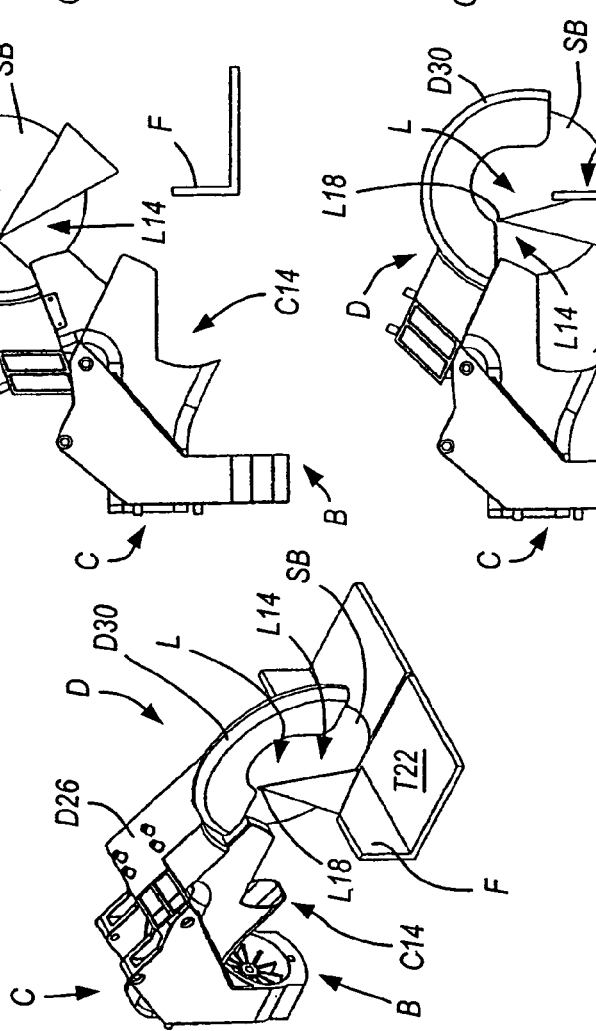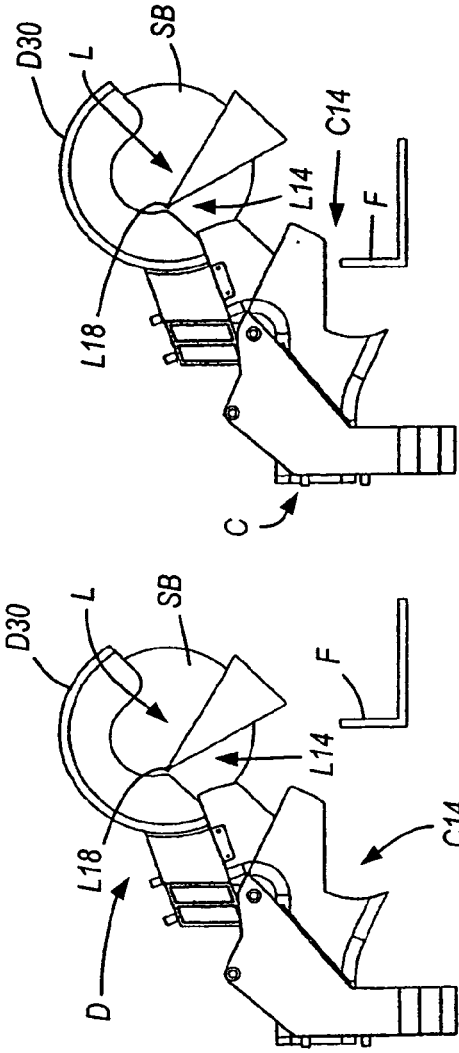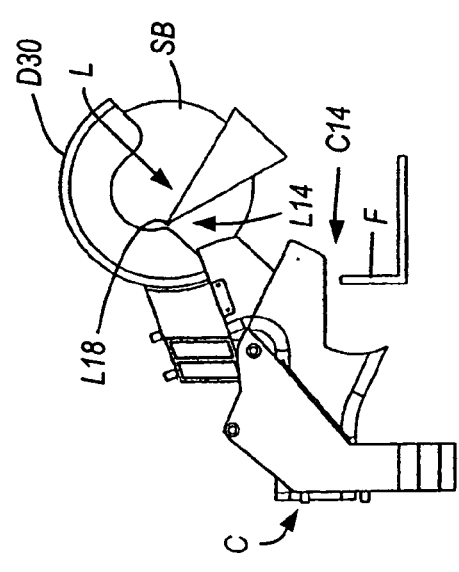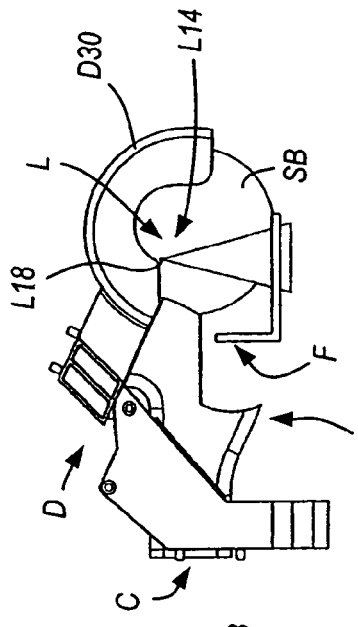

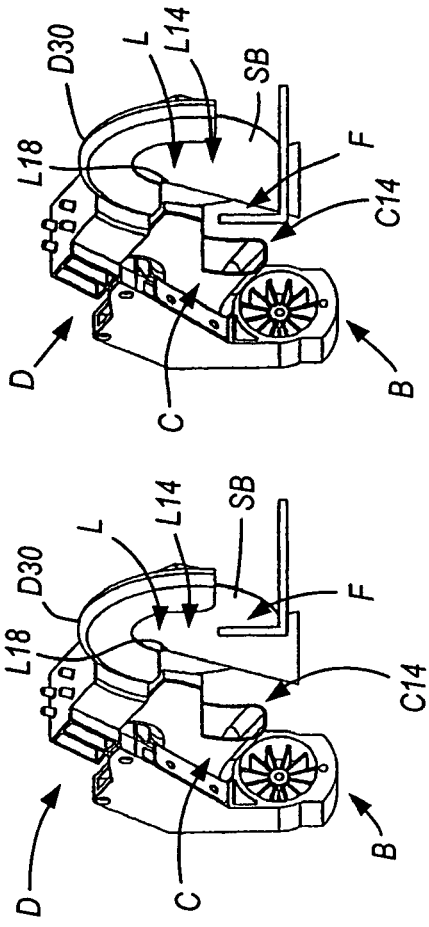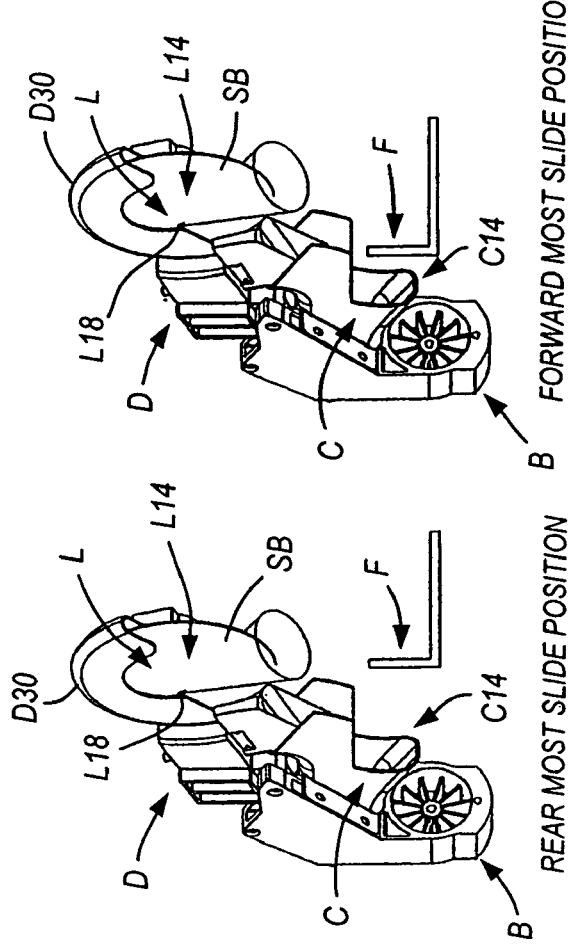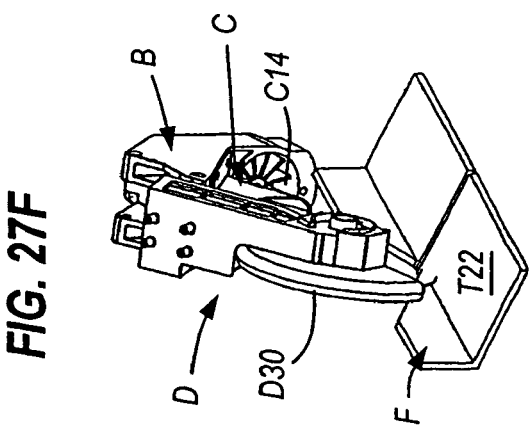

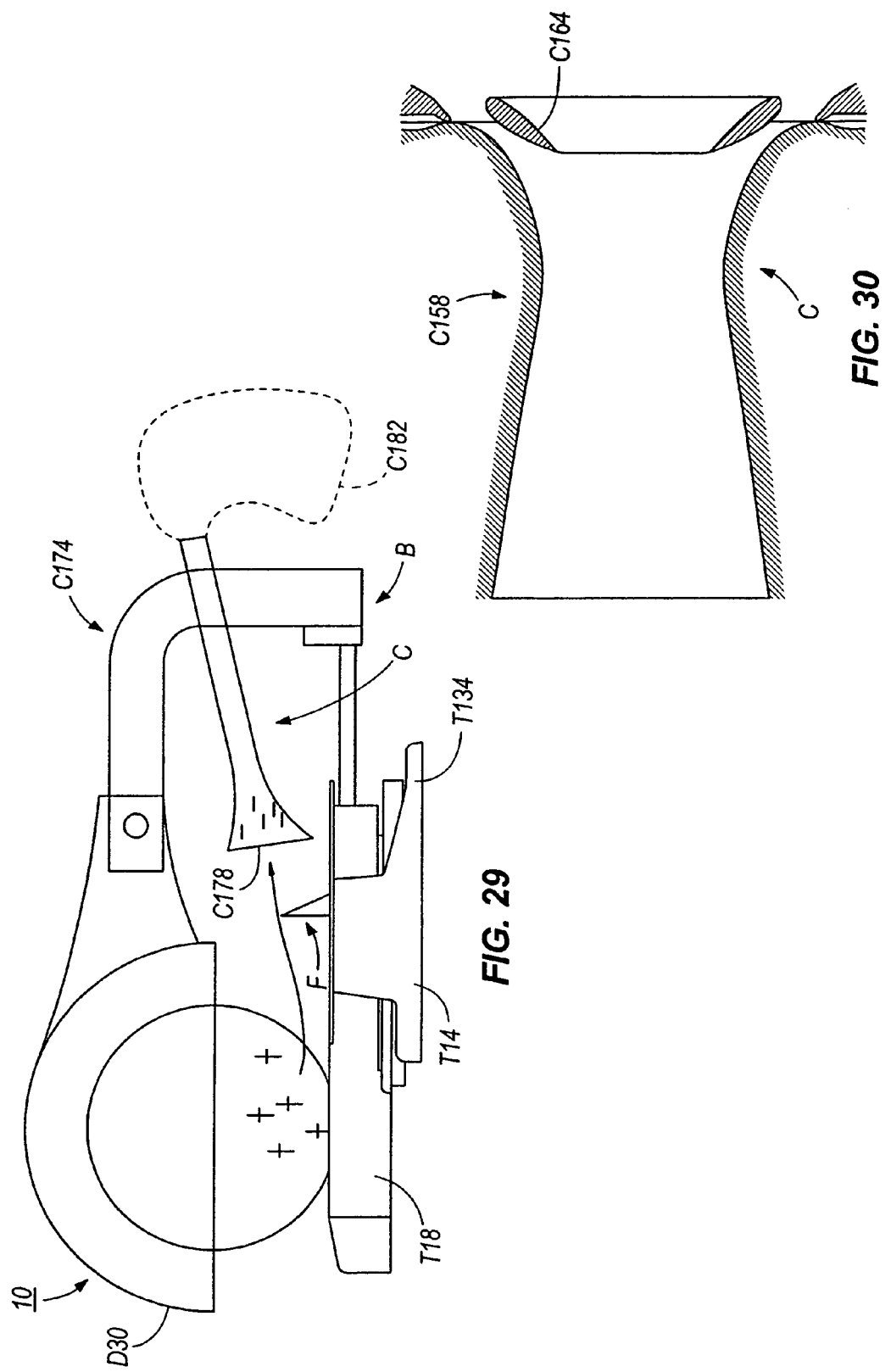

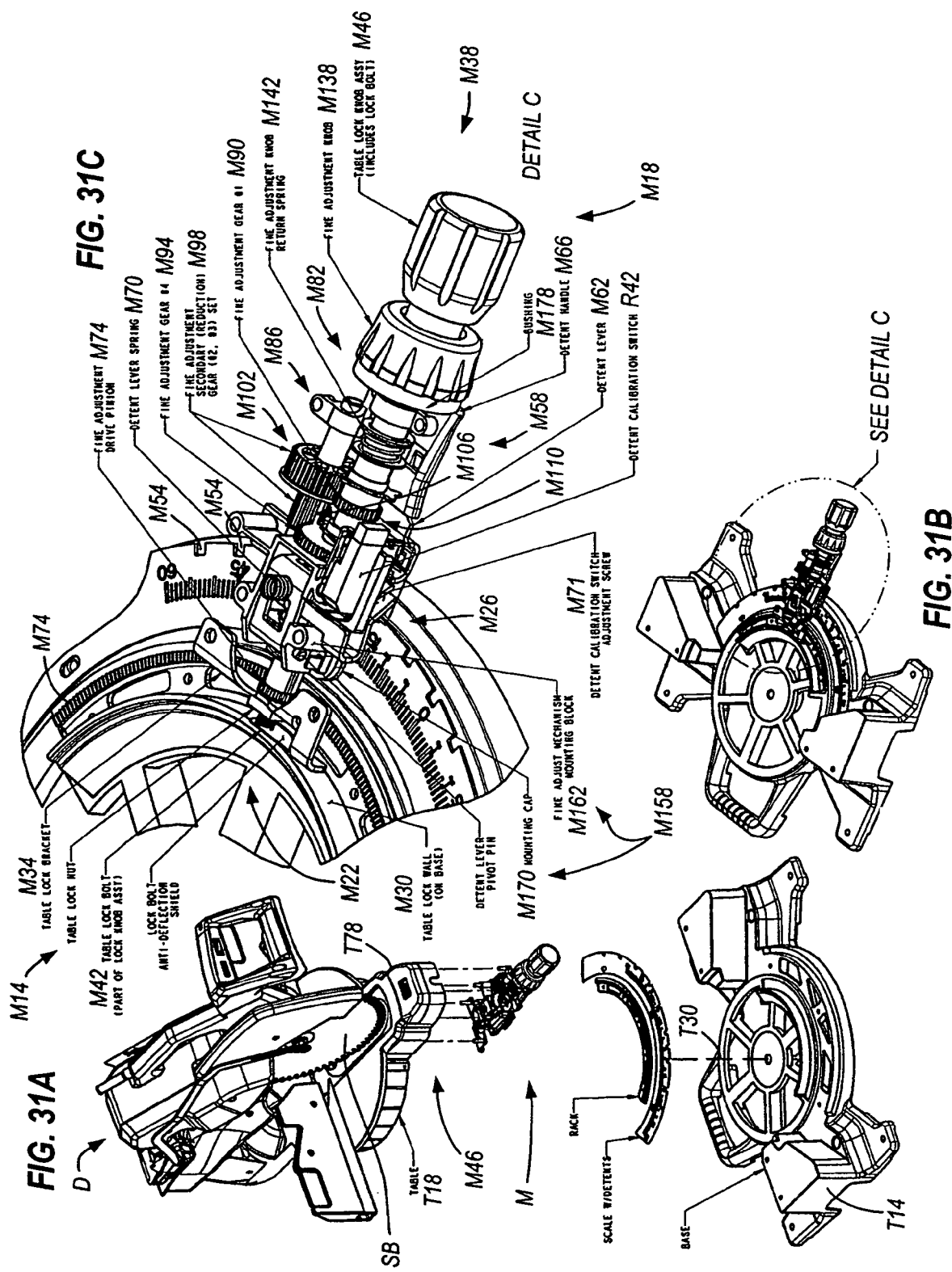

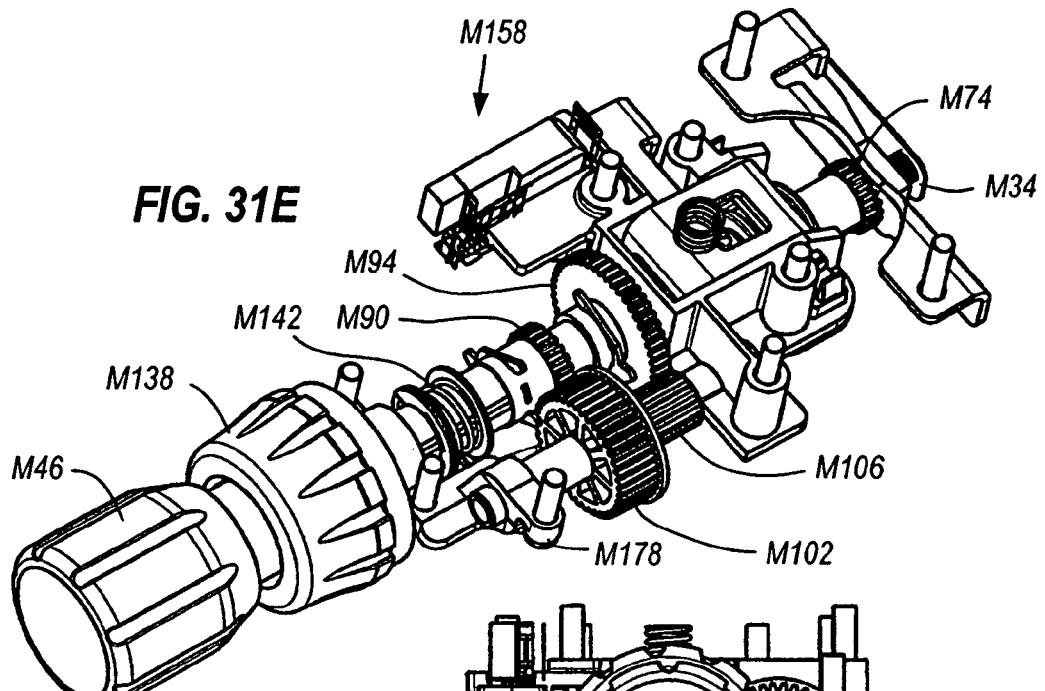
FIG. 31E
FIG. 31H
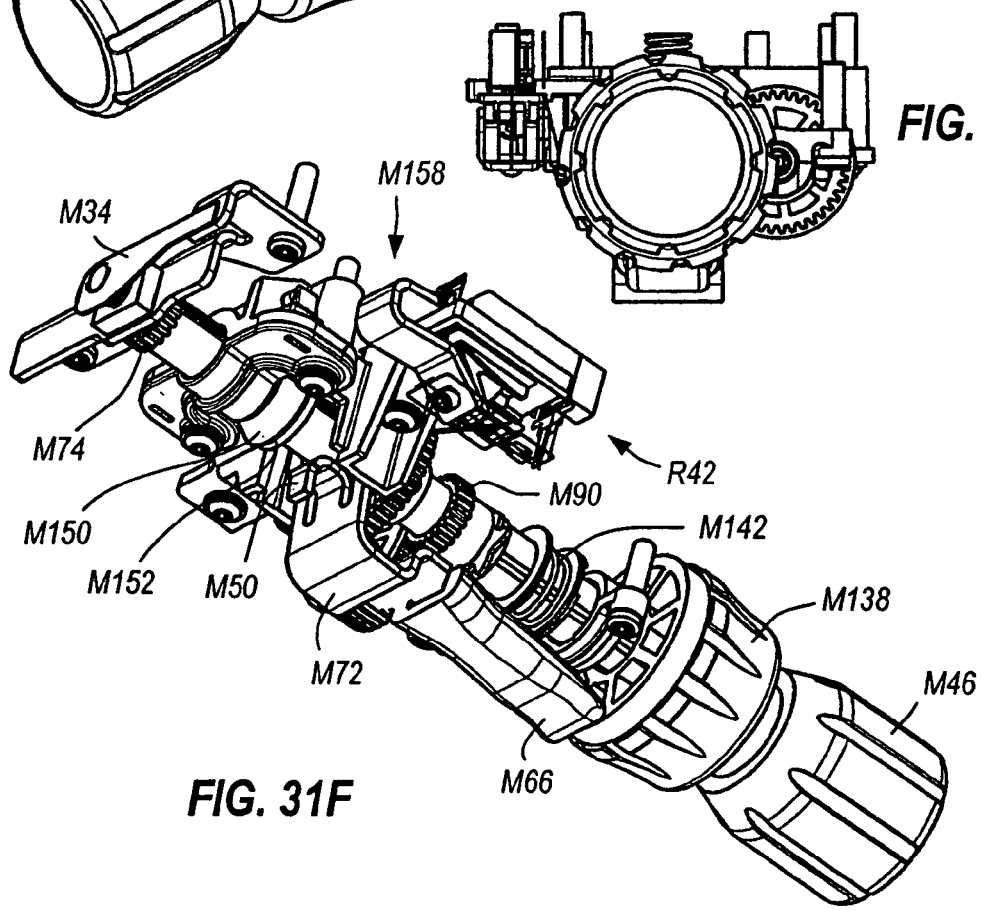
FIG. 31F

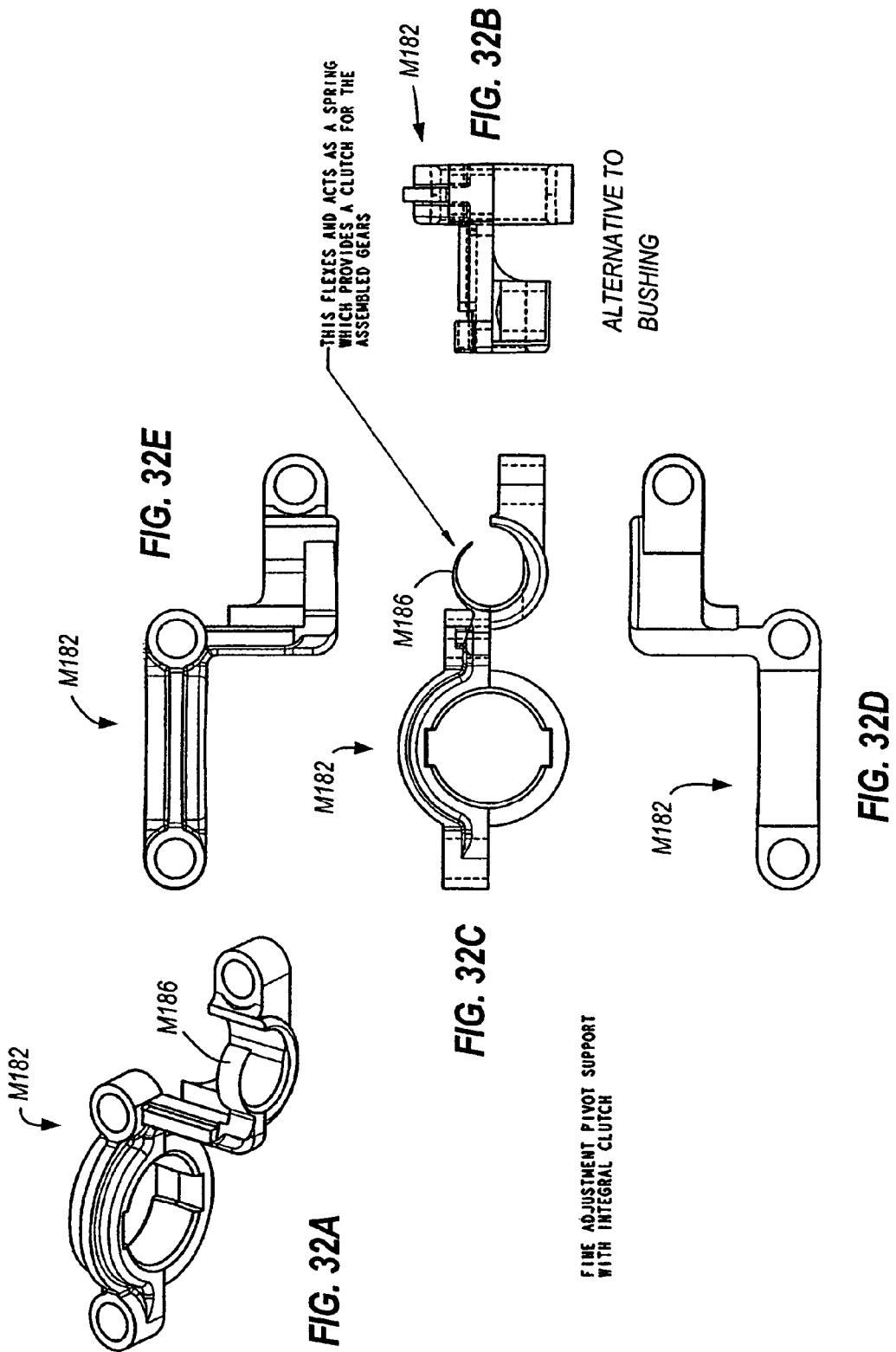

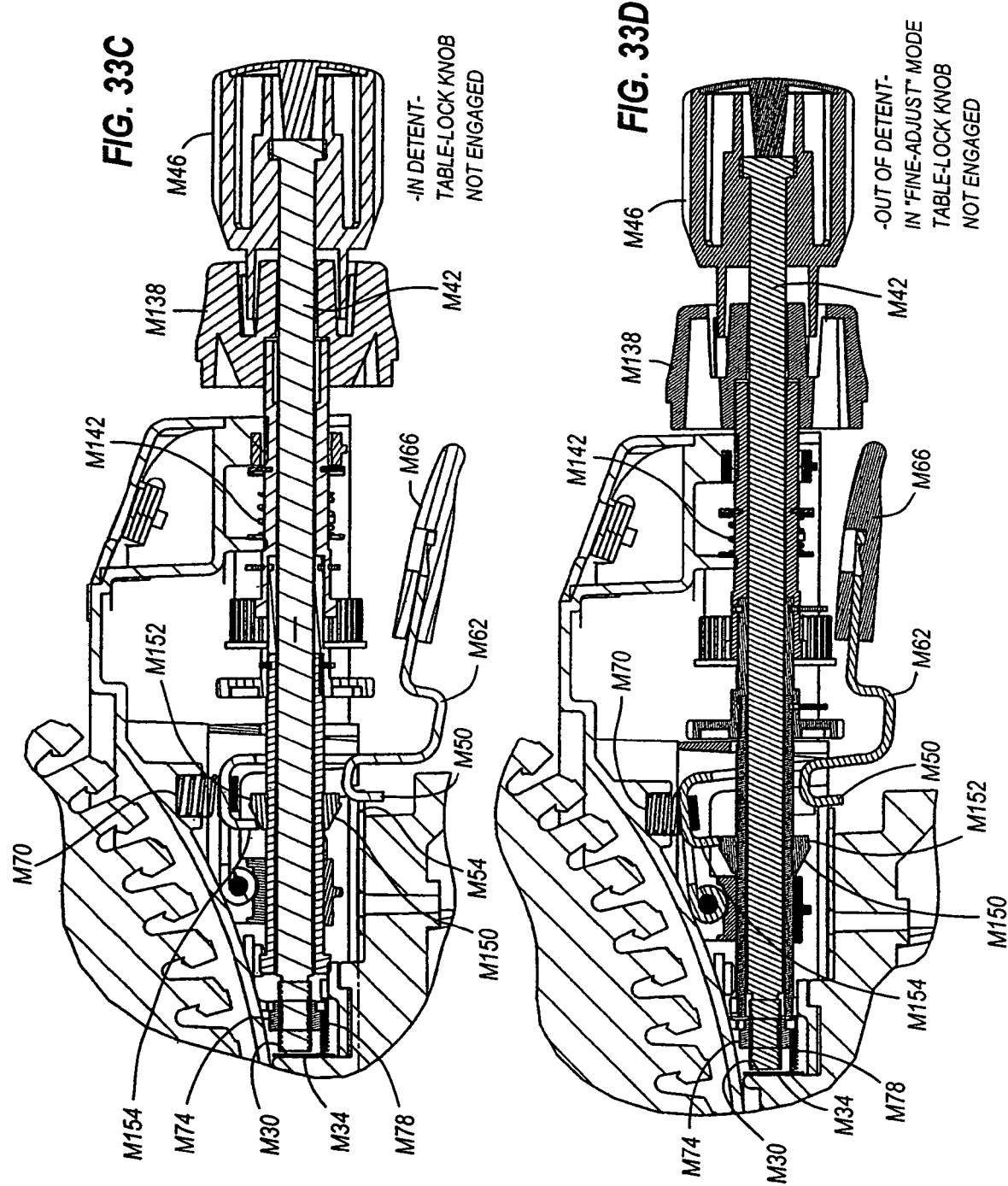

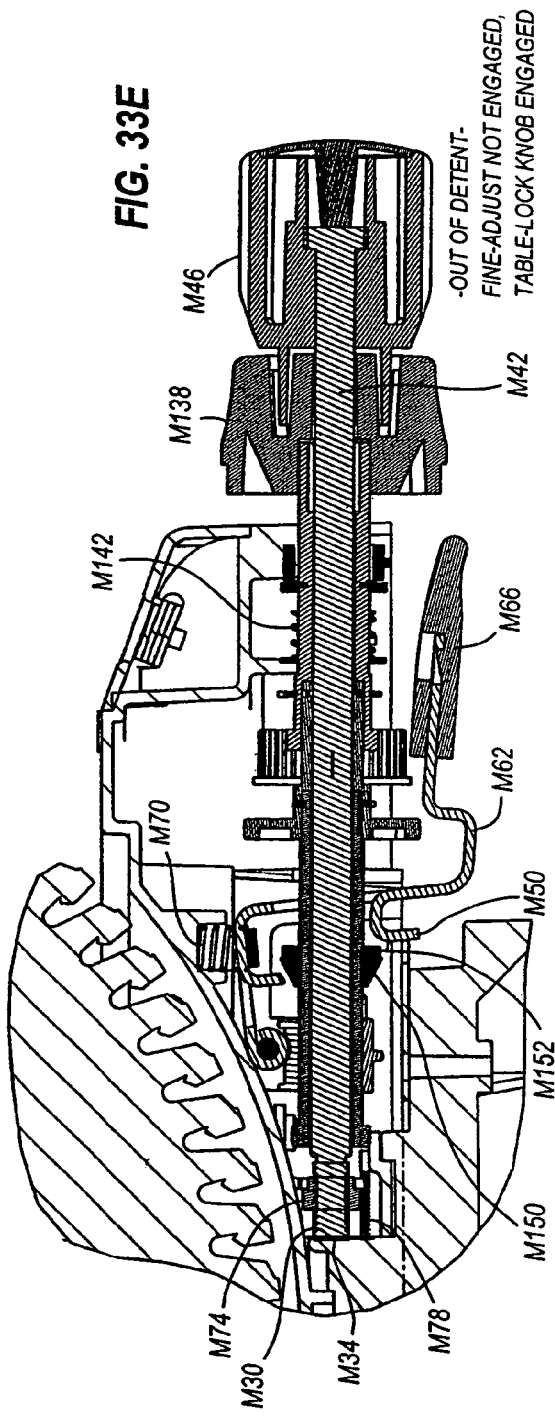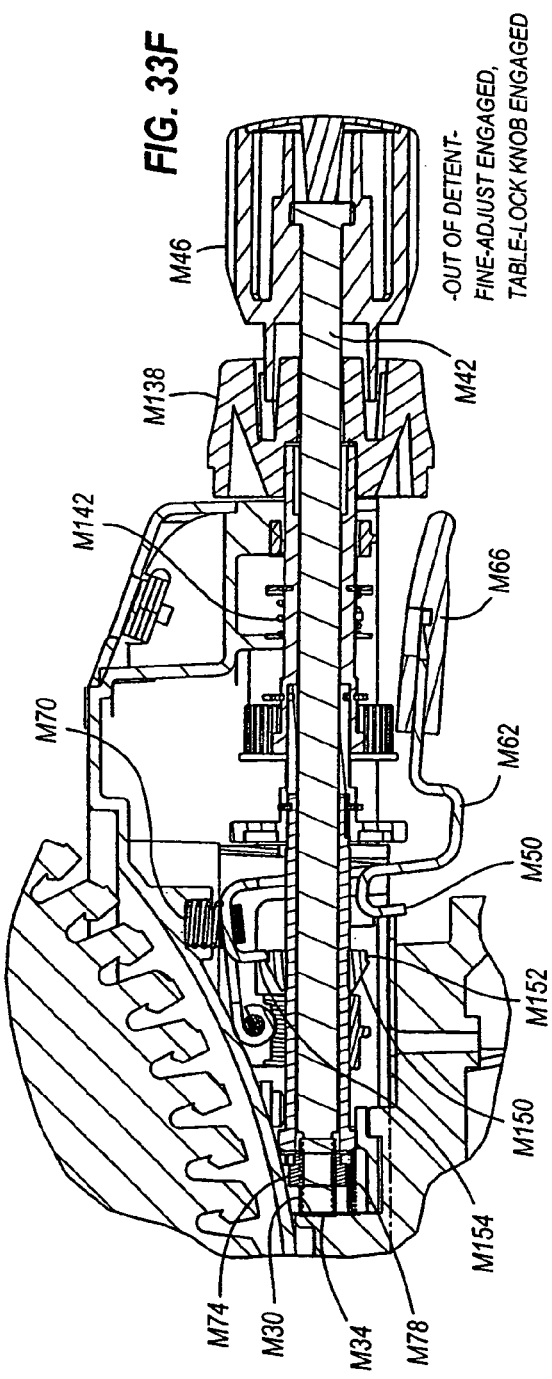

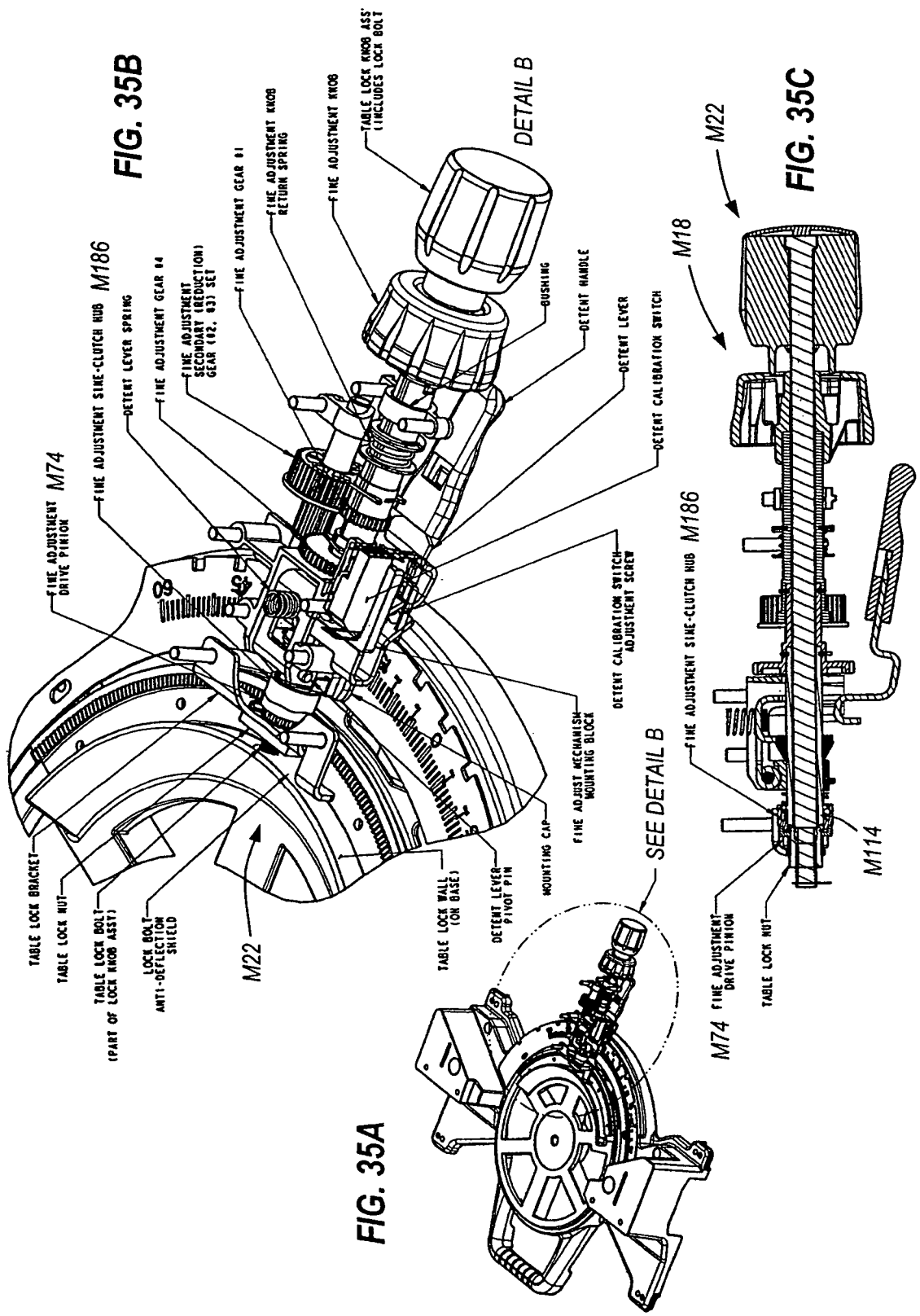

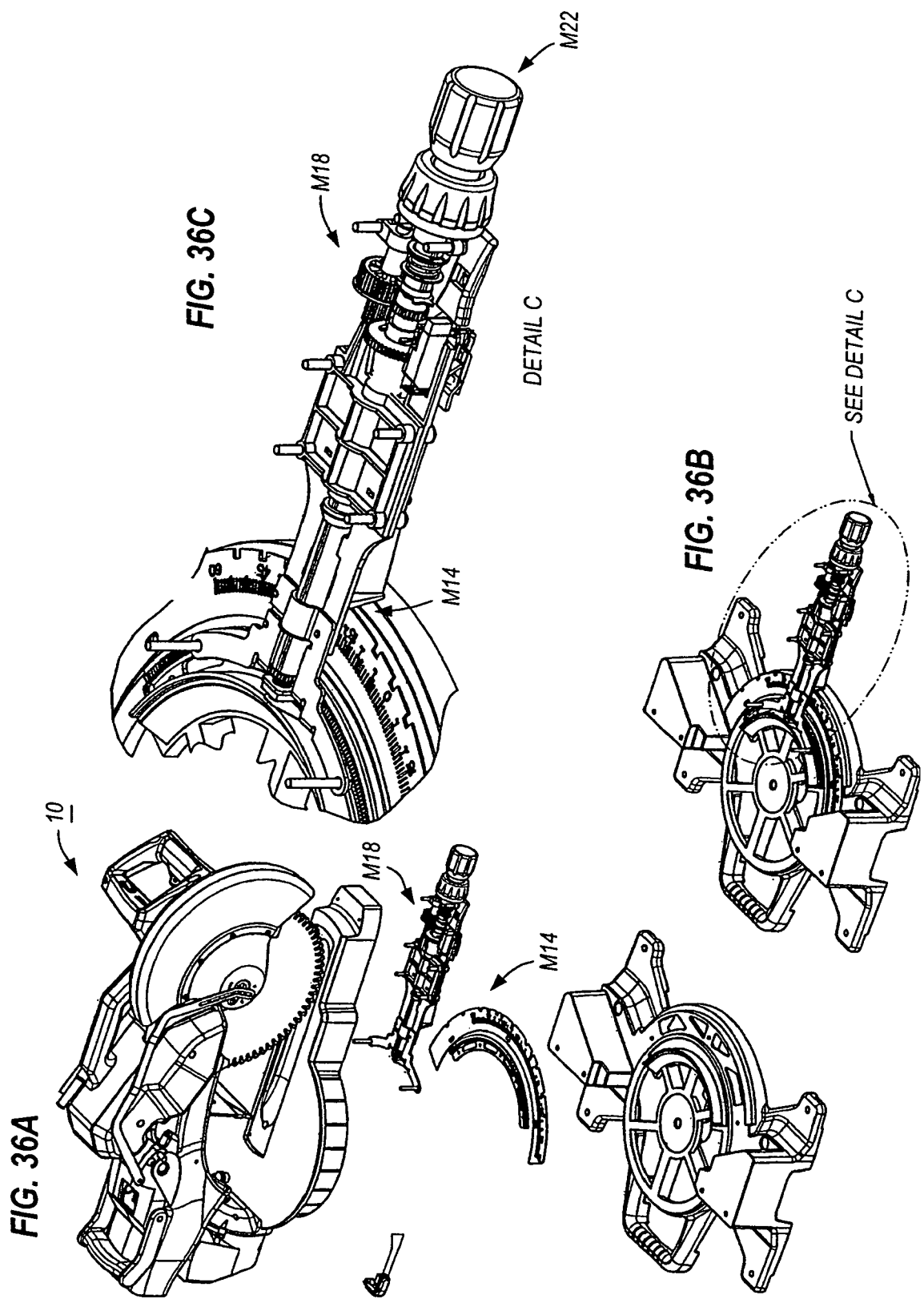

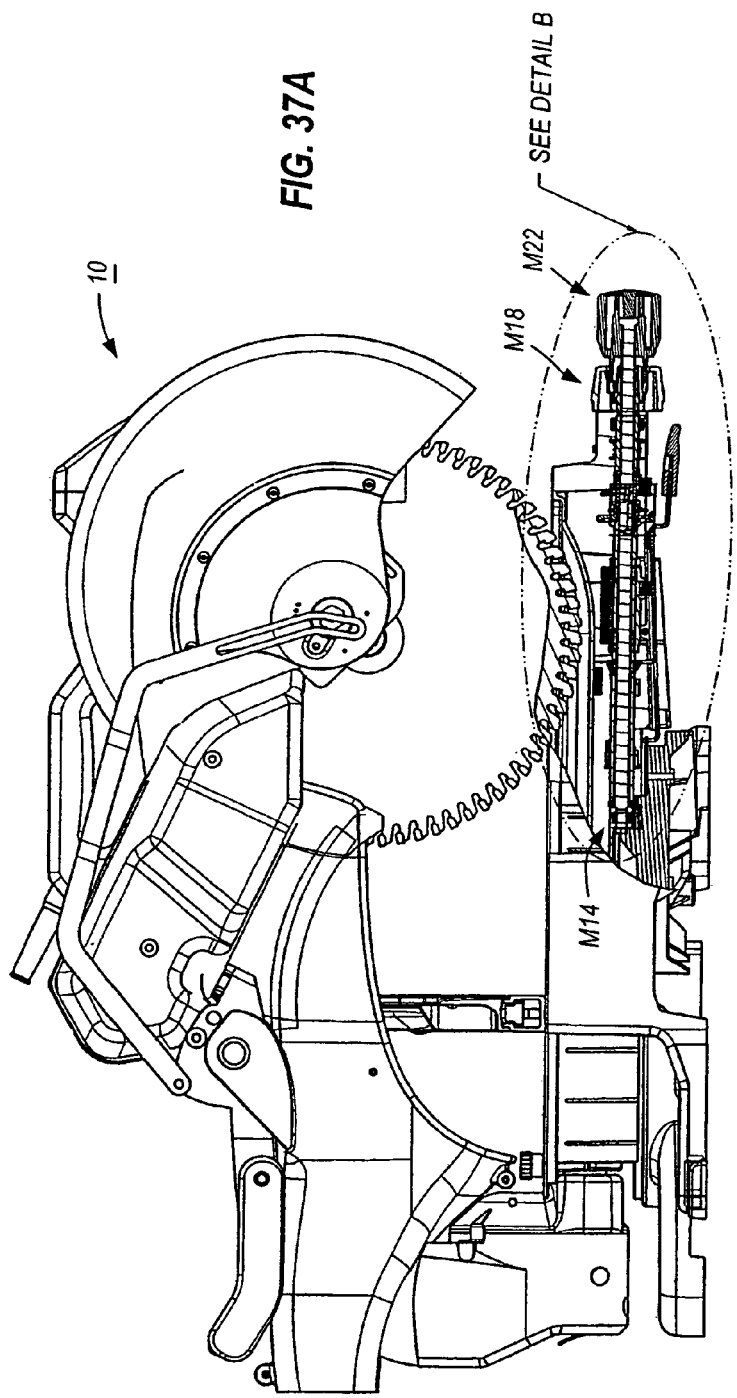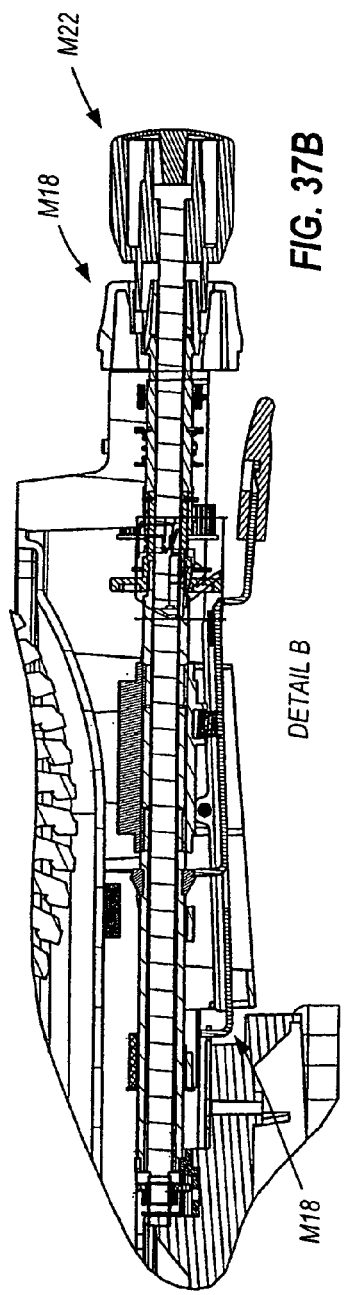

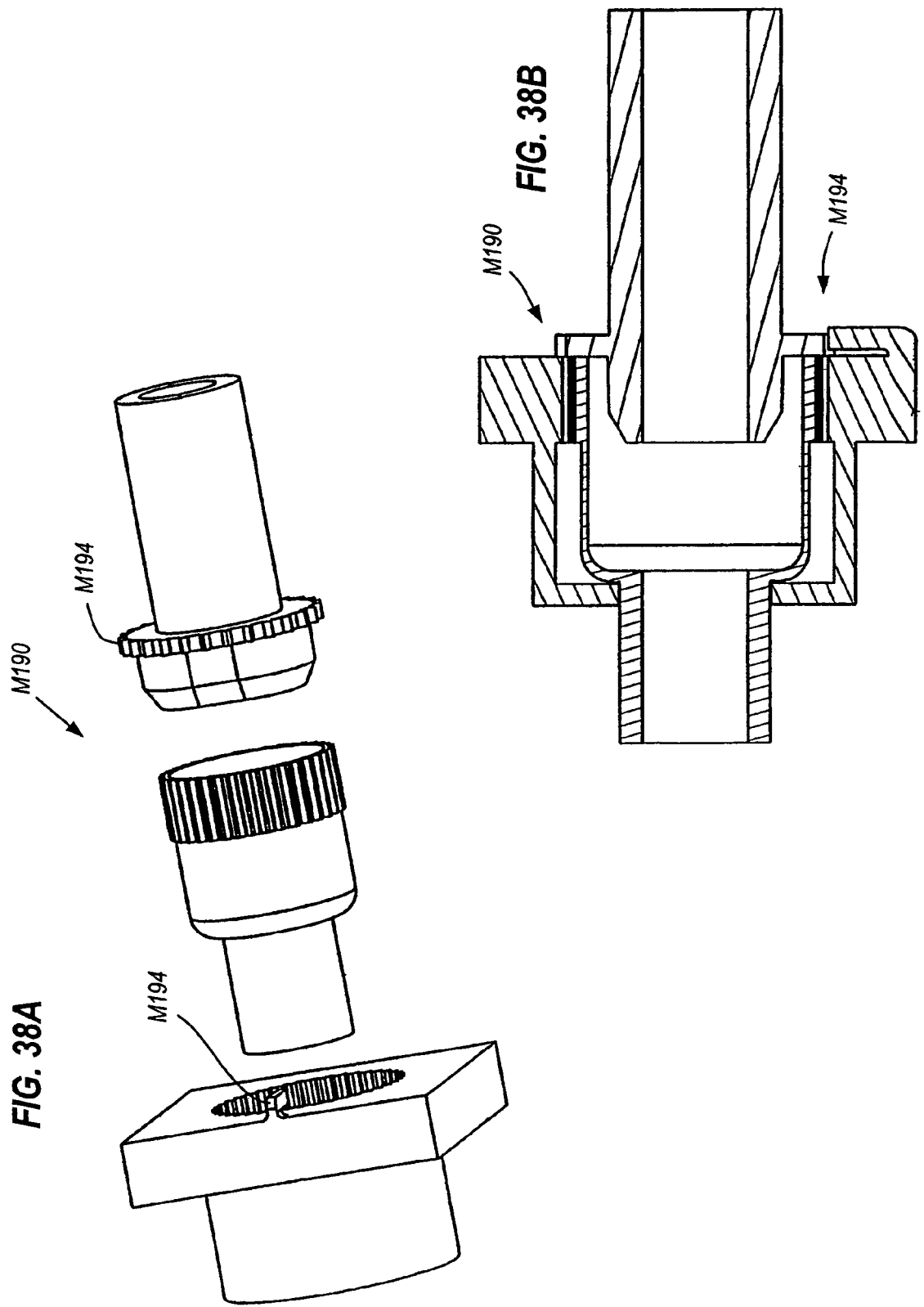

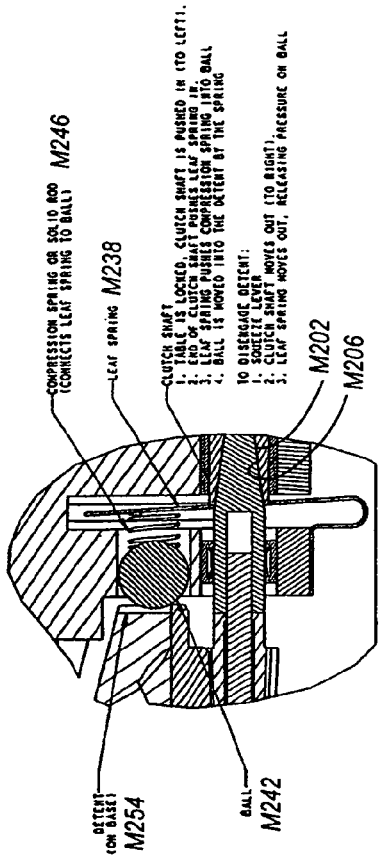
FIG. 39C  DETAIL DETENT
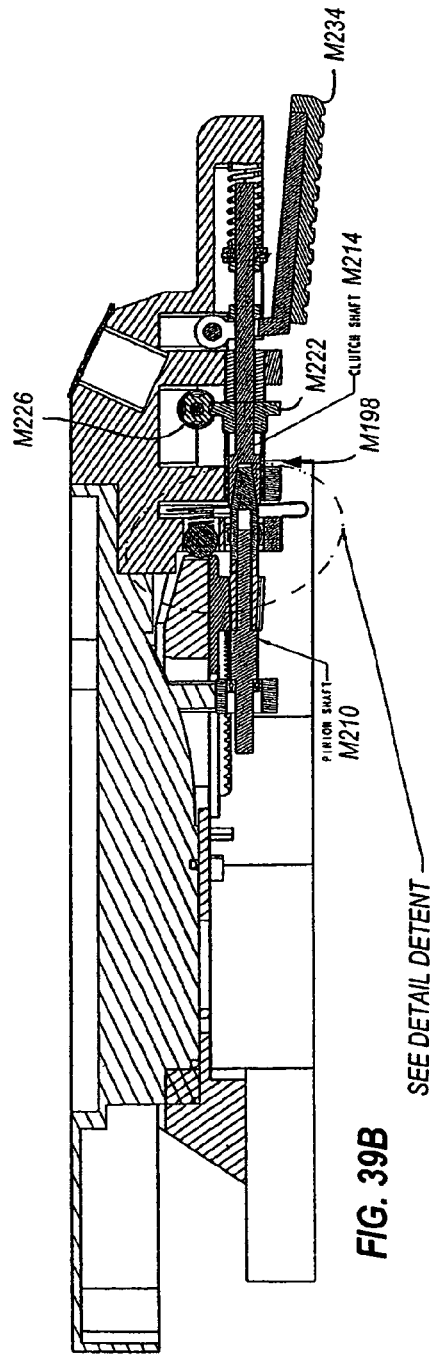
FIG. 39B

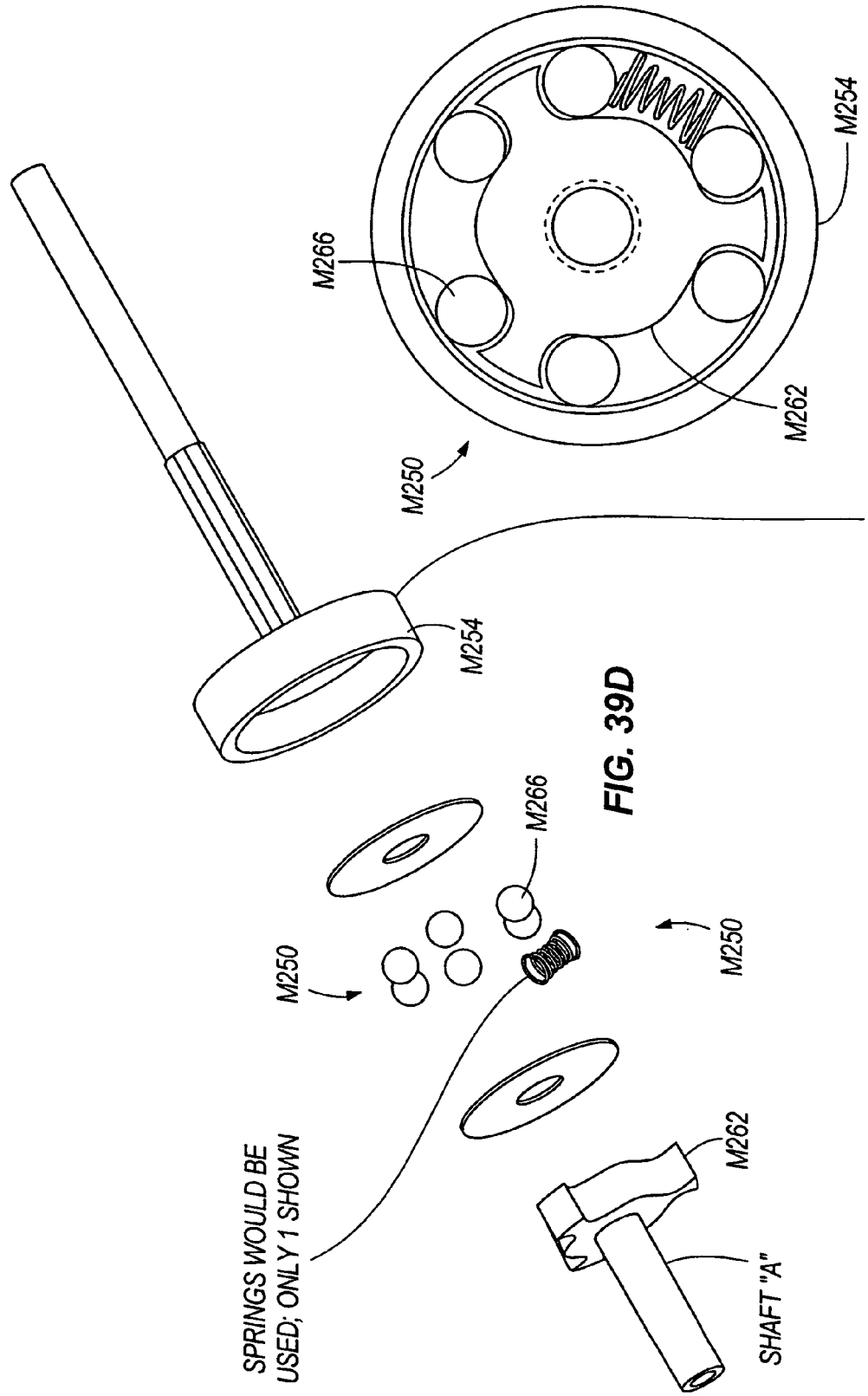

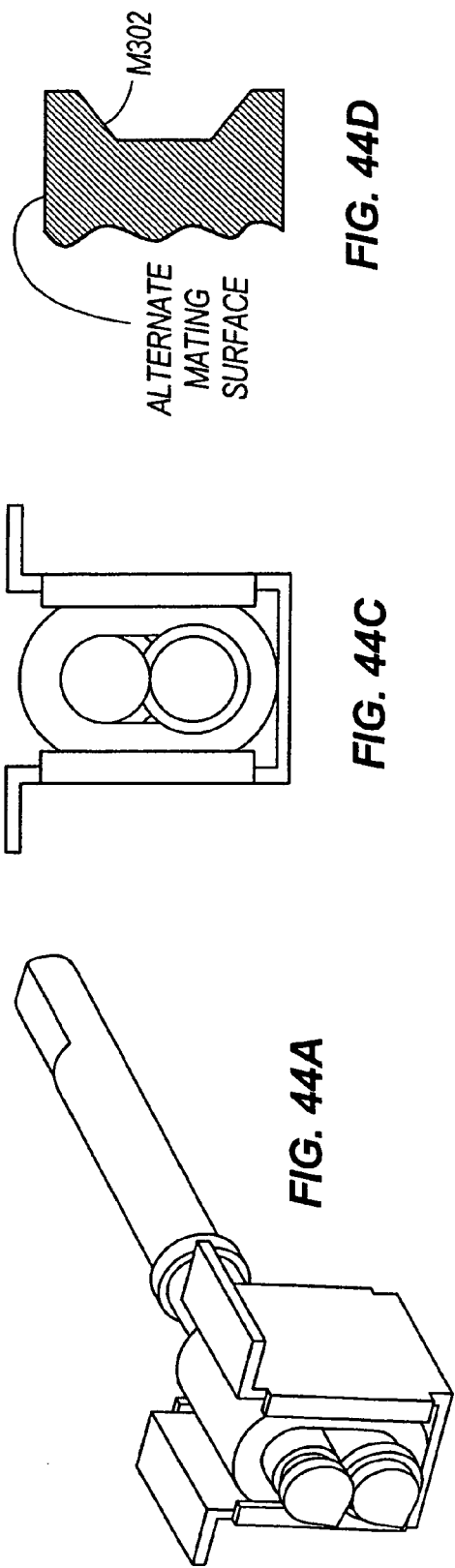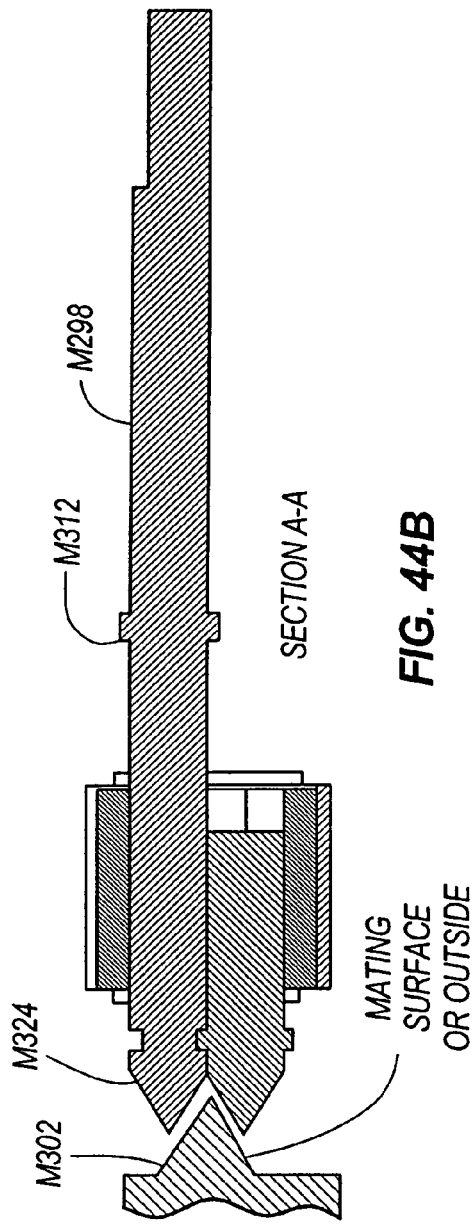

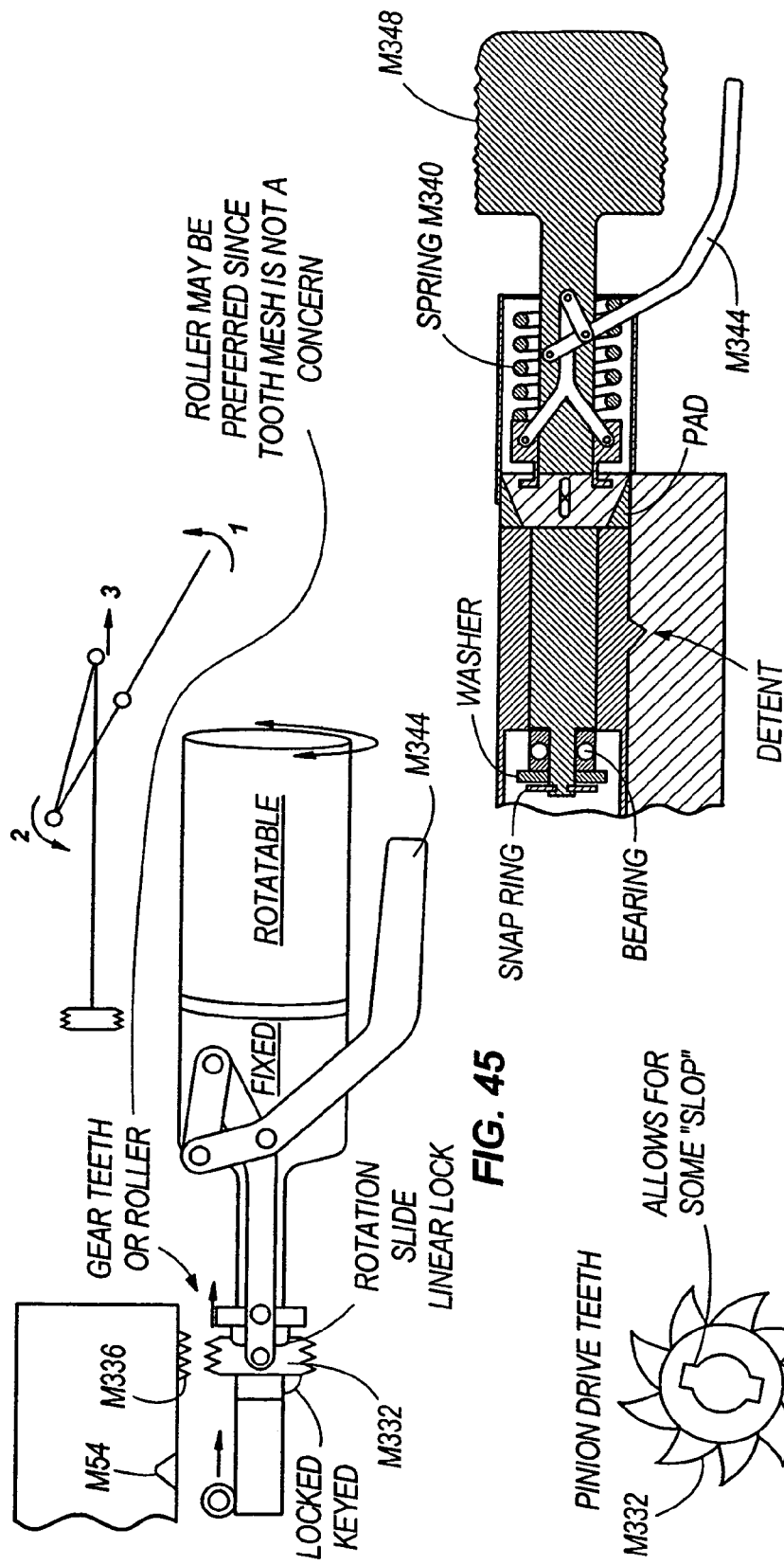

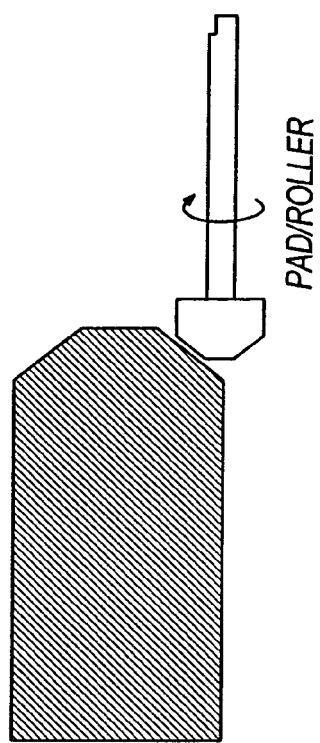
FIG. 48A RACK/PINION
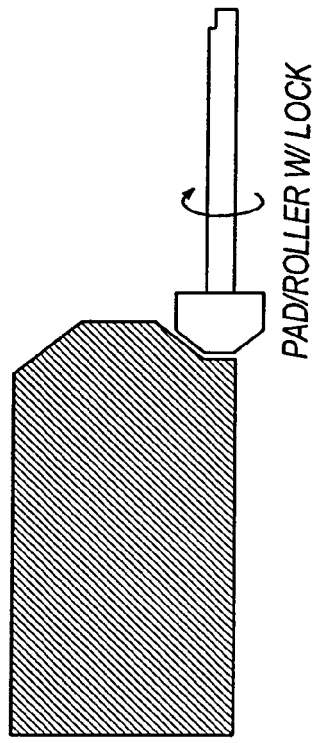
FIG. 48B PAD/ROLLER
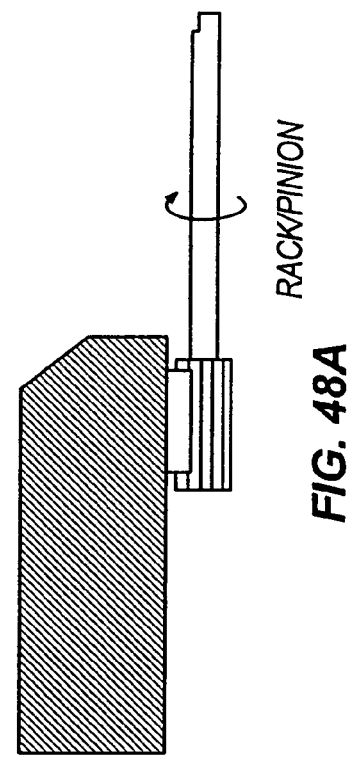
FIG. 48C PAD/ROLLER W/ 2-SIDED CONTACT
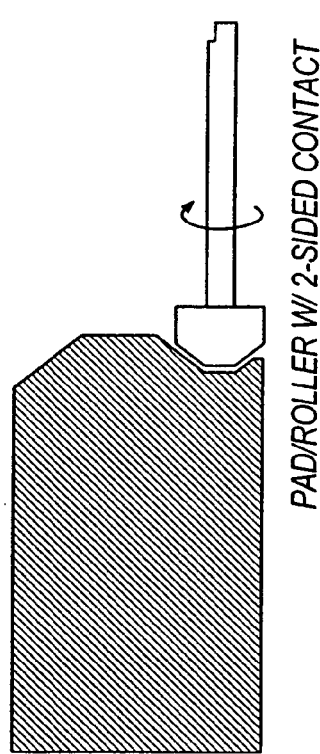
FIG. 48D PAD/ROLLER W/ LOCK

MODIFIED POINT-CONTACT DESIGN

POINT-CONTACT DESIGN

BEVEL GEAR - RACK & PINION

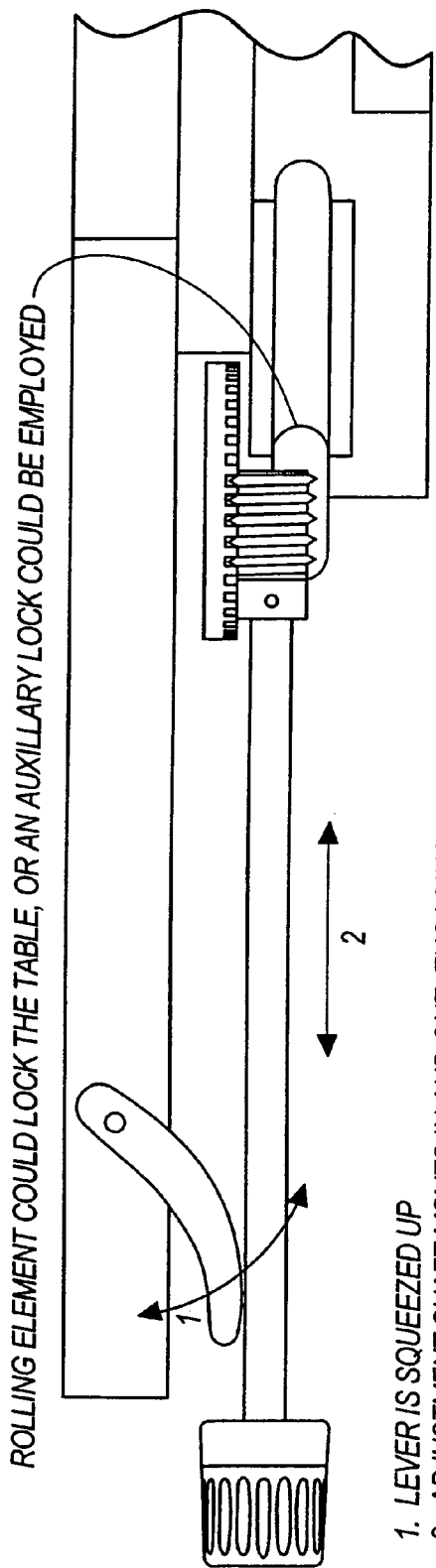

FIG. 49A

1. LEVER IS SQUEEZED UP
2. ADJUSTMENT SHAFT MOVES IN AND OUT, ENGAGING AND DISENGAGING ROLLING ELEMENT – THE ENTIRE ASSEMBLY COULD MOVE, OR THE SHAFT COULD TELESCOPE INTO ITSELF LEAVING THE KNOB IN ITS ORIGINAL POSITION

ROLLING ELEMENT COULD LOCK THE TABLE, OR AN AUXILLARY LOCK COULD BE EMPLOYED

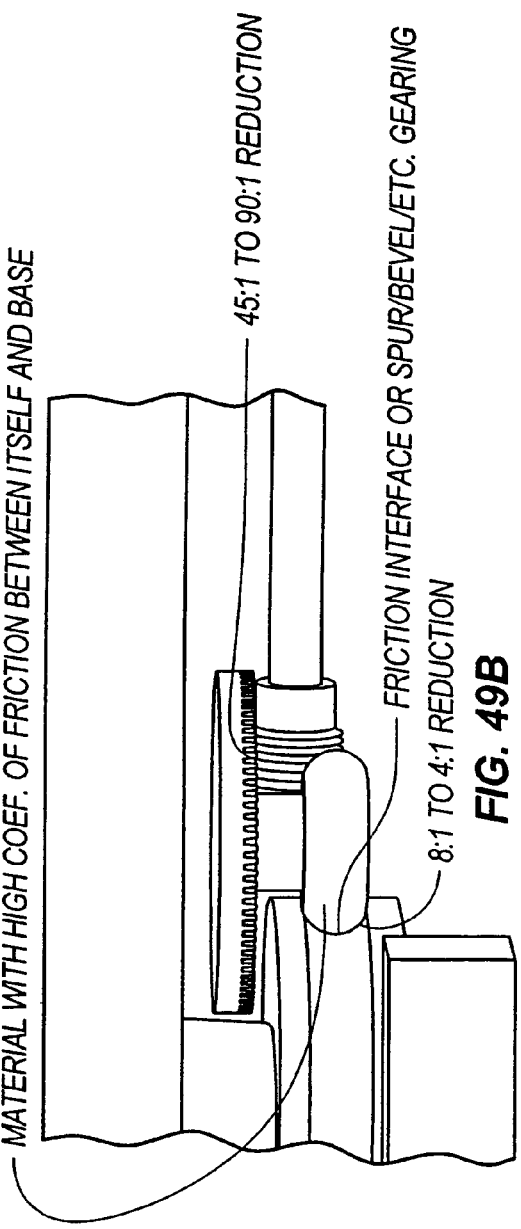

FIG. 49B

45:1 TO 90:1 REDUCTION
FRICTION INTERFACE OR SPUR/BEVEL/ETC. GEARING
8:1 TO 4:1 REDUCTION
MATERIAL WITH HIGH COEF. OF FRICTION BETWEEN ITSELF AND BASE

FACE-WORM/ROLLING ELEMENT COULD BE ROTATED ALONG THE PERIMETER OF THE TABLE. THIS WOULD ALLOW THE ADJUSTMENT KNOB TO BE CENTERED IN THE TONGUE.

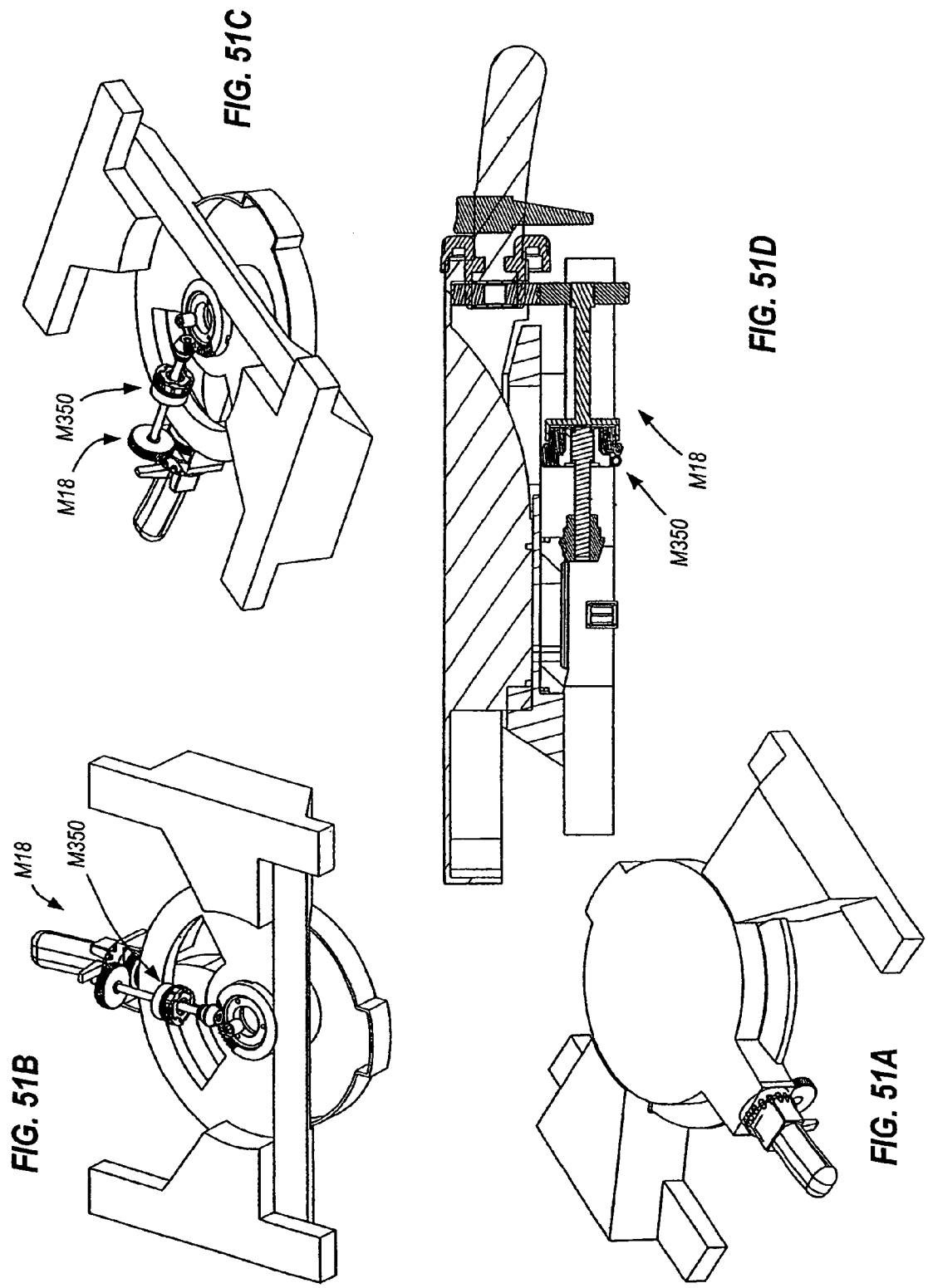

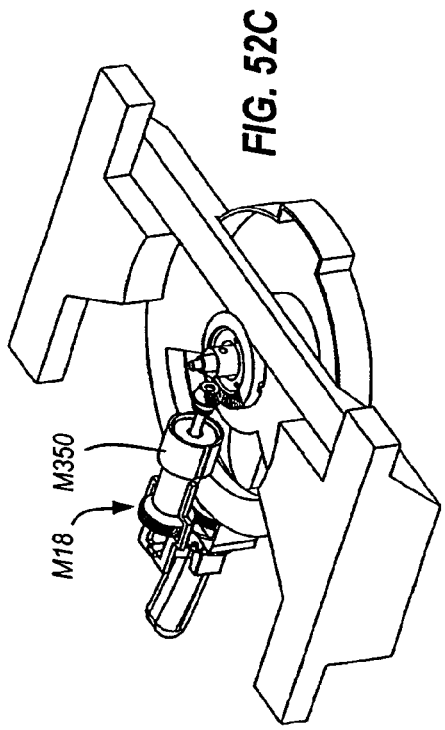
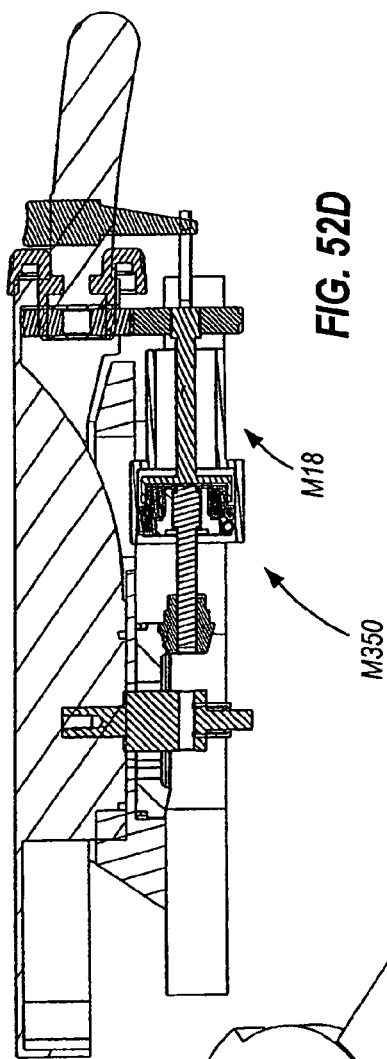
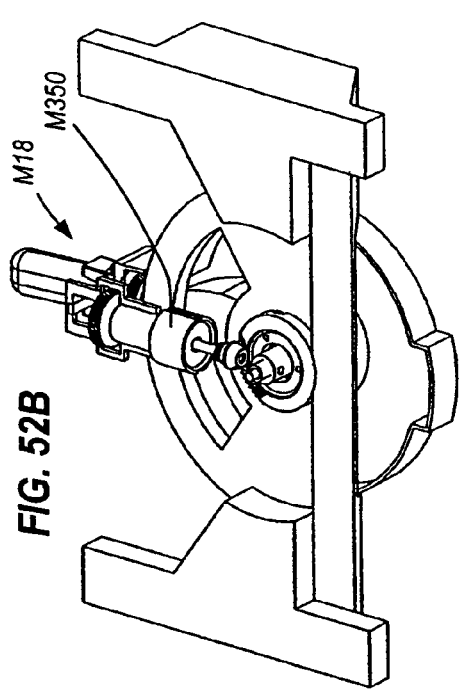
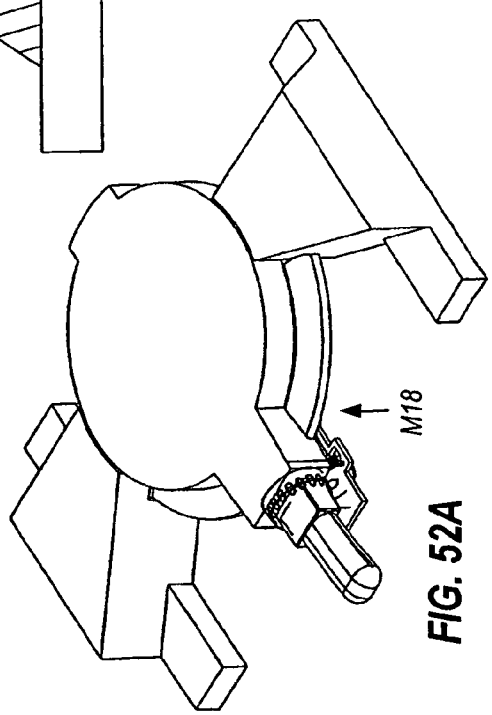
FIG. 52C
FIG. 52D
FIG. 52B
FIG. 52A

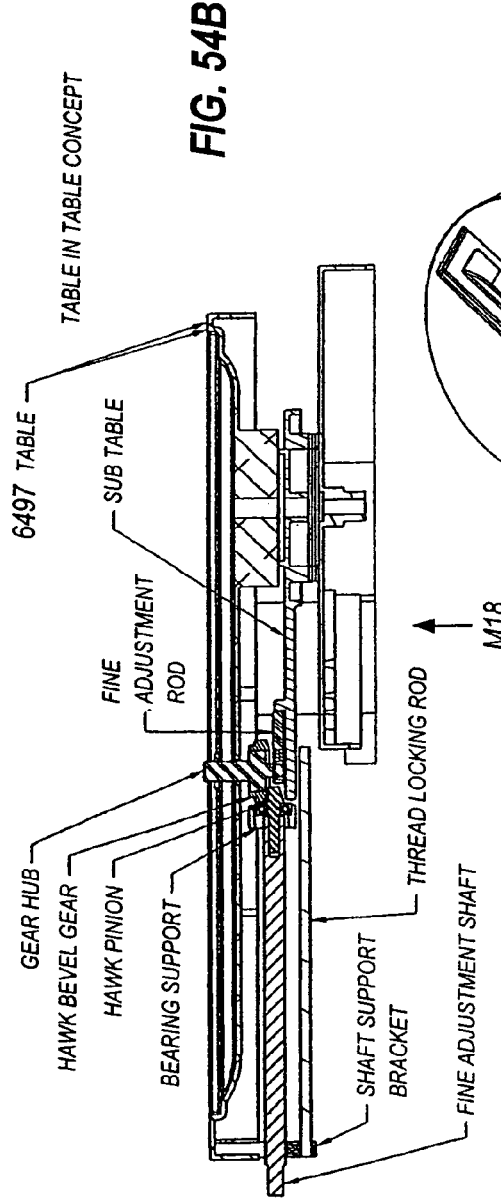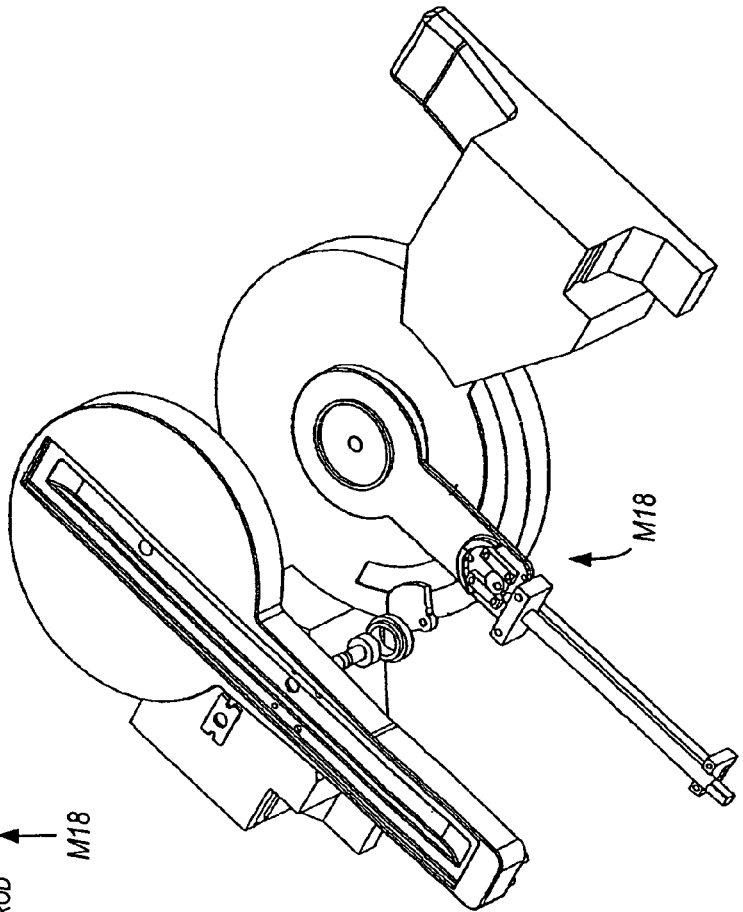
FIG. 54B
FIG. 54A

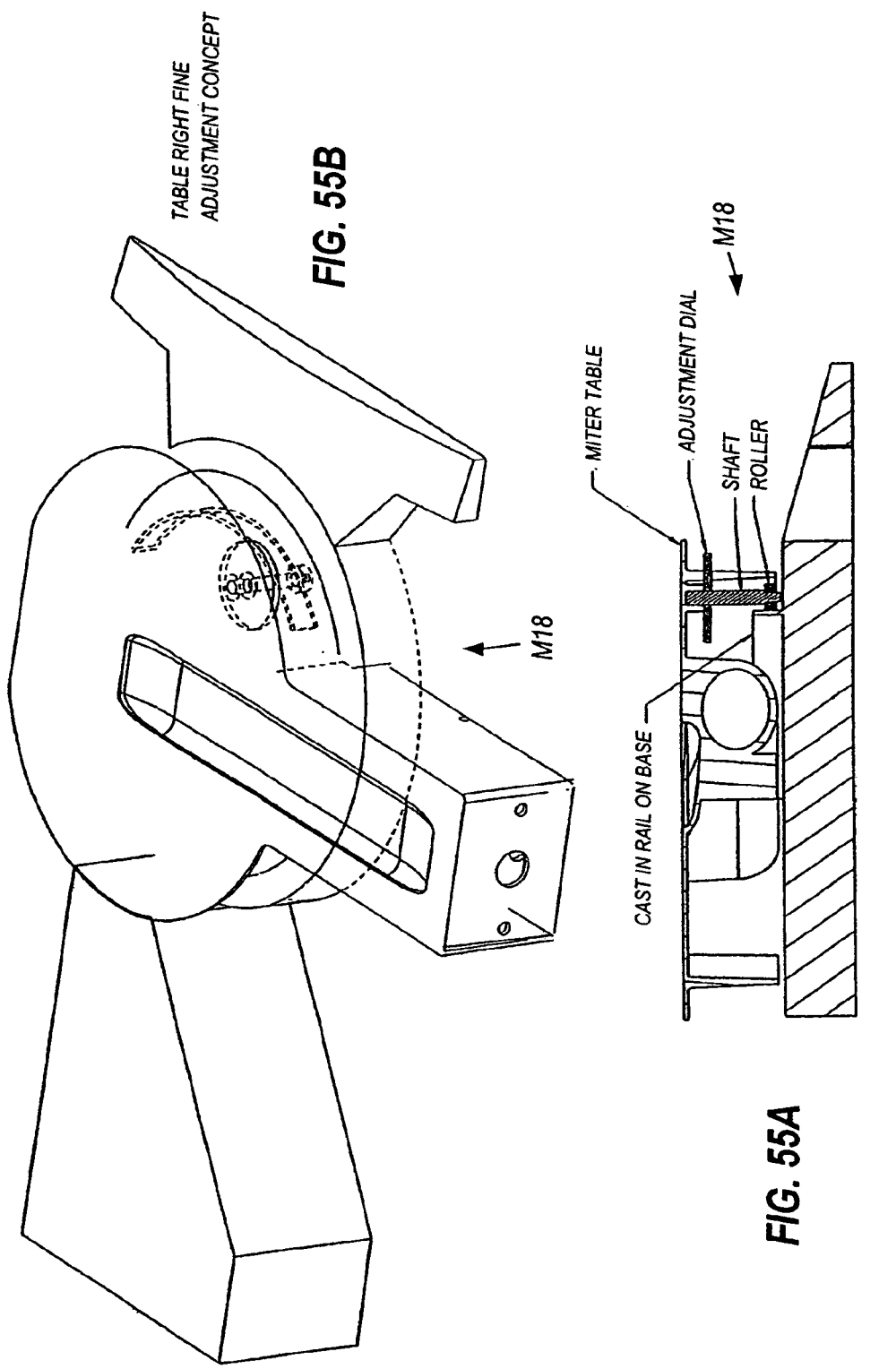

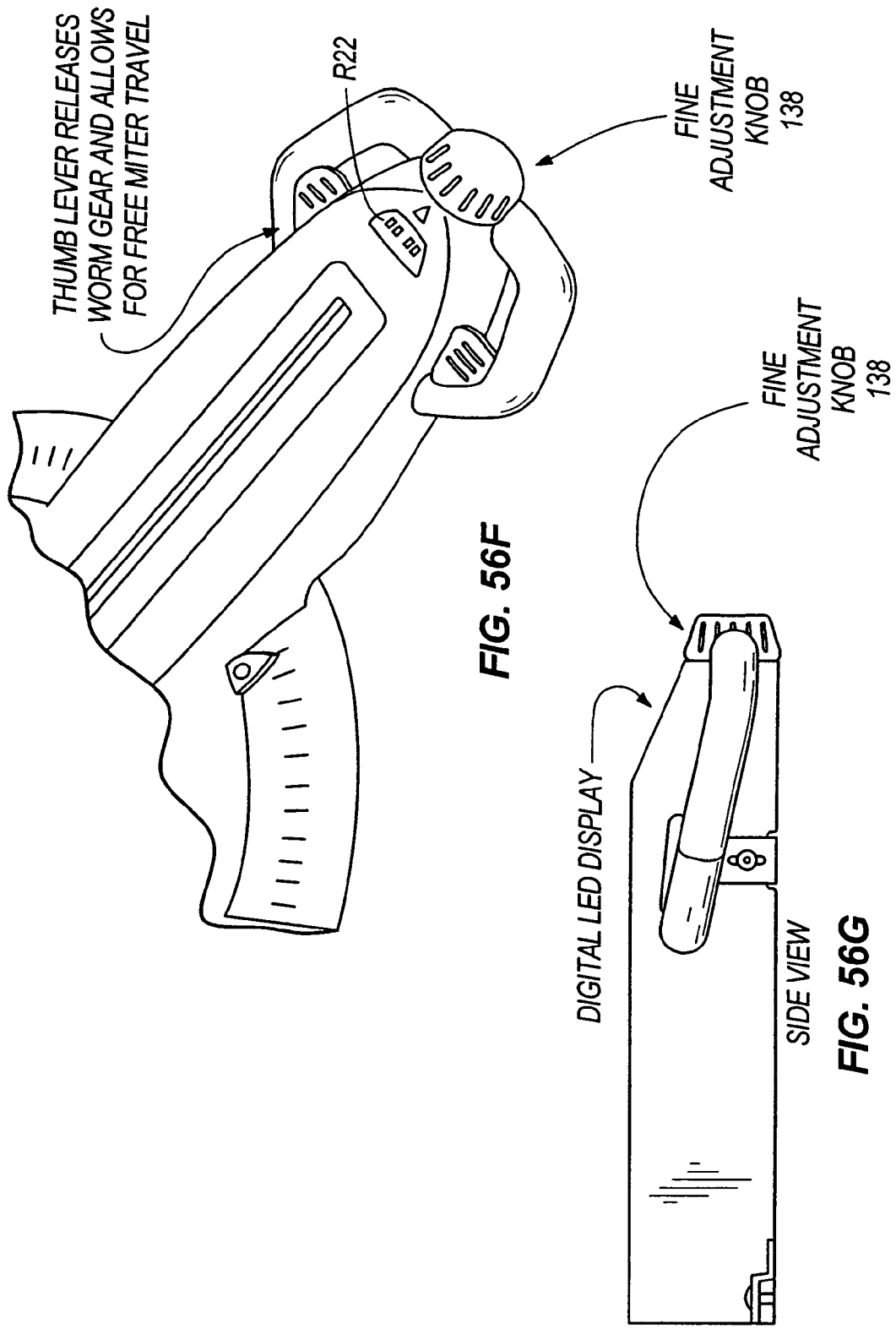

SWING UP HANDLE FOR MORE COMPACT STORAGE AND TRANSPORTATION

TONGUE SIDE VIEW

DETENT RELEASE

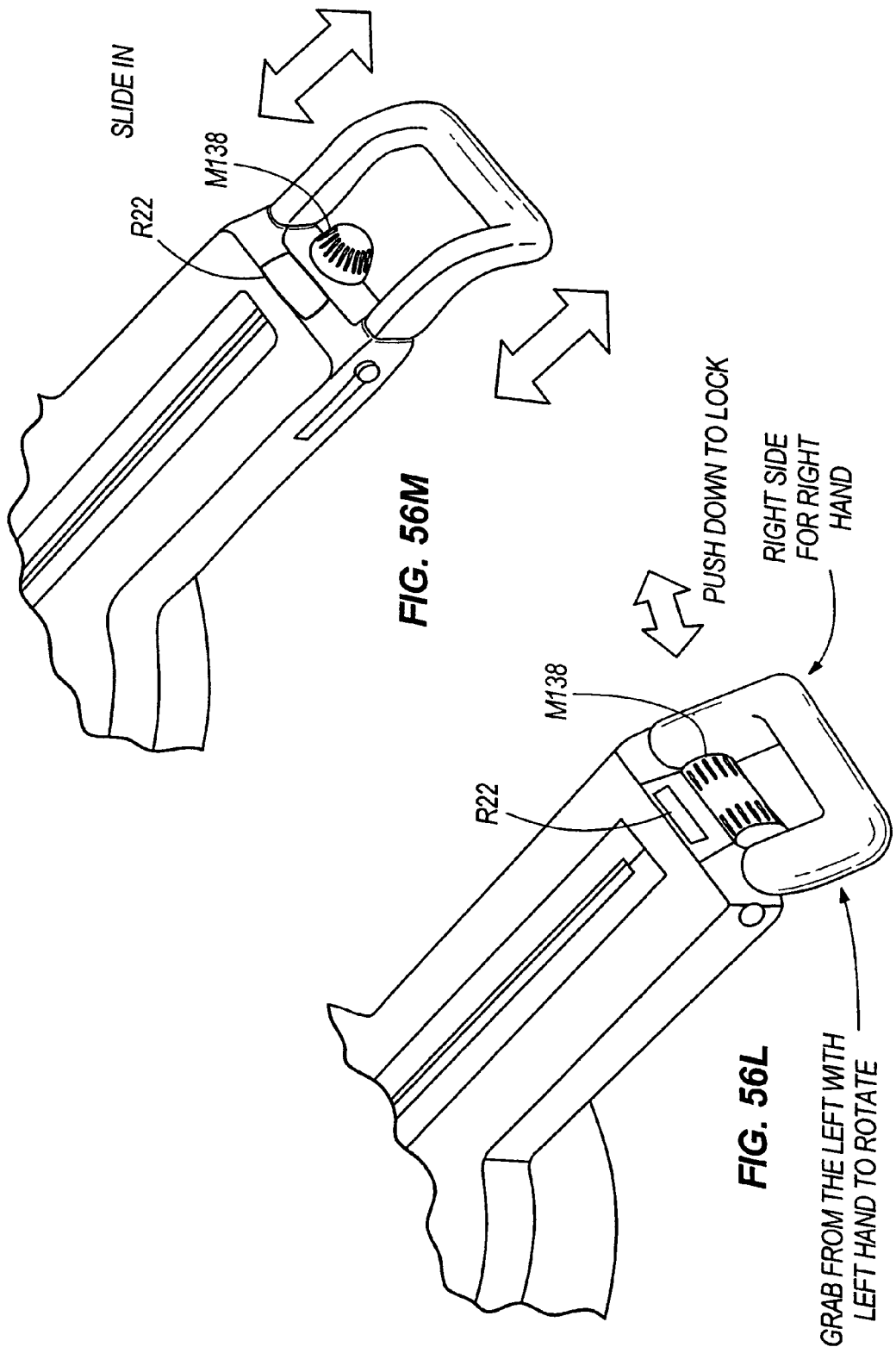

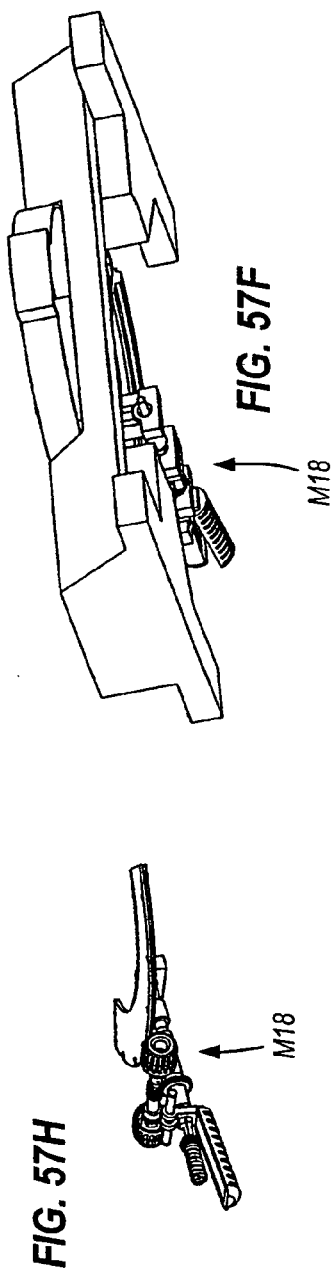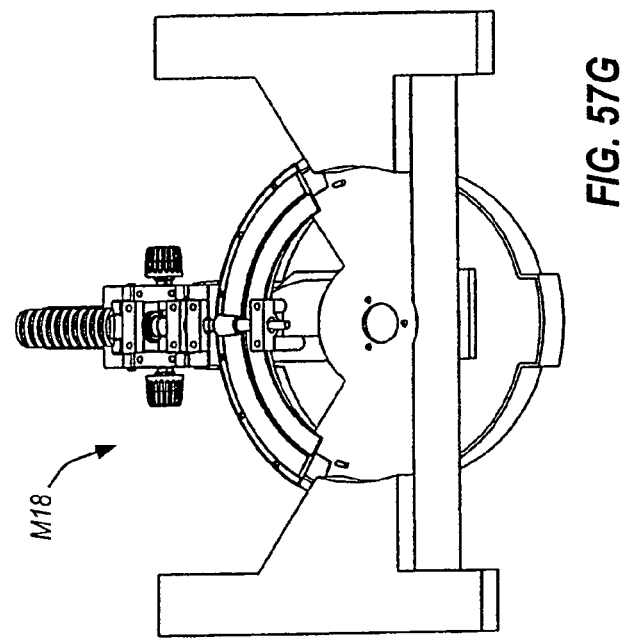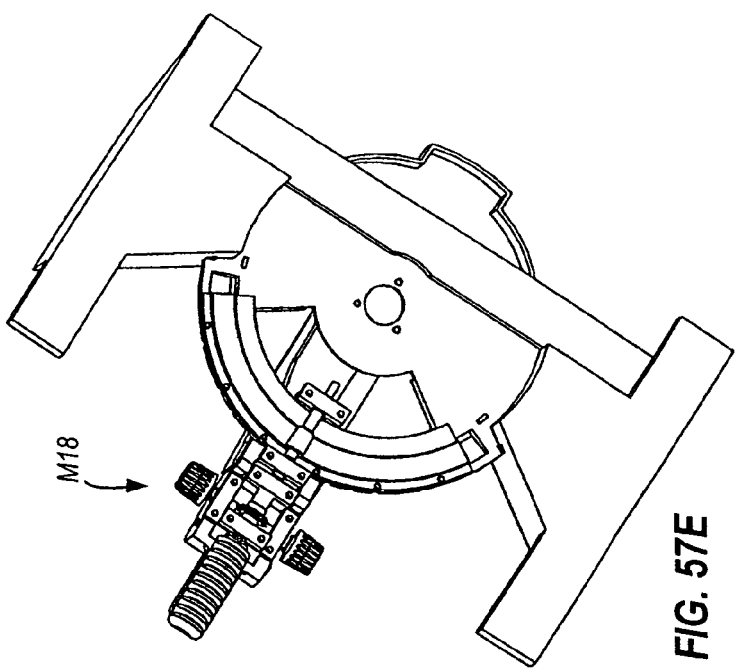

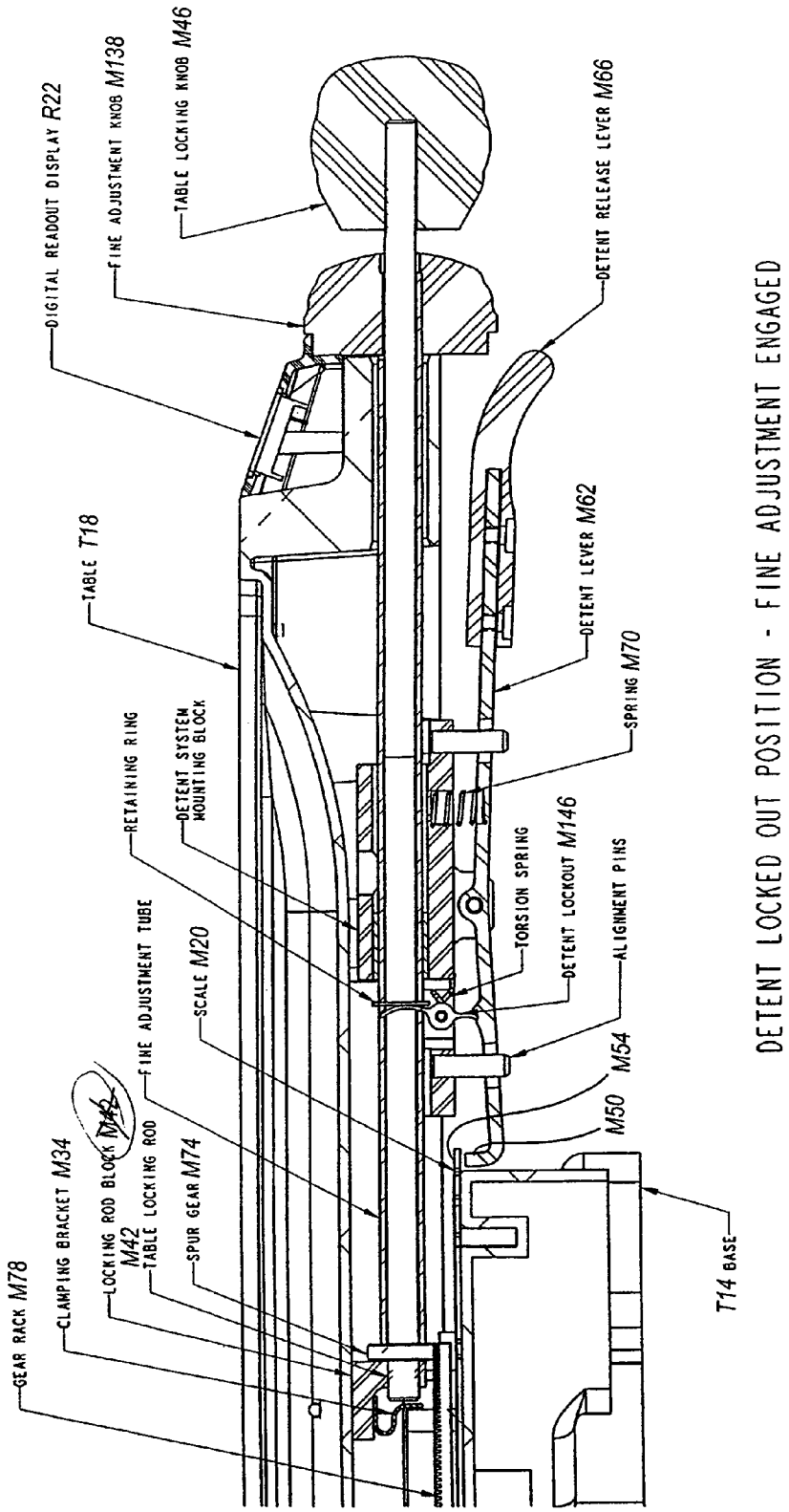

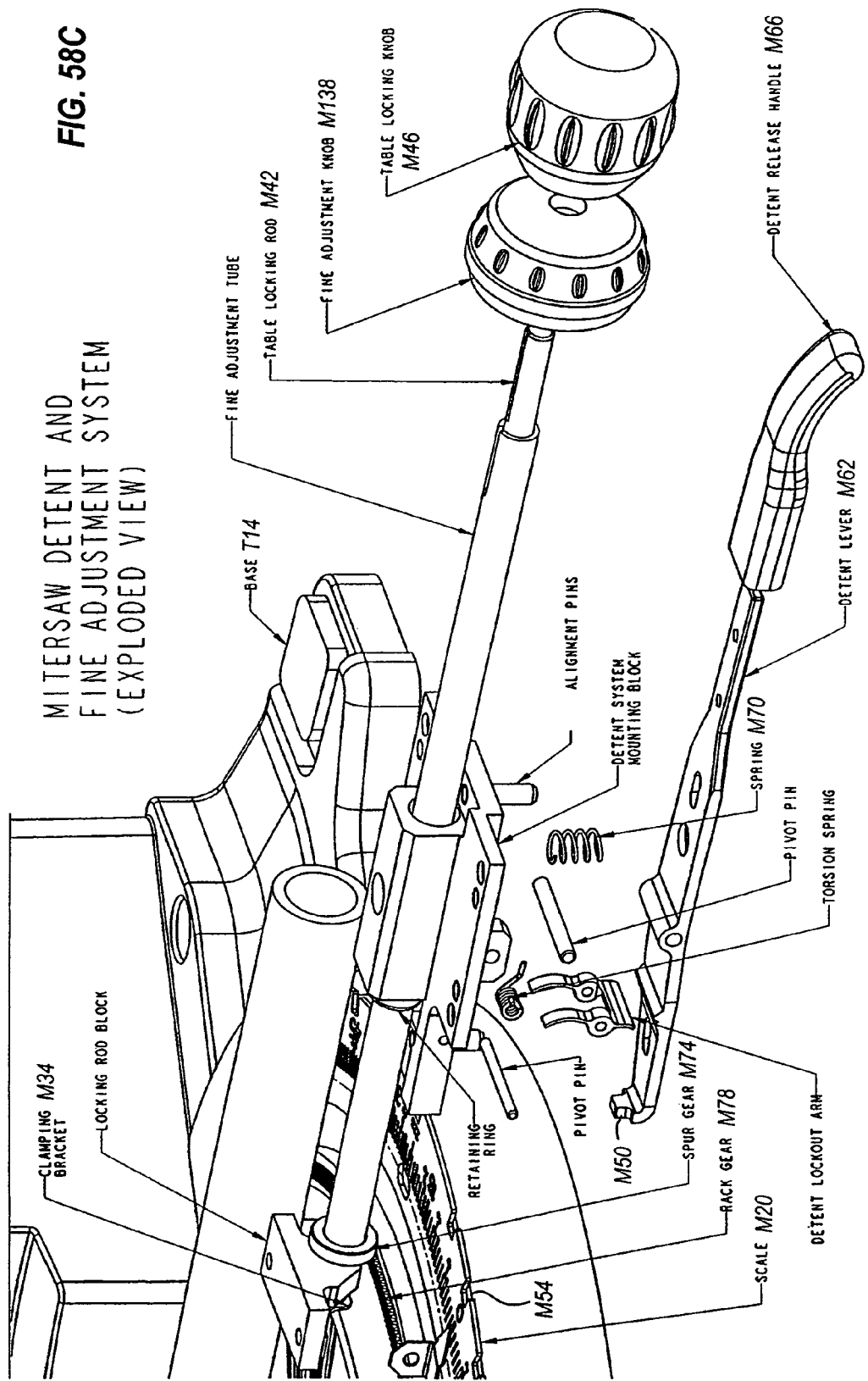

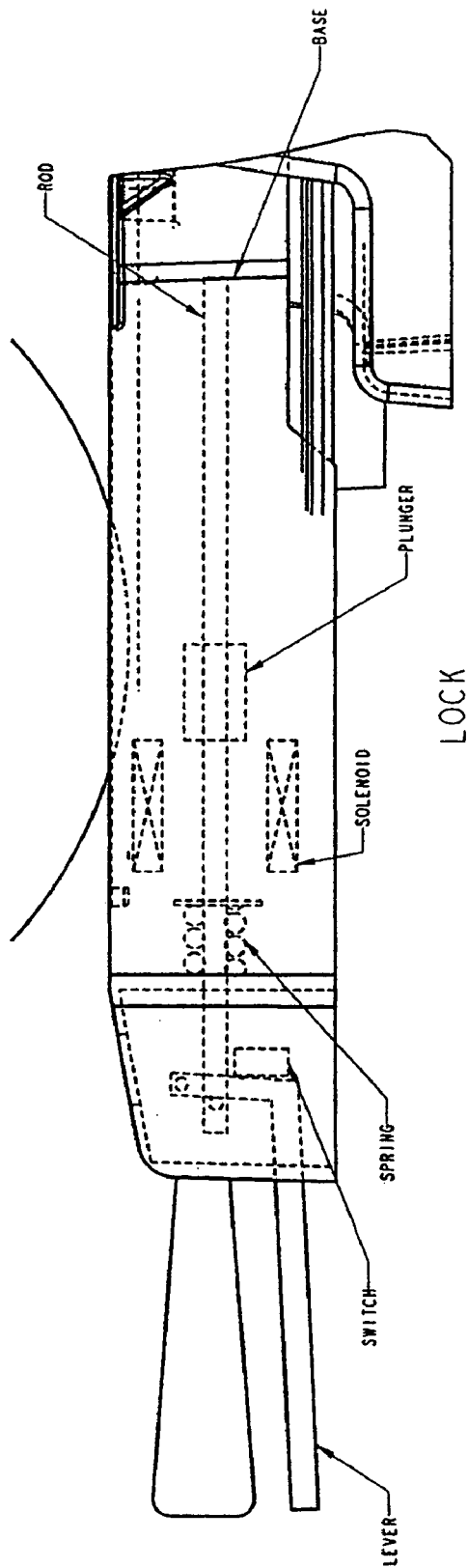
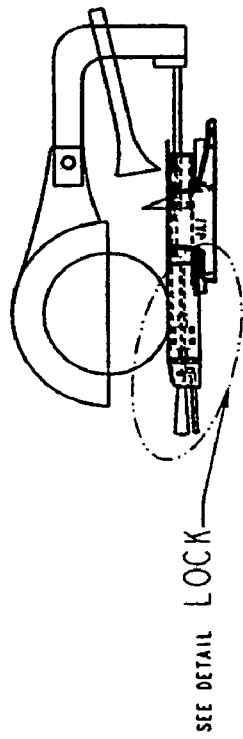
FIG. 63B
USER SQUEEZES LEVER, THIS COMPRESSES SPRING AND TURNS ON SWITCH. SWITCH TURNS ON SOLENOID WHICH PROVIDES ADDITIONAL PULL FORCE ON ROD. ROD MOVES AWAY FROM BASE, ALLOWING TABLE TO ROTATE FREELY. LEVER IS RELEASED, SOLENOID IS TURNED OFF, AND SPRING CAUSES ROD TO LOCK TABLE TO BASE.
FIG. 63A

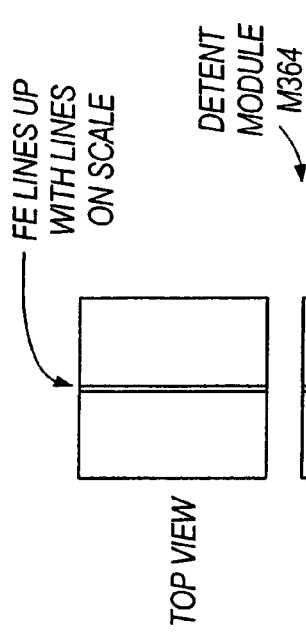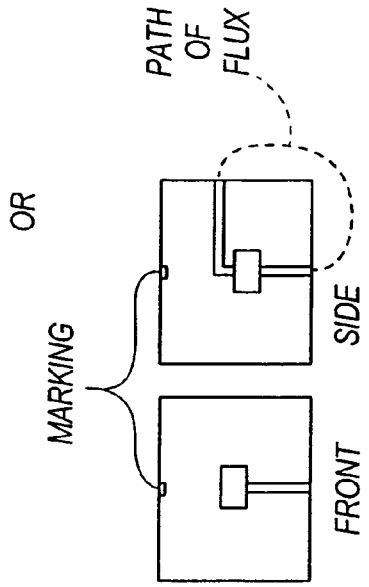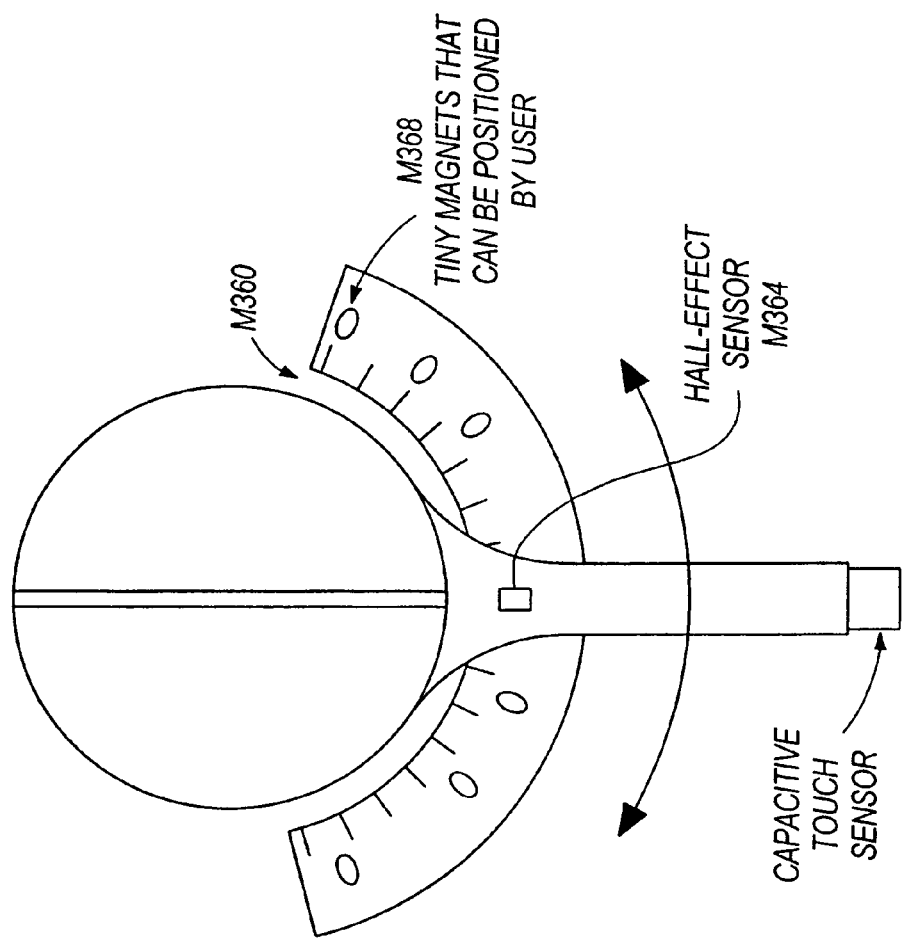

BEVEL DETENT SUB-ASSEMBLY

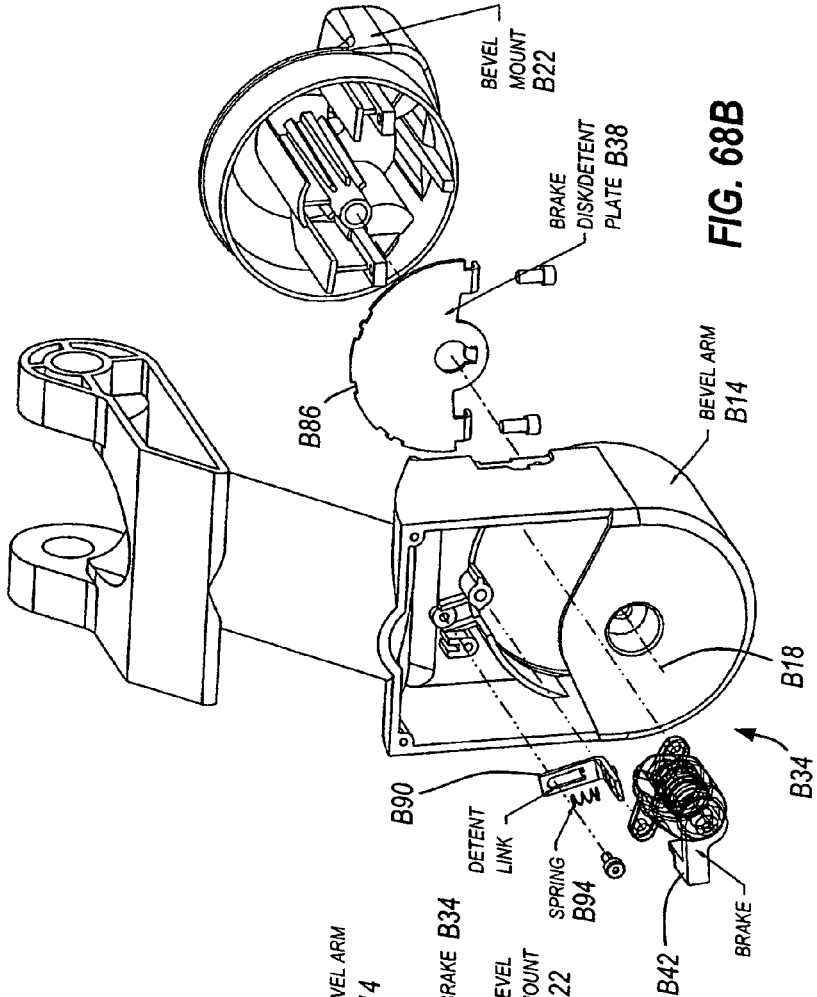
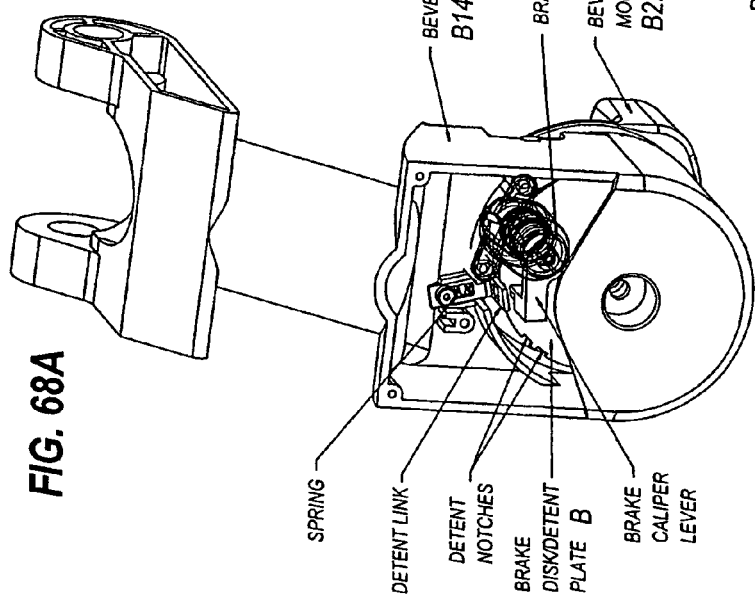
FIG. 68A
FIG. 68B

POSITION 1

POSITION 2

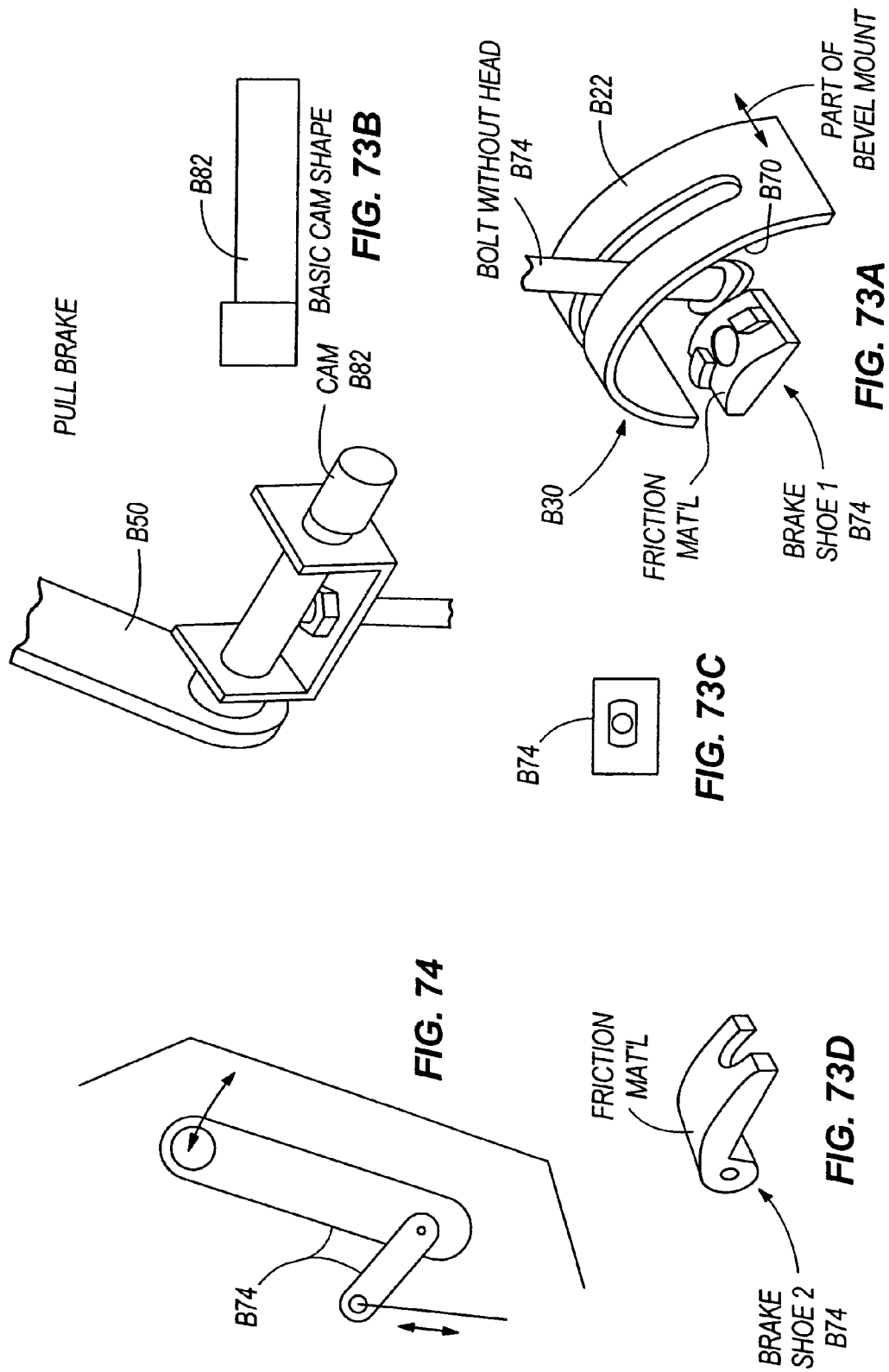

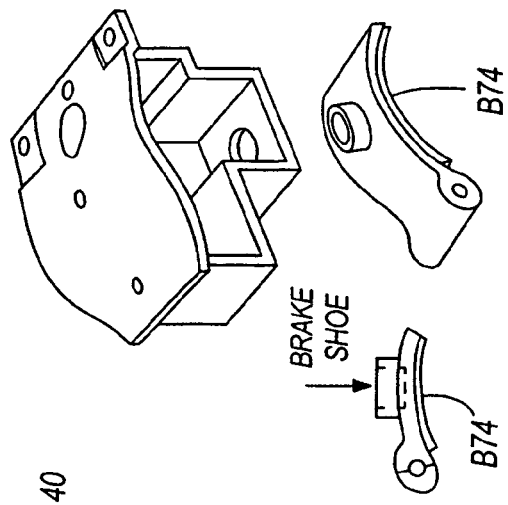
FIG. 75B
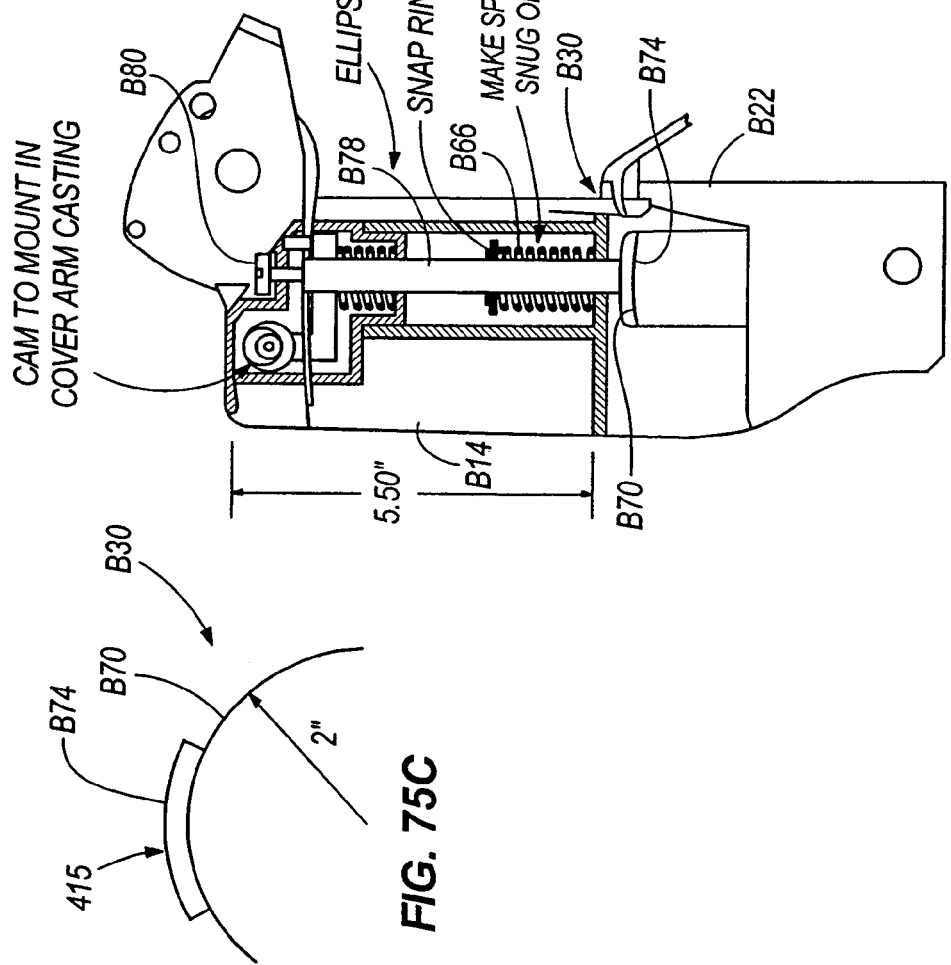
FIG. 75A
FIG. 75C

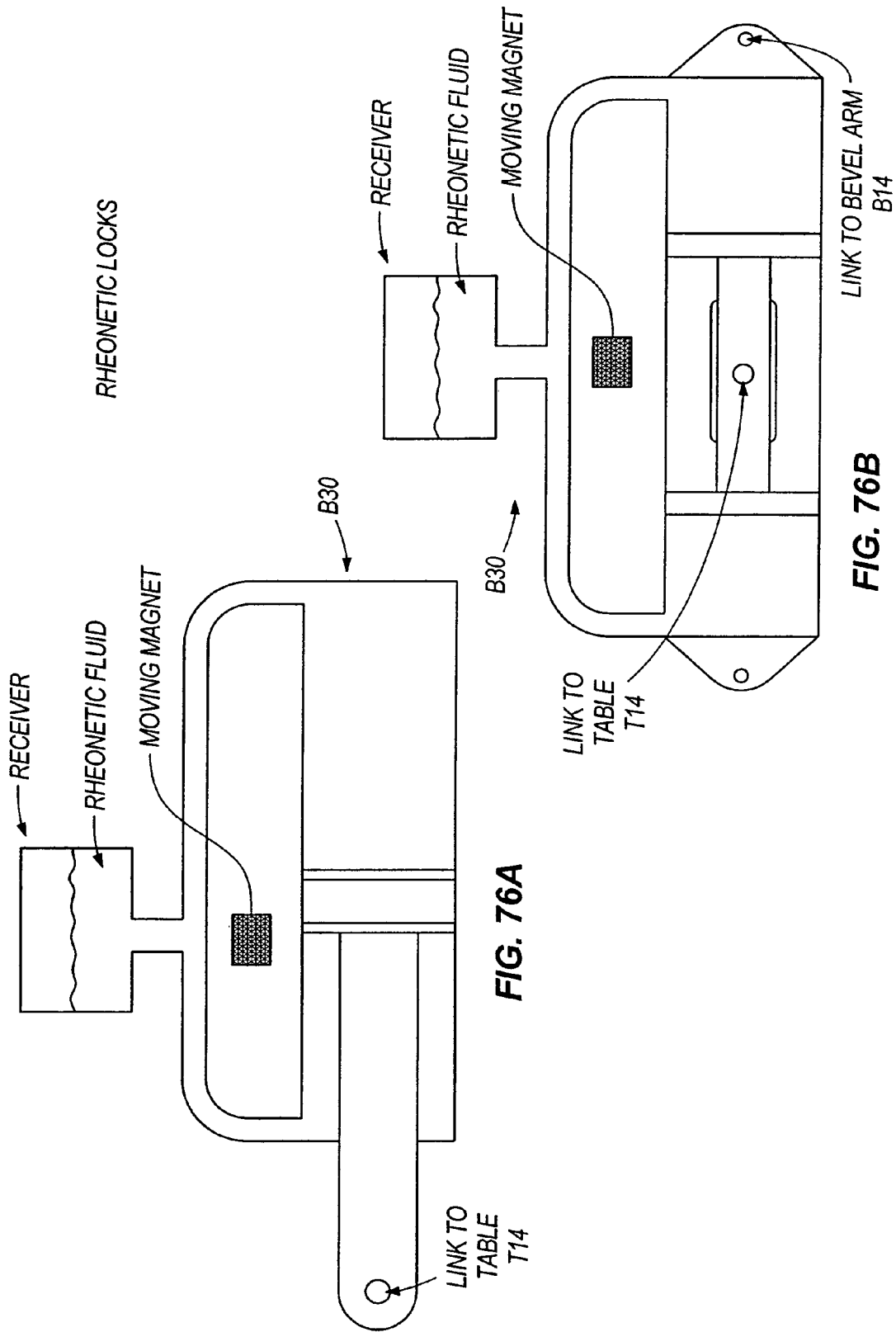

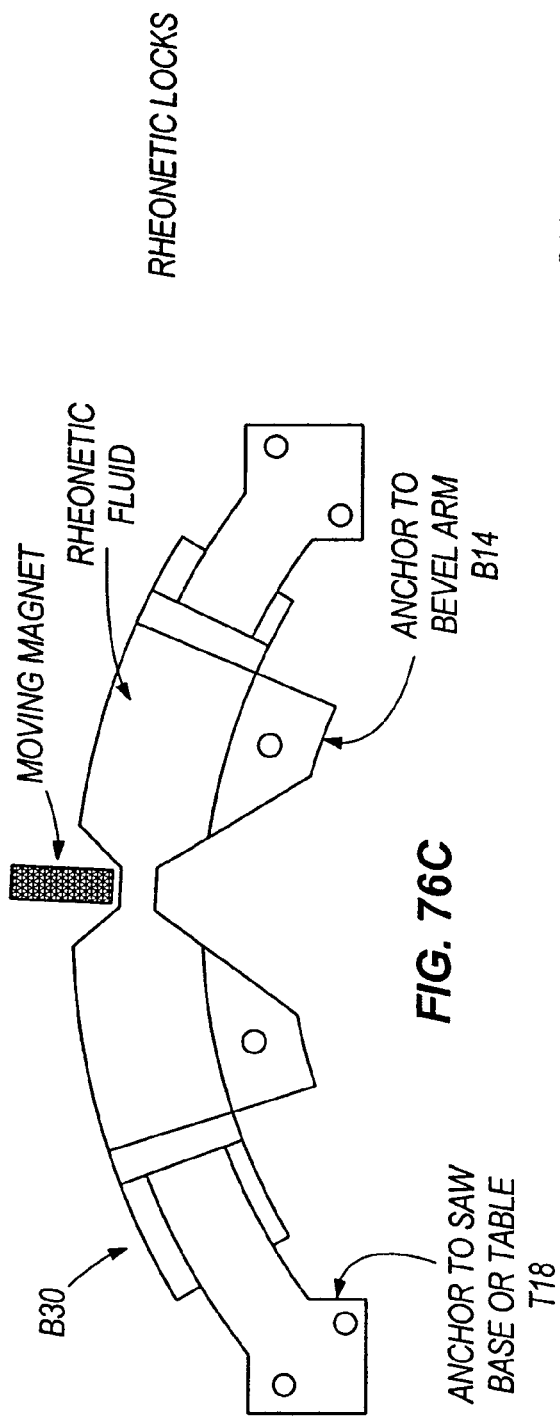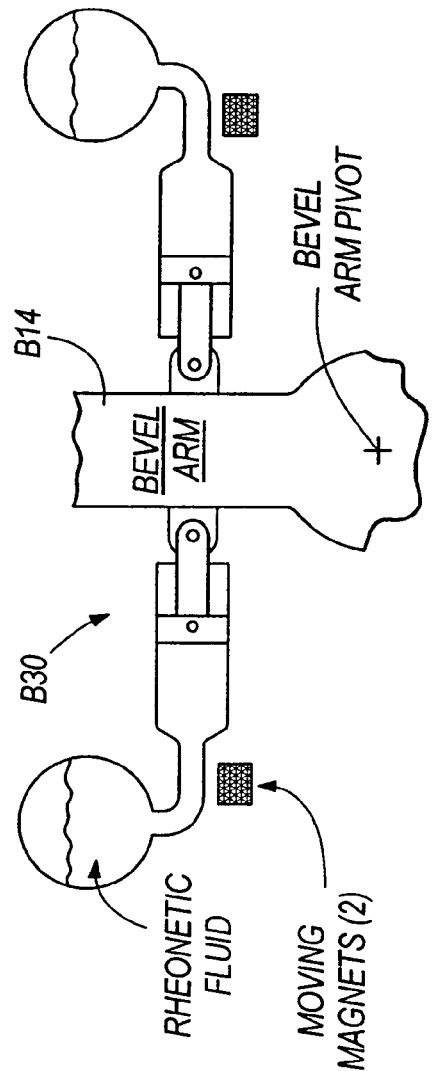

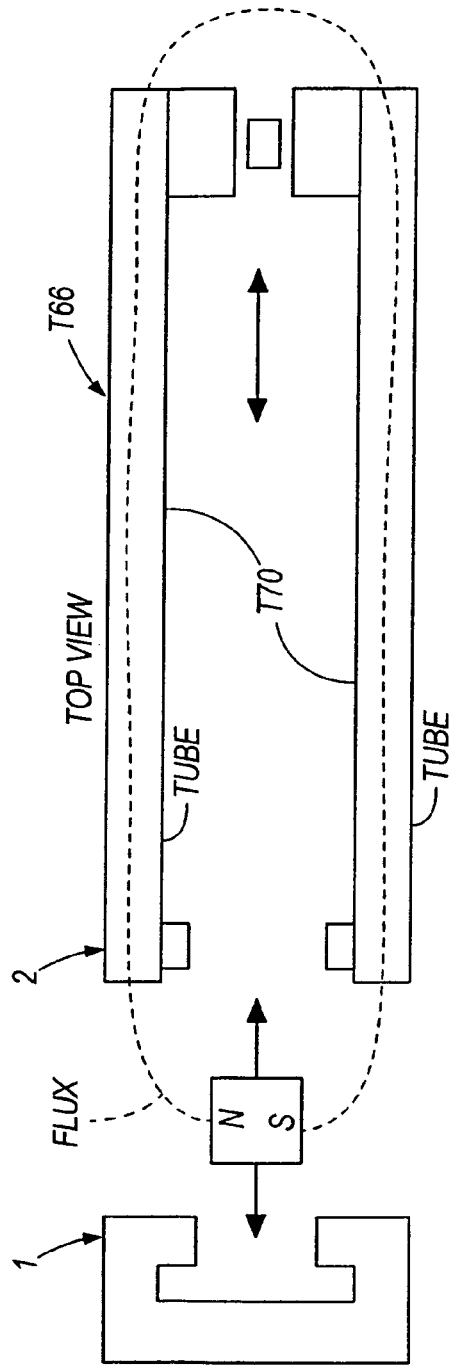
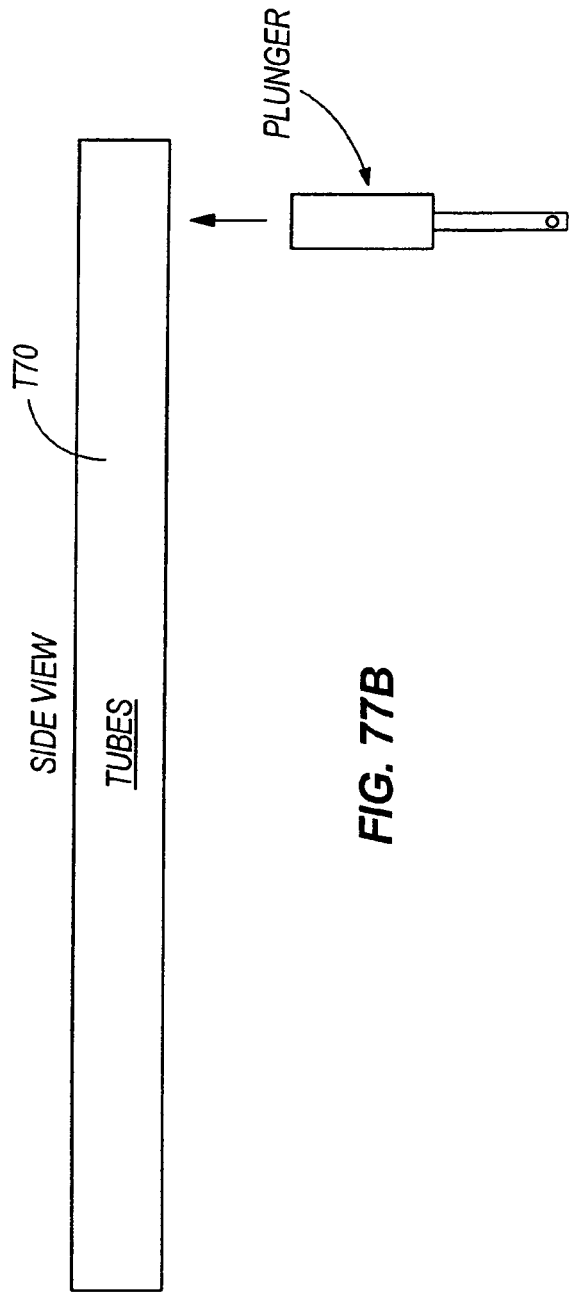
FIG. 77A
FIG. 77B

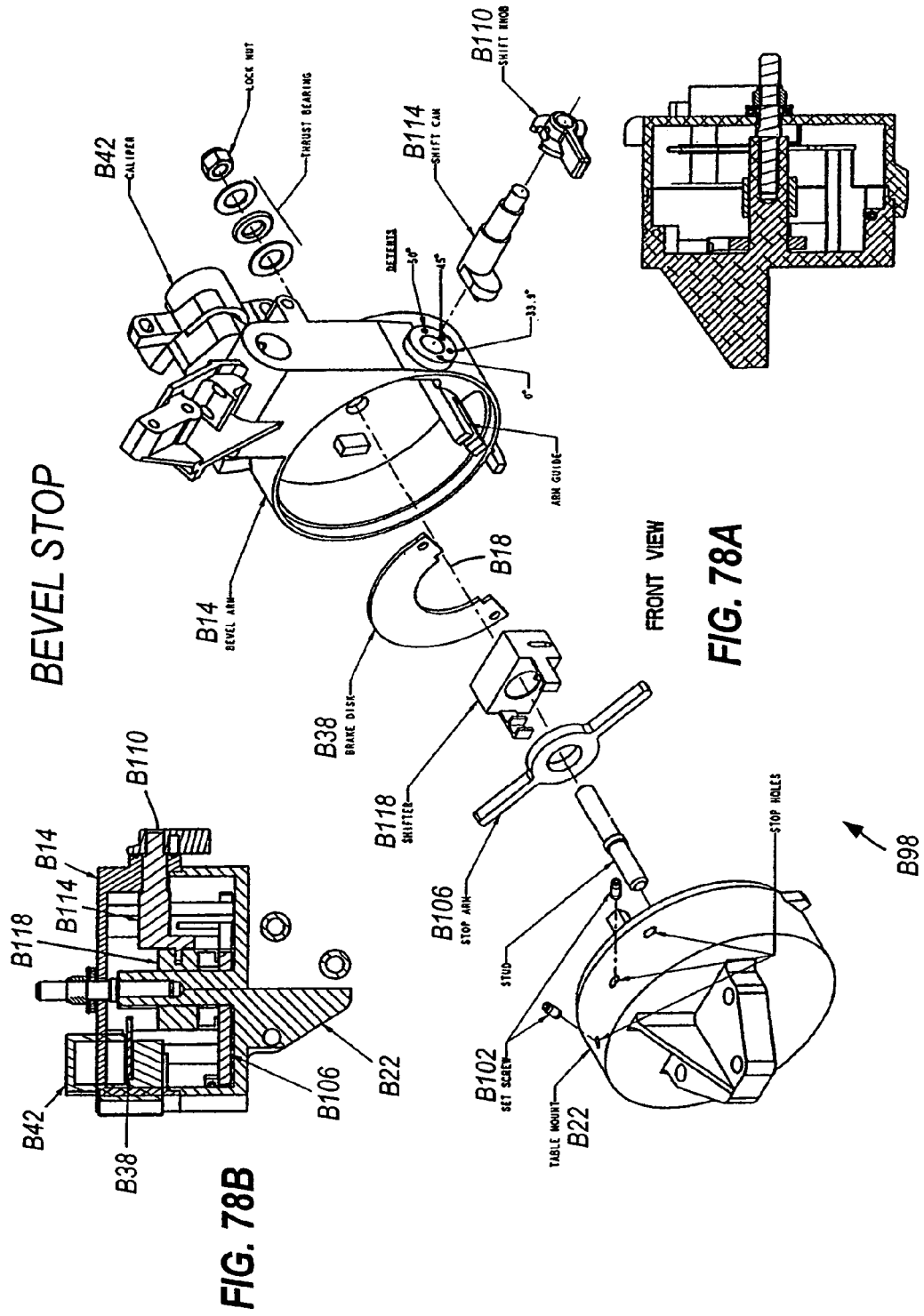

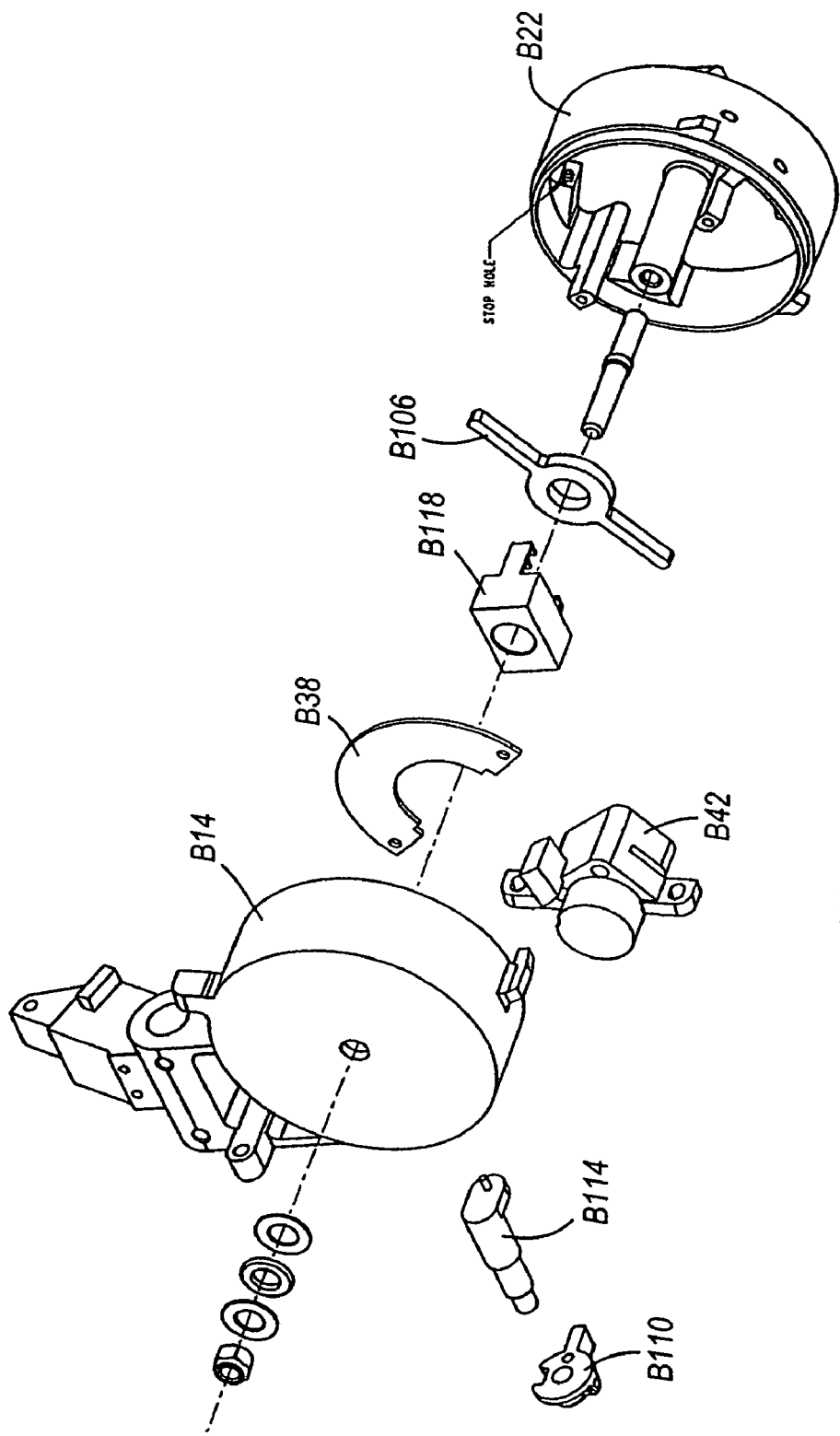
FIG. 78D BACK VIEW

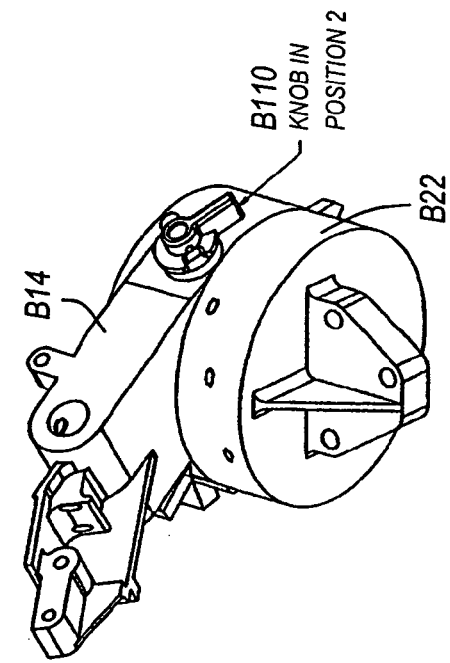
0° BEVEL
FIG. 78E
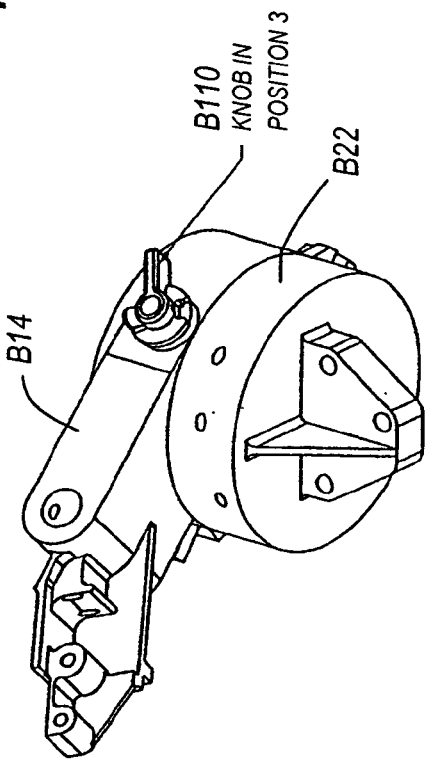
33.9° LEFT BEVEL
FIG. 78F
45° LEFT BEVEL
FIG. 78G

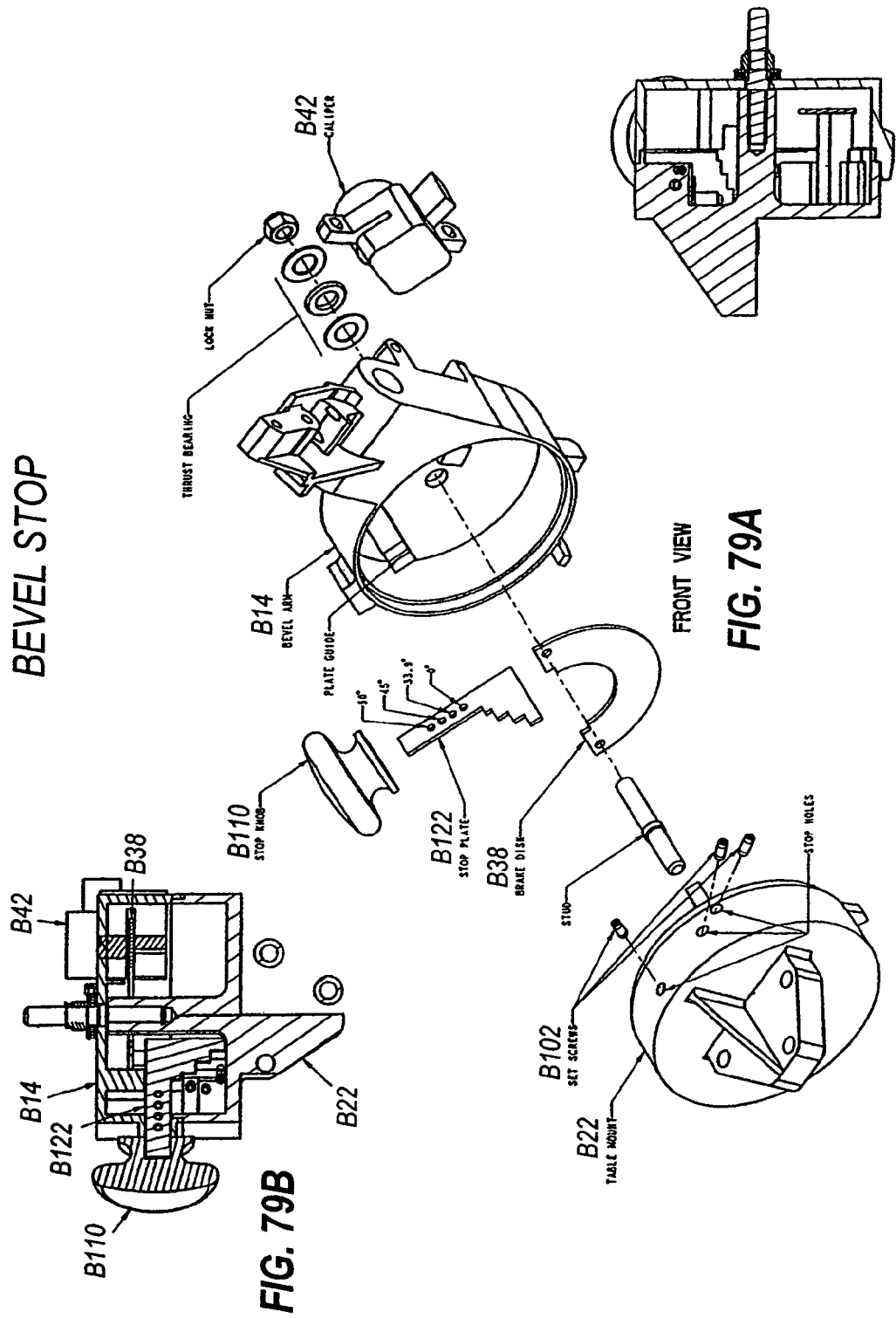

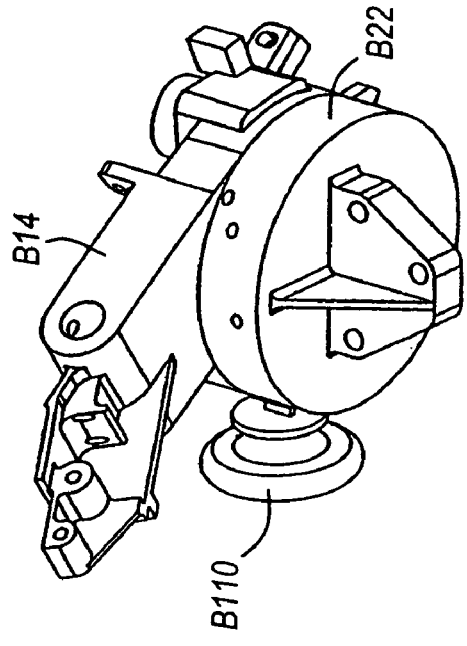
FIG. 79E  0° BEVEL
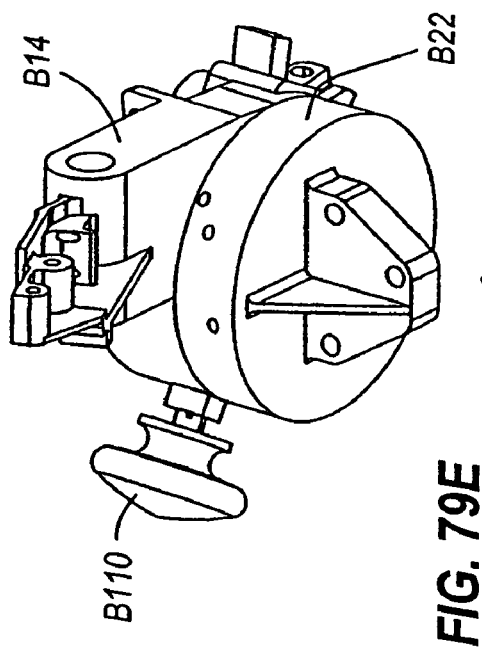
FIG. 79F  33.9° LEFT BEVEL
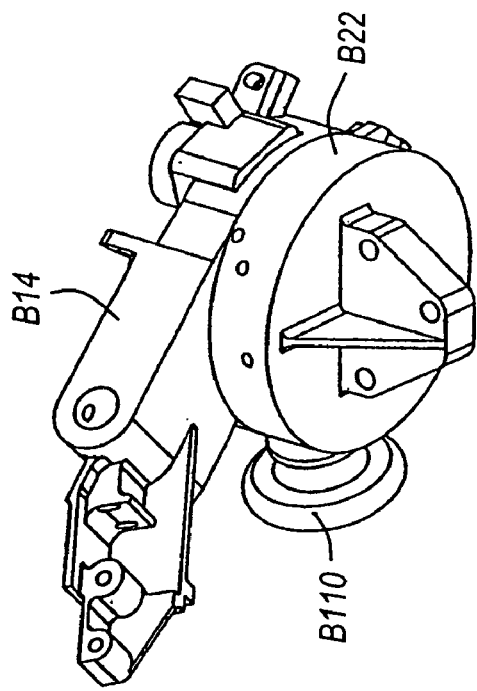
FIG. 79G  45° LEFT BEVEL

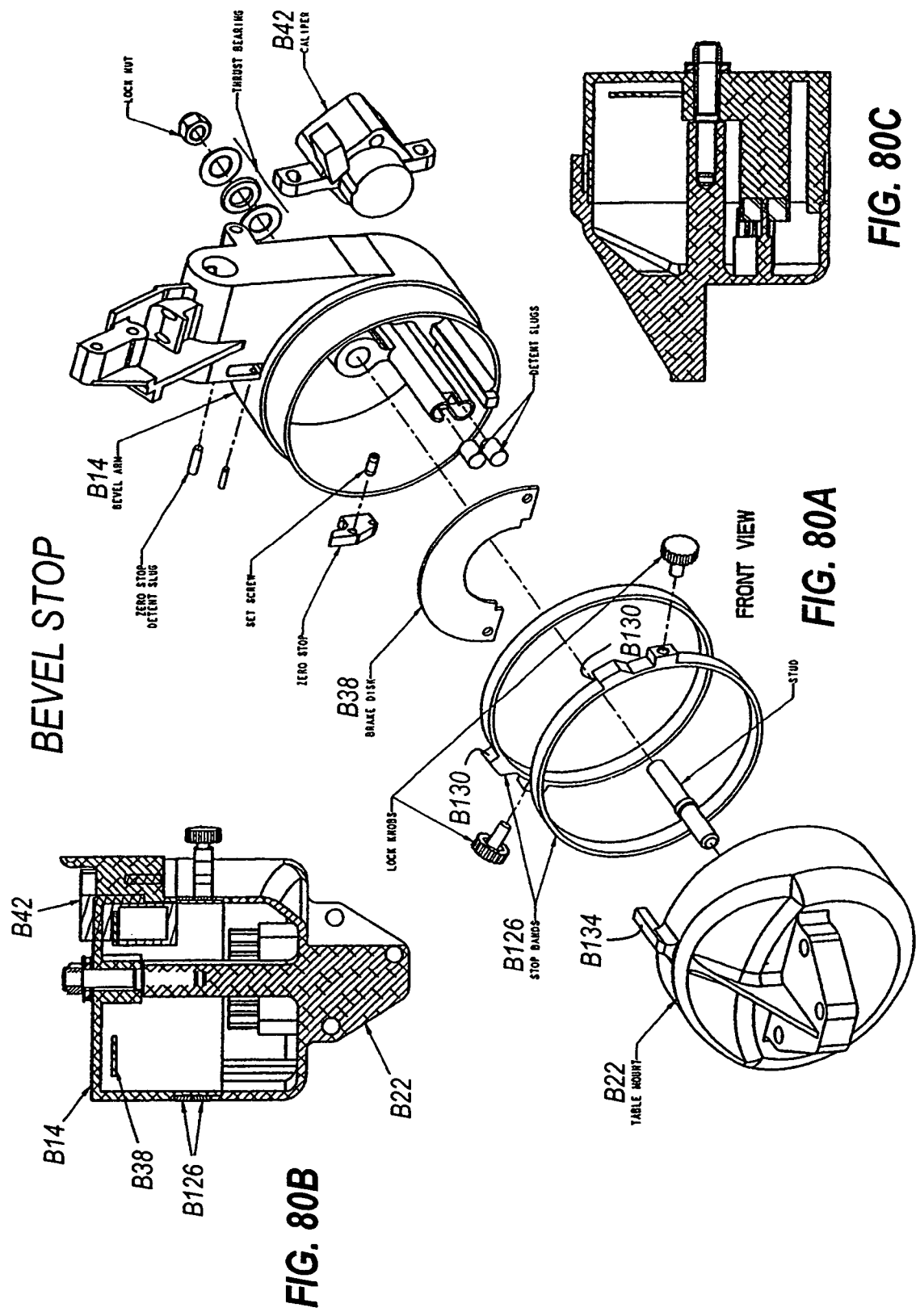

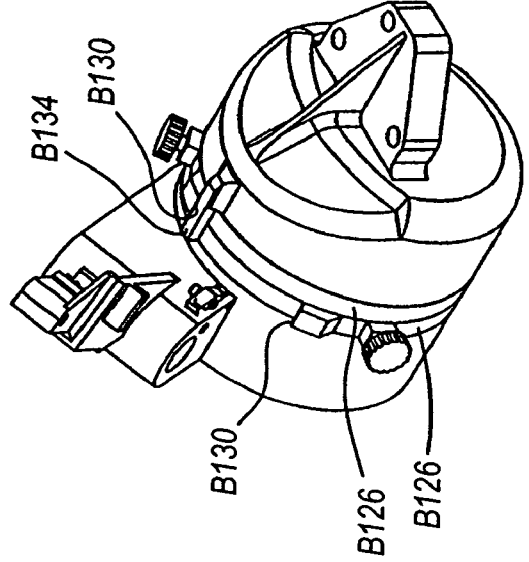
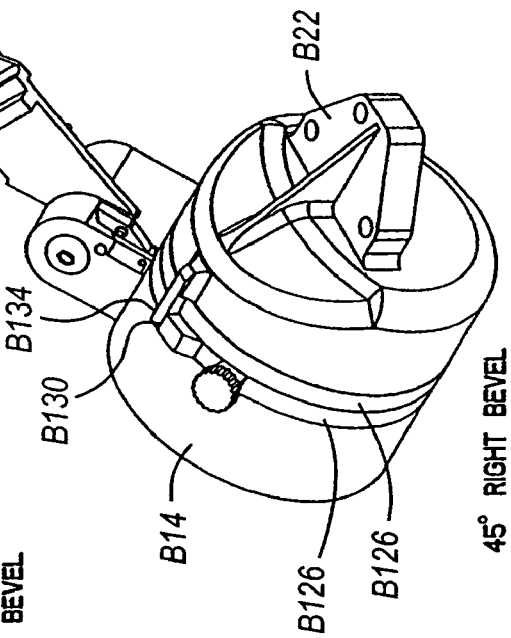
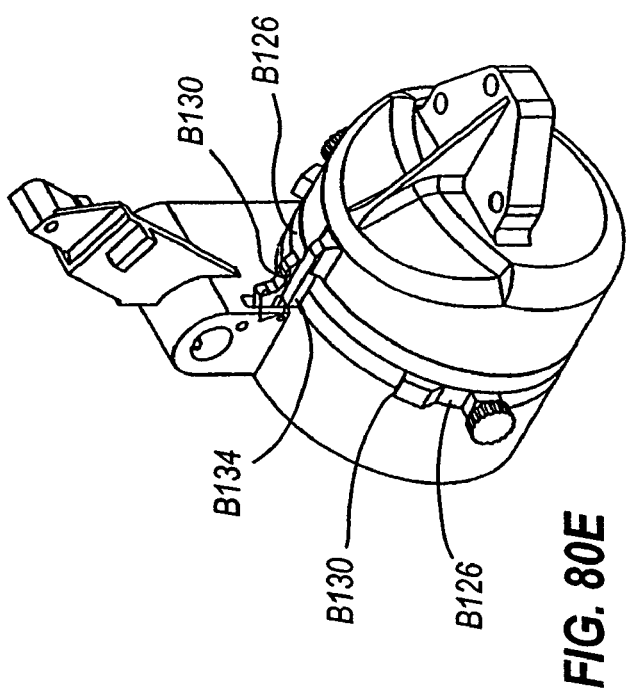
FIG. 80F
FIG. 80G
FIG. 80E

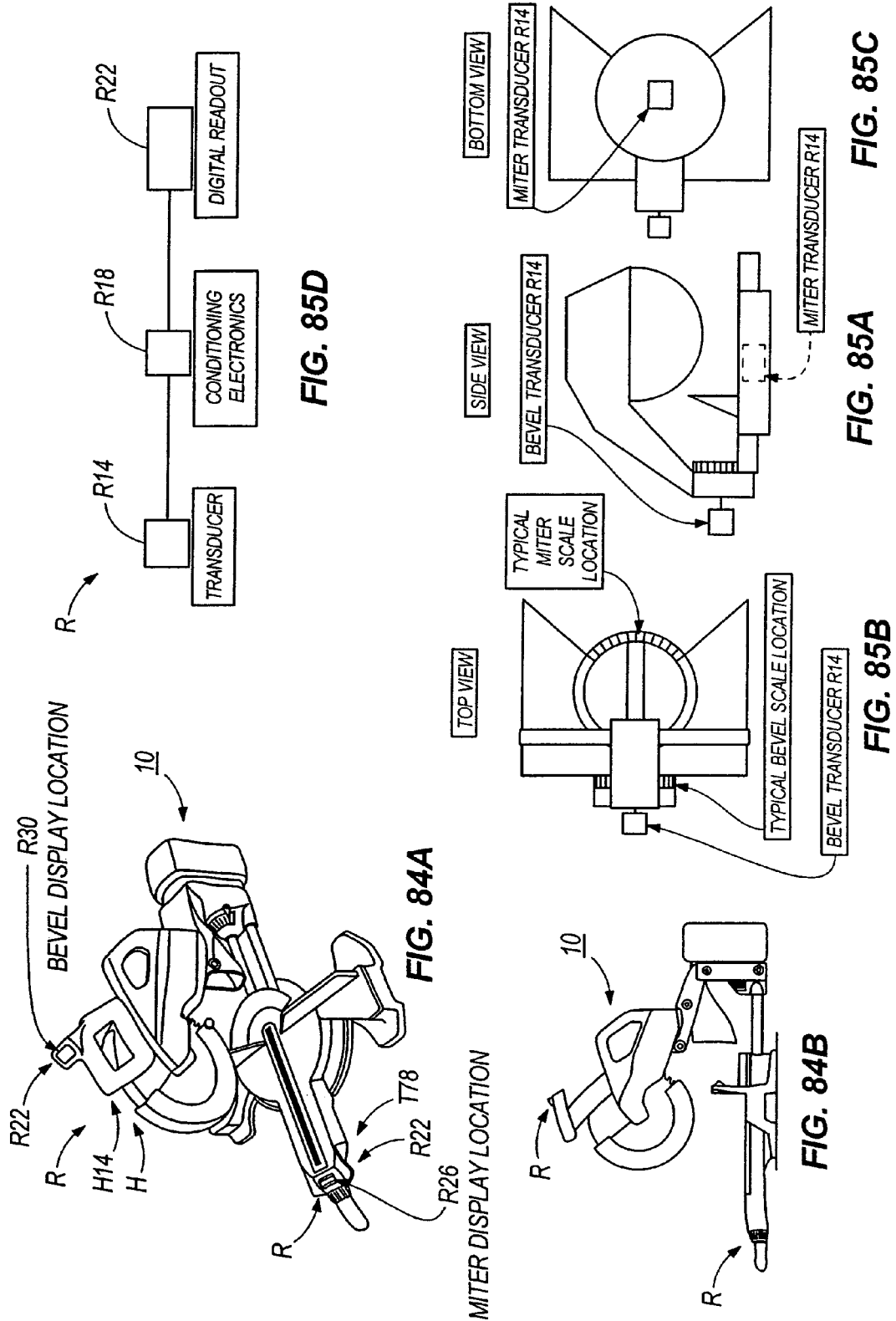

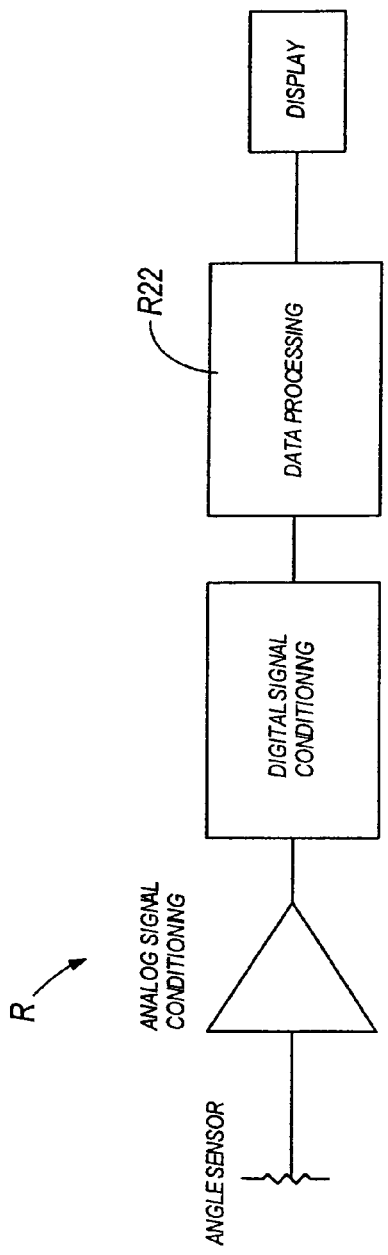

-ANALOG SIGNAL CONDITIONING
THE SENSOR SIGNAL IS AMPLIFIED TO FILL THE RANGE OF THE A/D CONVERTER. AN ANALOG LOW PASS FILTER IS USED TO REDUCE THE EFFECTS OF ELECTRICAL INTERFERENCE AND ALIASING ARTIFACTS.

-DIGITAL SIGNAL CONDITIONING
THE ANALOG SIGNAL IS CONVERTED TO DIGITAL FORMAT AND AVERAGED TO FURTHER REDUCE ELECTRICAL NOISE.

-DATA PROCESSING
THE DIGITAL ANGLE DATA IS PROCESSED TO IMPLEMENT THE AUTO-CALIBRATION ALGORITHM AND FORMAT THE DISPLAY. IF THE AXIS IS IN A DETENT, THE CALIBRATION CONSTANT FOR THAT DETENT IS LOADED INTO THE CALIBRATION LOOKUP TABLE AND THE KNOWN POSITION OF THAT DETENT IS DISPLAYED. IF THE AXIS IS BETWEEN DETENTS, A LINEAR INTERPOLATION ESTIMATION OF THE POSITION BASED UPON THE KNOWN POSITIONS OF THE DETENTS ON EITHER SIDE OF THE CURRENT POSITION IS IMPLEMENTED AND THE ESTIMATED POSITION IS DISPLAYED. THE DISPLAY IS UPDATED 5 TIMES A SECOND. AS THE AXIS IS MOVED FROM DETENT TO DETENT, A CONSTANTLY UPDATED CALIBRATION TABLE IS GENERATED. THIS COMPENSATES, TO A GREAT EXTENT, FOR MECHANICAL WEAR, ELECTRICAL AGING AND TEMPERATURE EFFECTS. APPARENT SENSOR LINEARITY IS ALSO IMPROVED GREATLY.

*FIG. 85E*

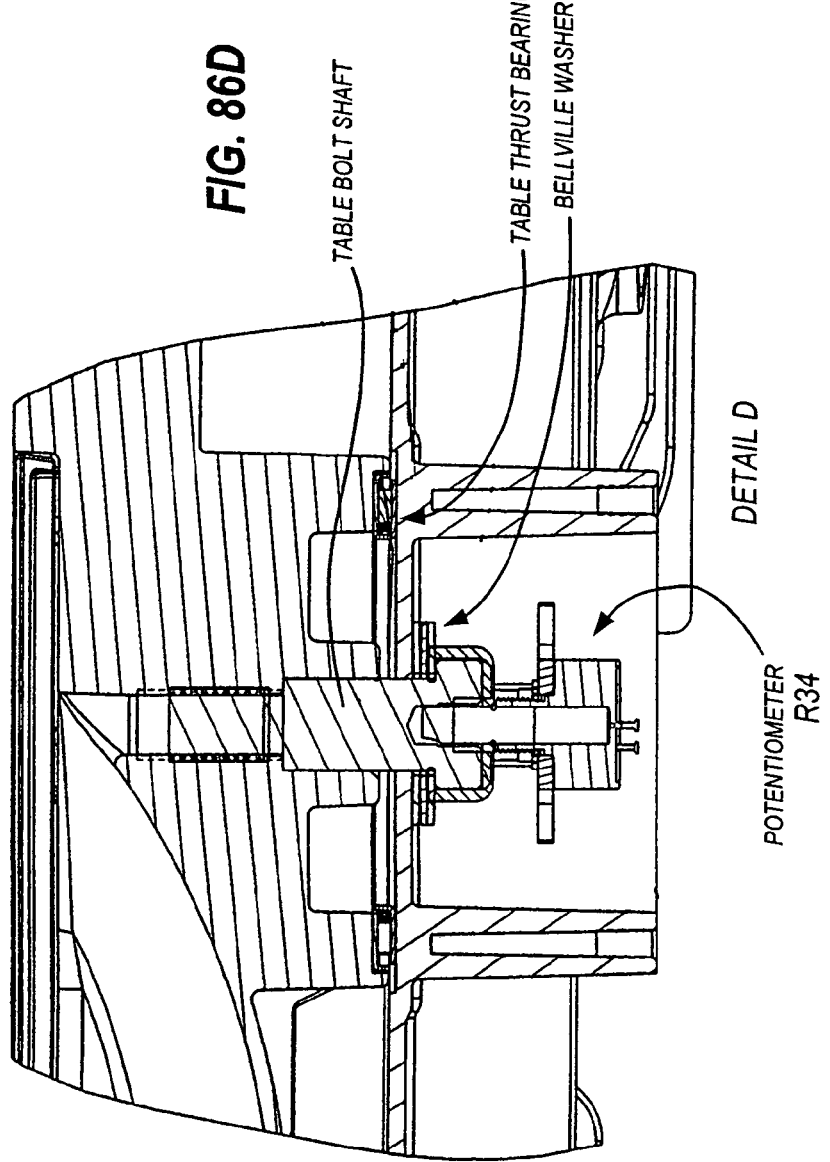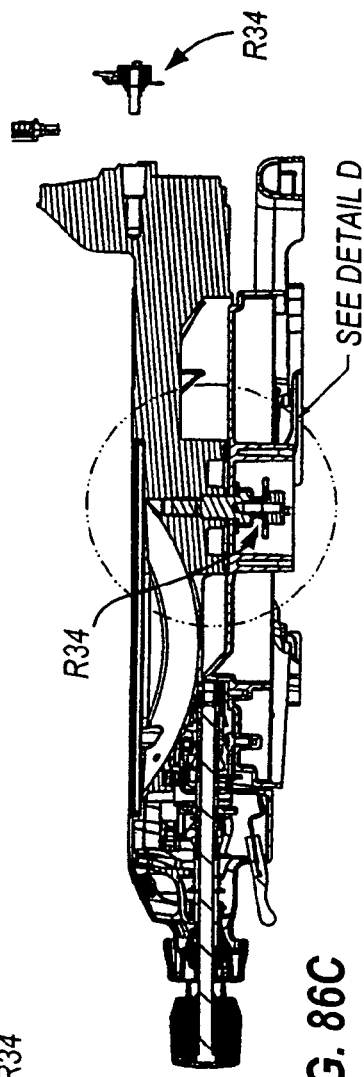

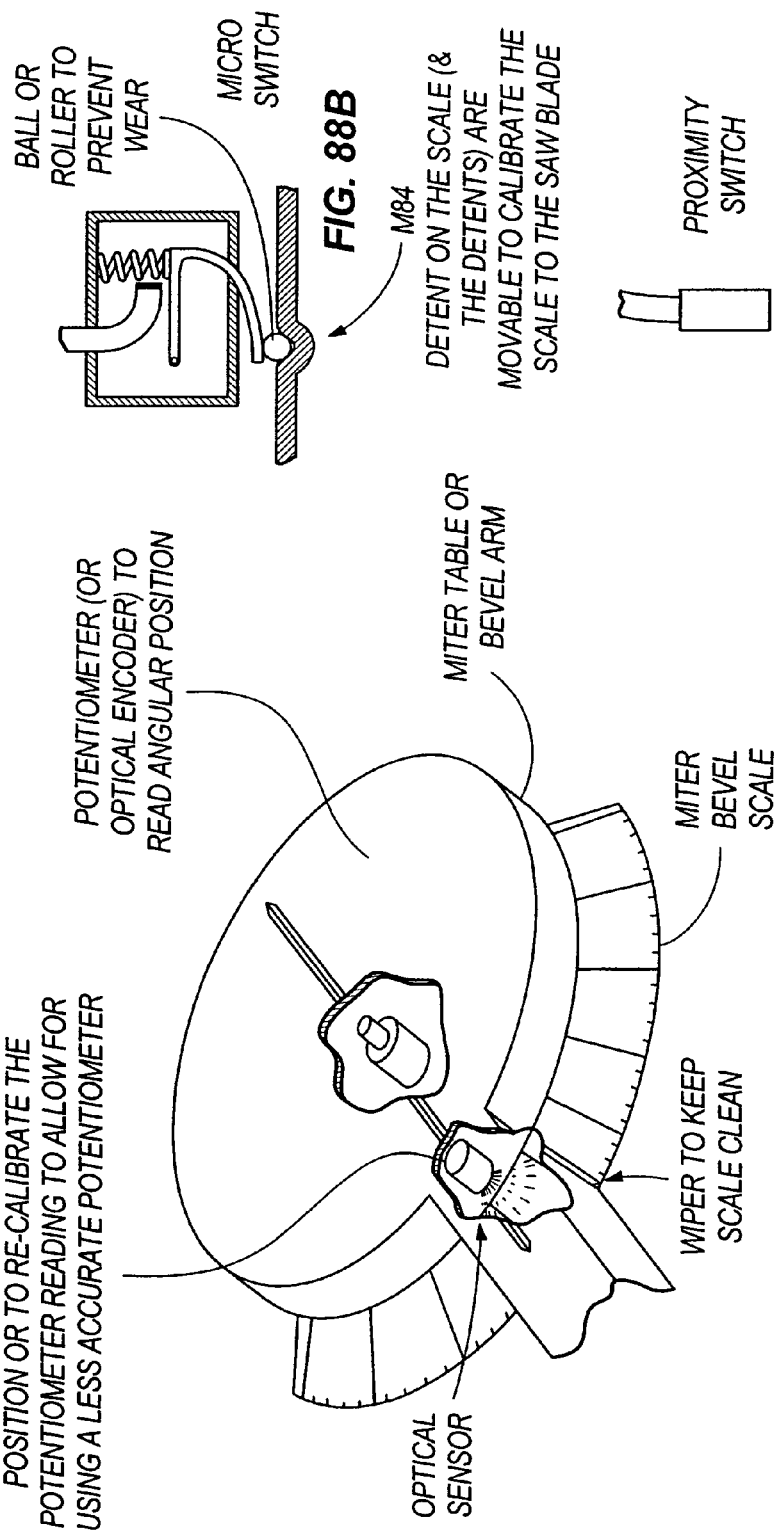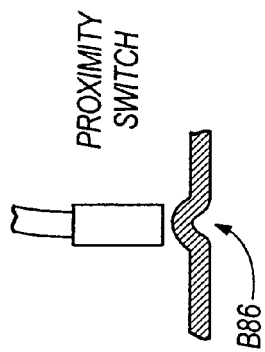

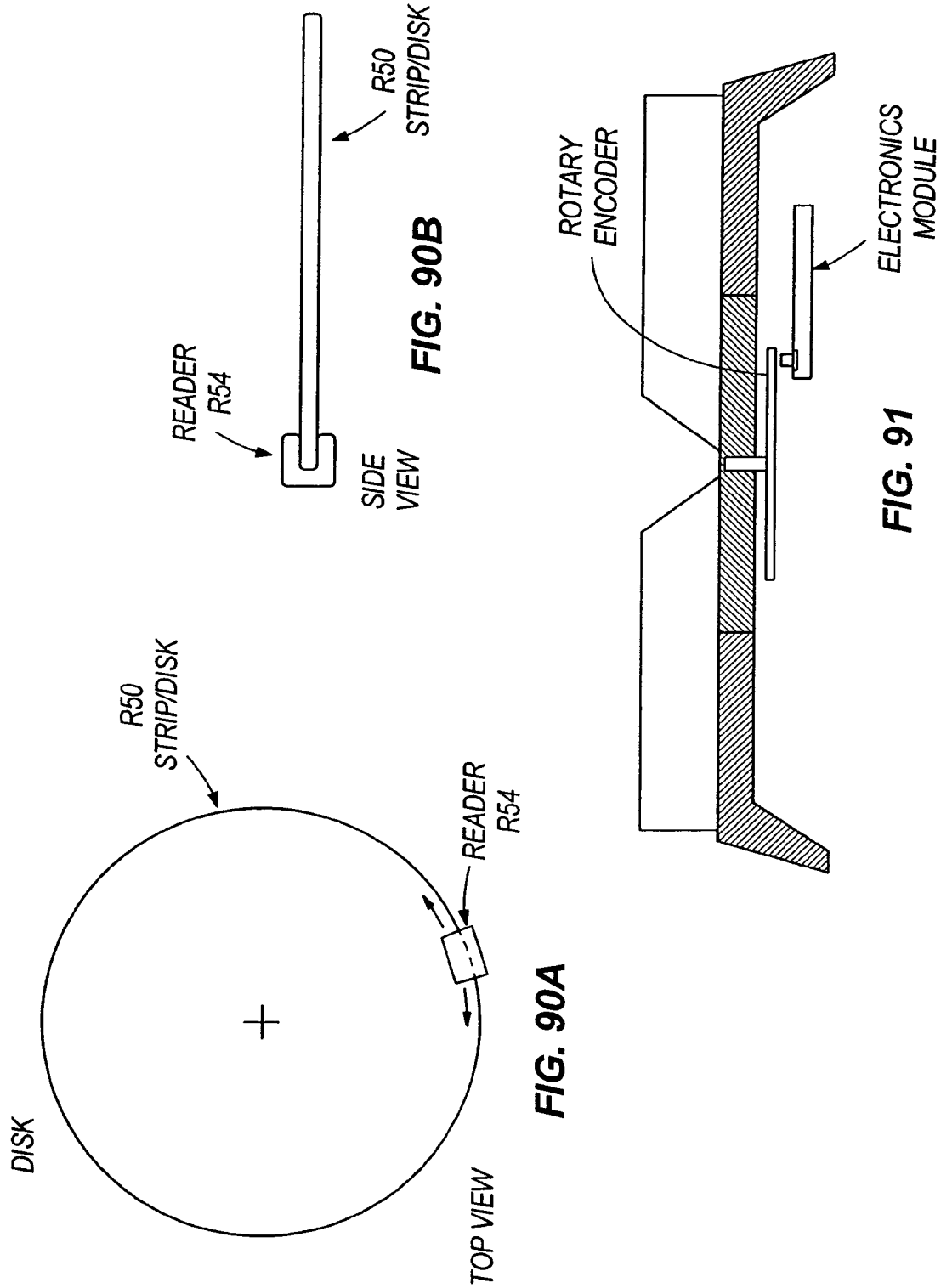

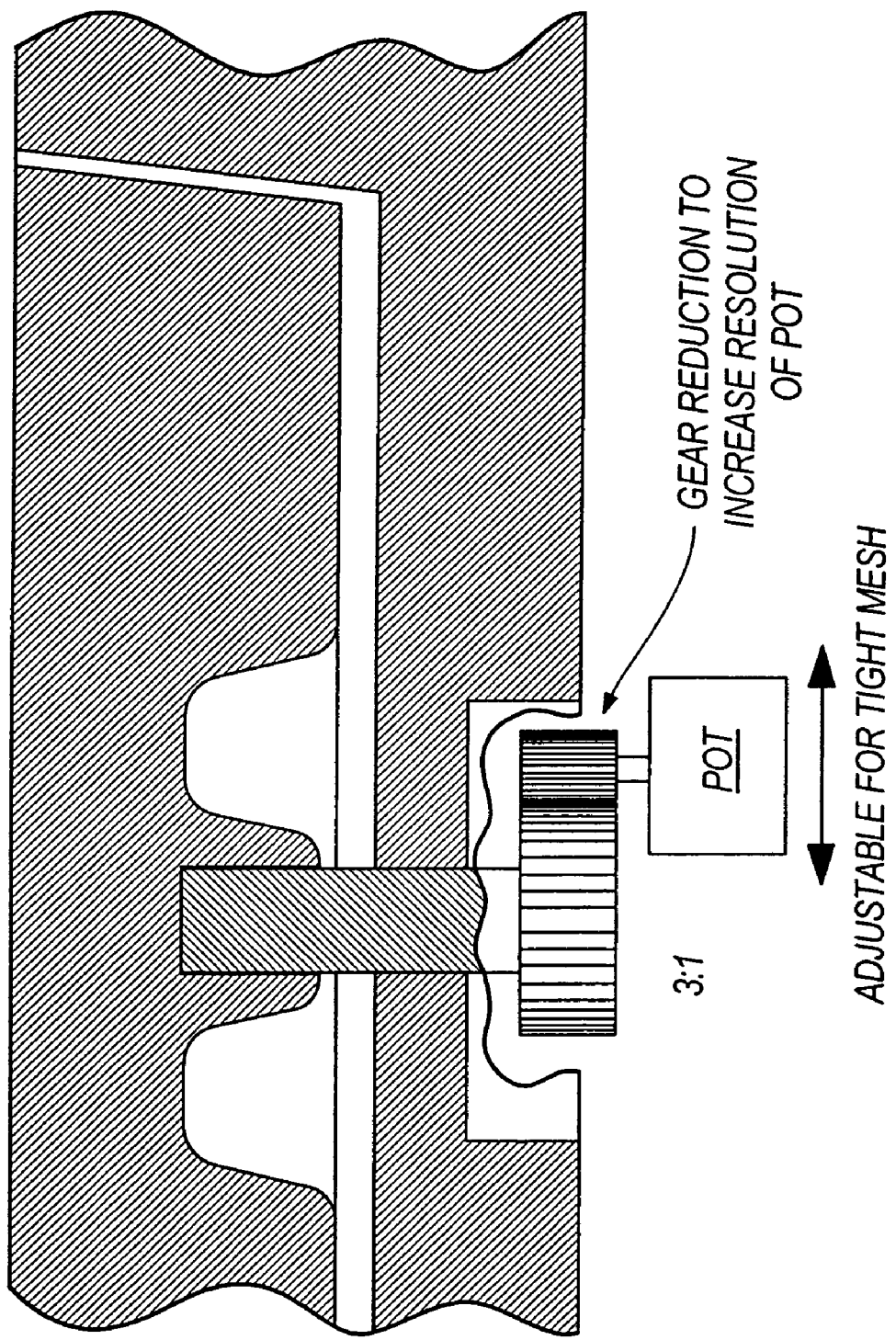

MITER SAW WIRING

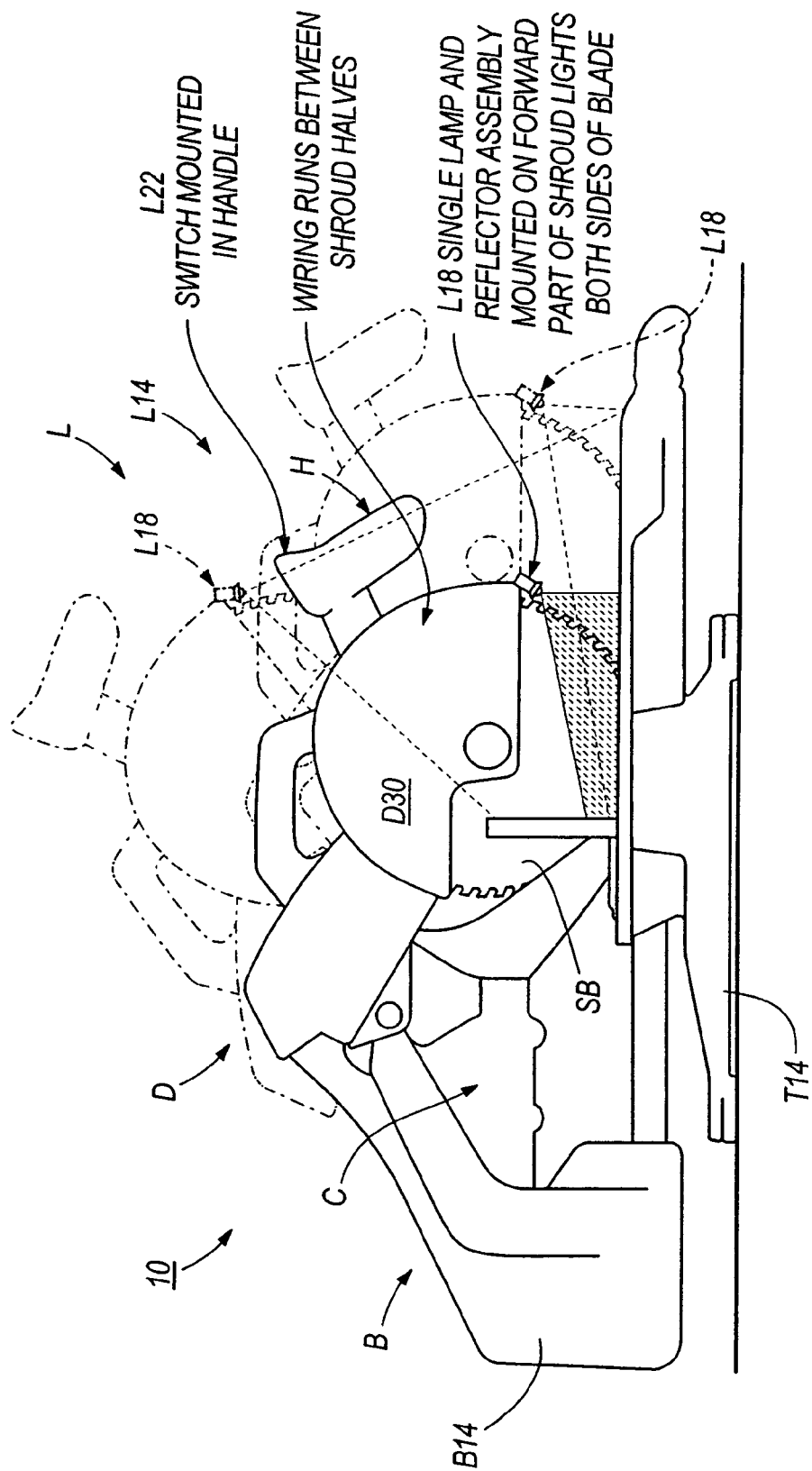
FIG. 97  MITER SAW INCANDESCENT LIGHTING
SINGLE LIGHT

MITER SAW INCANDESCENT LIGHTING

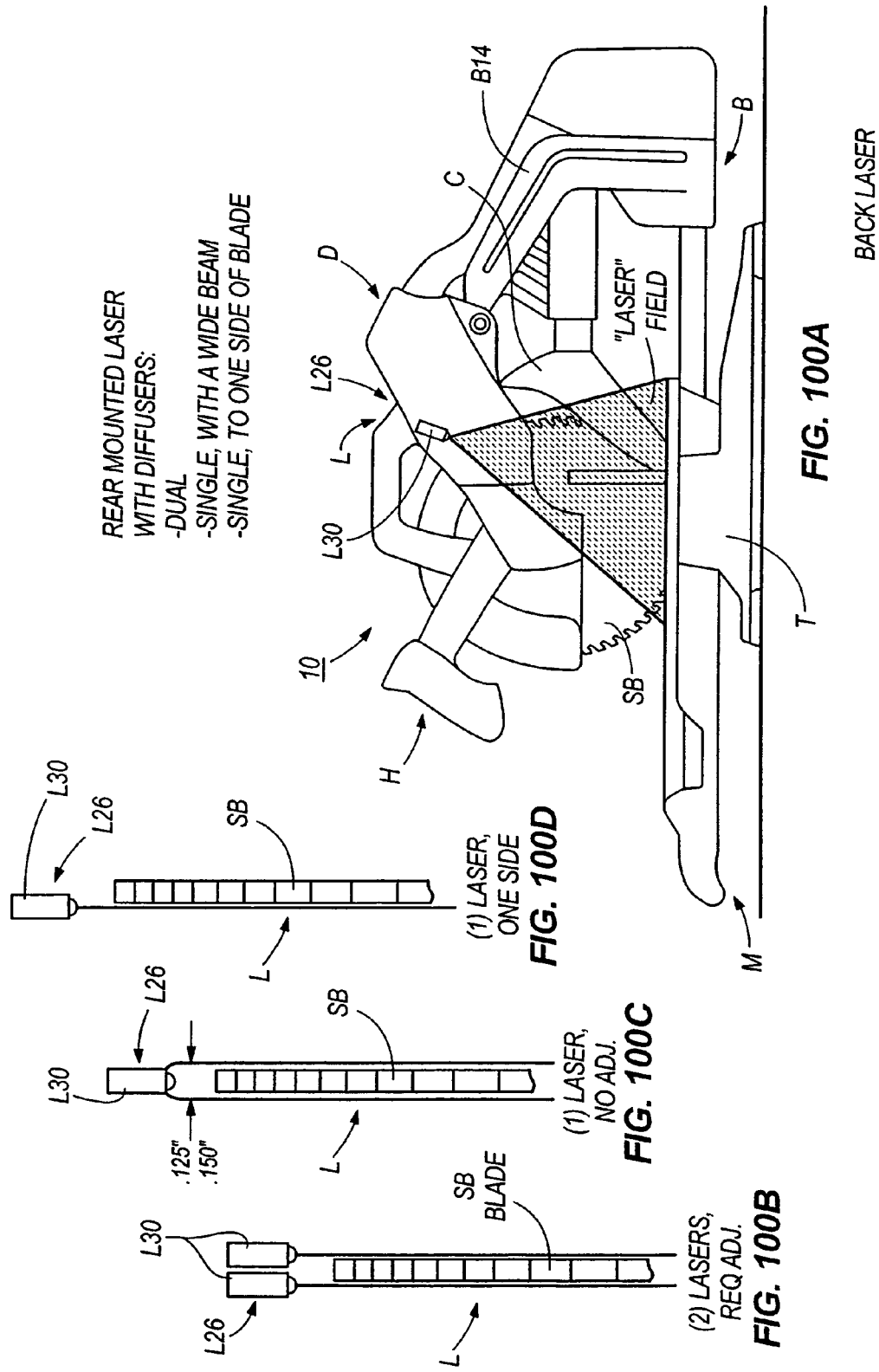

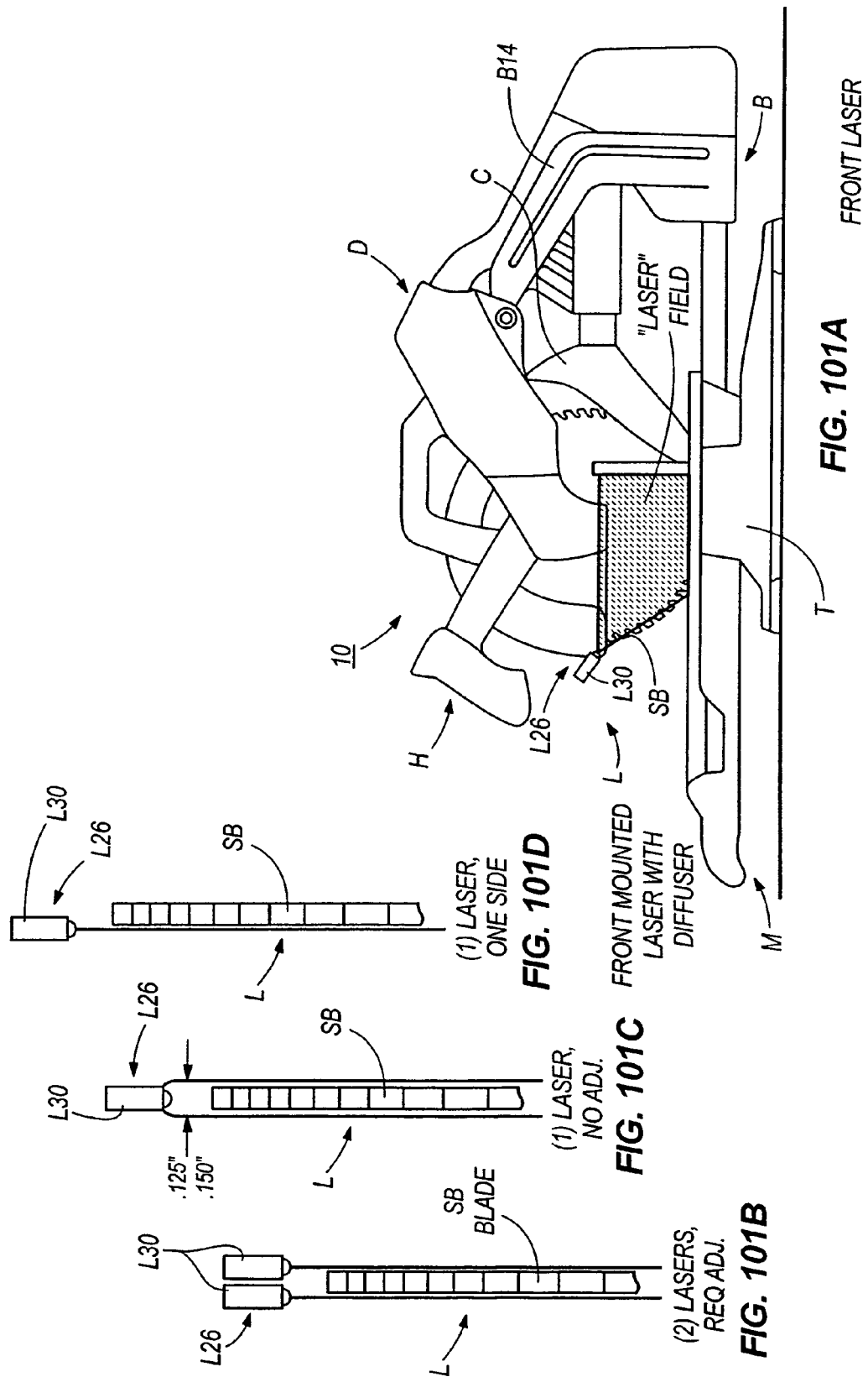

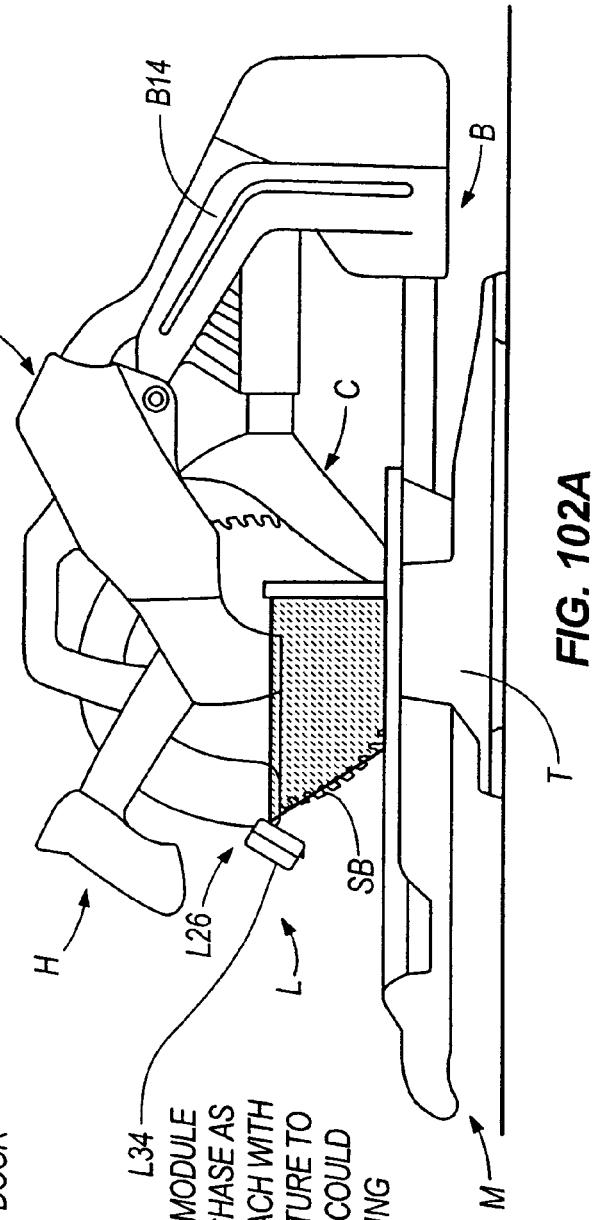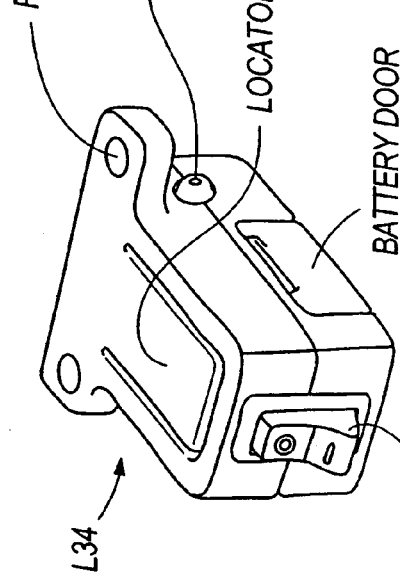
FIG. 102A
FIG. 102B
ADD-ON LASER MODULE
SELF CONTAINED LASER MODULE THAT USER WOULD PURCHASE AS AN ACCESSORY AND ATTACH WITH FASTENERS. TIMER FEATURE TO PRESERVE BATTERIES, COULD INCLUDE LED LIGHTING

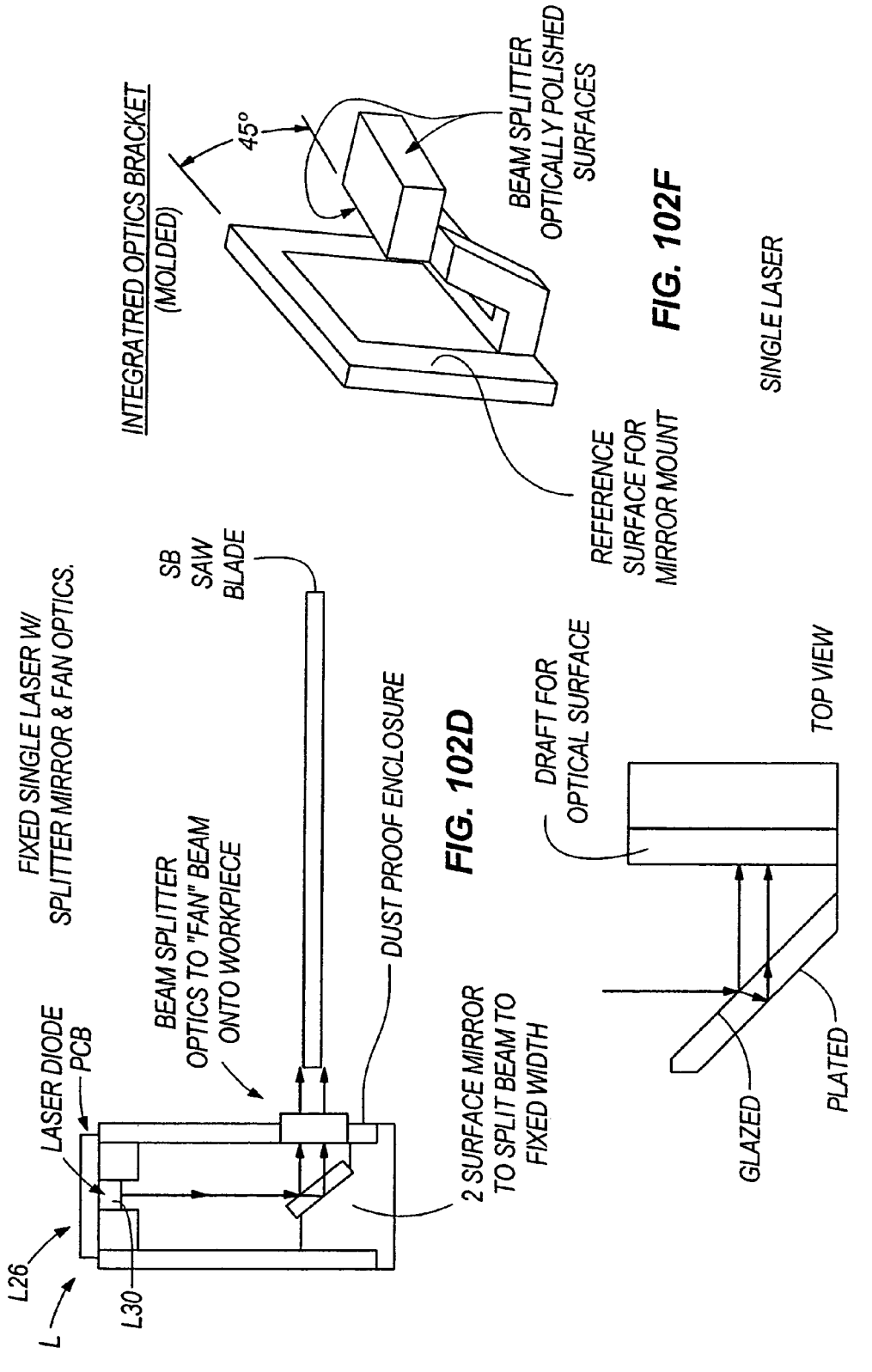

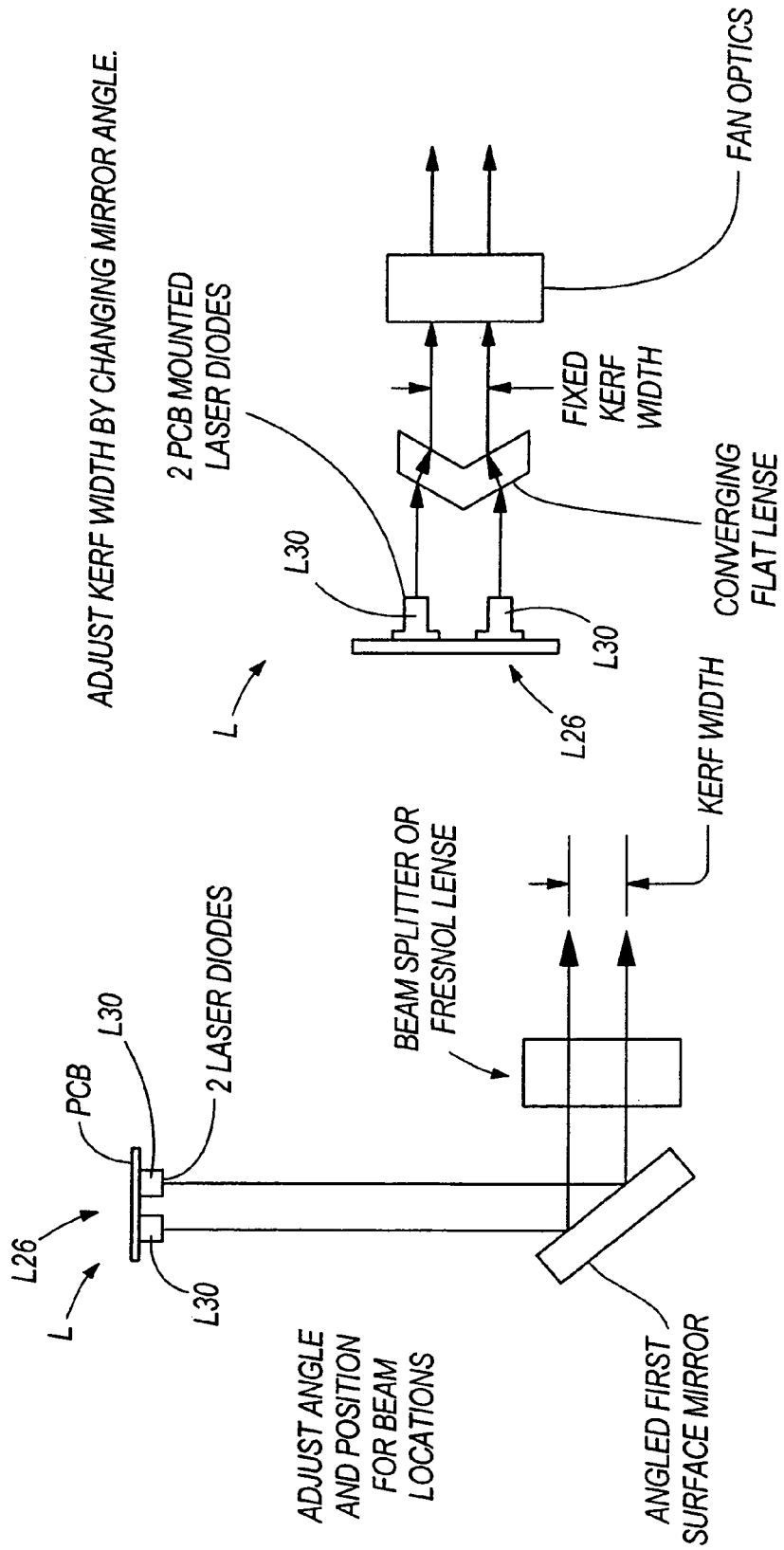

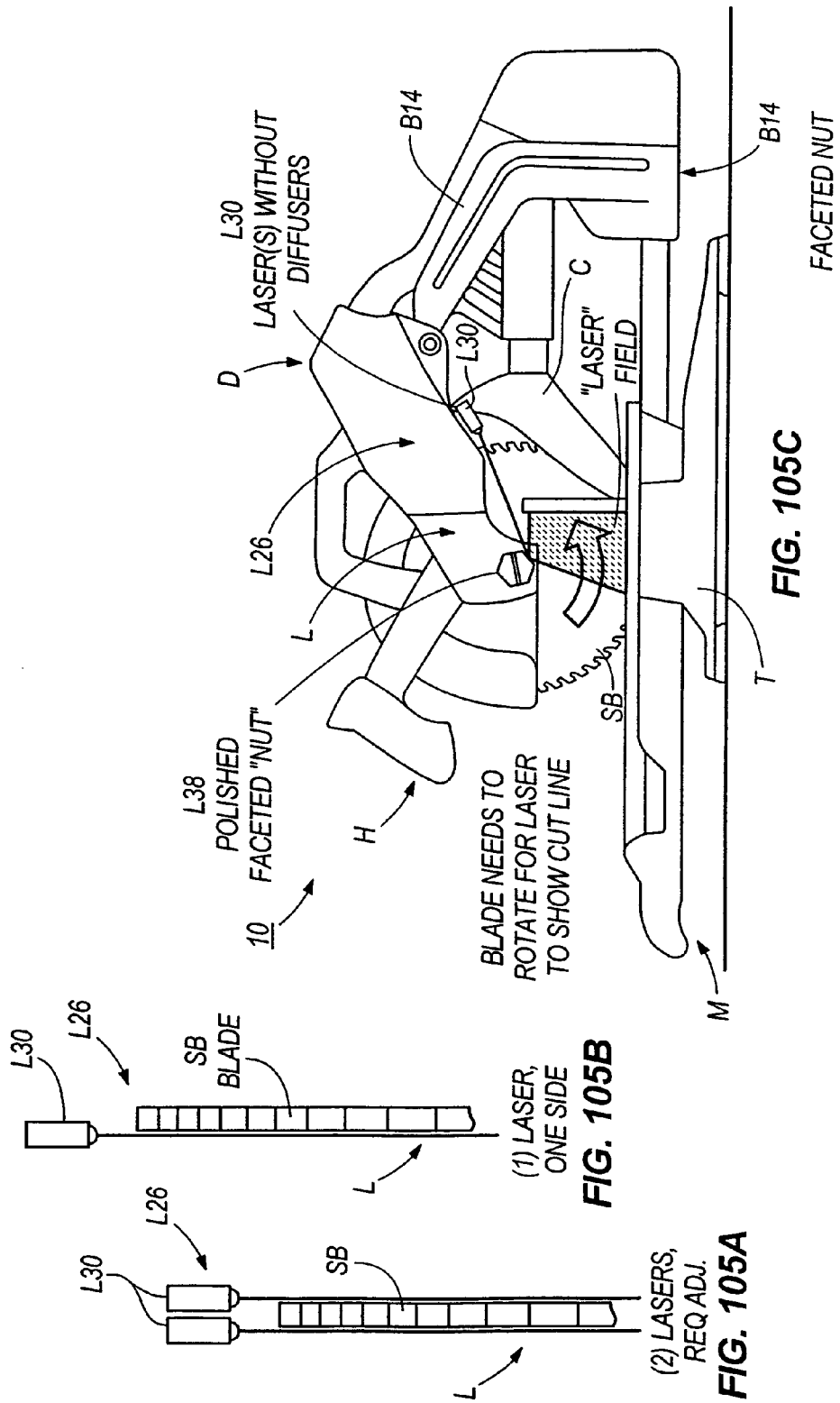

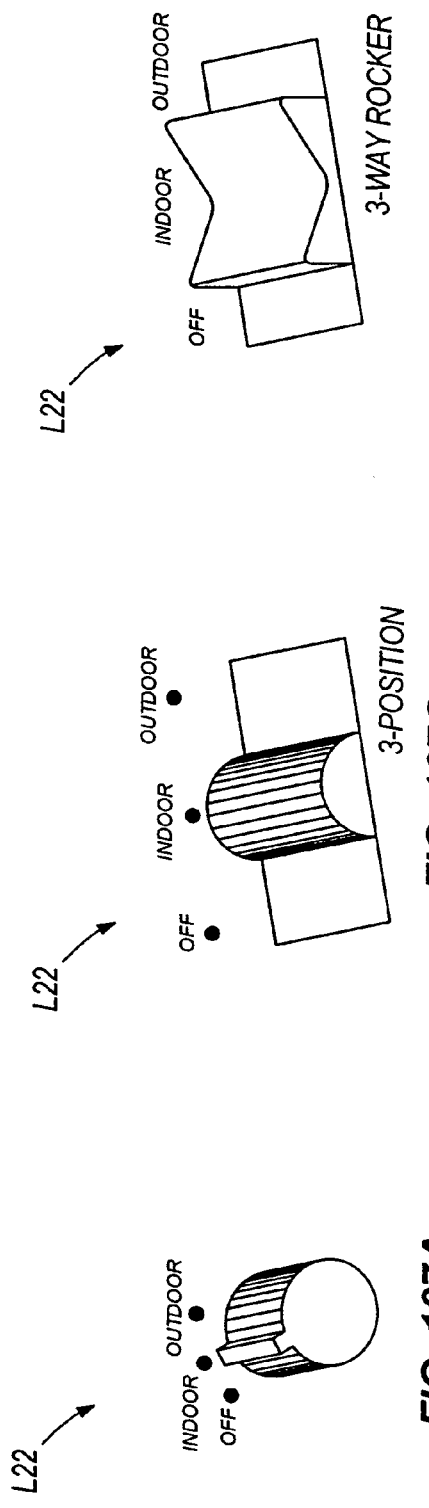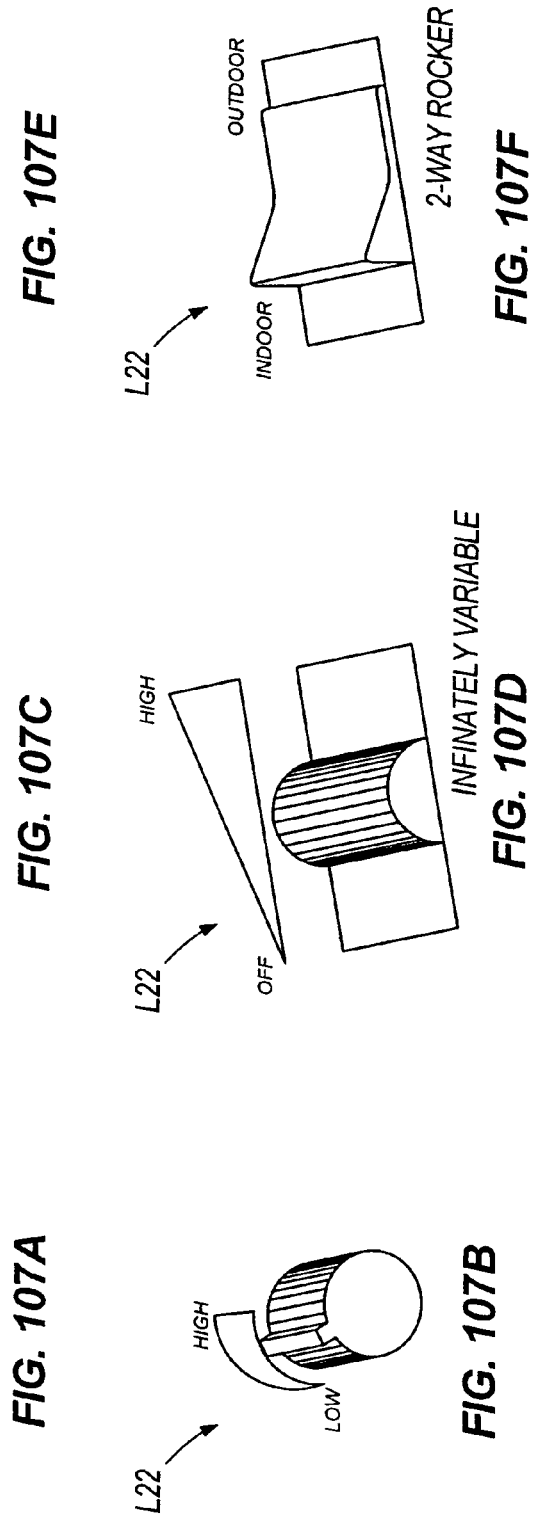

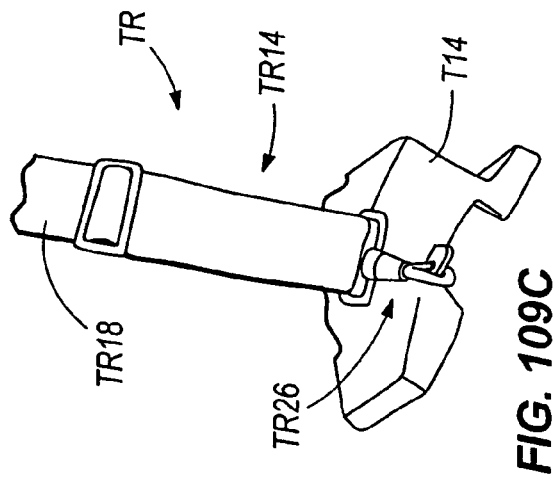
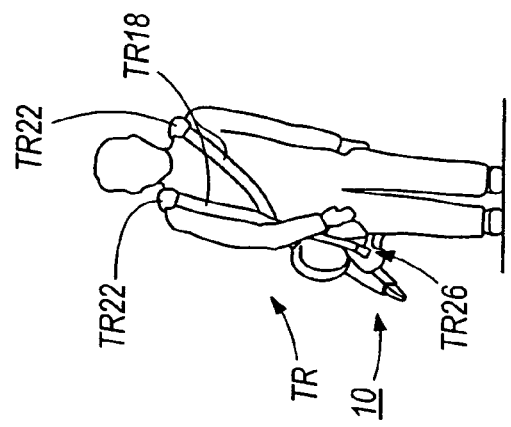
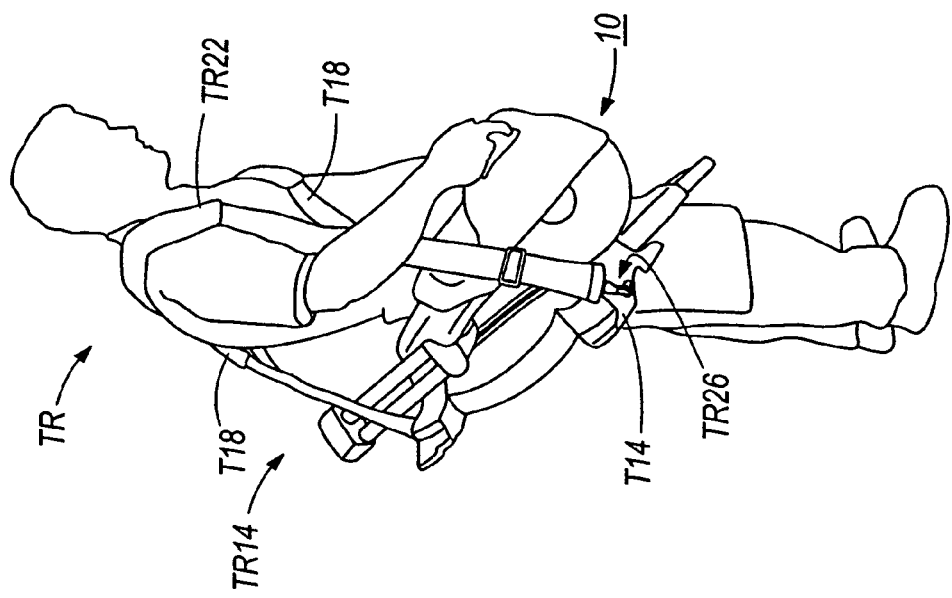
FIG. 109C
FIG. 109B
FIG. 109A

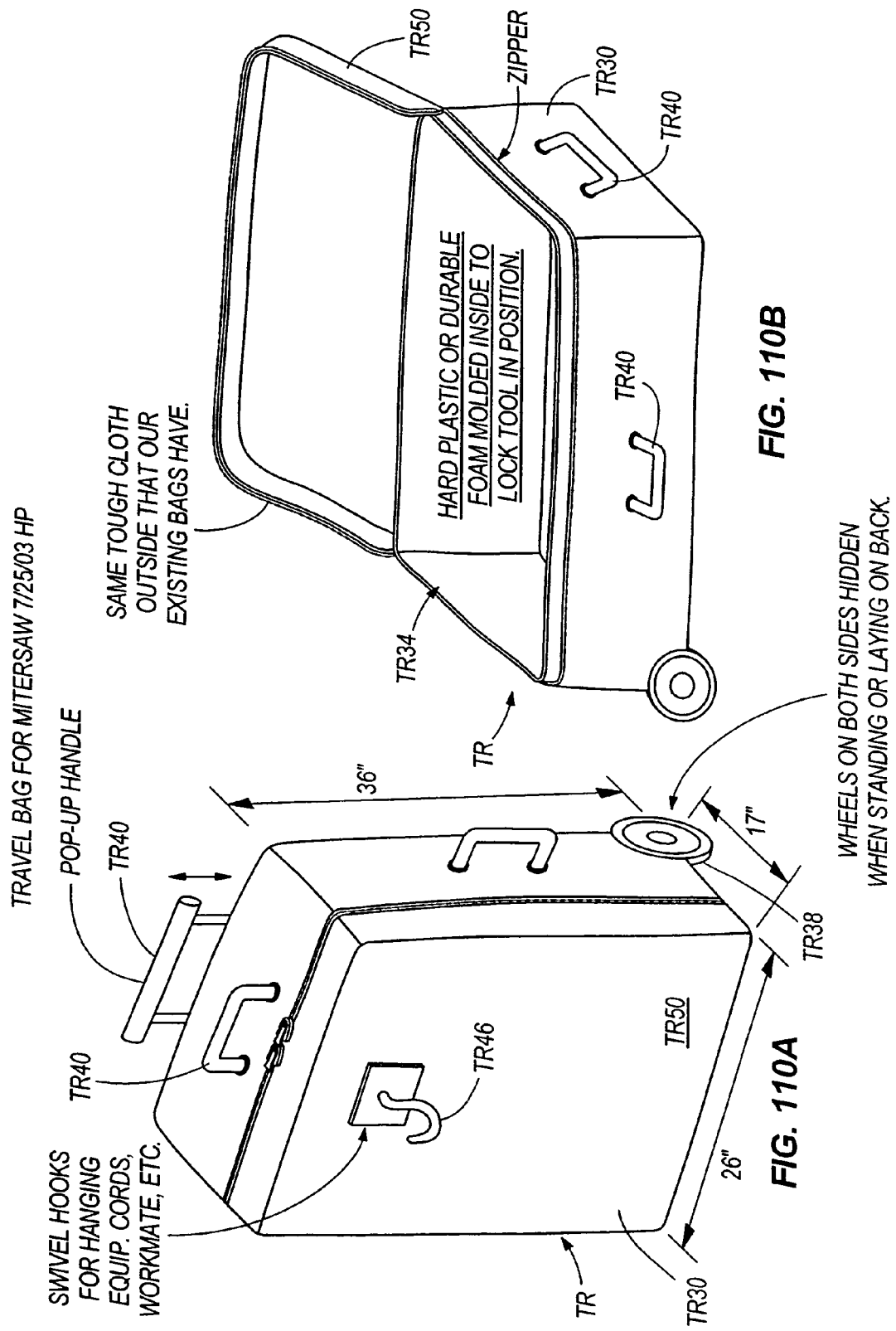

PLASTIC CASE FOR MITER SAW

STEP STOOL

COVER SECONDS AS A STEP STOOL & HAS SPACE FOR ACCESSORIES

TR40 HANDLE

WHEELS

BEVEL ADJUSTMENT ASSEMBLY FOR A SAW

RELATED APPLICATIONS

This patent application claims priority to prior-filed, co-pending U.S. Provisional Patent Application Ser. Nos. 60/562,592, filed Apr. 15, 2004, and 60/608,851, filed Sep. 10, 2004, the entire contents of both of which are hereby incorporated by reference.

The present application is related to U.S. patent application entitled "Miter Adjustment Assembly for a Saw", filed Apr. 15, 2005 Ser. No. 11/107,384; U.S. patent application entitled "Dust Collection Assembly for a Power Tool", filed Apr. 15, 2005 Ser. No. 11/107,403; U.S. patent application entitled "Table and Base Assembly for a Power Tool", filed Apr. 15, 2005 Ser. No. 11/108,156; and U.S. patent application entitled "Power Tool Having an Elastomeric Material", filed Apr. 15, 2005 Ser. No. 11/108,170, the entire contents of all of which are hereby incorporated by reference.

FIELD OF THE INVENTION

This invention relates generally to power tools and, more particularly, to saws, such as miter saws, chop saws, etc.

SUMMARY OF THE INVENTION

A conventional saw, such as a miter saw, may generally include a saw unit supported by a table for movement between a raised or non-cutting position and a lowered or cutting position. The table, in turn, may be movably coupled to a base about a substantially vertical axis or a miter axis to adjust a miter angle of the saw unit. To adjust the miter angle of the saw unit, a user may unlock the table from the base, rotate the table relative to the base until the desired miter angle is achieved, and lock the table to the base. The saw unit may also be movably coupled to the table about a substantially horizontal axis or a bevel axis to adjust a bevel angle of the saw unit. To adjust the bevel angle of the saw unit, the user may unlock the saw unit from the table, rotate the saw unit relative to the table until the desired bevel angle is achieved, and lock the saw unit to the table. Some miter saws also include structure to allow sliding movement of the saw unit along the bevel axis.

In some aspects and in some constructions, the invention provides a sliding saw, such as a sliding compound miter saw, generally including a base operable to support a work piece, at least one tube slidably coupled to the table below a work piece support surface of the saw, and a saw unit coupled to the at least one tube for movement with the tube relative to the base.

In some aspects and in some constructions, the invention provides a saw, such as a miter saw, generally including a base operable to support a work piece, and a saw unit coupled to the base for movement relative to the base, and a carry strap coupled to the saw to facilitate transportation of the saw.

In some aspects and in some constructions, the invention provides a saw, such as a miter saw, generally including a base operable to support a work piece, and a saw unit coupled to the base for movement relative to the base, and the saw unit may include a permanent magnet motor operable to drive a saw blade.

In some aspects and in some constructions, the invention provides a saw, such as a miter saw, generally including a base operable to support a work piece, and a saw unit coupled to the base for movement relative to the base, and the saw unit may include a fixed upper blade guard covering an upper portion of a saw blade and a movable lower blade guard covering a lower portion of the saw blade. A relief may be defined in the fixed upper blade guard to allow an increased cutting capacity of a work piece, and the saw unit may also include a supplemental blade guard for selectively covering the portion of the saw blade exposed by the relief in the fixed upper blade guard.

In some aspects and in some constructions, the invention provides a saw, such as a miter saw, generally including a base operable to support a work piece, a saw unit coupled to the base for movement relative to the base, and an on-board dust collection assembly for capturing dust generated during cutting of a work piece by the saw unit. In some aspects and in some constructions, the dust collection assembly may include a vacuum fan positioned in an electric motor of the saw unit to assist with dust collection.

In some aspects and in some constructions, the invention provides a saw, such as a miter saw, generally including a base operable to support a work piece, a saw unit coupled to the base for movement relative to the base, and at least one fence movably coupled to the base. In some aspects and in some constructions, the at least one fence may include quick-release structure to allow an operator to adjust the position of the fence with respect to the base using only one hand.

In some aspects and in some constructions, the invention provides a saw, such as a miter saw, generally including a base, a table coupled to the base for movement relative to the base, and a saw unit coupled to the table for movement relative to the table, and the table may include fine-adjustment structure allowing the table to be adjusted relative to the base in small angular increments.

In some aspects and in some constructions, the invention provides a saw, such as a miter saw, generally including a base operable to support a work piece, a saw unit coupled to the base for movement relative to the base about a generally horizontal bevel angle, and a bevel angle adjustment mechanism operable to adjust the bevel angle of the saw unit relative to the base. The bevel angle adjustment mechanism may include an actuator positioned on or in proximity to a surface of the saw which is engageable by the operator to adjust the bevel angle. The surface may include a handle, such as the main operator's handle of the saw unit, so that the operator may engage the actuator while engaging the surface to adjust the bevel angle.

In some aspects and in some constructions, the invention provides a saw, such as a miter saw, generally including a base, a table coupled to the base for movement relative to the base, a saw unit coupled to the table for movement relative to the table, and one or more digital readouts to display, among other things, the miter angle and/or the bevel angle of the saw.

In some aspects and in some constructions, the invention provides a saw, such as a miter saw, generally including a base operable to support a work piece, a saw unit coupled to the base for movement relative to the base, and a variable intensity laser line for indicating a cutting line for the saw unit. In some aspects and in some constructions, the intensity of the laser line may be adjusted to adapt to a work environment of low light and/or to a work environment of bright light.

In some aspects and in some constructions, the invention provides a saw, such as a miter saw, generally including a base operable to support a work piece, a saw unit coupled to the base for movement relative to the base, and one or more lights coupled to the saw unit to illuminate the workpiece. In some aspects and in some constructions, a light switch separate from the main power switch of the saw unit may be coupled to the saw unit to independently operate the one or more lights and the saw unit.

In some aspects and in some constructions, the invention provides a saw, such as a miter saw, generally including a base, a table coupled to the base for movement relative to the base, a saw unit coupled to the table for movement relative to the table, and a bevel stop assembly operable to define one or more bevel angles of the saw unit relative to the table.

In some aspects and in some constructions, a saw may generally include a miter adjustment assembly including a coarse adjustment assembly and a fine adjustment assembly.

In some aspects and in some constructions, a saw may generally include a bevel adjustment assembly including a brake mechanism and a bevel detent assembly.

In some aspects and in some constructions, a saw may generally include a dust collection assembly including a dust chute defining a dust both around the bevel arm.

In some aspects and in some constructions, a saw may generally include a table having a top wall with a peripheral rim and a side wall depending from the top wall, and a base defining an opening in which the side wall is received and a ledge above which the rim is positioned.

In some aspects and in some constructions, a saw may generally include elastomeric material covering a portion of the base, such as a bottom surface, a lateral surface, a grip surface, etc.

Independent features and independent aspects of the invention will become apparent to those skilled in the art upon review of the following detailed description, drawings and claims.

BRIEF DESCRIPTION OF THE DRAWINGS

In the drawings, wherein like reference numerals indicate like parts:

FIGS. 2A-2L are views of another construction of a saw, such as a compound miter saw.

FIGS. 5A-5M are views of alternate constructions of a saw, such as a miter saw.

FIGS. 11A-11B are schematic views of another construction of a portion of a saw and illustrating a table assembly.

FIGS. 13A-13D are views of alternate constructions of a portion of a saw and illustrating a fence assembly.

FIGS. 14A-14E are views of another construction of a fence assembly.

FIGS. 16A-16C are views of a portion of a saw and illustrating a drive assembly.

FIGS. 17A-17E are views of alternate constructions of a portion of a saw and illustrating a drive assembly and a dust collection assembly.

FIGS. 20A-20D are perspective views of a portion of a saw and illustrating a drive assembly and a wiring arrangement.

FIGS. 22A-22F are views of a portion of a saw and illustrating a dust collection assembly.

FIGS. 24A-24C are views of a portion of a saw and illustrating a blade guard support gusset.

FIGS. 25A-25G are views of a portion of a saw and illustrating a dust chute assembly.

FIGS. 26A-26E are views of an alternate construction of a dust chute assembly.

FIGS. 27A-27J are views of a portion of a saw and illustrating a dust chute assembly and a light assembly.

FIG. 29 is a schematic view of a portion of a saw and illustrating another construction of a dust collection assembly.

FIG. 30 is a schematic view illustrating operation of a portion of the dust collection assembly of FIG. 17C.

FIGS. 31A-31J are views of a portion of a saw, such as a compound miter saw, and illustrating a miter angle fine adjustment assembly.

FIGS. 32A-E are views of an alternate construction of a bushing shown in FIG. 3ID.

FIGS. 33A-33F are views illustrating operation of the fine adjustment assembly shown in FIGS. 31A-31J.

FIGS. 35A-C are views of yet another construction of a fine adjustment assembly including a sine-clutch assembly.

FIGS. 36A-36D are views of a portion of a saw, such as a sliding miter saw, and illustrating a miter angle fine adjustment assembly.

FIGS. 37A-37B are views of a further construction of a fine adjustment assembly.

FIGS. 38A-38B are views of a portion of an alternate construction of a portion of a fine adjustment assembly and illustrating a harmonic drive assembly.

FIGS. 39A-39E are views of alternate constructions of portions of a fine adjustment assembly.

FIGS. 44A-44D are views of an alternate construction of a portion of a fine adjustment assembly shown in FIGS. 43A-43C.

FIG. 45 is a schematic view of yet another construction of a fine adjustment assembly.

FIG. 46 is a schematic view of the fine adjustment assembly shown in FIG. 45.

FIGS. 47A-47B are schematic views of an alternate construction of a portion of the fine adjustment assembly shown in FIG. 45.

FIGS. 48A-48G are schematic views of alternate constructions of a portion of a fine adjustment assembly.

FIGS. 49A-49C are views of a further construction of a fine adjustment assembly.

FIGS. 51A-51D are views of yet another construction of a fine adjustment assembly.

FIGS. 52A-52D are views of a further construction of a fine adjustment assembly.

FIGS. 54A-54B are views of yet another construction of a fine adjustment assembly.

FIGS. 55A-55B are views of a further construction of a fine adjustment assembly.

FIGS. 56A-56M are views of alternate constructions of portions of a saw, such as a fine adjustment assembly, adjustment controls, locking assemblies, handles and/or a digital display indicating the miter angle of the miter saw.

FIGS. 58A-58C are views of portions of a saw, such as a base and table assembly, yet another construction of a fine adjustment assembly and a detent override assembly and illustrating operation of the fine adjustment assembly and the detent override assembly.

FIG. 63A-63B are views of a further construction of a miter angle locking assembly.

FIGS. 64A-64C are views of a portion of a saw, such as a miter angle scale and a user-adjustable detent assembly.

FIGS. 68A-68B are views of another construction of a bevel angle adjustment assembly and a bevel detent assembly.

FIGS. 73A-73D are views of portions of a bevel angle adjustment assembly and a bevel angle locking assembly, such as a pull brake assembly.

FIG. 74 is a schematic view of an alternate construction of a pull brake assembly.

FIGS. 75A-75C are views of another construction of a bevel angle adjustment assembly and a bevel angle locking assembly.

FIGS. 76A-76G are views of alternate constructions of an angular adjustment assembly and a locking assembly, such as a bevel angle adjustment assembly and a bevel angle locking assembly.

FIGS. 77A-77B are schematic views of a portion of a saw and illustrating power transmission through the slide tube.

FIGS. 78A-78G are views of a portion of a saw, such as a bevel stop assembly.

FIGS. 79A-79G are views another construction of a bevel stop assembly.

FIGS. 80A-80G are views of yet another construction of a bevel stop assembly.

FIGS. 84A-84B are views of a saw, such as a sliding compound miter saw, and illustrating an angular display arrangement.

FIGS. 85A-85K are schematic views of saw, such as a compound miter saw, and illustrating a transducer arrangement and an angular display arrangement.

FIGS. 86A-86D are views of portions of a saw and illustrating a transducer arrangement.

FIGS. 88A-88C are schematic views illustrating alternate sensors, such as switch elements, to sense the position of a detent.

FIGS. 90A-90B are schematic views of a portion of a saw and illustrating another construction of an angular sensing arrangement.

FIG. 91 is a schematic view of a portion of a saw and illustrating yet another construction of an angular sensing arrangement.

FIG. 92 is a schematic view of a portion of a saw and illustrating a further construction of an angular sensing arrangement.

FIG. 97 is a schematic side view of a saw, such as a sliding miter saw and illustrating another construction of a light assembly.

FIGS. 100A-100D are views of a portion of a saw, such as a sliding miter saw, and illustrating a laser assembly.

FIGS. 101A-101D are views of a portion of a saw, such as a sliding miter saw, and illustrating another construction of a laser assembly.

FIGS. 102A-102F are views of a portion of a saw, such as a sliding miter saw, and illustrating yet another laser assembly, such as an add-on laser module.

FIGS. 104A-104B are schematic views of yet another construction of an add-on laser module.

FIGS. 105A-105C are schematic views of a saw, such as a sliding miter saw, and illustrating a further construction of a laser assembly, such as a laser targeting a polished faceted nut.

FIGS. 107A-107F are schematic views of a portion of an illumination assembly, such a variable intensity laser assembly, and an actuator assembly

FIGS. 109A-109C are views of another construction of a carry strap assembly.

FIGS. 110A-110G are views of alternate constructions of a transport assembly Before any features and at least one embodiment of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

Figure 1A:
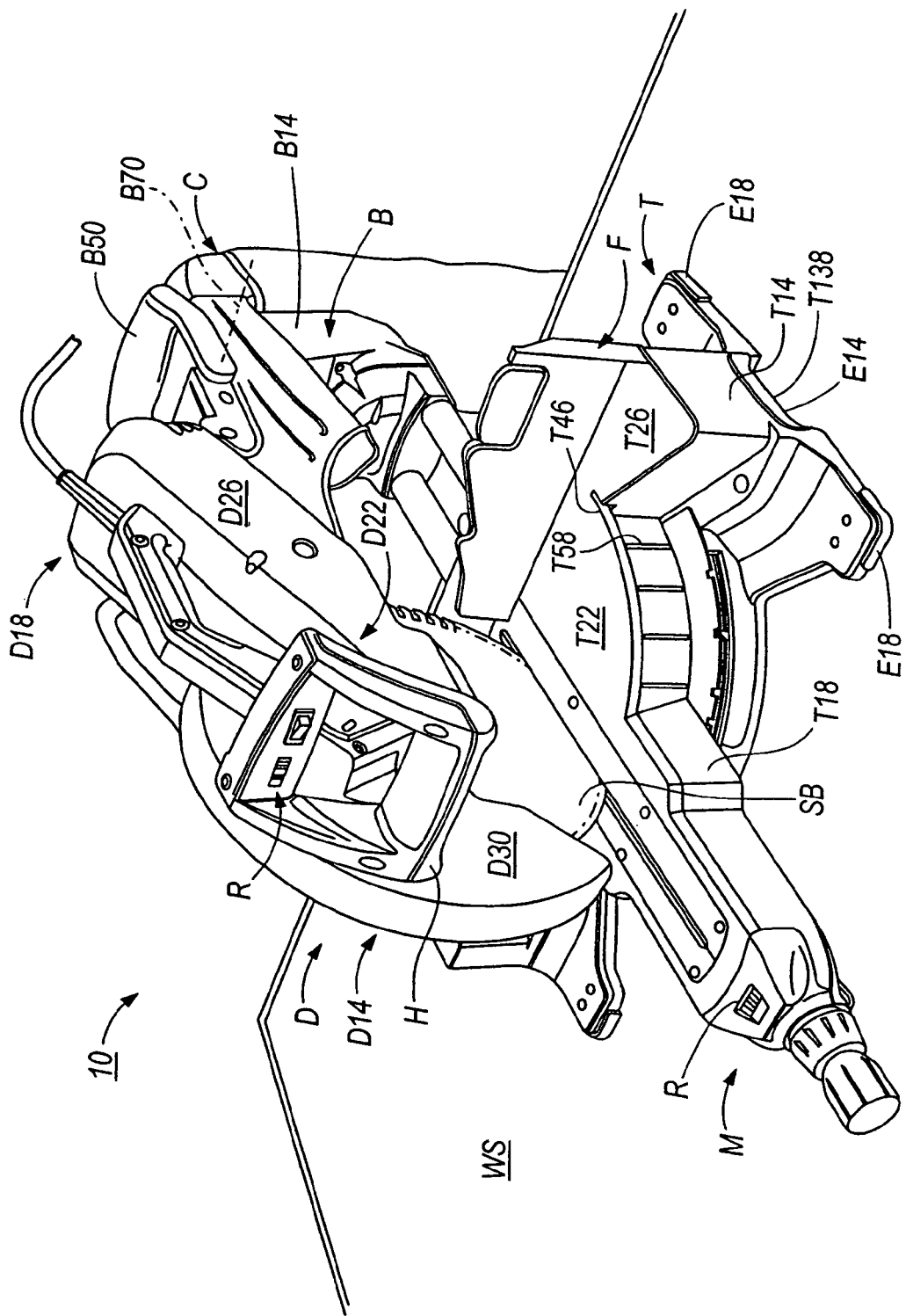
FIGS. 1A-1L are views of a saw, such as a sliding compound miter saw.
Figure 1B:
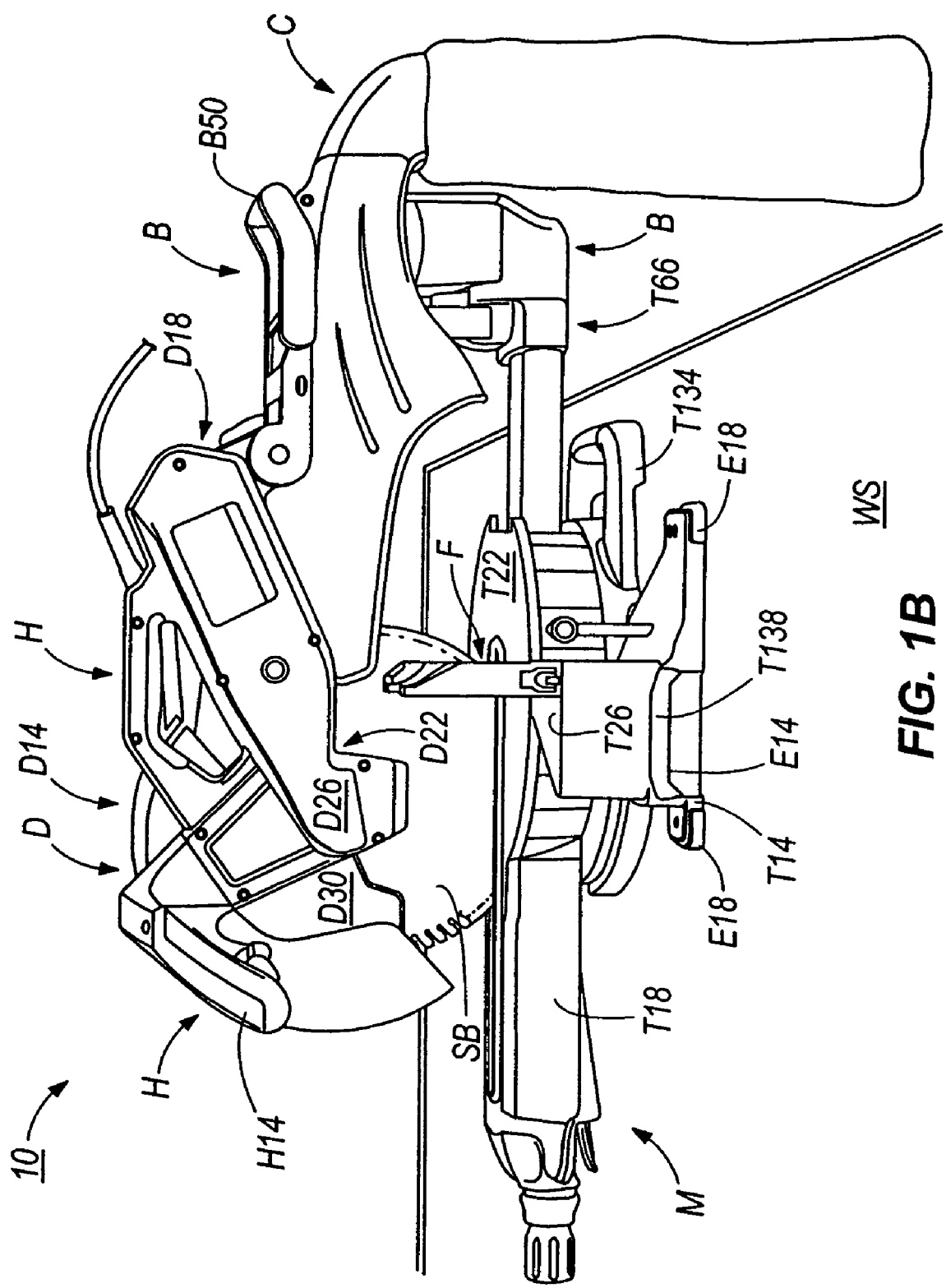
Figure 1C:
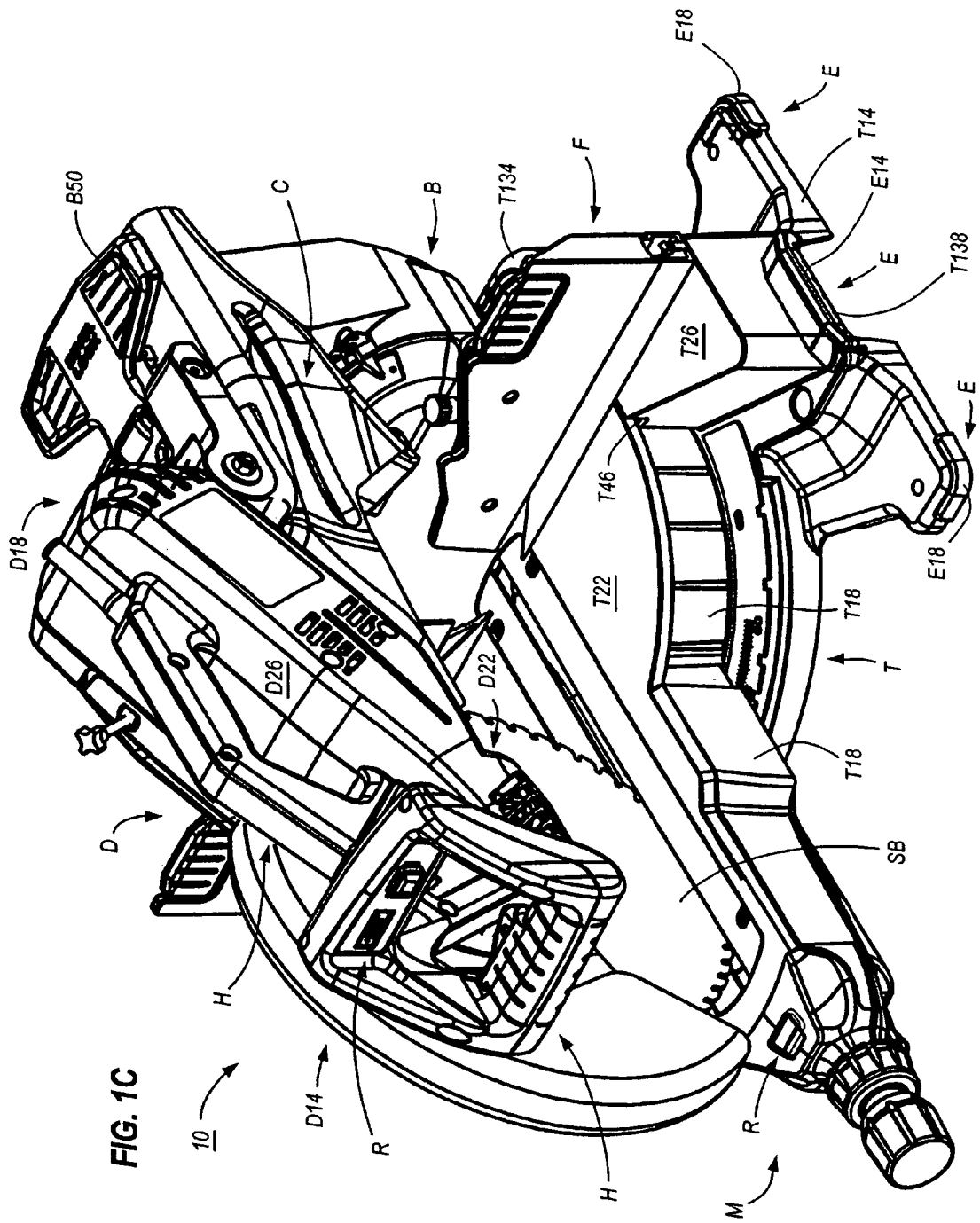
Figure 1D:
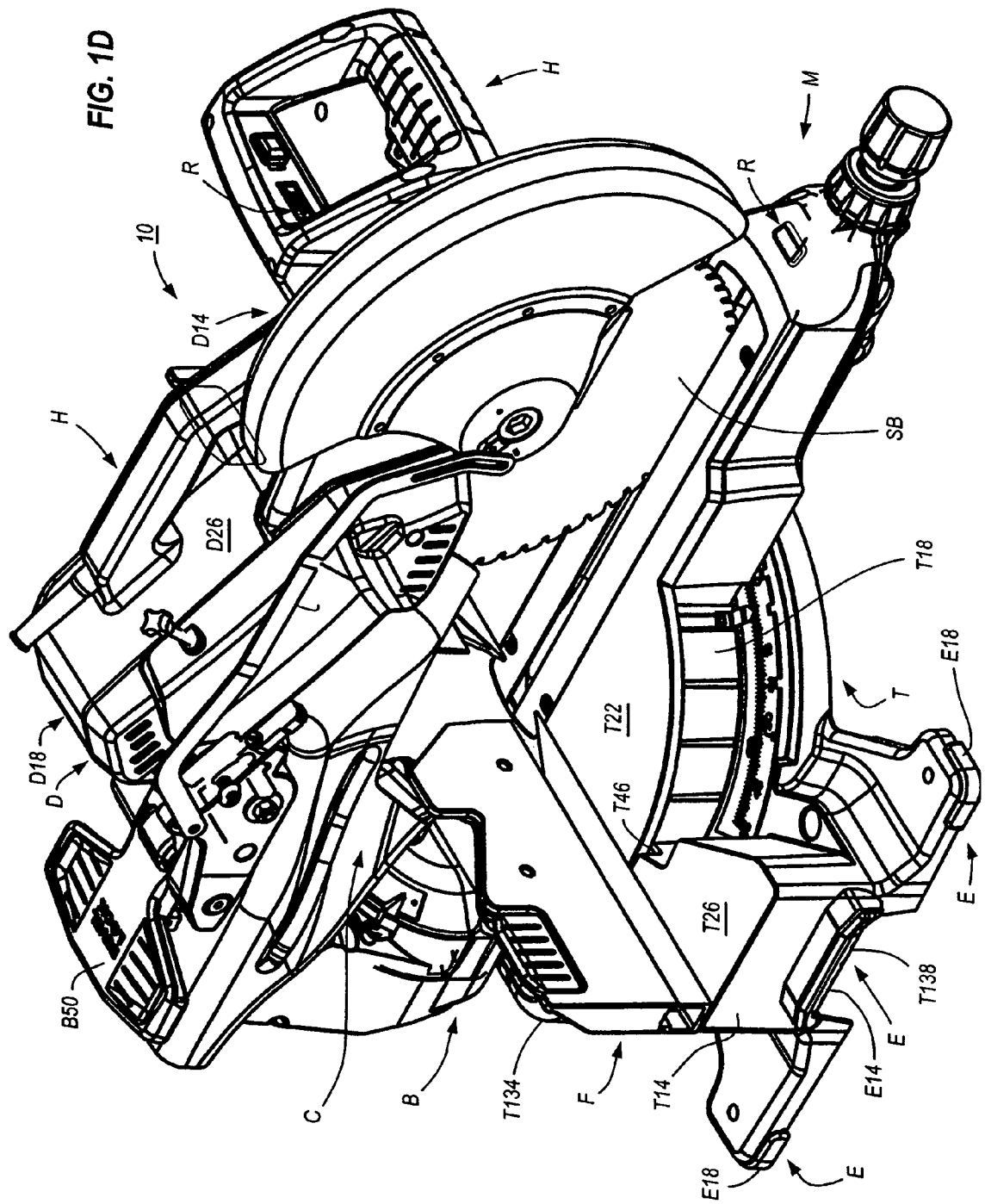
Figure 1E:
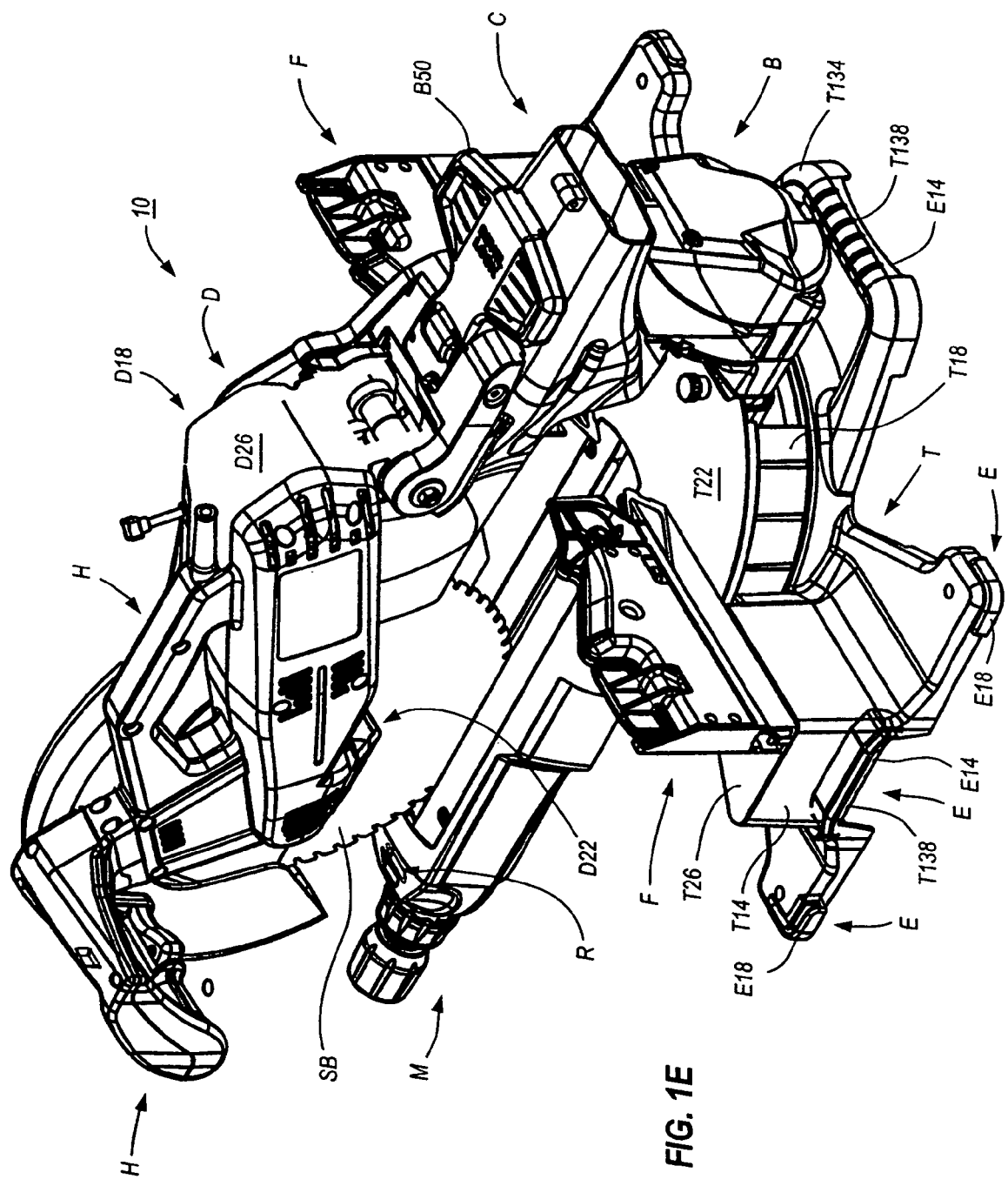
Figure 1F:
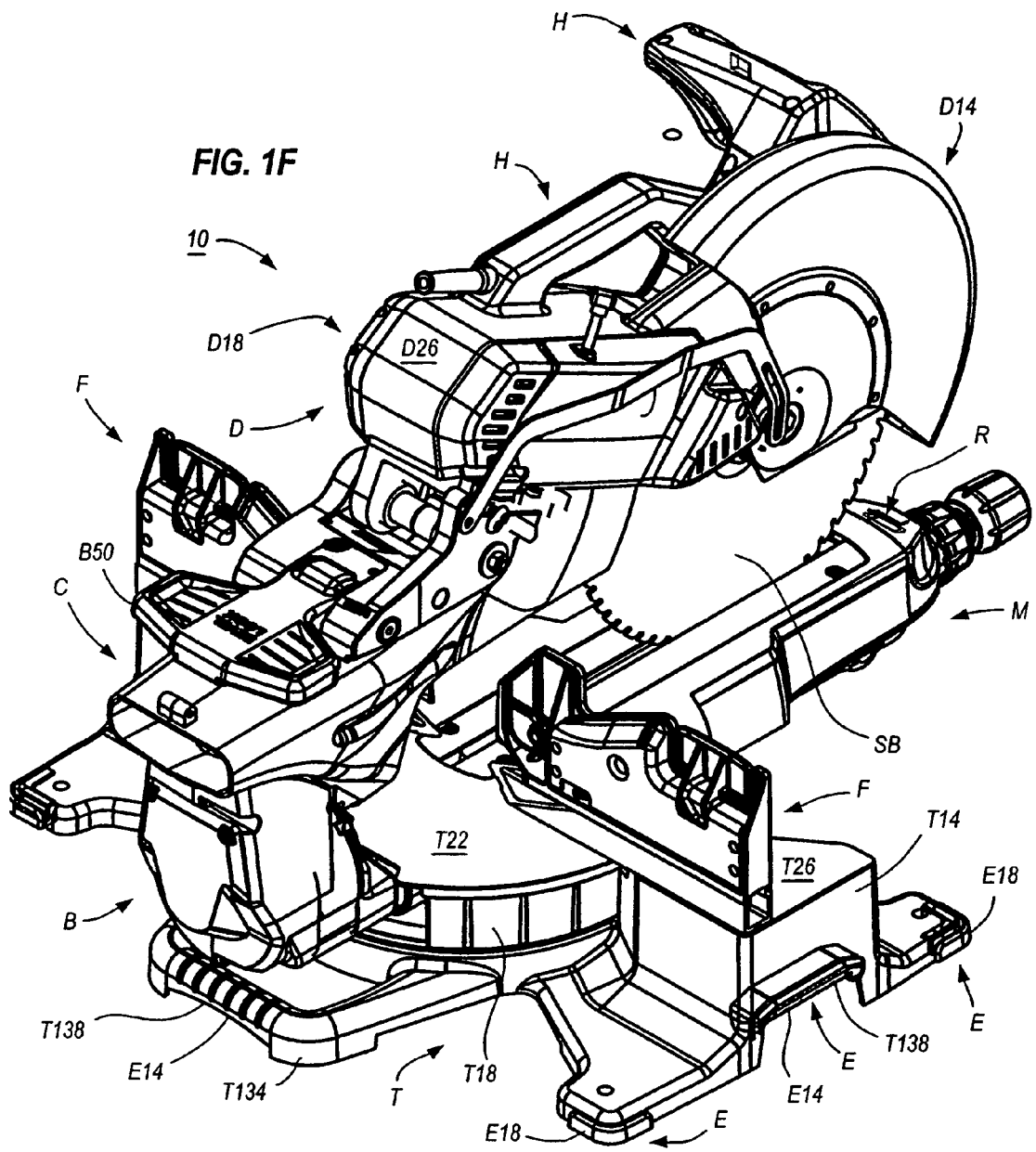
Figure 1G:
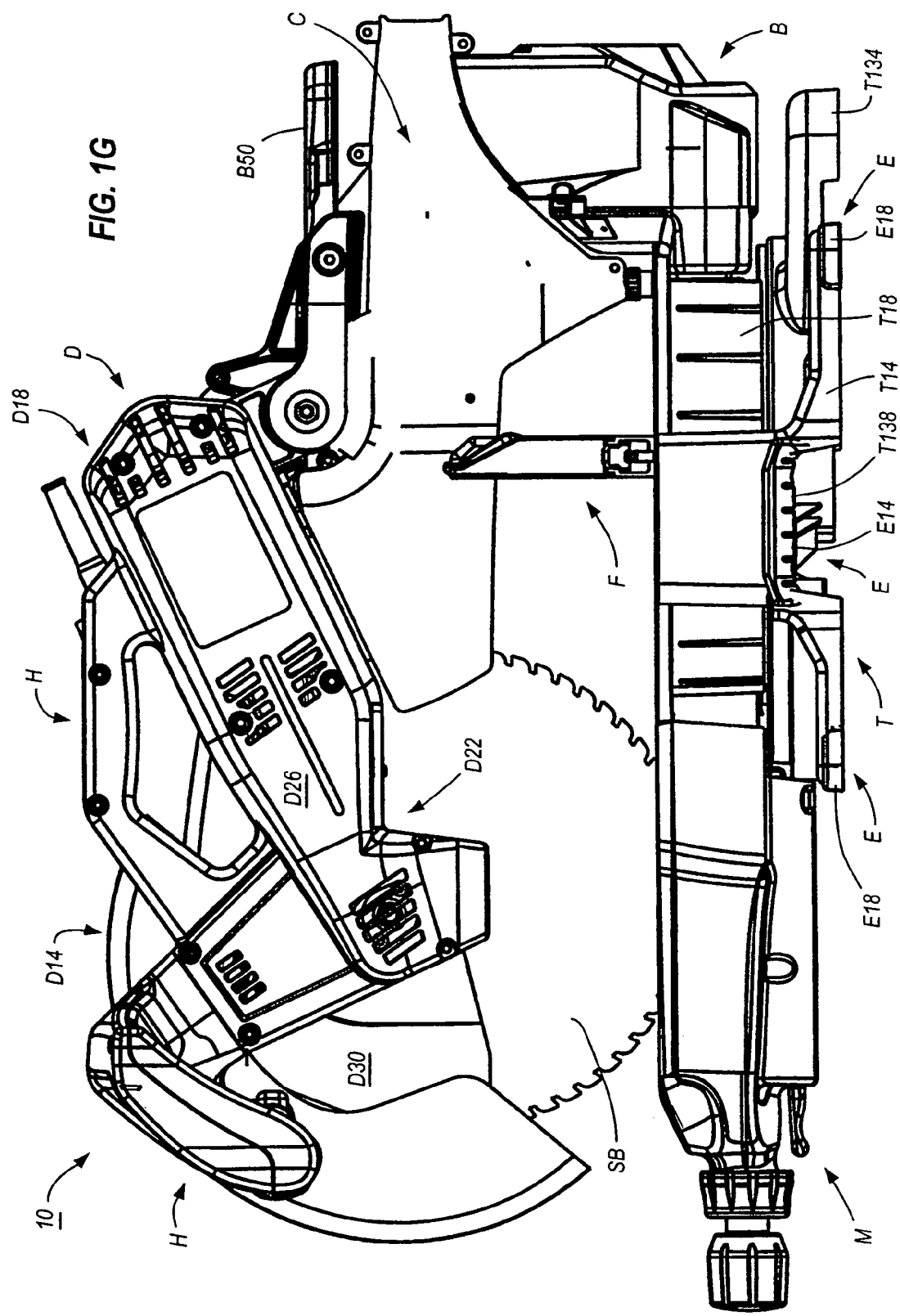
Figure 1H:
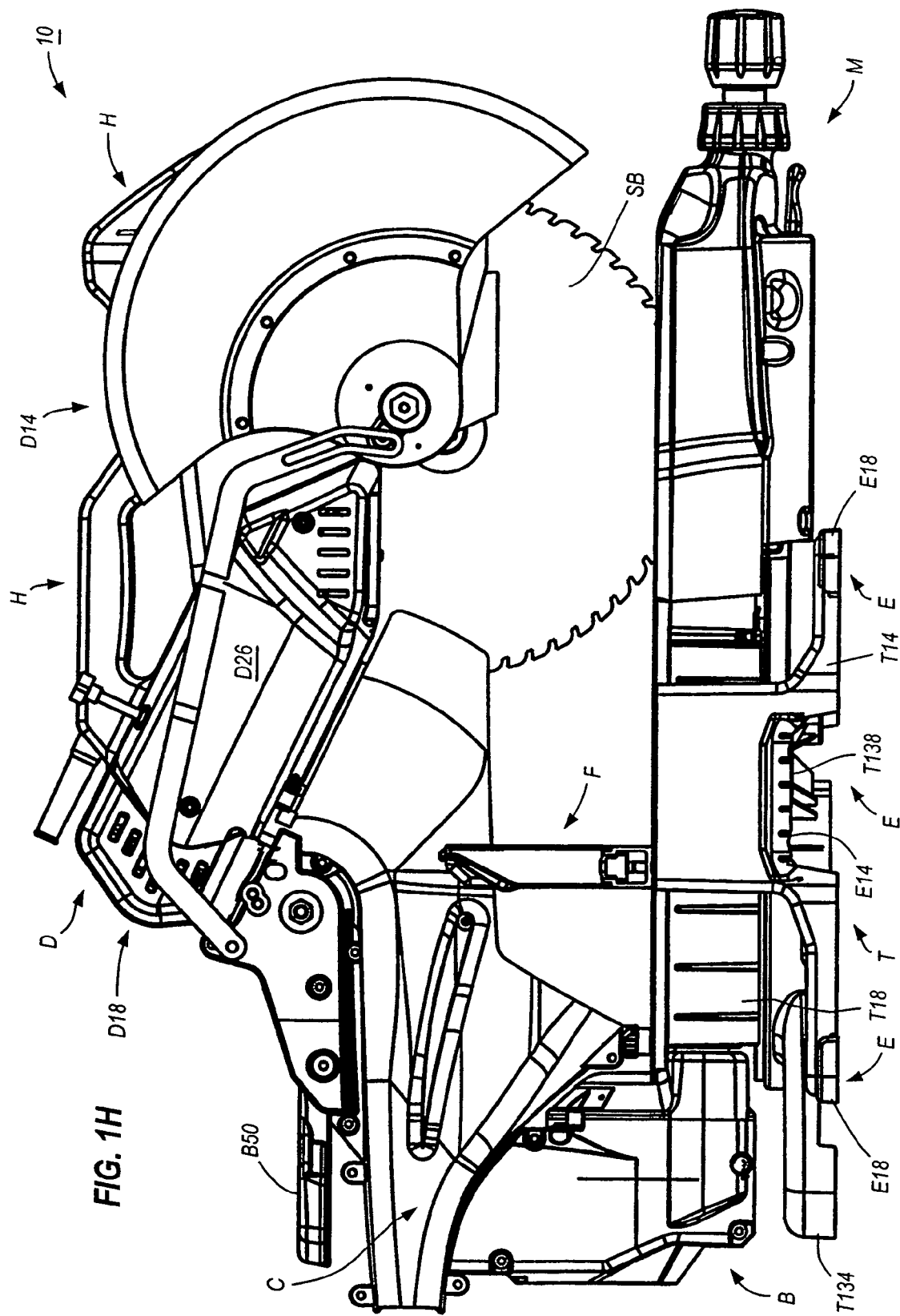
Figure 1I:
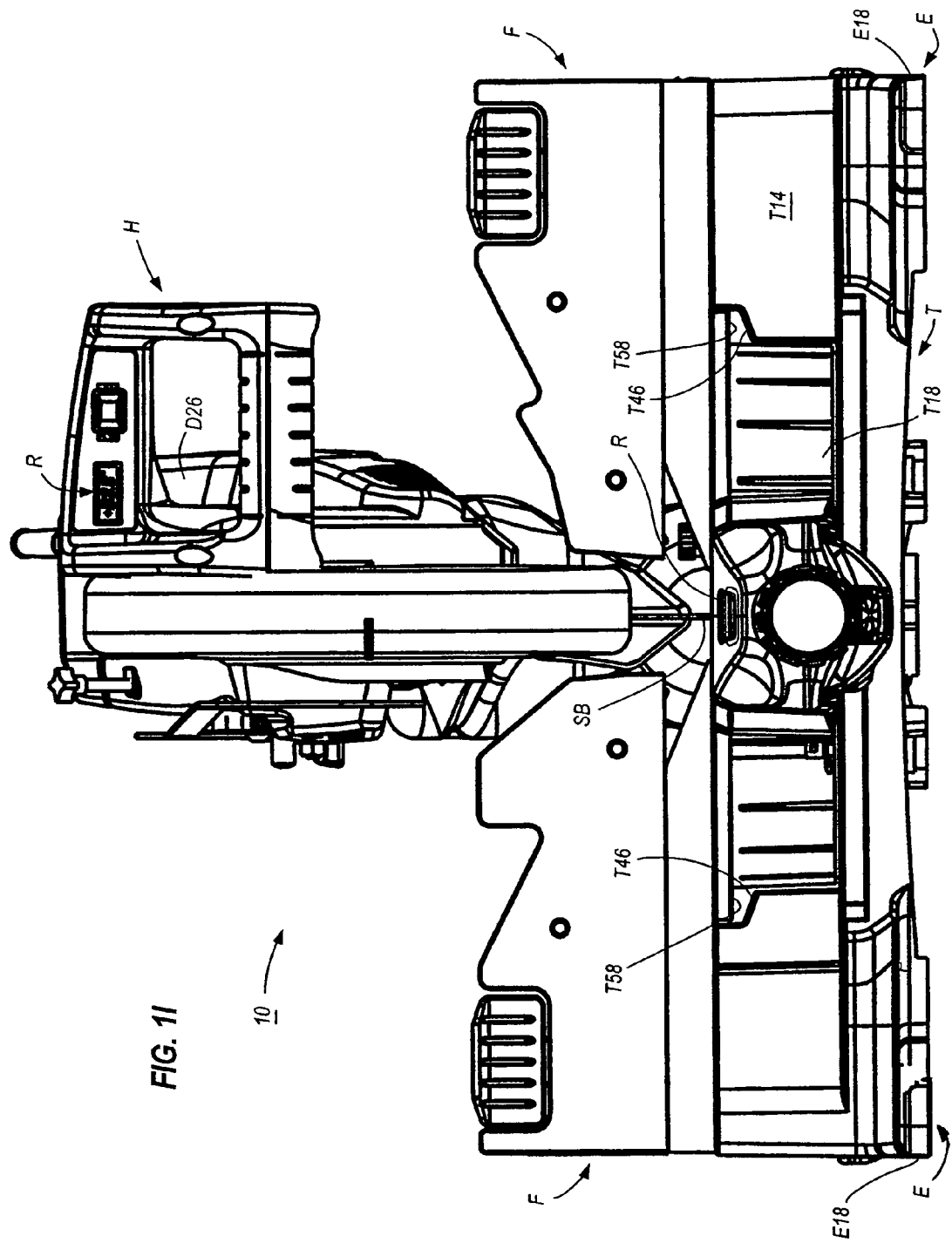
Figure 1J:
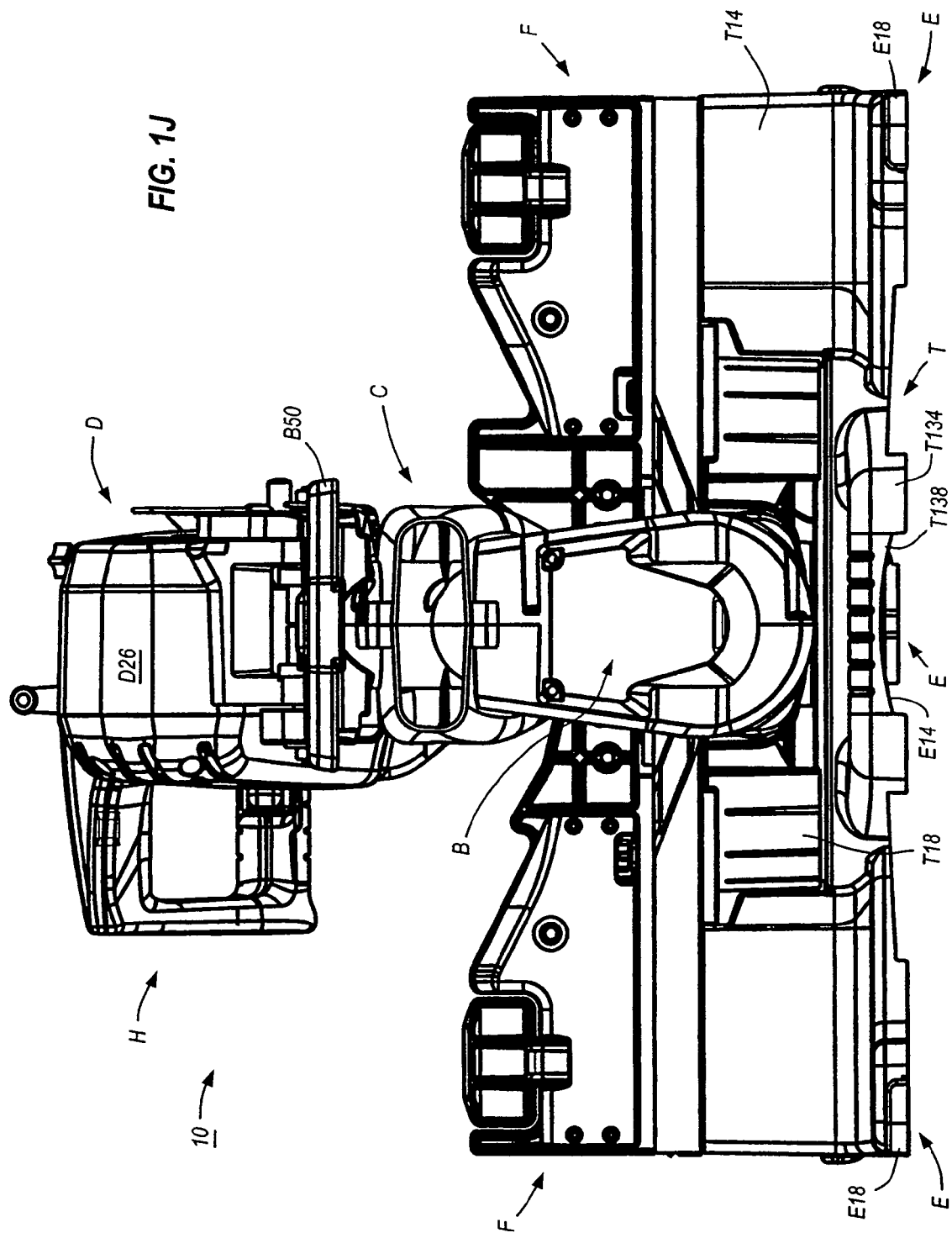
Figure 1K:
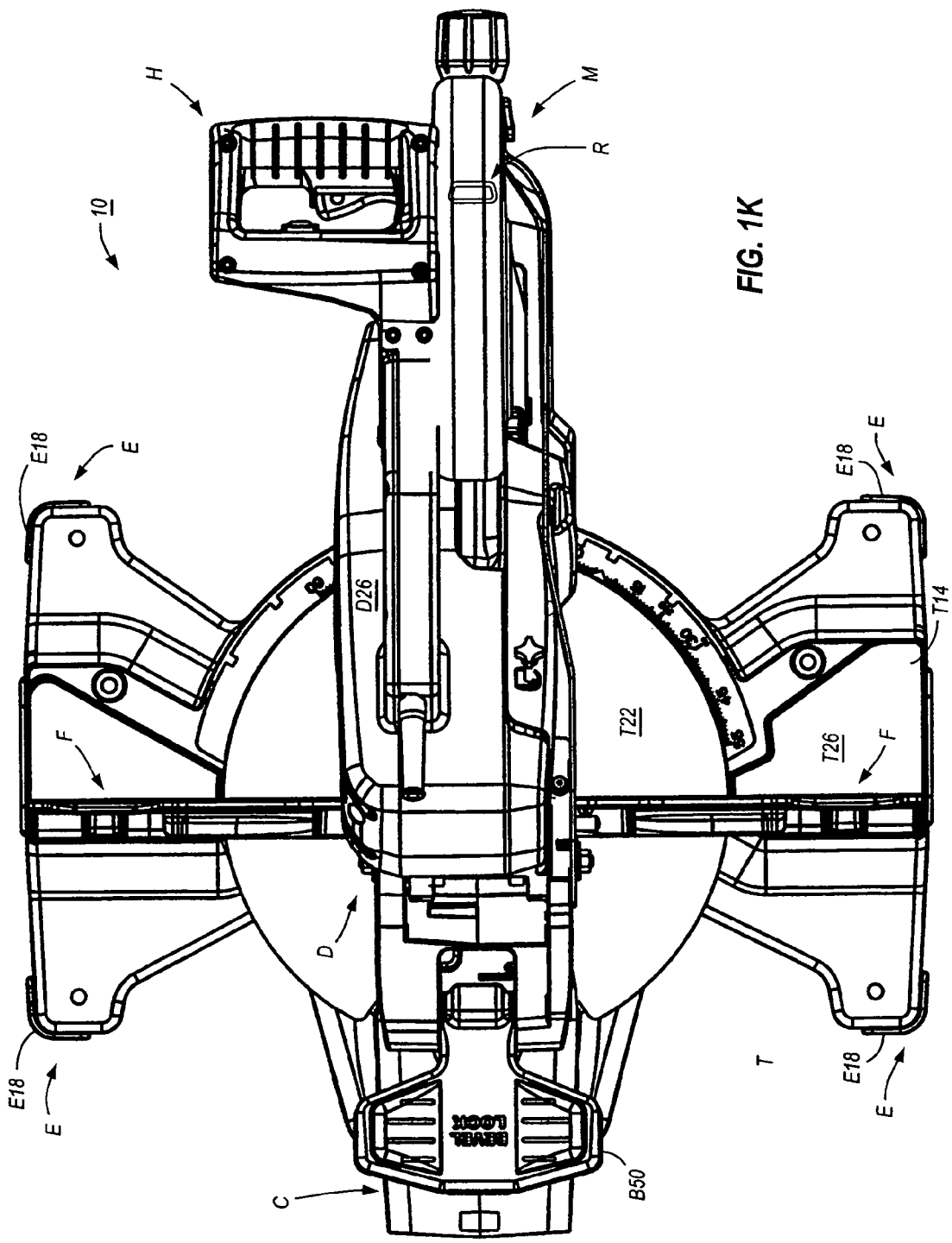
Figure 1L:
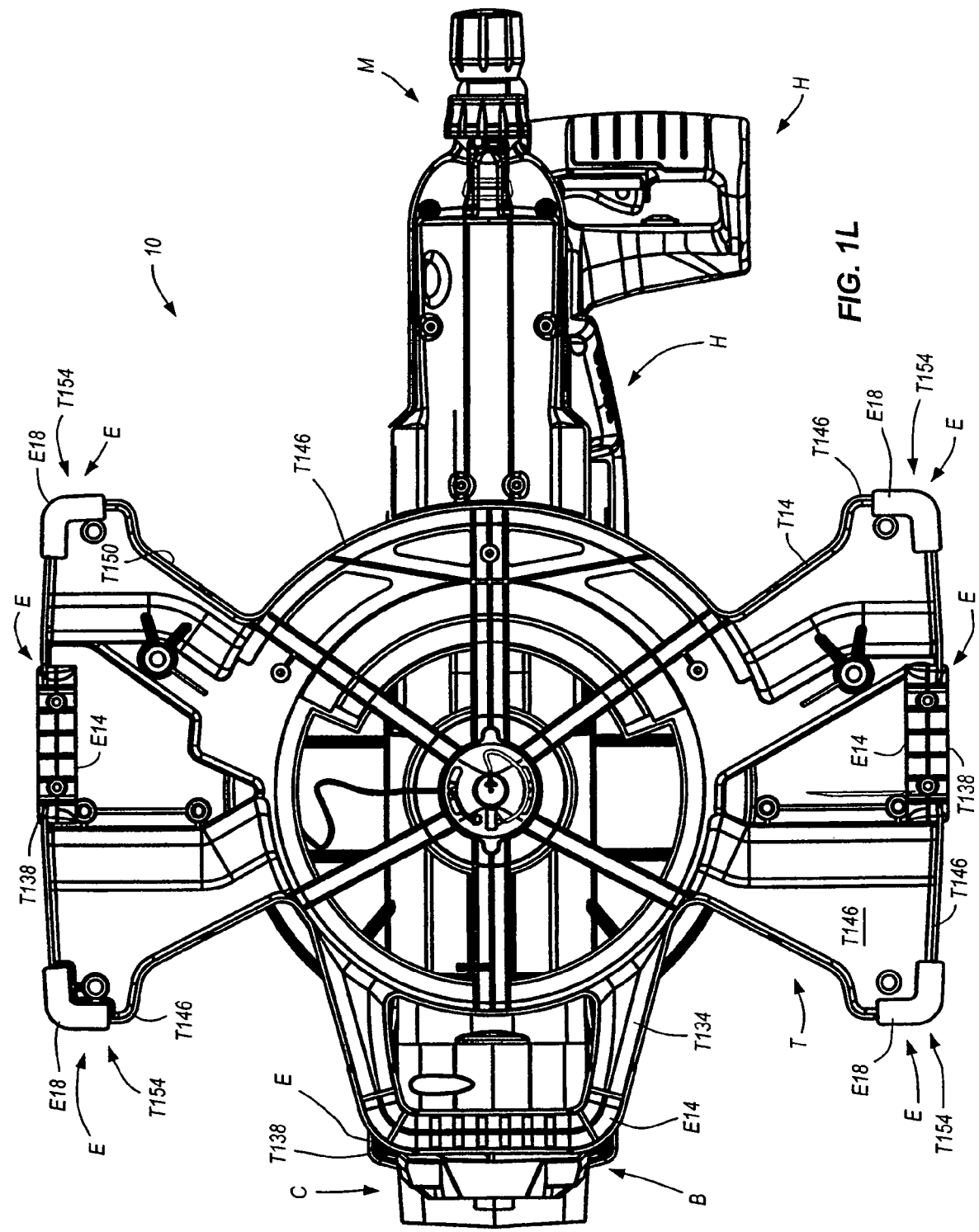
Figure 2A:
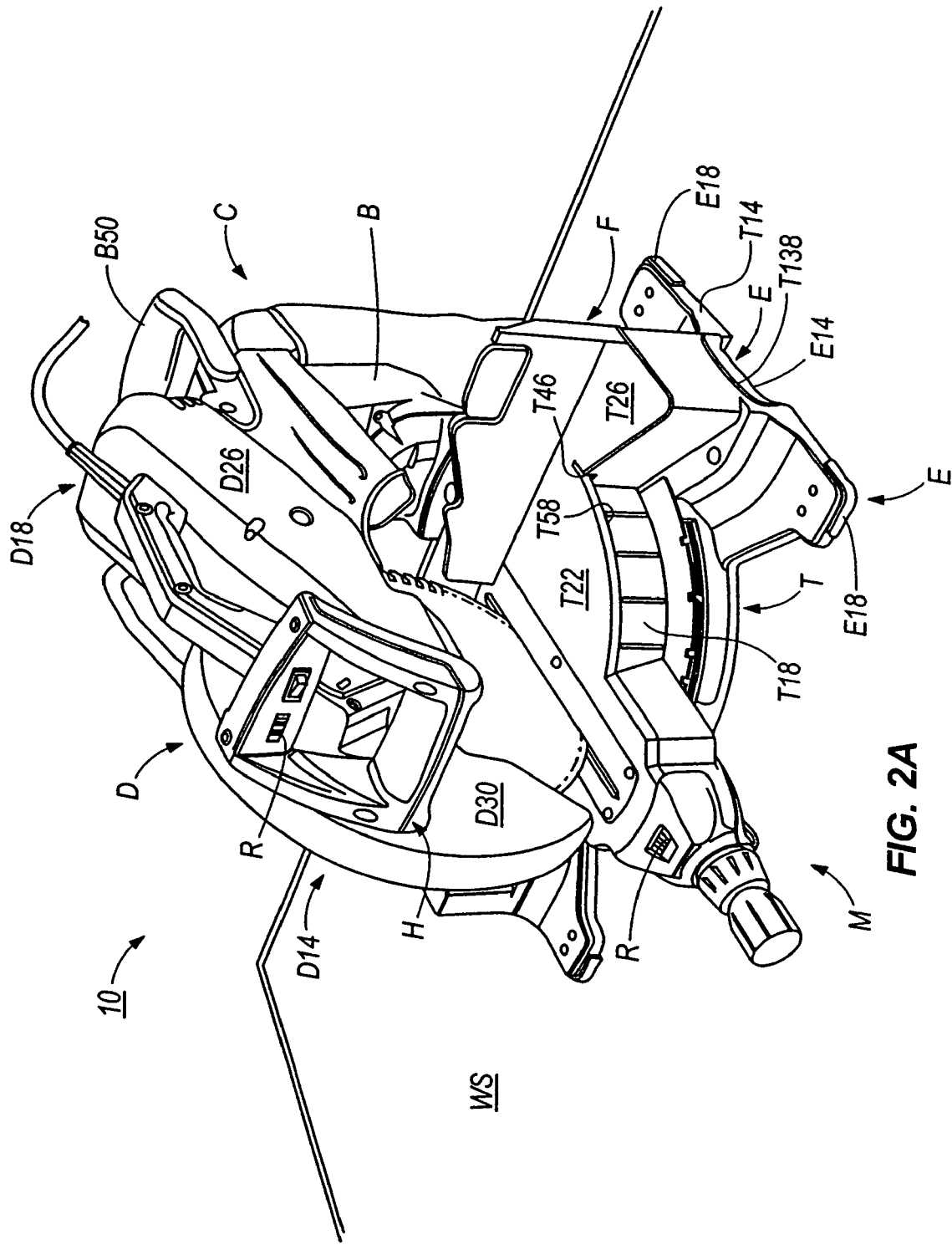
Figure 2B:
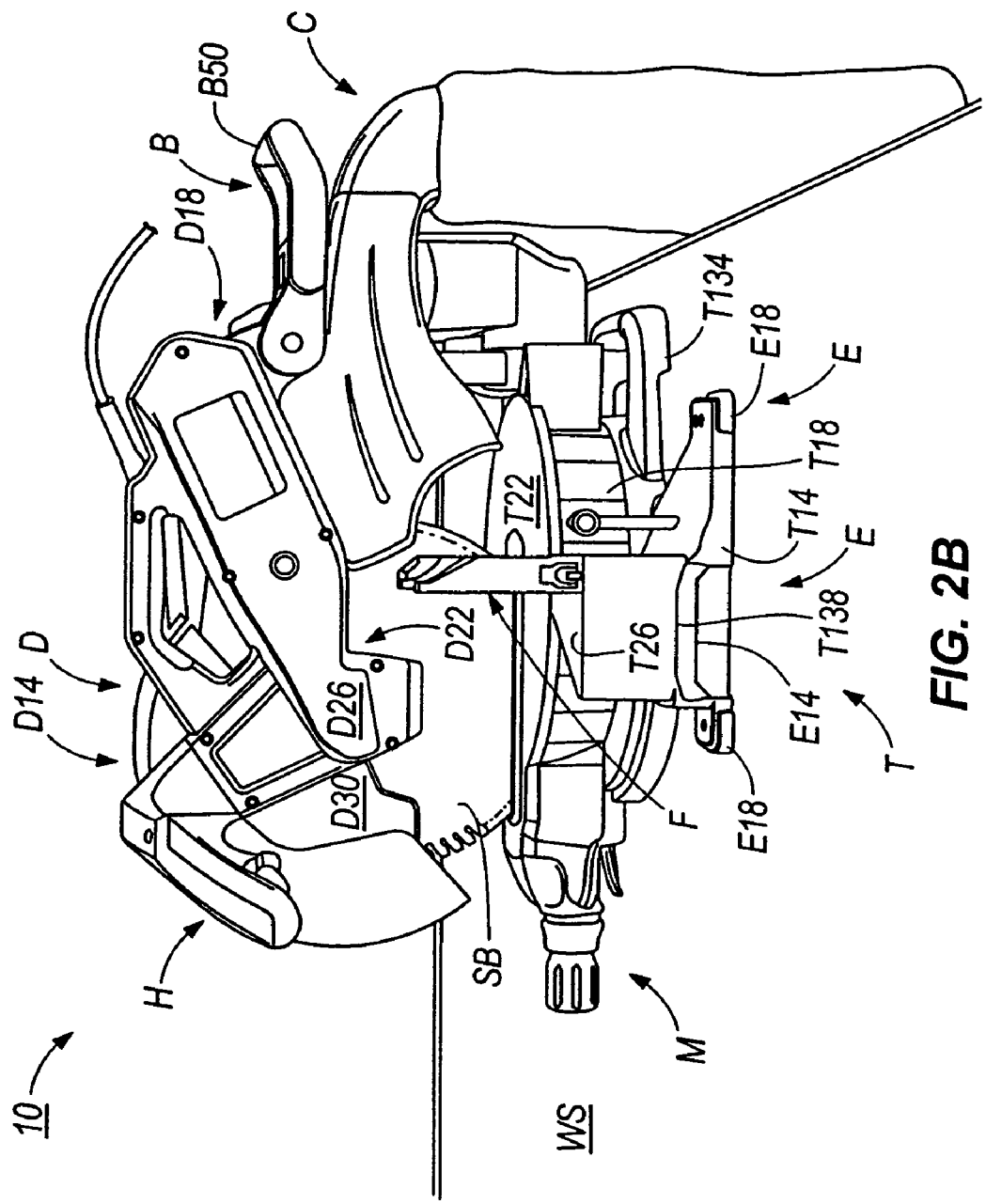
Figure 2C:
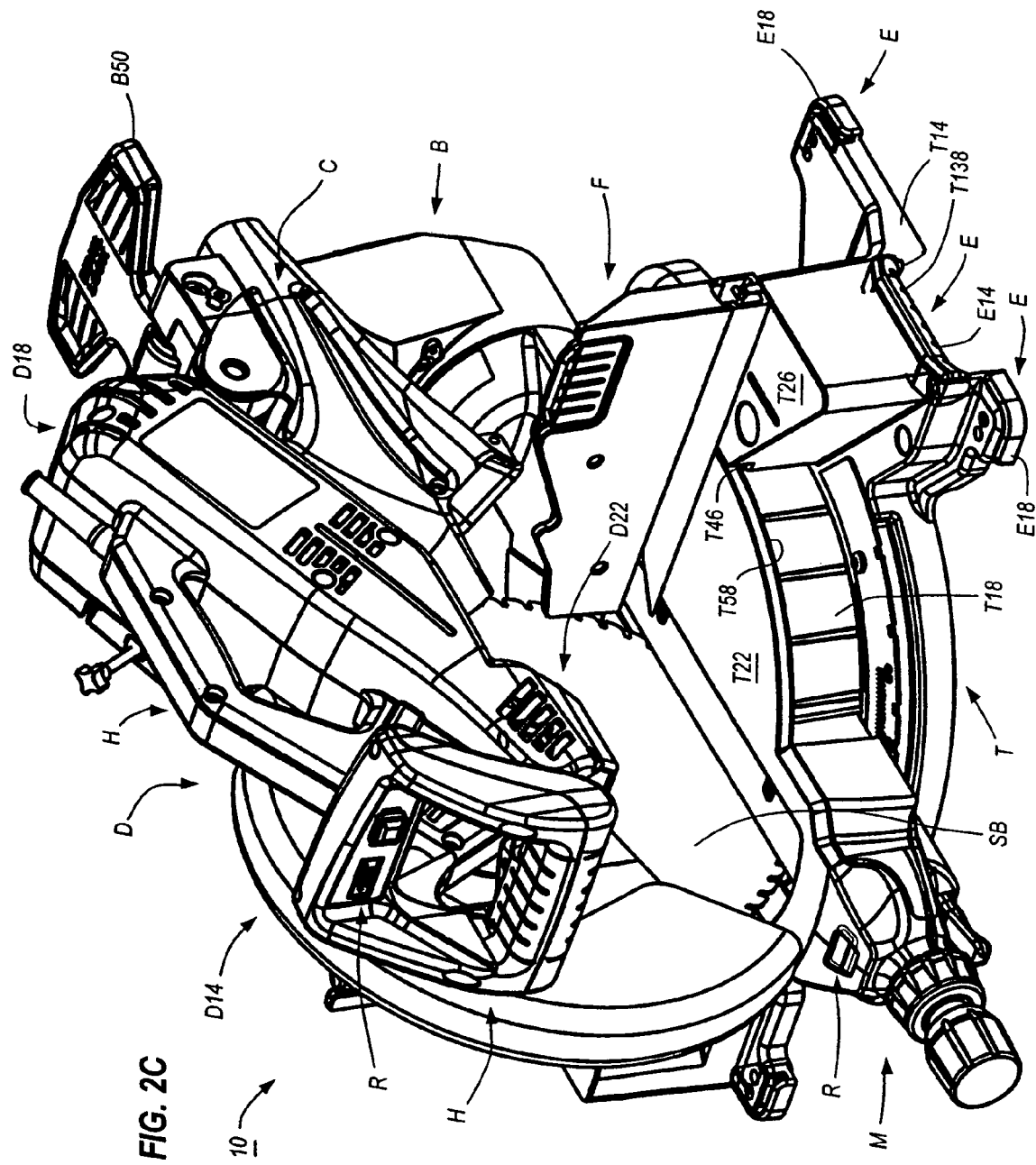
Figure 2D:
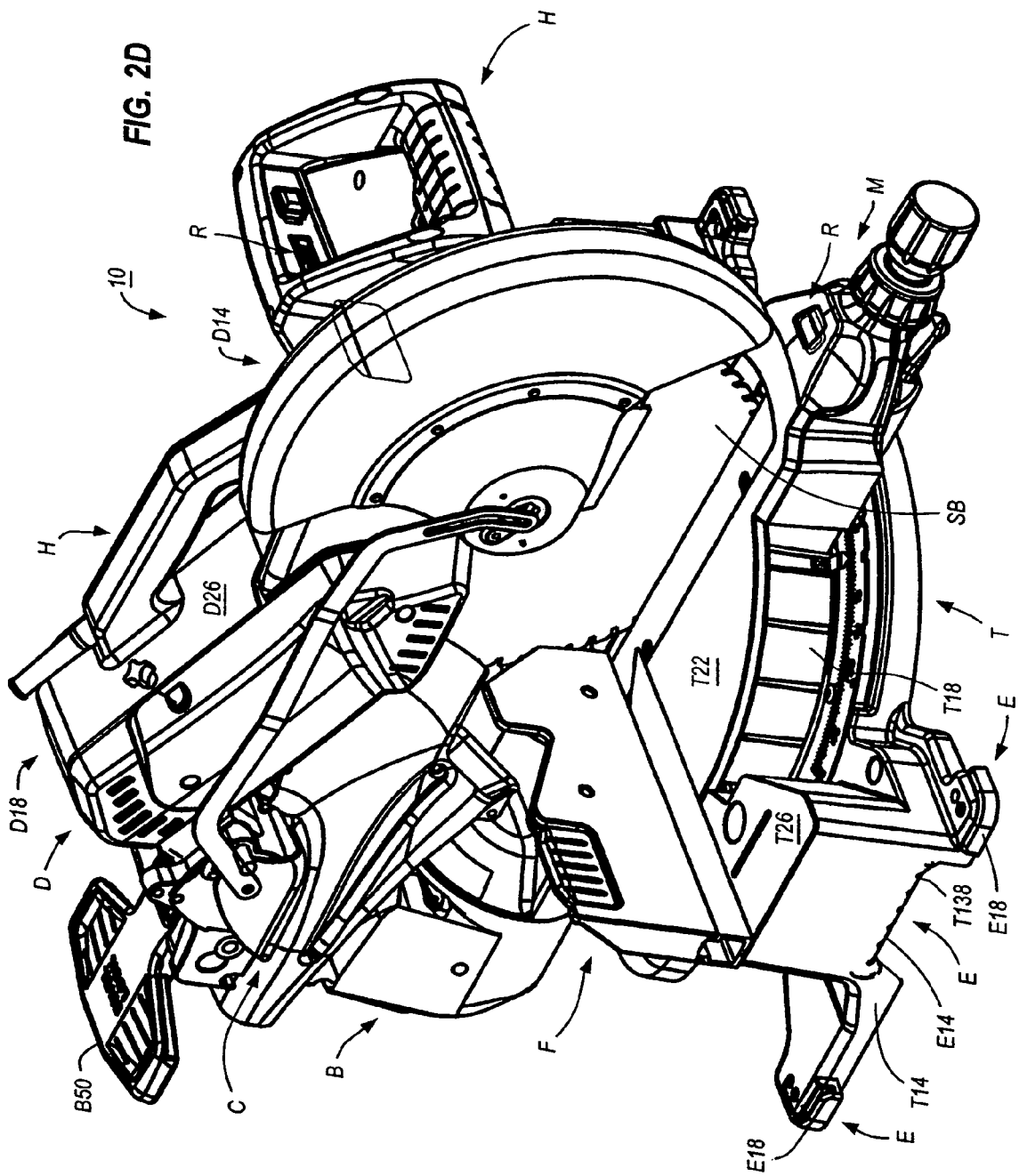
Figure 2F:
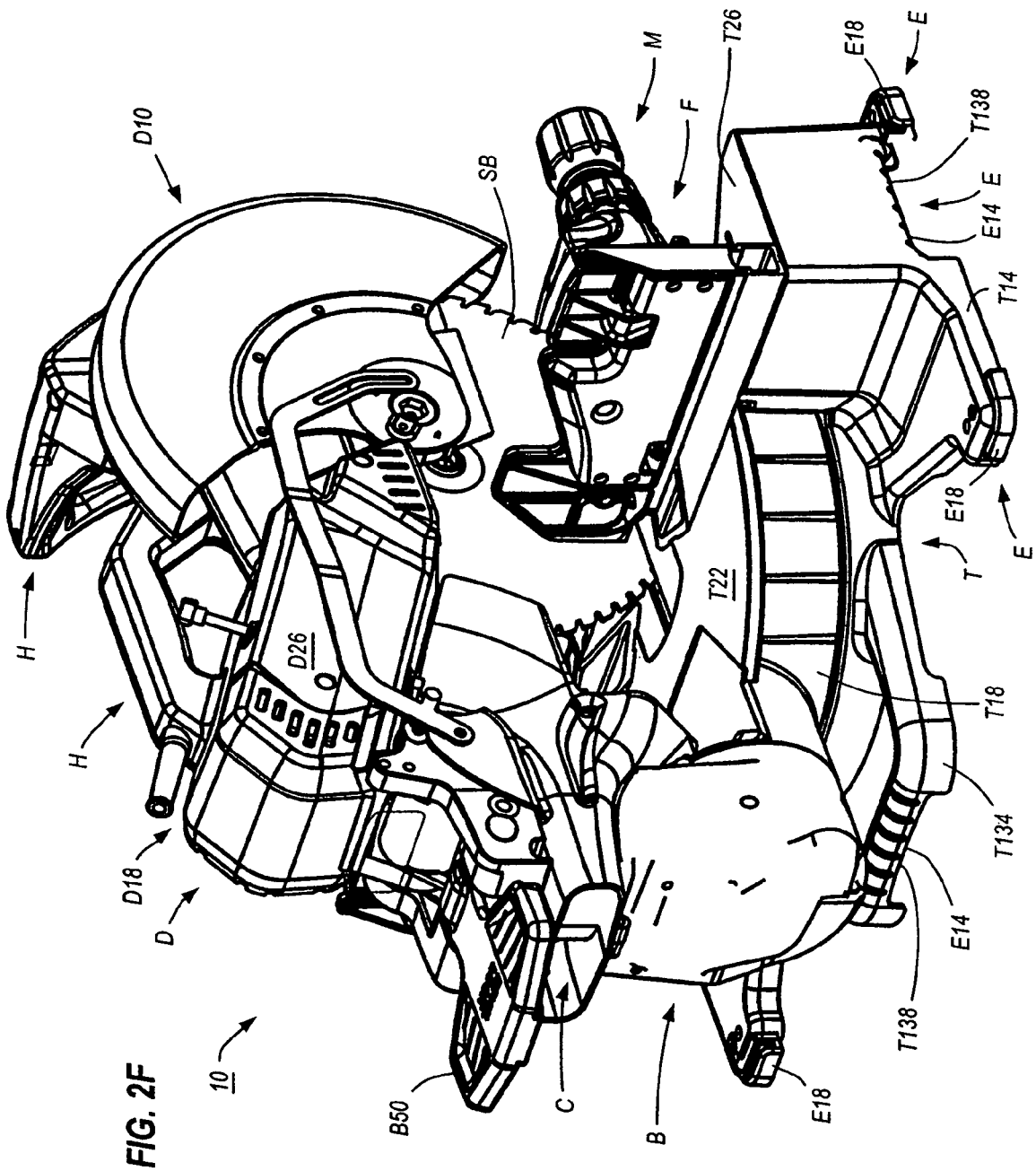
Figure 2H:
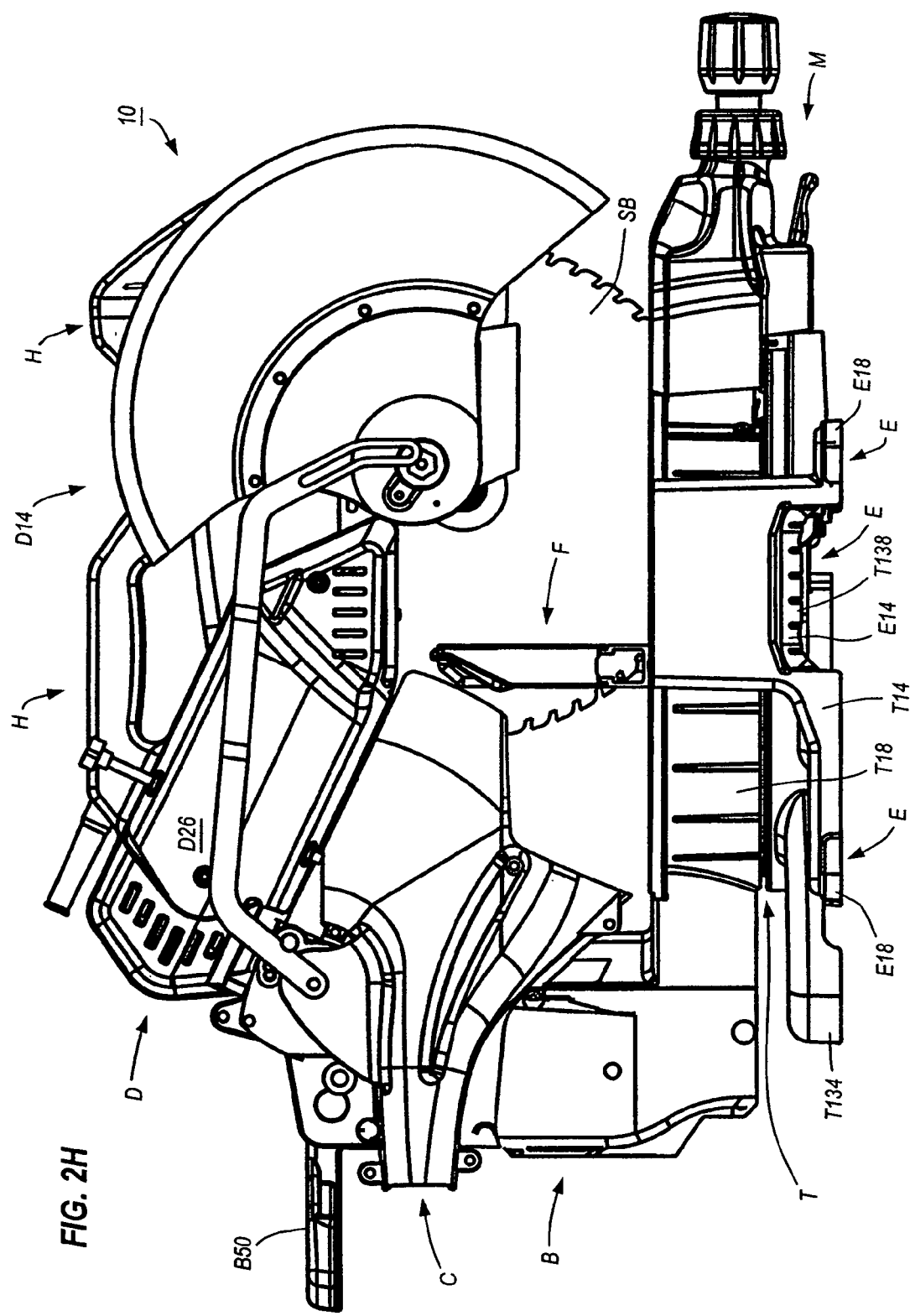

The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

Constructions of a power tool or saw 10, such as a chop saw, a miter saw, a sliding saw, a compound miter saw, etc., embodying one or more independent aspects of the invention are illustrated in the figures.

General

Constructions of a saw 10, such as a chop saw, a miter saw, a sliding saw, a compound miter saw, a sliding compound miter saw, etc., embodying independent aspects of the invention are illustrated in FIGS. 1A-1H, 2A-2M, 3A-3B, 4A-4B and 5A-5M.

Generally, as discussed below in more detail, the saw 10 may include a base and table assembly T including a base T14 and a table T18 for supporting a work piece WP. The saw 10 may include a drive assembly D operable to drive a saw blade SB to cut a work piece WP supported on the base and table assembly T. The drive assembly D may include a saw unit D14 (including the saw blade SB), a motor D18 and a drive train D22 operable to drive the saw blade SB.

In some independent aspects and in some constructions, the saw 10 may include a fence assembly F supported by and cooperating with the base and table assembly T to support the work piece WP. In some independent aspects and in some constructions, the saw 10 may include a dust collection assembly C for collecting debris, dust, etc. generated by the saw blade SB cutting the work piece WP.

In some independent aspects and in some constructions, the saw 10 may include a miter angle adjustment assembly M providing for adjustment of the angle of the saw blade SB relative to the work piece WP about a generally vertical axis T30. In some independent aspects and in some constructions, the saw 10 may include a bevel angle adjustment assembly B providing for adjustment of the angle of the saw blade SB relative to the work piece WP about a generally horizontal axis B18. In some independent aspects and in some constructions, the saw 10 may include a digital display arrangement or digital readout arrangement R for displaying information to a user (e.g., a relative position of a portion of the saw 10, such as the miter angle, the bevel angle, etc., information relating to the operation of the saw, such as motor speed, battery capacity, battery charging status, etc., historical information relating to the saw, such as number of cuts performed, warranty information, etc.).

In some independent aspects and in some constructions, the saw 10 may include a handle assembly H engageable by a user to adjust a relative position of at least a portion of the saw 10 (e.g., to move the saw unit D14 and the saw blade SB between the raised, non-cutting position and the lowered, cutting position, to adjust the miter angle, to adjust the bevel angle, to transport the saw 10, etc.). In some independent aspects and in some constructions, the saw 10 may include an elastomeric material E provided on surfaces of the saw 10 (e.g., carrying surfaces, gripping surfaces, support surfaces, protruding surfaces, etc.)

In some independent aspects and in some constructions, the saw 10 may include an illumination assembly L for illuminating an object (e.g., the work piece WP, the surface of the base and table assembly T, etc.), for indicating a cut-line, etc. In some independent aspects and in some constructions, a transport assembly TR is provided to assist the user in transporting to the saw 10 to, from and around a job site.

Base and Table Assembly T

In addition to FIGS. 1-5, FIGS. 6-12 illustrate constructions of a base and table assembly T. In the illustrated constructions, the base and table assembly T includes a base T14 supported on a work surface WS, such as a work bench, saw stand, etc., and a turntable or table T18 supported by the base T14. The table T18 includes a table surface T22, and the base T14 includes support surfaces T26 which are generally planar with the surface T22. The surfaces T22 and T26 cooperate to support a work piece WP.

In the illustrated constructions, the saw 10 is a miter saw, and the table T18 is coupled to the base T14 for pivoting movement about a generally vertical miter axis T30. As shown in FIGS. 1-5, the drive assembly D and saw blade SB are coupled to the table T18 for pivoting movement with the table T18 relative to the base T14 to allow the saw blade SB to perform various angled miter cuts on a work piece WP supported on the table T18 and/or on the base T14.

A connecting assembly T34 is provided to pivotally connect the table T18 and the base T14. The connecting assembly T34 generally defines the miter axis T30. A bearing assembly (not shown) is provided between the table T18 and the base T14.

The saw unit D14 and the saw blade SB are coupled to the table T18 for movement relative to the table T18 between a raised, non-cutting position (see FIG. 5A) and a lowered, cutting position (see FIG. 1A). In some constructions, the saw unit D14 and the saw blade SB may also be coupled to the table T18 for pivoting movement about a bevel axis B18 to allow the saw blade SB to perform bevel cuts on a work piece WP supported on the table T18 and/or the base T14.

The base T14 defines an opening T42 for receiving the table T18. Ledges or ridges T46 are provided adjacent to and below the associated support surfaces T26. The table T18 includes a top wall T50 and a side wall T54 depending from the top wall T50. In some constructions, the side wall T54 is spaced inwardly from the periphery of the top wall T50 to provide an annular rim T58. The side wall T54 is positioned in the opening T42 and may extend the full depth of the opening T42. The rim T58 is positionable above the ridges T46 which may provide support to the rim T58.

Vertical ridges T62 may be provided on the side wall T54, and contoured recesses (not shown) may be provided on the bottom surface of the rim T58 to provide a grip surface for a user's fingers (e.g., for carrying the saw, for holding a work piece WP, etc.).

Figure 3A:
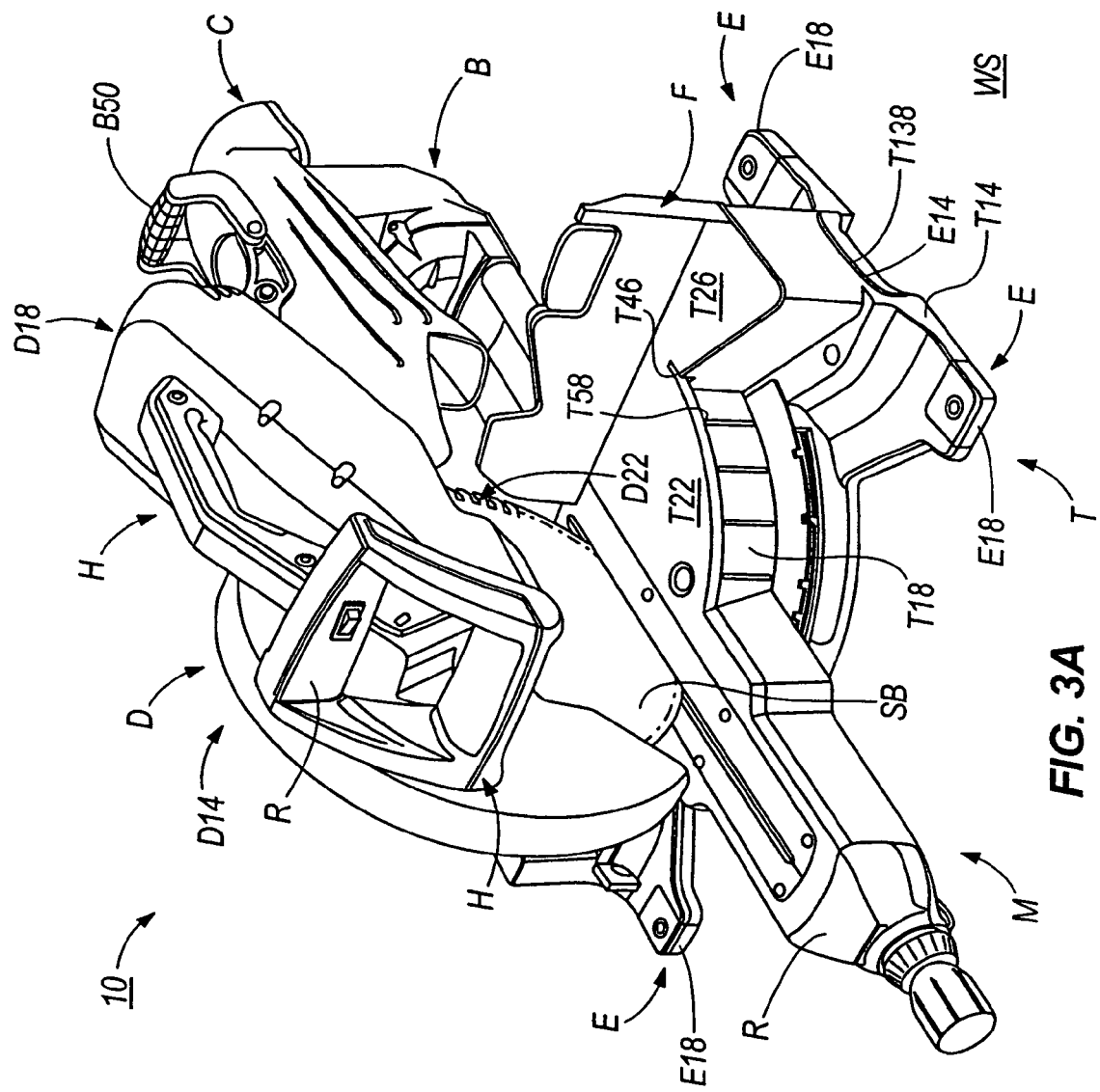
FIGS. 3A-3C are views of yet another construction of a saw, such as a sliding compound miter saw.
Figure 3B:
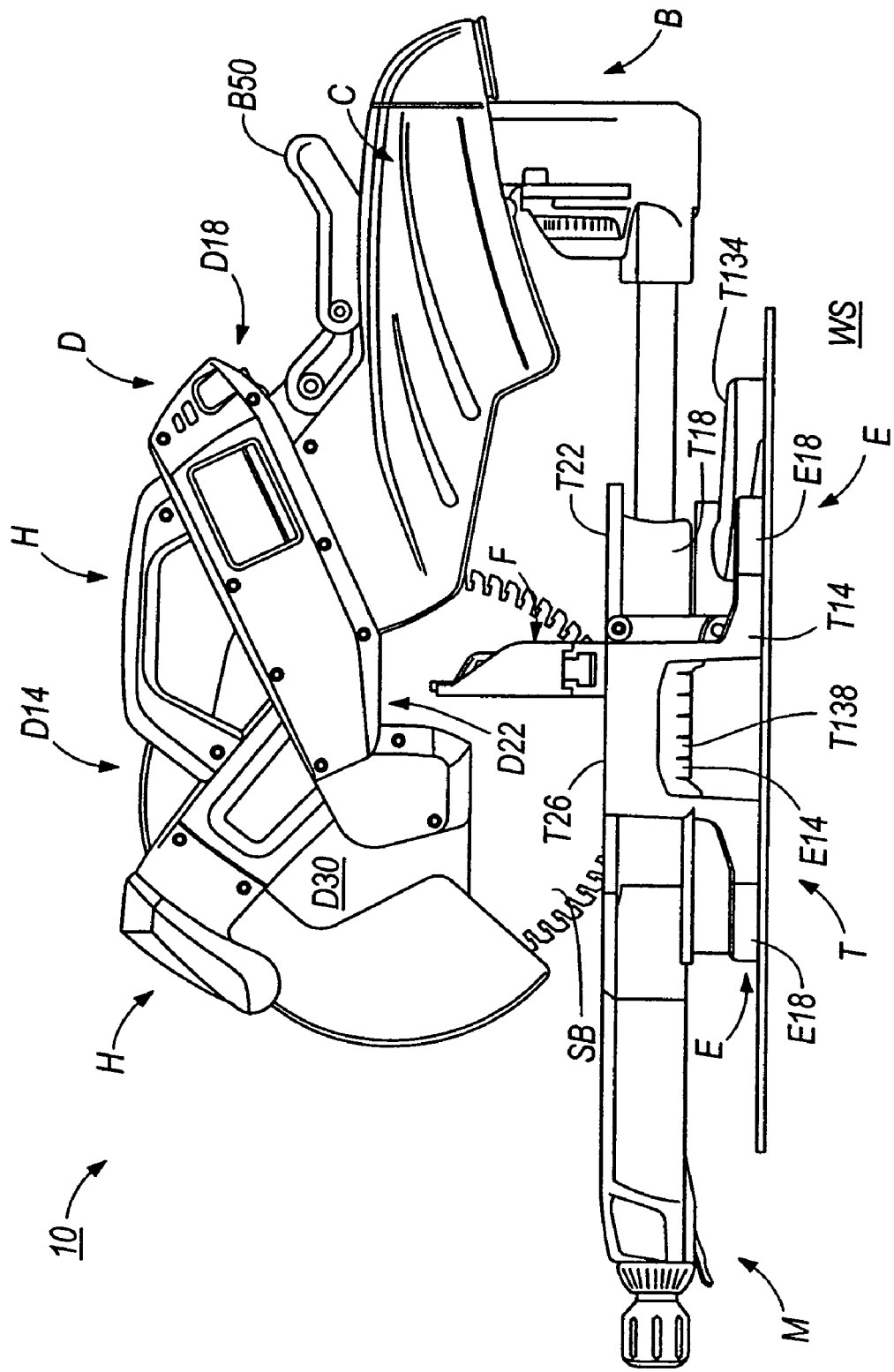
Figure 3C:
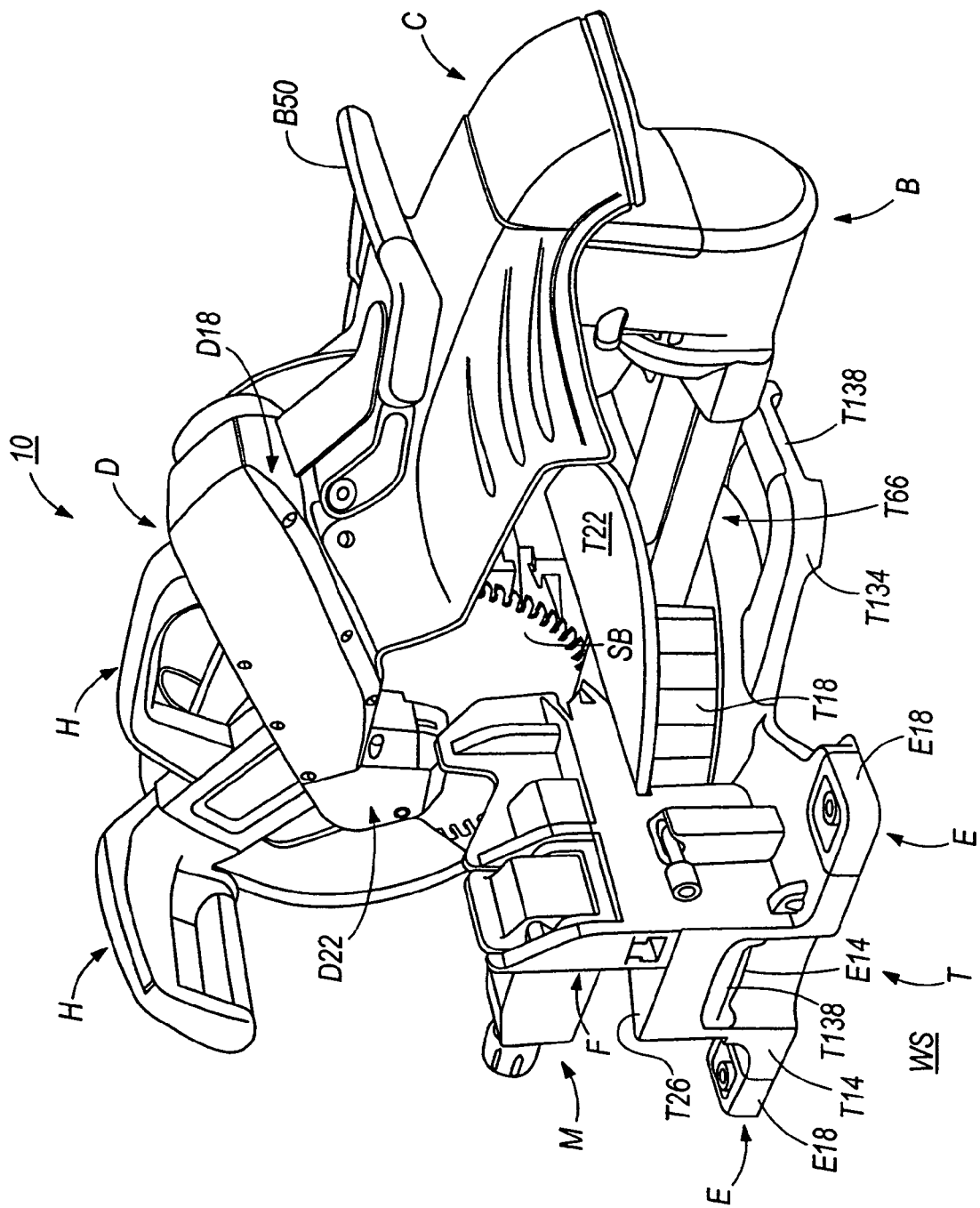
Figure 4A:
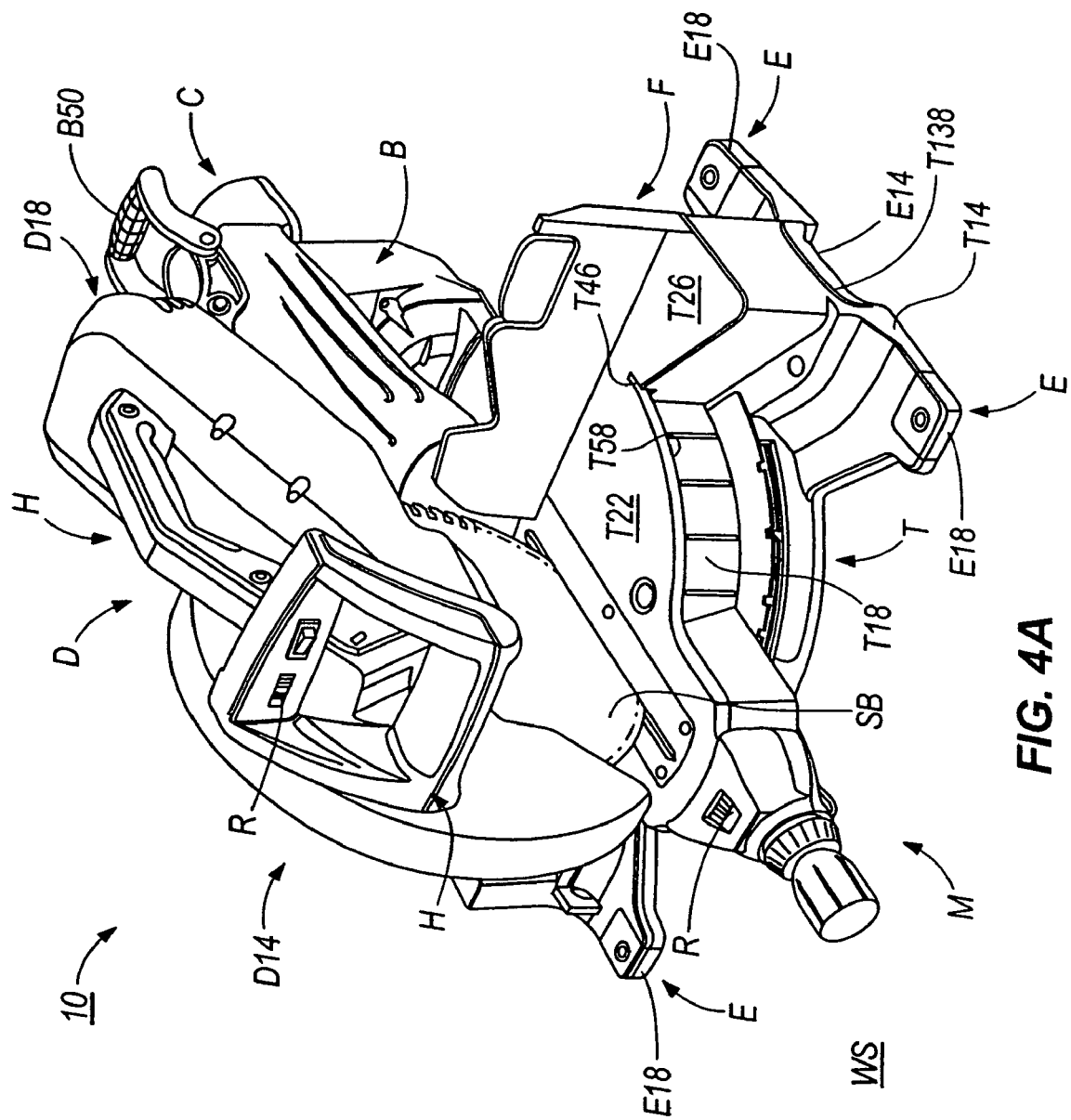
FIGS. 4A-4B are views of a further construction of a saw, such as a compound miter saw.
Figure 4B:
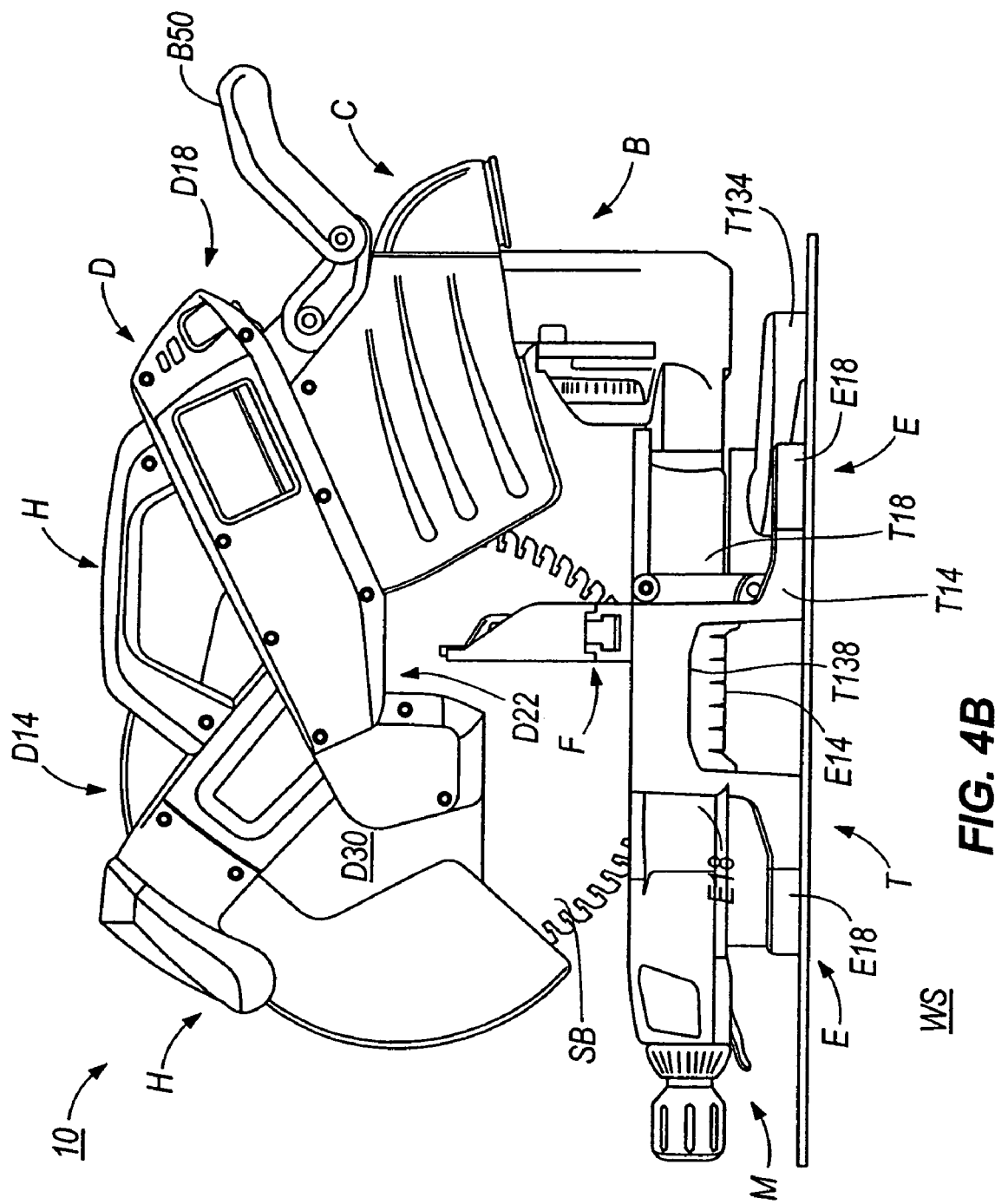

With continued reference to FIGS. 1, 3 and 5, and with additional reference to FIGS. 7-12, the illustrated saw 10 may be a sliding saw, and, in such constructions, the saw unit D14 is coupled to the table T18 for generally linear sliding movement by a sliding support assembly T66. In the illustrated construction, the sliding support assembly T66 generally includes support or slide tubes T70 supported for sliding movement relative to the table T18 along an axis generally parallel to the bevel axis B18 and for pivoting movement with the table T18 relative to the base T14. The saw unit D14 is supported by the slide tubes T70 for movement with the slide tubes T70 relative to the table T18.

In the illustrated construction of the saw 10, the slide tubes T70 are located below and in a common horizontal plane oriented substantially parallel with the plane of the surface T22 of the table T18. The side wall T54 of the table T18 defines an open circumferential space T74 to the rear and a forward tongue portion T78. The space T74 and the tongue portion T78 accommodate sliding movement of the slide tubes T70 between a forward position (shown in FIG. 1), in which the slide tubes T70 at least partially extend into the tongue portion T78, and a rearward position (shown in FIG. 3), in which the slide tubes T70 project to a greater extent through the space T74. In some constructions, such as that shown in FIGS. 7-10, the space T74 may be relatively large (e.g., extending about 180 degrees). In other constructions, such as that shown in FIGS. 12A-12B, the space T74 is relatively narrow.

The slide tubes T70 are slidably supported in the table T18 by linear bearing assemblies T82. In the illustrated construction, the sliding support assembly T66 also includes a sub-table T86 which cooperates with the table T18 as a "clam-shell" to hold the bearing assemblies T82 and which can be pivotally mounted to the base T14. The sub-table T86 may include a side wall T90 extending upwardly from the base T14 and at least partially closing a relatively large space T74 (as shown in FIGS. 7-10) to cooperate with the table T18 to substantially enclose components within the base and table assembly T (e.g., the bearing assemblies T38, T82, etc.).

In some constructions, such as that shown in FIGS. 7-10, the sub-table T86 may provide an open cup shape with channels T92 for the bearing assemblies T82 and/or slide tubes T70. In other constructions, such as that shown in FIGS. 12A-12B, the sub-table T86 may provide a relatively tight fit sandwiching the bearing assemblies T82 and/or slide tubes T70 to the table T18.

Figure 12A:
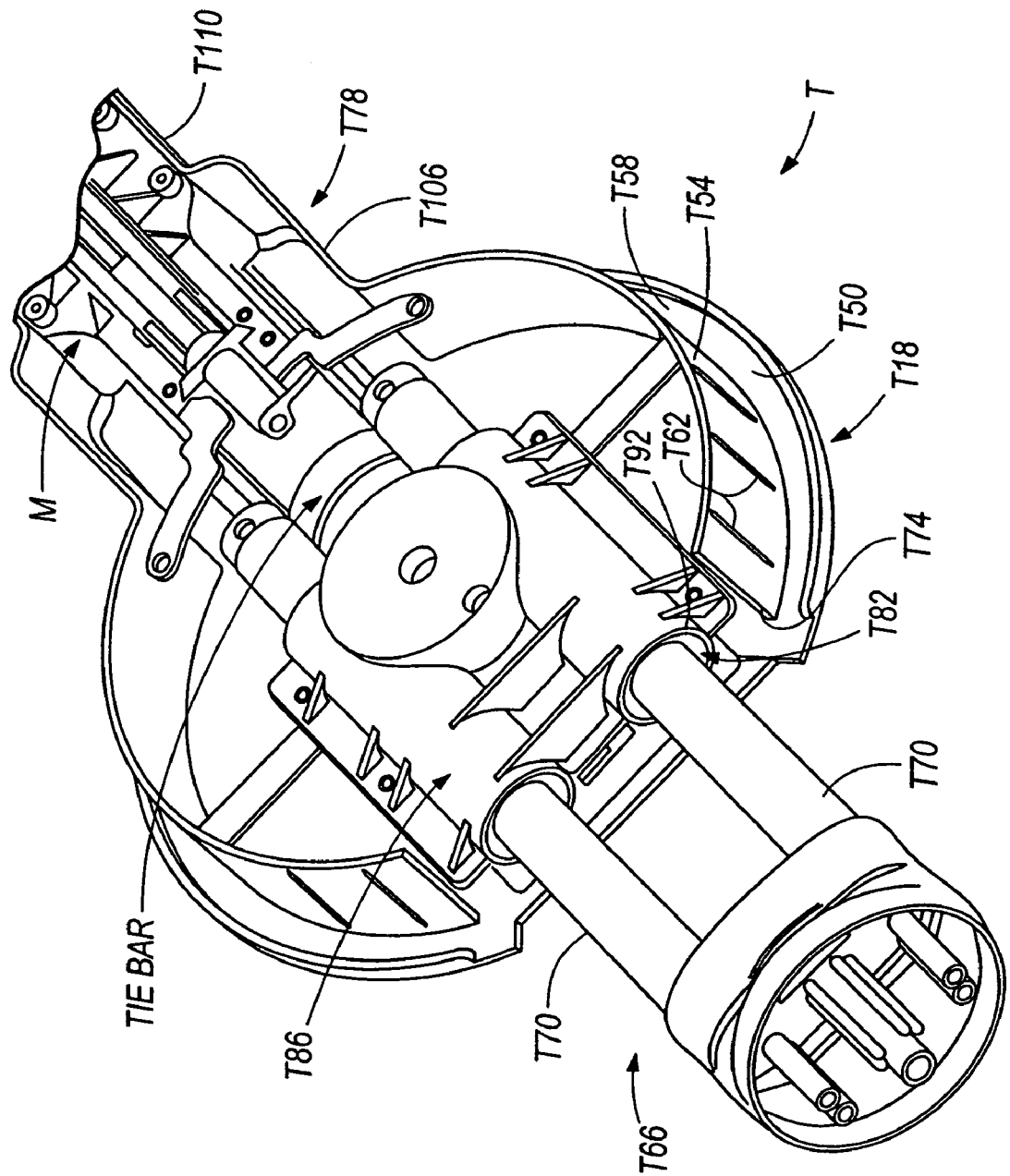
FIGS. 12A-12B are perspective views of yet another construction of a portion of a saw and illustrating a table assembly.
Figure 12B:
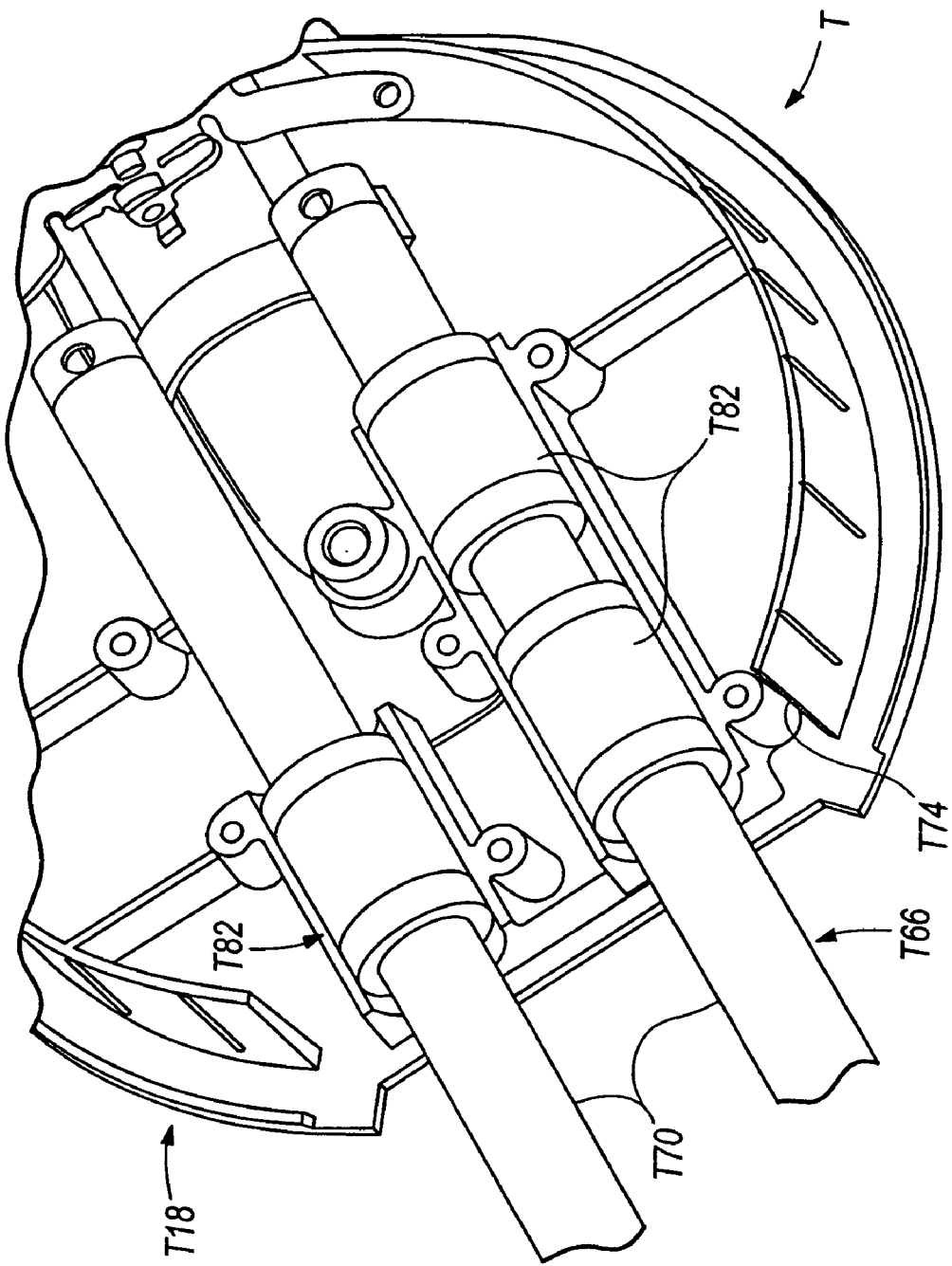

As shown in FIGS. 12A-12B, the bearing assemblies T82 may be at least partially located outside of the side wall T54 of the table T18, and the connecting assembly T34 defining the miter axis T30 may be located inside of the side wall T54 of the table T18 and the sub-table T86.

In some constructions, such as that shown in FIGS. 11A-11B, radial support ribs T98 may be provided between the inner side wall T54 and the top wall T50. Also, a relatively short peripheral wall T102 may depend from the periphery of the top wall T50. In some constructions, the support ribs T98 extend between the peripheral side wall T102 and the inner side wall T50 to provide support to the rim T58.

As shown in FIG. 12A, the tongue portion T78 may have a wider portion T106 accommodating movement of the slide tubes T70 and a narrower, stepped-down or necked-down portion T110 accommodating components of the miter adjustment assembly M. A slide locking assembly T114 may be provided to releasably lock the slide tubes in a position relative to the table T18.

In other constructions (not shown), the side wall T54 may be slanted or non-vertical. In yet other constructions (not shown), a side wall may extend upwardly from the base T14 to close a portion of the opening T42.

In further constructions (not shown), a shorter side wall may extend upwardly from the base T14, and a relatively short side wall may depend from the table T18. A gap or slot may be provided between the side walls to accommodate pivoting movement of the slide tubes T70. In such constructions, a flexible material, such as a brush, a curtain, etc. may be provided in the gap/slot between the side walls of the table T18 and the base T14. The slide tubes T70 would be able to pivot with the table T18 through the flexible material, and the flexible material would limit entry of debris into the gap or slot.

In other constructions (not shown), no side wall may be provided between the table T18 and the base T14.

In other constructions, the sliding support assembly T66 may include slide tubes (not shown) configured and/or oriented in other ways. For example, the support tubes may be mounted above the plane of the surface T22 (e.g., i) support tubes mounted in a vertical orientation relative to the plane of the surface T22, ii) support tubes mounted in a horizontal orientation relative to the plane of the surface T22, iii) support tubes mounted in an oblique orientation relative to the plane of the surface T22, etc.).

Figure 21:
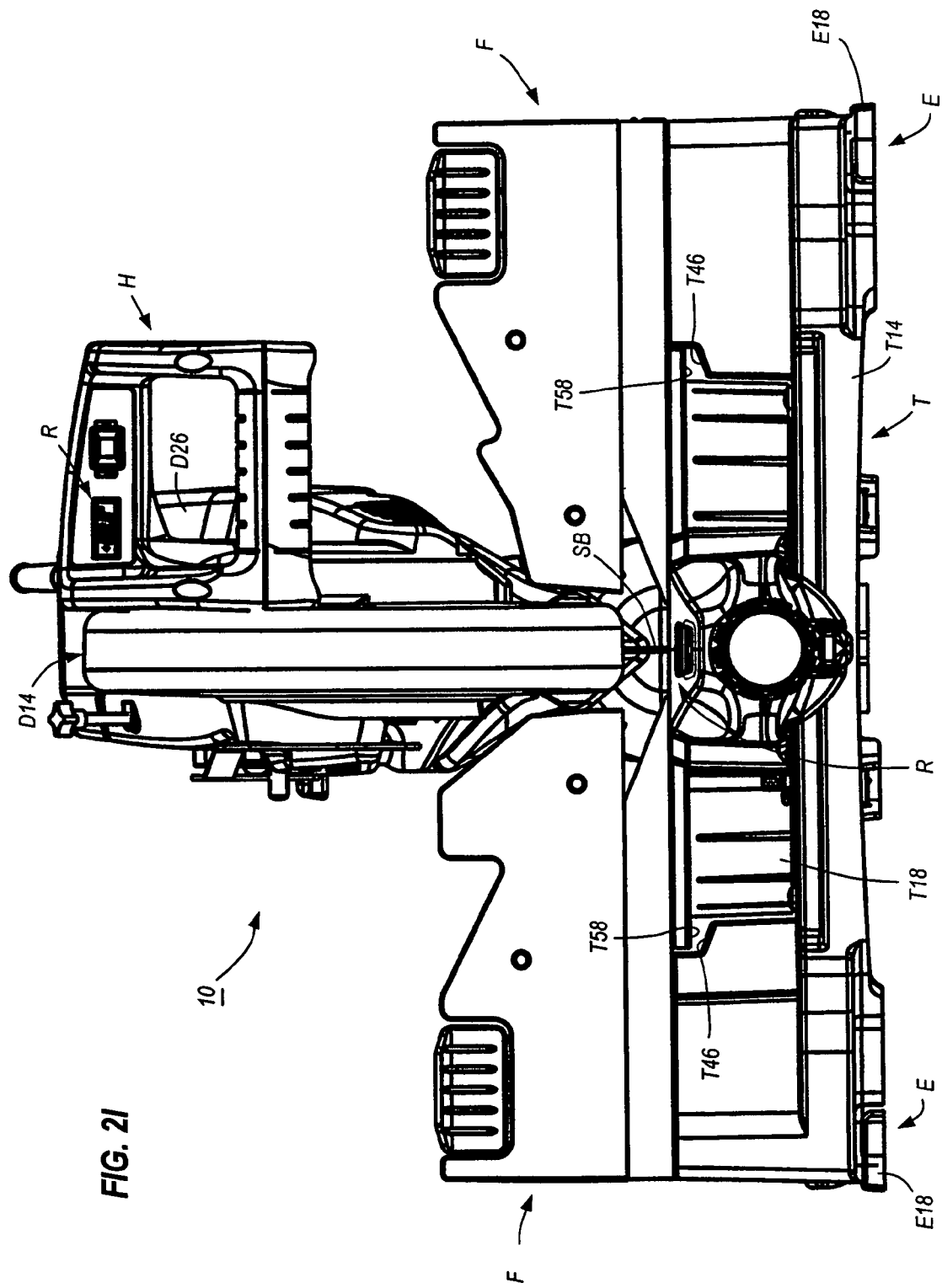
FIGS. 21A-21B are cross-sectional views of a portion of a saw and illustrating a motor assembly mounted within a slide tube.
Figure 5C:
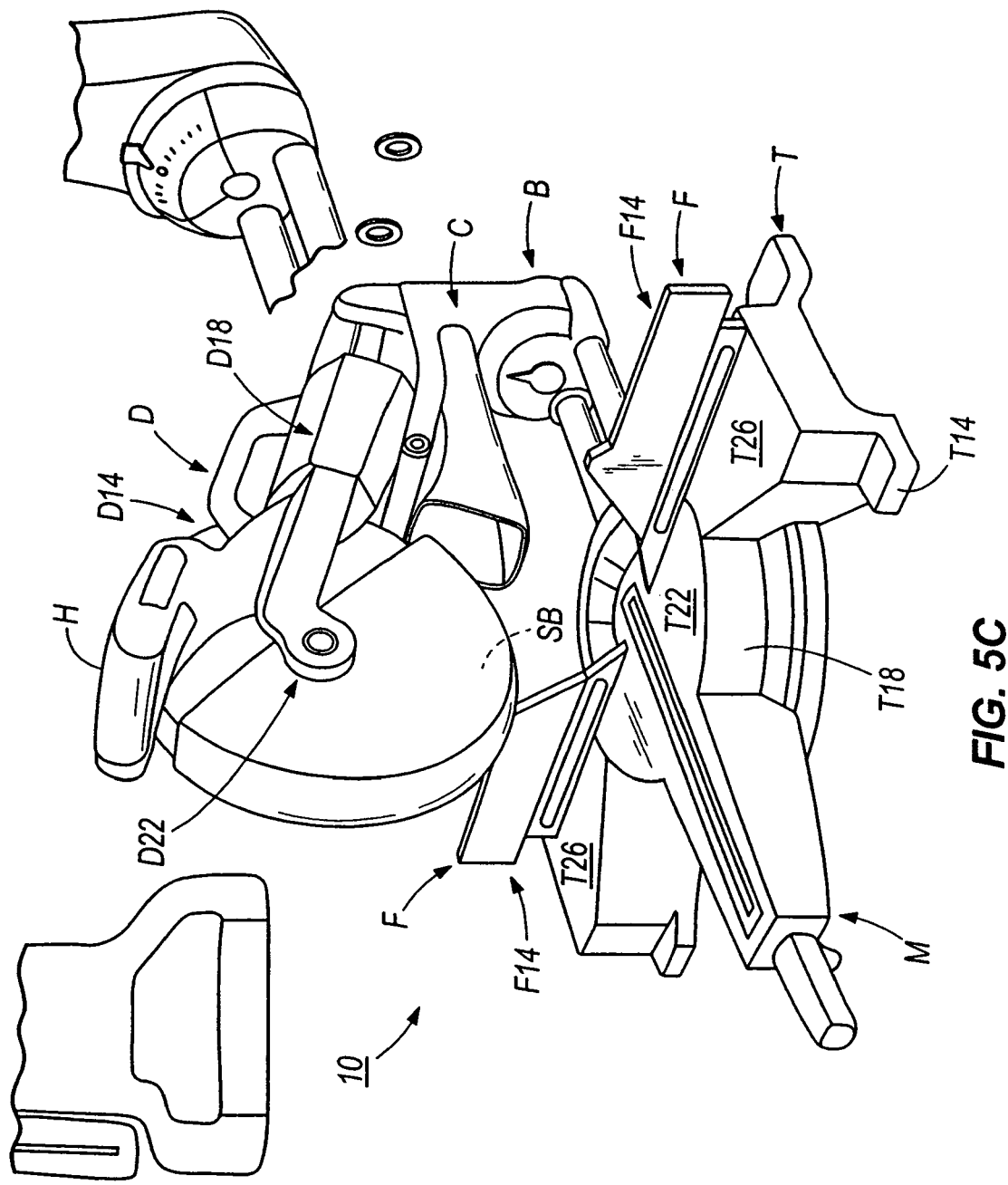
Figure 5D:
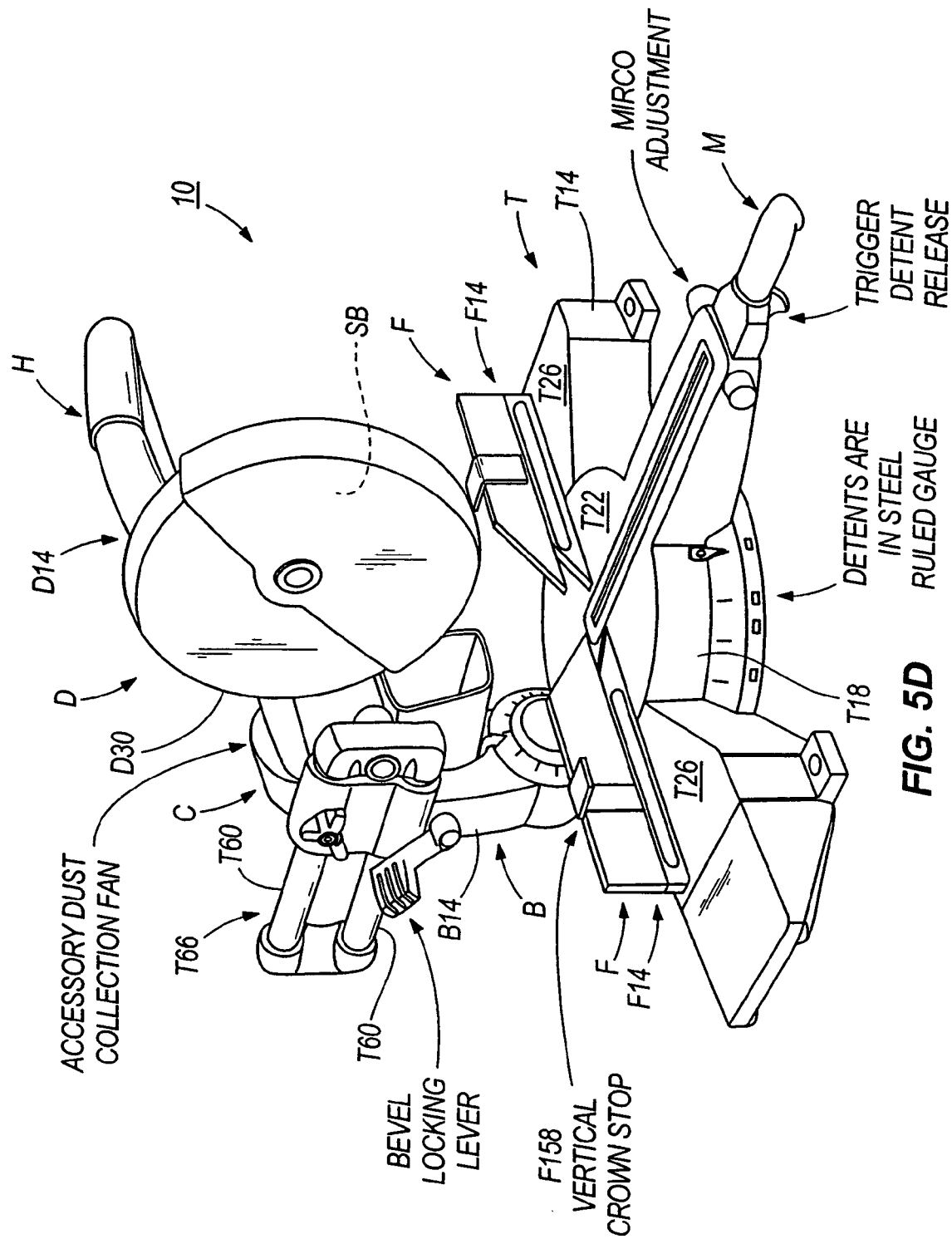

FIG. 5D illustrates a sliding miter saw 10 including an above-the-table sliding support assembly T66. In the illustrated construction, the assembly T66 includes support tubes T60 connected to the saw unit D14 and slidably supported by an arm, such as a bevel arm B14. FIG. 21A illustrates another construction of a miter saw including an above-the-table sliding support assembly T66.

In other constructions (not shown), the sliding miter saw 10 may include support tubes that are fixed to a base and table assembly T and a saw unit D14 that is slidably movable along the support tubes. In some constructions, the support tubes may project toward the front of the base and table assembly T (i.e., the tubes are supported at the rear of the base and table assembly T) and slide into the saw unit D14 (e.g., i) support tubes mounted in a vertical orientation relative to the plane of the surface T22, ii) support tubes mounted in a horizontal orientation relative to the plane of the surface T22, iii) support tubes mounted in an oblique orientation relative to the plane of the surface T22, etc.).

In some constructions (not shown), the support tubes may project toward the rear of the base and table assembly T (i.e., the tubes are supported at the front of the base and table assembly T) and slide into the saw unit D14 (e.g., i) support tubes mounted in a vertical orientation relative to the plane of the surface T22, ii) support tubes mounted in a horizontal orientation relative to the plane of the surface T22, iii) support tubes mounted in an oblique orientation relative to the plane of the surface T22, etc.).

Figure 5E:
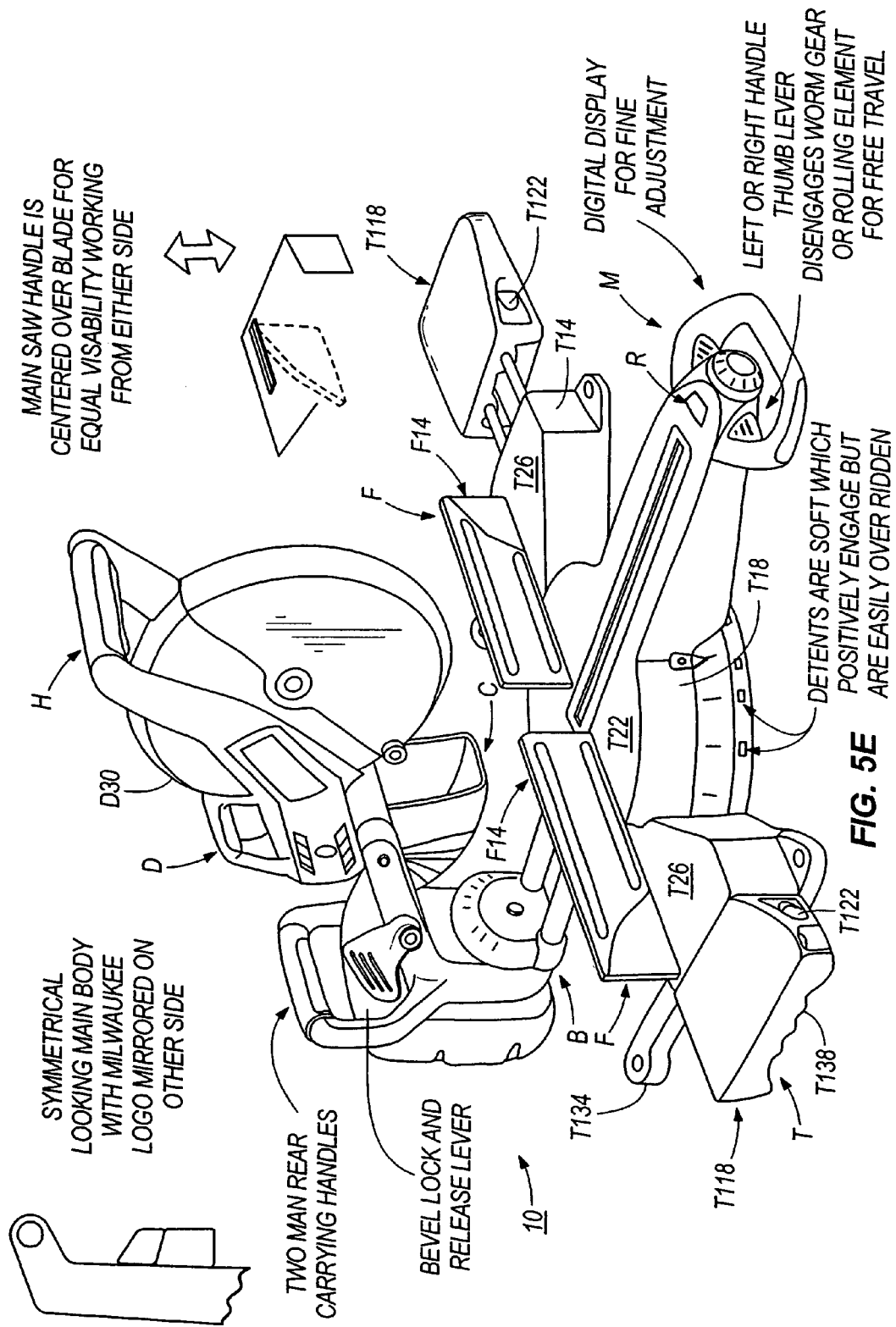
Figure 5F:
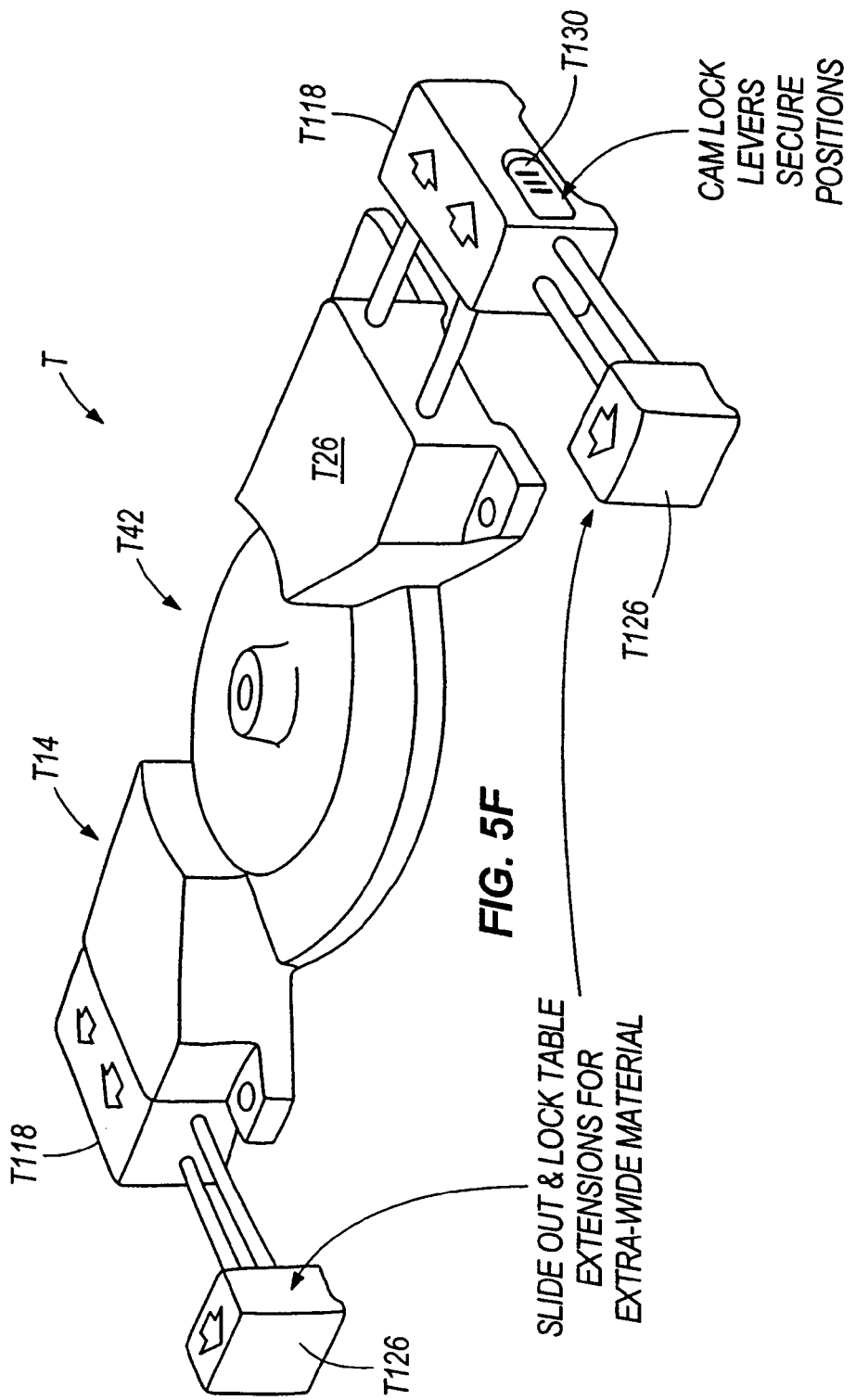

As shown in FIG. 5E-5F, the saw 10 may include movable work support assemblies. Lateral movable work support assemblies T118 may be movably supported by the base T14 and may telescope laterally out of the base T14 to extend the lateral length of the base T14 and support a relatively long work piece WP. The movable work support assemblies T118 may be movably supported by the base T14 or may be movable relative to but not removable from the base T14.

The base T14 and/or the movable work support assemblies T118 may include a locking arrangement T122 to lock the movable work support assemblies T118 in a position relative to the base T14. The locking assembly T122 may include a quick-locking assembly, such as, for example, a cam-locking assembly, to the secure the position of the movable work support assemblies T118 relative to the base T14.

Other movable work support assemblies T126 to adjust the lateral width of the base T14 to support a relatively wide work piece WP. The movable work support assemblies T126 may be movably supported relative to the movable work support assemblies T118 and/or relative to the base T14. The movable work support assemblies T126 may be removable from the movable work support assemblies T118 and/or from the base T14 or may be movable relative to but not removable from the movable work support assemblies T118 and/or from the base T14. A locking arrangement T130, such as, for example, a cam-locking assembly, may be provided between the movable work support assemblies T126 and the movable work support assemblies T118 and/or the base T14 to the secure the position of the movable work support assemblies T126 relative to the movable work support assemblies T118 and/or the base T14.

In some constructions, such as those illustrated in FIGS. 1-5, the saw 10 may include one or more extensions T134 to impede rearward tipping of the saw 10 relative to the work surface WS. The extension(s) T134 may also provide auxiliary gripping or carrying surface(s) or handle(s) for the saw 10. Such extension(s) T134 may be contoured to provide a gripping surface and/or may include grippable elastomeric material E.

Figure 5G:
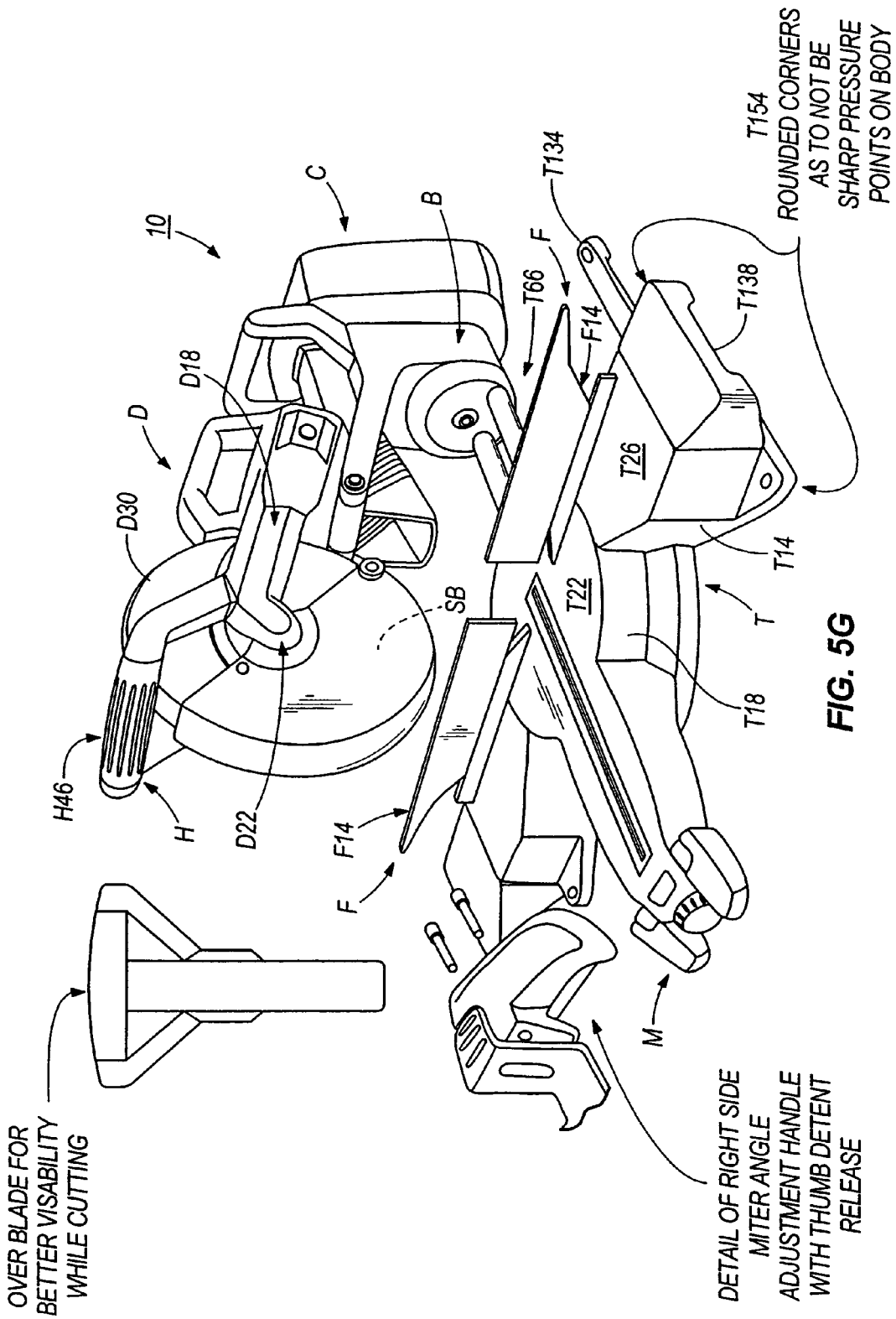
Figure 5H:
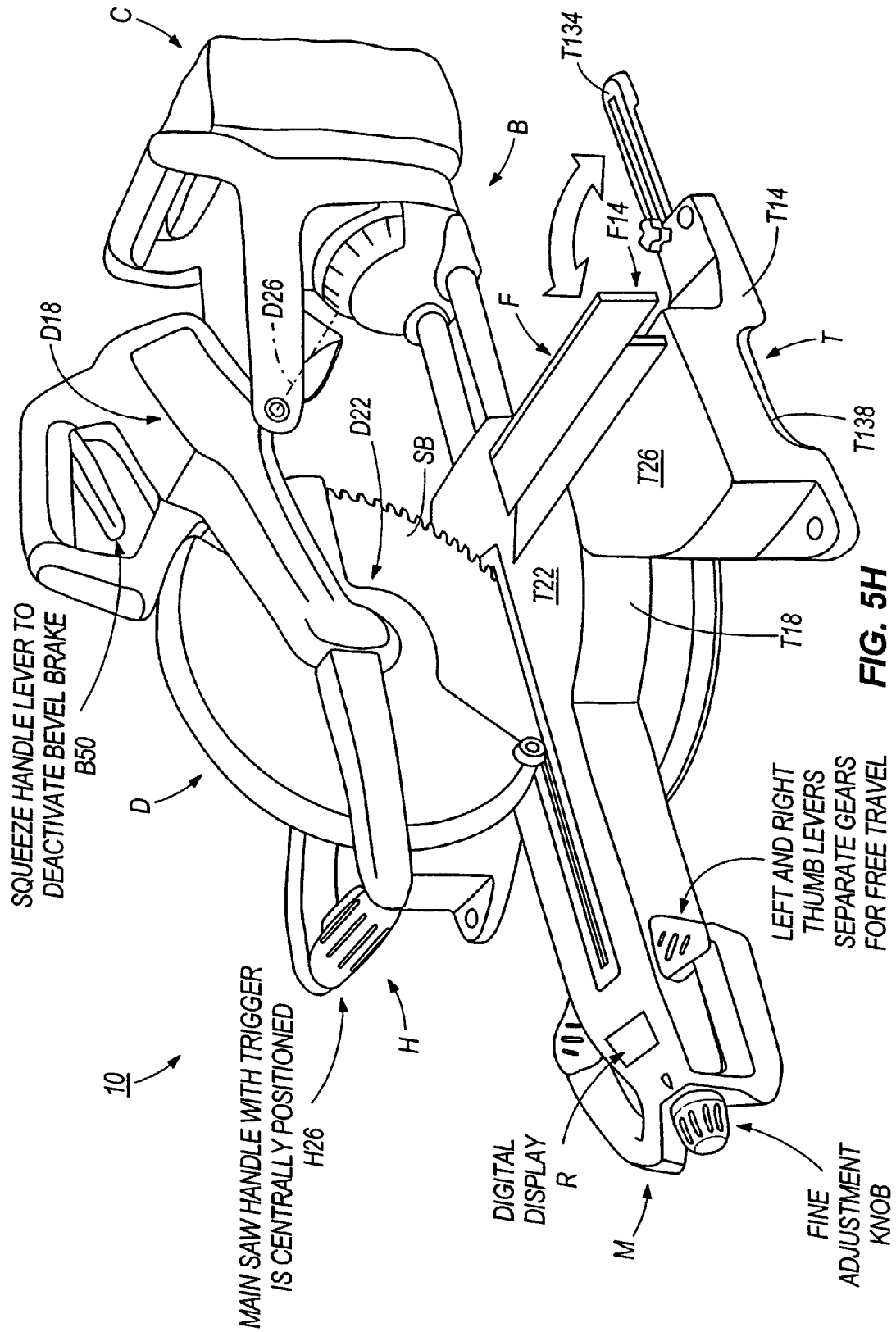
Figure 5I:
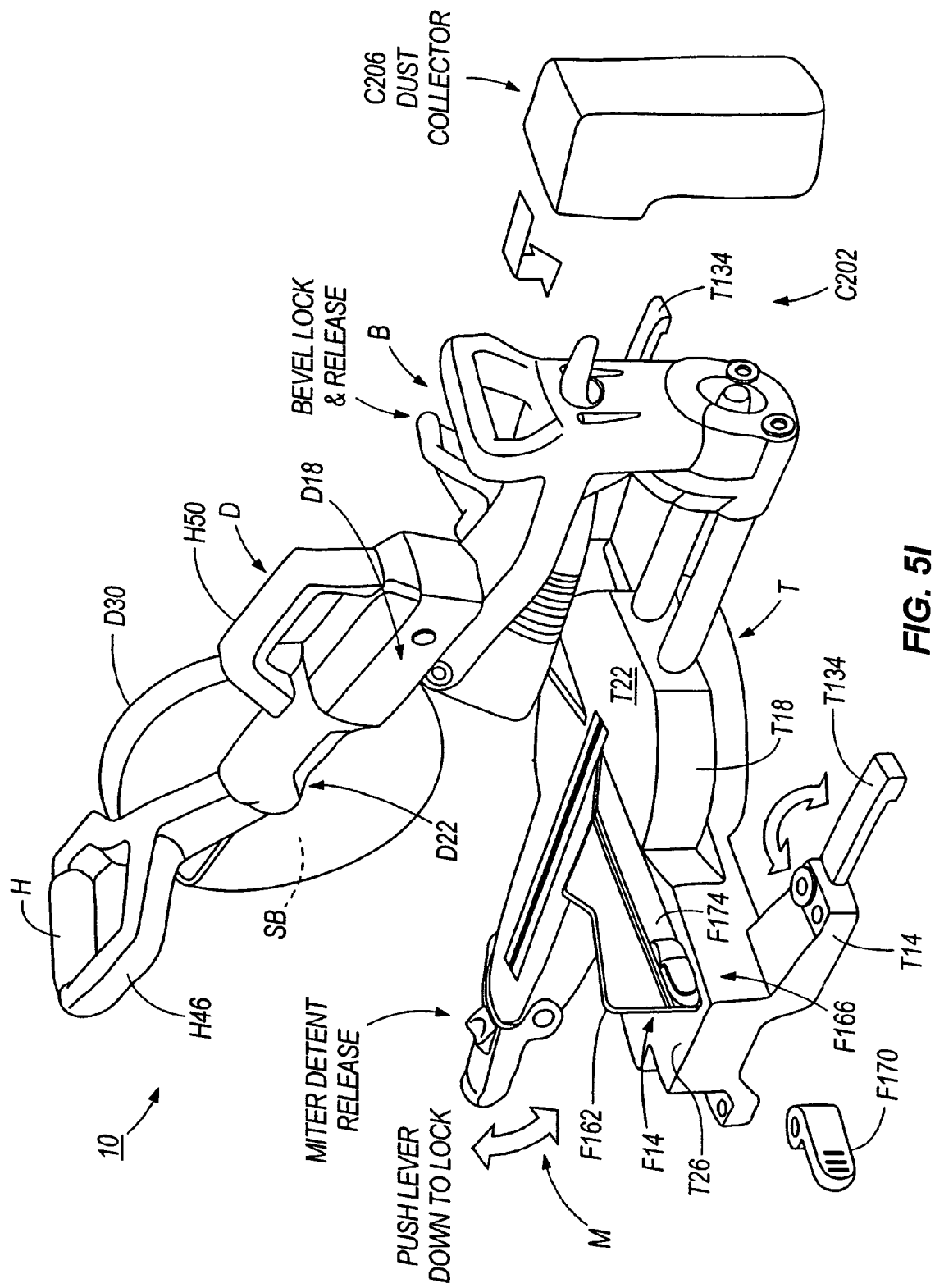

In some constructions, as shown in FIGS. 1-4, and 5K-5M, the extension(s) T134 may be fixed relative to the base T14. In other constructions, as shown in FIGS. 5A and 5H-5I, such extension(s) T134 may be movable (e.g., slidable (FIG. 5A), pivotable (FIGS. 5H-5I), etc.) relative to the base T14.

Elastomeric Material E

In some constructions, as shown in FIGS. 1-6, the base T14 may provide auxiliary carrying surfaces or handles T138 (e.g., on the bottom of the lateral sides of the base T14). As shown in FIGS. 1-4, 5K-5M and 6, the carrying surfaces or handles T138 may be covered with elastomeric material E, such as, for example, rubber, Santoprene, etc., to provide improved gripping and/or comfort for a user. The carrying surfaces or handles T138 and/or the elastomeric material E may also be contoured to fit a user's hand.

Figures 6A, 6B:
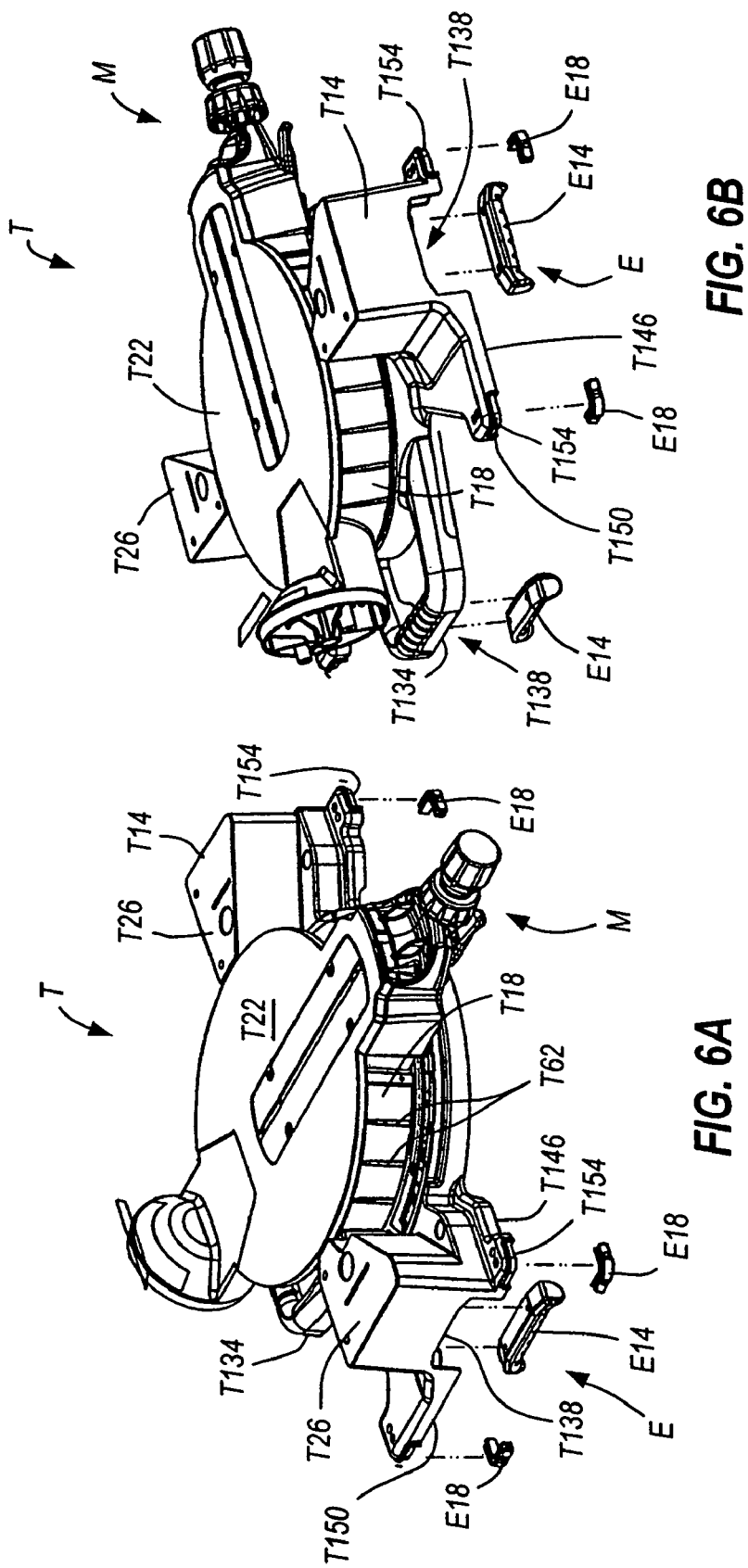
FIGS. 6A-6B are perspective views of a portion of a saw.
Figure 7:
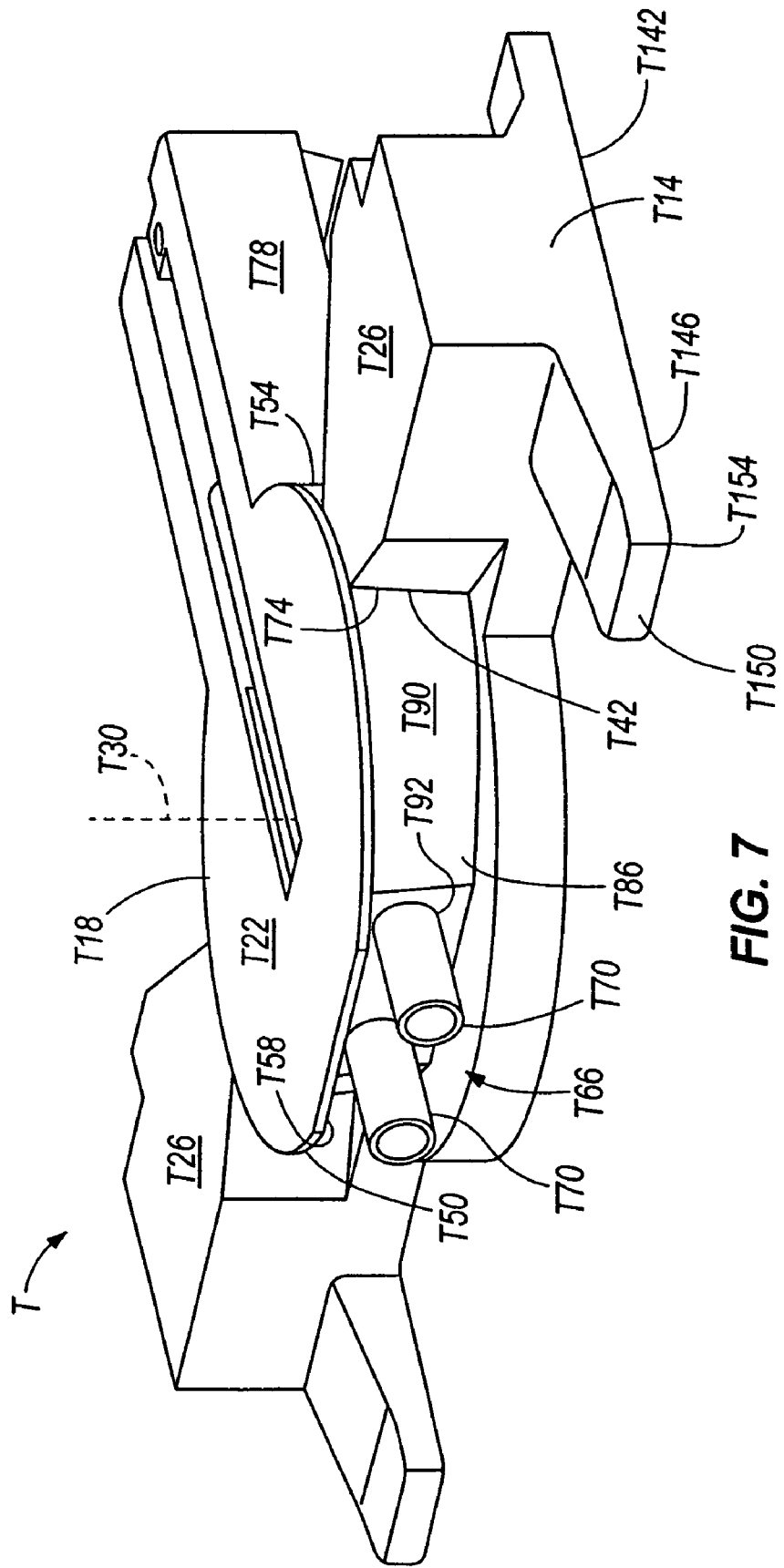
FIGS. 7-10 are perspective views of a portion of a saw, such as a sliding miter saw, and illustrating a base and table assembly.
Figure 8:
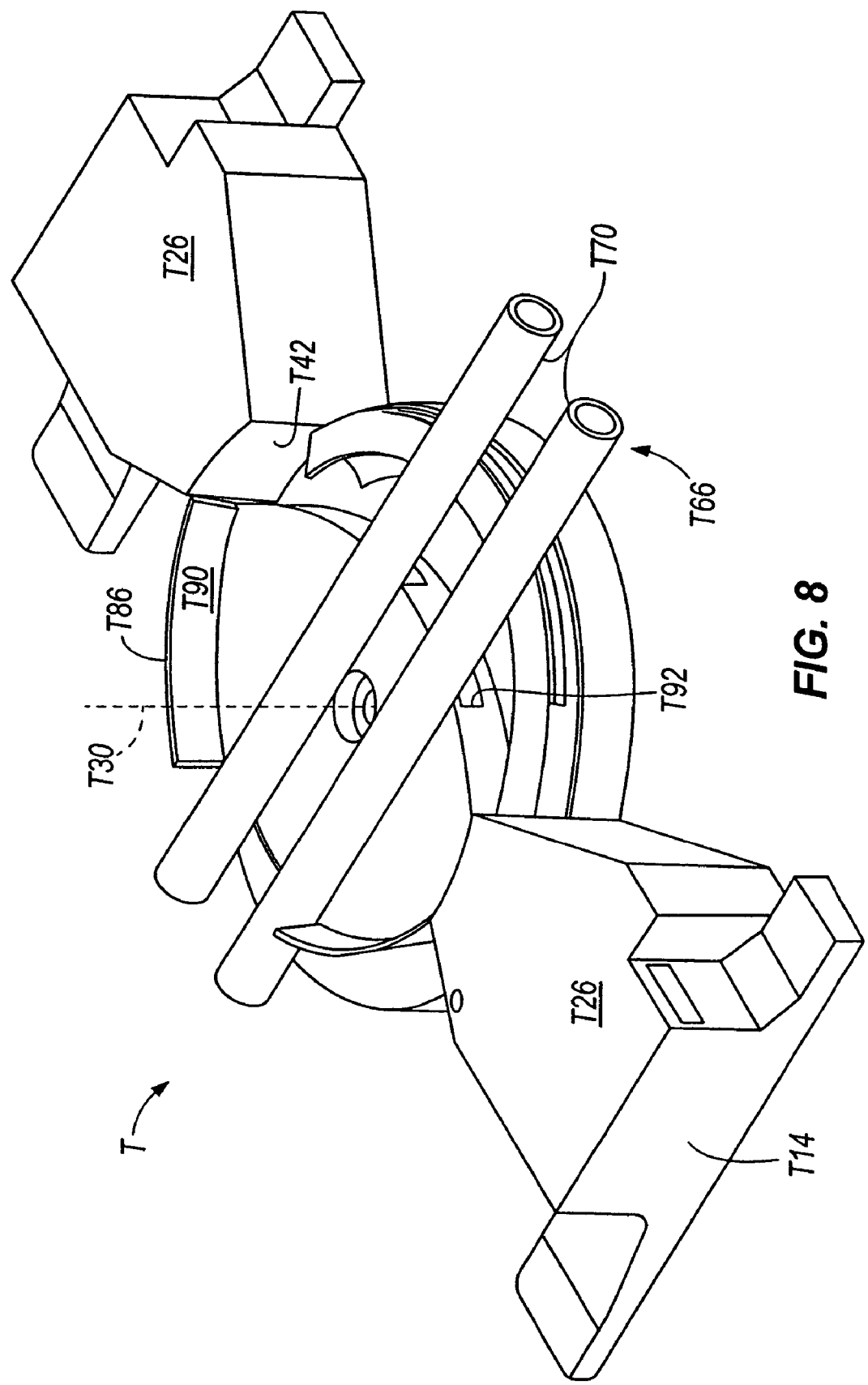
Figure 9:
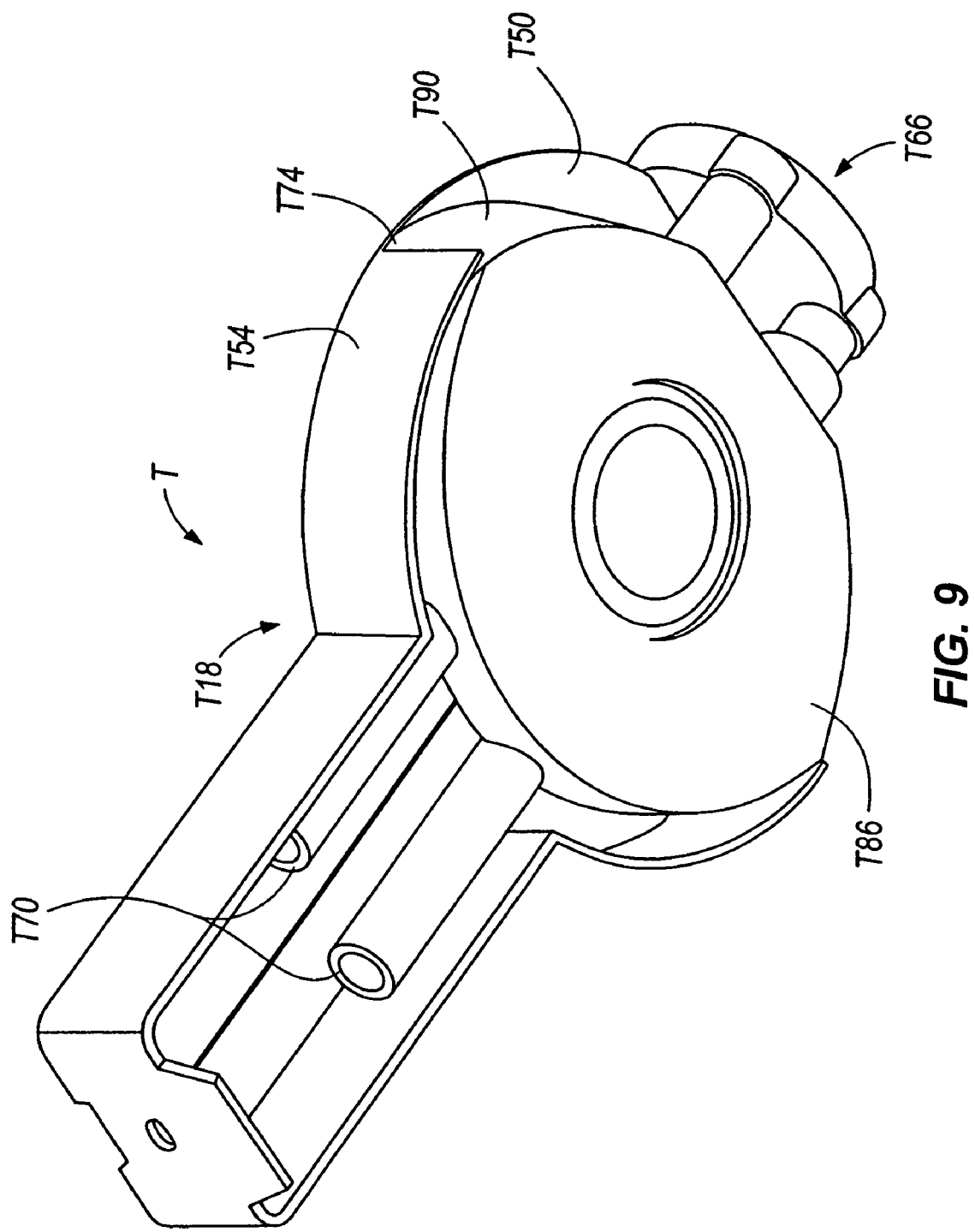
Figure 10:
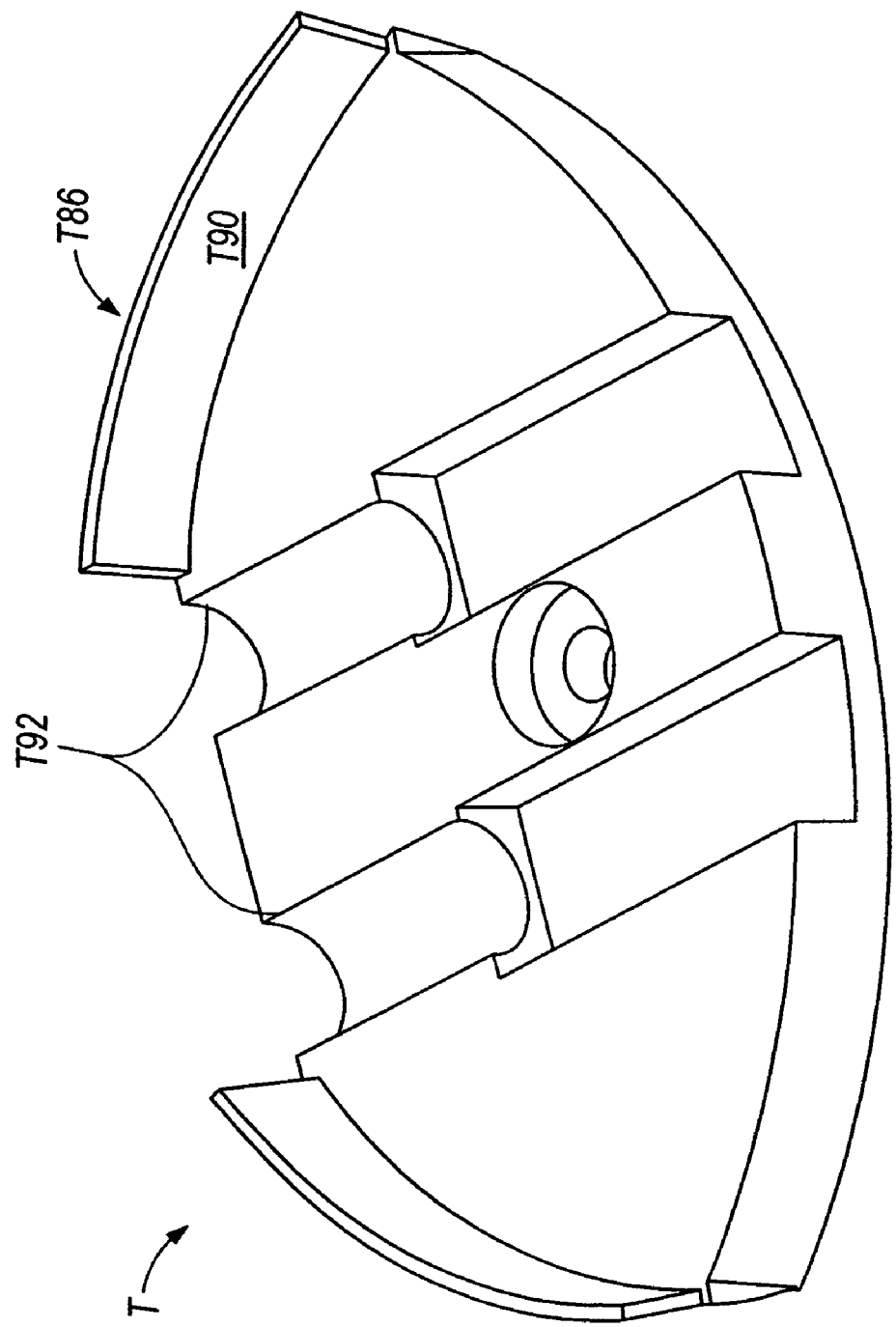

As shown in FIG. 6, the elastomeric material E may be formed as a separate grip member E14 which is attachable to the base T14 (e.g., to the extension(s) T134, to the carrying surfaces or handles T138, etc.). Alternatively, the elastomeric material E may be provided as an overmold (e.g., on the extension(s) T134, on the carrying surface(s) or handle(s) T138, etc.).

Generally, the saw 10 defines an outer periphery, and the base T14 has a peripheral surface T142 (laterally and/or vertically). The base T14 has a bottom surface T146 which is engageable with the work surface WS to support the saw 10 on the work surface WS. The base T14 also has a lateral surface T150 including corner surfaces T154.

As shown in FIGS. 5K-5M and 6, elastomeric material E may cover a portion of the periphery of the saw 10 (e.g. bottom surface T146, the lateral surface T150 and/or the corner surfaces T154, etc.). In some constructions, such as that shown in FIG. 6, the elastomeric material E may be provided as a separate portion (e.g., a foot portion E18) which is attachable to the base T14 (e.g. bottom surface T146, the lateral surface T150 and/or the corner surfaces T154, etc.). As shown in FIG. 5F-5G, the base T14 may include rounded lateral edges T150 and corners T154.

The elastomeric material E may inhibit damage to, provide increased friction with, etc. a work surface WS on which the saw 10 is supported. The elastomeric material E may also inhibit damage to other objects during movement of the saw 10 (e.g., inhibit damage if the saw 10 impacts a wall, etc.), improve comfort to a user during movement of the saw 10 (e.g., cover points which may engage against a user during transport), etc.

Elastomeric material E may be provided on portions of the saw 10 which may be engageable by an operator (e.g., gripping or handling surfaces, such as, for example, the handle assembly H, the angular adjusting handle(s) of the miter adjustment assembly M and/or of the bevel adjustment assembly B, auxiliary carrying surface(s) or handle(s) T138 (and T134), etc.) and on surfaces engageable with a work surface WS or other object to provide one or more of, among other things, protection (e.g., to improve comfort, to prevent damage of the work surface WS or other objects), friction between the work surface and the saw 10, etc.

Fence Assembly F

Figure 5J:
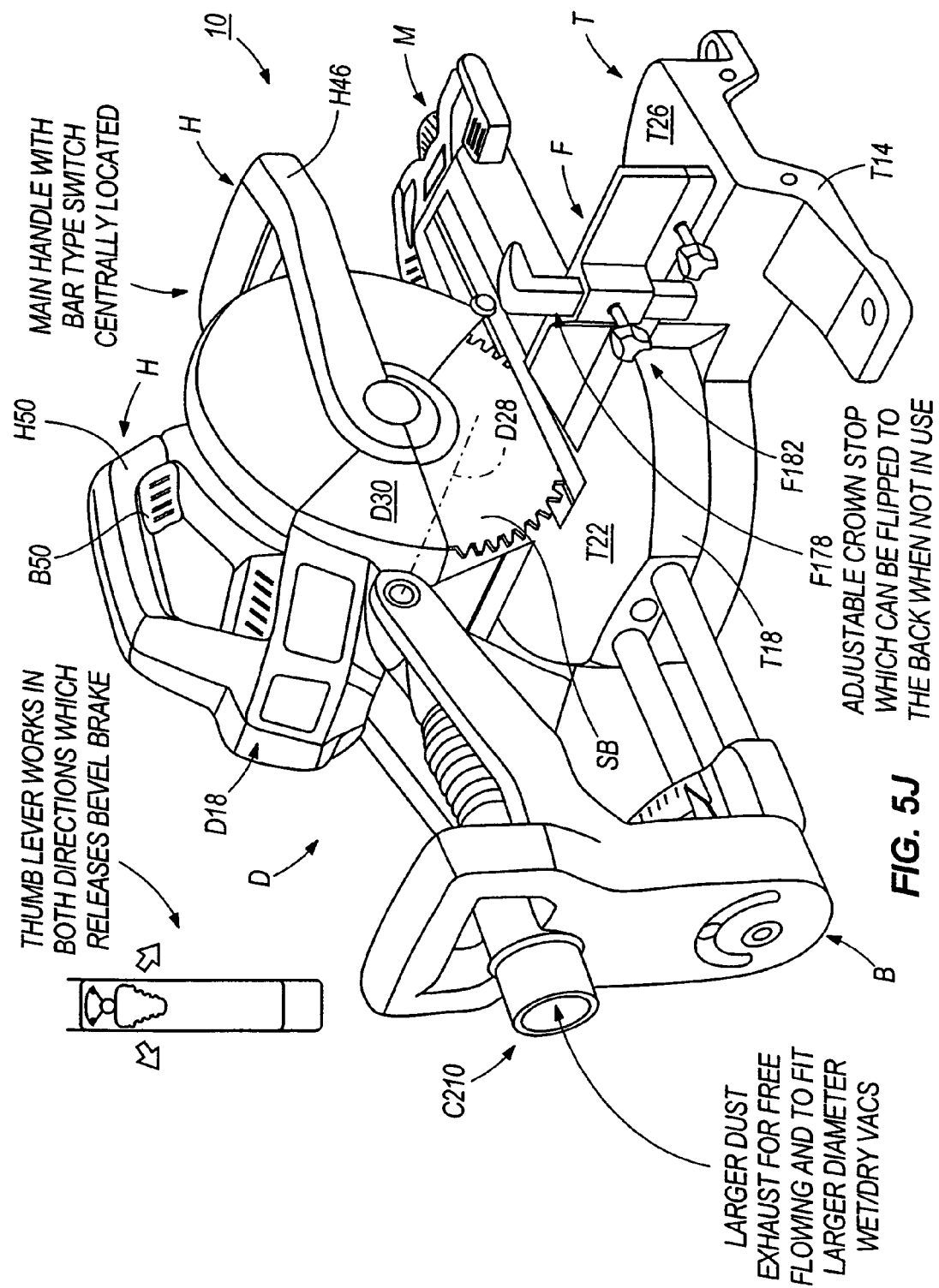
Figure 5K:
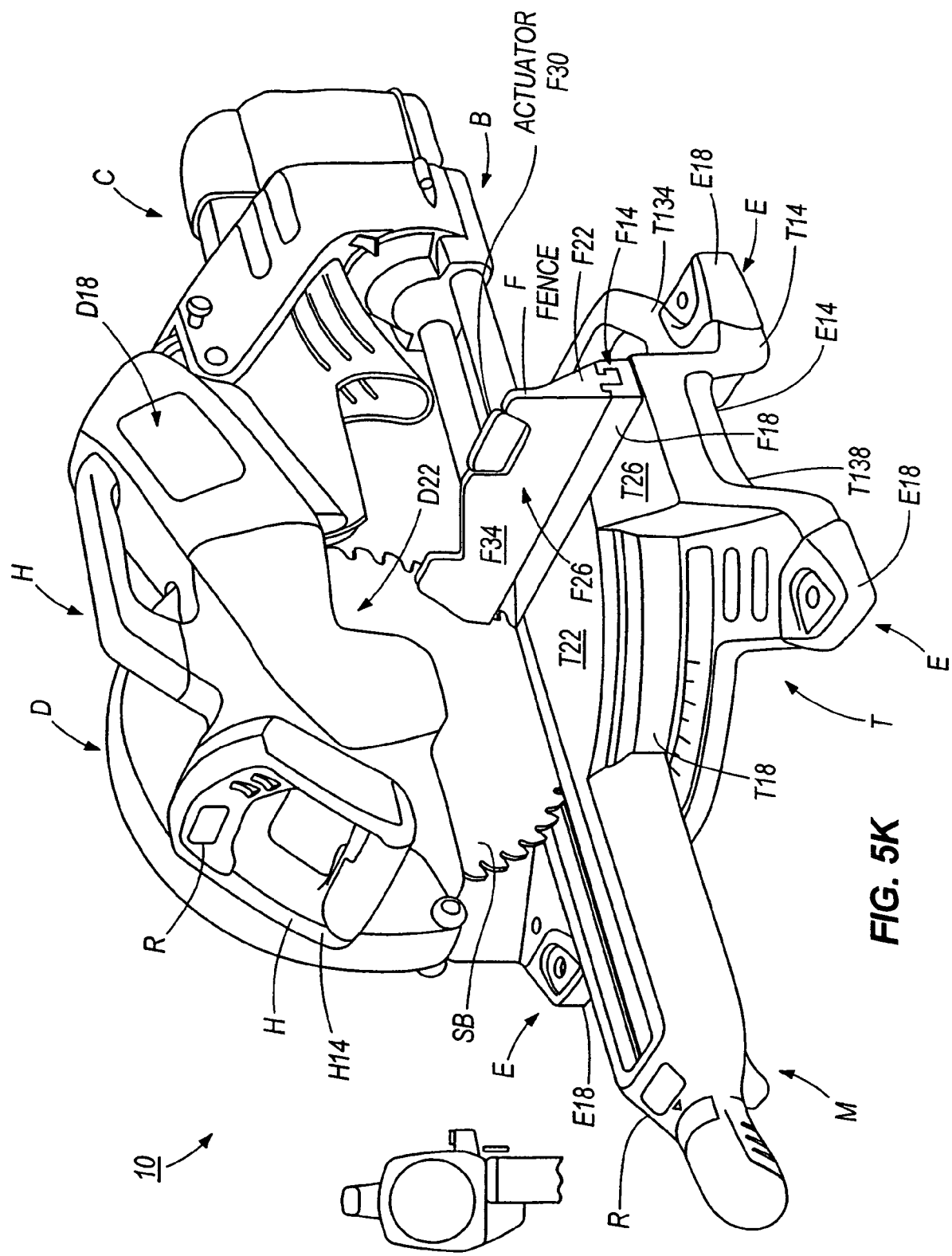
Figure 5L:
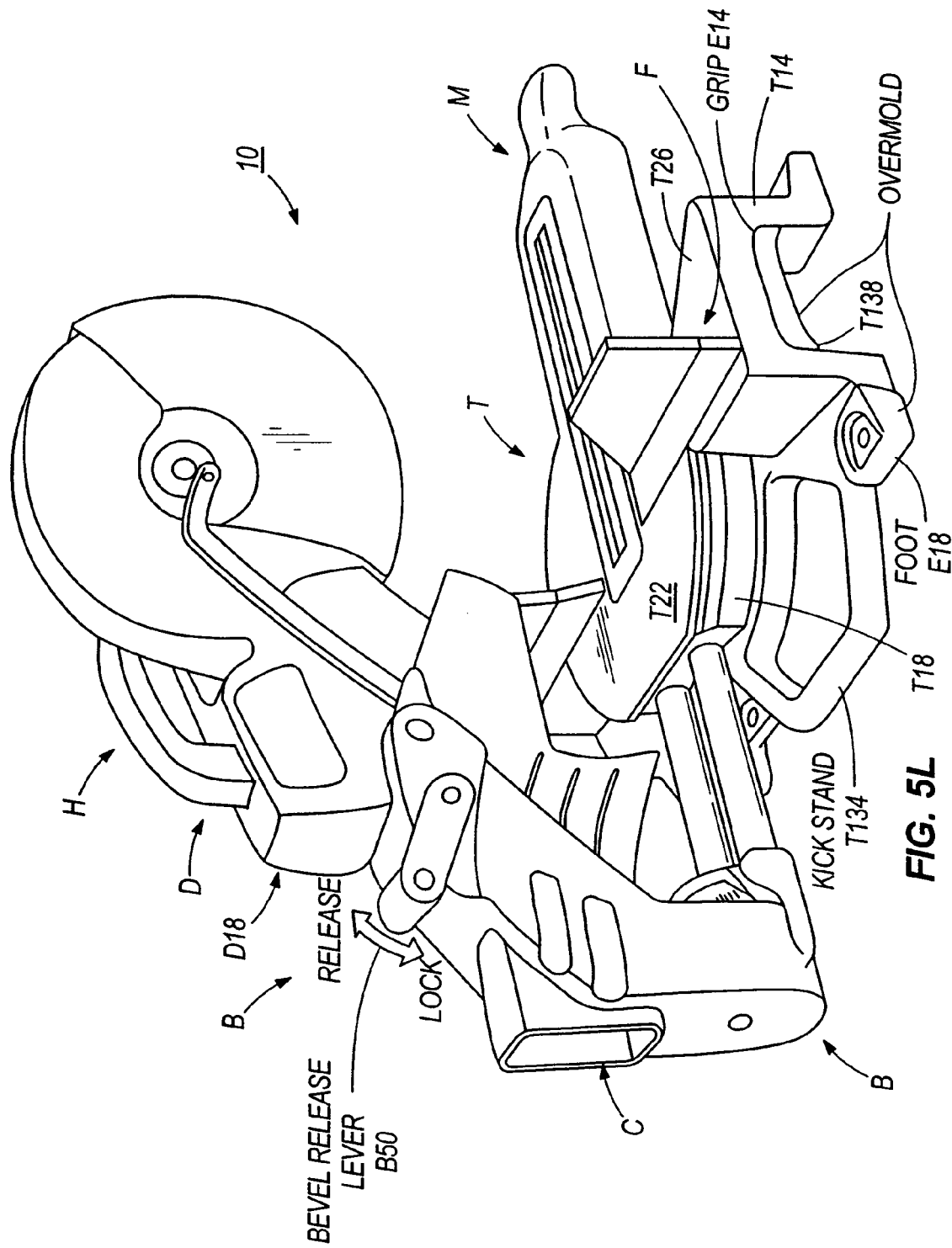

FIG. 5K illustrates a fence assembly F including one or more fence assemblies F14 which are releasably coupled to the base T14 and/or the table T18 such that a user may adjust the position of the fence assembly F14 using only one hand. The illustrated fence assembly F14 includes a lower portion F18 fixed to the base T14 and an upper portion F22 that is adjustable relative to the base T14. FIGS. 1-4 illustrate similar fence assemblies F14.

A locking assembly, such as an over-center locking assembly F26, is provided between the upper portion F22 and the lower portion F18. A lever F30 is operable to actuate the locking assembly F26. The lever F30 is recessed from the work piece-contacting surface F34 of the fence assembly F14 so to not interfere with the work piece WP. As such, to adjust the fence assembly F14, the user first pushes (or, in other constructions, pulls) the lever F30 to unlock the upper portion F22 from the fixed lower portion F18. The user then may adjust the position of the upper portion F22 relative to the lower portion F18 with the same hand utilized to manipulate the lever F30. When the final position of the upper portion F22 is achieved, the user may lock the upper portion F22 to the lower portion F18 again by returning the lever F30 to its original or home position (shown in FIG. 5K).

In other constructions (not shown), the lever F30 and/or the locking assembly F26 may be biased to the locking position.

In other constructions (not shown), the lower portion F22 may be movable relative to the base T14. In such constructions, a locking assembly (not shown but similar to the locking assembly F26) may be provided between the lower portion F22 and the base T14 to releasably lock the position of the lower portion F22 relative to the base T14.

Figure 13A:
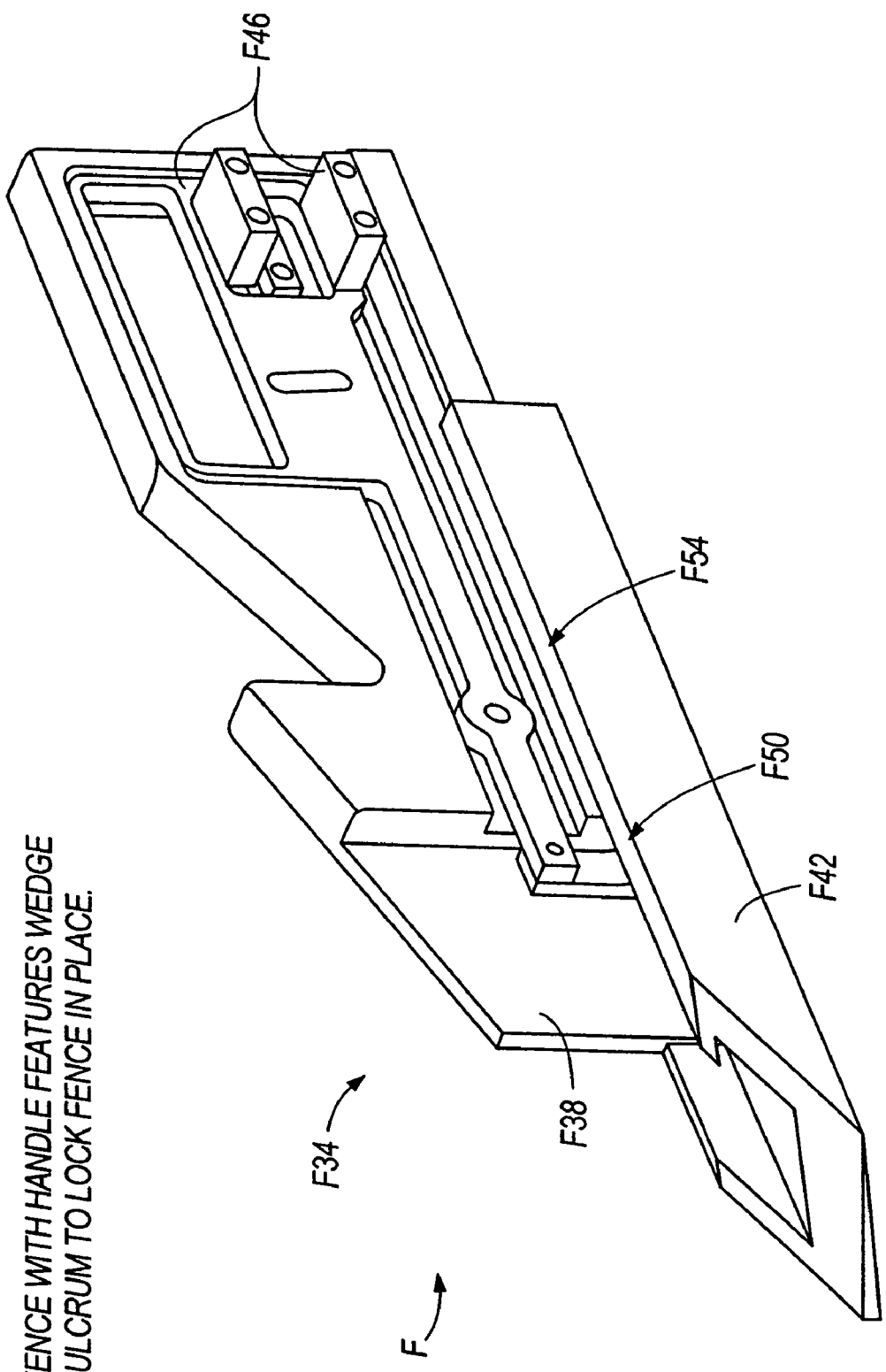

FIG. 13A illustrates another construction of an adjustable fence assembly F34. The fence assembly F34 includes an upper portion F38 movable relative to a lower portion F42. The fence assembly F34 also includes an actuator or handle F46 that is manipulatable by the user to lock the upper portion F38 relative to the lower portion F42. The handle F46 is coupled to a wedge F50 and a fulcrum F54 to selectively lock the upper portion F38 to the lower portion F42. The procedure for adjusting the fence assembly F34 is substantially similar to that of the fence assembly F14 of FIG. 5K, such that an operator may adjust the position of the upper portion F38 with one hand.

Figure 13B:
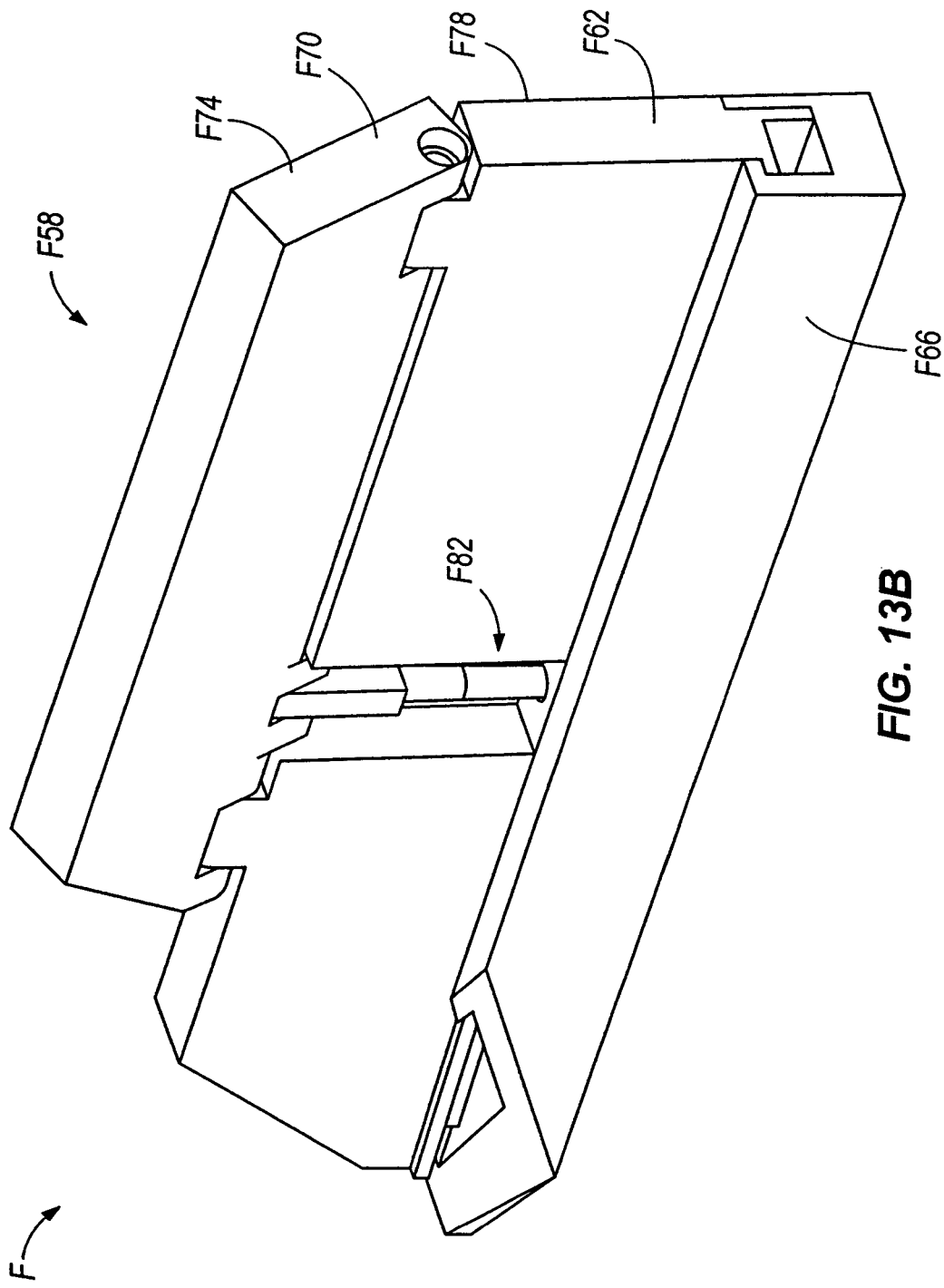

FIG. 13B illustrates yet another construction of an adjustable fence assembly F58. The fence assembly F58 also includes an upper portion F62 movable relative to a lower portion F66. A lever portion F70 includes a surface F74 substantially co-planar with the work piece-supporting surface F78 of the upper portion F62. The lever portion F70 is operable to actuate a cam structure F82 to lock the upper portion F62 to the lower portion F66. The procedure for adjusting the fence assembly F58 is substantially similar to that of the fence assembly F14 of FIG. 5K, such that a user may adjust the position of the upper portion F62 with one hand.

FIG. 13C illustrates a further construction of an adjustable fence assembly F86. The fence assembly F86 includes a lower portion F90, which may be adjustable relative to the base T14 in a similar manner to any one of the upper portions of the fence assemblies F14, F34 or F58 shown FIG. 5K or 13A-13B. The fence assembly F86 also includes an upper portion F94 that may be pivotable relative to the lower portion F90. More particularly, the upper portion F94 may pivot about a central pivot F98 about 180 degrees. Alternatively, the upper portion F94 may be removed from the lower portion F90 by removing the upper portion F94 from the central pivot F98.

FIG. 13D illustrates a tilting fence assembly F102. A tilting portion F106 may be tilted to adjust a position of a work supporting surface F10 of the tilting portion F106 relative to the base T14.

FIGS. 14A-14D illustrate a fence assembly F114 including a movable fence portion F118. The fence assembly F114 may include a fixed fence portion F122 cooperating with the movable fence portion F118 to provide a support surface F126 for a work piece WP. A locking assembly F130 is provided to lock the movable fence portion F118 in a position relative to the fixed fence assembly F122, if one is provided, and relative to the base T14. The locking assembly F130 includes an actuator or fence handle F134 which operates a cam F138 to cause a clamp bracket F142 to move into and out of clamping engagement with the fixed portion (e.g., a fixed fence portion F122, the base T14, etc.).

A spring clip F146 is provided to selectively retain the movable fence portion F118. The spring clip F146 includes a blocking portion F150 selectively preventing the movable fence portion F118 from disengaging (e.g., from the fixed fence portion F122, from the base T14, etc.). A user may manipulate a release portion F154 of the spring clip F146 to allow the movable fence portion F118 to be removed (e.g., from the fixed fence portion F122, from the base T14, etc.).

In other constructions (not shown), the lower "fixed" fence portion F122 may also be movably supported relative to the base T14. In such constructions, a locking assembly (not shown) is provided between the movable fixed fence portion and the base. Such a locking assembly may include a thumb screw or a locking assembly similar to that shown in Figs. FIGS. 14A-14E.

FIGS. 5A-5E, 5G-5H and 5M illustrate arrangements of movable and/or removable fence assemblies F14. In FIGS. 5E-5F, additional movable fence portions (not shown) may be slidably received in the movable work support assemblies T118. The movable fence portion may slidable into and out of the movable work support assemblies T118. FIG. 5D illustrates a fence assembly F14 including a movable vertical crown stop F158.

FIG. 5I illustrates at least one fence assembly F14 including a movable fence portion F162. A locking assembly F166 including a lever F170 is provided between the movable fence portion F162 and a fixed fence portion F174. In other constructions (not shown), the locking assembly may be provided between the movable fence portion F162 and the base T14, and a fixed fence portion (such as fixed fence portion F174) may not be provided.

FIG. 5J illustrates a fence assembly F14 including an adjustable crown stop F178. A locking assembly F182, such as a thumb screw locking assembly, is operable to hold the stop F178 in a position relative to the fence assembly F14. In other constructions (not shown), another locking assembly, such as an over-center lever, may be provided. The stop F178 can be moved out of the way when not in use (e.g., by being flipped to the rear).

Drive Assembly D

Figure 15B:
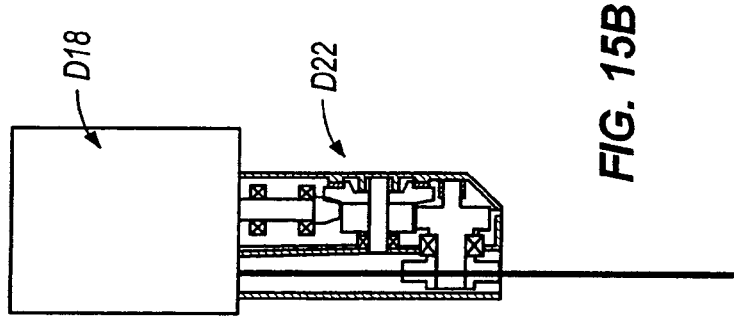
FIGS. 15A-15B are partial cross-sectional views of a portion of a saw and illustrating a drive assembly and a guard assembly.
Figure 15A:
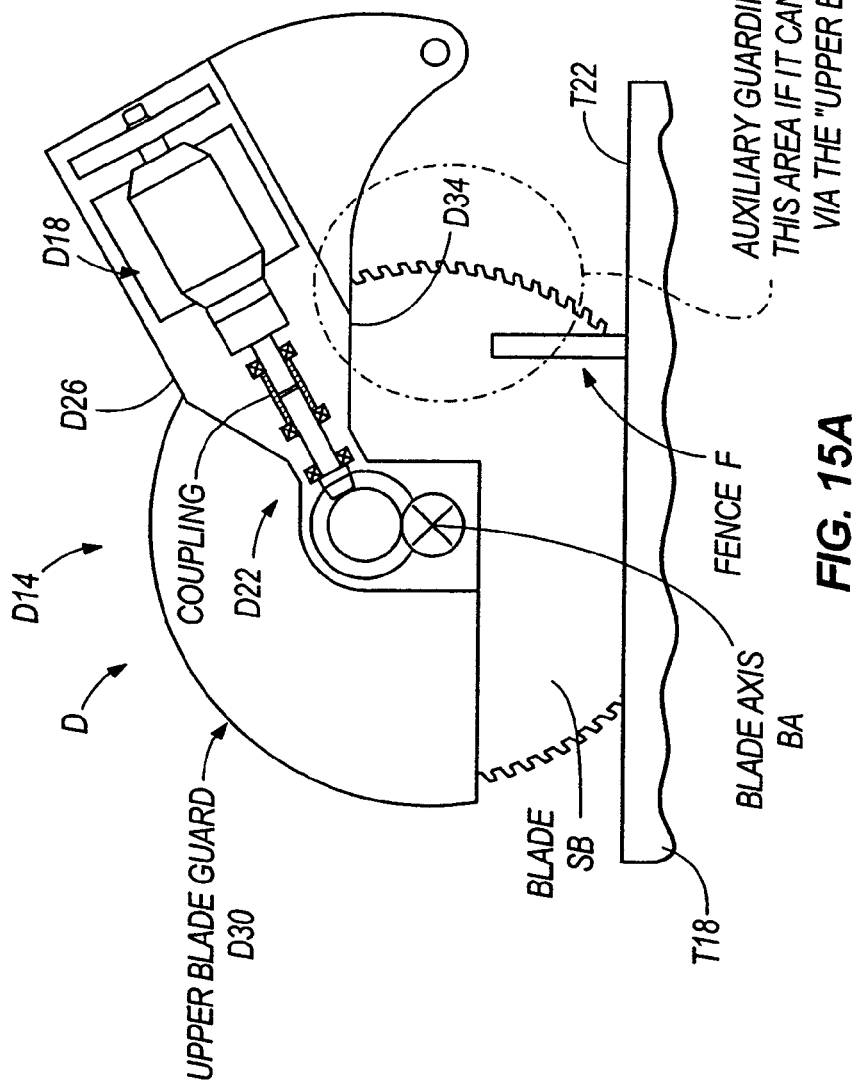

FIGS. 15A-15B illustrates a drive assembly D for a saw 10. The drive assembly D generally includes a saw unit D14 (including a saw blade SB), a motor D18 and a drive train D22 operable to drive the saw blade SB. A housing assembly D26 houses the motor D18 and the drive train D22. At least a portion of the drive assembly D (such as the saw unit D14) is supported for movement between the raised, non-cutting position and the lowered, cutting position about an axis D28.

As shown in FIGS. 1-4, an arm D28 extends from the housing assembly D26. A handle H is supported on the arm D28.

The housing assembly D26 includes a fixed upper blade guard D30 having a portion D34 removed to provide increased vertical cutting capacity compared to conventional miter saws. With reference to FIG. 15A, the portion D34 of the upper blade guard D30 between the blade axis BA and the fence assembly F is relieved to increase the vertical cut capacity of the saw 10. The upper blade guard D30 may or may not still cover the teeth on the rear portion of the saw blade SB, as in the saw 10 shown in FIGS. 1-4. As a result, an auxiliary blade guard (not shown) may be provided to cover the exposed teeth of the rear portion of the saw blade SB. Such an auxiliary blade guard may be fixed, flexible, or movable to allow selective exposure of the rear portion and/or teeth of the saw blade SB.

FIGS. 16A-16B illustrate a drive assembly D incorporating a drive train D22 coupling the motor D18 and the saw blade SB that allows the motor D18 to be remotely positioned relative to the blade arbor D38 such that the motor D18 substantially does not interfere with the fence assembly F, base and table assembly T, or work piece WP when the saw unit D14 is positioned for a bevel cut. In some constructions of the saw 10, the motor D18 may include a permanent magnetic motor, while in other constructions of the saw 10, the motor D18 may include a standard or universal motor, a switched reluctance (SR) motor, etc.

The motor D18 includes a motor shaft D42 defining a motor axis D46 that is substantially parallel to the saw blade SB and substantially perpendicular to the blade arbor D38. Also, as viewed from the side, the motor axis D46 defines an oblique angle with respect the table T18 or the work piece support surface T22 such that the motor housing D26 is tilted away from a user. By tilting the motor housing D26 away from the user, the exhaust of a motor fan D50 may be directed away from the user, and an auxiliary dust collection fan C130 may be coupled to the motor shaft D42.

Figure 16C:
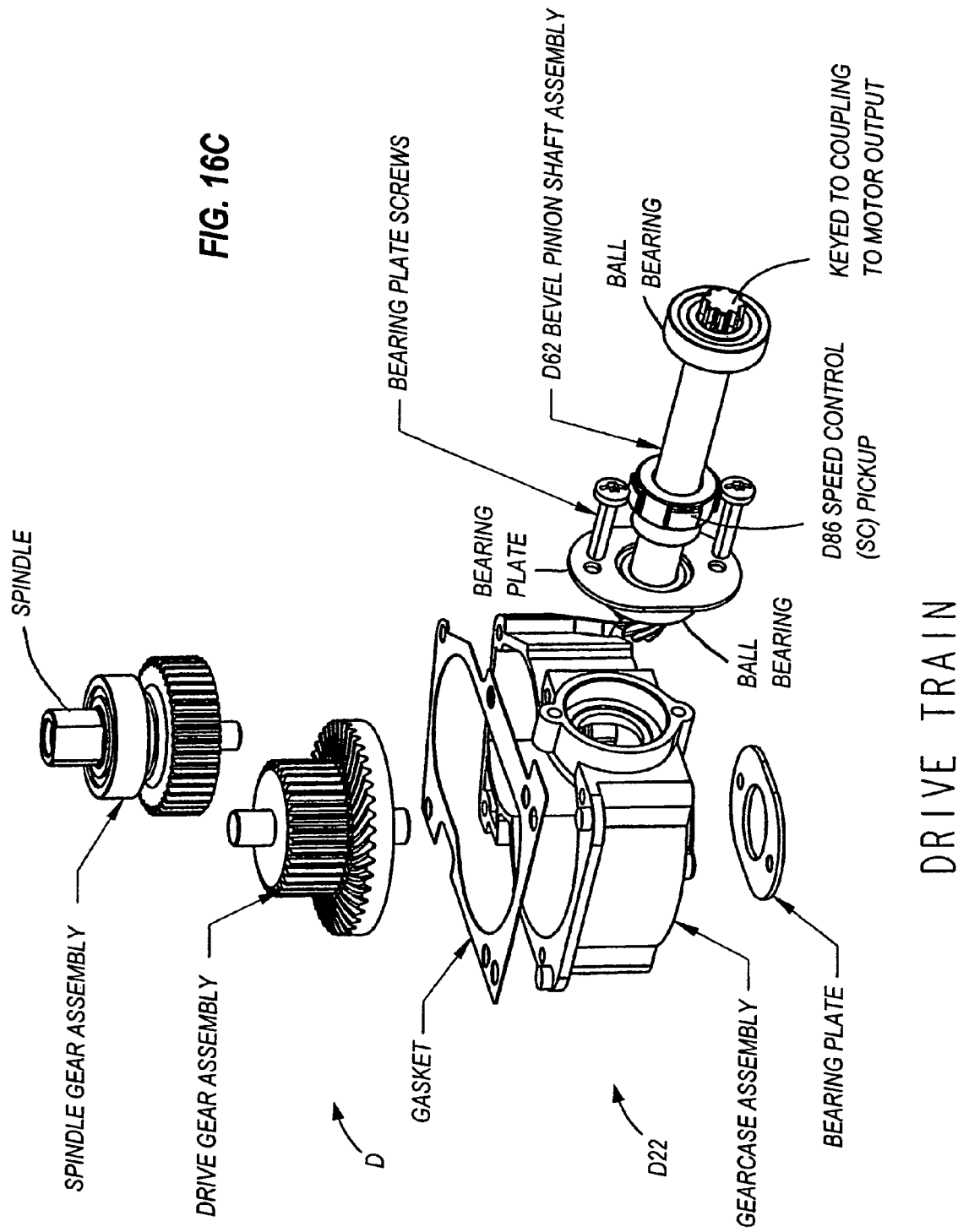

As shown in FIG. 16C, the drive train D22 includes a dual-stage drive train configuration drivably coupling the motor shaft D42 and the blade arbor D38. In the illustrated construction, the first stage D54 includes a spiral bevel gear set, and the second stage D58 includes a helical gear set. A spiral bevel pinion D62 is coupled to the end of the motor shaft D42 by a coupling D66. An idler assembly, including a spiral bevel gear D70 and a helical pinion D74, is rotatably supported on a shaft D78 such that the spiral bevel pinion D62 is drivably engageable with the spiral bevel gear D70. Further, a helical gear D78 is coupled to the blade arbor D38 and drivably engageable with the helical pinion D74 of the idler assembly.

Alternative drive train configurations (not shown) may include (1) a single-stage bevel gear set, in which a spiral bevel gear is directly coupled to the blade arbor and drivably engaged by a spiral bevel pinion coupled to the motor shaft; (2) a dual-stage spiral bevel gear set, with the first stage utilizing an oblique mesh angle to permit a wide range of motor orientations, (3) a single-stage worm gear set, in which a gear is directly coupled to the blade arbor and drivably engaged by a worm gear coupled to the motor shaft, (4) a single-stage hypoid gear set, in which a hypoid gear is directly coupled to the blade arbor and drivably engaged by a hypoid pinion coupled to the motor shaft, etc.

Figures 18, 19:
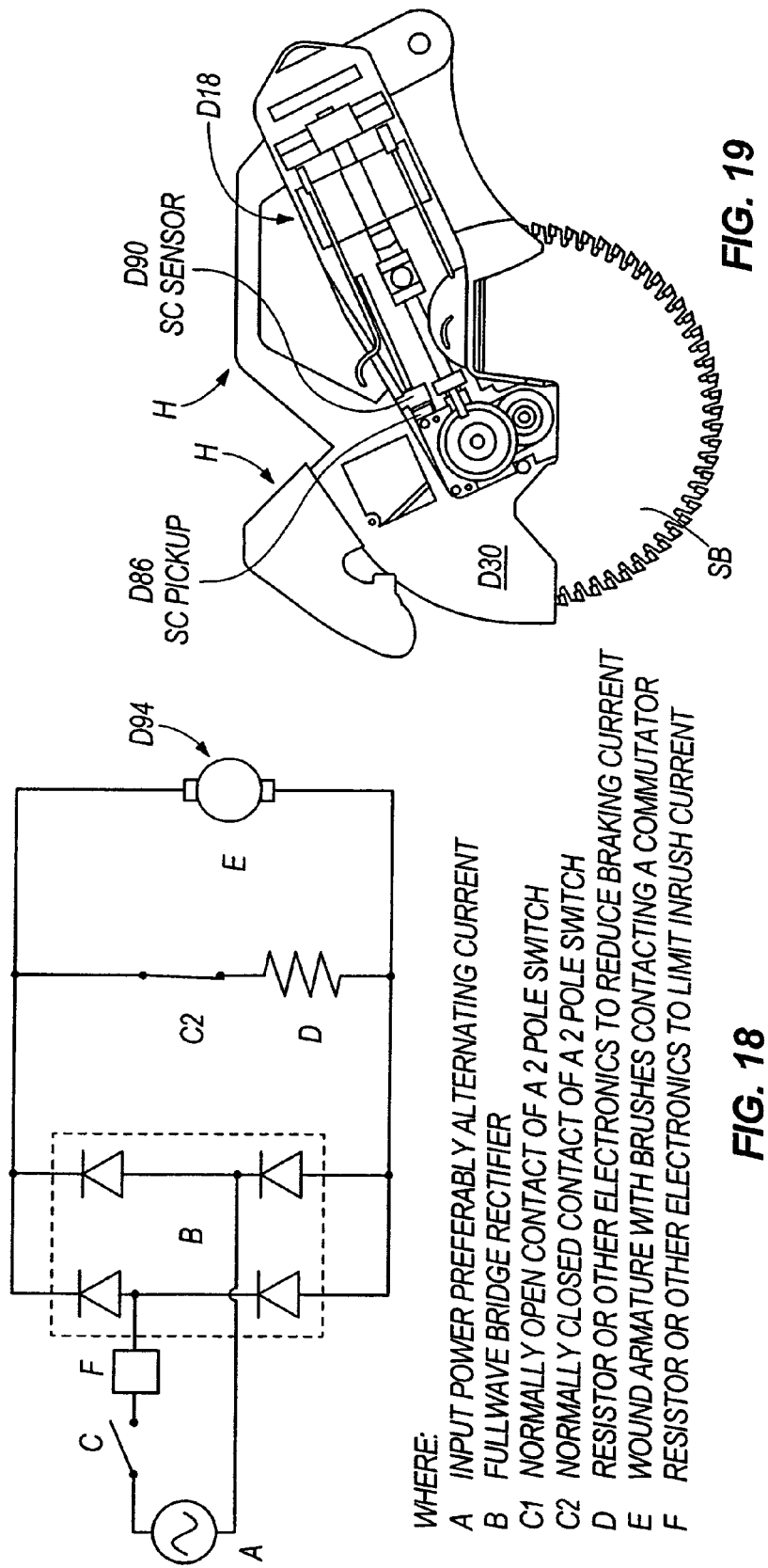
FIG. 18 is a schematic diagram illustrating an electrical circuit and an electric motor of a saw.
FIG. 19 is a side view of a portion of a saw and illustrating a drive assembly and a speed control assembly.
Figure 20A:
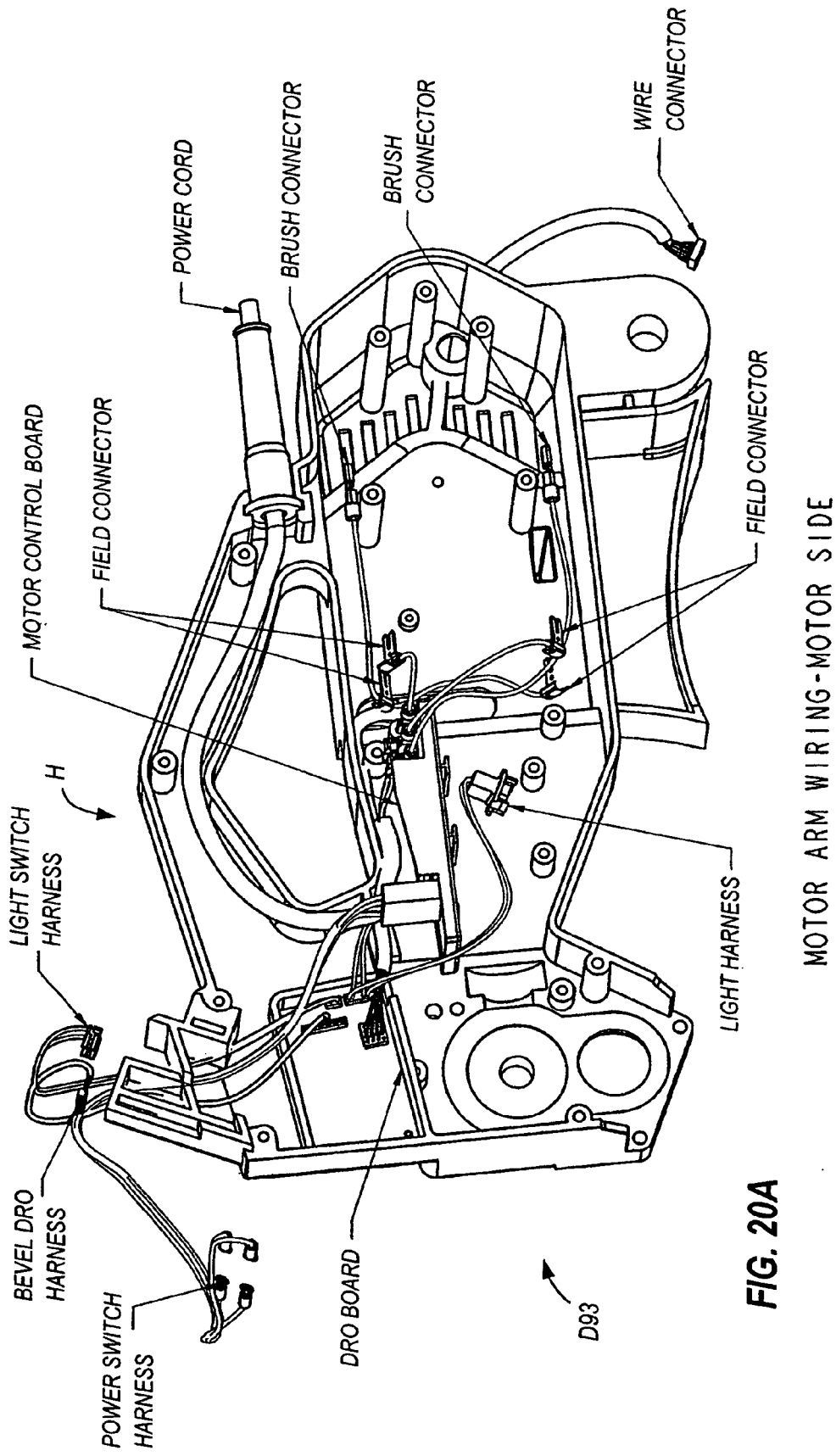
Figure 20C:
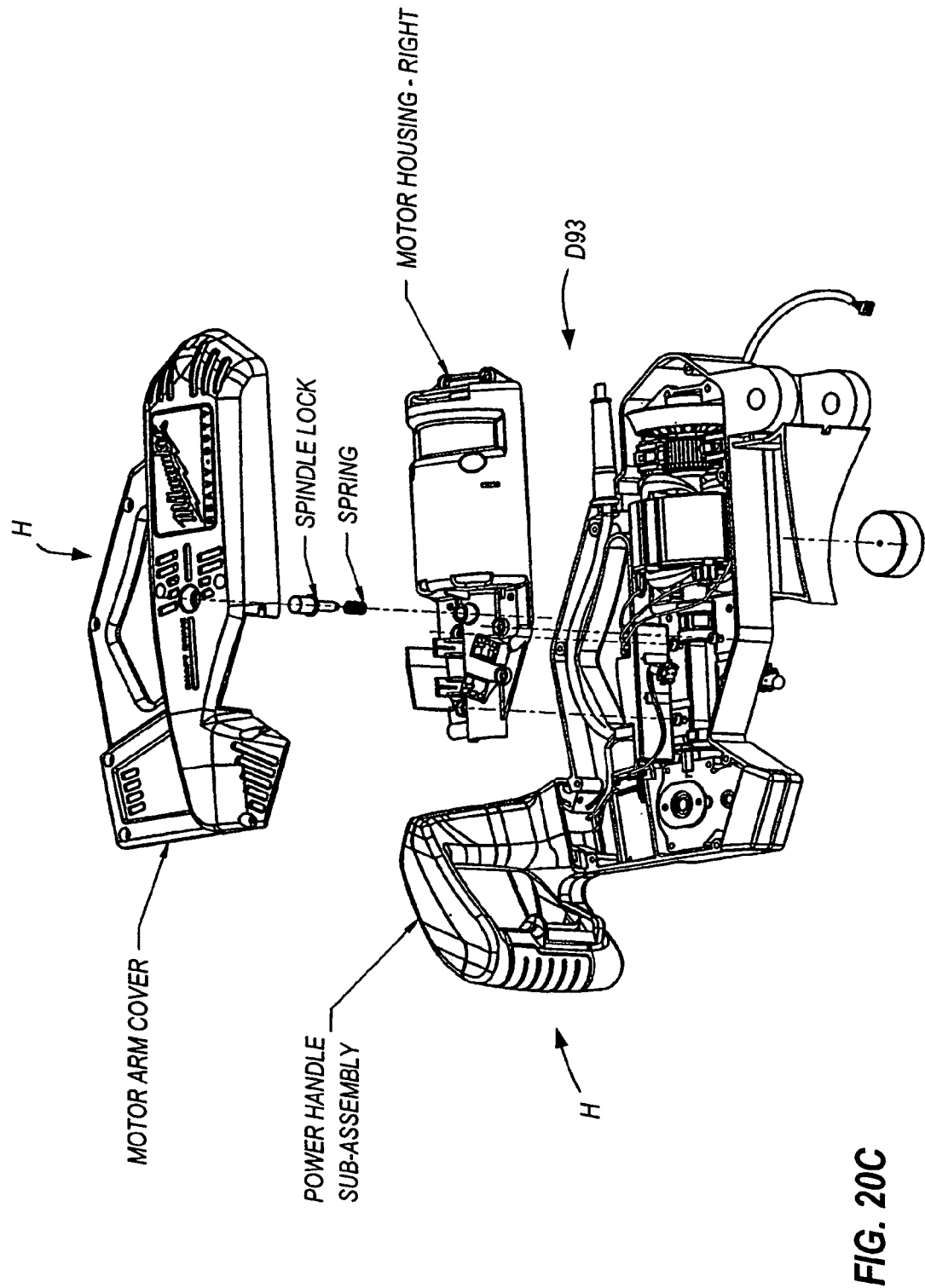

As shown in FIGS. 16C and 19, the drive assembly D may also include a speed control (SC) assembly D82. The SC assembly D82 includes a SC pickup D86, such as toothed metal cog, supported for rotation with the spiral bevel pinion D62 and a SC sensor D90 sensing rotation of the SC pickup D86. The SC sensor D90 communicates with a controller D92 (see FIG. 20A) which is operable to control the speed of the motor D18. FIGS. 20A-20D illustrate a portion of a wiring arrangement D93 for the saw 10.

FIGS. 17A-17E illustrate a drive assembly D used with a dust collection assembly C, such as an on-board dust collection assembly. Such a dust collection assembly C is discussed in more detail below.

FIG. 18 schematically illustrates motor D18, such as a permanent magnet motor D94. The permanent magnet motor D94 includes permanent magnets (not shown) and a wound armature (not shown) with commutator. In operation of the motor D94, AC line power is rectified and passed by brushes to the armature. Additional electronics may be added to modulate the input power to provide speed control for the motor D94. Components, such as relatively simple resistors or other electronics, may be added to control acceleration and deceleration of the motor D94.

The permanent magnet motor D94 may generally allow the saw blade SB to be driven in a smooth and controlled manner for more accurate cutting. More particularly, the permanent magnet motor D94 may generally provide "soft start" and "soft stop" of the saw blade SB and a reduced no-load speed (when compared to a universal motor), which contributes to more accurate cutting. Also, the permanent magnet motor D94 may generally have a reduced size compared to a universal motor of the same power output, a flatter speed torque characteristic with minimal electronics, resulting in a more constant speed without expensive feedback circuits, 100% braking efficiency in bringing the saw blade SB to a complete stop, and/or increased power compared to a comparably-sized universal motor.

Figure 21B:
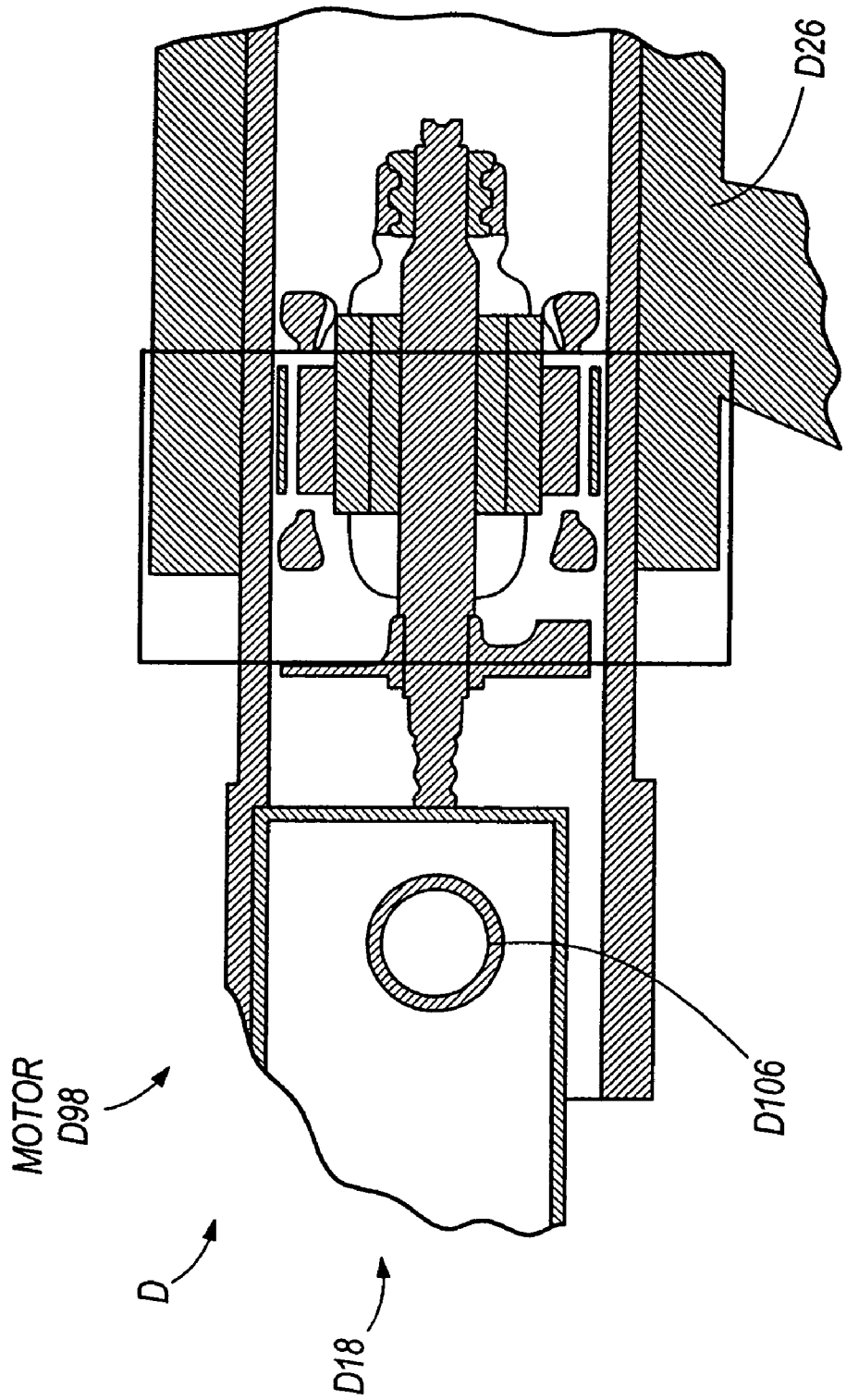

FIGS. 21A-21B illustrate a saw 10, such as a sliding miter saw, including a motor D98 mounted inside of a slide tube T70. The motor D98 is connected to the output spindle D102 via a flexible coupling D106, such as, for example, a U-joint, a flexible shaft, etc.

As shown in FIG. 5M, the saw 10 includes a movable stop assembly D102 for limiting the depth to which the saw blade SB may be moved into the work piece. In the illustrated construction, the depth stop assembly D102 includes a thumb screw D106 which is engageable with a surface on the saw arm to set a limit for pivoting movement of the saw head D14 relative to the bevel arm B14 and relative to the table T14. In other constructions (not shown), the stop assembly D102 may include one or more quickly-adjustable stops for a given depth positions (e.g., one-eighth inch, one-quarter inch, three-eighths inch, one-half inch, etc.).

Dust Collection Assembly C

FIGS. 17D-17E, 22-24 and 27-28 illustrate constructions of at least portions of a dust collection assembly C, such as a dust chute assembly C14, for a saw 10. As shown in FIGS. 22A-22F, the dust chute assembly C14 may include a dust chute C18 extending through the bevel arm B14. A chip deflector C22 is provided to direct debris into the chute inlet port C26, which is generally tall and wide to capture a high percentage of dust and debris. The chip deflector C22 moves with the saw unit D14 relative to the dust chute C18 as the saw unit D14 is moved between the raised, non-cutting position and the lowered, cutting position.

The chip deflector C22 may be mounted below the motor housing D26 ahead of the upper blade guard D30. The chip deflector C22 may scissor in and out of the top of the dust chute C18 as the saw unit D14 is raised and lowered. The chip deflector C22 may serve as a blade guard to replace that portion of the fixed upper guard D30 which would otherwise be in place. The chip deflector C22 also automatically adjusts the inlet height of the dust chute C18 as the saw unit D14 is raised and lowered.

A curved, inside surface of the chip deflector C22 may redirect dust and debris coming off the saw blade SB, thereby bending the dust and debris stream downward to the chute exhaust port C30. In a similar fashion, this surface may redirect air coming off the tips of the saw blade SB, creating flow across the top, inner surface of the chip deflector C22 and the dust chute C18 to assist in moving dust toward the chute exhaust port C30.

In other constructions (not shown), the chip deflector C22 may be mounted to allow some pivoting movement relative to the motor housing D26 and upper guard D30 to optimize the direction of deflection of debris as the saw unit D14 and upper guard D30 are moved between the raised, non-cutting position and the lowered, cutting position.

As shown in FIGS. 22D-22F, the chute exhaust port C30 is generally large and smooth to facilitate efficient flow of material through the dust chute C18. In some constructions, the chute exhaust port C30 may provide a downwardly angled outlet to minimize the amount of dust that might otherwise spray around the room when the chute exhaust port C30 is open (e.g., when a debris collector (a bag, a hose, etc.) is not attached) and to improve the effectiveness of directing the dust to some type of outboard storage container (e.g., a box, bucket, or large bag).

A rear dust chute deflector C34 may be positioned on the chute exhaust port C30. The deflector C34 may provide the downwardly angled outlet. The deflector C34 may connect to the chute exhaust port C30 by simply accepting the chute exhaust port C30 (in a manner similar to the connection of vacuum pipe sections in many typical wet/dry vacuums). In other constructions (not shown), another connecting assembly may be provided to releasably connect the deflector C34 to the dust chute C18.

FIGS. 24A-24B illustrate a blade guard support gusset C36 formed on a portion of the motor housing D26. FIGS. 27A-27J illustrate a dust collection assembly which is similar to the dust collection assembly C14.

As shown in FIGS. 23A-23E, in another construction, the dust chute assembly C38 includes a dust chute C42 which does not go through the bevel arm B14. Instead, the dust chute C42 goes around the bevel arm B14. Because the bevel arm B14 does not include the dust chute (such as the dust chute D14) extending therethrough, such a construction provides a bevel arm B14 which may be easier to manufacture, sturdier, etc., require less material, etc. FIGS. 1-4 illustrate a similar dust chute assembly C38.

Figure 23B:
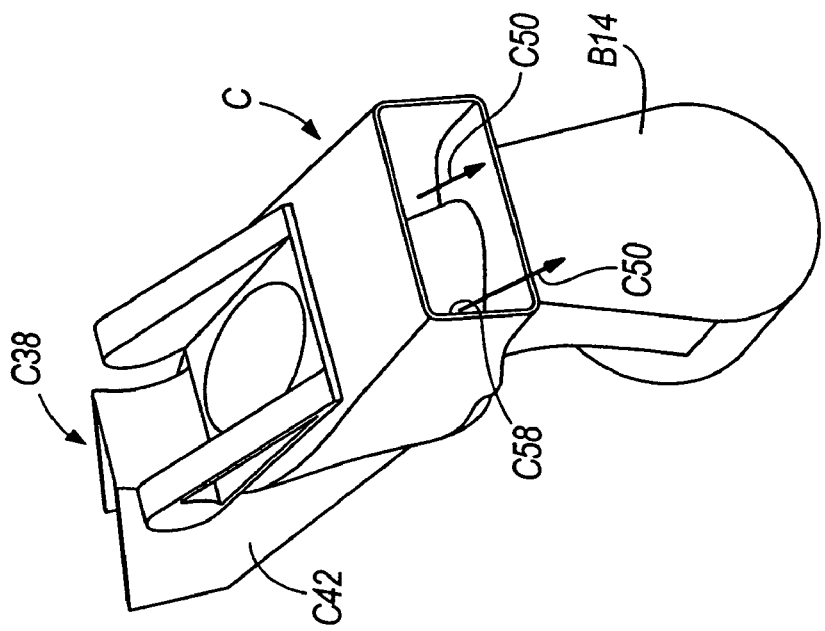
FIGS. 23A-23E are views of a portion of a saw and illustrating a dust chute and arm assembly.
Figure 23A:
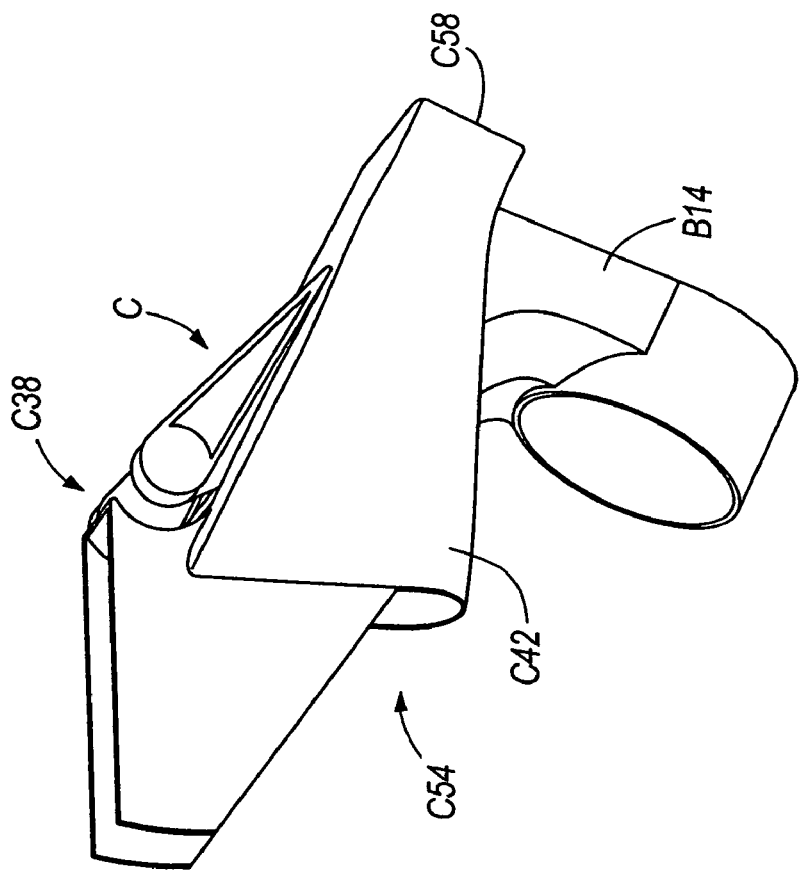
Figure 23D:
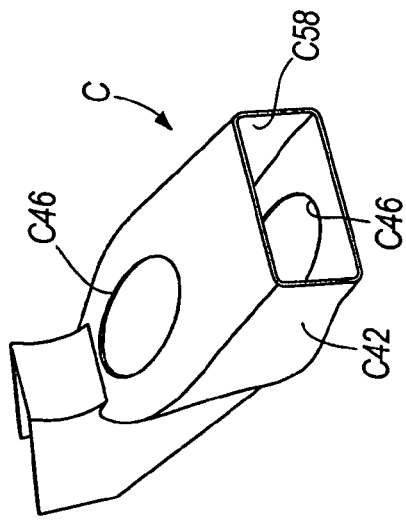
Figure 23E:
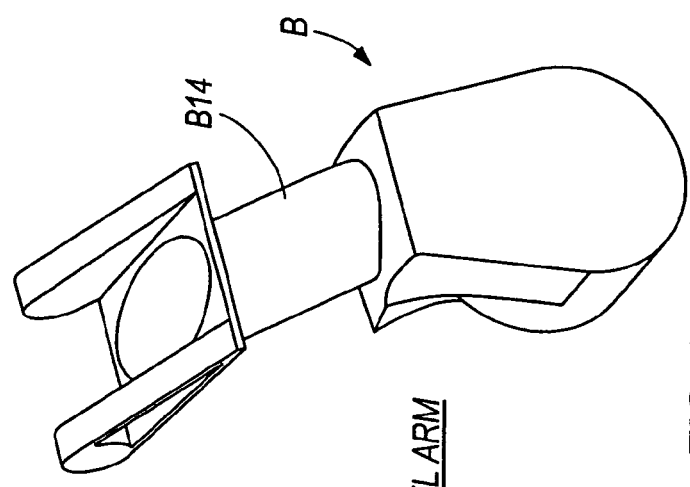
Figure 23C:
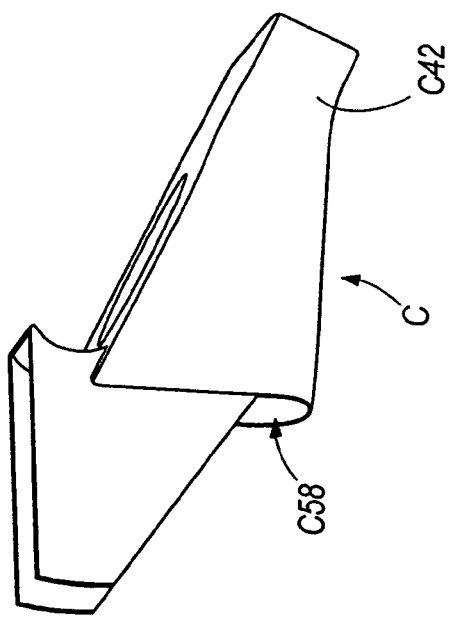
Figure 25G:
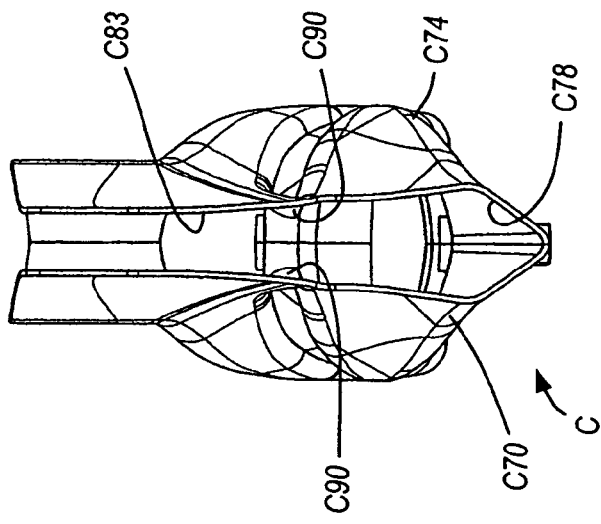
Figure 25F:
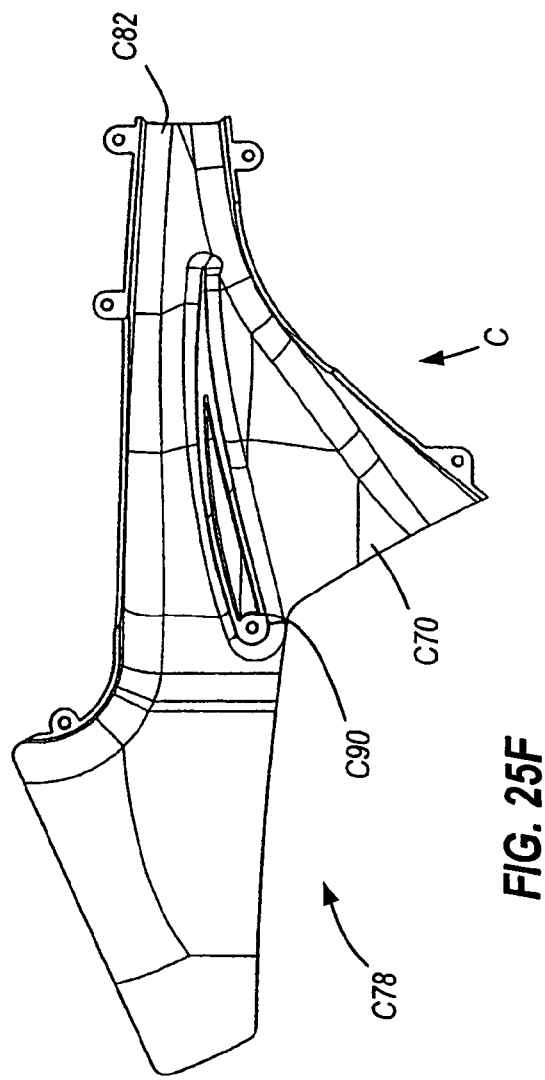
Figure 28A:
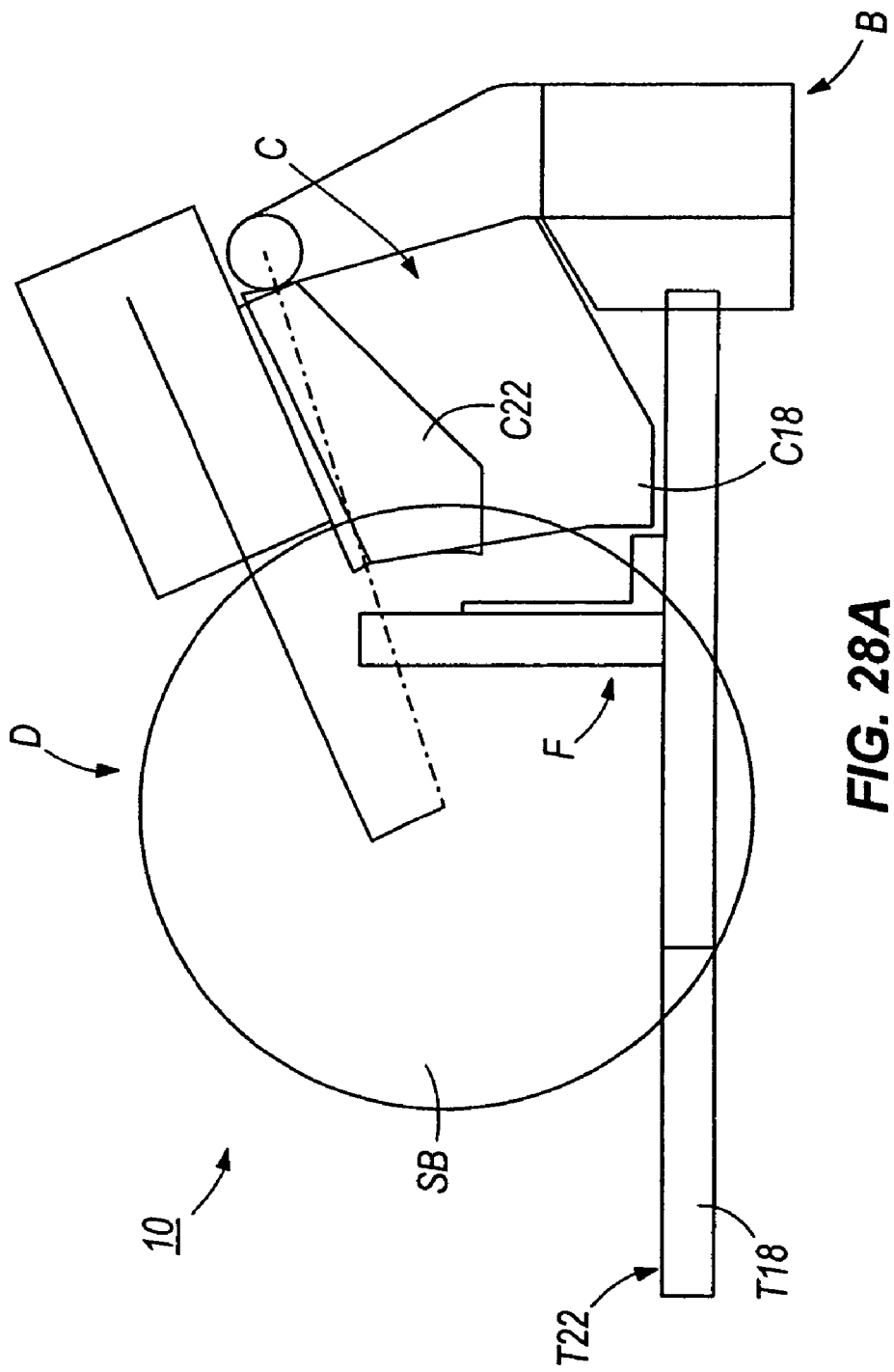
FIGS. 28A-28B are schematic views of a portion of a saw and illustrating a multi-piece dust chute assembly.
Figure 28B:
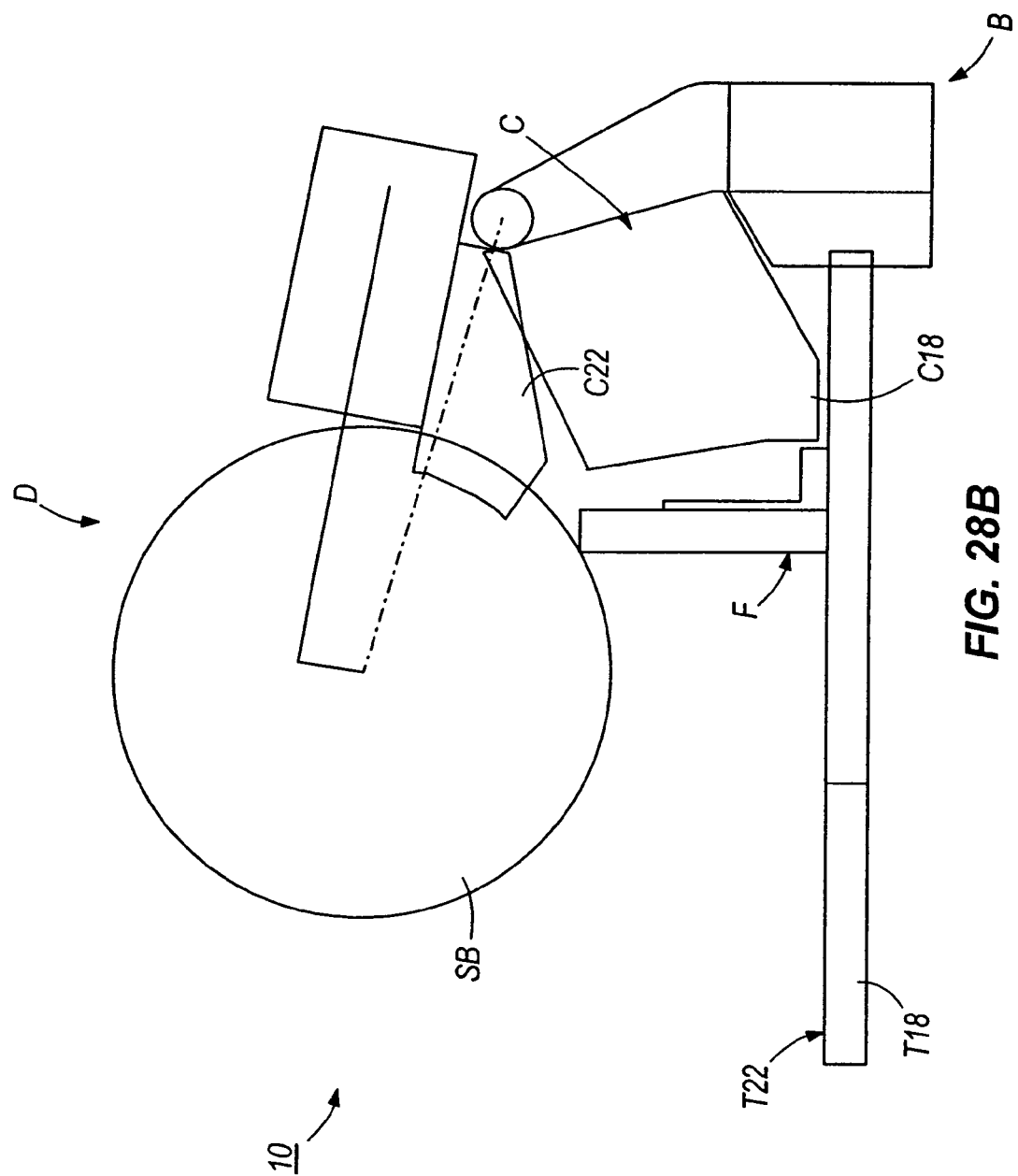
Figure 31D:
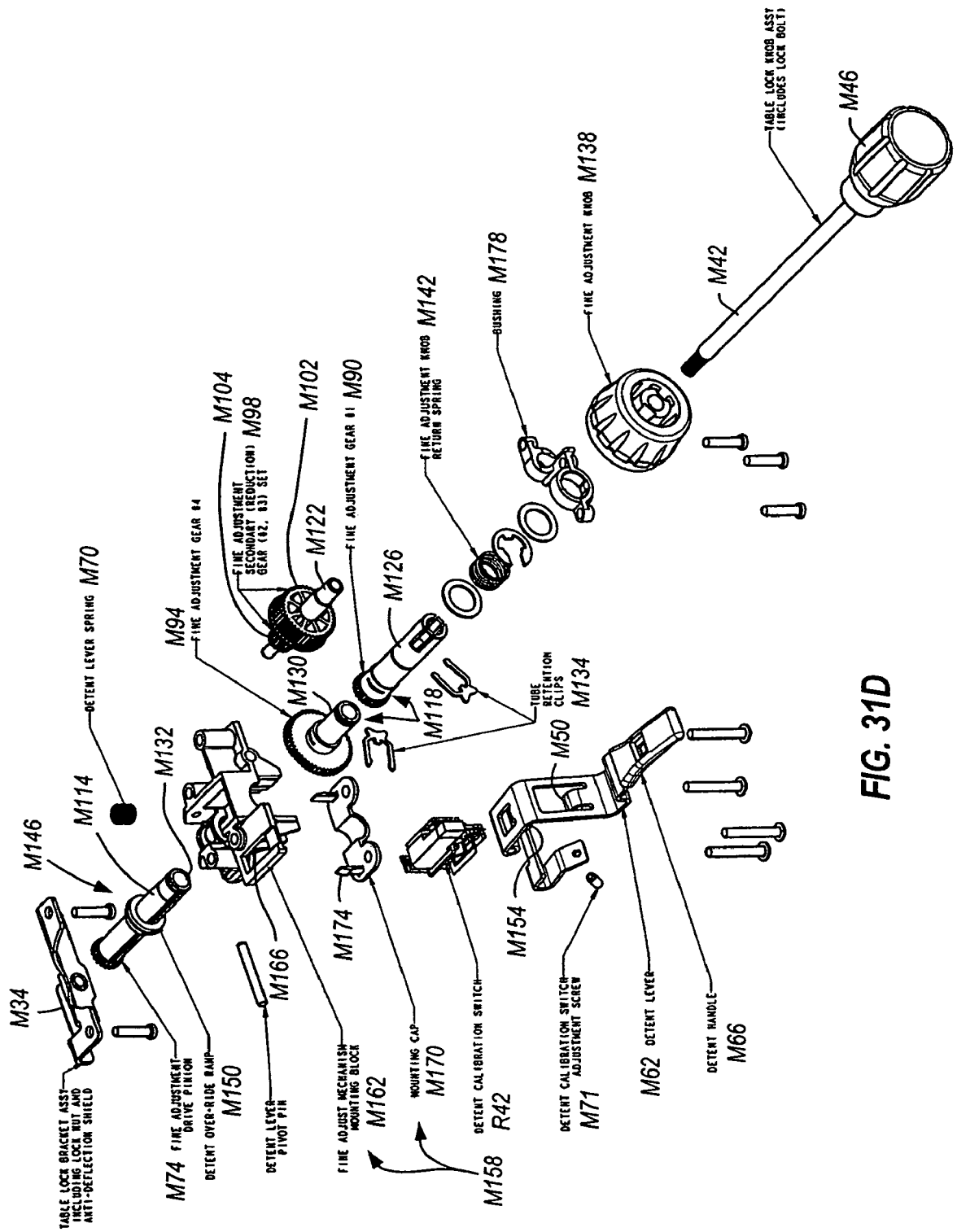
Figure 31I:
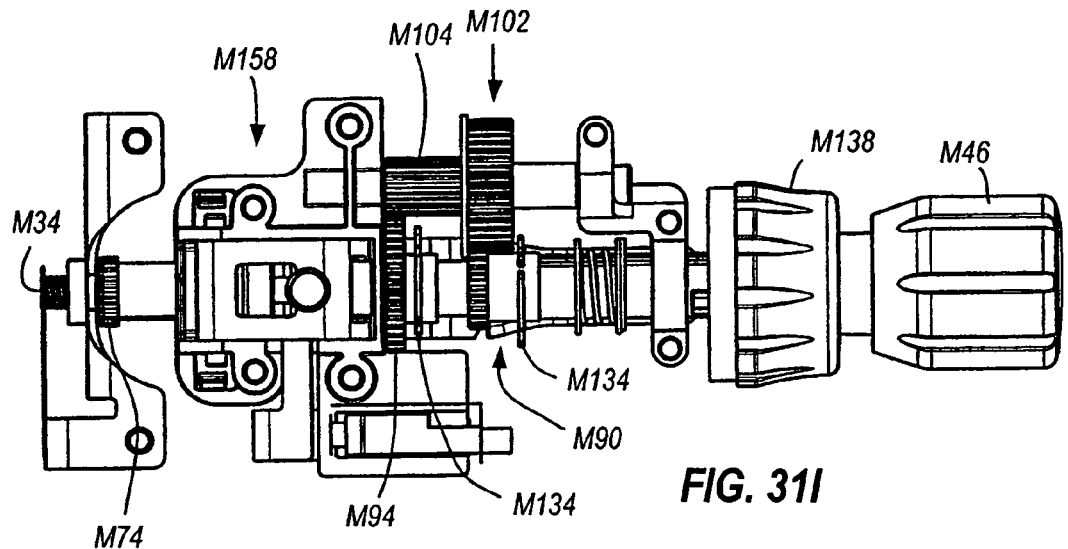
Figure 31G:
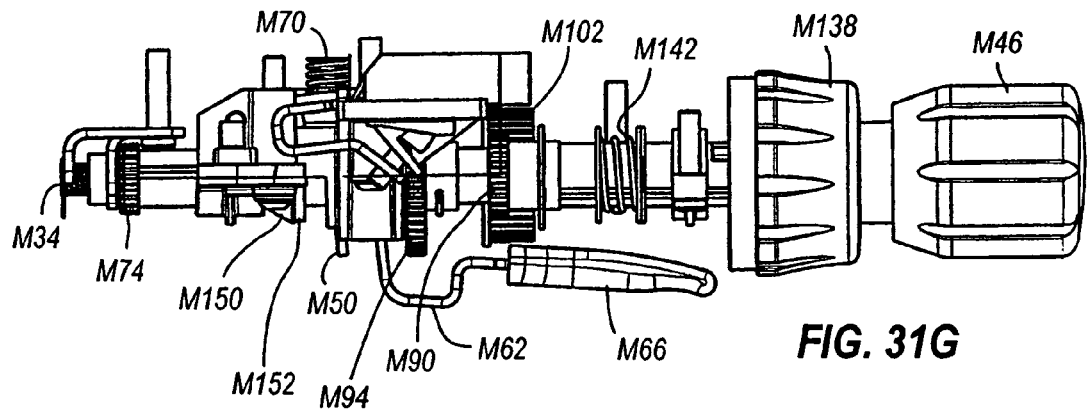
Figure 31J:
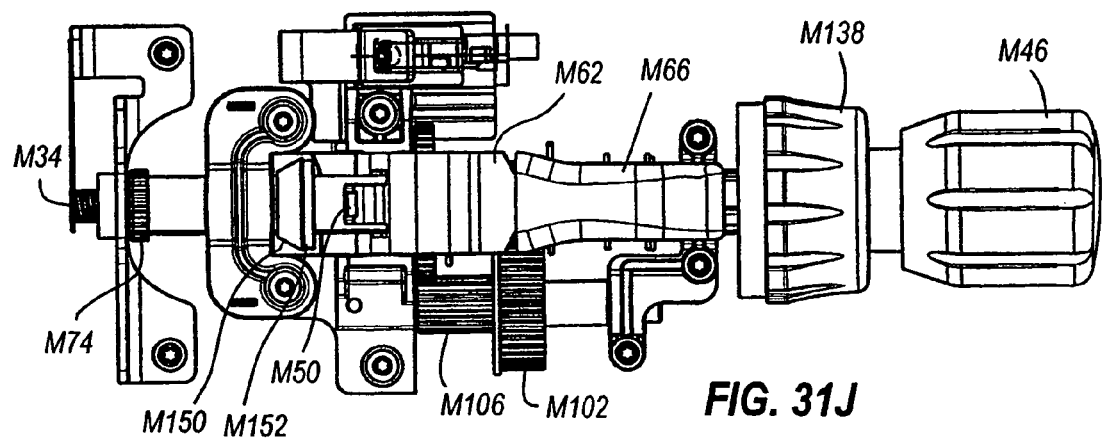

As shown in FIG. 23D, the dust chute C42 defines openings C46 for receiving a portion of the bevel arm B14. When assembled, as shown in FIGS. 23A-23B, the dust chute C42 defines a path C50 on each side of the bevel arm B14 from the chute inlet port C54 to the chute exhaust port C58.

FIGS. 25A-25G illustrate a dust chute assembly C62 for a saw 10, such as a sliding compound miter saw, which includes a dust chute C66 which extends around, rather than through, the bevel arm B14. The dust chute C66 is formed of dust chute portions C70 and C74. The portions C70 and C74 are secured on opposite sides of the bevel arm B14 and cooperate to provide the dust chute C66.

Each portion C70 and C74 provides a portion of the chute inlet port C78 and of the chute exhaust port C82. Each portion C70 and C74 cooperates with the outer surface of the bevel arm B14 to define a path C86 around the bevel arm B14.

A rib C90 is formed on each portion C70 and C74 and extends into the associated path C86 to direct flow through the dust chute C66. Each rib C90 defines a recessed portion C94 to provide a close fit with the outer surface of the bevel arm B14.

A fastening assembly (partially shown) including fastener receiving opening portions C98 secures and seals the dust chute C66 around the bevel arm B14. In some constructions, additional sealing members (not shown), such as flexible gaskets, may be provided at the interface between the portions C70 and C74 to provide a relatively air tight dust chute C66 so that debris can only flow out through the chute exhaust port C82.

A rear dust chute deflector C102 is connectable at the chute exhaust port C82 of the dust chute C66. A connecting assembly C106 is provided to removably connect the deflector C102 to the dust chute C66. In the illustrated construction, the deflector C102 defines an opening C110 which receives a portion of the dust chute C66 (e.g., the rearmost fastener receiving opening portions C98). A lower ledge C114 formed on the deflector C102 may be received by a portion of the dust chute C66 (e.g., a slot).

To attach the deflector C102, the opening C110 receives the portion of the dust chute C66 (e.g., the rearmost fastener receiving opening portions C98). The deflector C102 is then pivoted such that the ledge C114 engages the slot to prevent the rearmost fastener receiving opening portions C98 from disengaging the opening C110.

A debris collector (not shown), such as a bag, a hose, a debris "sock", etc., may be connectable to the outlet C118 of the deflector C102. The outlet C118 may be have a standard configuration and/or may be formed with a portion of a connecting assembly to releasably secure a standard debris collector to the outlet C118.

FIGS. 26A-26E illustrate a dust chute assembly C122 for a saw 10, such as a compound miter saw, which includes a dust chute C66 which extends around, rather than through, the bevel arm B14. The dust chute assembly C122 is similar to the dust chute assembly C62.

FIGS. 17 and 28-30 illustrate constructions of a dust collection assembly C, such as an on-board dust collection assembly.

Figure 17B:
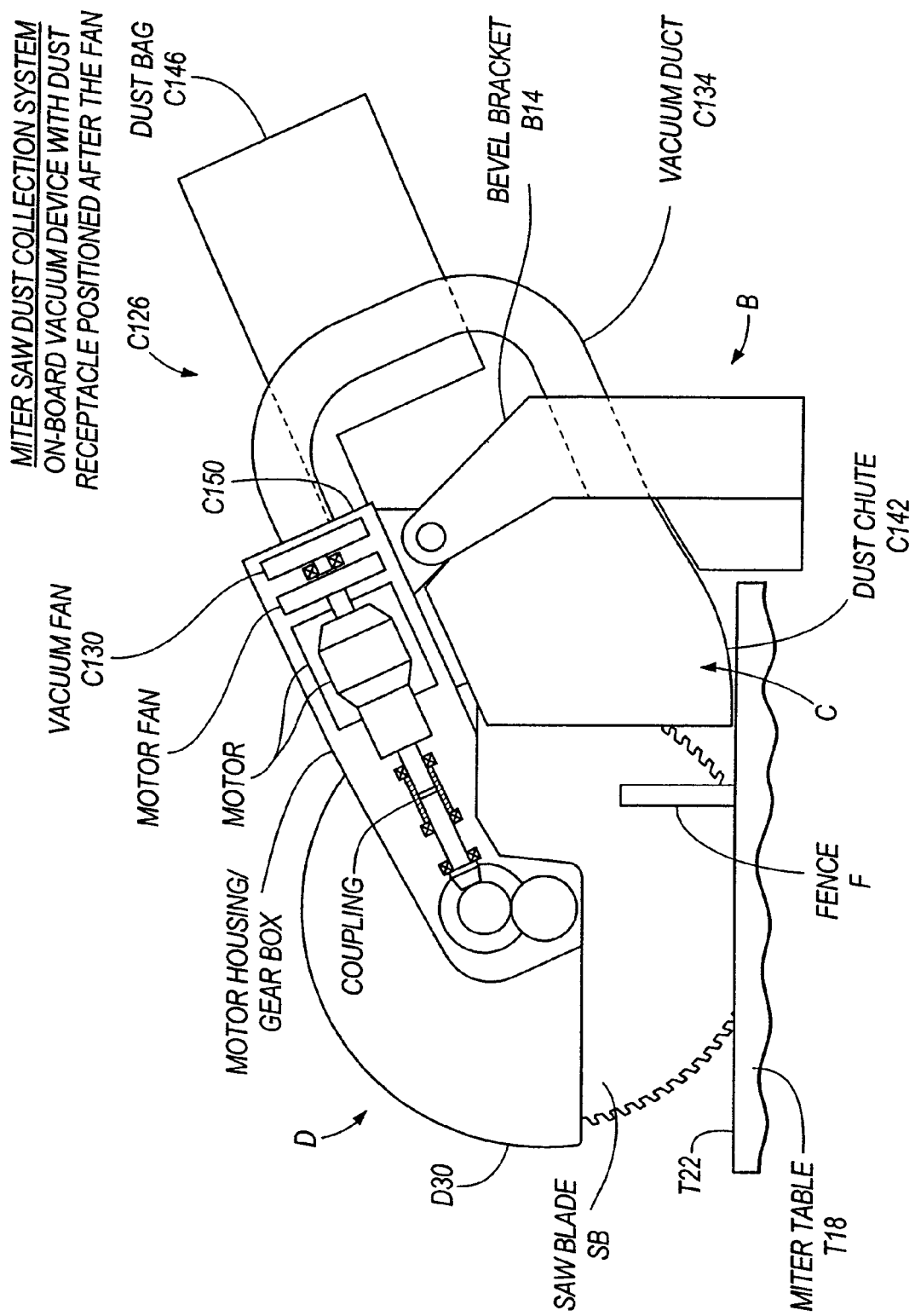
Figure 17E:
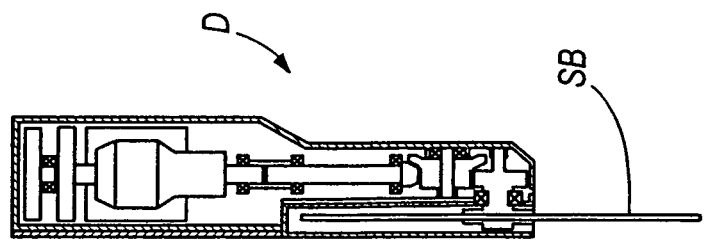
Figure 17D:
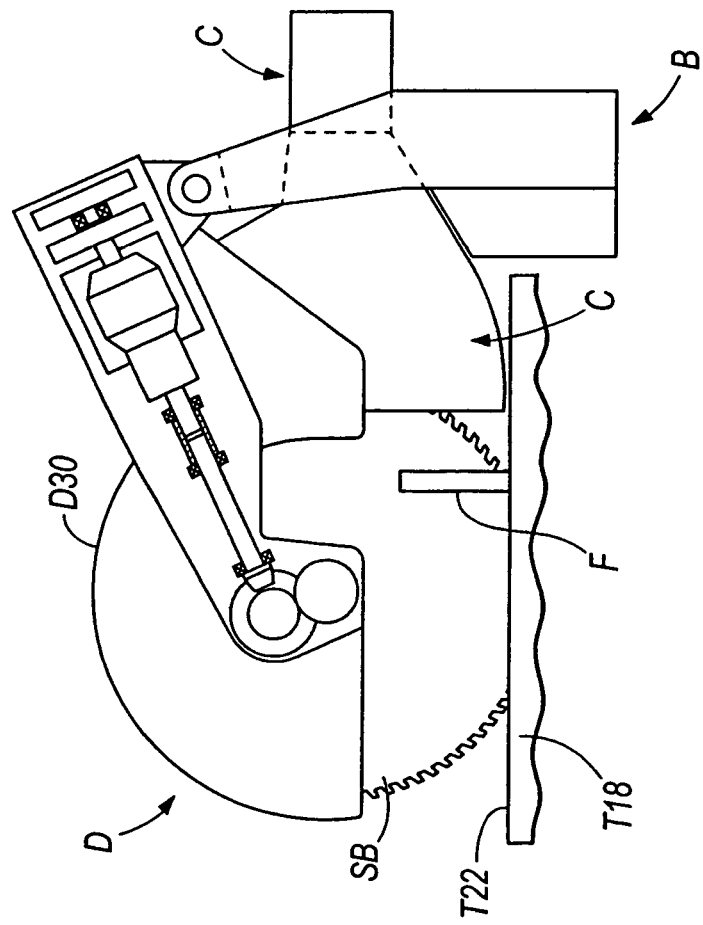

As shown in FIGS. 17A-17B, the dust collection assembly C126 includes a vacuum fan C130 which may be sealed and/or isolated from the fan D50 of the motor D18 but which may be fixed to the end of and drive by the motor shaft D42. Rotation of the motor shaft D42 rotates the vacuum fan C130, which generates an airflow through a vacuum duct C134 toward the vacuum fan C130.

Such an airflow may create a low pressure in a particle separator C138, which, in turn, creates a low pressure in a dust chute C142 positioned proximate the saw blade SB. The low pressure in the dust chute C142 helps to draw dust and debris generated by cutting a work piece WP into the particle separator C138.

The particle separator C138 may be a sealed canister which separates dust particles and chips before the airflow enters the vacuum duct C134 and reaches the vacuum fan C130. The particle separator C138 may be detachable from the saw 10 to allow a user to dispose the dust and debris accumulated in the particle separator C138.

A filter (not shown) may be used to achieve dust and debris separation in the particle separator C138. Alternatively, cyclonic action (similar to that used in some commercial and consumer vacuum cleaners) may be used. As shown in FIG. 17B, if the particle separator C138 does not utilize the filter, a porous dust bag C146 may be attached to the exhaust port C150 of the vacuum fan C130.

A dust sock (not shown) may be coupled to the exhaust port C150. In contrast to the dust bag C146, the dust sock is fairly long (perhaps several feet in length) and can be left open at the downstream end. By leaving the sock open, little or no back pressure is created, and the dust and debris material can be deposited directly and "gently" into an open container or onto the floor. The dust stream energy is dissipated as it moves through the sock, thereby slowing it to a "dribble" before exiting. Alternatively, the sock could have a zipper at the output end so that dust is trapped within. Given the length of the dust sock, and with a relatively porous material, back pressure may be decreased.

FIG. 17C illustrates another construction of a dust collection assembly C150. A single or a multi-stage fan system C154 (shown) may generate an airflow into a Coanda device C158. As shown in FIGS. 17C and 30, the airflow generated by the fan system C154 is forced into a nozzle C162 through a narrow opening or groove at a high velocity, creating a low pressure zone in the nozzle C162. The high velocity air exiting the groove follows the inside curvature of the nozzle C162, resulting in a low pressure zone which "pulls" ambient air into the nozzle inlet C164. A dust chute C166 is positioned proximate the saw blade SB to guide dust and debris into the inlet C164 of the Coanda device C158. The low pressure zone in the nozzle C162 of the Coanda device C158 helps to draw the dust and debris generated by the saw blade SB through the dust chute C166 and into the dust receptacle C170. The air flow exiting the Coanda device C158 has the energy of the two combined air streams.

In yet other constructions of the dust collection assembly (not shown), the dust collection assembly C may include a blower scroll enclosing a dust collection fan. In such constructions, the blower scroll may be an integral component of the saw 10, and the dust collection fan may be driven by the motor shaft D42 as the motor D18 drives the saw blade SB. Also, the blower scroll and dust collection fan may be an assembly retrofitted to existing saws.

During operation of the saw 10, the dust collection fan may generate a vacuum behind the saw blade SB to draw dust away from the work area and into a bag or other container for later disposal. Also, the dust collection fan may be mounted on the motor shaft D42 using overrunning bearings, such that the fan may continue to rotate after the motor shaft D42 and the saw blade SB stop rotating.

FIG. 29 illustrates yet another construction of a dust collection assembly C174. Dust and debris generated by cutting a work piece WP may be electrically charged and a dust chute C178 and/or a dust receptacle C182 may have an opposite charge to attract the charged dust or debris into the dust chute C178 and/or the dust receptacle C182. Such an arrangement may be used separate from or in addition to other constructions of dust collection assemblies C.

FIG. 5A illustrates another construction of a dust collection assembly C186 including a squirrel-cage fan C190 which draws debris into the dust chute C194 positioned adjacent the saw blade SB and which moves the debris into a sawdust collection bag C198 mounted behind the fan C190. In the illustrated construction, the dust chute C194 extends through the bevel arm B14. The dust chute C194 includes a rear portion (not shown) which directs debris downwardly into the collection bag C194.

FIG. 5I illustrates another construction of a dust collection assembly C202 including a dust collector C206 which is removably positioned on the rear of the bevel arm B14. The bevel arm B14 and the dust collector C206 include interengaging portions which selectively hold the dust collector C206 on the bevel arm B14. In the illustrated construction, the dust collector C206 is moved onto the bevel arm B14 and then slid downwardly so that the interengaging portions engage to hold the dust collector C206 on the bevel arm B14. An additional locking arrangement may be provided to further hold the dust collector C206 in place. As shown in FIG. 5J, the rearward portion of the dust chute C210 may be configured to be connectable to a standard hose from a vacuum, such as a wet/dry vacuum. As shown in FIG. 5M, a detachable dust collector C214 may be removably fixed to the bevel arm B14, for example, by a bracket engaging the saw arm.

Miter Adjustment Assembly M

As discussed above, in the constructions illustrated in the figures, the saw 10 is a miter saw, and the table T18 is coupled to the base T14 for pivoting movement about a generally vertical miter axis T30. As shown in FIGS. 1-5, the drive assembly D and saw blade SB are coupled to the table T18 for pivoting movement with the table T18 relative to the base T14 to allow the saw blade SB to perform various angled miter cuts on a work piece WP supported on the table T18 and/or on the base T14. The saw 10 may include a miter angle adjustment assembly M providing for adjustment of the angle of the saw blade SB relative to the work piece WP about the generally vertical miter axis T30.

When using a miter saw, a user sometimes needs to adjust their cut slightly from a known or unknown starting angle (e.g., an angle corresponding to a miter detent position, the angle used for earlier cuts on associated work pieces, etc.). With conventional miter saws, the operator must slightly move (e.g., gently tap the side of the table) the table in small angular increments. This may not be an accurate or repeatable method for making a slight angular change. Furthermore, several motions are usually involved in locking and unlocking the table to the base to prevent movement of the table once the angle is set. Therefore, extra effort may be required by an operator who needs to make an angle adjustment at or near a detent in a conventional miter saw.

Accordingly, in many constructions illustrated in the figures, the miter adjustment assembly M includes a coarse adjustment assembly M14, for making relatively large angular adjustments of the miter angle, and a fine adjustment assembly M18, for making accurate and/or repeatable incremental adjustments of the miter angle. The miter angle may be indicated on a miter scale M20.

FIGS. 31A-31J illustrate a construction of a miter adjustment assembly M including a coarse adjustment assembly M14 and a fine adjustment assembly M18.

As shown in FIG. 31A-31D, the coarse adjustment assembly M14 includes a miter locking assembly M22 and a miter detent assembly M26. In the illustrated construction, the miter locking assembly M22 enables the user to lock the table T18 in substantially any available miter angle position relative to the base T14. The miter locking assembly M22 generally includes inter-engaging locking surfaces between the table T18 and the base T14. In the illustrated construction, one locking surface is provided by a lock wall M30 on the base T14, and the other locking surface is provided by a lock bracket M34 supported by the table T18.

A locking actuator assembly M38 selectively causes locking of the lock bracket M34 to the lock wall M30. In the illustrated construction, the assembly M38 includes a threaded lock bolt M42 and a lock knob M46 for threadedly adjusting the lock bolt 42. The lock bolt M42 has an aggressive double lead thread, and the lock bracket M34 also acts to shield the lock wall M30 so that the lock bolt M42 does not "walk" on the lock wall M30 as it is tightened, which may normally affect the accuracy of the miter angle position.

In operation, from a locked position, the user operates the assembly M38 to reduce the force between the lock bracket M34 to the lock wall M30 to allow the table T18 to move relative to the base T14. The user adjusts the position of the table T18, for example, by pushing the miter handle M46 at least partially provided by the tongue T78 to the left or right to the desired miter angle position. The user then operates the assembly M38 to increase the force between the lock bracket M34 to the lock wall M30 to lock the table T18 in a miter angle position relative to the base T14. Again, in the illustrated construction, the selected miter angle position may be substantially any available miter angle position.

It should be understood that, in other constructions, other locking members may be provided between the table T18 and the base T14. Also, a different locking actuator assembly M38 having a different locking motion or action (e.g., pivoting, non-rotating linear movement, etc.) may be provided.

The miter detent assembly M26 provides the user with an arrangement to position the table T18 in one or more selected miter angle positions relative to the base T14 (e.g., 0 degrees; left 15 degrees, 22.5 degrees, 30 degrees and 45 degrees; right 15 degrees, 22.5 degrees, 30 degrees, 45 degrees, and 60 degrees; etc.). The assembly M26 generally includes a detent projection M50 which is selectively engageable in one or more detent notches or recesses M54 each of which correspond to a selected miter angle position. In the illustrated construction, the recesses M54 are provided by the base T14 (e.g., formed on the miter scale M20), and the projection M50 is supported by the table T18.

The assembly M26 includes a detent actuator assembly M58 for moving the projection M50 between a detent engaged position, in which the projection M50 engages a recess M54, and an out-of-detent or detent disengaged position, in which the projection M50 is not engaged with a recess M54. In the illustrated construction, the assembly M58 includes a lever M62 connected to the projection M50 and a handle M66 engageable by the user.

A biasing member, such as a spring M70, biases the projection M50 toward the detent engaged position. In the illustrated construction, the spring M70 engages the lever M62 to bias the lever M62 to a position corresponding to the detent engaged position.

To operate the detent assembly M26, the user unlocks the miter locking assembly M22. The user then lifts the handle M66 to lift the projection M50 out of the recess M54. The user adjusts the position of the table T18, for example, by pushing the miter handle M46 at least partially provided by the tongue T78 to the left or right to the desired miter angle position. If the user continues to engage the handle M66, thereby overcoming the biasing force of the spring M70, the projection M50 will not engage subsequent recesses M54 as it passes. If the user releases the handle M66, the biasing force of the spring M70 will cause the projection M50 to engage the next recess M54 it passes. At the desired miter angle position (either with the projection M50 engaged with a recess M54 or not), the user then locks the assembly M22.

In the illustrated construction, the miter detent assembly M22 operates to hold the table T18 in the selected miter angle position unless the detent actuator assembly M58 is operated by the user to disengage the detent projection M50 from the detent recess M54.

In other constructions, the detent assembly M22 may provide a fairly weak detent engagement which may be overcome by the user, for example, by pushing on the tongue T78 to adjust the miter angle position. Such a weak detent engagement may be provided by a weak biasing force applied to the projection M50, by angled, ramp surfaces between the projection M50 and the recesses M54, etc.

As discussed below, the saw 10 includes a switch R42, such as a detent calibration switch, which is used by the digital readout arrangement R to calibrate the sensing of the position of the detent recesses M54. In the illustrated construction, an adjustment assembly, such as a detent calibration switch adjusting screw M71, is provided to adjust the position and/or actuation of the switch R42.

As shown in FIGS. 31A-31D, the fine adjustment assembly M18 generally includes inter-engaging members which are relatively movable to cause small incremental movement of the table T18 relative to the base T14. In the illustrated construction, the assembly M18 includes an assembly of a rolling or rotating member, such as a pinion M74, which moves along a surface, such as a rack M78. The rack M78 is supported by the base T14 behind the miter scale M20 and has an arcuate shape. The pinion M74 is supported by the table T18, and rotating engagement of the pinion M74 and the rack M78 causes small incremental movement of the table T18 relative to the base T14 and fine adjustment of the miter angle position.

The assembly M18 also includes an fine adjustment actuator assembly M82 for causing rotating movement of the pinion M74 along the rack M78. In the illustrated construction, the assembly M18 includes a fine adjust drive assembly M86. The assembly M86 is operable between a fine adjust mode, in which the assembly M86 is configured to provide driving engagement to the pinion M74, and a disengaged mode, in which the assembly M86 is not configured to drive the pinion M74.

In the illustrated construction, the assembly M86 includes a drive gear M90 and a driven gear M94. A gear reduction assembly M98, including gears M102 and M106, is provided between the gears M90 and M94.

A tube assembly M110 supports the pinion M74 and the gears M90, M94, M102 and M106. In the illustrated construction, a tube assembly M118 supports the pinion M74 and the gears M90 and M94, and a gear reduction tube M122 supports the gears M102 and M106. The tube assembly M118 includes a pinion tube M114 supporting the pinion M74, a drive gear tube M126 supporting the drive gear M90 and a driven gear tube M130 supporting the driven gear M94. In the illustrated construction, the tube M126 is rotatable relative to the tube M130, which is rotatably keyed to the tube M114 by inter-engaging flat surfaces M132.

To provide selective engagement of the assembly M86, the driving engagement between the pinion M74 and the rack M78 is disengageable. Also, the tube assembly M118 is movable relative to the rack M78 to selectively engage the pinion M74 and the rack M78. In the illustrated construction, the tube assembly M118 and the supported pinion M74 are slidable relative to the rack M78. The pinion M74 is movable between a driving position, in which the pinion M74 and the rack M78 are engaged, and a disengaged position, in which the pinion M74 is slid out of engagement with the rack M78.

Also, the tube assembly M118 is movable relative to the tube M122 to selectively engage the gear M90 and the gear M102. In the illustrated construction, the tube M126 and the gear M90 are slidable relative to the axially-fixed tube M122 and the axially-fixed gear M102. The gear M90 is movable between a driving position, in which the gears M90 and M102 are engaged, and a disengaged position, in which the gear M90 is slid out of engagement with the gear M102.

In the illustrated construction, the tube M130 and the gear M94 are slidable with, while being relatively rotatable to, the tube M126 and the gear M90. To retain the tubes M126 and M130 as the assembly M118 and slidable with the tube M114, tube retention clips M134 engage at the interface between tubes M126 and M130 and between tubes M130 and M114. The tubes M126, M130 and M114 are axially slidable relative to the table locking bolt M42 which extends through the tubes M126, M130 and M114.

The fine adjustment actuator assembly M82 also includes an actuator portion or knob M138 which is engageable by the user to engage the fine adjust drive assembly M86 and to operate the fine adjust drive assembly M86 to finely adjust the miter angle position. The knob M138 is moved axially to selectively engage the assembly M86 and then is rotated to operate the assembly M86.

A biasing member, such as a spring M142, biases the assembly M86 to the disengaged mode. In the illustrated construction, the spring M142 biases the knob M138 axially away from the table T18 so that the gear M90 is biased out of engagement with the gear M102.

In the illustrated construction, the fine adjustment drive assembly M86 also includes a detent override assembly M146 to disengage the projection M50 from and hold the projection M50 out of engagement with the recess(es) M54. The assembly M146 includes a ramp M150 and an annular notch M152 both of which are engageable with a portion M154 of the lever M62.

As the knob M138 is moved inwardly to engage the fine adjust drive assembly M86, the portion M154 of the lever M62 moves upwardly along the ramp M150, lifting the projection M50 from engagement with the recess(es) M54. When the portion M154 engages the notch M152, the portion M154 is prevented from moving downwardly to allow engagement of the projection M50 with a recess M54. The user may rotate the knob M138 to operate the assembly M86 to finely-adjust the miter angle position.

Engagement of the portion M154 in the notch M152 also maintains the assembly M86 in the fine adjust mode. Slight rearward pressure on the knob M138 disengages the portion M154 from the notch M152 allowing the assembly M86 to move outwardly to the disengaged position. This also allows the portion M154 of the lever M62 to move downwardly along the ramp M150, returning the projection M50 to a recess-engageable condition.

As shown in FIGS. 31A-31J, a housing assembly M158 is provided to retain at least a portion of the miter adjustment assembly M, such as the fine adjustment assembly M18, as a unit. The assembly M158 includes a mounting block M162 receiving and supporting the tubes M126, M130, M114 and M122 and thus supporting the connected components. The block M162 defines recesses M166. A mounting cap M170 includes snaps M174 which are engageable in the recesses M166 to retain the cap M170 on the block M162 and to retain the supported components of the assembly M18. The housing assembly M158 and supported and retained components of the fine adjustment assembly may then be connected as a unit to the table T18.

A bushing M178 cooperates to maintain axial alignment of the tube M1122 with the tubes M126, M130 and M114. FIGS. 32A-32E illustrate an alternative construction of a bushing M182. The bushing M182 includes a flexible side wall M186 which allows radial movement between the tube M122 (and the gear M102) and the tube M126 (and the gear M90). This arrangement provides a clutch to selectively disengage the gears M90 and M102 when an applied force is too great.

Figures 33A, 33B:
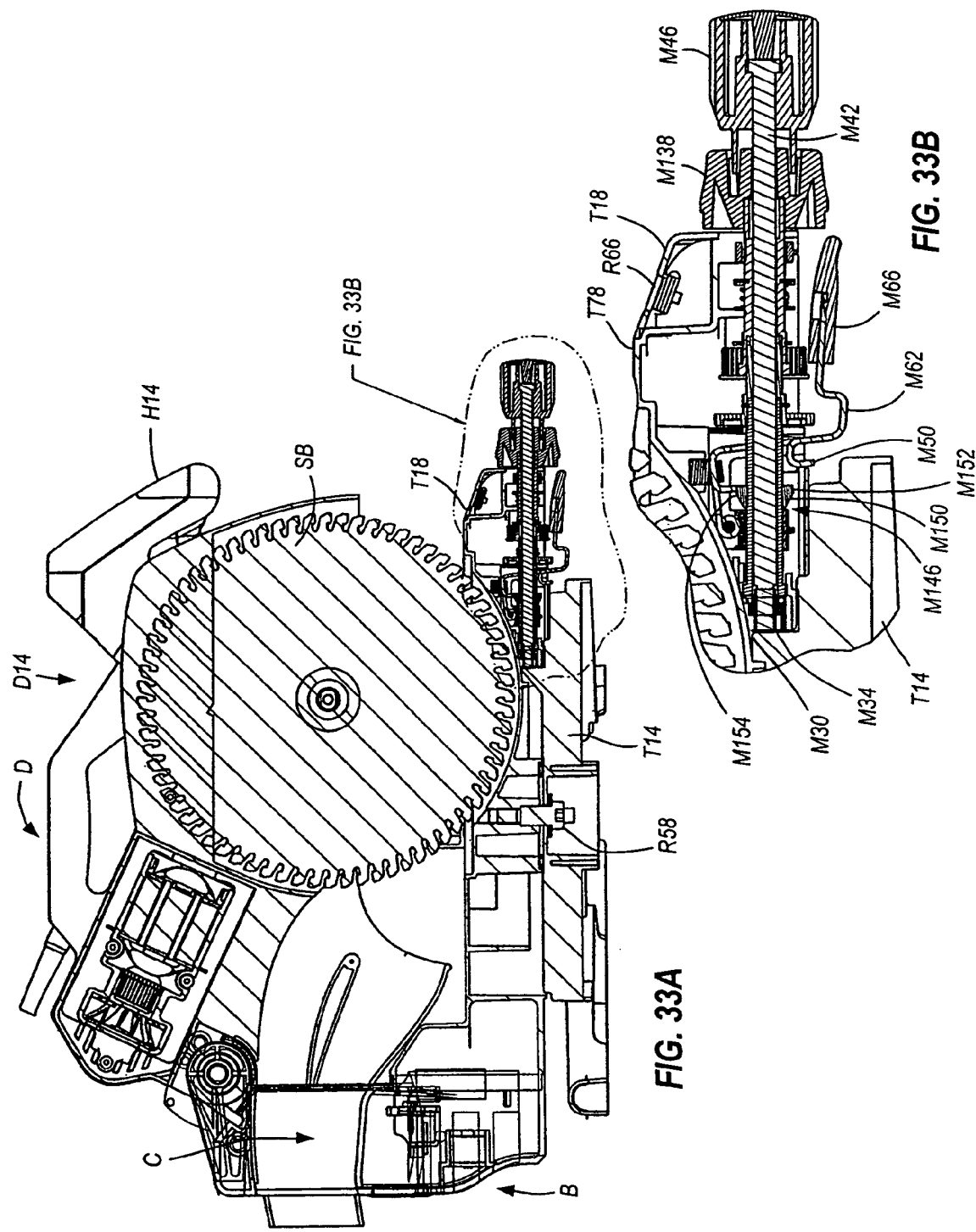

FIGS. 33A-33F illustrate operation and various positions and conditions of the miter adjustment assembly M including a coarse adjustment assembly M14 and a fine adjustment assembly M18. FIGS. 33A-33B and 33E-33F illustrate the miter locking assembly M22 in the locked position, and FIGS. 33C-33D illustrate the assembly M22 in the unlocked position. FIGS. 31A-31B, 33D and 33F illustrate the fine adjustment assembly M18 in the engaged position, and FIGS. 33C and 33E illustrate the assembly M18 in the disengaged position.

Figure 34:
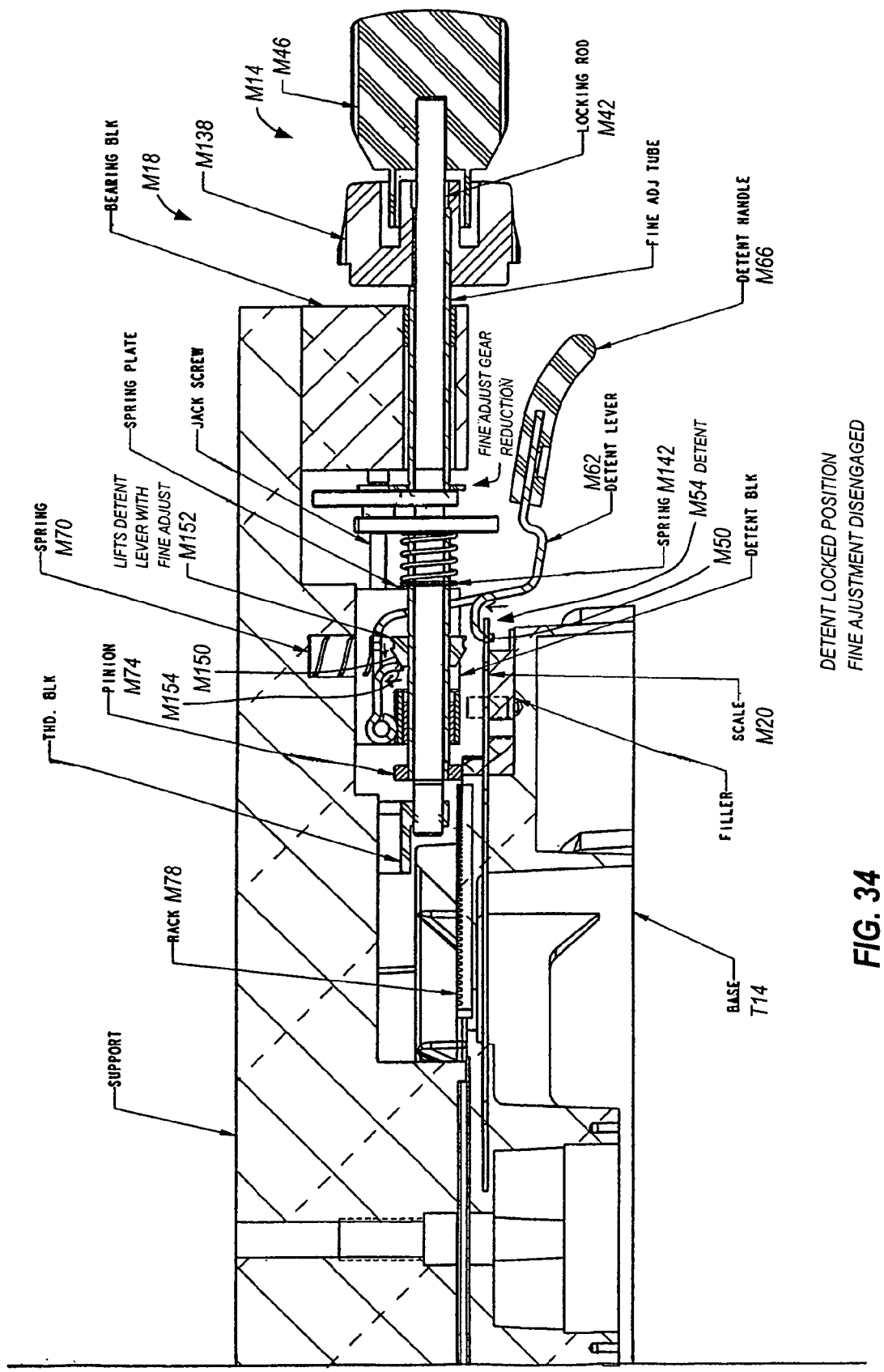
FIG. 34 is a side view similar to that in FIG. 33C and illustrating another construction of a fine adjustment assembly.

FIG. 34 illustrates an alternate construction of a miter adjustment assembly M including a coarse adjustment assembly M14 and a fine adjustment assembly M18. As illustrated, the miter detent assembly M26 is in the detent engaged position, the miter locking assembly M22 is in the unlocked position, and the fine adjustment assembly M18 is in the disengaged position.

FIGS. 35A-35C illustrate a fine adjustment assembly M18 including a fine adjustment sine clutch M186. The clutch M186 is between the pinion M74 and the tube M114, and, if a force is too great, the clutch M186 allows relative rotation between the pinion M74 and the tube M114. As such, the pinion M74 is not required to disengage from and then re-engage the rack M78 as the fine adjustment assembly M18 moves between the engaged and disengaged positions. Also, the clutch M186 may prevent stripping of the toothed gear members if the force applied is too great (e.g., because the miter locking assembly M22 is in the locked position).

Figure 36D:
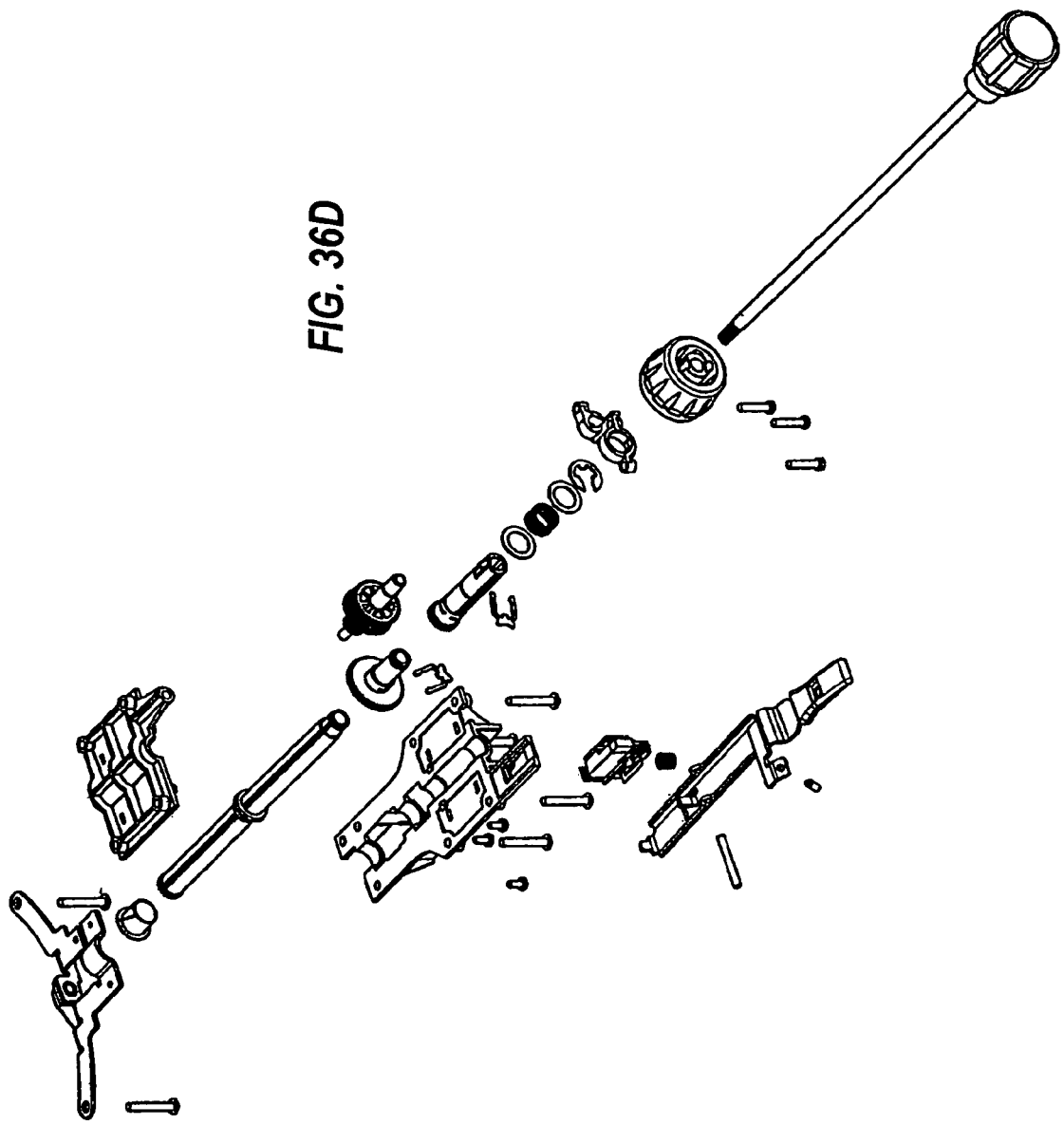

FIGS. 36-37 illustrate structure for and operation of an alternate construction of a miter adjustment assembly M for a sliding miter saw 10 including a coarse adjustment assembly M14 and a fine adjustment assembly M18.

FIGS. 38A-38B illustrate an alternate construction for a portion of the fine adjustment assembly M18. In the illustrated construction, the assembly M18 includes a harmonic drive assembly M190 which replaces the gear reduction assembly provided by the gears M90, M94, M102 and M106. An indicator assembly, such as an audible indicator M194, provides audible feedback to the user as the assembly M190 is operated.

FIGS. 39A-39E illustrate yet another construction of a fine adjustment mechanism M18. A clutch mechanism M198 may be incorporated into the gear train to allow the pinion M74 to remain engaged with the rack M78 during coarse or macro-adjustment of the miter angle.

The clutch mechanism M198 may include a plug M202 that is selectively frictionally engageable with a cup M206 formed in one end of a pinion shaft M210 rotatably supported by the table T18. The pinion shaft M210 may also carry the pinion M74 that is engageable with the rack M78. The plug M202 is coupled to a clutch shaft M214 that is also rotatably supported by the table T18. Alternatively, the plug M202 may be coupled to the pinion shaft M210, and the cup M206 may be formed in the shaft M214.

The plug M202 may be biased into engagement with the cup M206 by a biasing member (e.g., a compression spring M218 (FIG. 39B). A worm gear M222 is fixed to the clutch shaft M214 and engageable with a worm pinion M226, which is coupled to a knob M138 or other actuator. An analog indicator M230 is provided with the knob M138 to indicate adjustment of the miter angle position. The indicator M230 may be similar to that used for fine adjustment of the depth of a router.

Figure 39A:
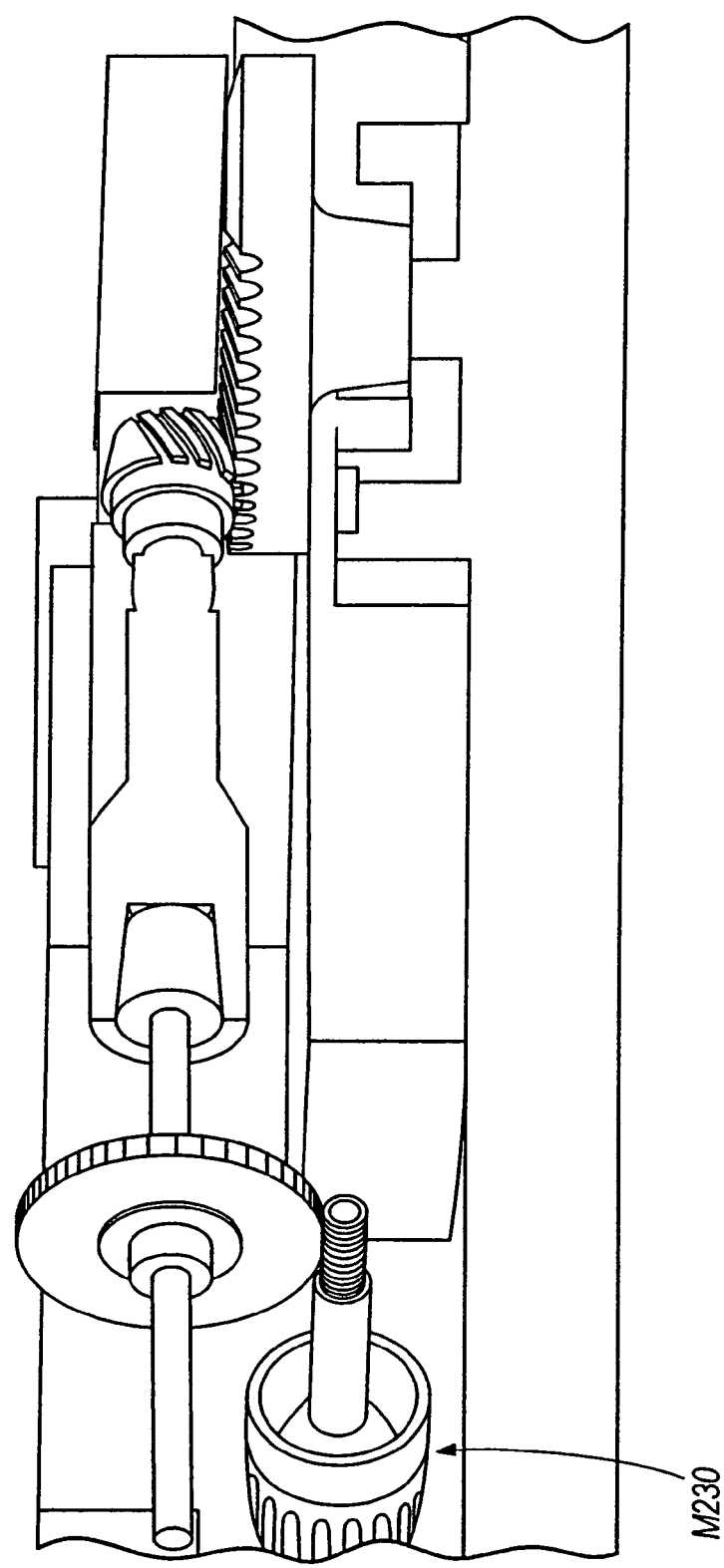
Figure 40A:
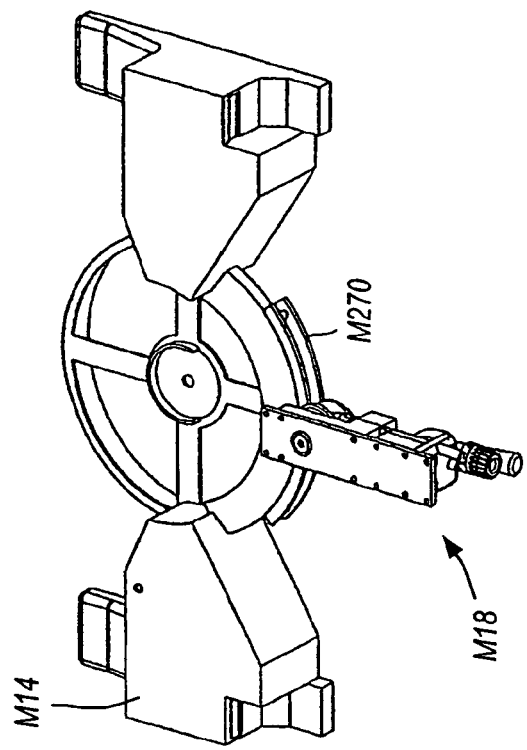
FIGS. 40A-40G are views of another construction of a fine adjustment assembly.
Figure 40B:
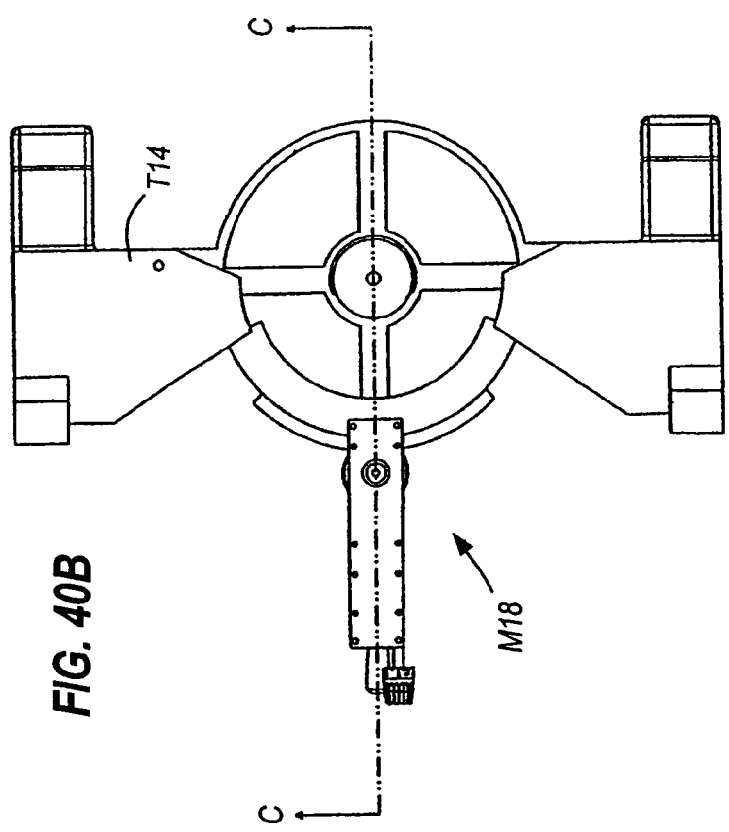
Figure 40C:
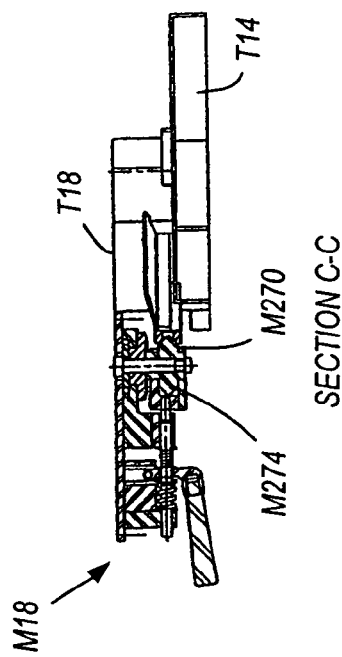
Figure 40D:
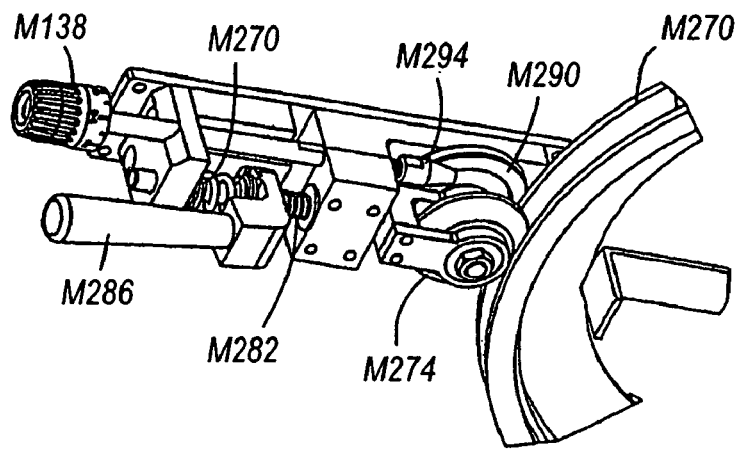
Figure 40E:
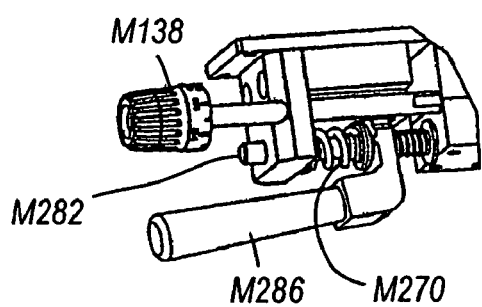
Figure 40G:
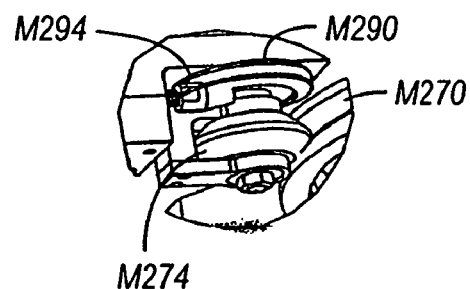
Figure 40F:
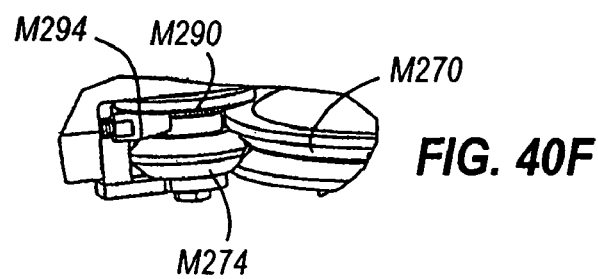
Figure 41A:
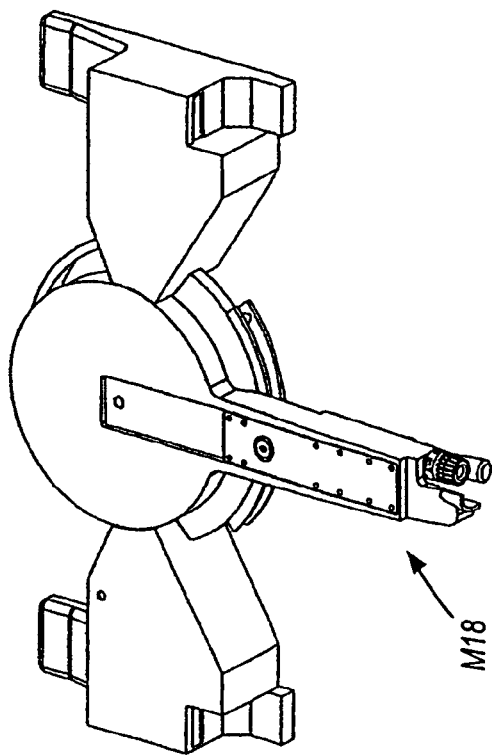
FIGS. 41A-41G are views of yet another construction of a fine adjustment assembly.
Figure 41B:
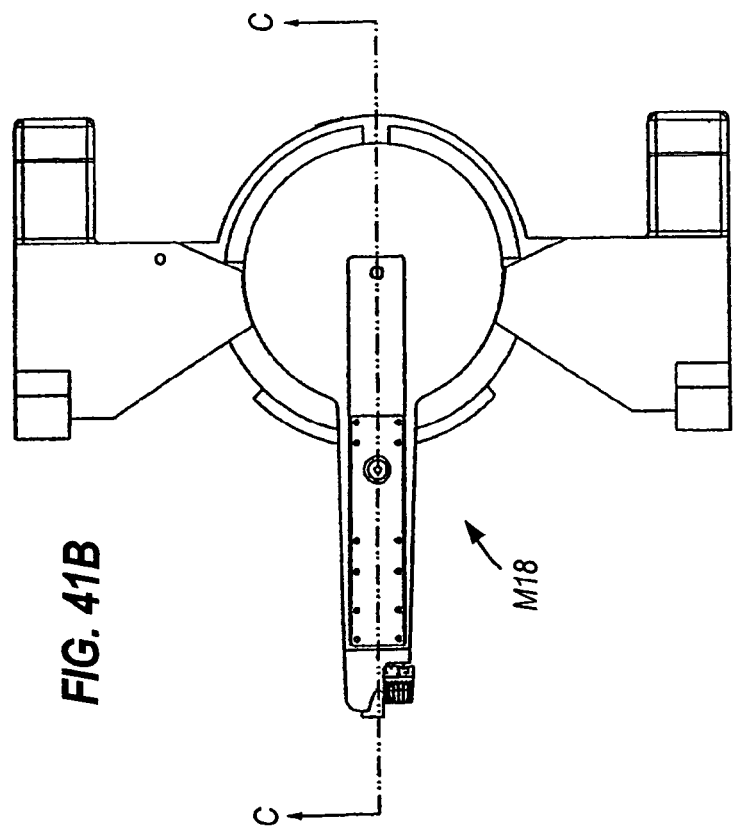
Figure 41C:
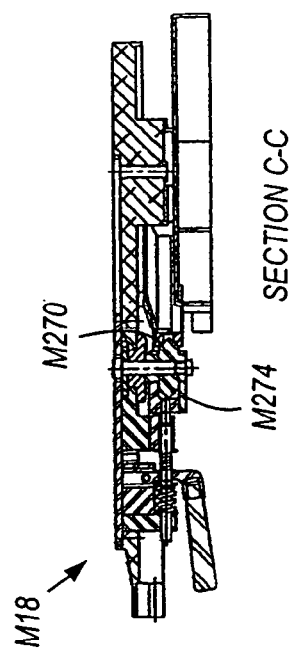
Figure 41D:
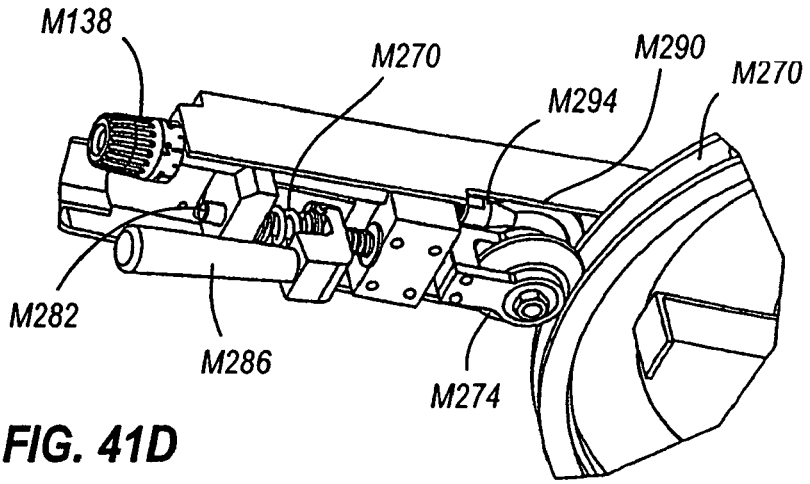
Figure 41E:
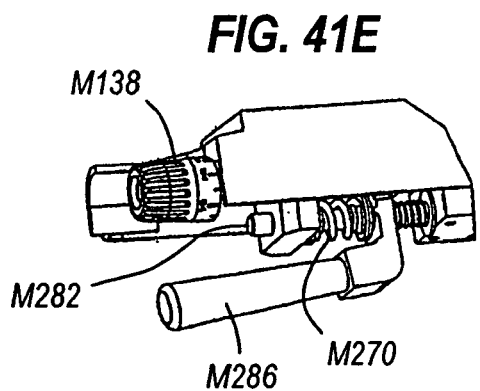
Figure 41G:
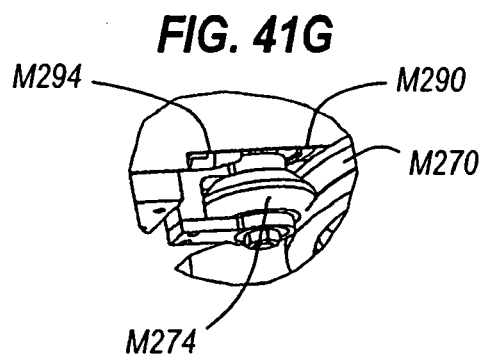
Figure 41F:
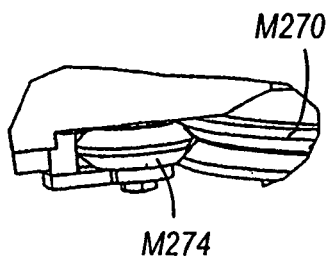

With reference to FIG. 39A, during operation of the fine adjustment assembly M18, rotation of the knob M138 imparts a rotation or a torque to the shaft M214 through the worm gear M222 and the pinion M226. When the clutch mechanism M198 is engaged (i.e., the plug M202 engages the cup M206), the shaft rotation or torque is transmitted to the pinion shaft M214 through the clutch mechanism M198. Accordingly, the pinion M74 is rotated relative to the fixed rack M78 to cause rotation of the table T18 relative to the base T14.

A first stage reduction may be provided by the worm gear M222 and the pinion M226, and a second stage reduction may be provided by the pinion gear M74 and the rack. M78. Alternatively, a single stage reduction may be utilized, or additional stages of gear reduction may be utilized.

To override the fine adjustment assembly M18 to make macro adjustments, the clutch mechanism M198 may be disengaged. More particularly, the plug M202 may be moved out of engagement with the cup M206 by retracting the clutch shaft M214 against the bias of the spring M218. With reference to FIG. 39B, the worm gear M222 may be keyed to the shaft M214 such that the gear M222 may remain fixed relative to the worm pinion M226 and the shaft M214 may move relative to the worm gear M222.

FIG. 39B also illustrates a detent override assembly M146 in combination with the fine adjustment assembly M18. A lever M234 or other actuator may be coupled to the clutch shaft M214 to selectively disengage the clutch mechanism M198. As shown in FIG. 39C, a portion of the clutch shaft M214 may be engageable with a leaf spring M238, which in turn biases a ball M242 into a detent recess M54 formed on the base T14. A compression spring M246 (or another spring member either separate from or integral with the leaf spring M238) is positioned between the ball M242 and the leaf spring M238.

When it is desired by the operator to perform a macro adjustment of the table T18, the operator may grasp and pivot the lever M234 upwardly to retract the clutch shaft M214 from the pinion shaft M210, thereby disengaging the clutch mechanism M198. Also, the clutch shaft M214 may disengage the leaf spring M238 such that the biasing force on the ball M242 is substantially decreased. The ball M242 may then be allowed to move in and out of the detent recesses M54 formed in the base T14 during macro adjustment of the table T18.

However, when it is desired by the operator to lock the table T18 to the base T14, the operator may release the lever M234 to allow the compression spring M246 to return the clutch shaft M214 to a position in which the clutch mechanism M198 is engaged. Also, the clutch shaft M214 may re-engage the leaf spring M238 to apply additional biasing force to the ball M242 to remain in the detent M54. A supplemental miter lock, such as the miter locking assembly M22, may also be utilized in addition to the mechanical advantage provided by the fine adjustment assembly M18.

FIGS. 39D-39E illustrate another construction of the clutch mechanism M250 that may be utilized in the fine adjustment mechanism M18 shown in FIGS. 31A-31C. The clutch mechanism M250 includes a tapered ring M254 fixed to a first shaft, a ball assembly M258, and a hub M262 fixed to a second shaft.

During operation of the clutch assembly M250, the ring M254 axially moves in and out of engagement with the ball assembly M258. Due to the taper of the ring M254, the balls M266 are displaced radially outwardly when the ring M254 is moved toward the ball assembly M258, thus causing the balls M266 to engage the ring M254 and lock the first shaft to the second shaft. Further, when the ring M254 is moved away from the ball assembly M258, the balls M266 disengage the ring M254 to allow relative movement between the first and second shafts.

FIGS. 40-41 illustrate a further construction of a fine adjustment assembly M18. An arcuate rack M270 is fixed to the base T14, and a selectively movable pinion M274 is connected for rotation relative to the table T18. The pinion M274 is biased into engagement with the rack M270 by one or more springs M278 coaxial with a shaft M282 supporting the pinion M274 in the table T18.

A lever M286 or other actuator is connected to the shaft M282 to pivot against the table T18 to disengage the pinion M278 from the rack M274 (i.e., move the pinion M278 away from the rack M274). Alternatively, a second lever or other actuator (not shown) may be connected to the shaft M282 to pre-load the biasing member M278 to impart an increased amount of friction between the pinion M278 and the rack M274.

Fine adjustment of the table T18 with respect to the base T14 may be accomplished by a single-reduction gear train including a driven gear M290 rotatably fixed to the pinion M278 and a driving gear M294 that is manipulatable by the operator via a knob M138 or other actuator. Rotation of the knob M138 imparts rotation to the driving gear M294, which in turn rotates the driven gear M290 and the pinion M278. Rotation of the pinion M278, when it is engaged with the rack M274, causes rotation of the table T18 relative to the base T14. The driving gear M294 may be biased into engagement with the driven gear M290 by one or more springs, such that the driving gear M294 retracts from the rack M274 with the pinion M278 when the pinion M278 is retracted by the lever M138.

Figure 48F:
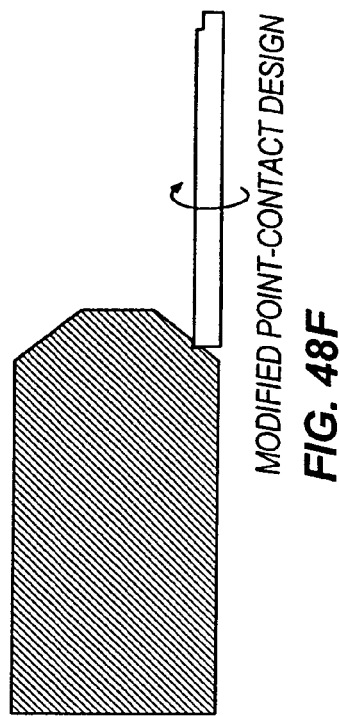
Figure 48E:
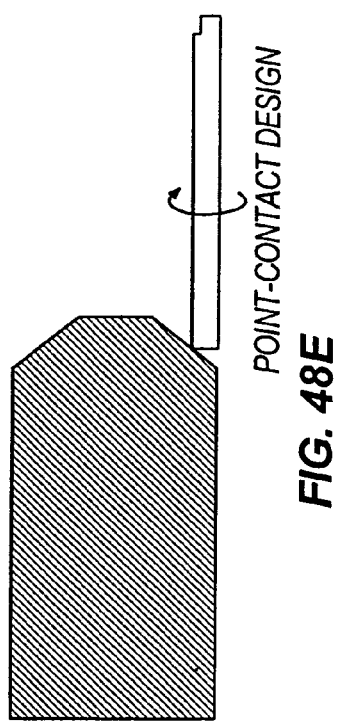
Figure 48G:
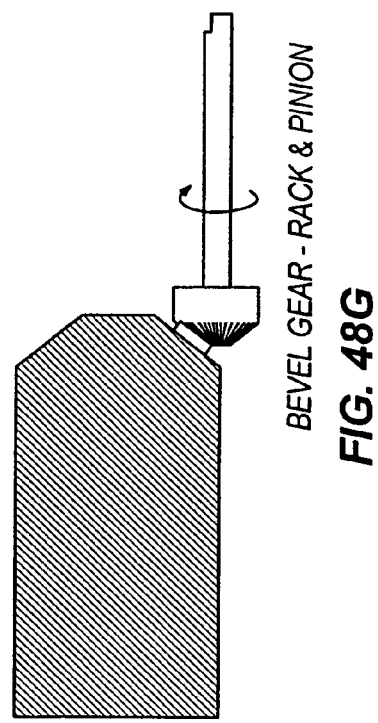

Alternative constructions of the fine adjustment assembly M18 may utilize a pad and friction roller in place of the rack and pinion (as shown in FIGS. 48B-48D). Also, still other constructions of the fine adjustment assembly may utilize different gear designs and/or other gear reductions other than the hypoid drive gear. Further, the gear train may be configured or arranged differently to drive the pinion. A supplemental miter lock may also be utilized in addition to the mechanical advantage provided by the fine adjustment assembly M118.

Figure 42A:
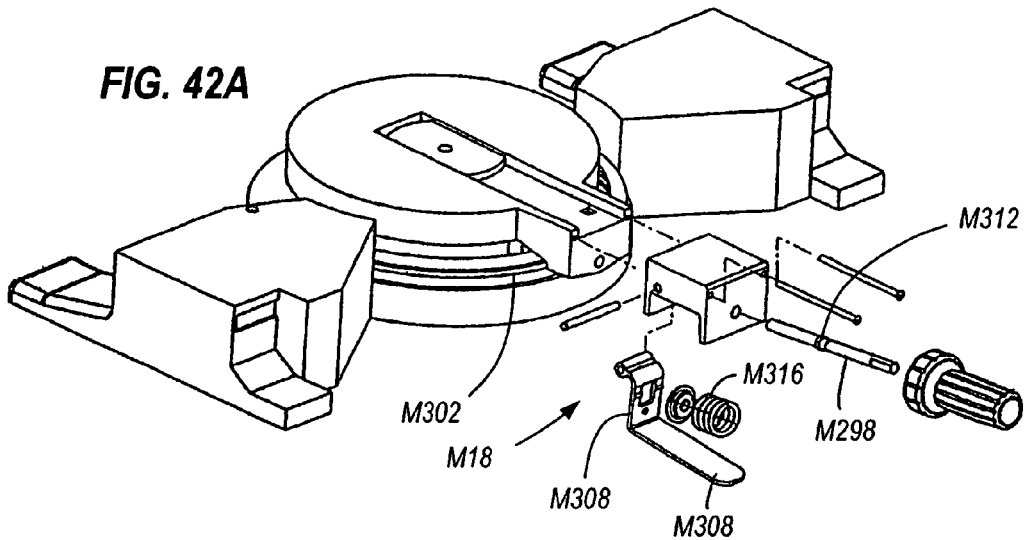
FIGS. 42A-42C are views of a further construction of a fine adjustment assembly.
Figure 42B:
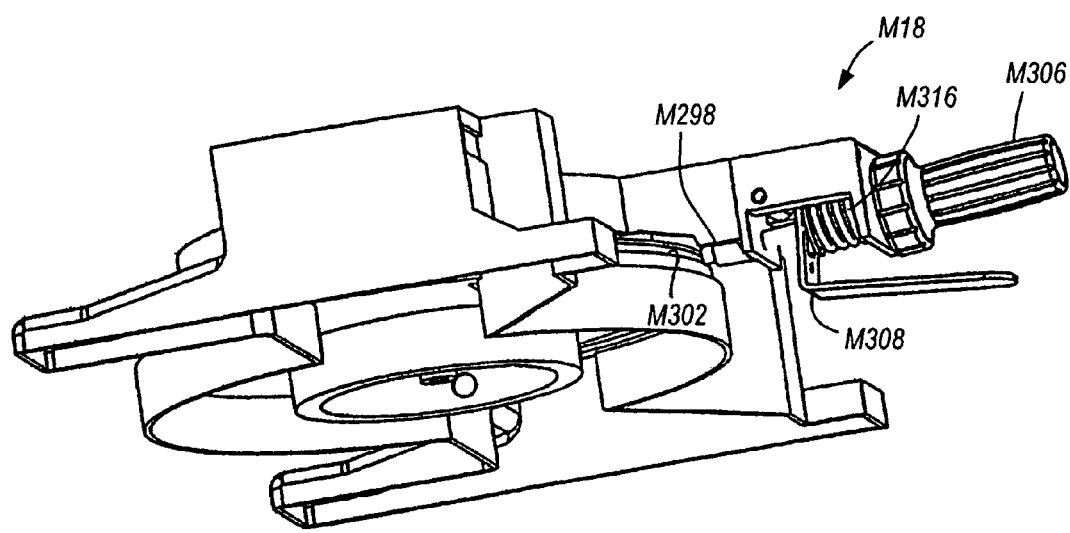
Figure 42C:
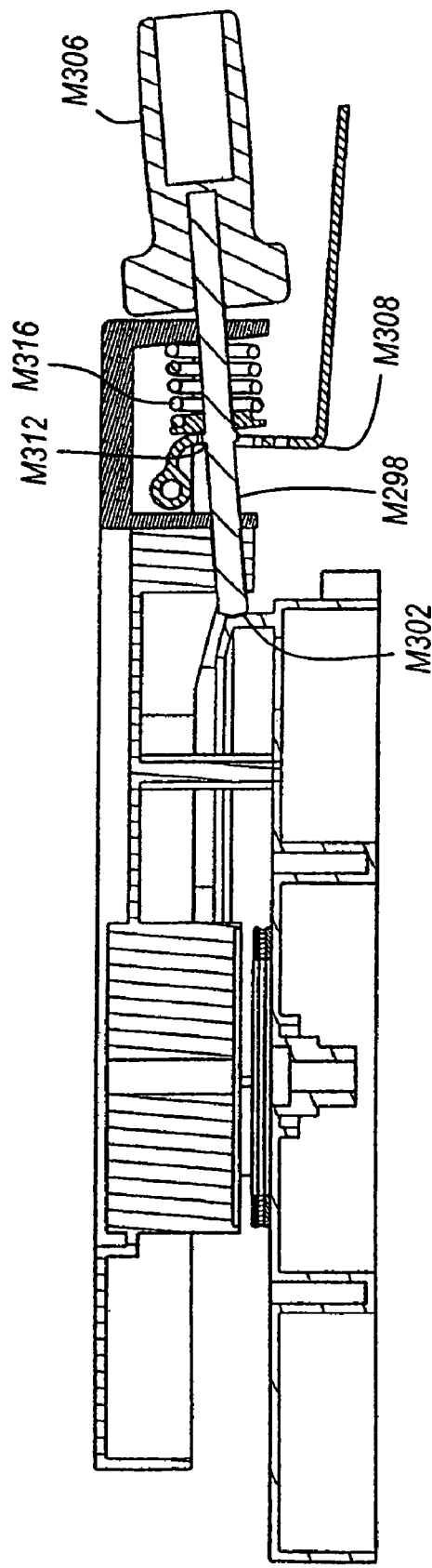

FIGS. 42A-42C illustrate another construction of a fine adjustment assembly M18. The assembly includes a shaft M298 rotatably supported by the table T18 and having an end engageable with an arcuate lip M302, an arcuate groove, or an arcuate pad fixed to the base T14. A handle M306 is coupled to the shaft such that an operator may grasp the handle and impart rotation to the shaft. A lever M308 is also pivotably coupled to the table and positioned such that the shaft passes through a portion of the lever. The shaft includes a shoulder portion M312 that is engageable by the lever, such that pivoting of the lever causes axial movement of the shaft. A biasing member (e.g., a compression spring M316) is positioned between the lever and a portion of the table to bias the lever downward and bias the shaft toward the base, such that the end M320 of the shaft frictionally engages the arcuate lip or groove in the base.

With reference to FIG. 42C, fine adjustment of the table with respect to the base may be accomplished by rotating the handle M306, which in turn rotates the shaft M298 relative to the arcuate lip M302 or groove. The frictional engagement between the end M320 of the shaft and the arcuate lip M302 or groove is sufficient to rotate the table relative to the base.

To allow macro adjustment of the table with respect to the base, the operator may rotate the lever M308 upwardly against the bias of the biasing member M316 to move the shaft axially away from the base. As such, the end of the shaft may disengage the arcuate lip or groove on the base. To lock the table to the base, the operator may release the lever to allow the end of the shaft to re-engage the arcuate lip or groove of the base.

Alternatively, the end of the shaft and the arcuate lip or groove may be configured with spaced upstanding projections (e.g., knurls, teeth, etc.) to provide additional surface area for engagement between the end of the shaft and the arcuate lip or groove.

Figure 43A:
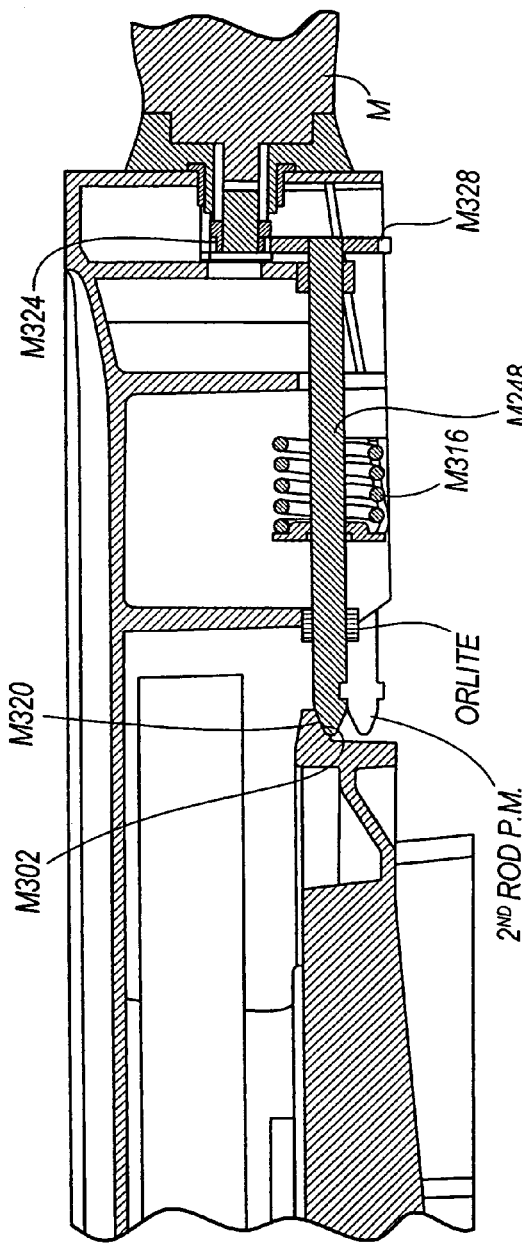
FIGS. 43A-43C are views of another construction of a fine adjustment assembly.
Figure 43C:
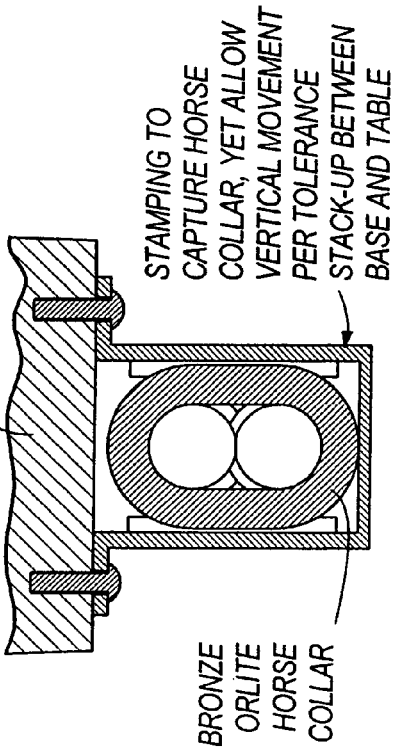
Figure 43B:
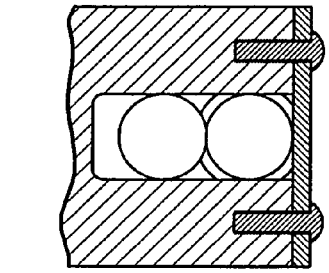

FIGS. 43-44 illustrate yet another construction of a fine adjustment assembly M18. The fine adjustment assembly M18 includes a rod or shaft M298 rotatably supported by the table T18 and having an end M320 frictionally engageable with an arcuate lip M302 of the base. A driven gear M328 is fixed to an opposite end of the shaft, such that a driving gear M324 fixed to a handle M306 meshes with the driven gear. Rotation of the handle imparts rotation to the shaft.

A lever M308 may also be pivotably coupled to the table and positioned such that the shaft passes through a portion of the lever. The shaft may include a shoulder M312 that is engageable by the lever, such that pivoting of the lever may cause axial movement of the shaft. The teeth of the driving and driven gears may be straight-cut to allow the driven gear to move axially relative to the driving gear. A biasing member (e.g., a compression spring M316) may be positioned between the lever and a portion of the table to bias the lever downward and bias the shaft toward the base, such that the end of the shaft frictionally engages the arcuate lip of the base.

Fine adjustment of the table with respect to the base may be accomplished by rotating the handle M306, which in turn rotates the shaft M298 relative to the arcuate lip M302 or groove. The frictional engagement between the end M320 of the shaft and the arcuate lip M302 or groove is sufficient to rotate the table relative to the base.

To allow macro adjustment of the table with respect to the base, the operator may rotate the lever M308 upwardly against the bias of the biasing member M316 to move the shaft axially away from the base. As such, the end of the shaft may disengage the arcuate lip or groove on the base. To lock the table to the base, the operator may release the lever to allow the end of the shaft to re-engage the arcuate lip of the base, such that a wedge-effect is created between the end of the shaft and the arcuate lip to lock the table to the base.

Alternatively, as shown in FIG. 44, more than one rod or shaft may be utilized to frictionally engage more than one arcuate lips of the base. Such a design may provide additional force with which to lock the table to the base.

FIGS. 45-48 illustrate another construction of a fine adjustment assembly M18 to allow miter angle adjustments in small increments at or near a detent recess M54. With reference to FIG. 45, with the table T18 located at an arbitrary angle to the base T14, the table is locked in position to the base through a mechanical advantage created by the interface between a gear M332 and an arcuate rack M336. The gear may be supported by the table, and the rack may be supported by the base.

Alternatively, a roller and a pad (not shown) may be used in place of the gear and rack. A supplemental lock may also be employed in addition to the mechanical advantage between the gear and rack or the roller and pad. The pinion/rack or roller/pad combination may utilize a single-reduction gear train. For simplicity, "pinion" may include either a gear type pinion or a roller, and "rack" may include either a gear type rack or a pad.

The pinion may be biased into engagement with the rack by a biasing member (e.g., a compression spring M340), resulting in the locking action through mechanical advantage or friction. The pinion may be disengaged from the rack when the operator squeezes a lever M344 that loads the biasing member and separates the pinion and the rack. This unlocks the table from the base, which allows the operator to make angle adjustments in large increments, or macro adjustments.

When the lever is released, the biasing member causes the pinion to re-engage the rack, thereby locking the table to the base again. The miter angle of the table, however, may be still be adjusted. This may be accomplished by rotating a knob M348 or other actuator that is coupled to the pinion to rotate the pinion. When the pinion rotates relative to the fixed rack, the table moves relative to the base.

As shown in FIGS. 47A-47B, to facilitate re-engagement of the pinion with the rack, the teeth of the pinion may be tapered so that meshing of the pinion to the rack becomes easier. When utilizing the roller and pad, this concern may be eliminated since inter-engaging teeth of the pinion and the rack are eliminated. The roller and pad utilize friction between the two parts to keep them from slipping relative to each other. Alternatively, FIGS. 48A-48G illustrate other constructions of the pinion and the rack.

In some constructions, motion of the lever may also be used to adjust detents that may be present in the miter saw. If the original detent is "stiff," the operator may want to disengage the detent when making a macro adjustment. A linkage could be driven from the lever that weakens or eliminates the detent when a macro adjustment is made. Alternatively, the detent may be weak or non-existent. As such, the linkage may cause the detent to strengthen so that the user can feel the detents as the miter angle of the table is adjusted.

In some constructions, operation of the fine adjustment assembly M18 may occur such that the table could be freely-rotated when the lever is actuated. Also, the table could lock to the base when the lever is released, regardless of whether or not the table is engaging a detent defining a particular angle between the table and the base.

In some constructions, fine adjustment of the table with respect to the base could be made without an additional unlocking motion (other than that caused by the lever). Fine adjustment could be made anywhere on the table (whether or not the table is engaging a detent).

In some constructions, detents could be mechanically linked to actuation of the lever such that (1) detents engage or become stronger when the lever is actuated, (2) detents disengage or become weaker when the lever is actuated, or (3) detents are unaffected when the lever is actuated.

Additional features of the fine adjustment assembly M18 may include fine adjustment of the table with respect to the base without locking the table. Also, fine adjustment of the table with respect to the base may be made after locking the table. In addition, fine adjustment of the table with respect to the base may be made before locking the table. Further, fine adjustment of the table with respect to the base may occur over the full range of the miter angle, or an override may be utilized for large adjustments. Fine adjustment of the table with respect to the base may be made without overriding any detents indicating a known miter angle. Fine adjustment of the table with respect to the base near a detent may occur by first overriding the detent.

Figure 49C:
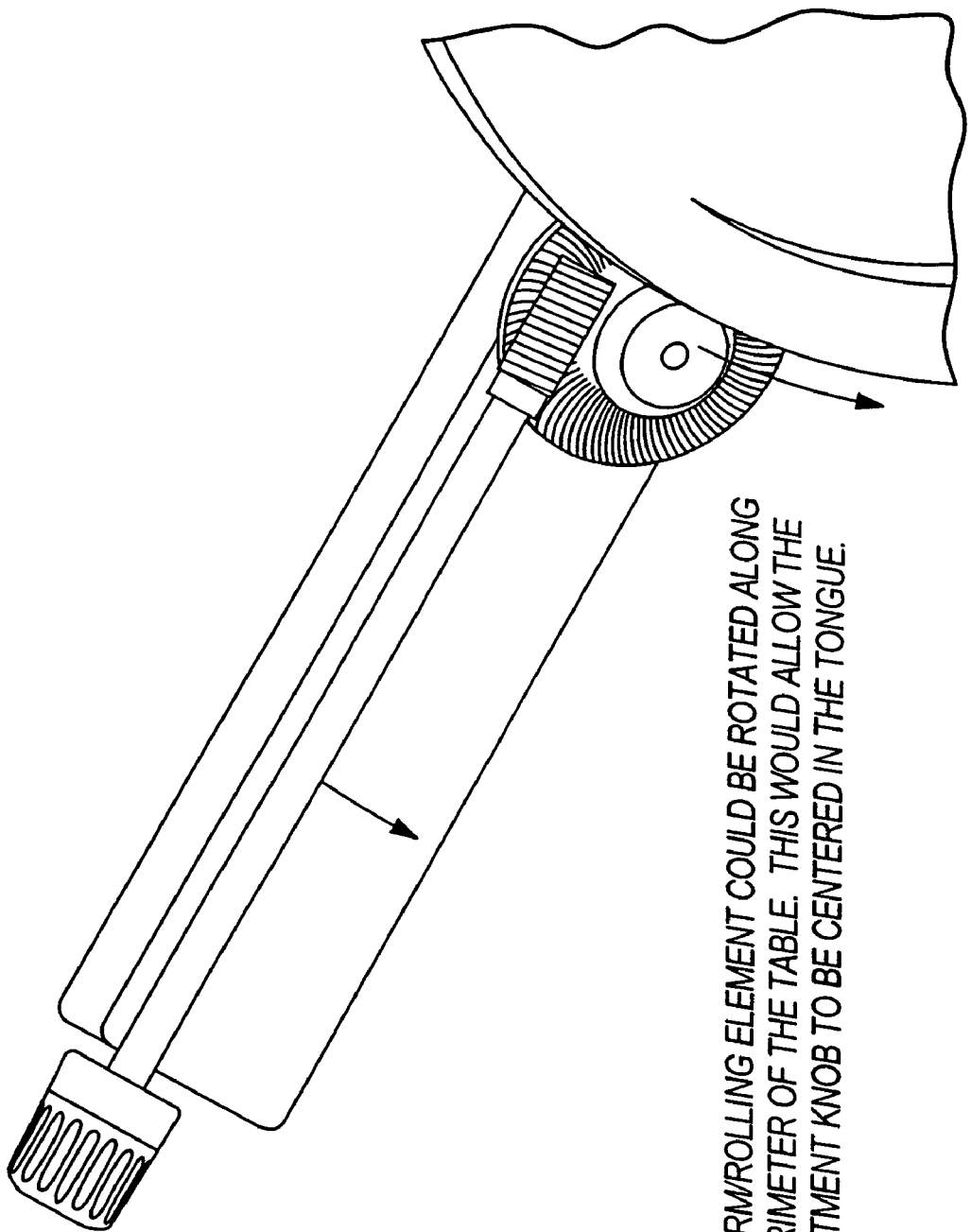
Figure 50:
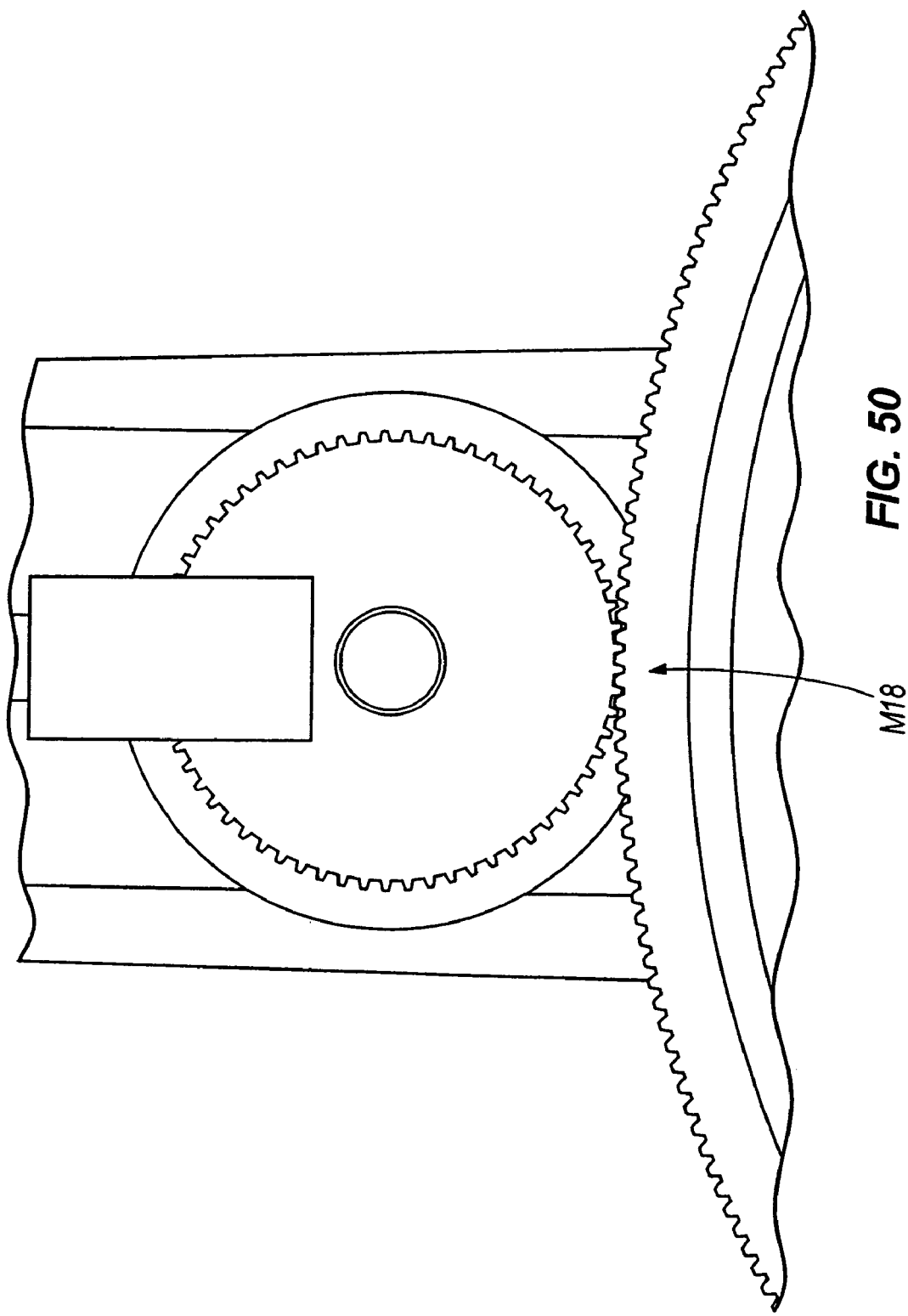
FIG. 50 is a top view of another construction of a fine adjustment assembly.

With reference to FIGS. 49A-49C, another construction of a fine adjustment assembly M18 is shown incorporating a multiple-reduction gear train. A first stage reduction may occur between a worm gear and a driven gear rotatably supported by the table. A roller may be coupled to the driven gear for co-rotation with the driven gear, such that the outer surface of the roller is frictionally engageable with a pad or a groove formed in the base of the miter saw. The roller may be sized accordingly to provide a second stage reduction between the roller and the pad or groove. The combination of the first and second stage reductions in the adjustment mechanism facilitates fine miter angle adjustments in smaller increments compared to using only a single stage reduction. FIG. 50 illustrates another construction of a fine adjustment assembly M18.

FIGS. 51-52 illustrate a further construction of a fine adjustment assembly M18. The fine adjustment assembly M18 includes a multiple-reduction gear train and a spindle-lock clutch mechanism M350, which may be incorporated into the gear train to allow a pinion gear to remain engaged with an arcuate rack during macro-adjustment of the miter angle.

The spindle-lock clutch mechanism may selectively transfer torque from a clutch shaft to a pinion shaft, which has the pinion gear fixed thereto. Both of the pinion shaft and the clutch shaft are rotatably supported by the table. A driven gear is fixed to an end of the clutch shaft opposite the clutch mechanism, and a driving gear rotatably supported by the table meshes with the driven gear. A dial is also rotatably supported by the table and is engageable with the driving gear to impart rotation to the driving gear. A lever may also be pivotably coupled to the table, and a biasing member (e.g., a compression spring) may bias the lever downwardly to engage the spindle-lock clutch mechanism.

Fine adjustment of the table with respect to the base may be accomplished by rotating the dial, which in turn rotates the pinion gear relative to the arcuate rack. To allow macro adjustment of the table with respect to the base, the operator may rotate the lever upwardly against the bias of the biasing member to disengage the spindle-lock clutch mechanism, thereby disengaging the clutch shaft and the pinion shaft to allow free movement of the table with respect to the base. To lock the table to the base, the operator may release the lever to allow the spindle-lock clutch mechanism to re-engage and lock the clutch shaft to the pinion shaft.

Figure 53B:
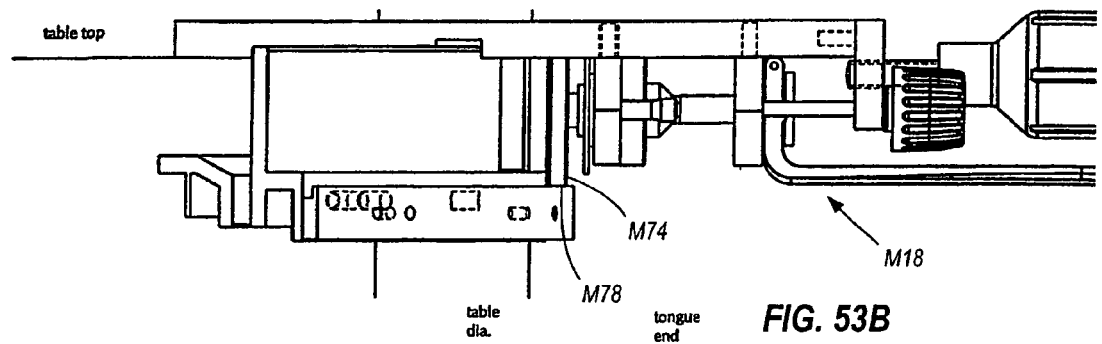
FIGS. 53A-53B are views of another construction of a fine adjustment assembly.
Figure 53A:
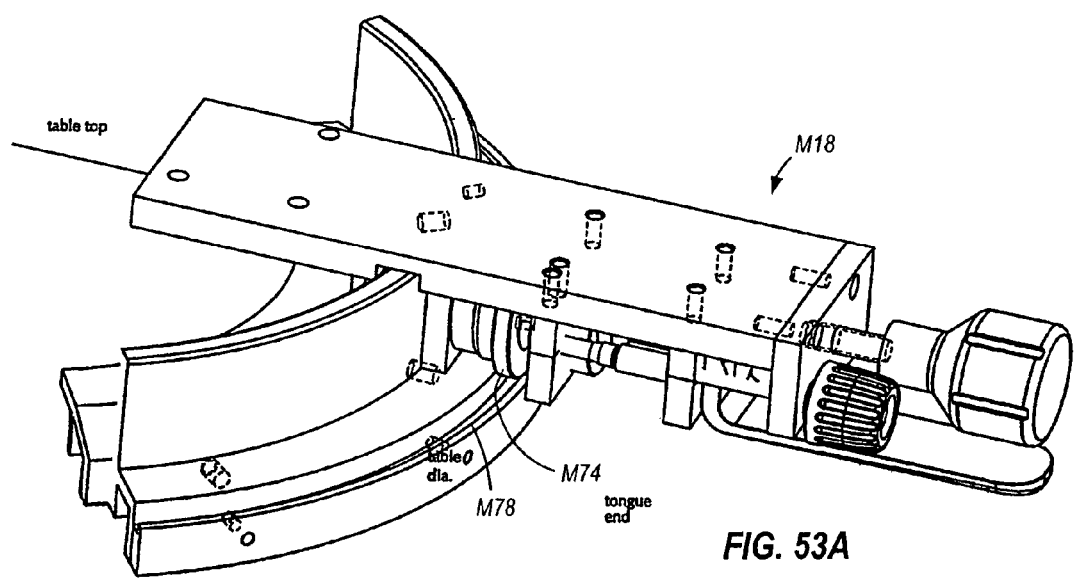
Figure 56A:
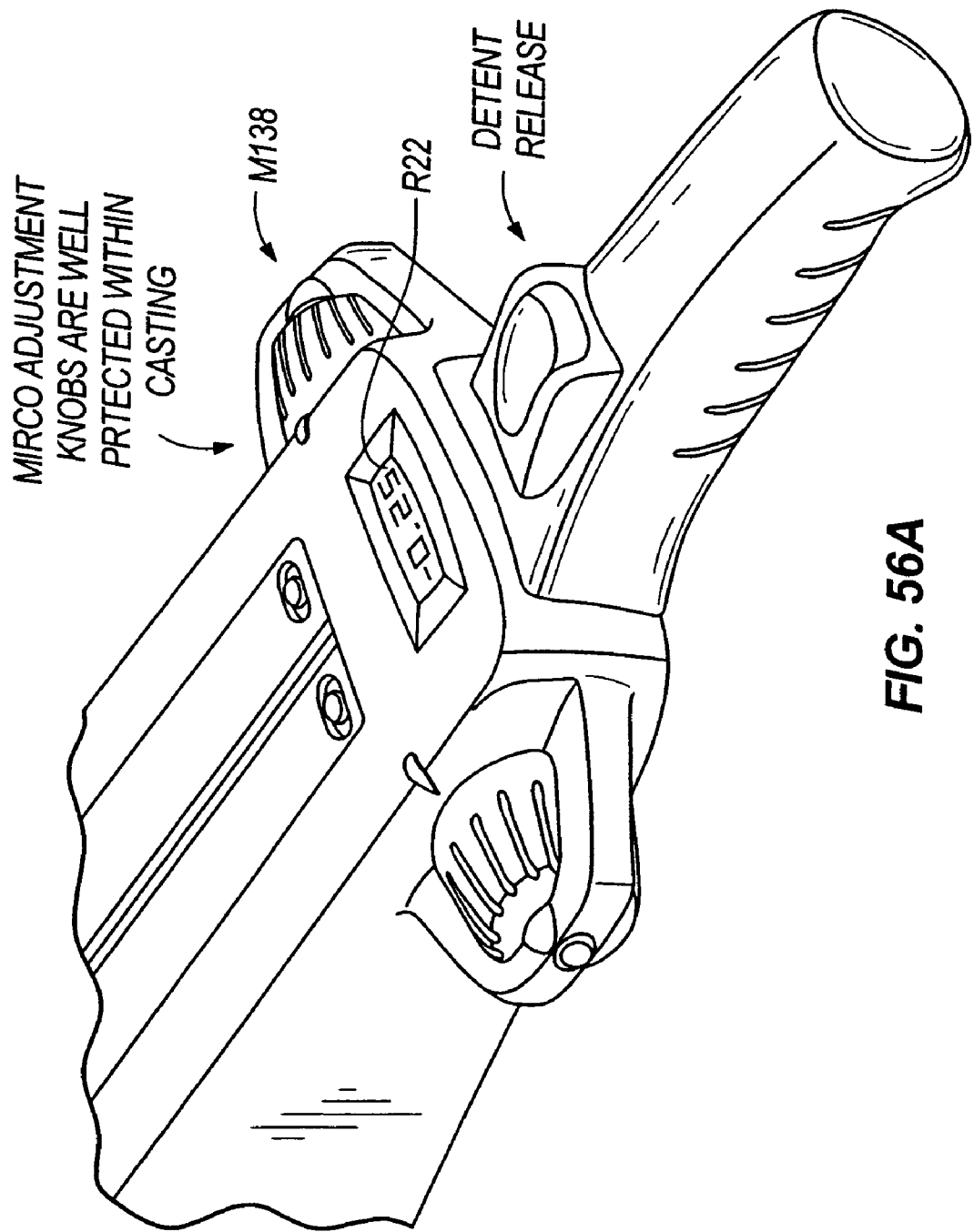
Figure 56B:
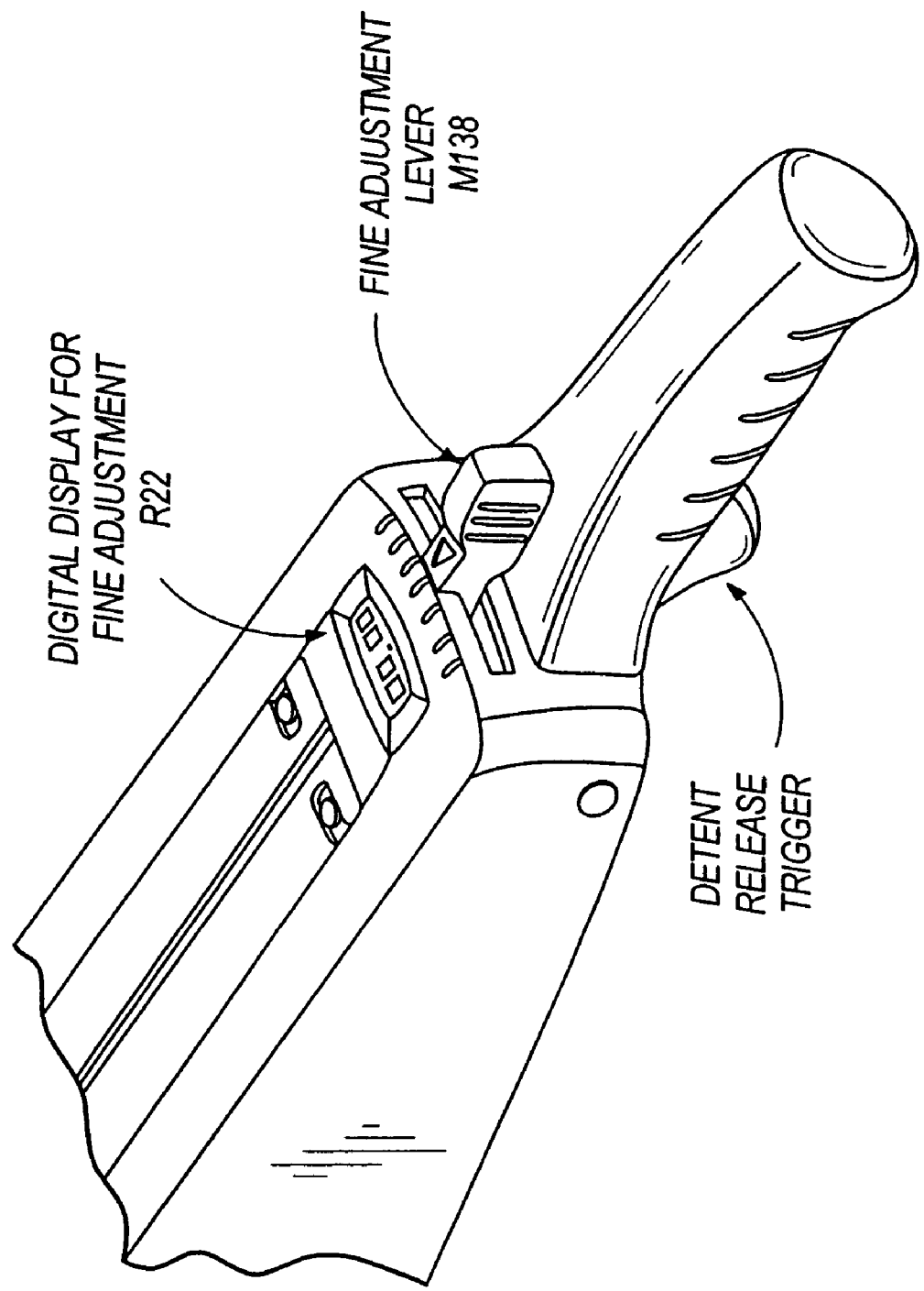
Figure 56C:
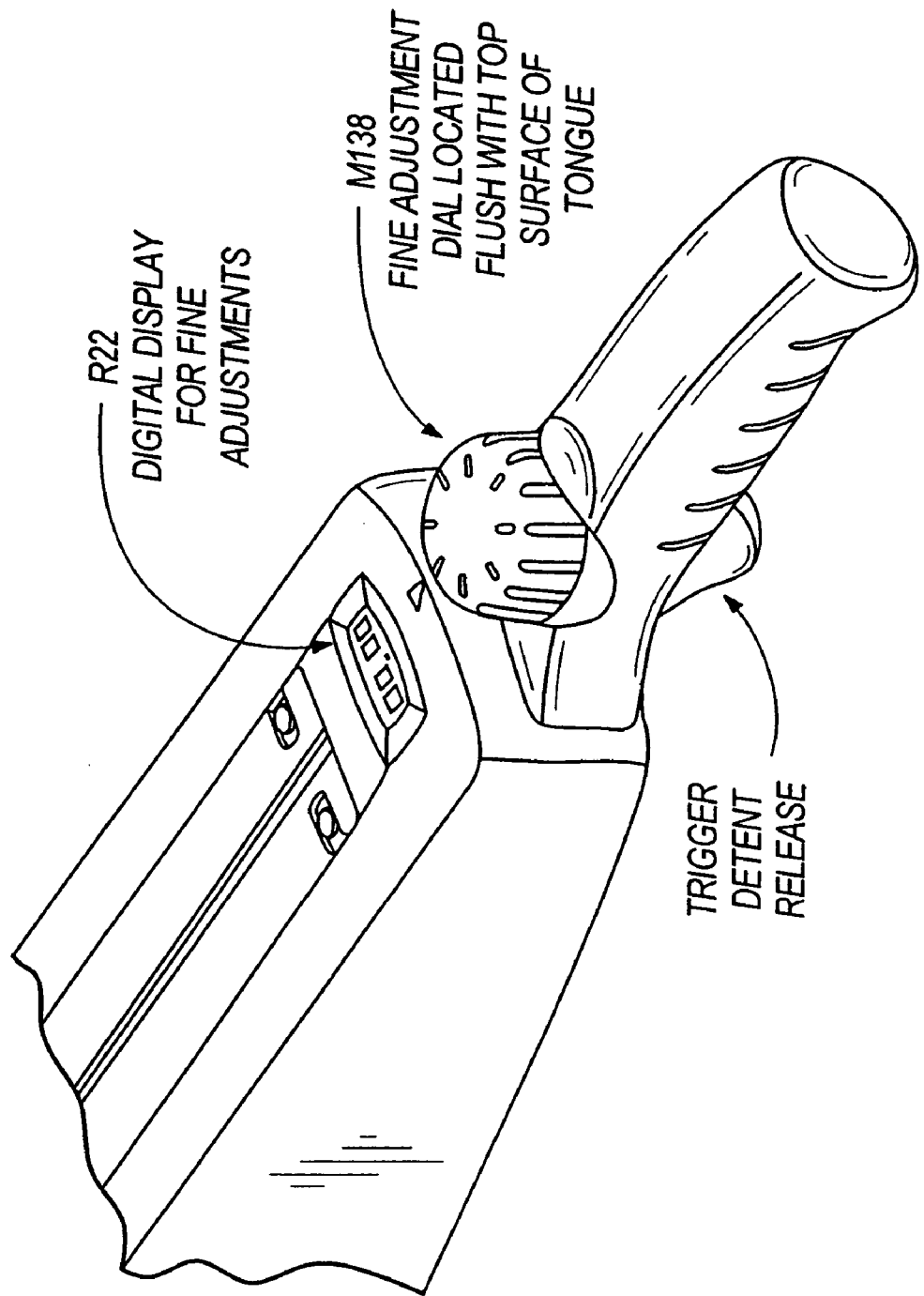
Figure 56D:
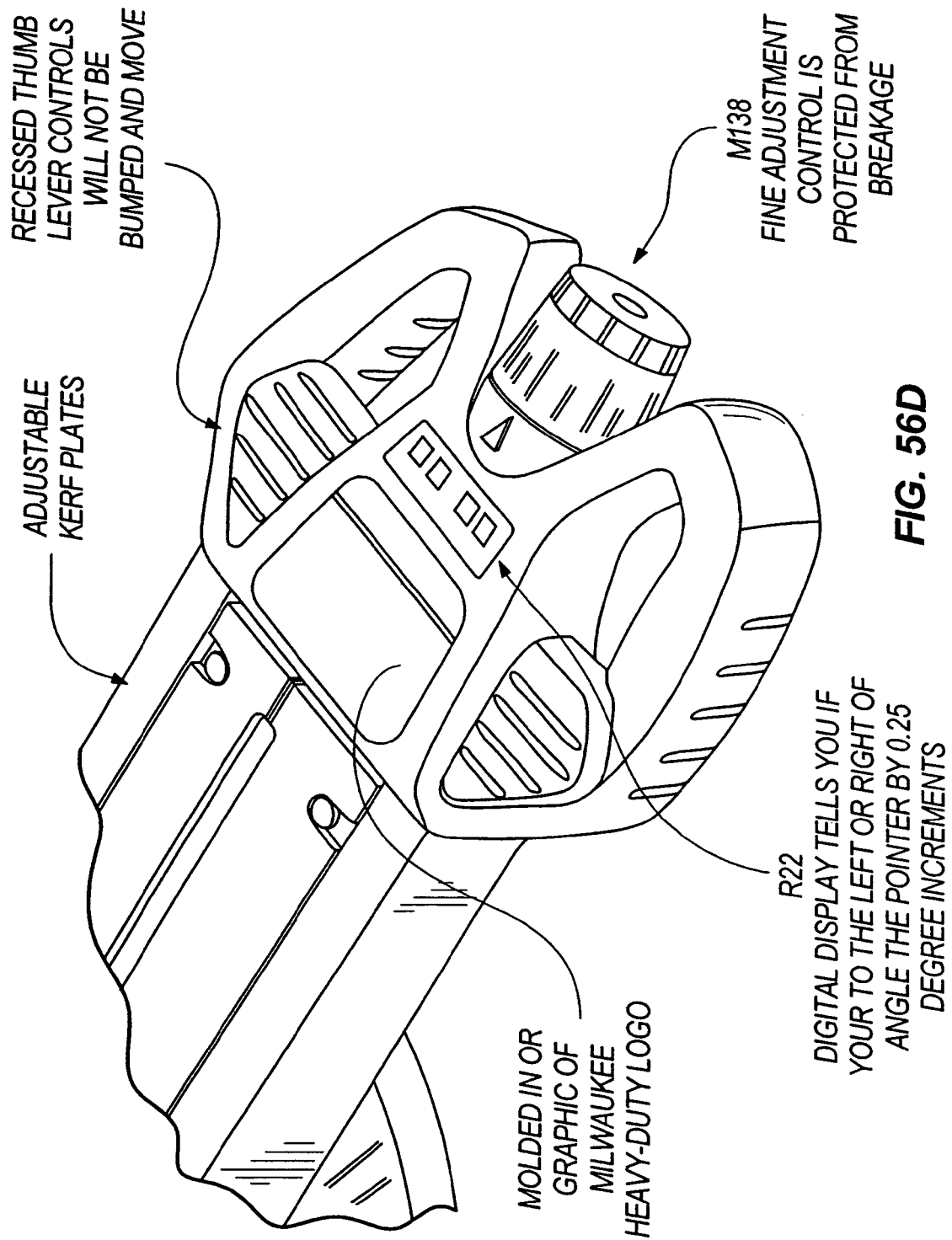
Figure 56E:
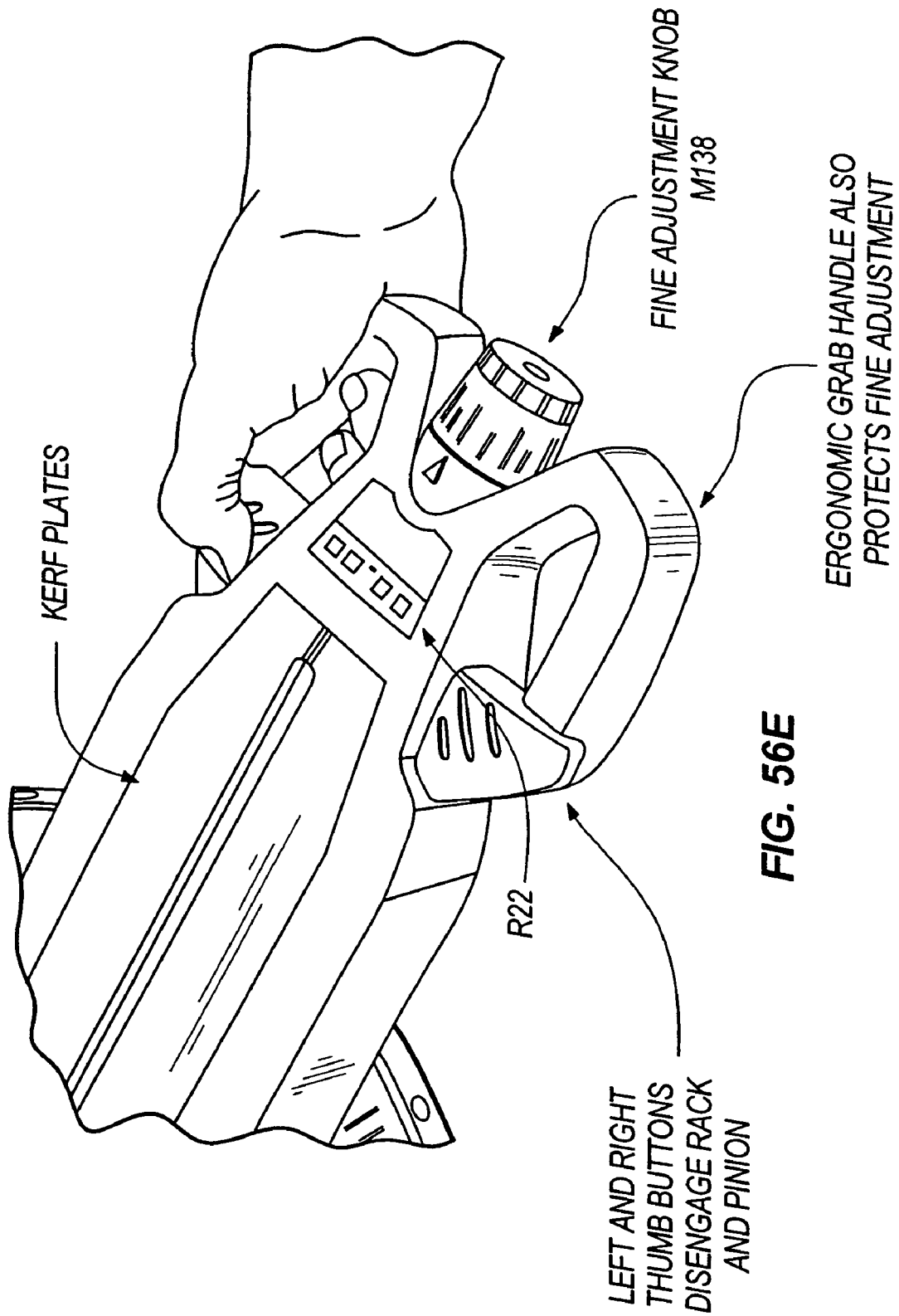
Figure 56I:
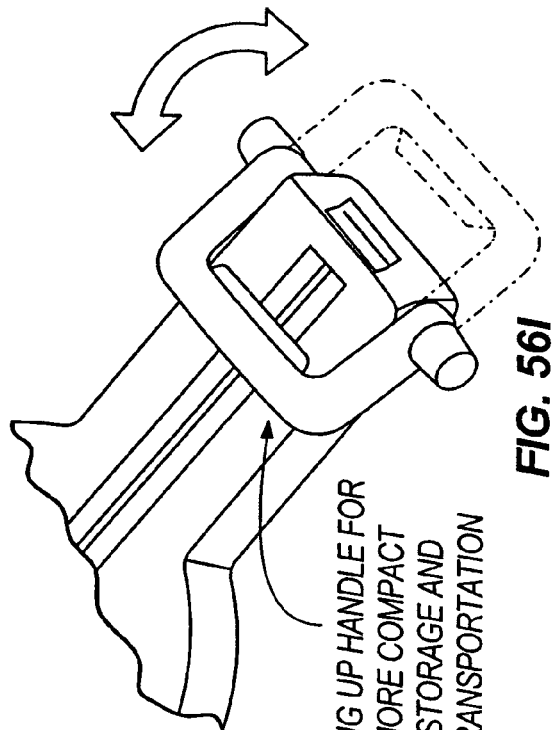
Figure 56K:
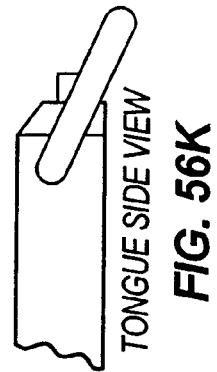
Figure 56J:
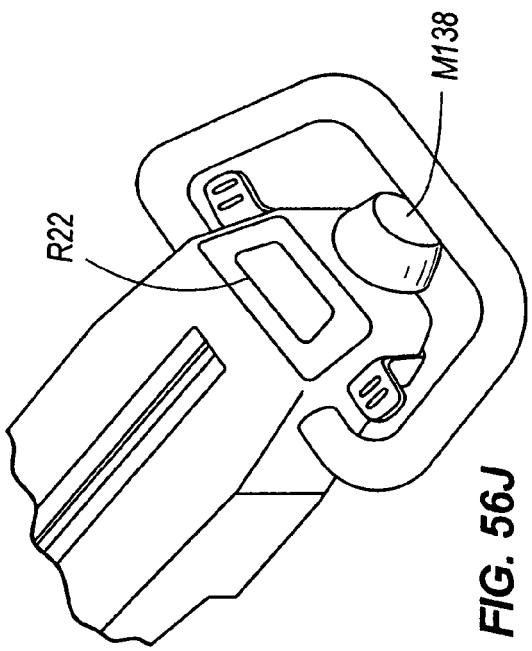
Figure 56H:
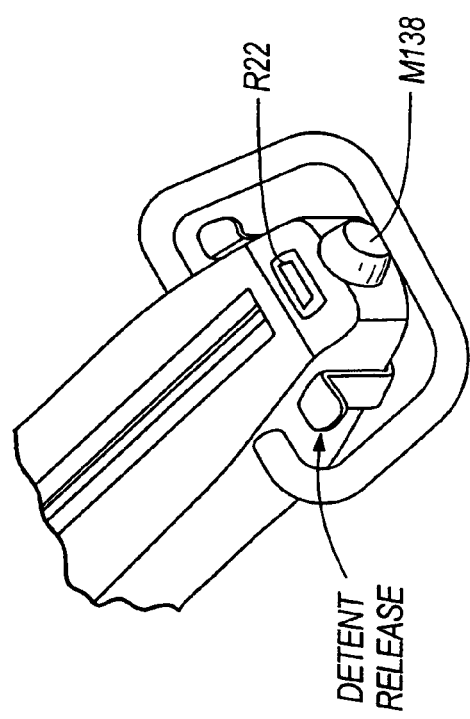

FIGS. 53A-53B illustrate another construction of a fine adjustment assembly M18. More particularly, the miter saw includes a fine adjustment assembly M18 having a shaft rotatably coupled to the table. One end of the shaft is coupled to a pinion gear M74, which in turn, engages an arcuate rack M78 on the base. A biasing member (e.g., a compression spring) biases an end surface of the pinion against a friction pad.

The end of the shaft coupled to the pinion includes at least one cam projecting therefrom for selectively engaging mating cam surfaces in respective grooves in the pinion gear. A dial or a knob is fixed to the opposite end of the shaft, such that initial rotation of the knob imparts rotation to the shaft, which causes the cam on the shaft to engage the cam surface in the pinion. A thumb lever may be pivotably coupled to the table to engage a shoulder on the shaft to axially displace the shaft.

Fine adjustment of the table with respect to the base may be accomplished by rotating the knob to rotate the shaft such that the cam on the shaft engages the cam surface in the pinion. This is sufficient to move the pinion axially away from the friction pad to unlock the table from the base. Further rotation (i.e., after the pinion is moved away from the friction pad) results in the pinion gear rotating relative to the fixed rack and adjusting the table relative to the base. To allow macro adjustment of the table with respect to the base, the operator may depress the thumb lever to move the shaft and the pinion away from the friction pad against the bias of the biasing member to allow free movement of the table relative to the base. Additionally, the knob may be disengaged from the shaft (via a spline fit, etc.) when the thumb lever is depressed. To lock the table to the base, the operator may release the thumb lever to allow the end surface of the pinion gear to re-engage the friction pad.

FIGS. 54A-54B illustrate yet another construction of a fine adjustment assembly M18. More particularly, the miter saw includes a table-in-table assembly, such that a first or upper table may be fine adjusted with respect to a second or lower table. The lower table is rotatably coupled to the base and includes a cam surface thereon. The lower table also supports a shaft having a pinion fixed at one end of the shaft. The upper table is rotatably coupled to the lower table, and a bevel gear and a cam are positioned between the upper table and the lower table such that the pinion engages the bevel gear and the cam co-rotates with the bevel gear. The cam is engageable with the cam surface of the lower table upon rotation of the cam.

Fine adjustment of the upper table with respect to the lower table may be accomplished by rotating the shaft, which in turn rotates the bevel gear and the cam relative to the cam surface. The engagement of the cam and cam surface, therefore, may cause the upper table to rotate in fine increments relative to the lower table. To allow macro adjustment of the upper and lower tables with respect to the base, detents and detent override structure may be incorporated into the miter saw.

FIGS. 55A-55B illustrate yet another construction of a fine adjustment assembly M18 for a miter saw. The fine adjustment assembly M18 incorporates a substantially vertically-oriented shaft relative to the table during normal operation of the miter saw. The shaft is rotatably coupled to the table and includes at one end a pinion gear and at an opposite end an adjustment dial. The pinion gear is engageable with an arcuate rack on the base.

Fine adjustment of the table with respect to the base may be accomplished by rotating the dial, which in turn rotates the pinion gear relative to the arcuate rack.

FIGS. 56A-56M illustrate various constructions of the actuator or adjustment knob M138 for fine- or micro-adjustment of the miter angle and the actuator or detent release for releasing the detent assembly (to enable movement of the miter saw to another miter angle). Also, FIGS. 56A-56F and 56H-56M illustrate the display R22 of the miter angle and, in some constructions, illustrate the display R22 of the miter angle for fine adjustment.

In addition, FIGS. 56A-56M illustrate various constructions for a handle or grip surface for engagement by an operator to adjust the miter angle, hold the saw, carry the saw, etc. As shown in FIGS. 56H-56M, the handle may be movable relative to the turntable, for example, between a use and a storage and/or transport position.

In addition, as shown in FIG. 56L, the handle may be adjustable to the left or right side so that the handle is in a better position for gripping by an operator's left hand or right hand. In the use position, a portion of the handle may engage or may be moved to engage a work surface or the work table to provide added stability for the saw.

Figure 57A:
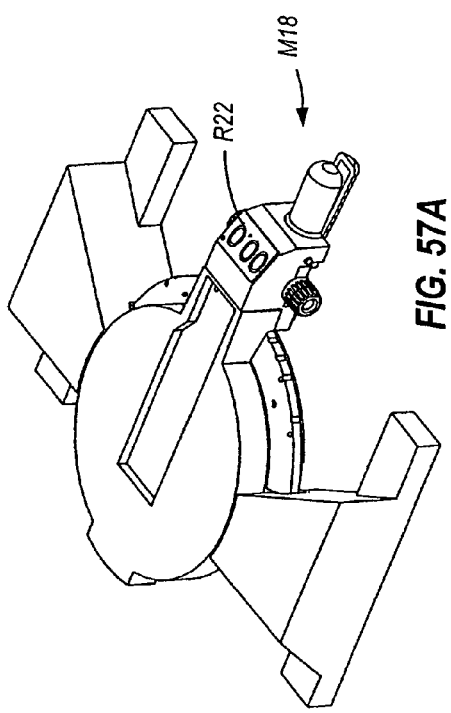
FIGS. 57A-57N are views of portions of a saw, such as base and table assembly and/or and another construction of a fine adjustment assembly.
Figure 57B:
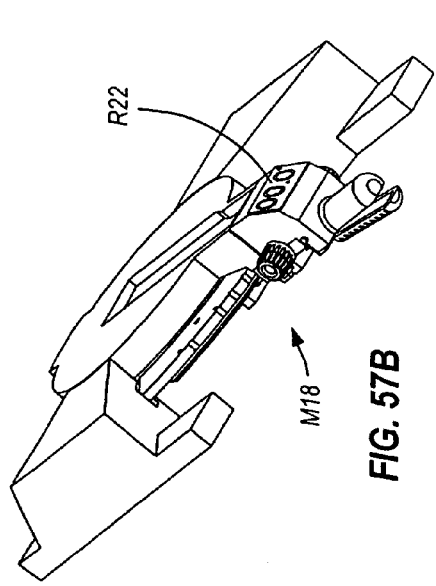
Figure 57C:
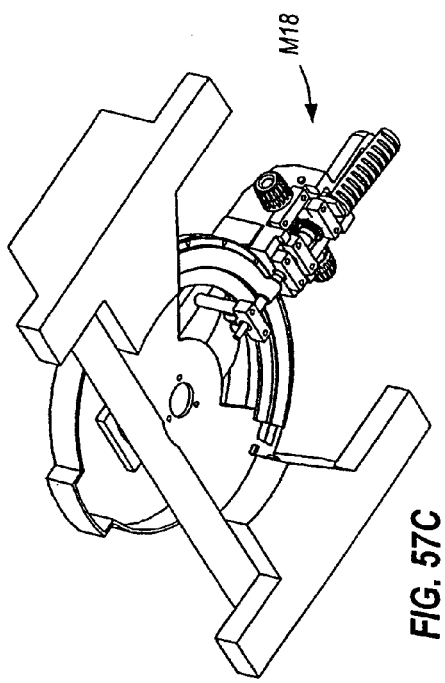
Figure 57D:
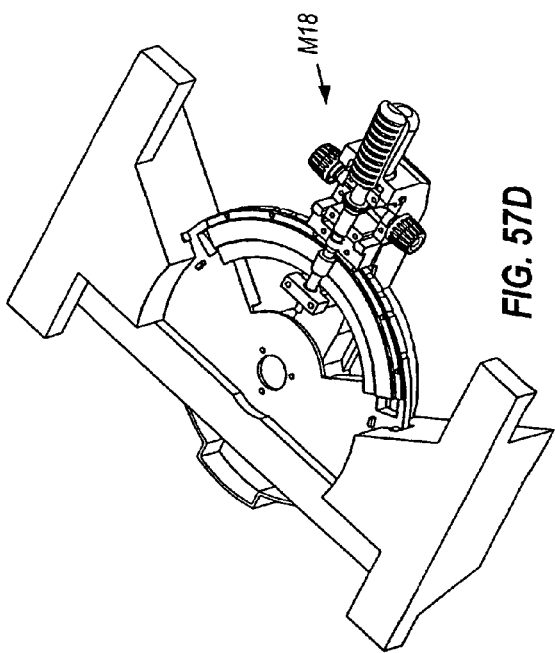
Figure 57I:
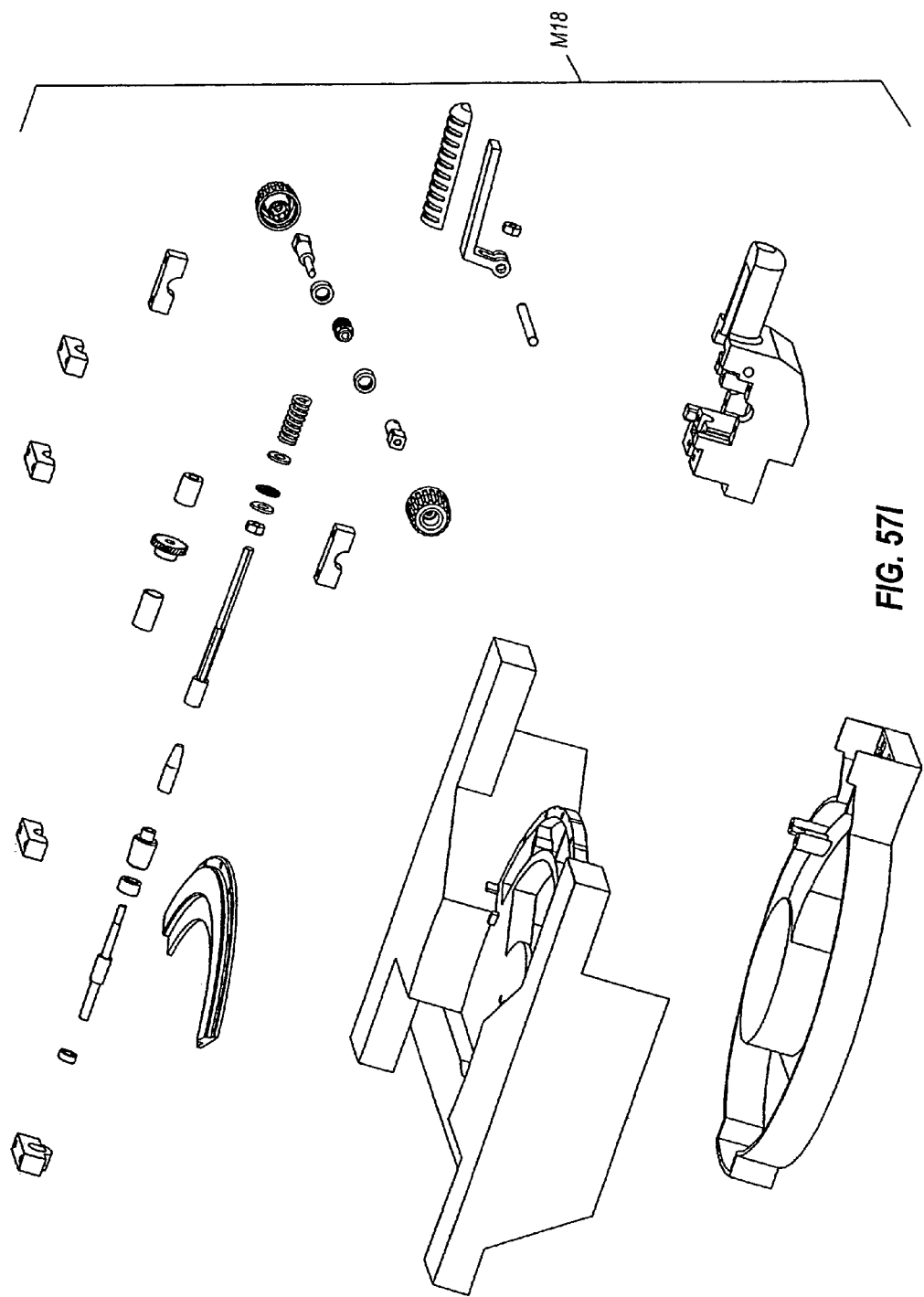
Figures 57J, 57K:
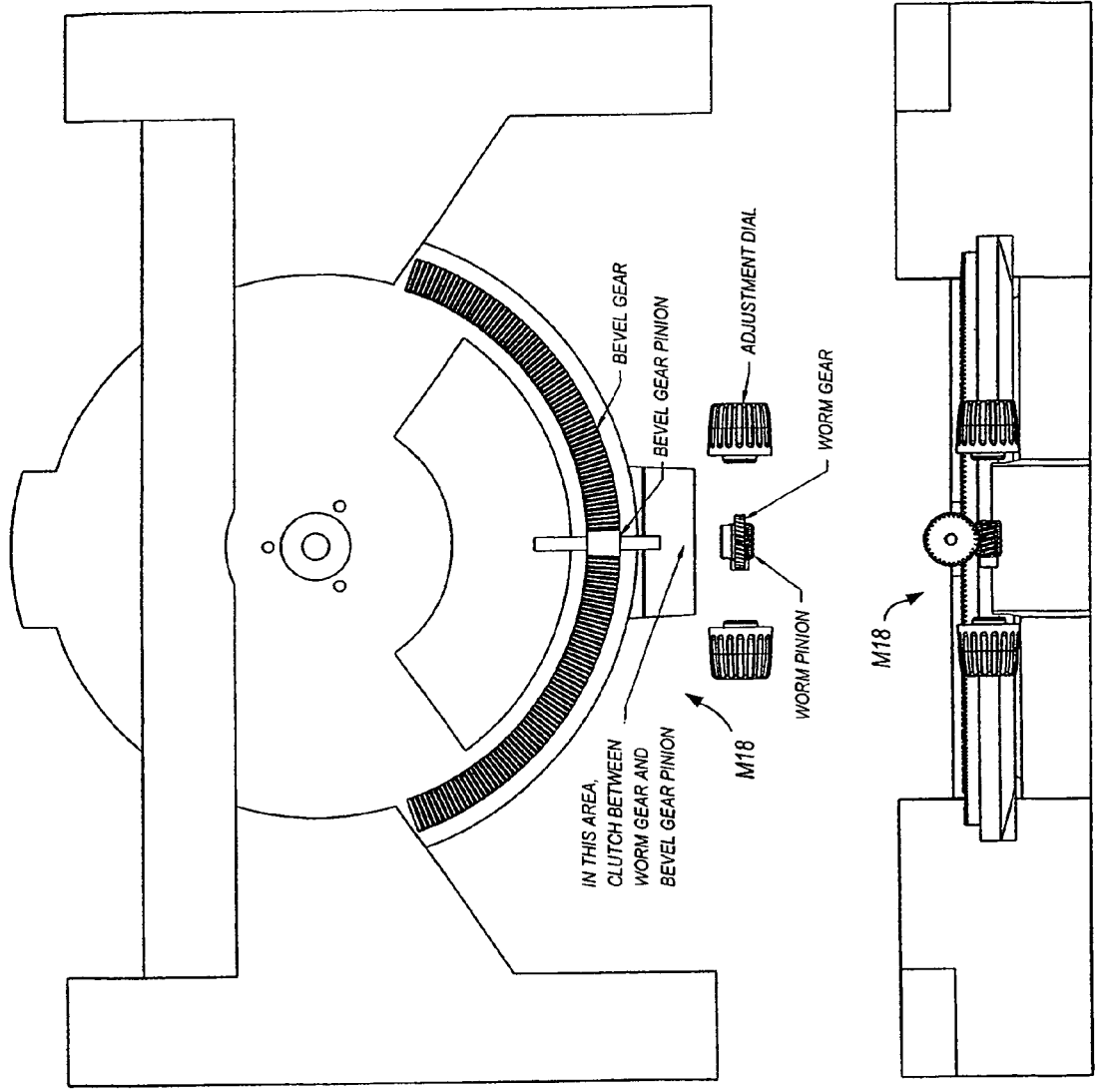
Figure 57L:
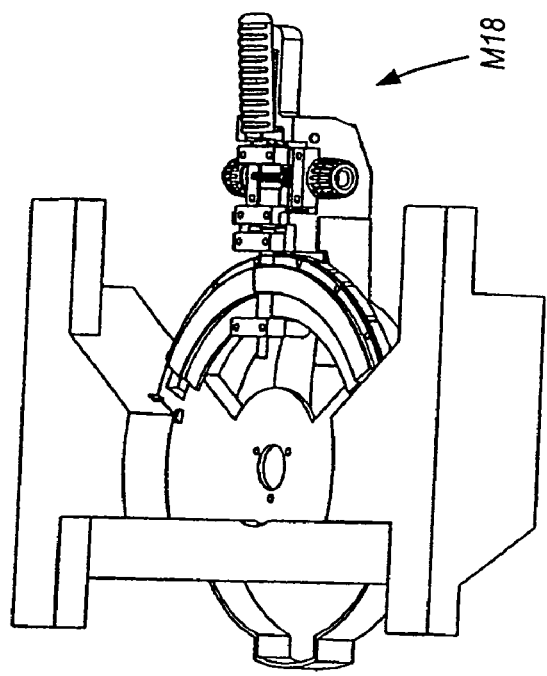
Figure 57N:
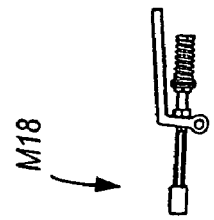
Figure 57M:
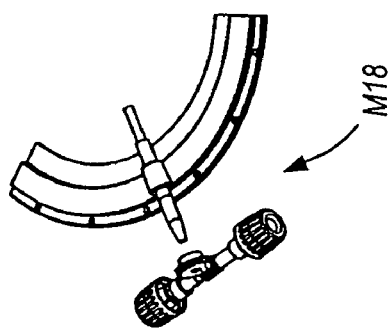

FIGS. 57A-57N illustrate a base, a table rotatably coupled to the base, and another construction of a fine adjustment assembly M18.

Figure 58A:
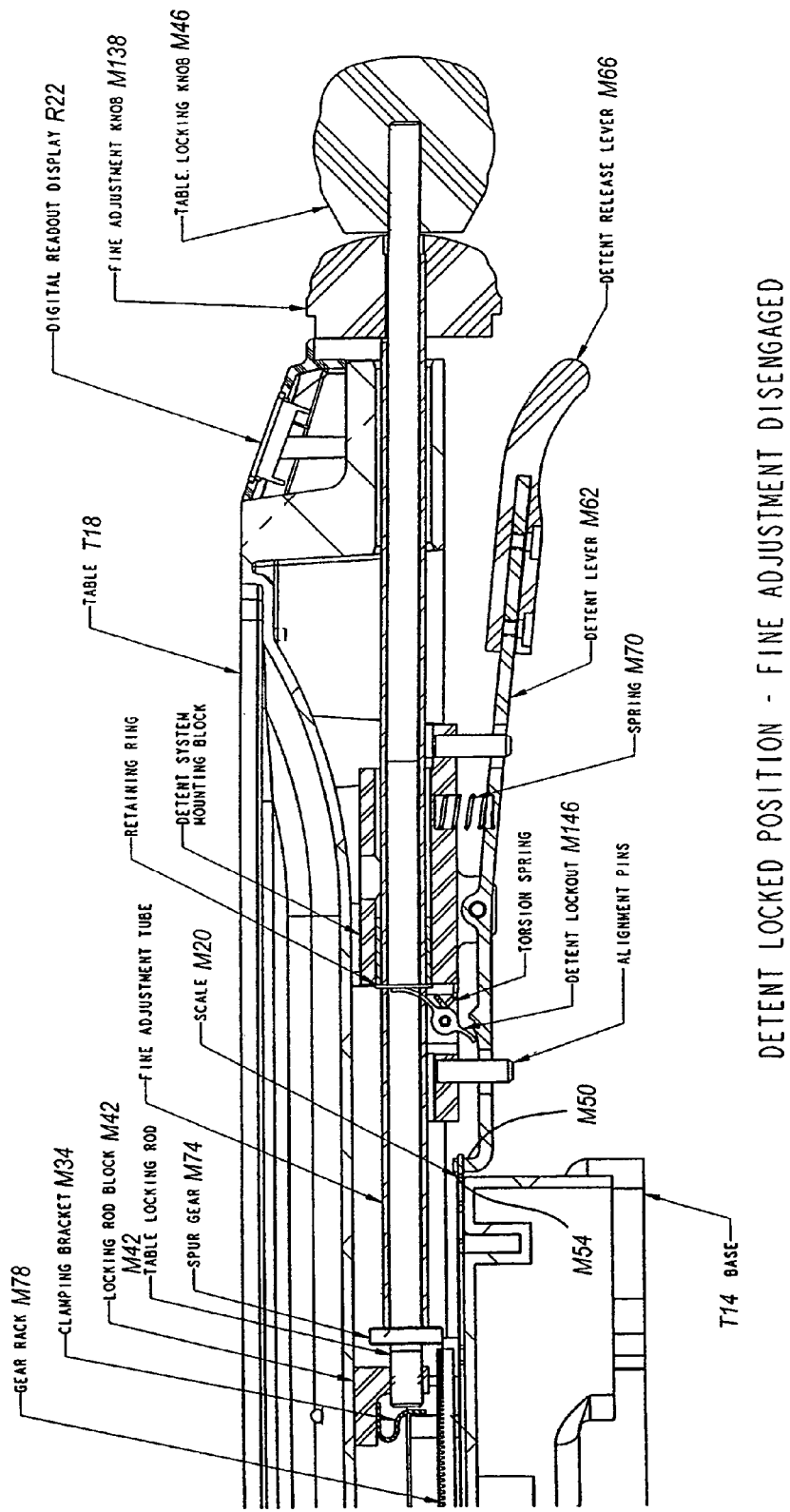
Figure 59A:
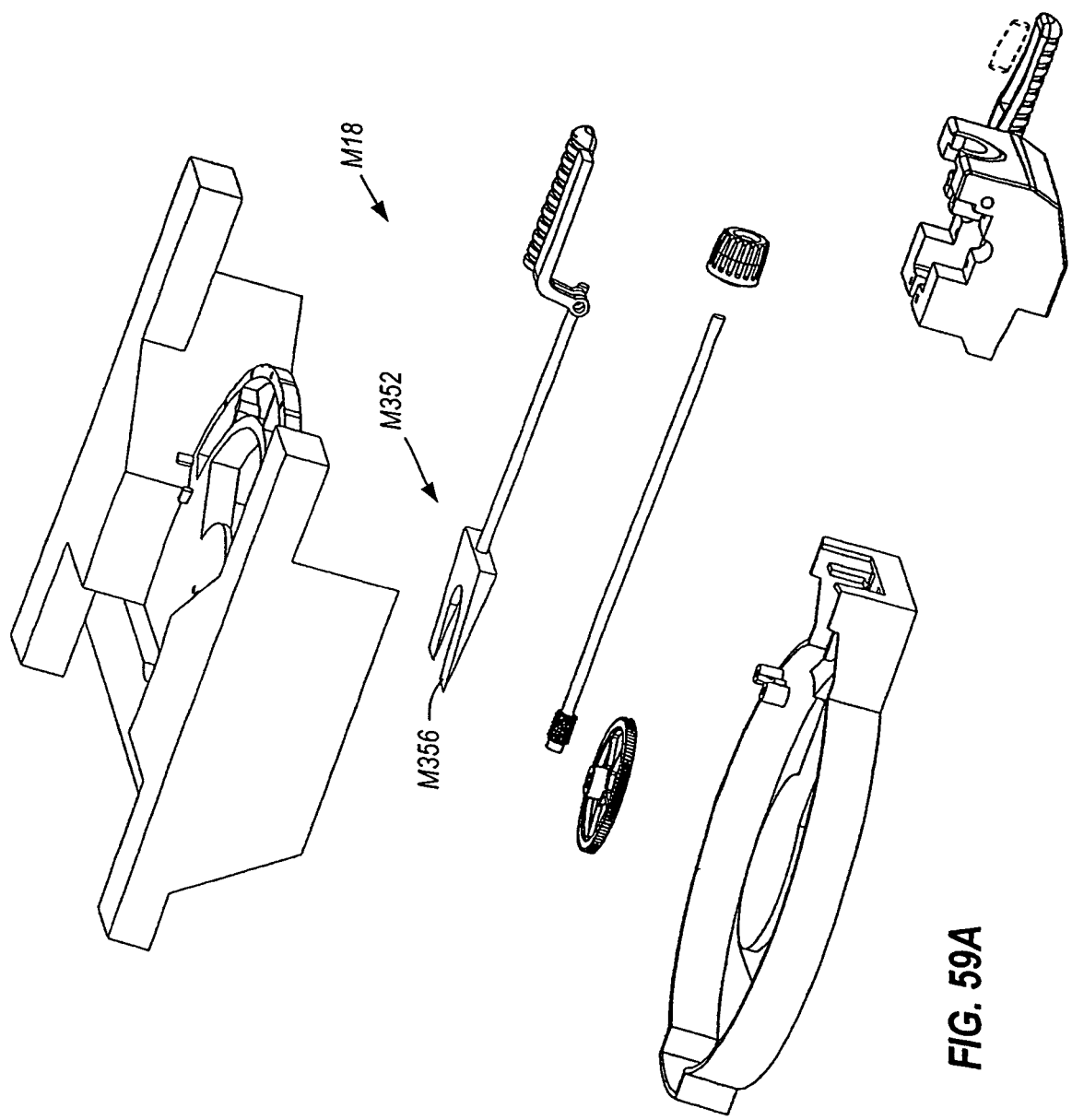
FIGS. 59A-59J are views of portions of a saw, such as a base and table assembly, a further construction of a fine adjustment assembly, and/or a locking assembly, such as a wedge locking assembly.
Figure 59C:
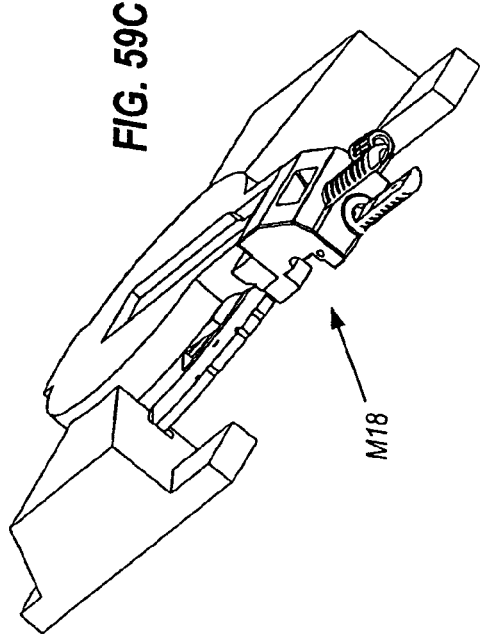
Figure 59B:
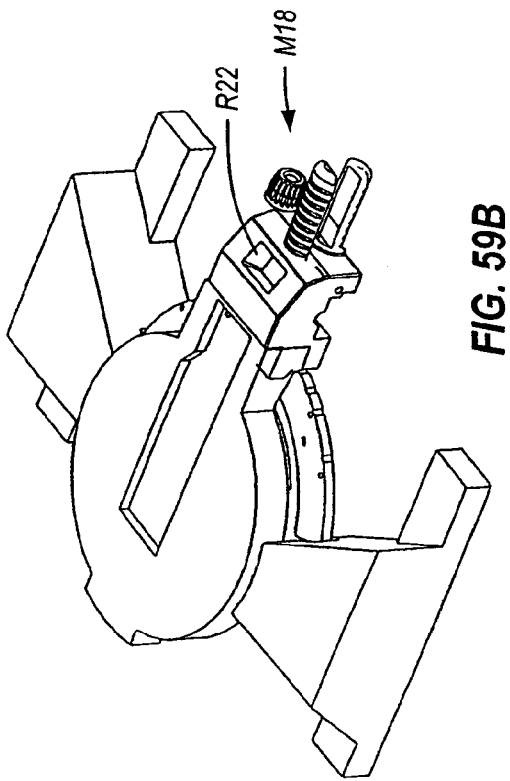
Figure 59D:
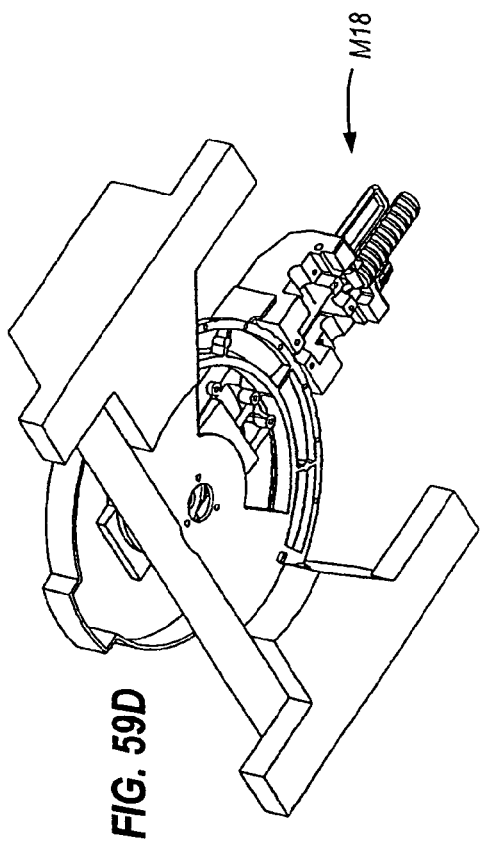
Figure 59E:
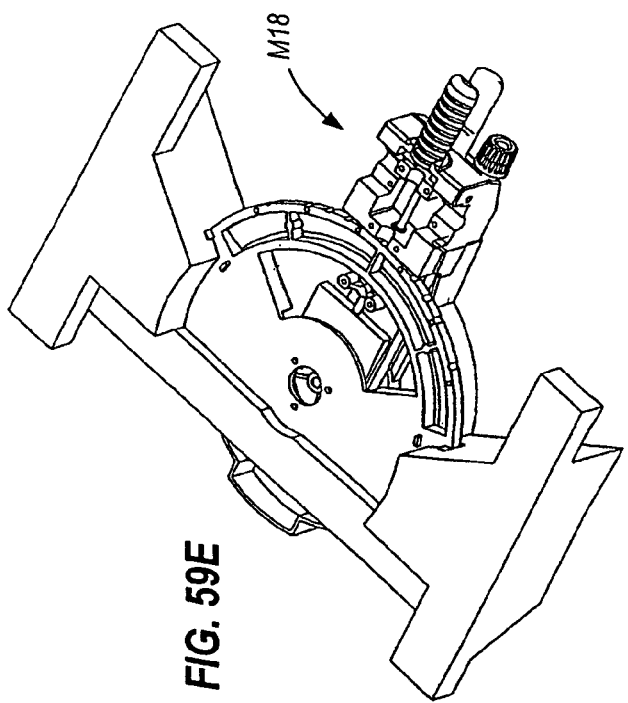
Figure 59F:
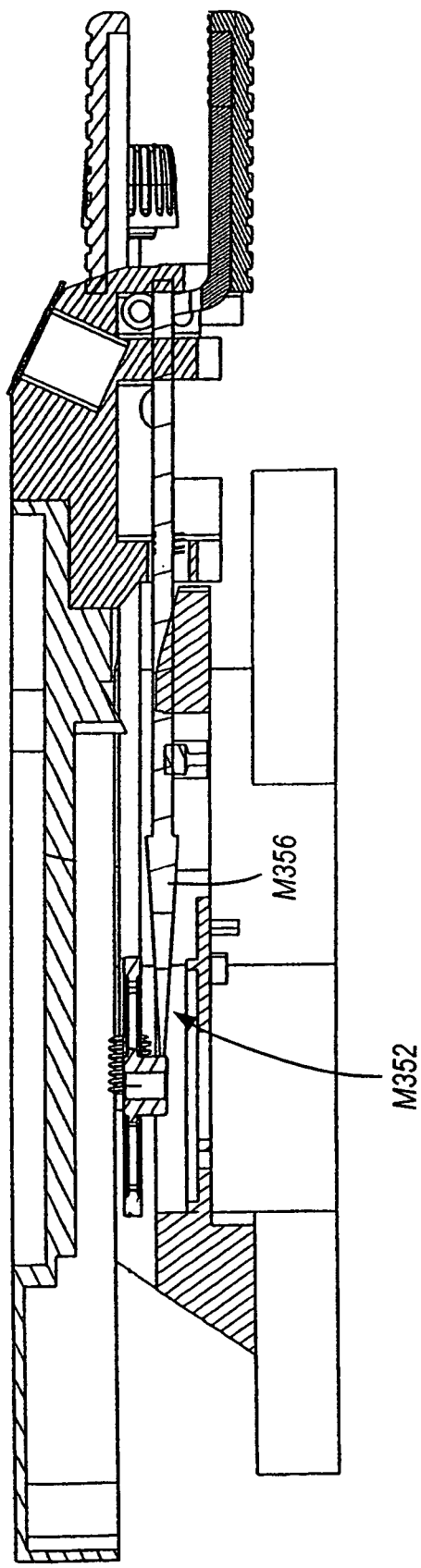
Figure 59G:
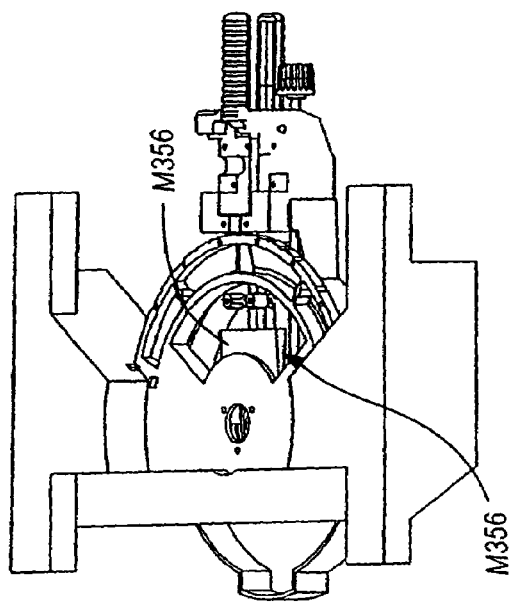
Figure 59J:
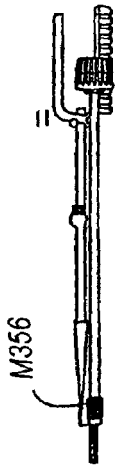
Figure 59I:
Figure 59H:
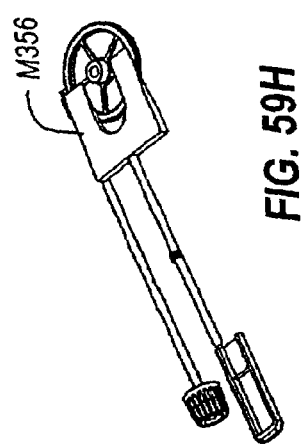

FIGS. 58A-58C illustrate a base, a table rotatably coupled to the base, and yet another construction of a fine adjustment assembly M18 and a detent override mechanism. As shown in FIG. 58A, the fine adjustment assembly M18 in a disengaged position and the detent override mechanism detent override assembly M146 in a locked position. FIG. 58B illustrates the fine adjustment assembly M18 in the engaged position and the detent override assembly M146 in a locked-out or unlocked position.

FIGS. 59A-59J illustrate a further construction of a fine adjustment assembly M18 including a wedge lock M352. The fine adjustment assembly M18 includes a worm gear rotatably coupled to the base coaxial with the miter axis. A worm pinion is rotatably coupled to the table of the miter saw. One end of the worm pinion meshes with the worm gear, while a dial or knob is fixed to the other end of the worm pinion to impart rotation to the worm pinion.

A wedge M356 is positioned between the worm gear and the base for movement toward and away from the worm gear. A lever is pivotably coupled to the table and the wedge, such that the lever may actuate the wedge toward or away from the worm gear. The wedge is configured to frictionally engage the worm gear and the base to lock the worm gear to the base.

Fine adjustment of the table with respect to the base may be accomplished by pivoting the lever, thus causing the wedge to move inwardly toward the worm gear to frictionally engage the worm gear and the base to lock the worm gear to the base. An operator may then rotate the knob, which in turn rotates the worm pinion relative to the worm gear. Since the worm gear is locked to the base, the worm pinion and the table may be adjusted about the miter axis in fine increments relative to the base.

To allow macro adjustment of the table with respect to the base, the operator may pivot the lever to disengage the wedge from the worm gear and the base to unlock the worm gear from the base. Thus, free movement of the table relative to the base is allowed. To re-lock the table to the base, the operator may release the lever to return the wedge to a position in which it is engaged with the worm gear and the base.

Figure 60:
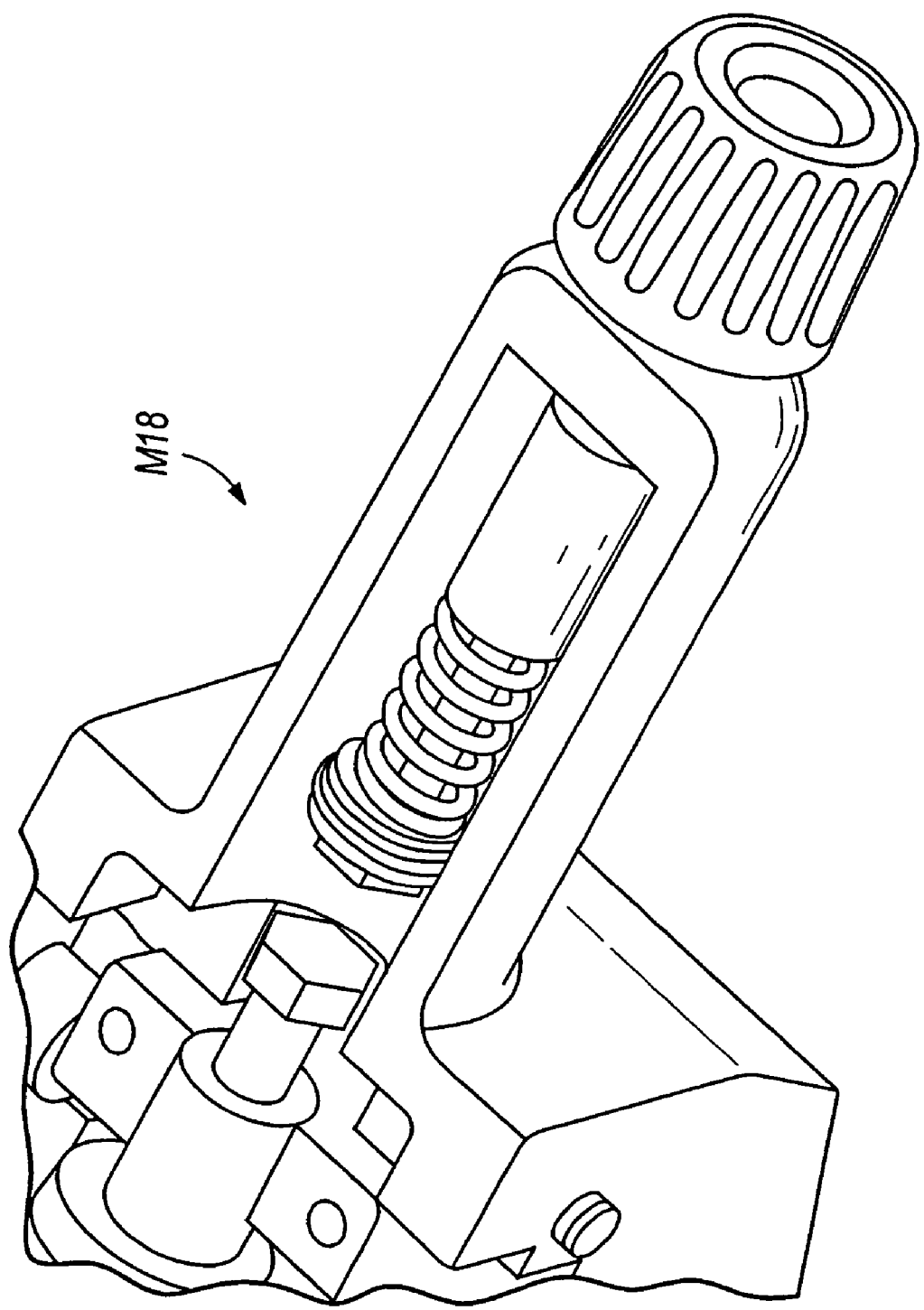
FIG. 60 is a front perspective view of a portion of a saw, such as another construction of a fine adjustment assembly and a supplemental miter angle locking assembly.

FIG. 60 illustrates another construction of a fine adjustment assembly M18 including a supplemental miter angle lock.

Figure 61:
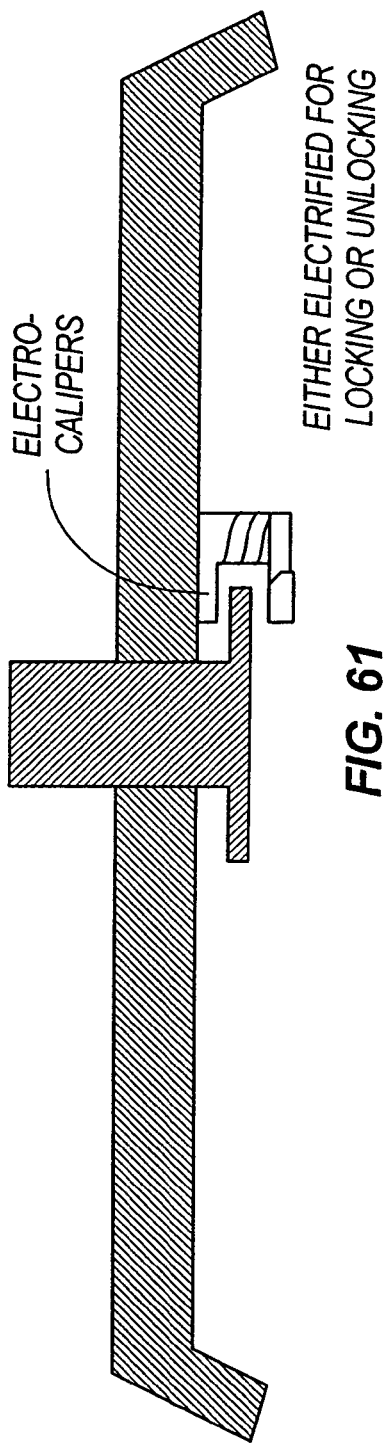
FIG. 61 is a schematic view illustrating another construction of a miter angle locking assembly.
Figure 62:
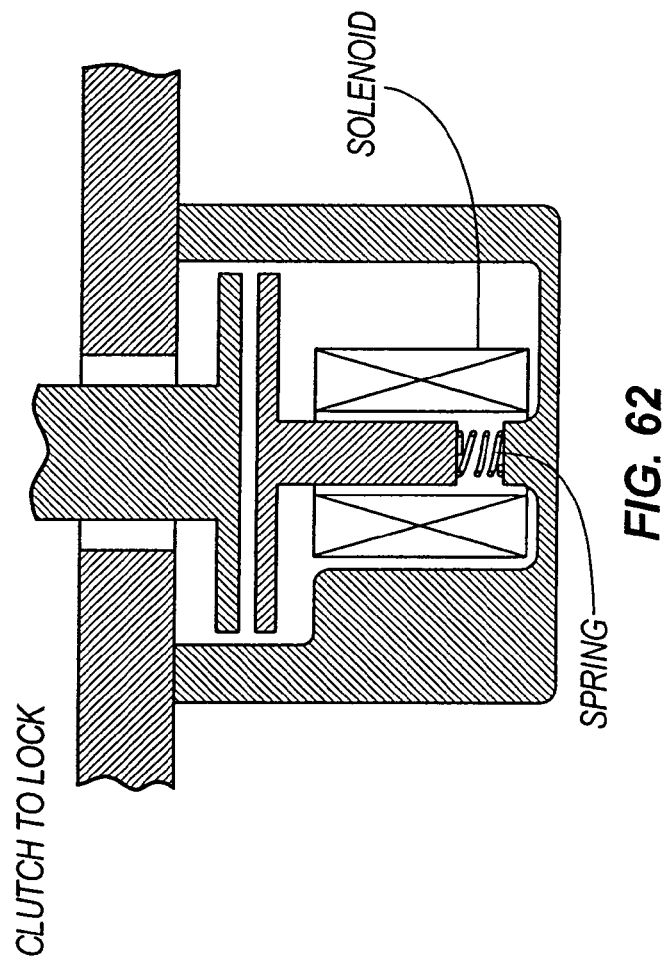
FIG. 62 is a schematic view illustrating yet another construction of a miter angle locking assembly.

FIGS. 61-63 illustrate various locking arrangements, such as electrical locking arrangements, which may be used to hold the table T18 in a selected miter angle position relative tot he base T14 and/or to hold the bevel arm B14 in a selected bevel angle position relative to the table T18.

FIGS. 64A-64C illustrate a miter angle scale incorporating a plurality of user-adjustable detents M360. A miter angle sensor module M364 for determining the position at which the table T18 is positioned relative to the base T14. The sensor module communicates with the miter angle indicator and controller module. The detent position magnets M368 may be positioned by the user (or during manufacture) at given miter angle positions. The user can set any given miter position in the controller, much like programming a pre-set radio station. A locking mechanism may be provided to hold the turntable in the desired miter angle position.

FIGS. 65A-65E illustrate constructions of a miter scale M20 formed with integral miter angle detent recesses M54. Slots in the miter scale enable the miter scale to be adjustably connected to the base T14 so that the miter angle can be "zeroed" to provide an accurate angle relative to components of the saw 10 (e.g., the saw blade SB, the support surface on the fence assembly F, etc.) during or after manufacture.

Figure 65A:
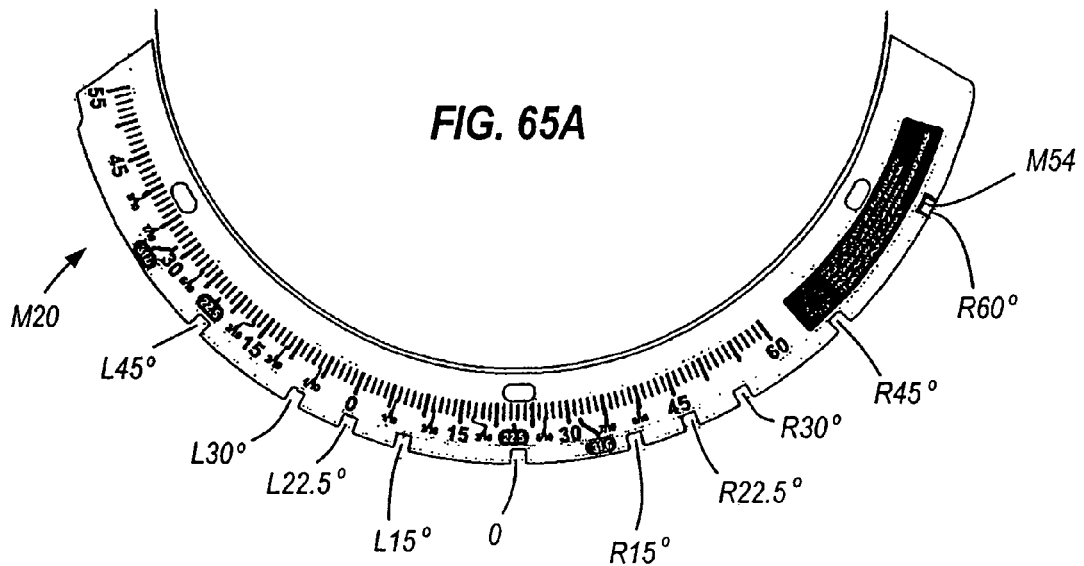
FIGS. 65A-65E are views of alternate constructions of a miter angle scale and a plurality of integrally-formed detents.
Figure 65B:
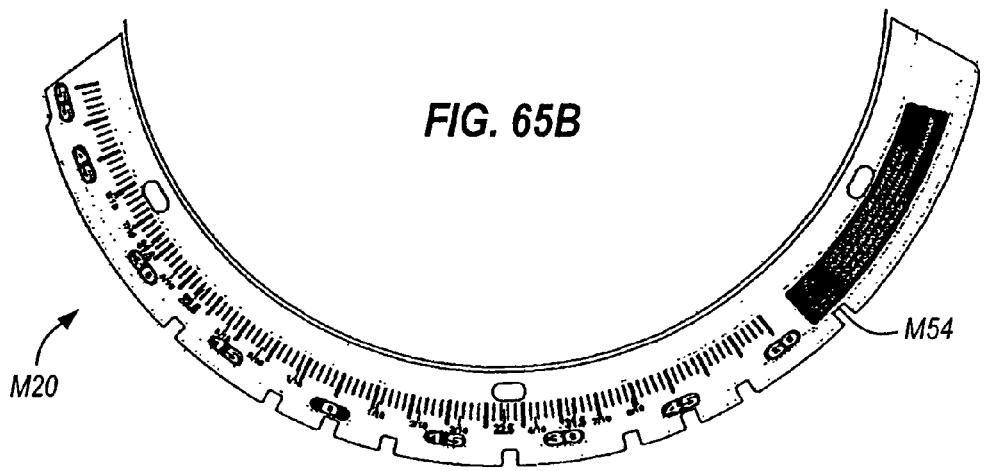
Figure 65C:
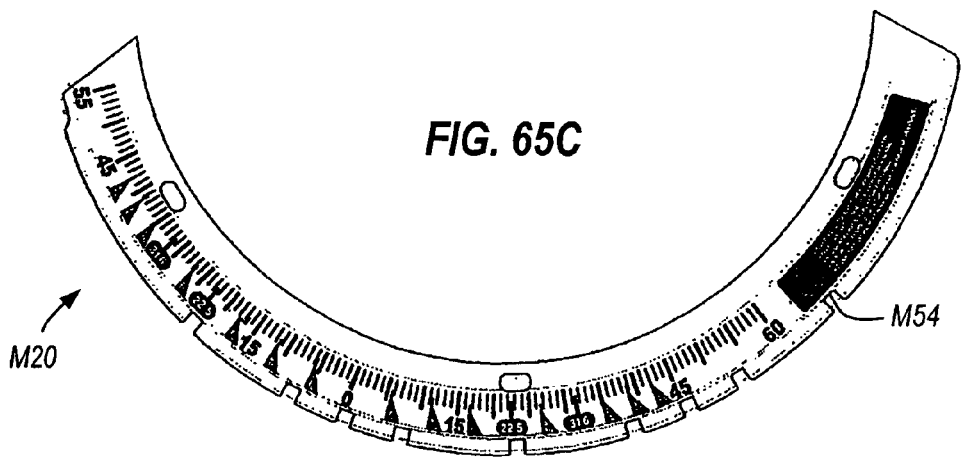
Figure 65D:
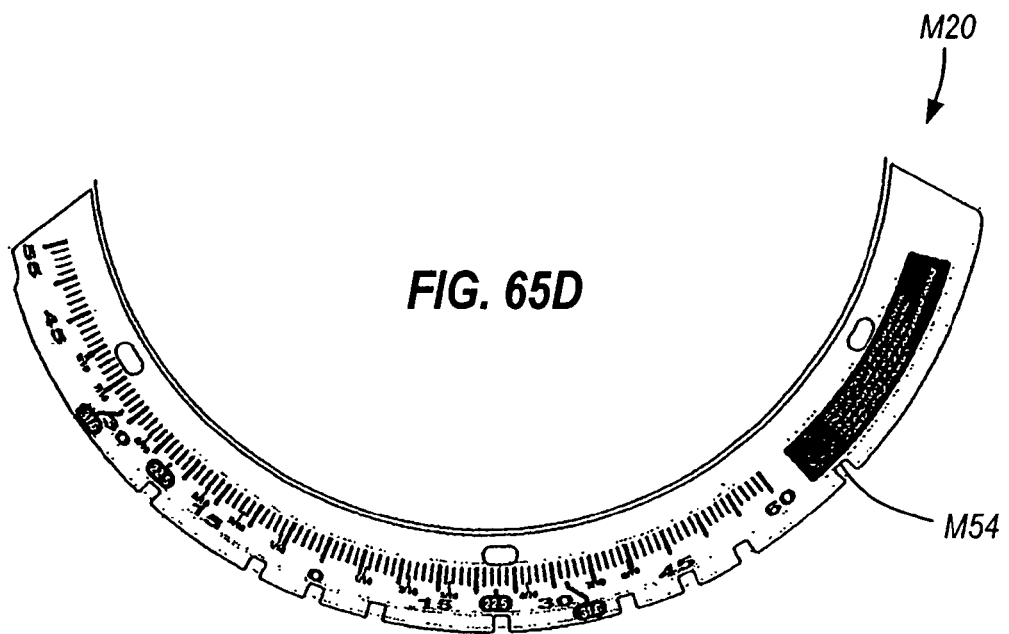
Figure 65E:
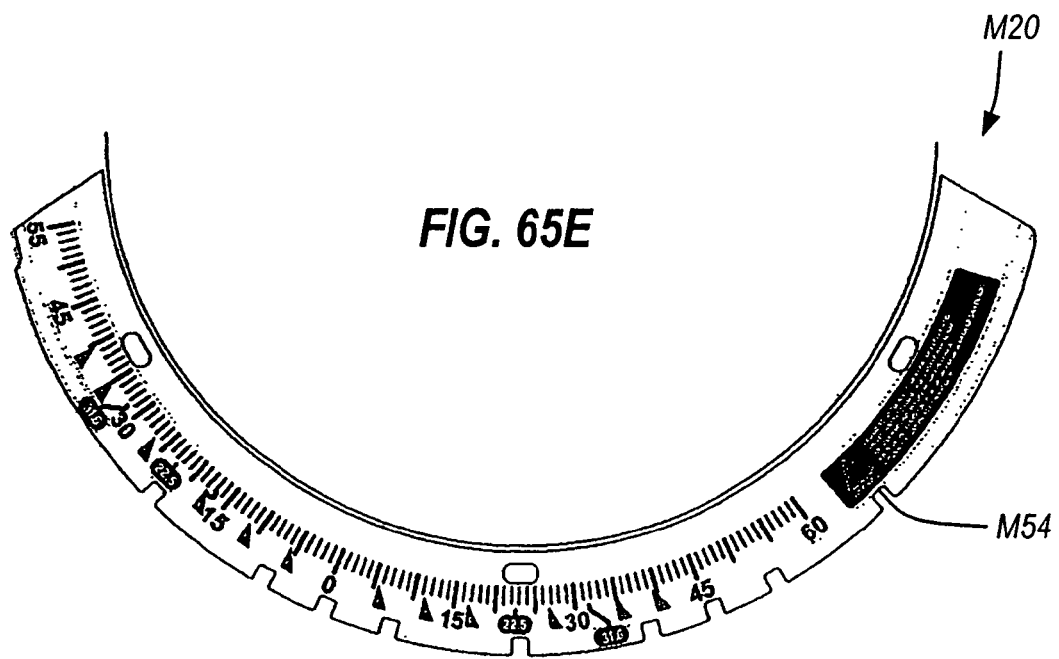

As shown in FIG. 65A, the miter scale M20 may define a plurality of detent recesses M54 each corresponding to selected miter angle (e.g., 0 degrees; left 15 degrees, 22.5 degrees, 30 degrees and 45 degrees; right 15 degrees, 22.5 degrees, 30 degrees, 45 degrees, and 60 degrees etc.).

Figure 66A:
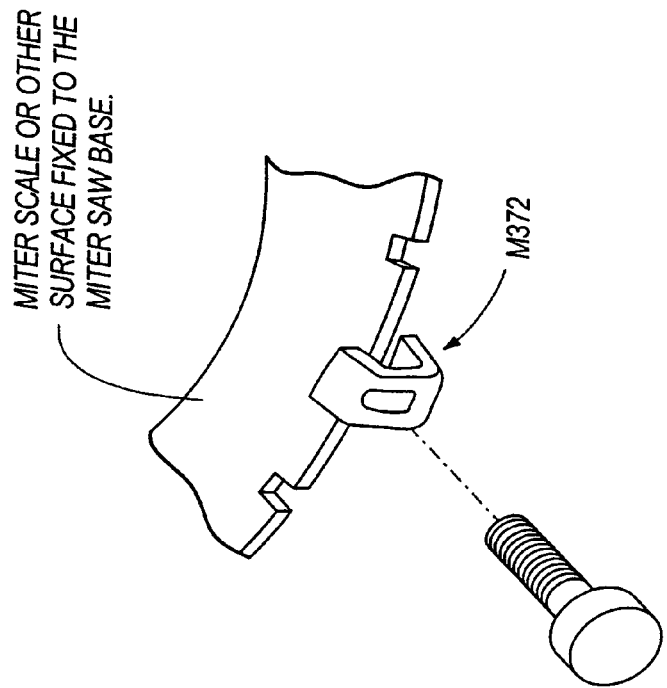
FIGS. 66A-66B are views of an adjustable miter angle stop assembly.
Figure 66B:
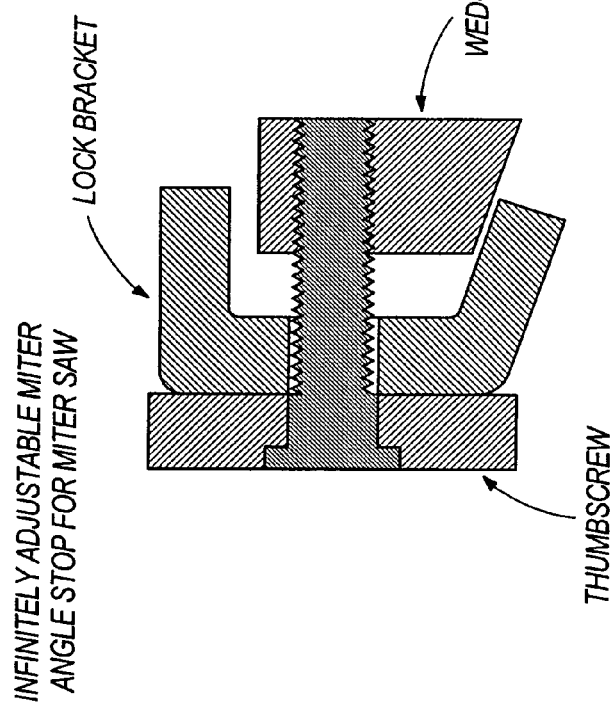

FIGS. 66A-66B an infinitely adjustable miter angle stop assembly M372. The stop may be mounted along the miter scale M20 and may be fixed in a position to stop movement of the table T18 relative to the base T14 in a selected miter angle position. The miter stop may be positioned anywhere along the miter scale.

FIGS. 5E, 5G-5H and 5J illustrates a miter adjustment assembly M having left and right operator's handles. A detent release is supported on each handle.

For the fine adjustment assembly M18 including a roller concept, a rubber or other elastomeric overmold could be added to the friction wheel to increase holding power.

A supplemental lock can be added to a worm-clutch fine adjustment mechanism. Such a lock works by clamping (via turning a threaded knob) against the shaft whose axis on which the clutch lies. This operation can add more force to the clutch than a spring can provide by itself. The result is that the clutch is clamped with a much higher force which produces much greater holder force. The fine adjustment mechanism is still operable, even in the clamp position, because the shaft can still rotate.

Bevel Adjustment Assembly B

FIGS. 67-80 illustrate at least portions of constructions of a bevel adjustment assembly B for adjustment of the angle of the saw blade SB relative to the work piece WP about a generally horizontal angle.

As shown in FIGS. 67A, 68B and 71B-71C, the bevel adjustment assembly B includes a bevel arm B14 on which the saw unit D14 is supported for movement between the raised, non-cutting position and the lowered, cutting position about an axis D28. The bevel arm B14 (and the saw unit D14 and the saw blade SB) is supported by the base and table assembly T for pivoting movement about a bevel axis B18 to adjust the angle of the saw blade SB relative to the work piece WP.

In the illustrated construction, the bevel arm B14 is supported by the table T18 for movement with the table T18 relative to the base T14 and is supported by the sliding support assembly T66 for sliding movement relative to the table T18 to provide a sliding compound miter saw 10. A table mount housing B22 is supported by table T18 (e.g., by the slide tubes T70). The bevel arm B14 includes a bevel arm housing B26 pivotally connected to the table mount housing B22. A bevel angle indication assembly B27 including a bevel scale B28 and a pointer B29 indicates the bevel angle to the user.

A locking mechanism B30 is provided between the bevel arm B14 and the table T18 to releasably hold the bevel arm B14 (and the saw unit D14 and the saw blade SB) in a bevel angle position relative to the table T18. In the illustrated construction, the locking mechanism B30 includes a brake mechanism B34. The brake mechanism B34 may be a mechanical, electrical, or a hydraulic-type brake mechanism.

In the illustrated construction, the brake mechanism B34 includes a brake disk B38 connected to the table mount assembly B22 and a brake caliper assembly B40 connected to the bevel arm housing B26. The caliper assembly B40 includes a caliper housing B41 fixed to the bevel arm housing B26 and a movable caliper B42. The caliper B42 is movable to selectively frictionally engage the brake disk B38 to lock the bevel arm housing B26 in a bevel angle position relative to the table mount assembly B22. As shown, the caliper B42 directly frictionally engages the brake disk B38. In other constructions (not shown), other structure, such as brake pads, may be positioned between the caliper B42 and the brake disk B38, such that the pads engage the brake disk B38.

As shown in FIGS. 1-5, 69, 71A, and 72A-72B, the locking mechanism B30 includes an actuating mechanism B46 to operate the brake mechanism B34 between a locked condition, in which the bevel arm B14 (and the saw unit D14 and the saw blade SB) is locked in a bevel angle position relative to the table T18, and an unlocked or release condition, in which the bevel arm B14 (and the saw unit D14 and the saw blade SB) is movable between bevel angle positions relative to the table T18.

In the locked condition, the actuating mechanism B46 operates to cause the caliper B42 to frictionally engage the brake disk B38 to substantially prevent pivoting movement about the bevel axis B18. In the release condition, the actuating mechanism B46 operates to reduce the frictional force applied by the caliper B42 to the brake disk B38 to allow pivoting movement about the bevel axis B18.

The actuating mechanism B46 includes an actuator, handle, paddle or lever B50, which is engageable by an operator. In the constructions illustrated in FIGS. 1-4, the lever B50 is substantially U-shaped or T-shaped and is engageable from the left or right of the bevel arm B14.

The actuating mechanism B46 also includes a linkage mechanism B54, which transmits movement of the lever B50 by the user to the brake mechanism B34. In the illustrated construction, the linkage assembly B54 includes a flexible cable B58 connected between the lever B50 and the brake mechanism B34 (to the caliper B42) in a manner similar to a bicycle brake assembly. The cable B58 extends from the brake mechanism B34 through at least a portion of the bevel arm housing B26 to the location of the lever B50 on the saw 10.

The locking mechanism B30 also includes a biasing mechanism B62 for biasing a portion of the locking mechanism B30 (e.g., the brake mechanism B34, the actuating mechanism B46) toward the locked condition. In the illustrated construction, the biasing mechanism B62 includes a spring assembly B66 between the caliper housing B41 and the caliper B42 which biases the caliper B42 toward the locked condition. Because of the biasing force toward the locked condition, the user must cause the actuating mechanism B46 to move the caliper B42 to the release condition and must maintain the caliper B42 in the release condition (e.g., by continuing to engage the lever B50) during adjustment of the bevel angle.

It should be understood that, in other constructions (not shown), the biasing mechanism B62 may include another type of member applying a biasing force (e.g., a magnetic force, an electrical force, another type of spring force, etc.). It should also be understood that, in other constructions (not shown), the biasing mechanism B62 may apply the biasing force to another component (e.g., the lever B50, the linkage assembly B54, etc.).

As shown in FIGS. 1-4, the lever B50 is a handle or paddle supported on the bevel arm B14. The lever B50 is pivotable about a lever axis B70 between positions corresponding to the locked condition and the release condition of the brake mechanism B34. In these constructions, the lever B50 is supported to the rear of the axis D28. As such, the user must reach to the rear of the saw 10 to engage and operate the lever B50.

FIGS. 71A, 72 and 81-83 illustrate an alternate location of the lever B50 which is in front of the axis D28. In the illustrated construction, the lever B50 is positioned on the operator's handle H14. As such, while engaging the handle H14 with one hand, the user may engage and hold the lever B50 in the release position and move the saw unit D14 (and the bevel arm B14) to adjust the bevel angle. The user is free to use the other hand to, for example, adjust or grasp the work piece WP. When the lever B50 is released by the operator, the biasing mechanism B62 causes the caliper B42 to re-engage the brake disk B38 to lock the bevel angle.

In other constructions (such as that shown in FIGS. 5H and 5J), the lever B50 may be located on another portion of the saw 10 forward of the axis D28. This other portion of the saw 10 may be a portion which the user would engage to adjust the bevel angle. As shown in FIGS. 5H and 5J, a U-shaped handle H50 is connected to the saw unit D14 and may be engaged by a user to assist in adjusting the bevel angle. The lever B50 is supported on the U-shaped handle H50. As such, while engaging the U-shaped handle H50 with one hand, the user may engage and hold the lever B50 in the release position and move the saw unit D14 (and the bevel arm B14) to adjust the bevel angle. In the construction illustrated in FIG. 5J, lever B50 is movable in both directions by the user to operate the brake mechanism B34.

FIG. 5A illustrates T-shaped handle H42 which the user may engage to adjust the bevel angle and which may include the lever B50.

In another construction (not shown), the lever B50 may be supported on the upper guard D30. As such, while engaging the upper guard D30 with one hand, the user may engage and hold the lever B50 in the release position and move the saw unit D14 (and the bevel arm B14) to adjust the bevel angle. Again, the user is free to use the other hand to, for example, adjust or grasp the work piece WP.

To accommodate the forward position of the lever B50, the linkage assembly B54 extends from the brake mechanism B34 to forward-positioned lever B50. In the illustrated construction, the flexible cable B58 extends through the bevel arm B34 and through a portion of the motor housing D26 to the handle H14 and is connected to the lever B50.

Figure 76E:
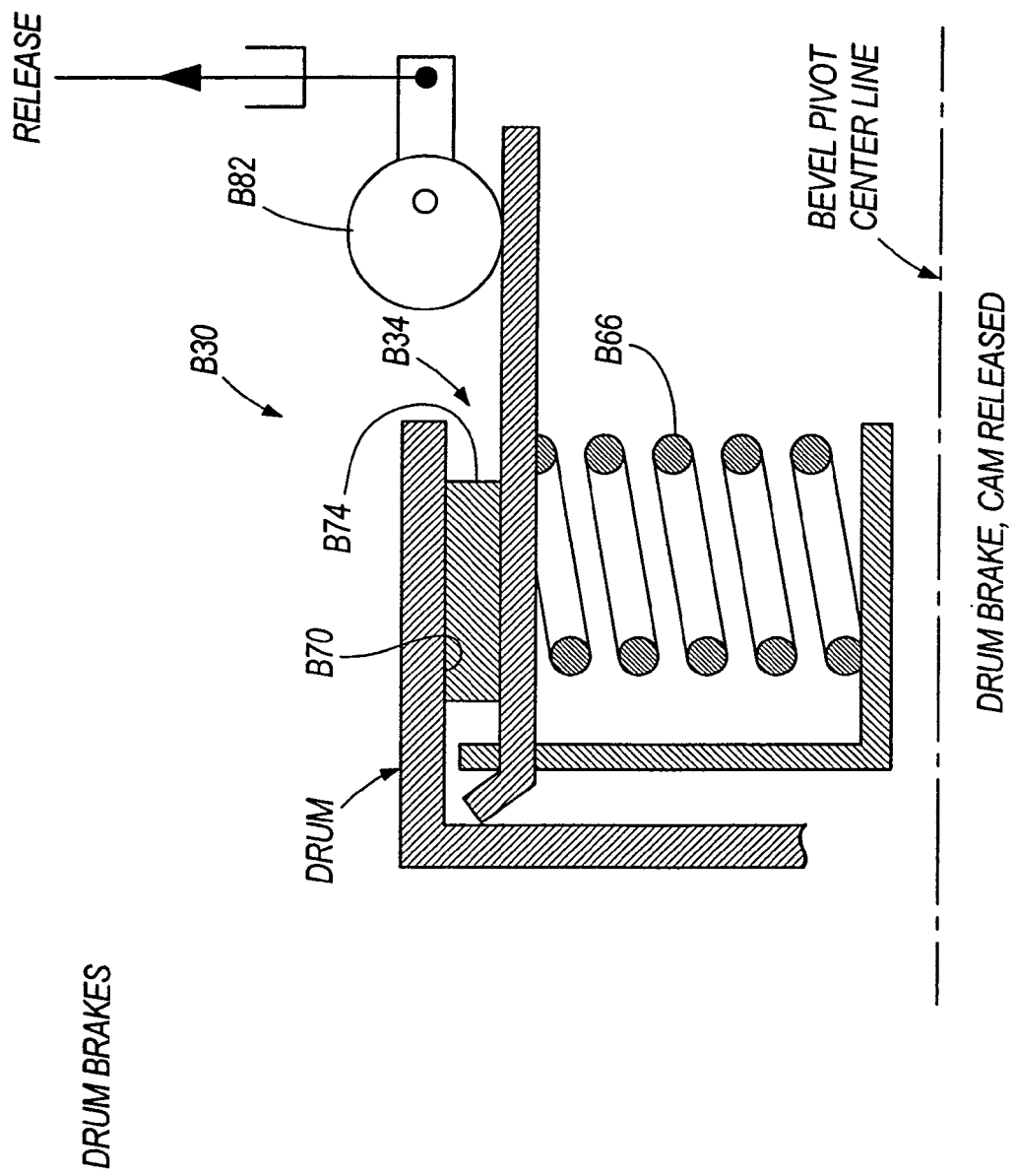

FIGS. 73, 75 and 76E illustrate alternate constructions of the brake mechanism B34, such as a pull brake mechanism. In the illustrated constructions, the brake mechanism B34 includes a brake surface B70 connected to the table mount housing B22 and a cooperating brake surface, such as a brake pad B74, supported by the bevel arm housing B26. The brake pad B74 is movable into and out of frictional engagement with the brake surface B70 to lock and release, respectively, the bevel arm B14 and the table T18. FIG. 76E illustrates a drum brake which is cam actuated to release the brake.

As shown in FIGS. 73-75, the linkage mechanism B54 includes substantially rigid link members B78 connected between the brake pad B74 and the lever B50. As shown in FIGS. 73A-73B, the lever B50 may include a cam B82 to translate pivoting movement of the lever B50 to linear movement of the link member B78 and the brake pad B54. As shown in FIG. 74, the link members B78 are pivoting link members to translate pivoting movement of the lever B50 to linear movement of the link member B78 and the brake pad B54. As shown in FIG. 75A, the link member B78 is moved linearly (e.g., by pulling upwardly on the knob end B80) to move the brake pad B74 relative to the brake surface B70.

FIGS. 76A-76G illustrate alternative constructions of the locking mechanism B30. FIGS. 76A-76D illustrate rheonetic locking mechanisms. In such mechanisms, Magnetic Rheonetic (MR) Fluid changes from a liquid (to allow for adjustment) to a near-solid (to provide a locking force) in the presence of a magnet.

Figure 76G:
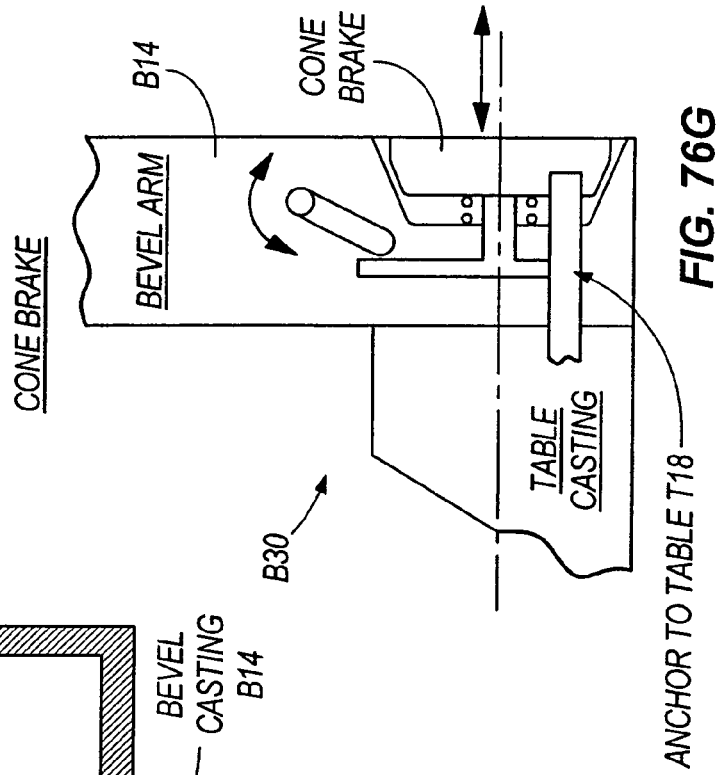
Figure 76F:
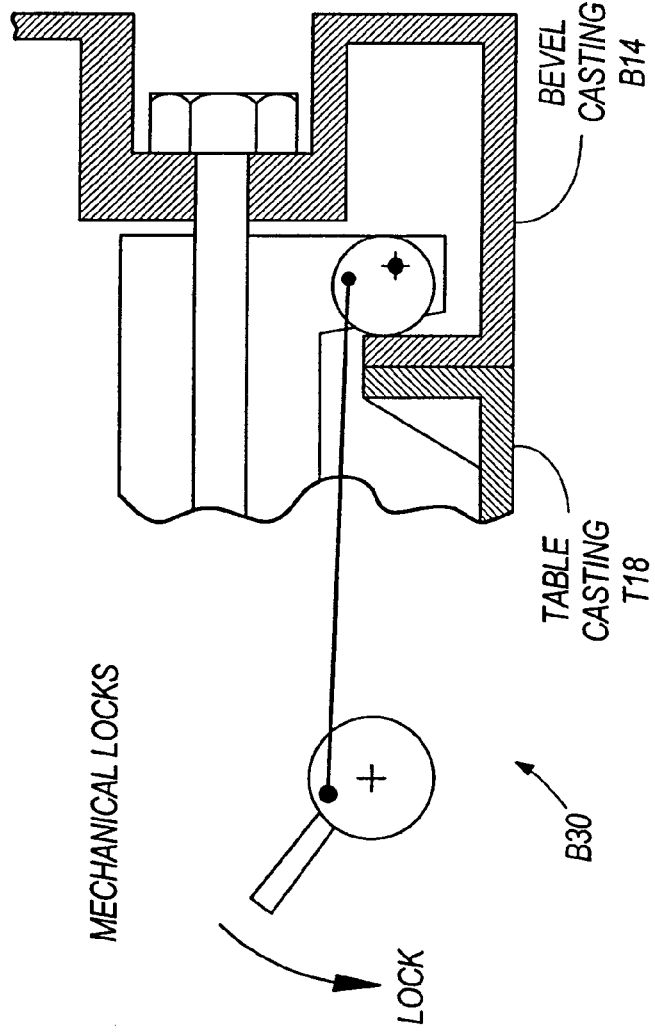
Figure 79D:
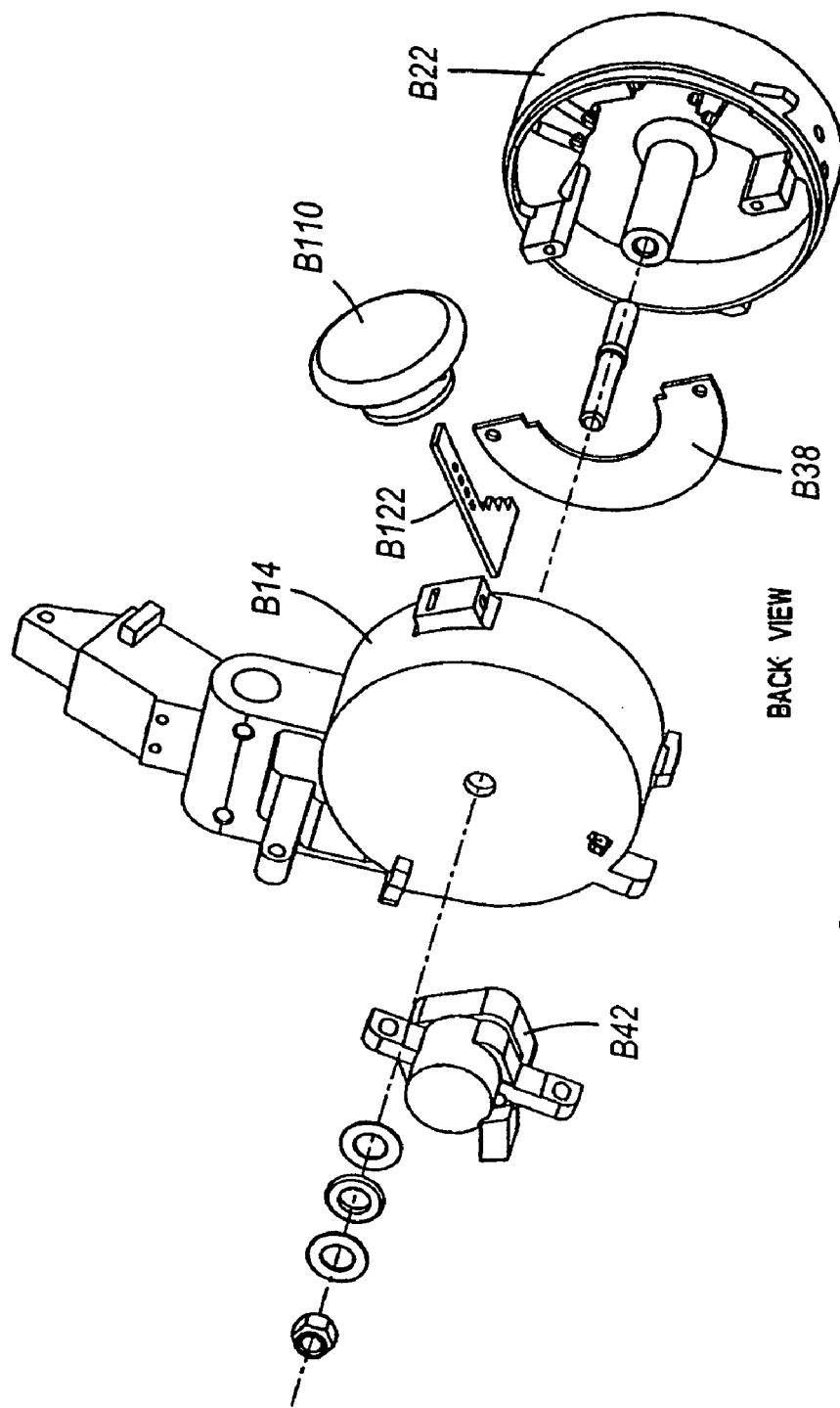
Figure 80D:
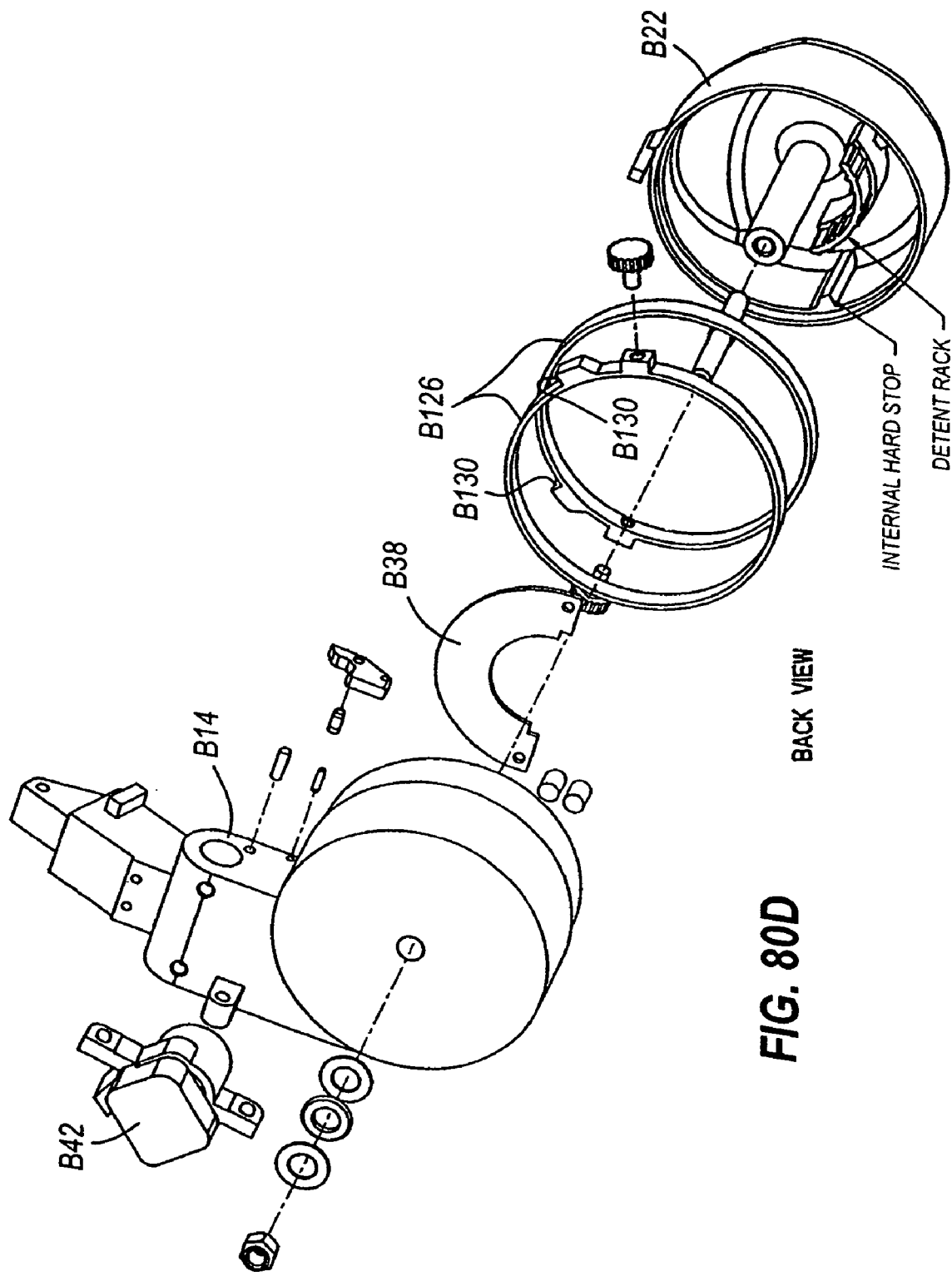

FIGS. 76F-76G illustrate other types of mechanical locking mechanisms, such as a cam lock system (shown in FIG. 76F) and a cone brake system (shown in FIG. 76G).

FIGS. 77A-77B illustrate an assembly which may be used if the relative positions of the lever B50 and the locking assembly B30 are adjustable (e.g., the saw unit D14 is slidably supported on a sliding support assembly T66 which is slidable relative to the bevel arm B14 (such as that shown in FIG. 5D)). An electrical signal may be transmitted through the slide tubes T70 from the lever B50 on the slidable saw unit D14 to the locking mechanism B30 on the non-sliding bevel arm B14.

Figure 67A:
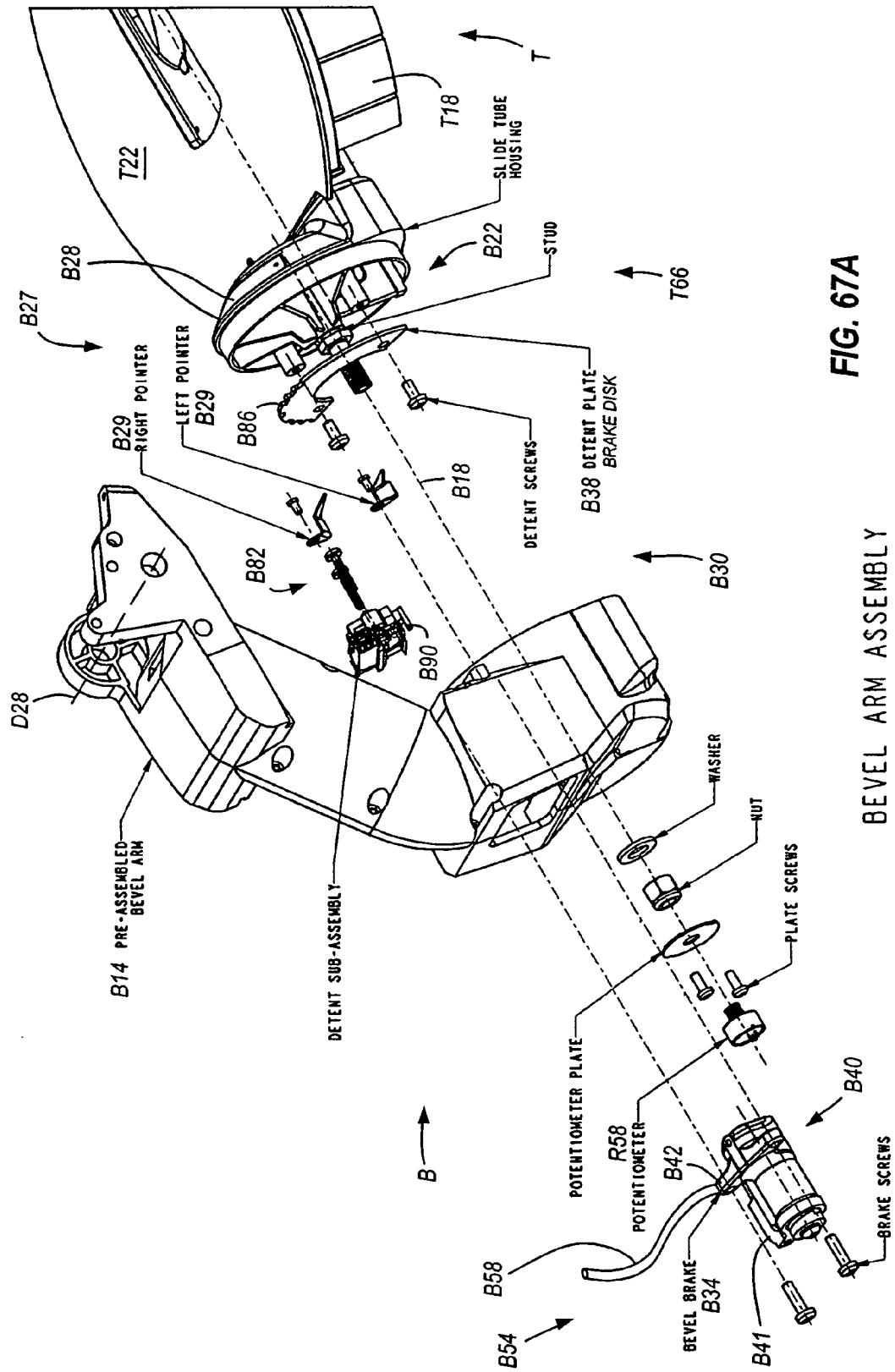
FIGS. 67A-67C are views of a portion of a saw, such as a compound miter saw, a sliding compound miter saw, etc., and illustrating portions of a bevel angle adjustment assembly and a bevel detent assembly.
Figure 67B:
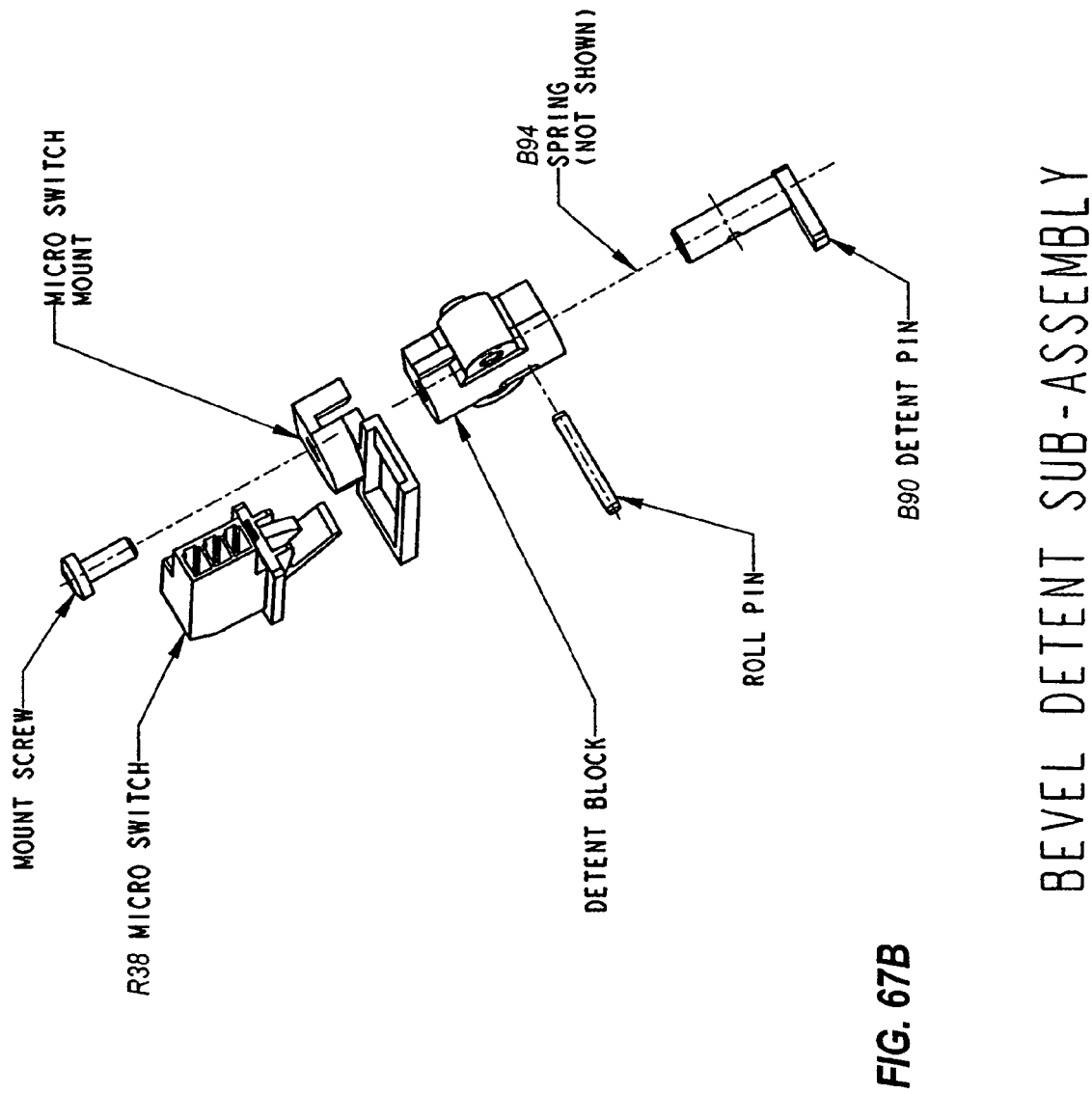
Figure 67C:
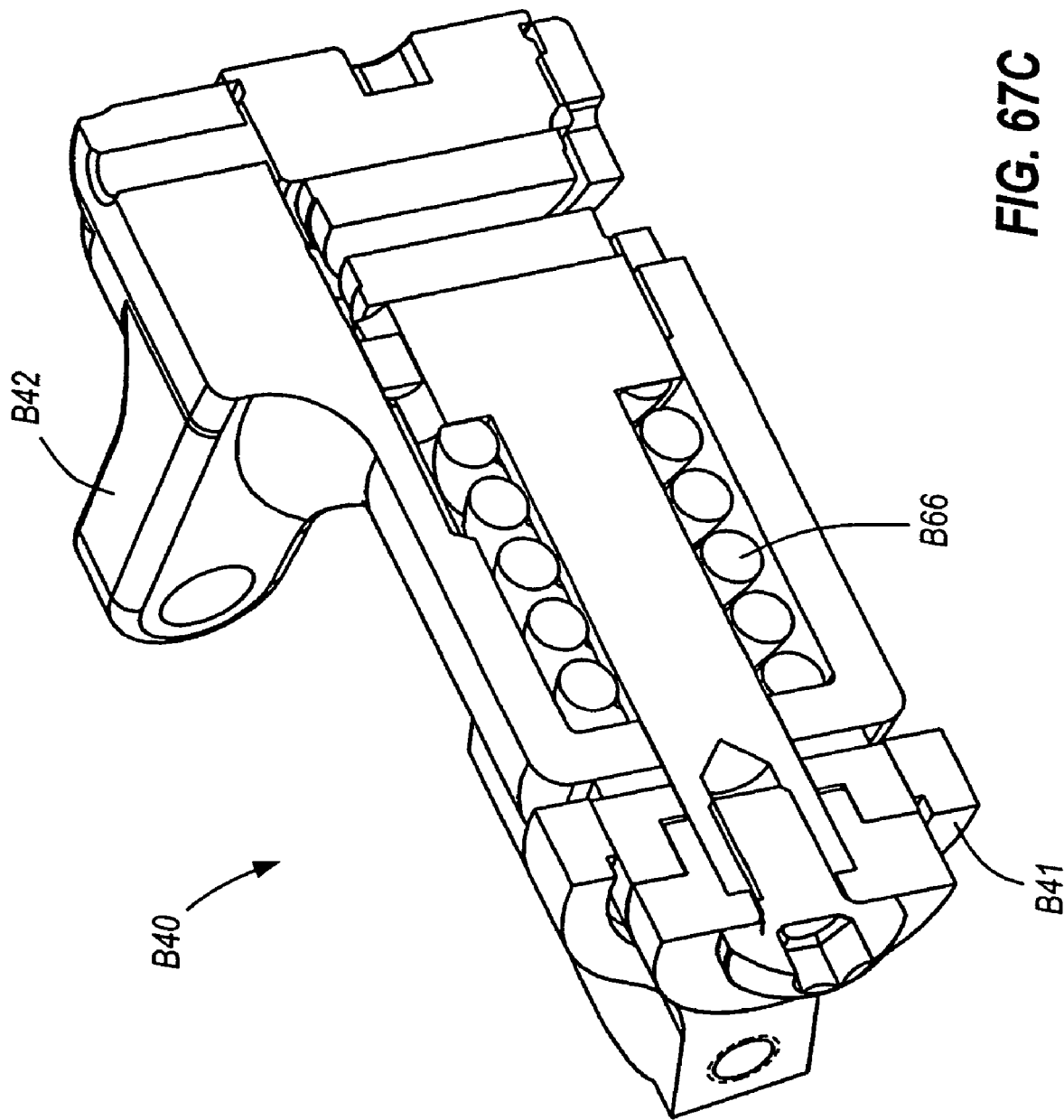
Figure 69:
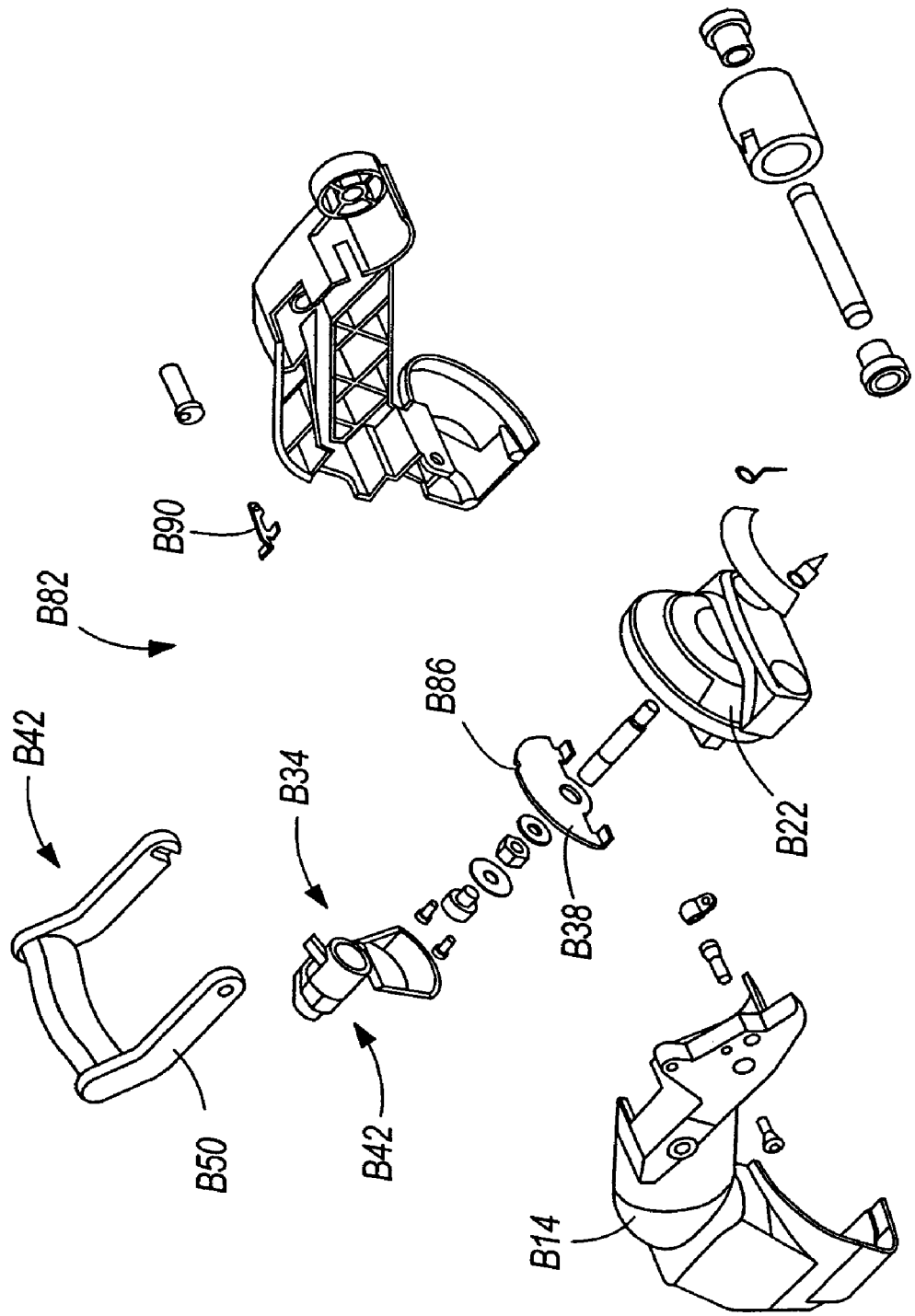
FIG. 69 is an exploded view of yet another construction of a bevel angle adjustment assembly and a bevel detent assembly.

As shown in FIGS. 67-69, in some constructions, the bevel adjustment assembly B also includes a bevel detent assembly B82 which is engageable to positively hold the bevel arm B14 in a selected bevel angle position relative to the table T18. In at least selected bevel angle positions, the bevel detent assembly B82 supplements the locking force applied by the locking mechanism B30, such as the frictional locking force applied by the brake mechanism B34.

The bevel detent assembly B82 includes a projection which is selectively engageable in a recess corresponding to a selected bevel angle. As shown in FIGS. 67A-67B, the brake disk B38 defines one or more detent recesses B86 each of which correspond to a selected bevel angle position. A movable detent pin B90 provides the projection which is engageable in the recess(es) B86, in a detent engaged position to lock the bevel arm B14 in a selected bevel angle position, and disengageable from the recess(es) B86, in a detent disengaged position to allow adjustment of the bevel angle position.

An detent pin actuator assembly is provided to move the detent pin B90 between the engaged and disengaged positions. In the illustrated construction, the detent pin actuator assembly is provided by the actuating mechanism B46. In operation, as the actuating mechanism B46 is operated to release the brake assembly B34, the actuating mechanism B46 moves the detent pin B90 to disengage the recess B86.

With the brake mechanism B34 maintained in the release position, the bevel angle is adjustable.

A biasing mechanism, such as a spring B94 may bias the detent pin B90 toward engagement with a recess B86. If the detent pin B90 is not aligned with a recess B86, the spring B94 causes the detent pin B90 to engage or ride on the outer surface of the brake disk B38.

The actuating mechanism B46 may be movable to a detent override position, in which the detent pin B90 is prevented from engaging the next recess B86 as the bevel angle is adjusted. The actuating mechanism B46 may have an intermediate detent actuation position in which the detent pin B90, once disengaged from a recess B86, is then allowed to engage the next recess B86 while the bevel angle is adjusted. In the intermediate position, the actuating mechanism B46 maintains the brake mechanism B34 is the release position.

Figure 70:
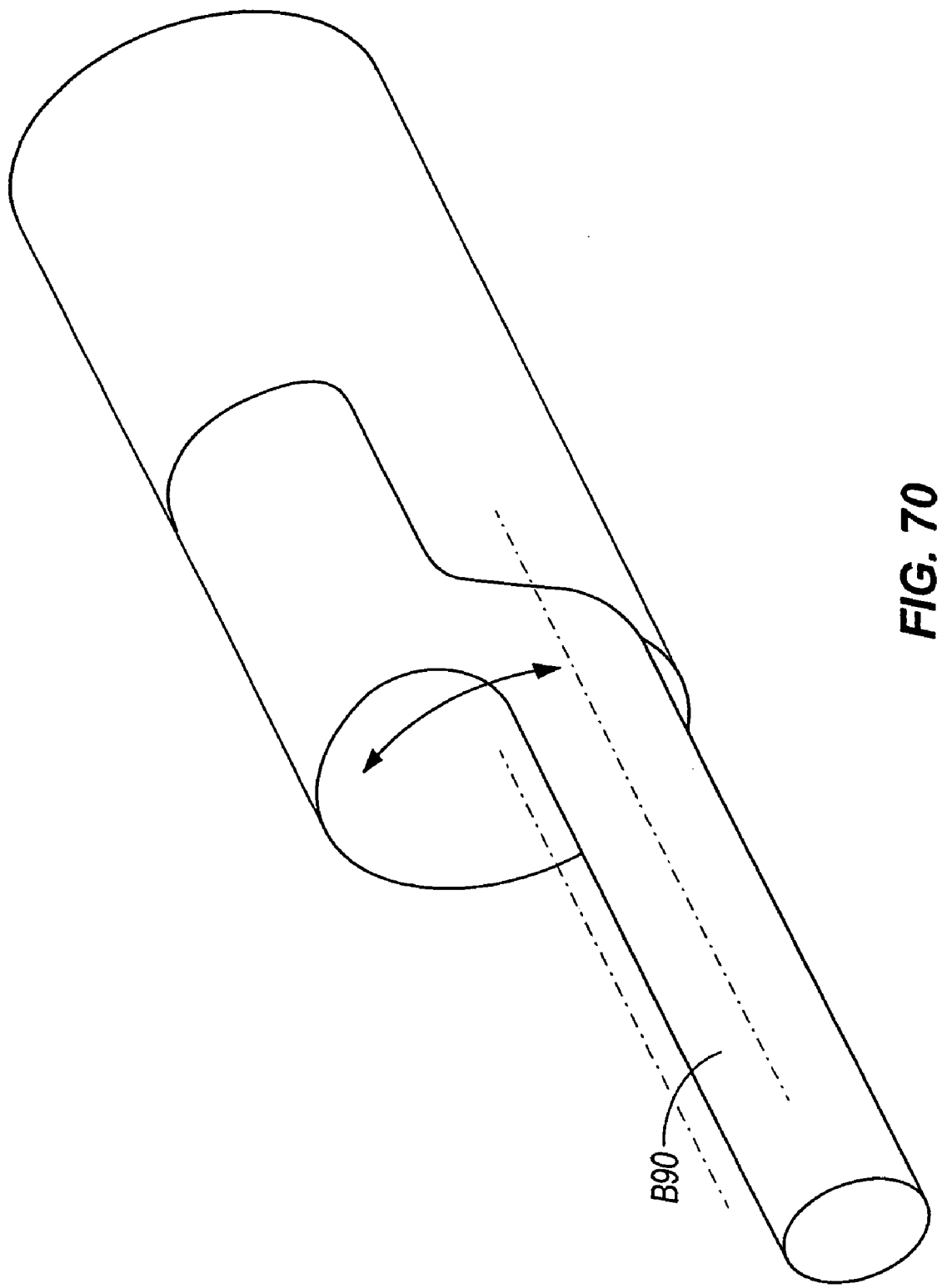
FIG. 70 is a perspective view of an alternate construction of a detent pin.
Figure 71A:
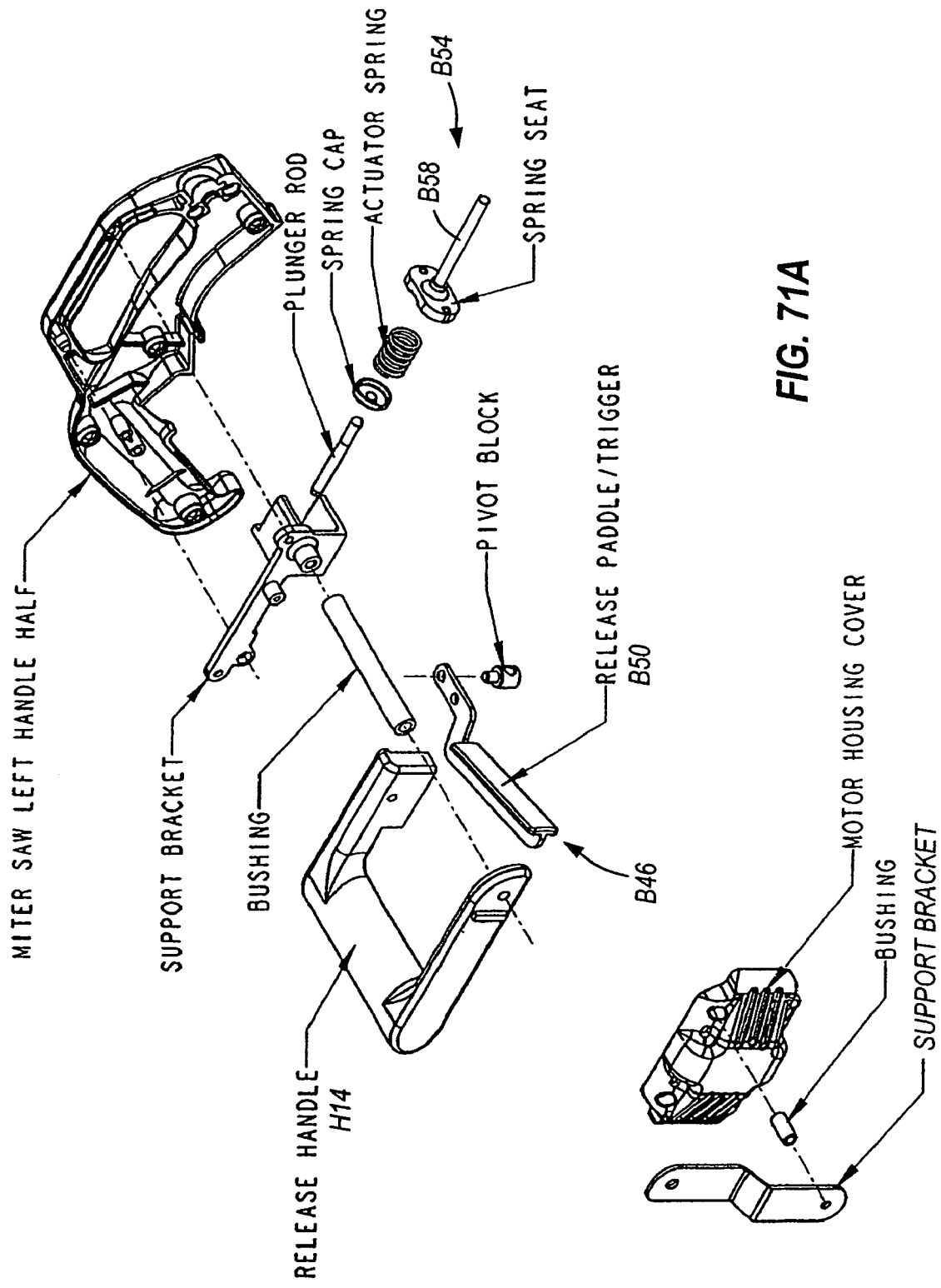
FIGS. 71A-71C are views of portions of a further construction of a bevel angle adjustment assembly.
Figure 71B:
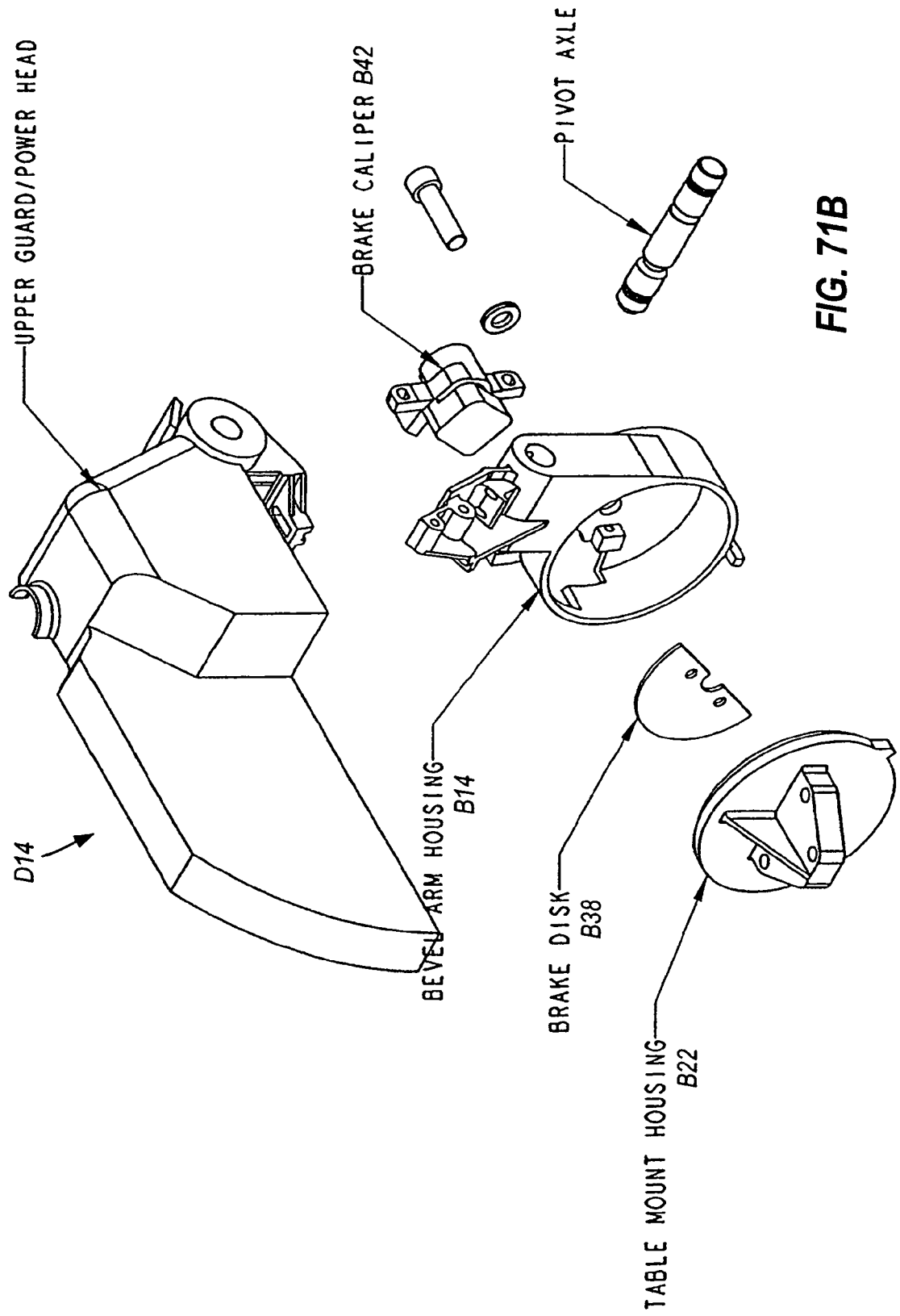
Figure 71C:
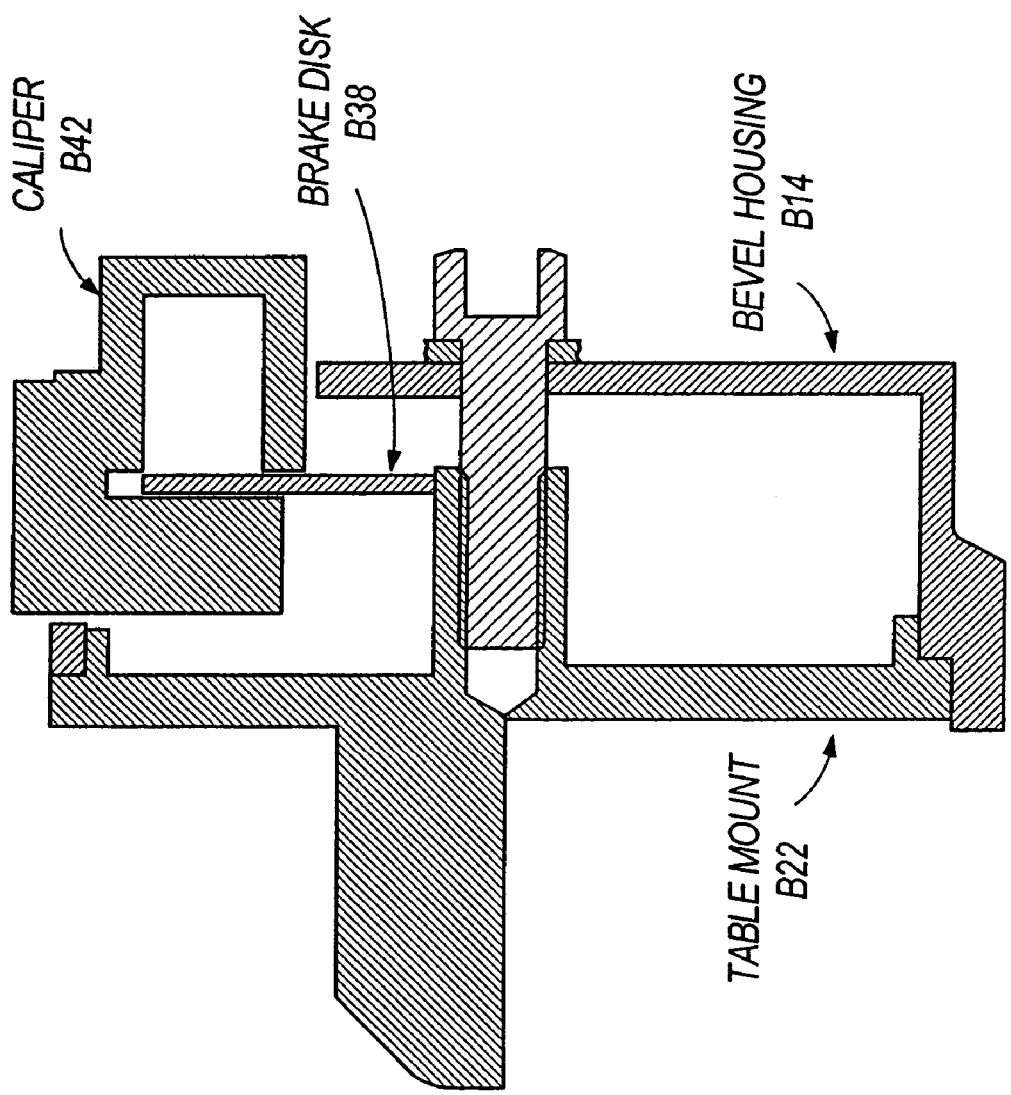
Figure 72A:
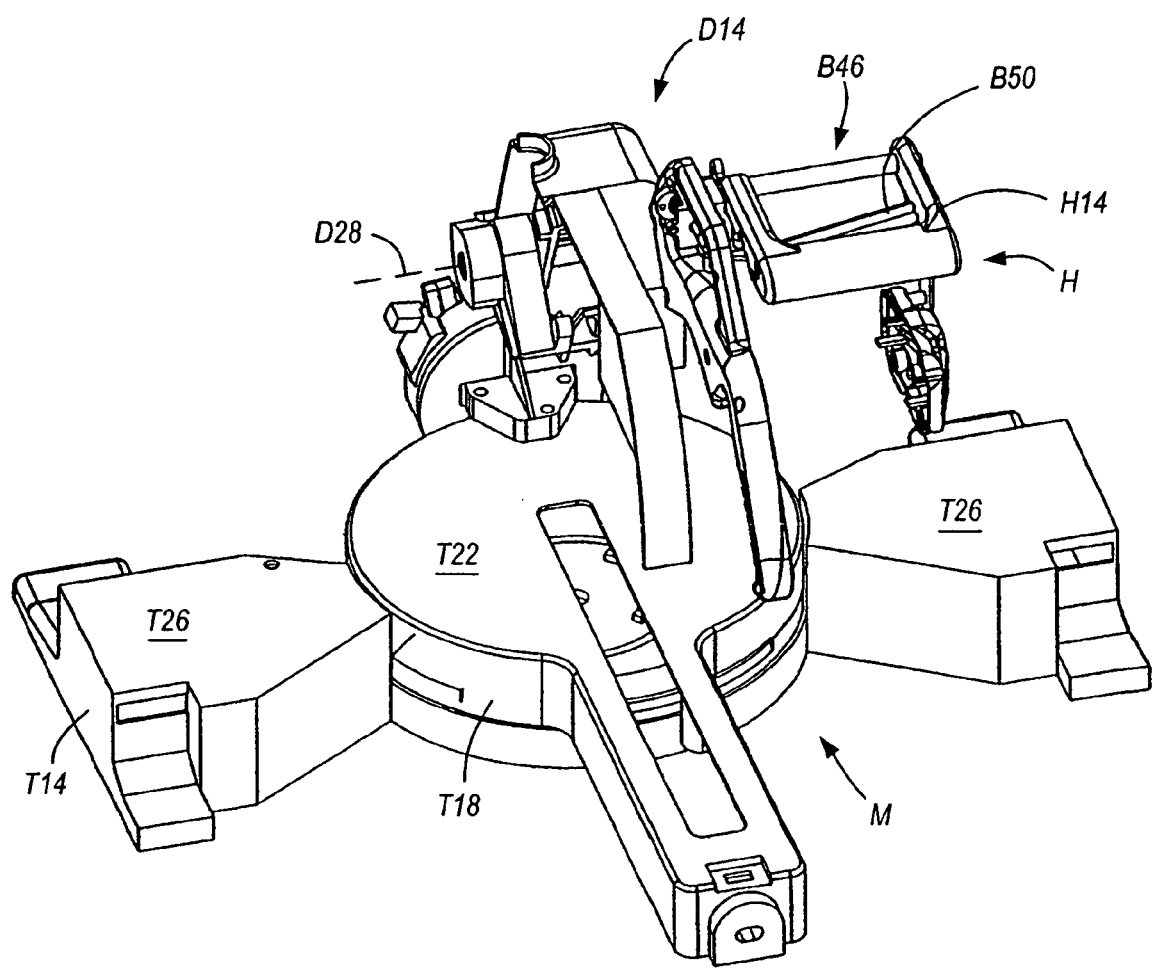
FIGS. 72A-72B are perspective views of a portion of a saw and illustrating operation of a bevel angle adjustment assembly.
Figure 72B:
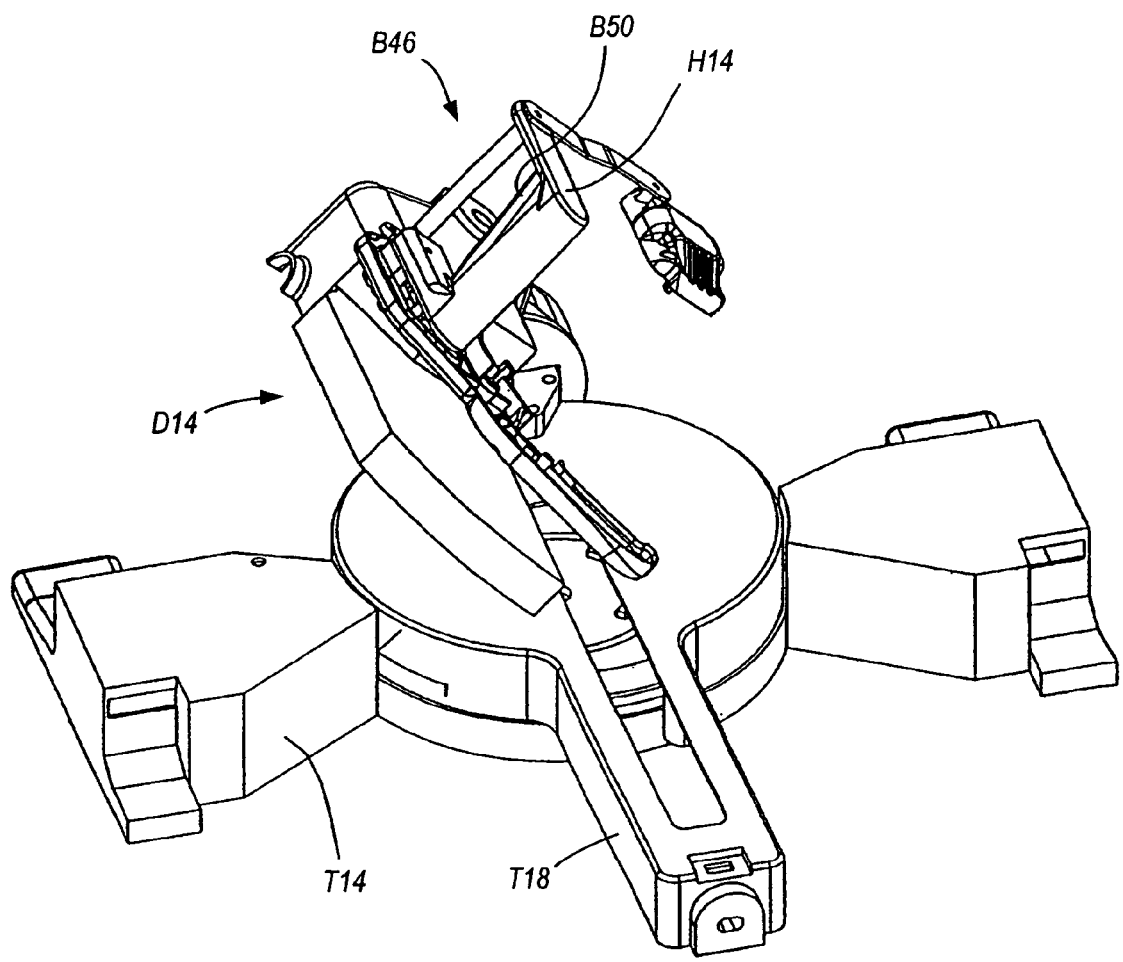

As shown in FIGS. 67A-67B and 68A-68B, the detent pin B90 is generally linearly slidable between the engaged and disengaged positions. In FIG. 69, the detent pin B90 is pivotable between the engaged and disengaged positions. FIG. 70 illustrates a detent pin B90 which is rotatable between the engaged and disengaged positions.

FIGS. 78-80 illustrate various bevel stop arrangements B98. In these arrangements, a user may set a selected bevel angle position at which the bevel arm B14 will be stopped during beveling movement relative to the table T18. The arrangements B98 will operate with the bevel arm B14 being beveled either to the left or to the right.

In a first construction (shown in FIGS. 78A-78G), set screws B102 are positioned in the table mount housing B22. A stop arm B106 moves with the bevel arm B14 and is adjustable to engage one or more set screws B102 to stop beveling movement of the bevel arm B34 relative to the table T18 at selected bevel angle position. A shift knob B110 operates a shift cam B114 to move a shifter B118 along the bevel axis B18. The shifter B118 moves the stop arm B106 into and out of a region of engagement with a given set screw B102 (which determines the bevel angle at which movement is stopped or beyond which movement is prevented without further action by the user).

In another construction (shown in FIGS. 79A-79G), a stepped stop plate B122 is provided for selective engagement with the set screws B102 to stop the beveling movement of the bevel arm B14 relative to the table T18 in a selected bevel angle position.

In another construction (shown in FIGS. 80A-80G), rotatable stop bands B126 are supported on the bevel arm B14 and include stops B130. The bands B126 may be rotated relative to the bevel arm B14 and then fixed in a position to set the bevel angle stop position. The table T18 includes a projection B134 which engages a bevel stop B130 to stop beveling movement of the bevel arm B14 relative to the table T18.

Handle Assembly H

Figure 81A:
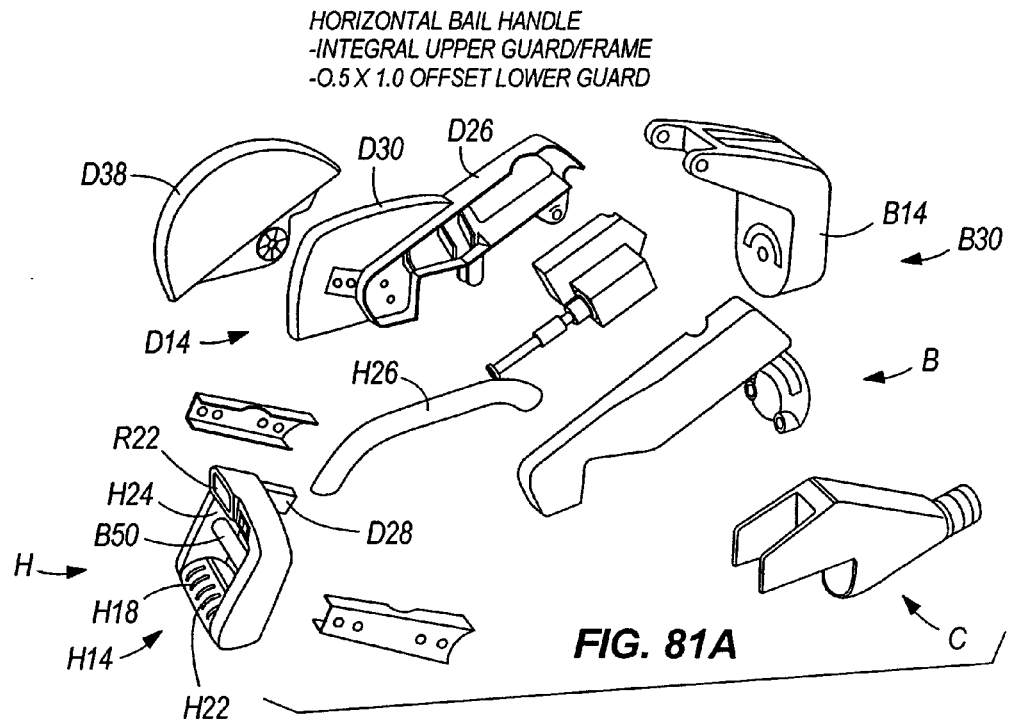
FIGS. 81A-81B are exploded perspective views of alternative constructions of a portion of a saw, such as a D-handle assembly, a bevel adjustment actuator assembly and an upper blade guard.
Figure 81B:
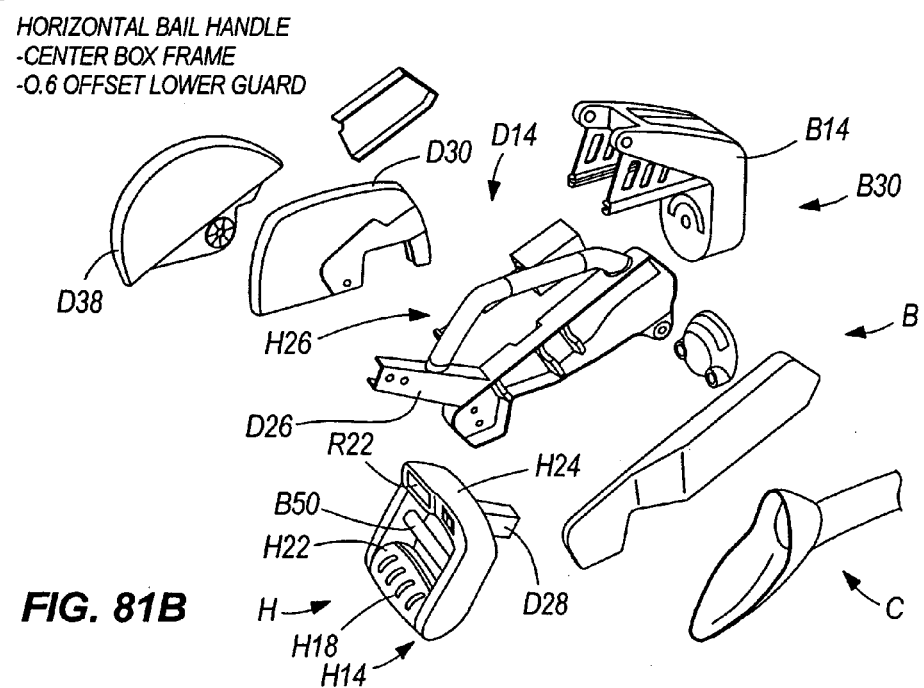
Figures 82A, 82B:
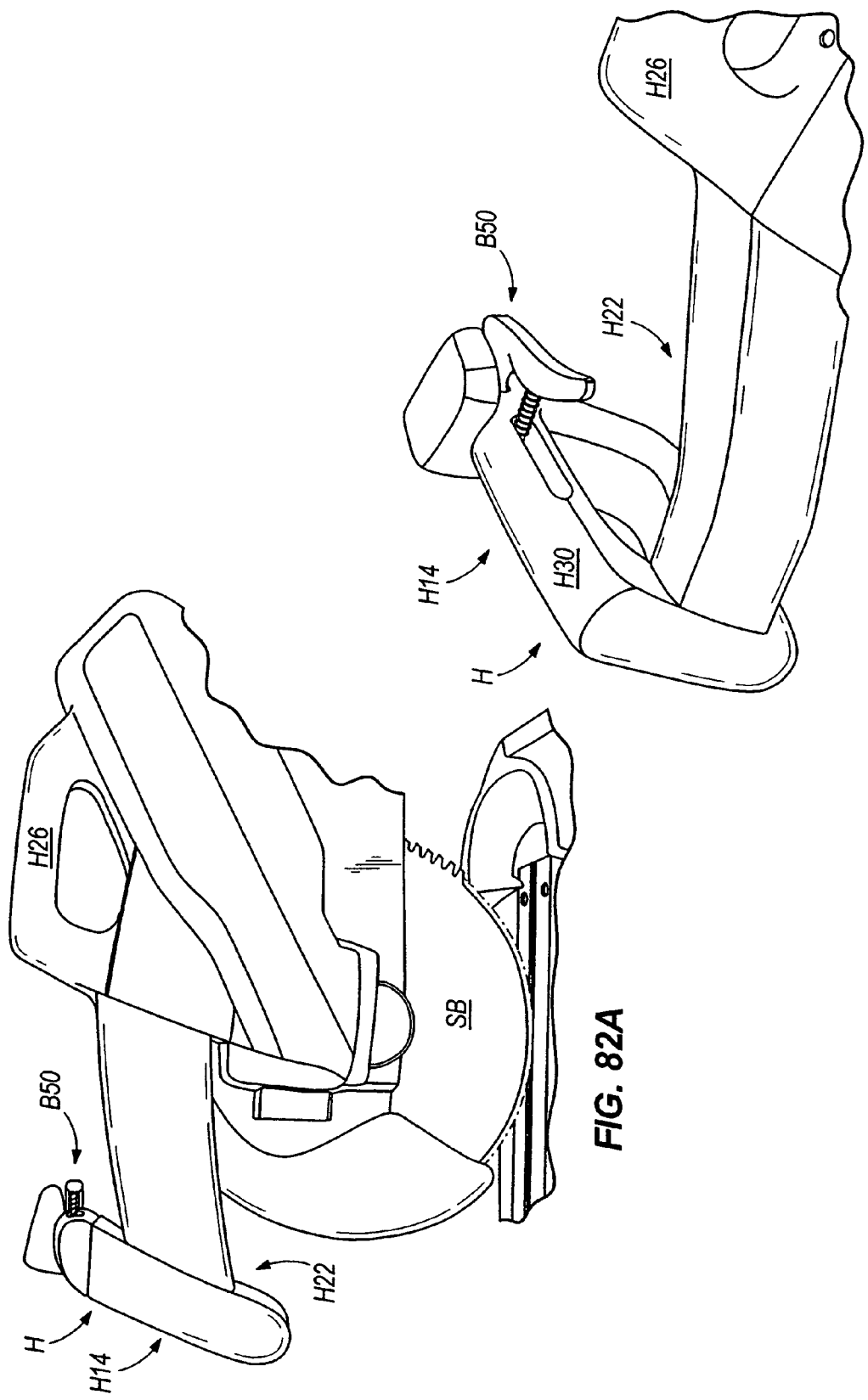
FIGS. 82A-82E are views of a D-handle assembly and an alternate construction of a bevel adjustment actuator assembly.
Figure 82C:
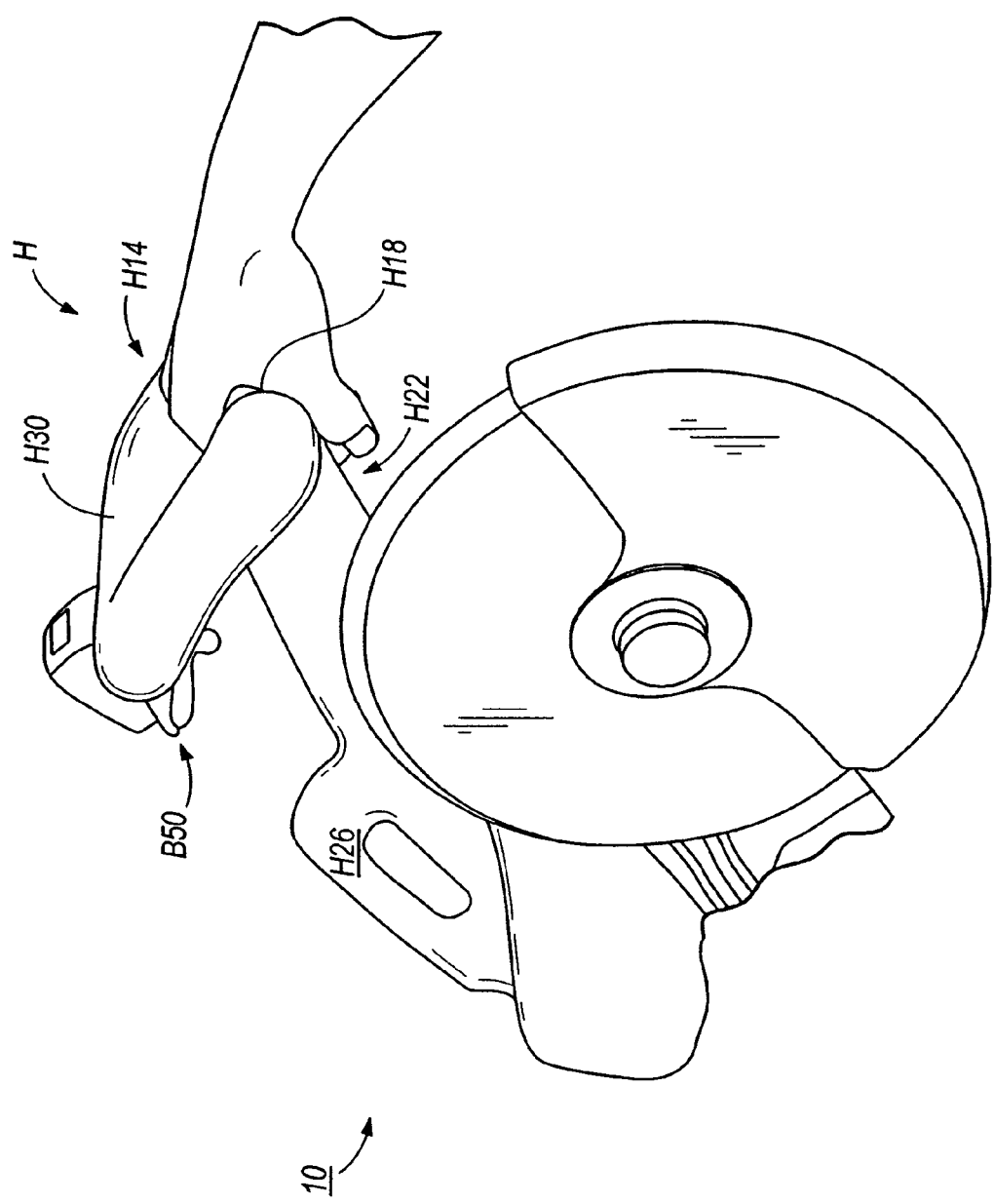
Figure 82D:
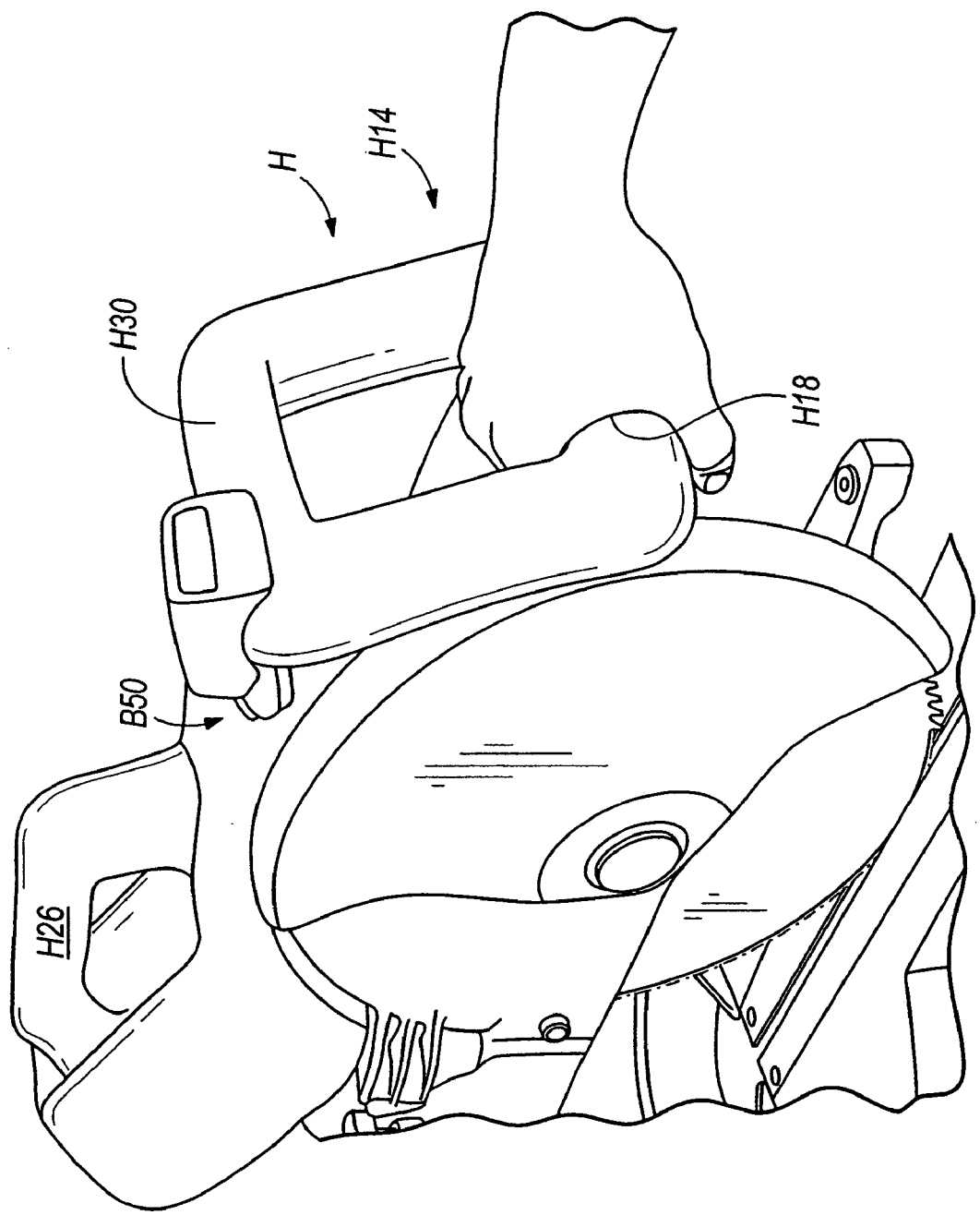
Figure 82E:
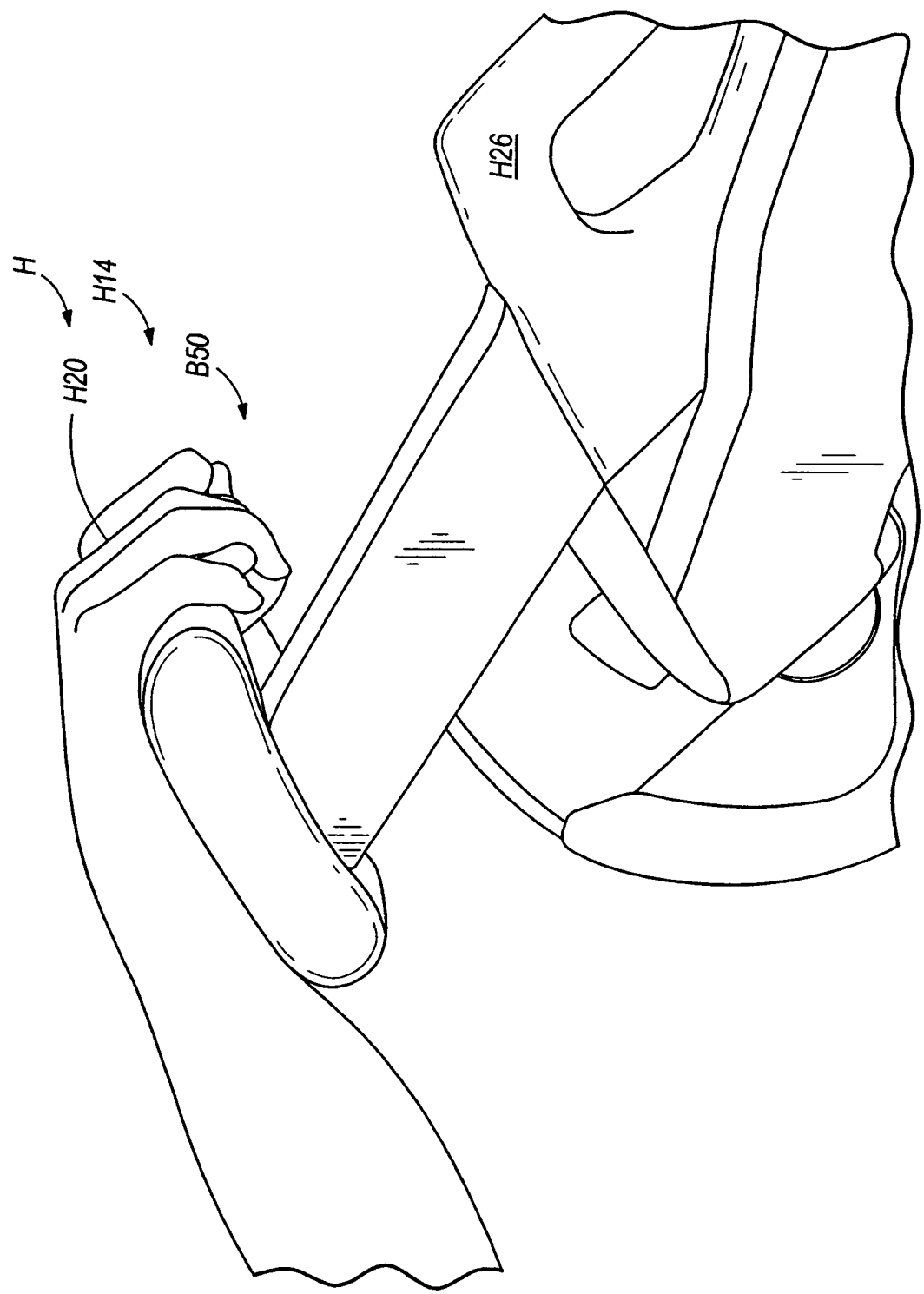

FIGS. 81A-81B illustrate a handle assembly H including a D-shaped operator's handle H14 connected to an arm D28 extending from the saw unit D14. The handle H14 has a main grip H18 on which is supported a main power switch H22 to operate the saw 10. A display R22 is provided on the handle H14 on a surface H24 above where a user's hand would grip the main grip H18. The position of the display R22 on the surface H24, the orientation of the surface H24 on the handle H14 and/or the orientation of the handle H14 relative to the arm D28 (e.g., at a non-parallel angle with respect to arm D28, and illustrated at almost 90 degrees or more with respect to the arm D28) the improves the visibility of the display R22. FIGS. 1-4 and 5K illustrate a similar handle.

As shown in FIGS. 81A-81B, in the illustrated construction, a bail-style release lever B50 is located rearward of the main grip H18. As explained above, the release lever B50 may be used to actuate the bevel angle locking mechanism B30.

To adjust the bevel angle, the release lever B50 may be accessed by the same hand on the main grip H18. A user may place one hand on the main grip H18 and reach for the release lever B50 with out-stretched their fingers. Upon grasping the release lever B50, the user may pull the release lever B50 toward the front of the saw 10 to unlock, disengage or release the bevel locking mechanism B30. While the bevel locking mechanism B30 is unlocked or disengaged, the user may support and adjust the bevel angle of the saw unit D14 using only the hand grasping the main grip H18 and the release lever B50. To lock or re-engage the bevel locking mechanism B30, the user may release the lever B50. The miter saw also includes a carry handle H26 centered over the saw for transporting the saw 10.

FIGS. 82A-82E illustrate an alternate construction for the D-shaped handle H14. The main grip H18 supports the main power switch H22 thereon, and a secondary grip H30 is positioned above the main grip H18. The secondary grip H30 incorporates a release lever B50 for the bevel locking mechanism B30.

To adjust the bevel angle, the release lever B50 may be accessed by the user by grasping the secondary grip H30 rather than the main grip H18. When it is desired to adjust the bevel angle, the user moves a hand to the secondary grip H30 (e.g., the operating hand from the main grip H18) and reaches the release lever B50. Upon grasping the release lever B50, the user may pull the release lever B50 toward the front of the saw 10 to unlock or disengage the bevel locking mechanism B30. While the bevel locking mechanism B30 is unlocked or disengaged, the user may support and adjust the bevel angle of the saw unit D14 using only the hand grasping the main grip H18 and the release lever B50. To lock or re-engage the bevel locking mechanism B30, the user may release the lever B50.

Figure 83A:
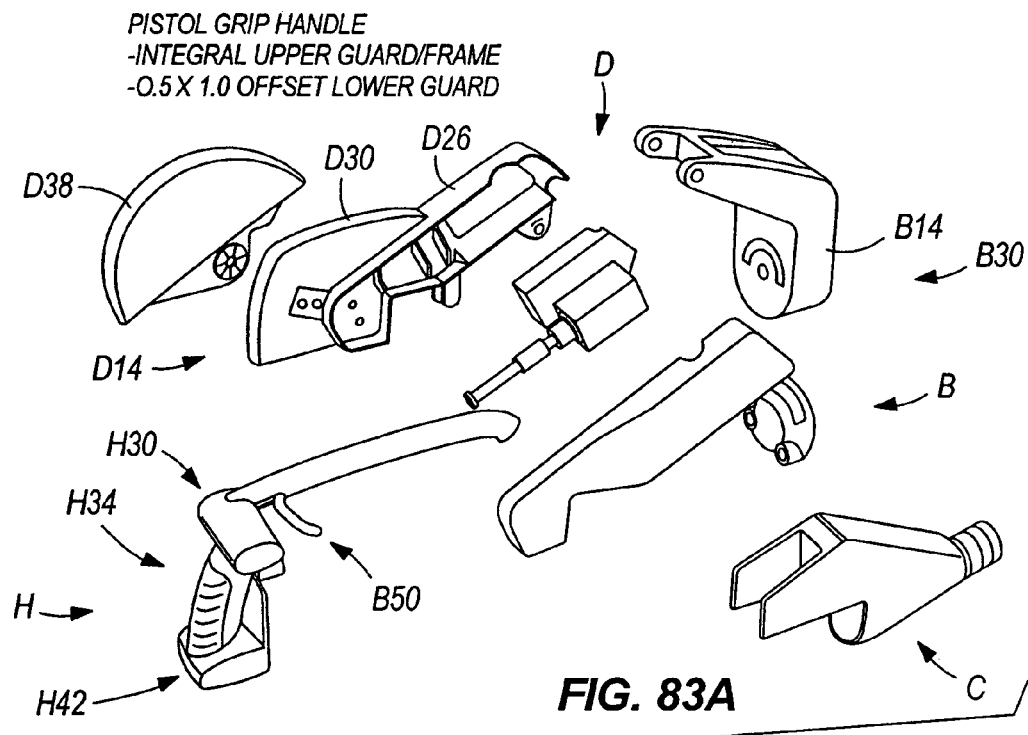
FIGS. 83A-83B are exploded perspective views of alternative constructions of a portion of a saw, such as a pistol grip handle assembly, a bevel adjustment actuator assembly, and an upper blade guard.
Figure 83B:
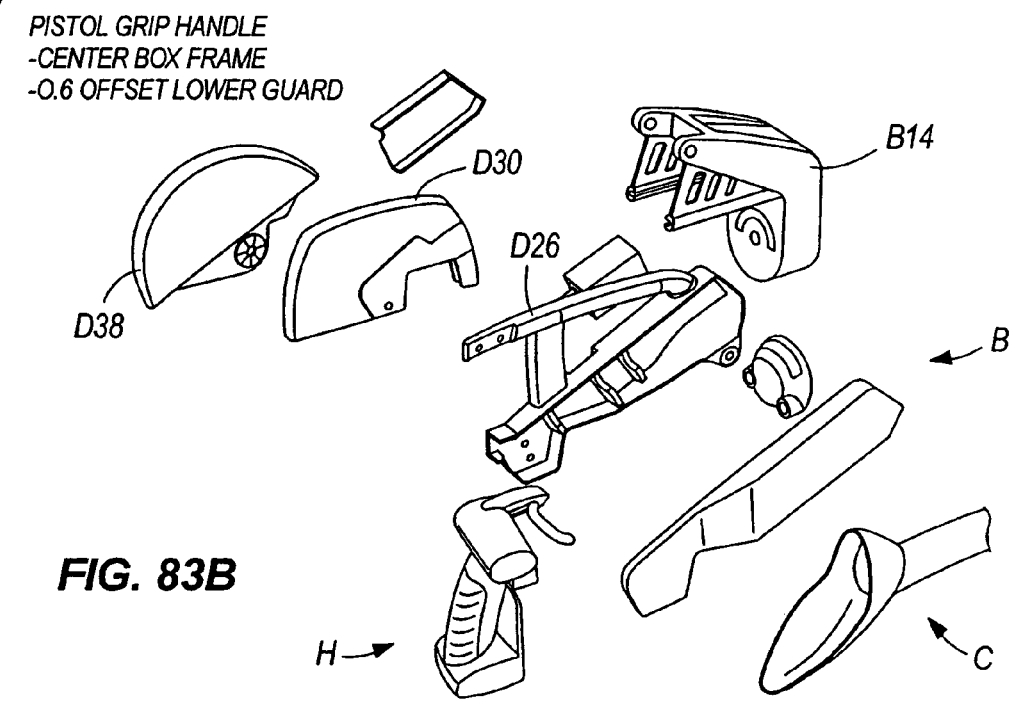

FIGS. 83A-83B illustrate another construction of a handle assembly H. In the illustrated construction, the handle assembly H includes a "joystick" handle H34 supporting the main power switch H22 and secondary handle H38 positioned above the joystick handle H34. The secondary handle H38 incorporates the release lever B50 for a bevel angle locking mechanism B30. The joystick handle H34 may include a contoured surface H42 toward the bottom of the handle H34 for an operator to rest their hand.

Alternatively, the joystick handle H34 may be open toward the top of the handle H34, and the secondary handle H38 may be located rearwardly of the handle H34. Also, the secondary handle may include a T-shape, an L-shape, or a saddle-style grip.

To adjust the bevel angle, the release lever B50 may be accessed by the user by grasping the secondary grip H38 rather than the handle H34. When it is desired to adjust the bevel angle, the user moves a hand to the secondary grip H38 (e.g., the operating hand from the handle H34) and reaches the release lever B50. Upon grasping the release lever B50, the user may pull the release lever B50 toward the front of the saw 10 to unlock or disengage the bevel locking mechanism B30. While the bevel locking mechanism B30 is unlocked or disengaged, the user may support and adjust the bevel angle of the saw unit D14 using only the hand grasping the secondary handle H38 and the release lever B50. To lock or re-engage the bevel locking mechanism B30, the user may release the lever B50.

FIG. 5A illustrates a T-handle H42 which may assist with adjustment of the bevel angle, transport of the saw 10, etc. FIGS. 5E and 5G-5H illustrate a main handle H46 generally centered over the saw blade SB. FIGS. 5H-5J illustrate a U-shaped handle H50 connected to the saw unit D14 which may be engaged by a user to assist in adjusting the bevel angle. The lever B50 is supported on the U-shaped handle H50.

Digital Readout Arrangement R

FIGS. 84-85 illustrate a digital display arrangement or digital readout arrangement R for a saw 10. The digital readout arrangement R may display information to a user (e.g., a relative position of a portion of the saw 10, such as the miter angle, the bevel angle, etc., information relating to the operation of the saw, such as motor speed, battery capacity, battery charging status, etc., historical information relating to the saw, such as number of cuts performed, warranty information, etc.).

As shown in FIG. 85A-85C, transducers R14 (e.g., capacitive, magnetic, hall effect, optical, reflective, resistive, encoders, etc.) may be positioned either coaxial with the respective axes of rotation of the miter angle and the bevel angle or next to or adjacent the moving parts of the miter saw that impart the miter angle and the bevel angle. The miter saw may also include signal-conditioning electronics R18 operable to convert the signals output by the transducers R14 into a numerical value corresponding with the miter angle and/or the bevel angle of the saw 10.

The digital angle readout or display R22 may be positioned on the saw 10 at locations corresponding with the respective miter adjustment assembly M and bevel adjustment assembly B. For example, as shown in FIG. 84A, a miter angle display R26 may be positioned on the tongue T78, and a bevel angle display R30 may be positioned near the bevel angle adjusting handle (e.g., the handle H14).

Alternatively, the miter angle display and the bevel angle display may be incorporated into a single display (not shown). Further, a single display, with the capability of switching between displaying miter angle and displaying bevel angle, may be used.

Other information relating to the miter saw (e.g., load current, etc.) or information not relating to the miter saw (e.g., time of day, advertisements, etc.) may also be shown on the display R22.

Figure 85F:
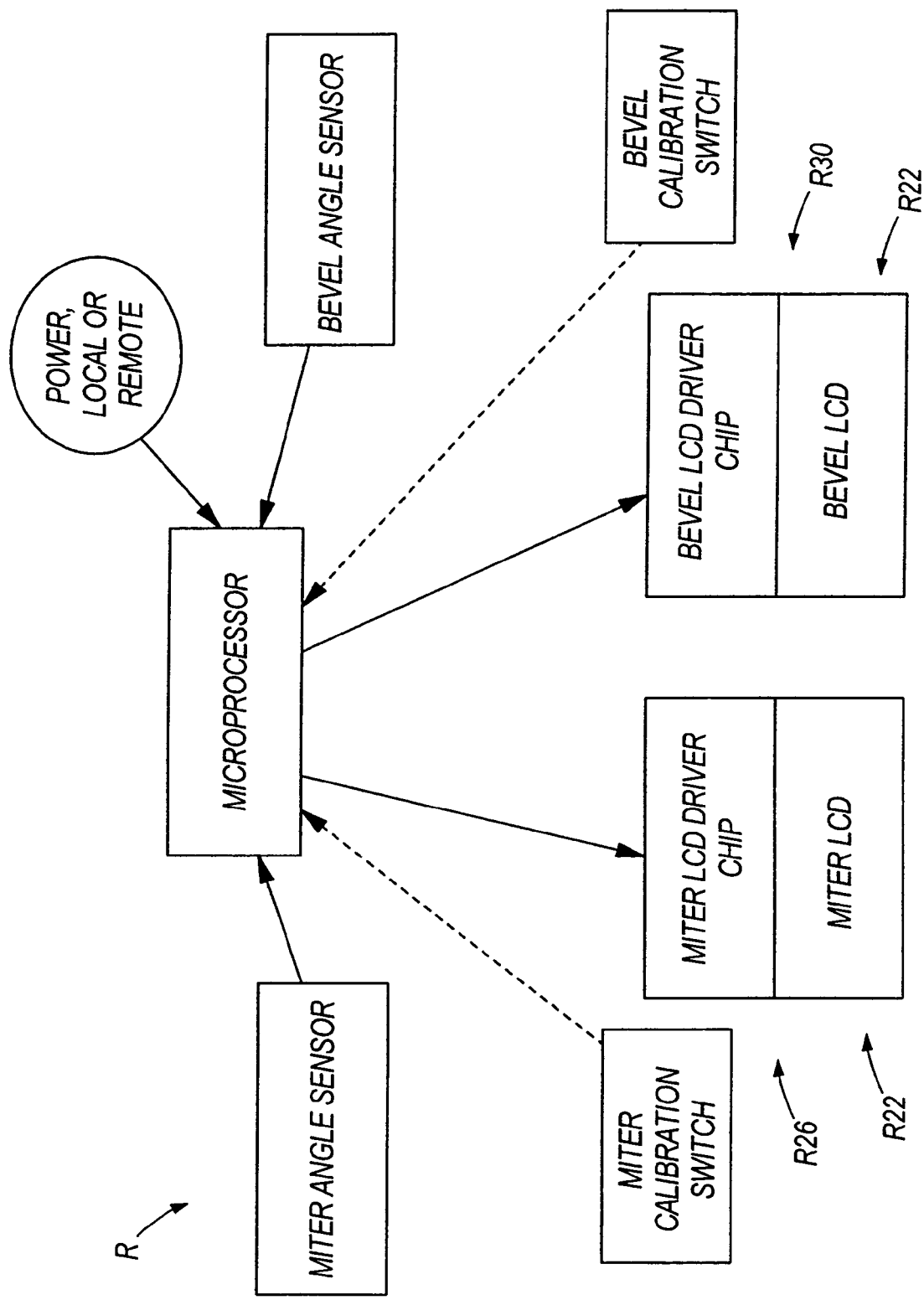
Figure 85G:
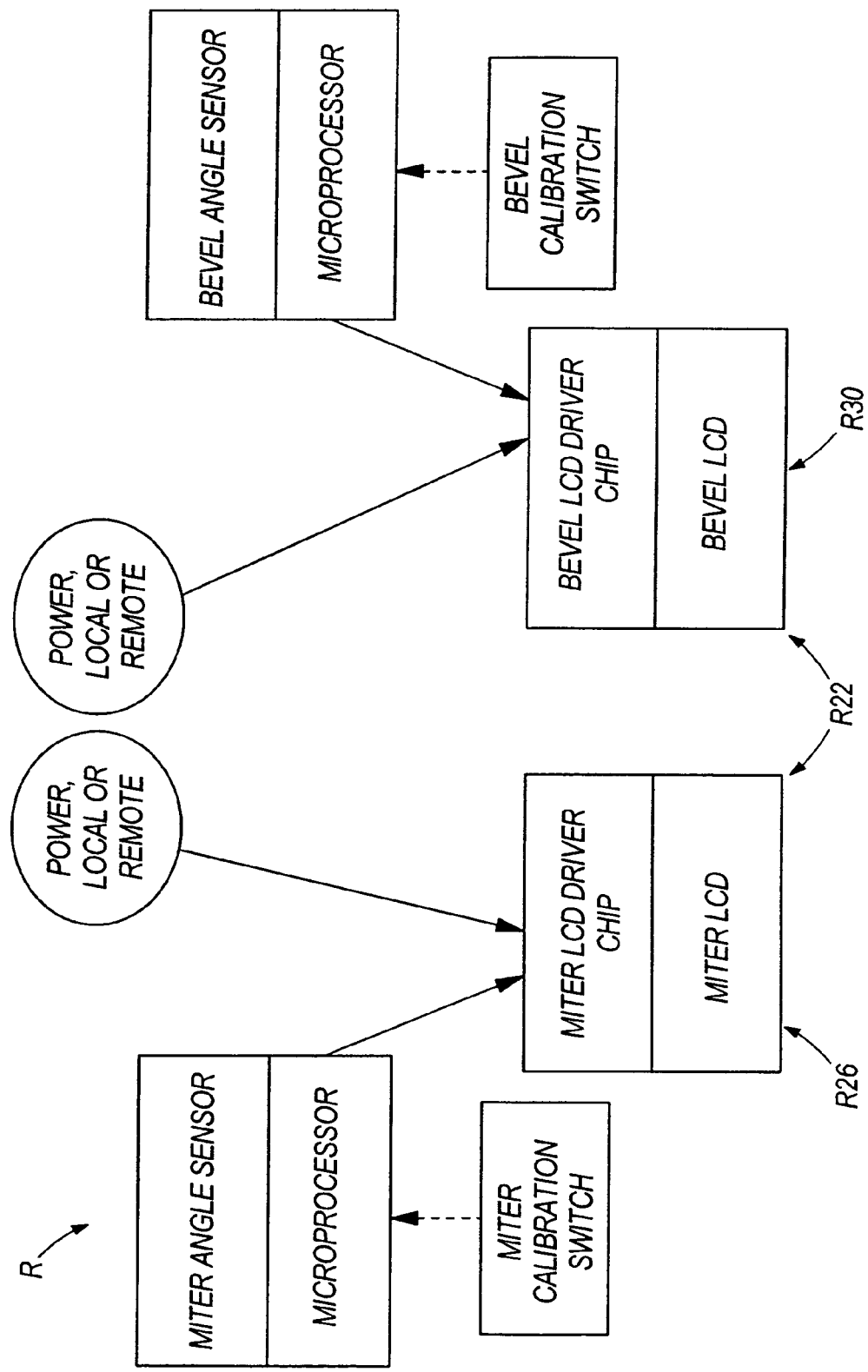
Figure 85H:
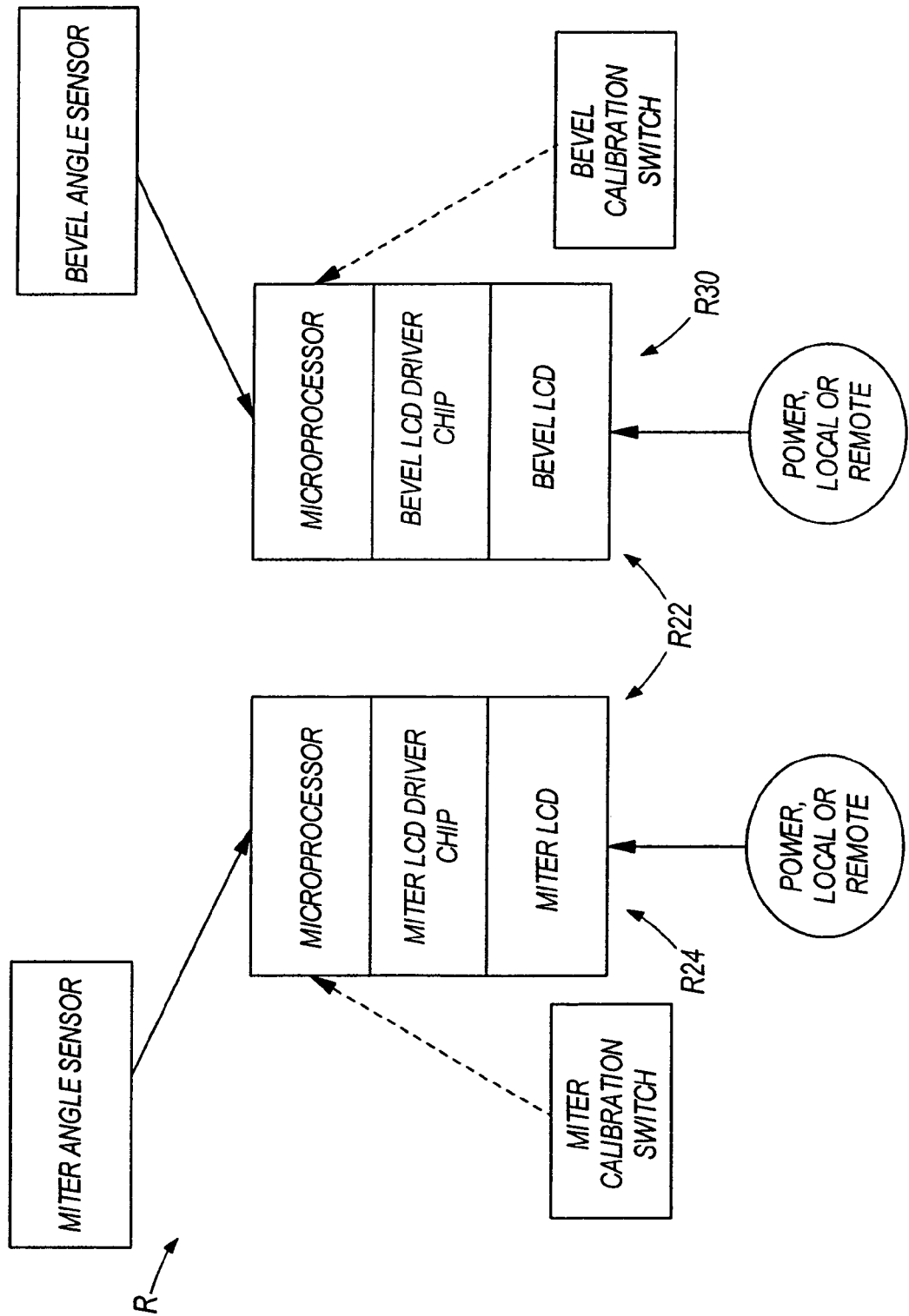
Figure 85I:
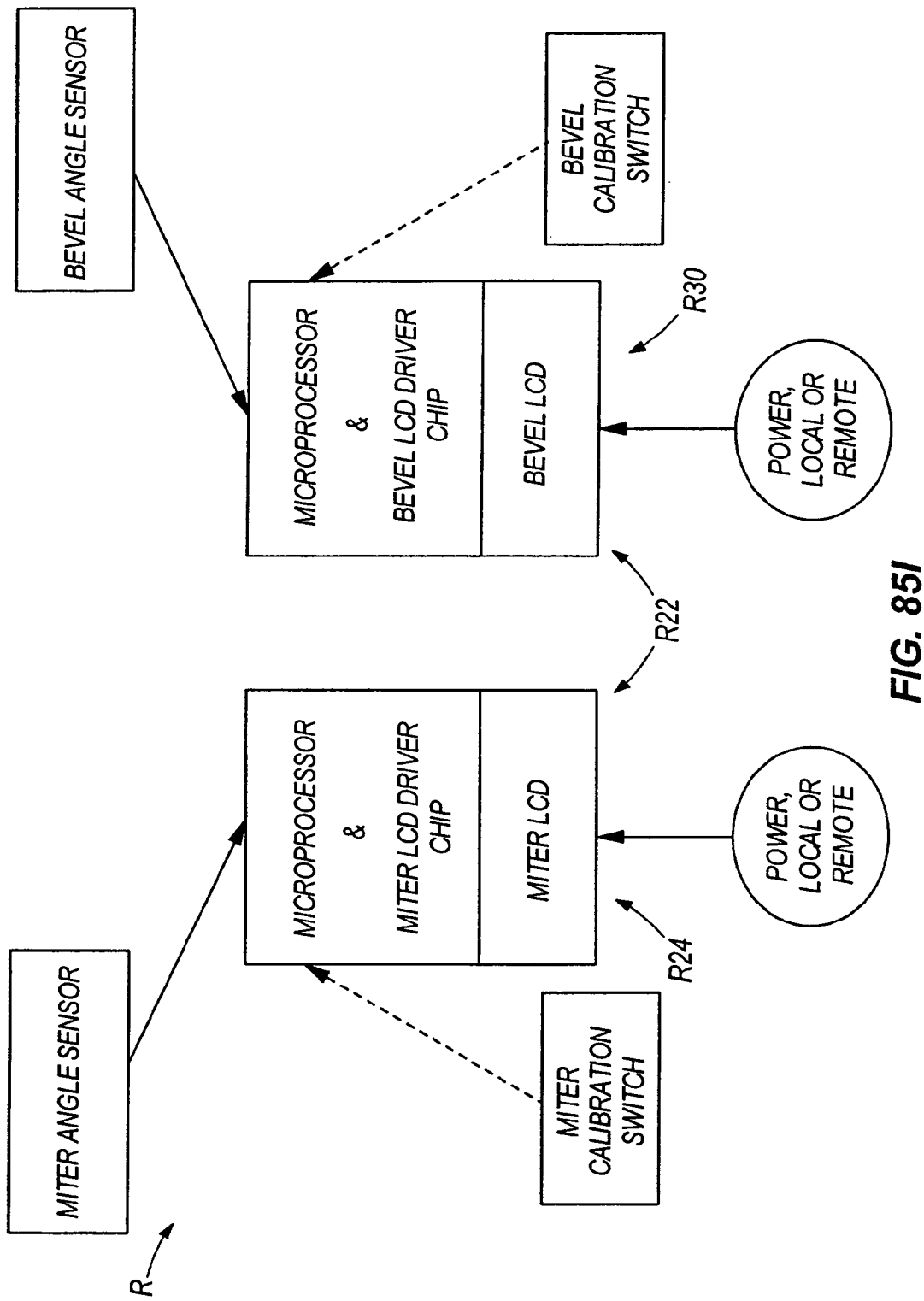
Figure 85J:
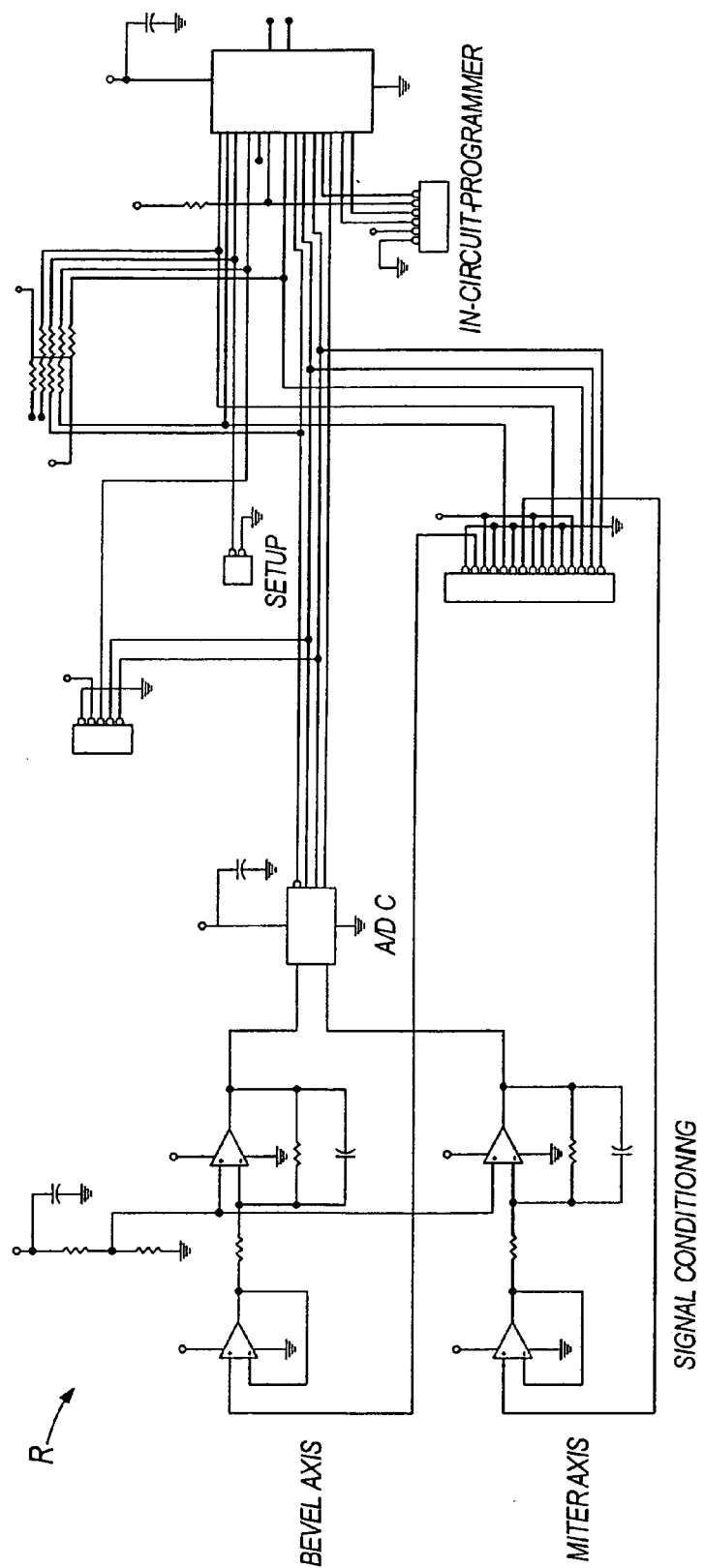
Figure 85K:
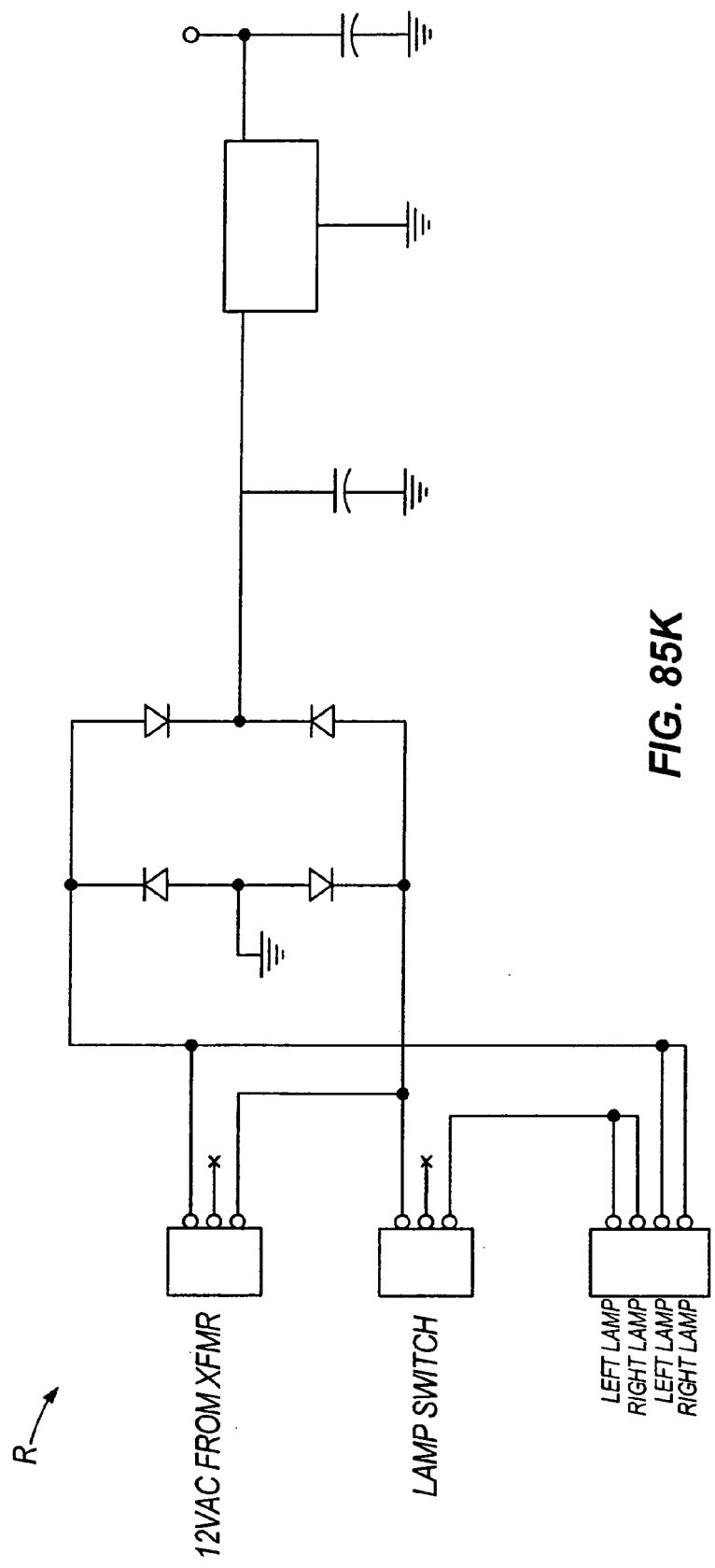

FIGS. 85E-85I illustrate operation of the digital readout arrangement R. FIGS. 85J-85K illustrate circuit diagrams of the digital readout arrangement R.

Figure 86A:
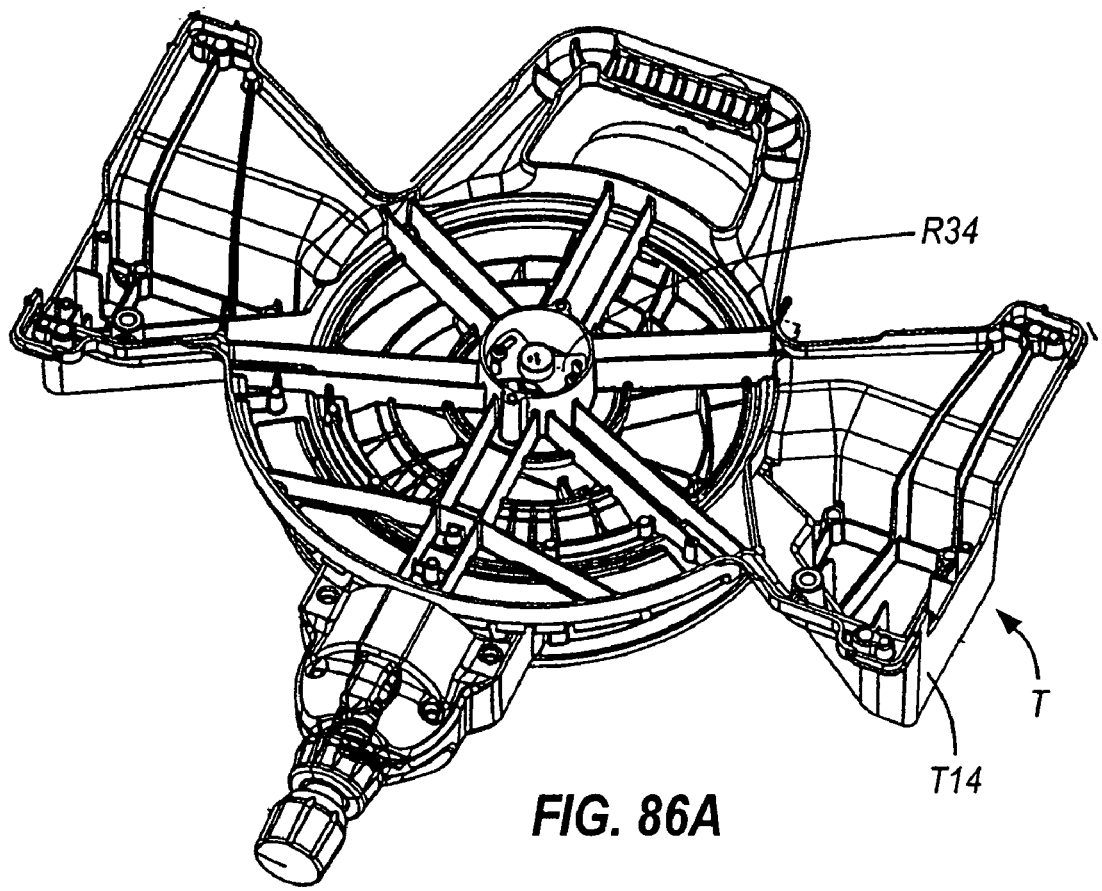
Figure 86B:
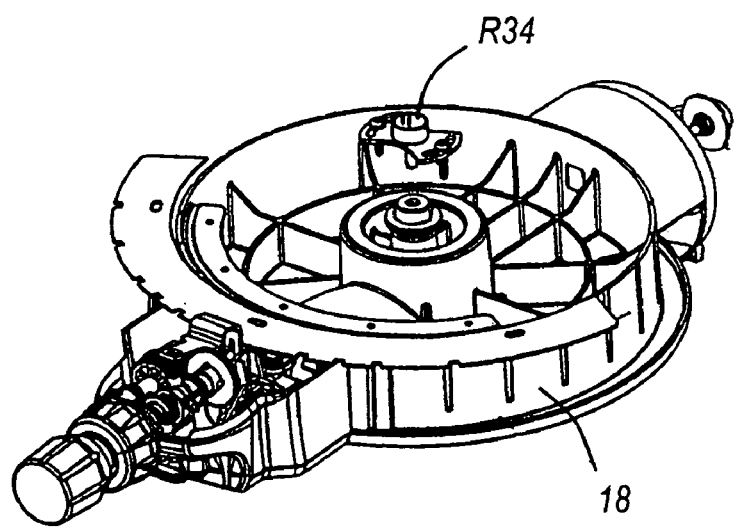

FIGS. 86A-86D illustrate the positioning a miter angle potentiometer R34 and a bevel angle potentiometer R38 (see FIG. 86C).

Figure 87:
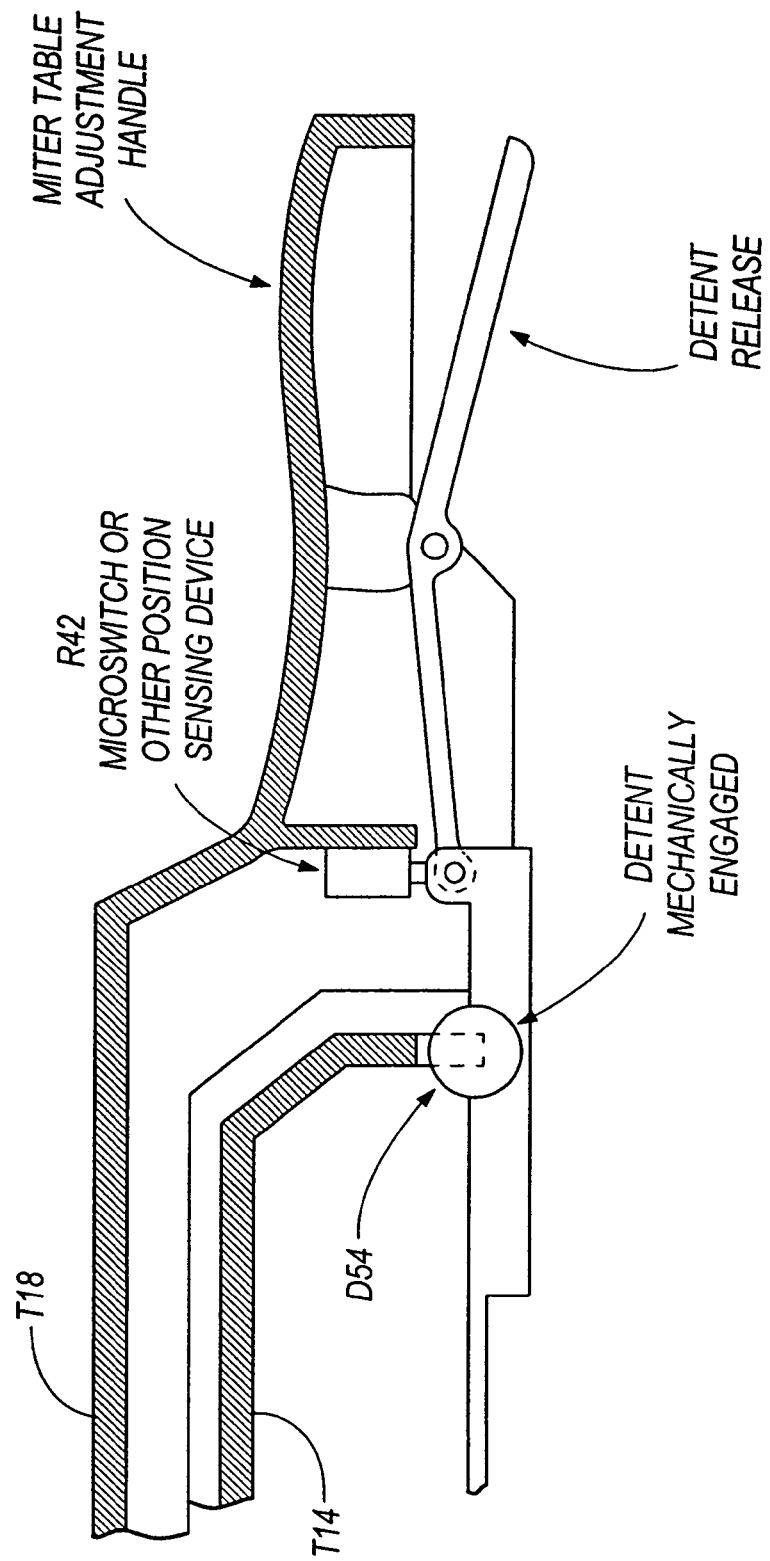
FIG. 87 is a schematic view illustrating a sensor, such as a microswitch, sensing engagement of a detent during angular adjustment of the saw unit.
Figure 89A:
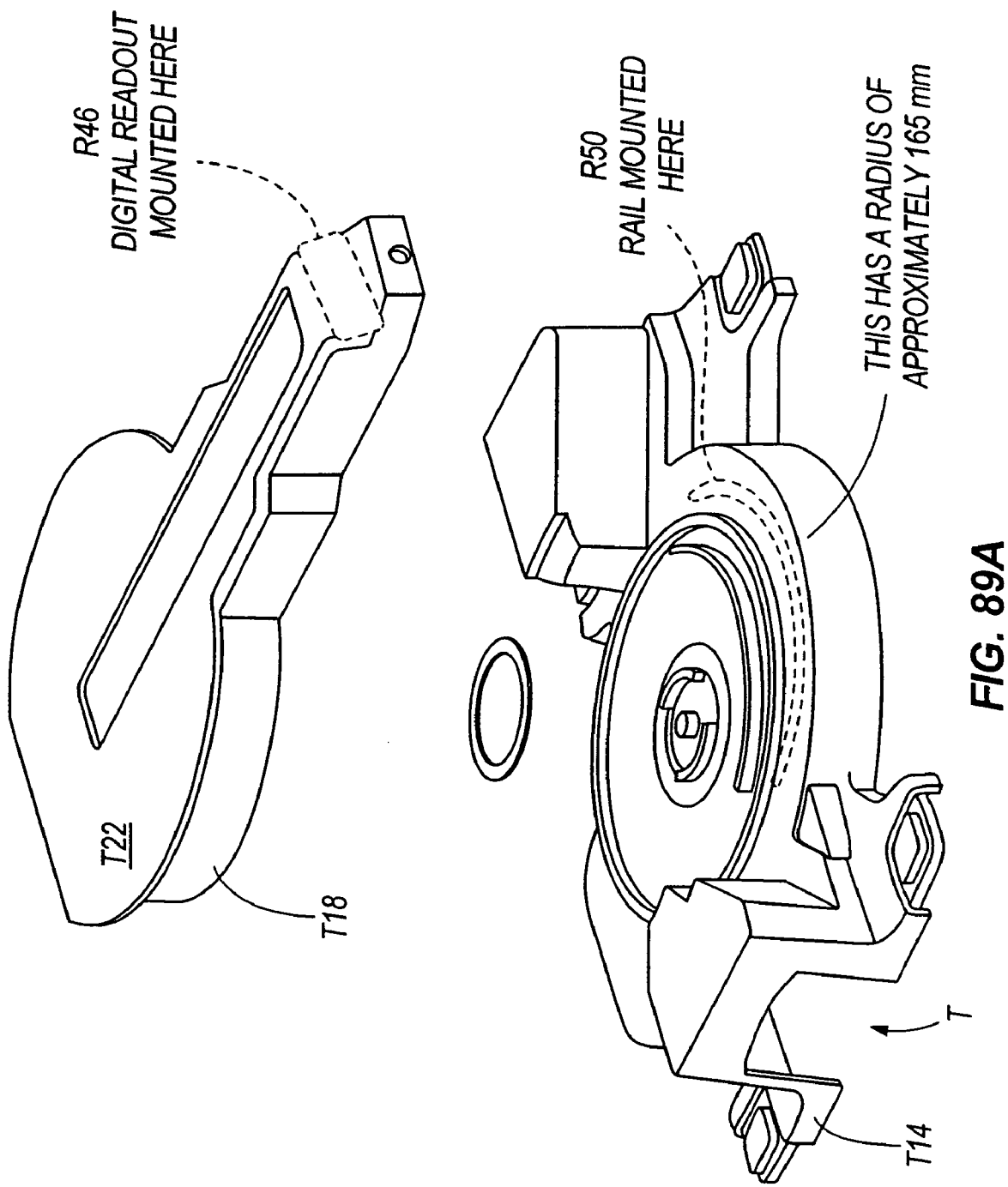
FIGS. 89A-89F are views of portions of a saw and illustrating an angular sensing arrangement, such as a capacitive sensor, a digital caliper, etc., and/or an angular display arrangement.
Figure 89B:
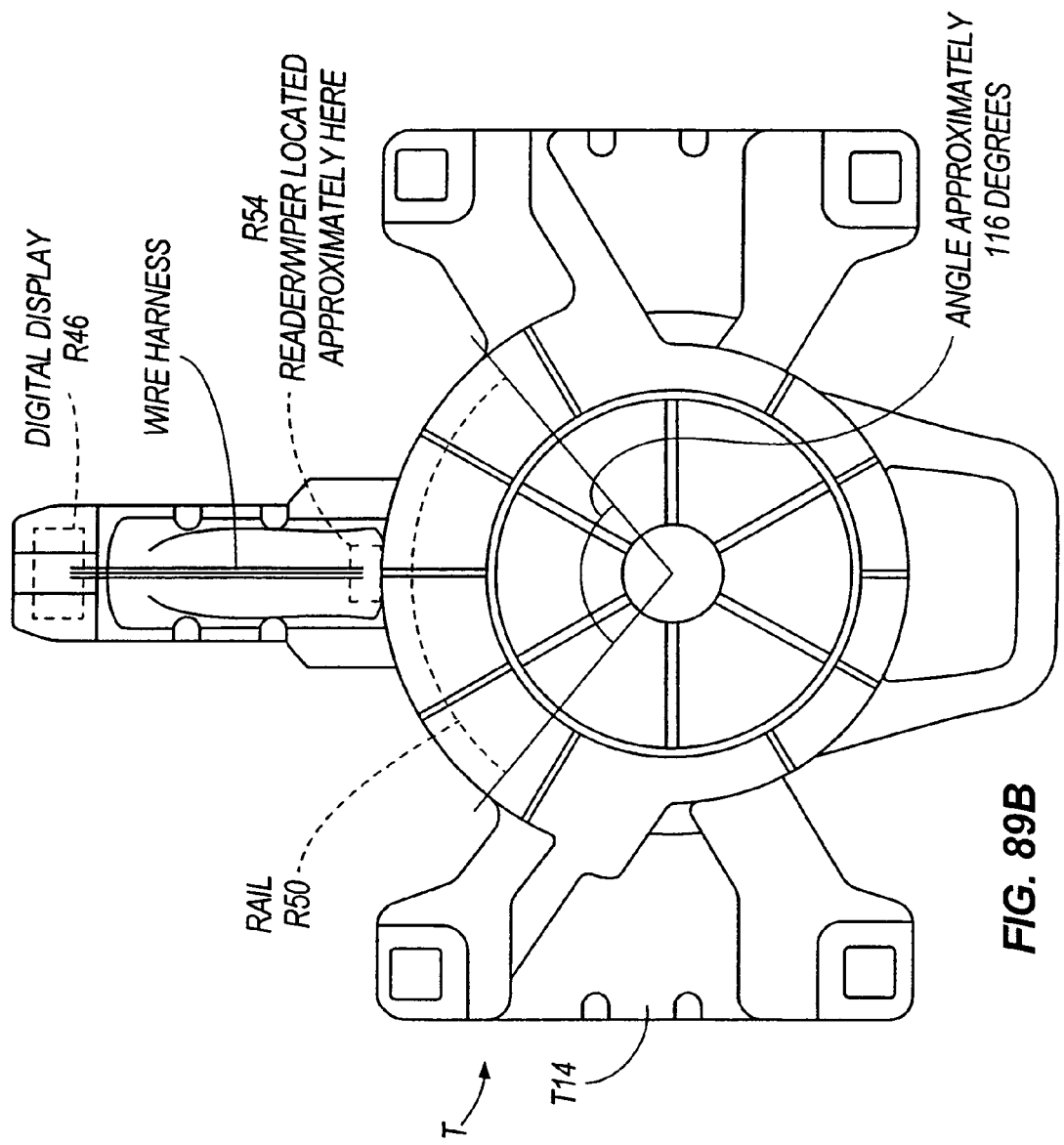
Figure 89D:
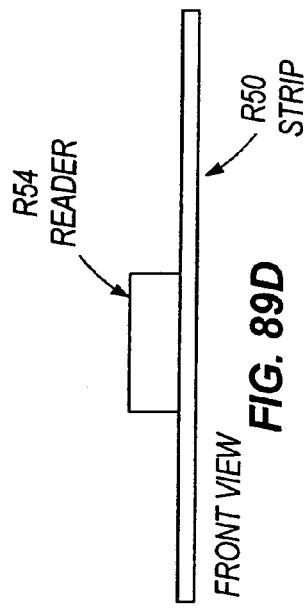
Figure 89F:
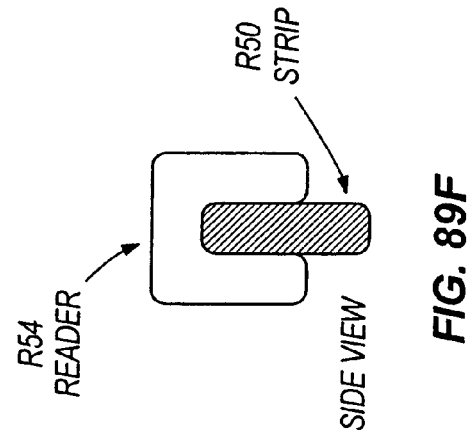
Figure 89C:
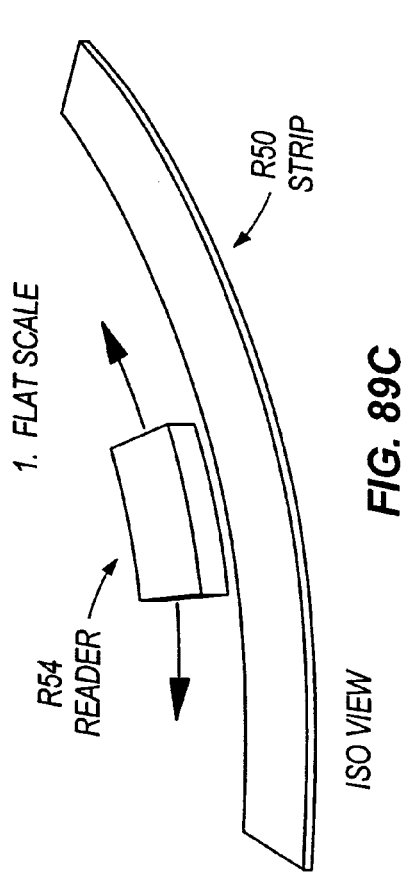
Figure 89E:
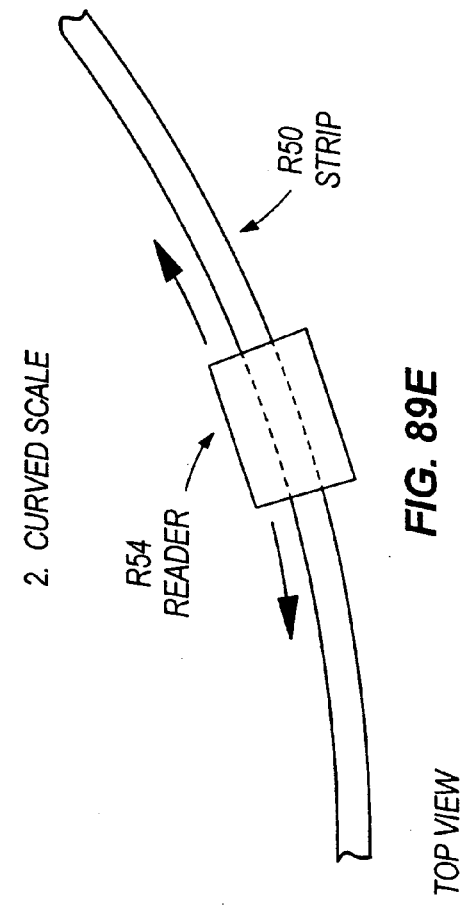

FIG. 87 illustrates structure and electronics to accurately measure and display miter angle settings and bevel angle settings. These angle measurements may be obtained by mounting potentiometers on both axes of rotation (i.e., the miter axis T30 and the bevel axis B18) and electronically displaying the angular displacement about each axis. This may enable an operator to position the miter angle and the bevel angle of the saw unit D14 to increased levels of accuracy and precision The degree of accuracy of the electronics is such that the mechanical detents D54 that are machined into the base T14 for the miter angle would likely not read to the exact position of the angular detents (e.g., 0.0 degrees, 22.5 degrees, 45.0 degrees, etc.). This would require that the mechanical detents to be held to extremely close tolerances, or, utilize the method discussed herein.

With reference to FIG. 87, a microswitch R42 (or other position sensing device such as a proximity sensor, Hall-Effect sensor, or optical/laser emitter-receiver) may be mounted in close proximity to the detent override mechanism such that when the operator locks the saw into a mechanical detent or passes over a mechanical detent, the microswitch may be actuated, thereby resetting or re-calibrating the potentiometer to the desired angle. Alternatively, the position of the microswitch or other sensor may be positioned in a location disposed from the detent override mechanism. This allows, among other things, the system to constantly recalibrate itself to prevent drift, enable more reasonable mechanical tolerances on the detents, ensure that the digital readouts agree with the position of the mechanical detents, and a less accurate or a less expensive potentiometer to be used.

In another construction, the saw 10 may include user-settable detents. As such, a detent may be set wherever an operator may want it, not just an adjustment from a pre-set detent. Furthermore, an operator may find it convenient to set as many or as few detents as they wish throughout the miter angle adjustment range. Such user-settable detents may work in conjunction with the bevel pivot, miter pivot, or both.

For example, with reference to detents for the miter angle adjustment, a stepper motor with an encoder may be positioned on the miter axis to provide user-settable detents. The stepper motor may be capable of microstepping in increments at least as fine as the desired detent accuracy. An electronic circuit may be utilized to signal the stepper motor when and which coil or multiple coils to energize. Energizing the proper coil combination may provide resistance to table rotation at the proper instant such that an operator would feel as if they hit or passed through a mechanical detent. Additionally, the coils may be energized in a pattern as an operator approaches one of the detents such the operator feels the effect of a ball riding into a ramp or feels the resistance of the table increase slightly as the detent approaches. Provided sufficient strength of the stepper motor, the motor may also act as the miter lock.

Alternatively, an electromagnetic device may engage a lock, damper, or other friction or mechanical interference geometry when signaled by an electronic circuit. Such an electromagnetic device may be a single solenoid mounted in the tongue of the table. The solenoid may engage anywhere along the perimeter of the table.

Alternatively, a voice-coil mechanism mounted in the tongue of the table may be utilized rather than the solenoid. The voice-coil mechanism has a fast response time, consumes less power, and is more responsive to instructions from an electronic circuit. The voice-coil device may also be energized with varying magnitude based on the position, velocity, and/or acceleration of the table. Like the stepper motor, a circuit may be programmed to simulate the feel of mechanical detents.

Independent benefits of such user-settable detents or electronically programmable detent devices may be the elimination of conflicting signals that a dual angle indication system may create. With a potentiometer or encoder mounted separately from a detent system, it is possible that the saw may be in a mechanical detent defined as 45 degrees (for instance), while the electronics may think and display that the saw is positioned at 45.3 degrees.

As discussed above, FIGS. 64A-64C illustrate a miter angle scale incorporating a plurality of user-adjustable detents M360. A miter angle sensor module M364 for determining the position at which the table T18 is positioned relative to the base T14. The sensor module communicates with the miter angle indicator and controller module. The detent position magnets M368 may be positioned by the user (or during manufacture) at given miter angle positions. The user can set any given miter position in the controller, much like programming a pre-set radio station. A locking mechanism may be provided to hold the turntable in the desired miter angle position.

FIGS. 88A-88C illustrate alternate sensors, such as switch elements, optical sensors, etc., to sense the position of a detent recess M54 or B86.

FIGS. 89A-89F illustrate various constructions for sensing and communicating to the user the miter angle of the table relative to the base and/or the bevel angle of the saw blade relative to the table. In some constructions, the miter saw may include a capacitive angle measurement and digital readout R46, in a manner similar to digital calipers. The rail R50 of the calipers would be curved around the radius, and the wipers R54 of the calipers would be mounted on the tongue of the table. Rather than displaying a linear distance, the display R22 would be programmed to display an angle to which the table is adjusted. A similar digital caliper is described and illustrated in U.S. Pat. No. 4,449,179, the entire contents of which are hereby incorporated by reference.

For example, a dimensionally stable tape with a series of very accurate copper rectangles plated on it using printed circuit technology may be supported on a stationary part (e.g., the base). A sliding part supported on a moving part (e.g., the turntable) has a similar but finer pitch pattern plated on it, and the ratio of capacity between the slider rectangles and the tape rectangles is used to calculate how far the slider has moved relative to the tape. Such an arrangement provides in incremental encoder to determine how far the slider has been moved from the last zero set-point. Such technology is reasonably rugged because there are no sliding contacts which wear.

The arrangement may include a "coolant-proof" digital caliper which alleviates the effects of changes in moisture which may affect the dielectric constant. Wipers may be provided to remove moisture from the scale as the slider moves past. The wipers may remove other debris, such as sawdust.

In the illustrated construction, the tape is wrapped around the arc cylinder. The slider is substantially arc-shaped as well. Because the tape and slider are mounted internally to the miter saw body, these components are protected from mechanical damage during use, storage and transport.

FIGS. 90-92 illustrate alternate constructions for sensing and communicating the relative position of components of the saw 10. FIGS. 90A-90B illustrate a strip or disk and a reader. FIG. 91 illustrates a rotary encoder and an electronics module. FIG. 92 illustrates a potentiometer and a gear arrangement. A wiring arrangement may connect the sensing arrangement to a "remote" display located a distance from the sensor.

Figure 93C:
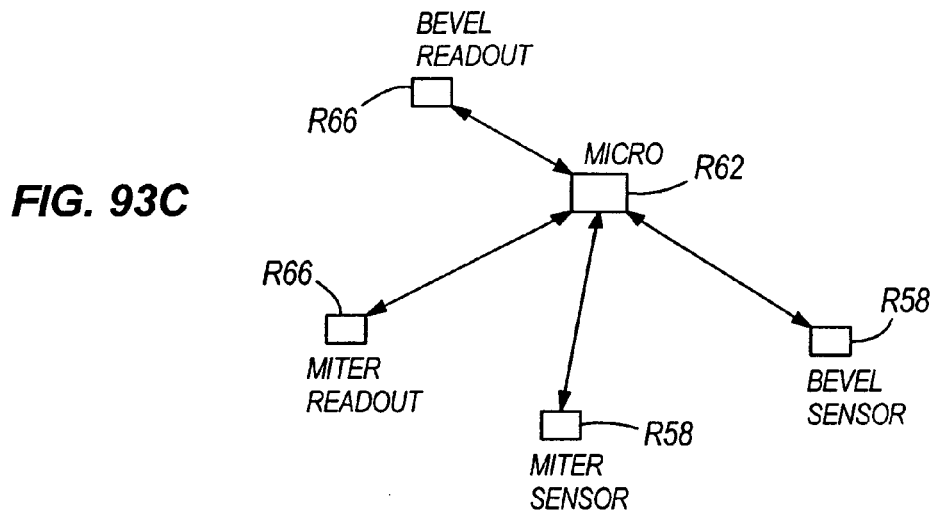
FIGS. 93A-93C are views of a portion of a saw and illustrating an angular sensing arrangement, an angular display arrangement and a wiring arrangement.
Figure 93A:
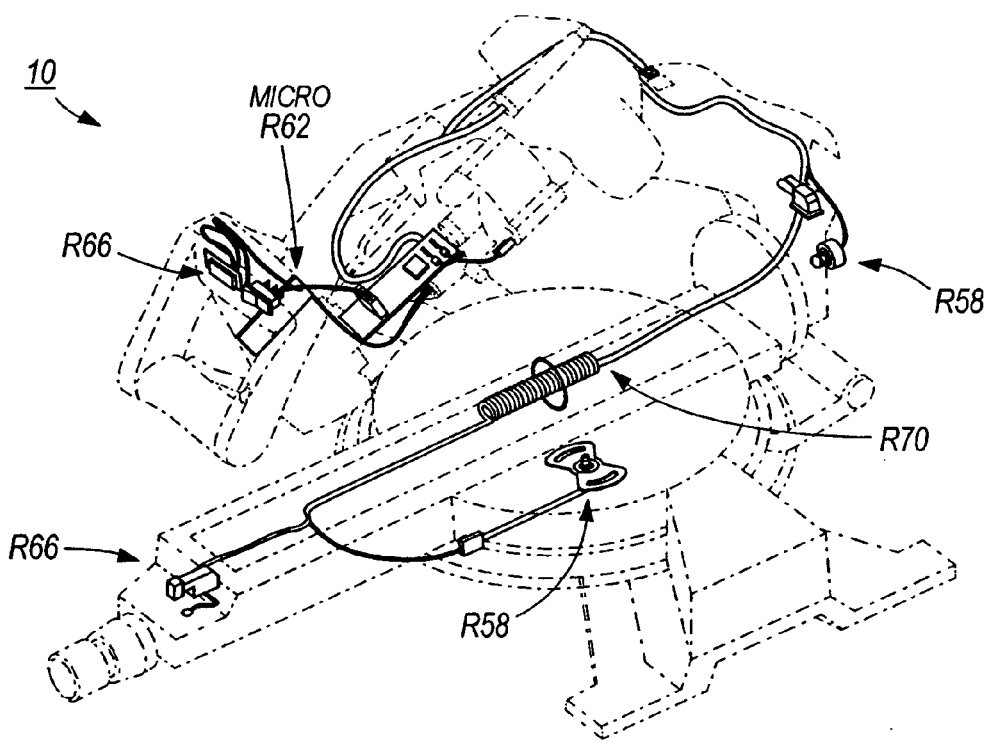
Figure 93B:
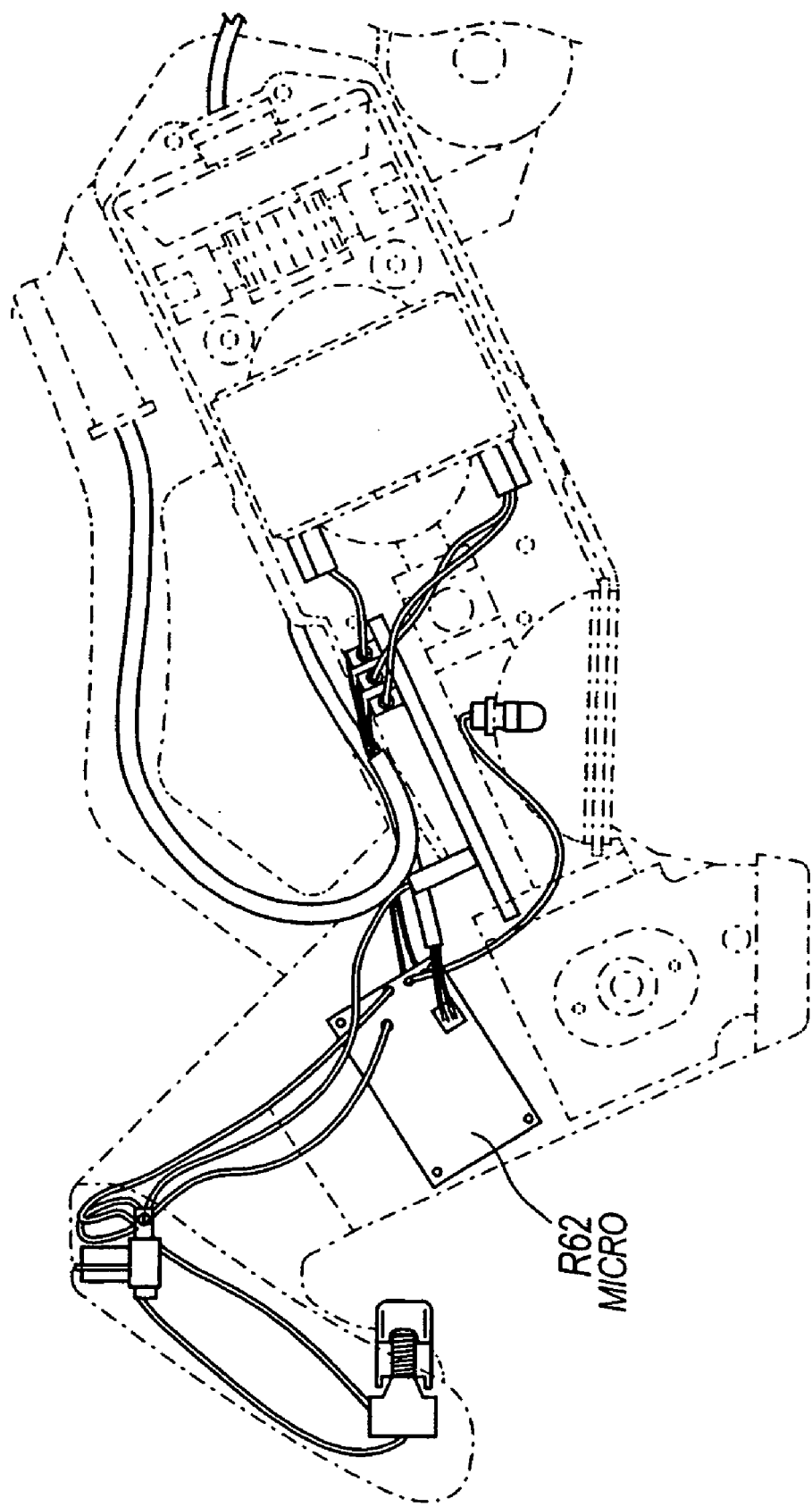
Figure 94A:
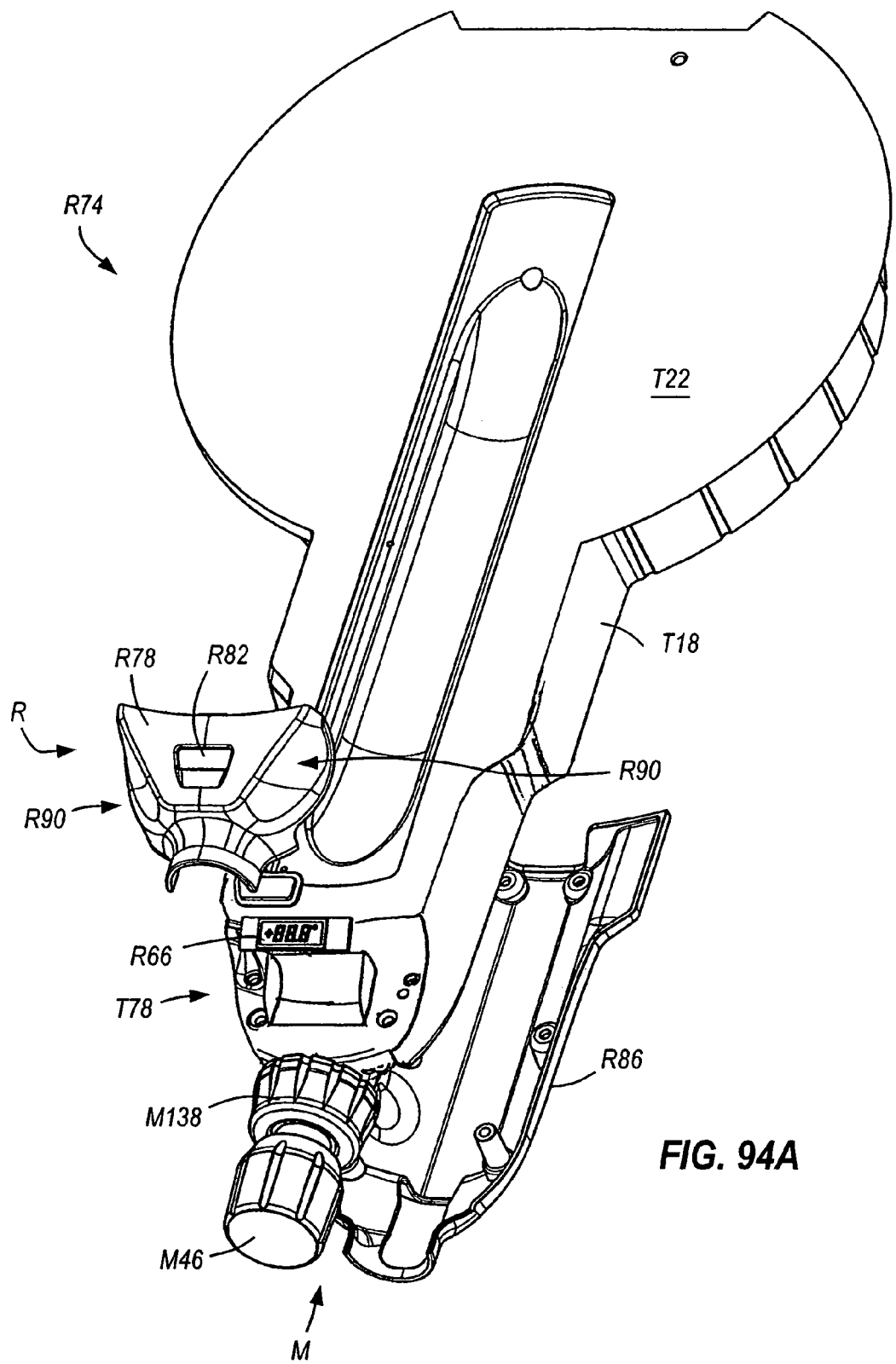
FIGS. 94A-94E are views of a portion of a saw, such as a sliding miter saw, and illustrating an angular display arrangement and a cover assembly.
Figure 94B:
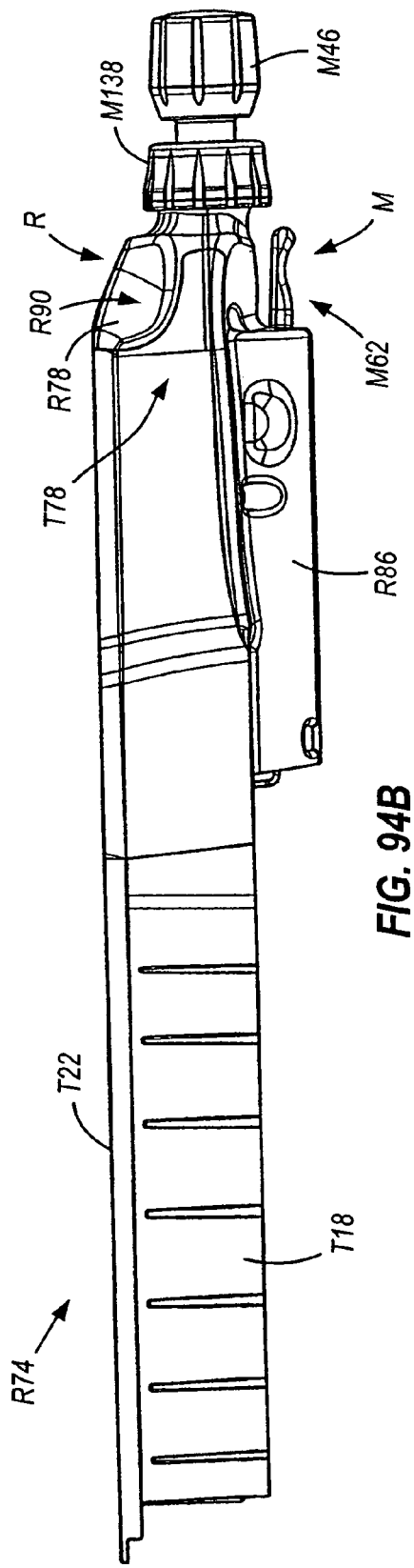
Figure 94C:
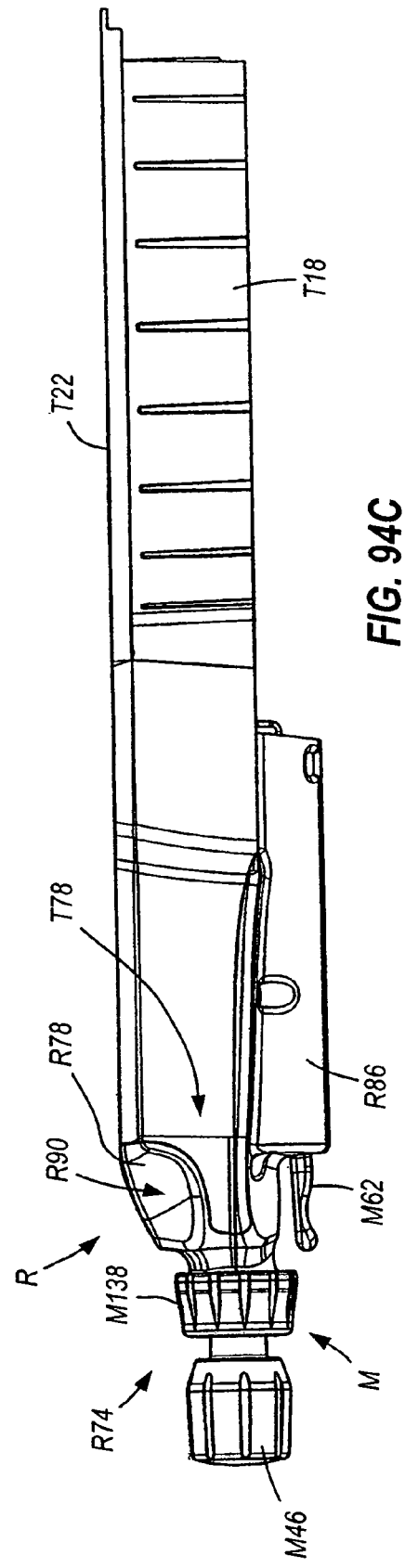
Figure 94D:
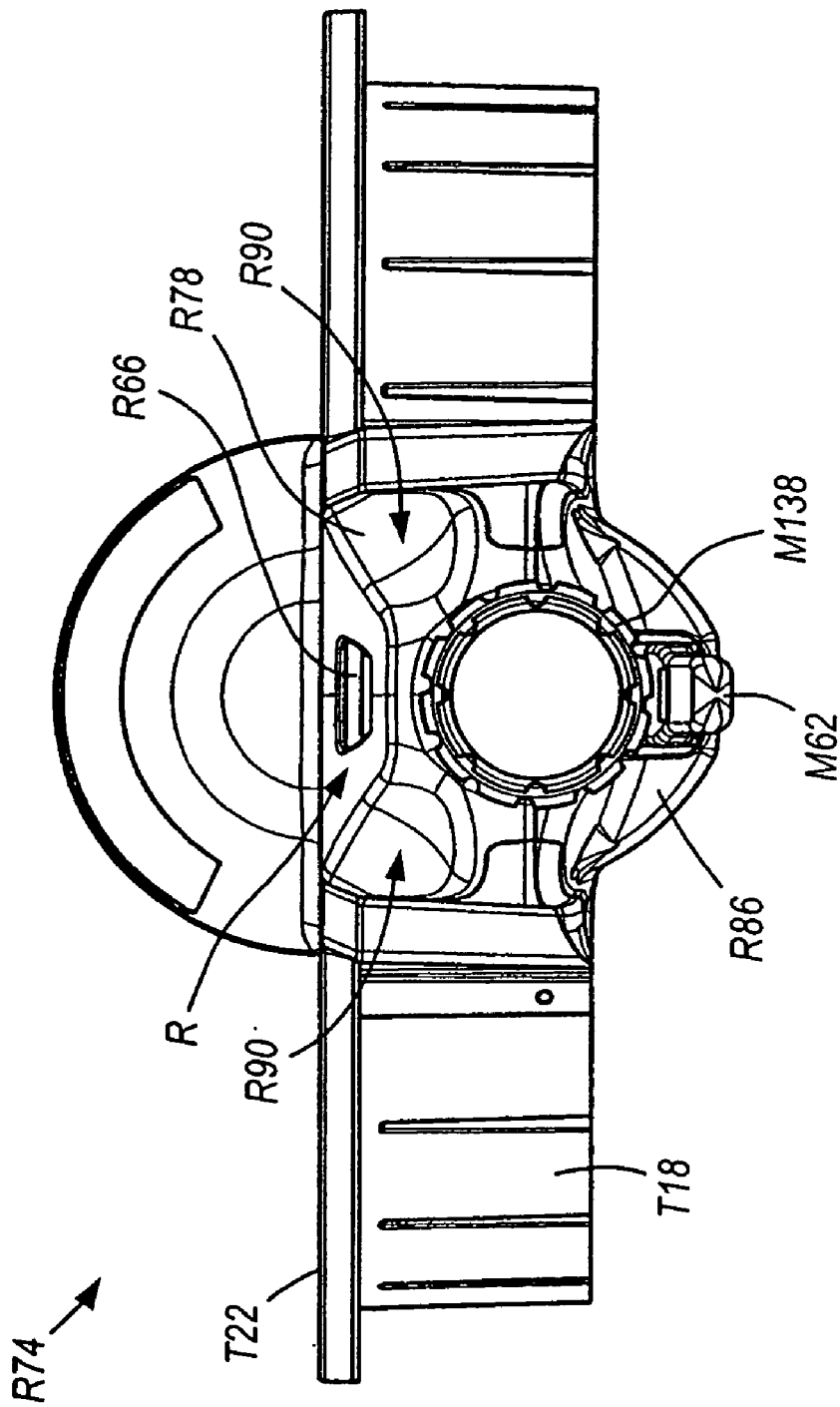
Figure 94E:
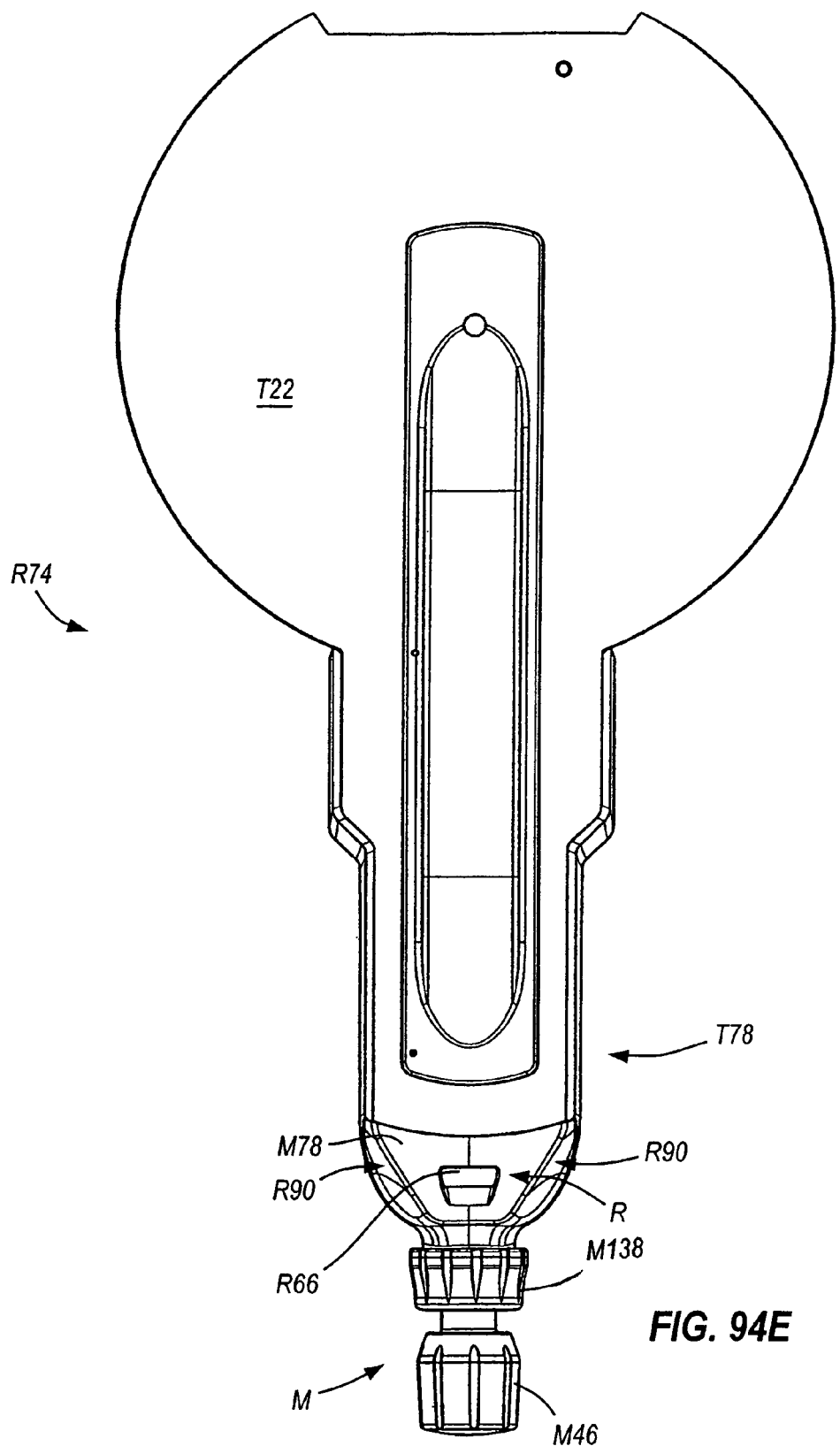

FIGS. 93A-93C illustrate a wiring arrangement for at least a portion of a saw 10. As illustrated angular position sensors R58, such as potentiometers, are provided for determining the miter angle position and the bevel angle position of the saw blade SB. These sensors R58 communicate with a controller R62 which, in turn, communicates with a corresponding display R66.

A wiring arrangement, such as a coiled wire R70, may be provided to accommodate movement between the controller R62 and a display R66 and/or a sensor R58. In the illustrated construction, the controller R62 is supported on the saw unit D14 which is slidable relative to the base T14 (on which the sensor R58 is supported) and the table T18 (on which the display R66 is supported). The coiled wire R70 extends through a slide tube T70 to connect the controller R62 to the sensor R58 and display R66 for the miter angle position.

Figure 95:
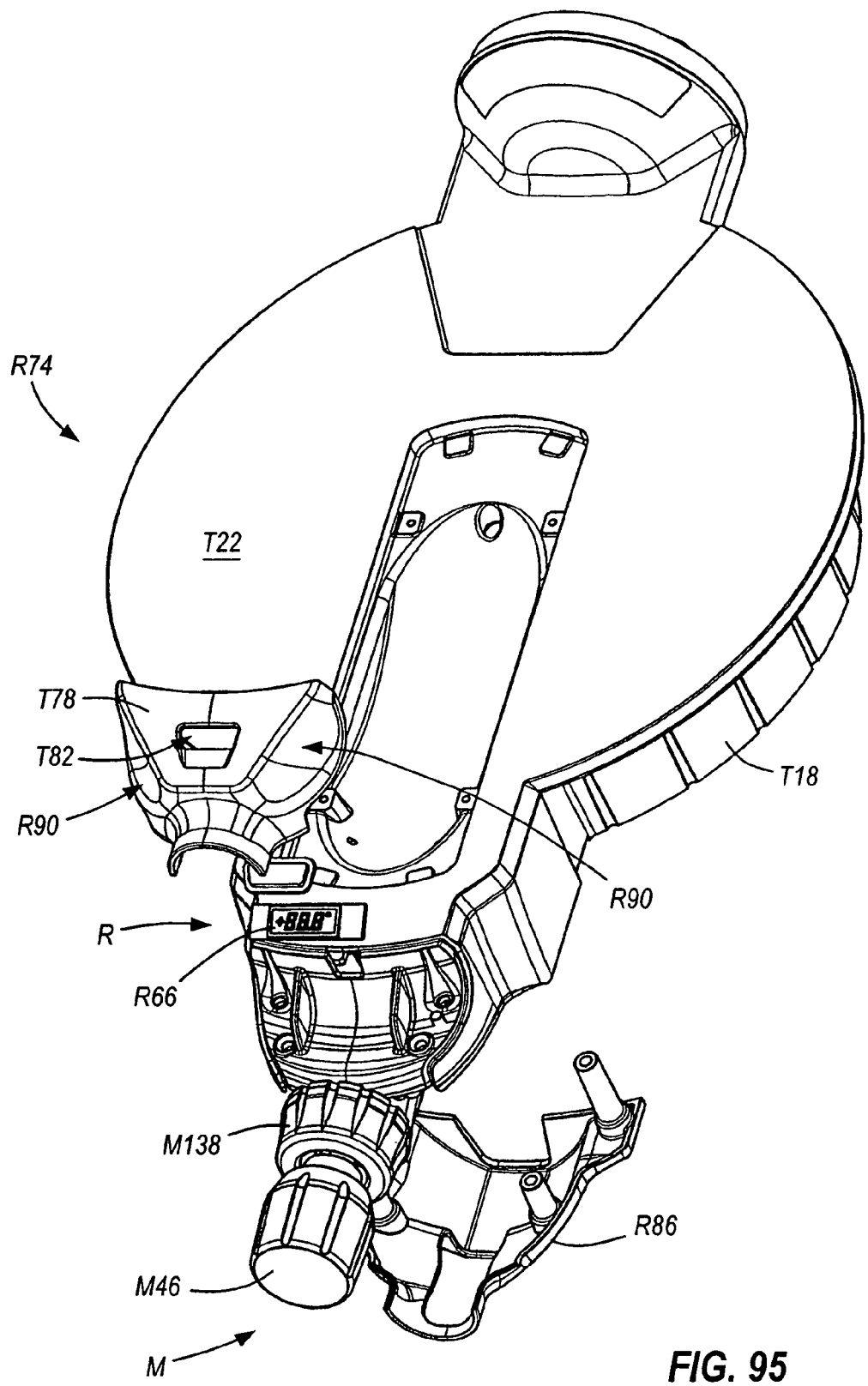
FIG. 95 is an exploded perspective view of a saw, such as a miter saw, and illustrating an angular display arrangement and a cover assembly.

FIGS. 94-95 illustrate a cover arrangement R74 for a portion of the digital display arrangement R, such as the miter angle position display R66. The display R66 is supported on the tongue T78 of the table T18. The cover arrangement R74 includes an upper cover R78 defining an opening R82 through which the display R66 is visible. A lower cover R86 covers the bottom surface of the tongue T78 to enclose at least components of the miter adjustment assembly M.

As discussed above, when adjusting the miter angle position, the user will operate the controls (e.g., the lock knob M46, the detent lever M62, the fine adjust knob M138, etc.) on the tongue T78 and will engage the tongue T78 to move the table T18. A scallop-shaped recess R90 is defined on each side of the opening R82. A user may place the thumb of the adjusting hand (which grasps the controls and/or the tongue T78) to maintain visibility of the display R66 before, during and after adjustment of the miter angle position.

The upper cover R78 is that same for the sliding compound miter saw shown in FIGS. 94A-94E and for the compound miter saw shown in FIG. 95. However, the lower cover R86 is somewhat smaller for the compound miter saw.

The display R66 may be powered by the power source for the saw 10 (e.g., line power, battery power, etc.). Alternatively, the display R66 may be powered by a separate power source. For example, a separate replaceable battery may be provided. A solar type arrangement may be provided (like that on many calculators), and an on-board illumination assembly L may provide the power to the solar arrangement. Power may be generated through operation of the saw 10 (e.g., rotation of the saw blade SB, movement of the table T18 or bevel arm B18, movement of the saw unit D14 along the slide tubes T70 (e.g., with a transformer, using low voltage, etc.)).

The digital readout arrangement R and electronic functions may also provide simple calculations using one or two keys or buttons by an operator. Such simple calculations may be the angle complement finder, a conversion to rise-run a display, a conversion to degrees-minute display, etc. In other constructions, the electronics may provide complex calculations and a multi-key or button pad may be required. Such calculations may include miter and bevel calculations for crown molding.

The digital readout arrangement R and transducer system may include a zero adjustment and/or a span adjustment. The display R22 for the electronics may be an LCD display and may be operable to display a picture or diagram of the workpiece and/or the worksite. The system may be operable to record and/or display information about the miter saw (e.g., the number of cuts, the run time, the estimated remaining brush life, number of impacts or drops, if any) or other information (e.g., guides to operating the saw, advertising about other products, accessories or services, etc.).

The digital readout arrangement R can display various operating characteristics of the miter saw such as, for example, rpm, depth of cut, miter angle, bevel angle, etc. The display might indicate faults with the miter saw or required maintenance. In addition, the display might provide a low-voltage or low power indication in case cases in which the line voltage may compromise intended performance at the miter saw.

The digital readout arrangement R or display may provide a watt-hour/run-time meter. A device would be provided for monitoring the power consumed and/or the run-time of the miter saw over a period of time. The device could be a separate in-line device, or it could be integrated into the miter saw. The device could be used as a tool usage tracking device by both the user and a service department.

The readout may provide a perpendicularity indicator which would provide an indication (e.g., visual, audible, etc.) to the user when the saw blade is perpendicular to the workpiece (e.g., at zero degrees bevel angle and zero degrees miter angle). The electronics may also provide an indication of leveling of the tool on a work surface. The device may also provide a metal detector which may be integrated or an accessory, which would detect the presence of metal in a workpiece. Such a device may provide an indication to the user and/or interrupt operation of the miter saw.

The digital readout system may be zeroed at any point on the table with respect to the miter angle and/or bevel angle. The position of the table may be an input to a calculator. The electronics may also be programmable to provide user-desired characteristics (e.g., selected rpm, soft start, breaking time, etc.). The miter saw may include a separate power source, such as a battery, to power electronics.

The electronics may provide control of operation, such as incorporation of feedback, soft-start (to extend the run-time of a battery or to conserve power), auto-reversing, etc.

A separate sensor may be provided for sensing characteristics of the workpiece or work area, such as, for example, the desired angles, lengths, widths for cutting a workpiece. This separate sensor may communicate with the electronics module. Such communication may be wireless, hard-wired with the sensor remaining in a position around the work area, hard-wired with the sensor being connected to the electronics package on the miter saw itself, etc.

Illumination Assembly L

FIGS. 1-5, 27 and 96-107 illustrate various arrangements for illuminating a portion of the saw 10, such as the table T18, the work piece WP, an angular adjustment scale (e.g., the miter scale M20, a bevel scale B28 (as shown in FIG. 5A), etc.). As discussed below, in some constructions, the arrangement may provide an indication of the line of cut.

As shown in FIGS. 27 and 96-99, the illumination assembly L may include a light assembly L14 for illuminating a portion of the saw 10. The light assembly L14 includes one or more lighting elements L18. The lighting elements L18 may include an incandescent lighting element, a LED lighting element, etc.

In the illustrated construction, the lighting element(s) L18 are supported for movement with the saw unit D18. The lighting element(s) L18 may be supported at various locations on the saw unit D18. FIGS. 27 and 96-99 illustrate various placements of the lighting element(s) L18.

Figure 96A:
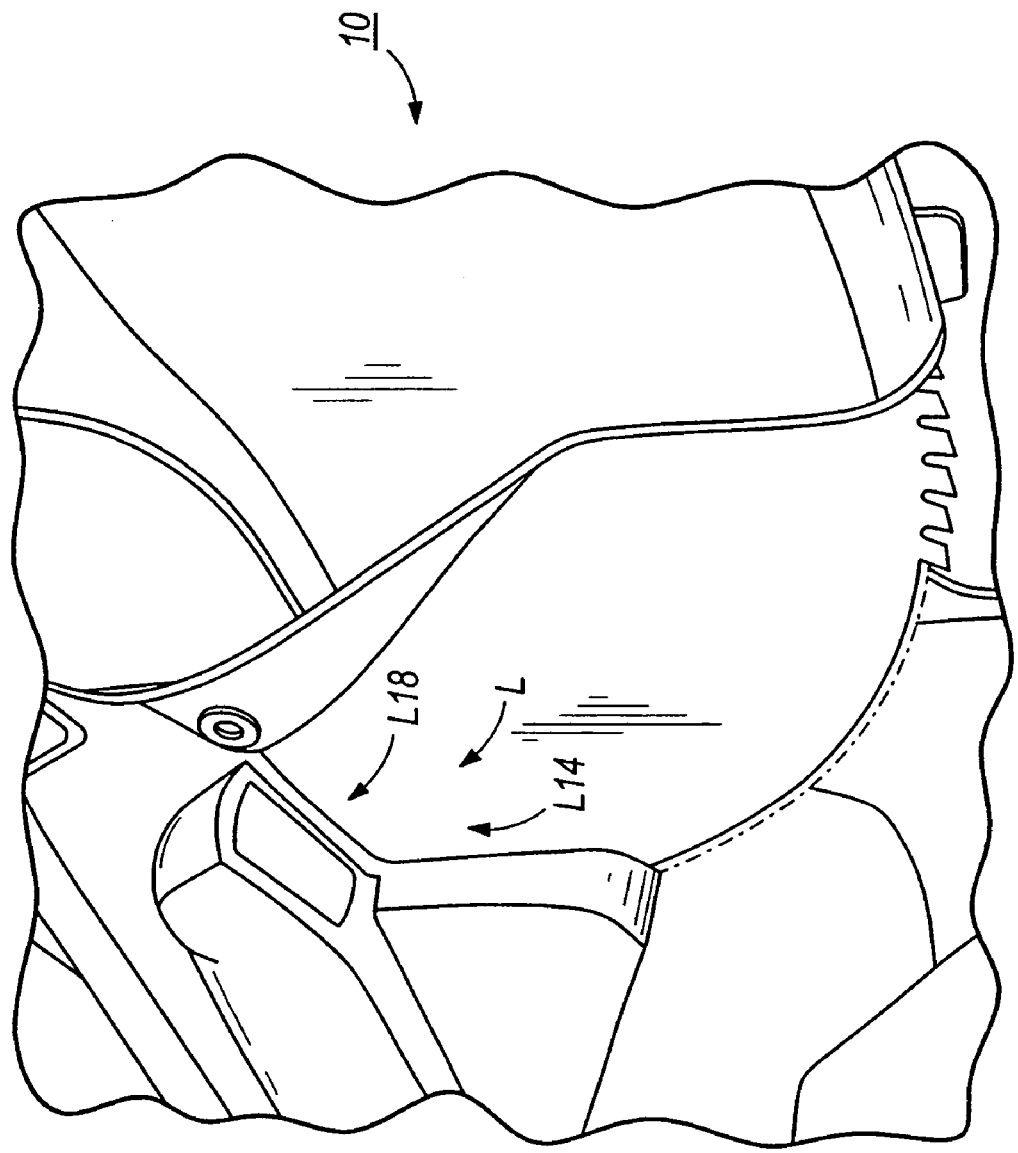
FIGS. 96A-96G are views of portions of a saw and illustrating a light assembly.
Figure 96B:
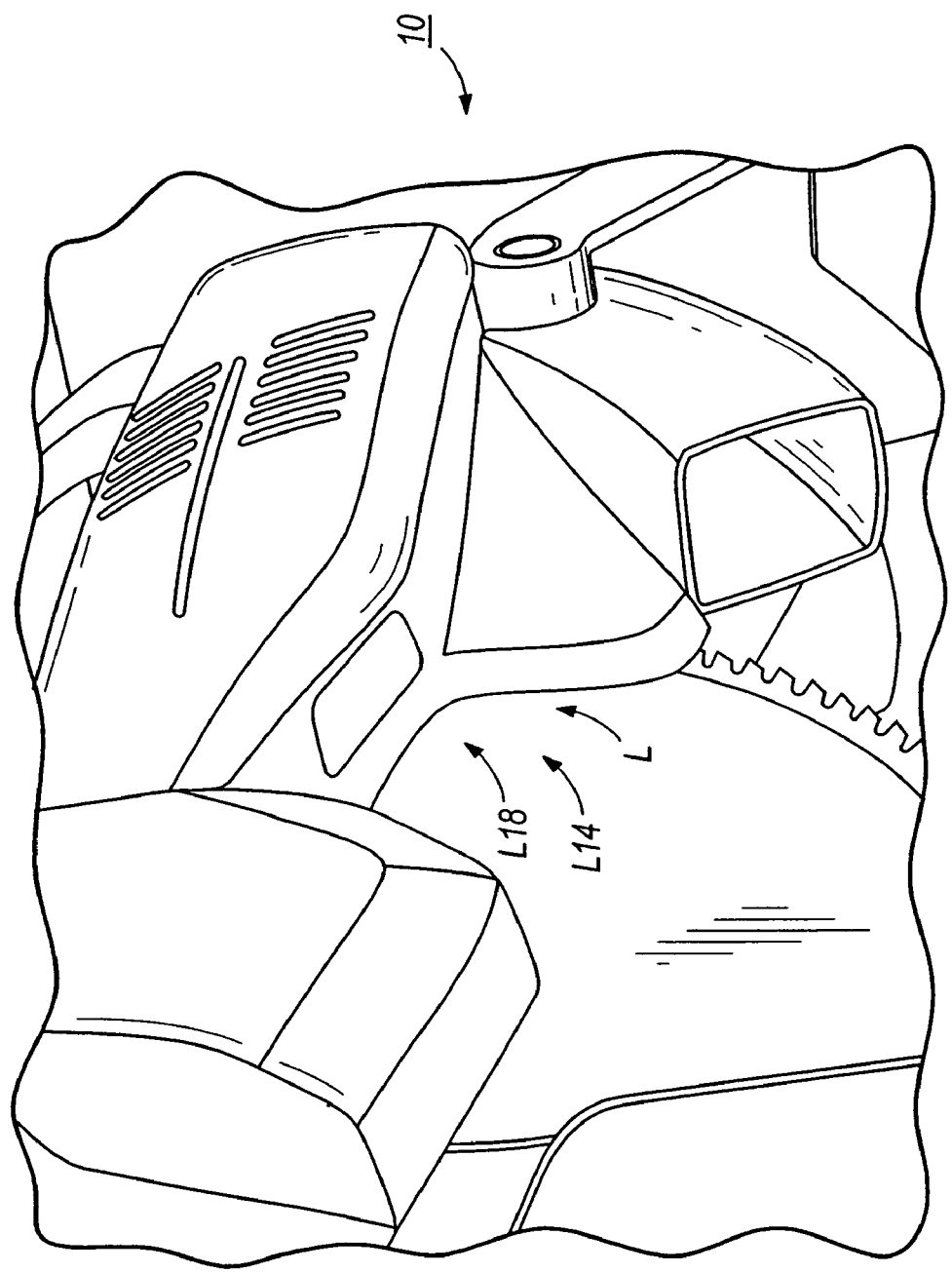
Figure 96C:
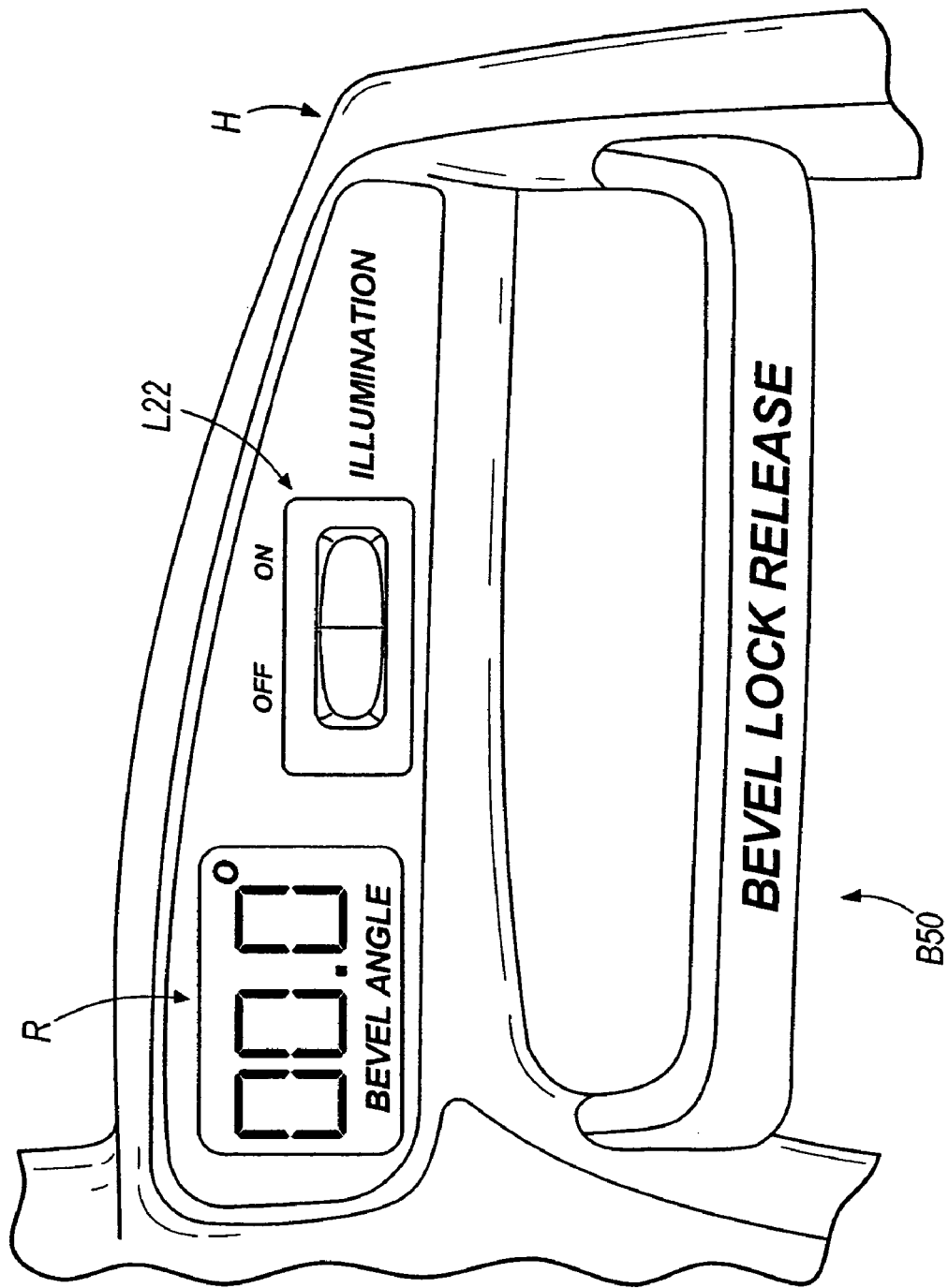
Figure 96D:
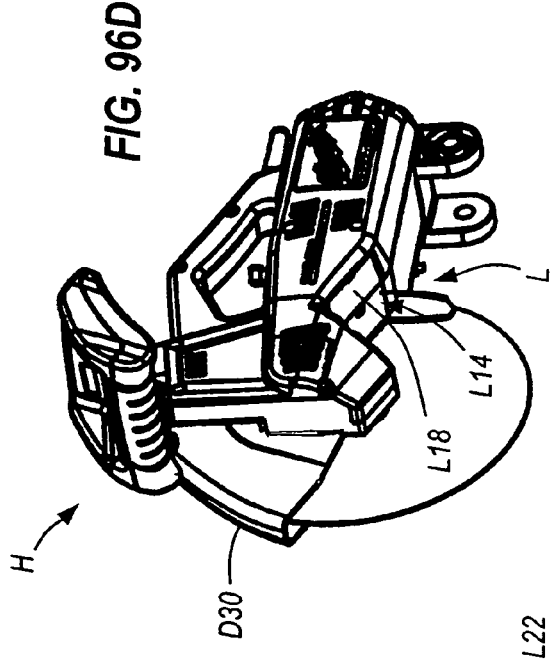
Figure 96F:
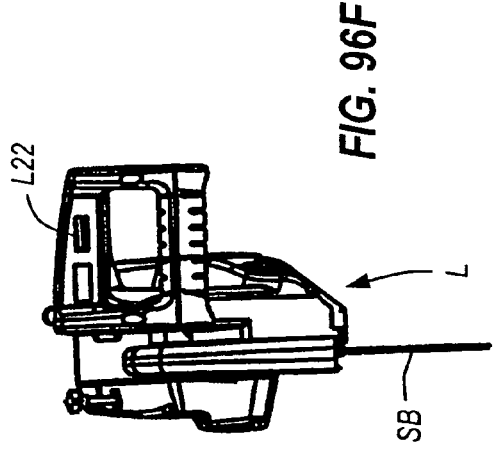
Figure 96E:
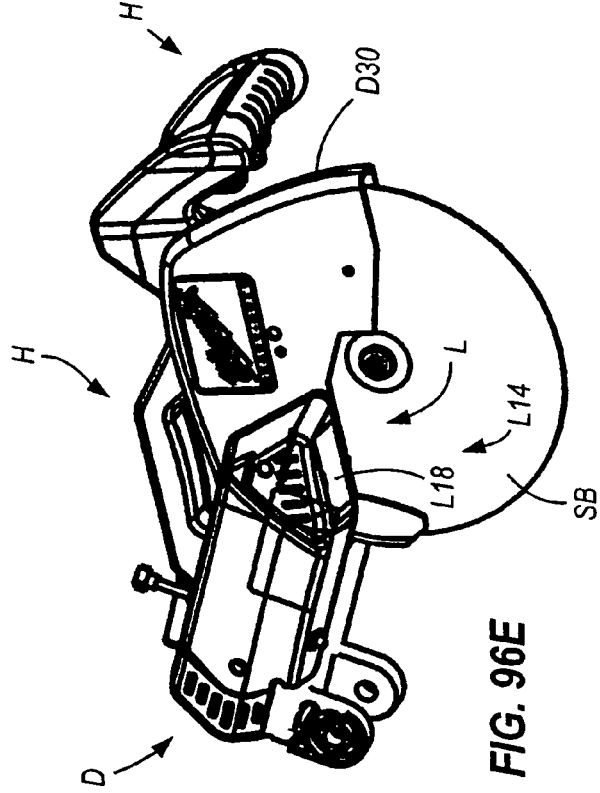
Figure 96G:
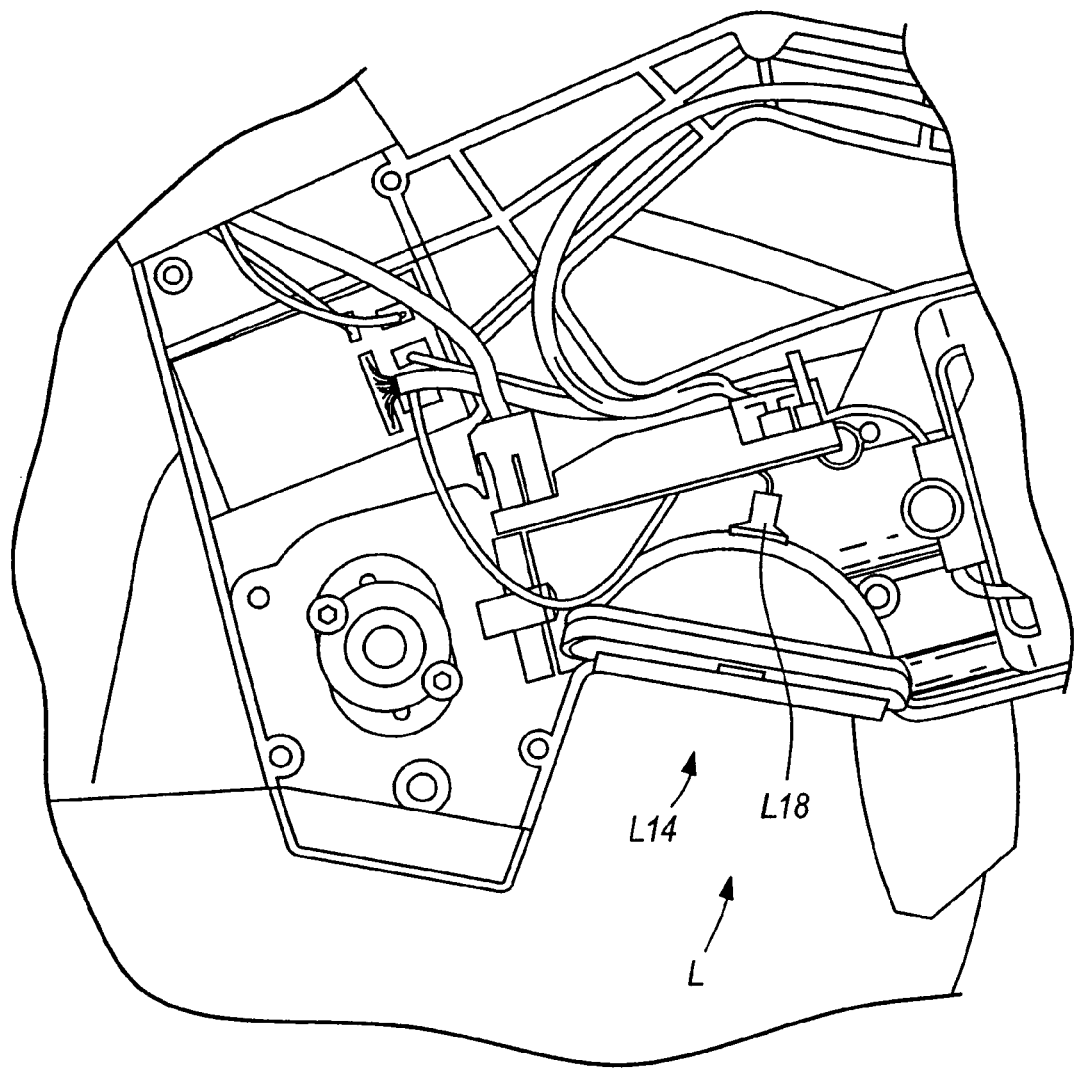
Figure 98:
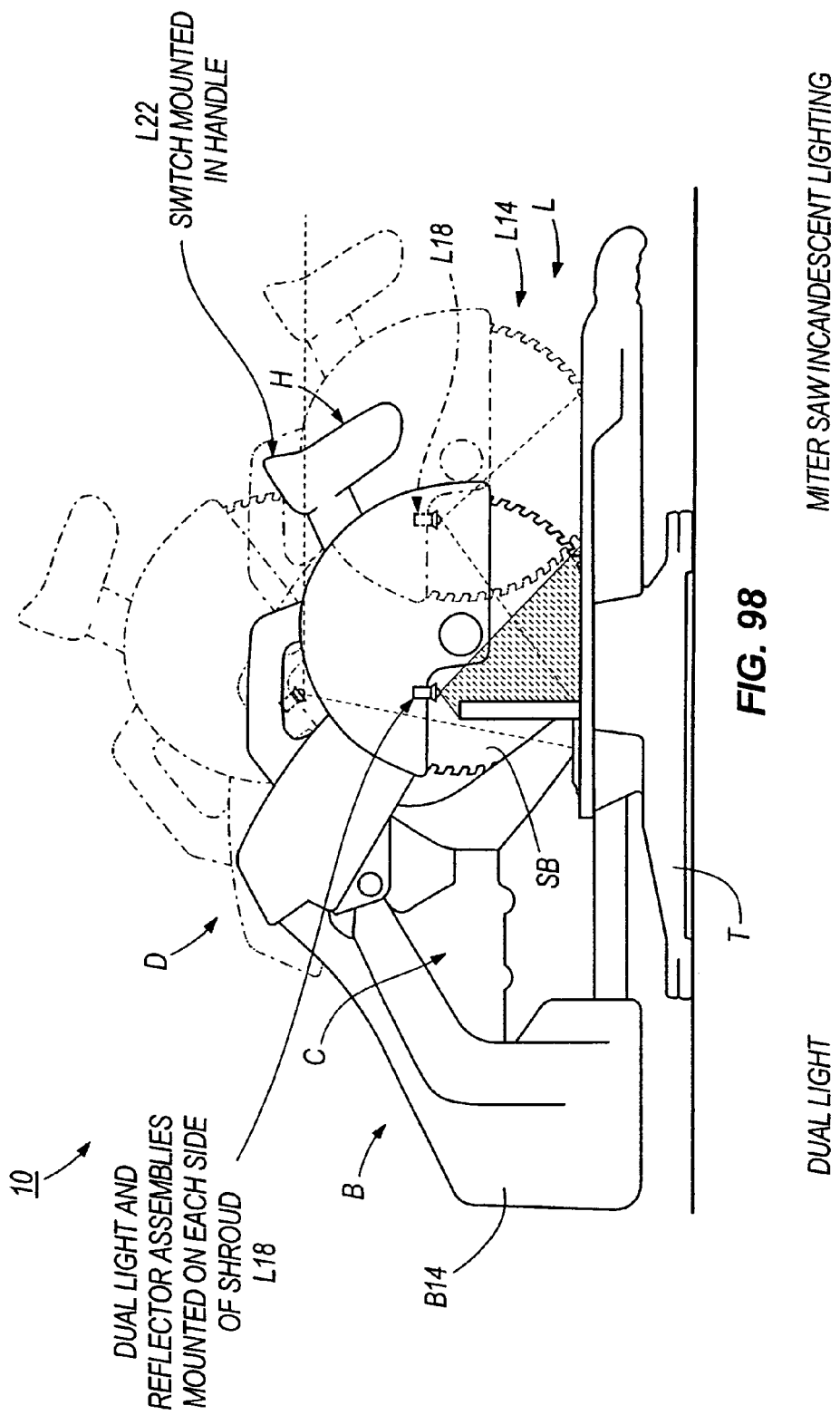
FIG. 98 is a schematic side view of a saw, such as a sliding miter saw and illustrating yet another construction of a light assembly.
Figure 99:
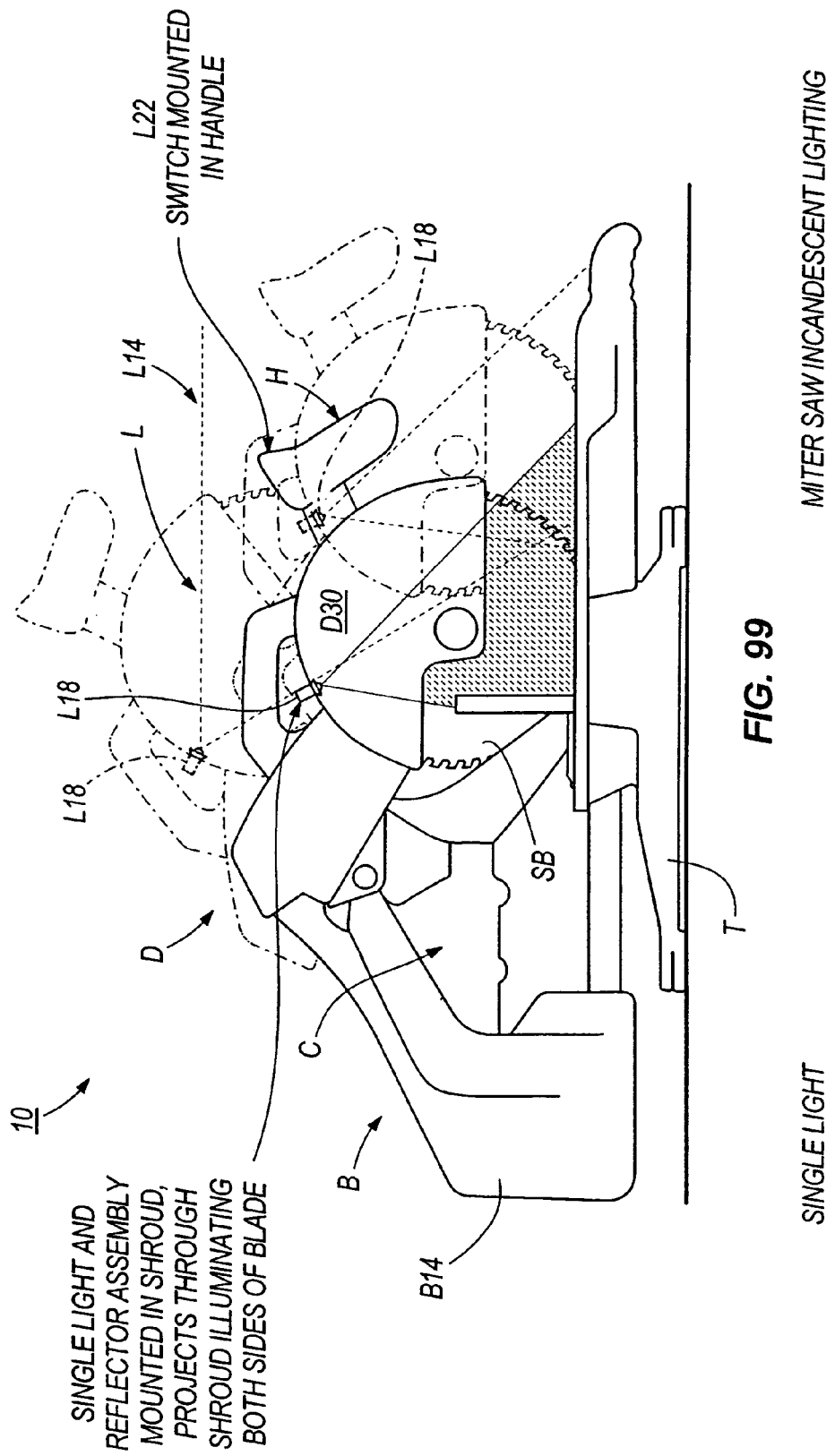
FIG. 99 is a schematic side view of a saw, such as a sliding miter saw and illustrating a further construction of a light assembly.

As shown in FIGS. 96C and 107, the lighting element(s) L18 may be selectively powered during operation of the saw 10. The light assembly L14 includes a switch arrangement L22 for controlling the supply of power to the lighting element(s) L18. The switch arrangement L22 may simply be an on/off switch, as shown in FIG. 96C. In other constructions (see FIGS. 107A-107F), the switch arrangement L22 may operate the lighting element(s) in multiple power modes (e.g., "full on" power mode, an intermediate power mode (a single intermediate power level or variable intermediate power levels), and off).

In still other constructions (not shown), the saw 10 may include a sensor and controller arrangement to determine and set the appropriate power mode for the lighting element(s) L18 (e.g., based on ambient light, based on the available supply of power to the saw 10 (e.g., remaining battery capacity), etc.). Such an arrangement may also control and select the "off" mode (e.g., when the saw 10 is left unused for a period of time, at a point during cutting when illumination is not required, etc.).

As shown in FIGS. 100-107, the illumination assembly L may include an assembly for indicating a line of cut (e.g., a laser assembly L26). The laser assembly L26 may include one or more laser element(s) L30. As shown in FIGS. 100 and 100, the laser element(s) L30 may be supported at various locations on the saw 10.

In FIG. 100A, the laser element(s) L30 are mounted toward the rear of the saw unit D14 to project forwardly to illuminate or indicate a cut line on the work piece WP. Alternatively, as shown in FIG. 101A, the laser element(s) L30 may be mounted toward the front of the saw unit D14 to project rearwardly to illuminate the cut line.

Figure 102C:
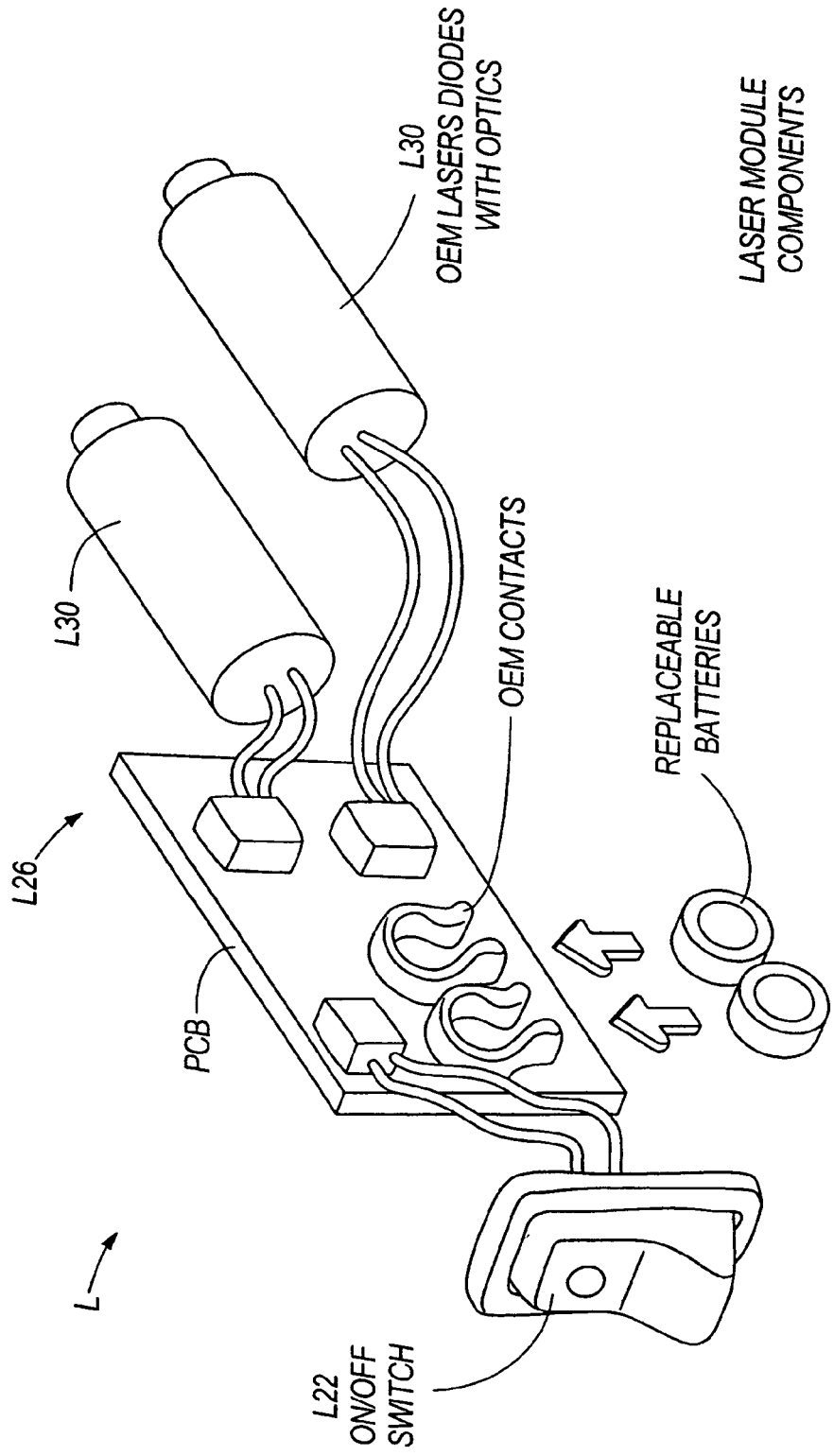
Figure 103:
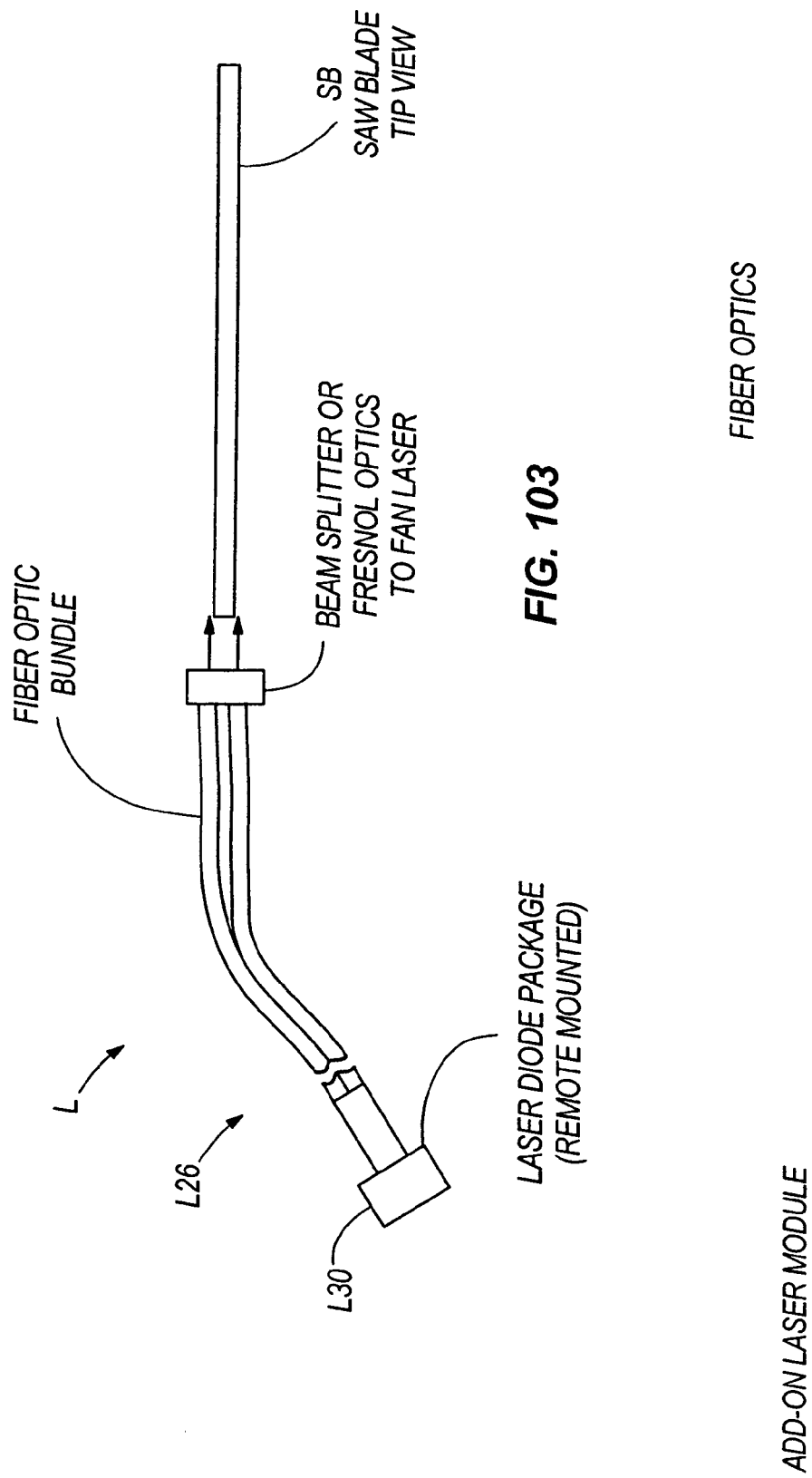
FIG. 103 is a schematic view of another construction of an add-on laser module.

As shown in FIGS. 102-104, the laser assembly L26 may include a self-contained laser module L34 separate from the saw 10. The laser module L34 may be coupled to the saw 10 as an aftermarket accessory or as original equipment from the manufacturer of the saw 10.

As shown in FIGS. 105A-105C, the laser assembly L26 may alternatively be mounted either toward the rear or the front of saw unit D14 to project toward a polished faceted surface or "nut" L38 Rotation of the saw blade SB may then result in a cut line being indicated on the work piece WP.

Figure 106A:
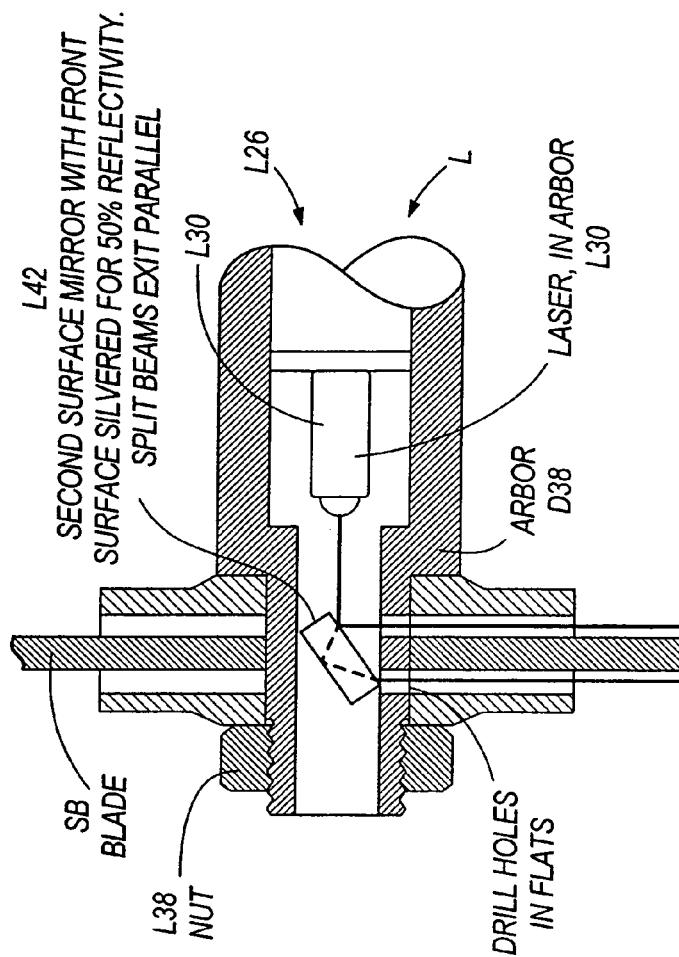
FIGS. 106A-106C are schematic views of a saw, such as a sliding miter saw, and illustrating a further construction of a laser assembly, such as a laser positioned in an arbor of the saw unit.
Figure 106B:
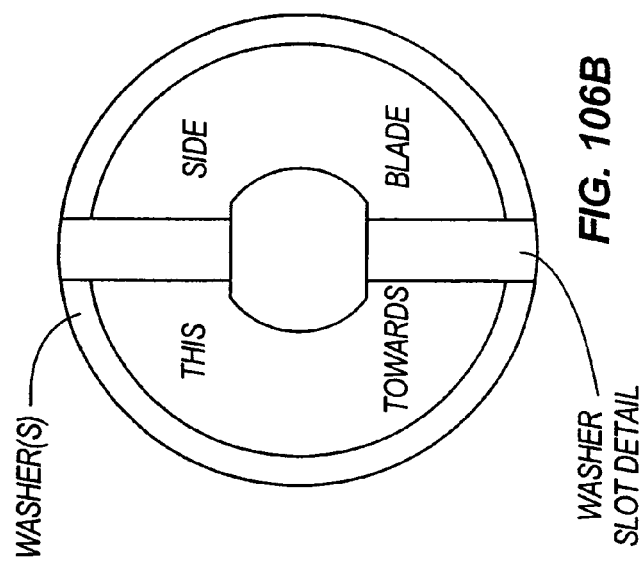
Figure 106C:
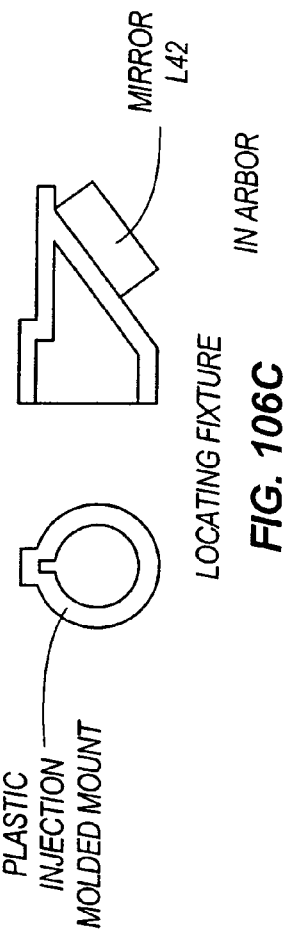

As shown in FIGS. 106A-106C, the laser assembly L26 may be positioned within the arbor D38 of the saw blade SB to project toward a reflective surface (e.g., a mirror L42), which may reflect the laser along the saw blade SB to indicate a cut line on the work piece WP.

As shown in FIG. 107A-107F, laser assembly L26 may include a switch arrangement L22 for controlling the supply of power to the laser assembly L26. In some constructions, the switch arrangement L22 may simply be an on/off switch.

In other constructions (see FIGS. 107A-107F), the switch arrangement L22 may operate the laser element(s) L30 in multiple power modes (e.g., "full on" power mode, an intermediate power mode (a single intermediate power level or variable intermediate power levels), and off) to provide a variable intensity laser. Such a variable intensity laser allows an operator to align a work piece WP with the position of the saw blade SB under varying lighting conditions (e.g., indoor and outdoor lighting). The switch arrangement L22 may provide a number of laser intensity levels to vary the intensity of the laser line to accommodate the user's preferences when using the saw 10 in a given ambient light (e.g., an indoor or outdoor setting).

In still other constructions (not shown), the saw 10 may include a sensor and controller arrangement to determine and set the appropriate power mode for the laser element(s) L30 (e.g., based on ambient light, based on the available supply of power to the saw 10 (e.g., remaining battery capacity), etc.). Such an arrangement may also control and select the "off" mode (e.g., when the saw 10 is left unused for a period of time, at a point during cutting when laser illumination is not required, etc.).

Transport Assembly TR

Figure 108C:
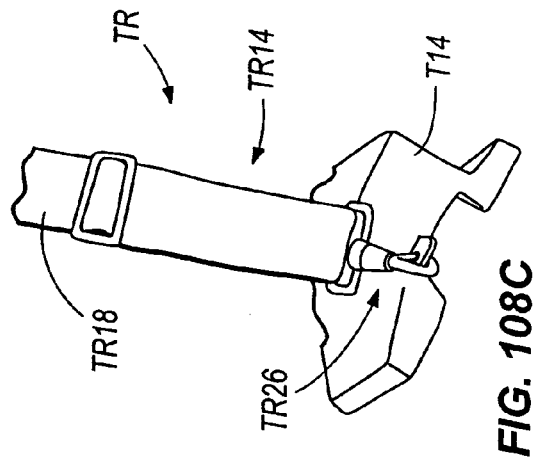
FIGS. 108A-108C are views of a saw and illustrating a transport assembly, such as a carry strap assembly.
Figure 108B:
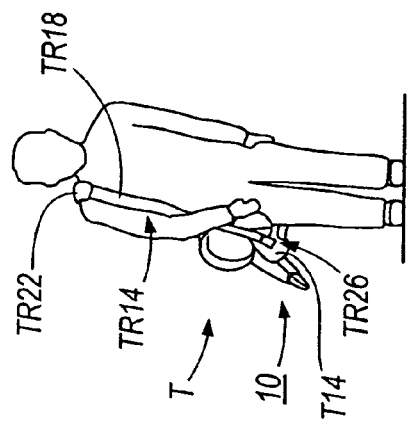
Figure 108A:
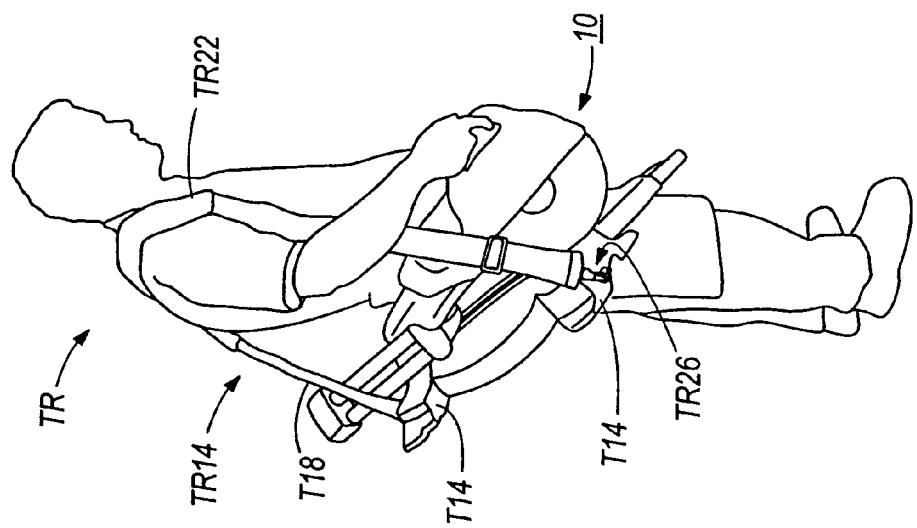

FIGS. 108-110 illustrate various constructions of a transport assembly TR for the saw 10.

As shown in FIGS. 108-109, the transport assembly TR may include a carry strap TR14 to facilitate transportation of the saw 10 by a user. The carry strap TR14 may include a shoulder strap TR18 that is, for example, 1"-3" wide, and that has an adjustable length of, for example, 4'-6'. The carry strap TR14 may include a single shoulder strap T18 (as shown in FIG. 108) or multiple shoulder straps T18 (as shown in FIG. 109).

A heavily-padded shoulder pad TR22 may be movable along the shoulder strap TR18. A non-slip surface may be provided on the shoulder pad TR22 to substantially prevent slippage of the shoulder pad TR22 on the user's shoulder.

As shown in FIGS. 108C and 109C, the shoulder strap TR18 may be connected to the saw 10 a quick-connect assembly TR26 (e.g., two or more quick-connect swivel latches) that engage corresponding attachment structure on the saw 10 (e.g., eyelets on the base T14) in predetermined balance locations. The quick-connect assembly TR26 may include locking features (e.g., a threaded engagement similar to a locking carbineer) to avoid accidental detachment of the shoulder strap TR18 from the base T14.

FIGS. 110A-110G illustrate other constructions of a transport assembly TR, such as a case, a bag, etc., for the saw 10.

As shown in FIG. 110A-110B, the transport arrangement TR may include a bag TR30 similar to a piece of rolling luggage. The bag TR30 forms an enclosure T34 in which the saw 10 is supported. The enclosure T34 may be formed with a contoured recess for receiving the outer contour of the saw 10 and for holding saw 10 in position.

A locking arrangement (not shown) may be provided for holding the saw 10 in position. For example, straps may be provided to hold the saw 10 in place. In other constructions, movable retainer surfaces (e.g., pivotable arms) may engage surfaces on the saw 10 to hold it in place and may be moved out of to allow removal of the saw 10.

In the illustrated construction, wheels TR38 are supported on the outside of the bag TR30. A handle TR42, such as a telescoping handle, is provided on the bag. Hooks TR46 may be provided on the exterior of the bag TR30 for supporting accessory equipment such as cords, lights, etc. The bag TR30 may be formed of heavy-duty cloth, hard plastic, metal, etc.

Figure 110C:
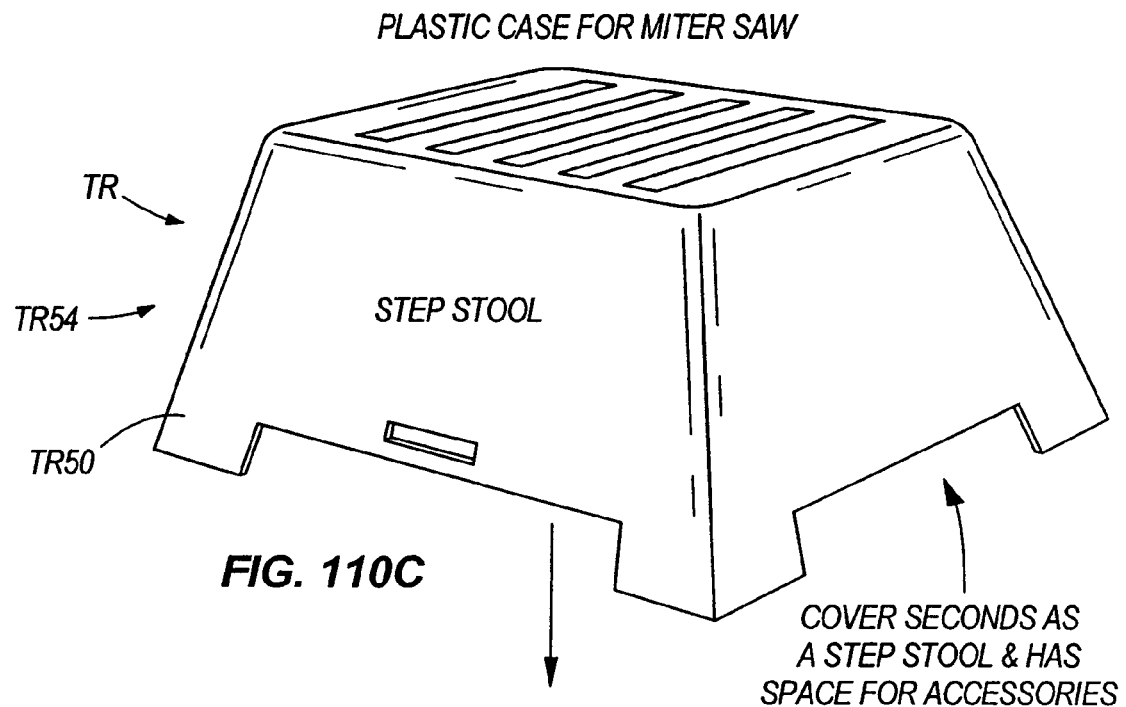

As shown in FIGS. 110C and 110E-G, the transport arrangement TR may be provided by a plastic case TR50. The case TR50 or a portion of the case, such as the cover TR54, may perform other functions. For example, the portion TR54 may provide a step stool (as shown in FIG. 110C), storage for other equipment and/or accessories, etc.

Figure 110D:
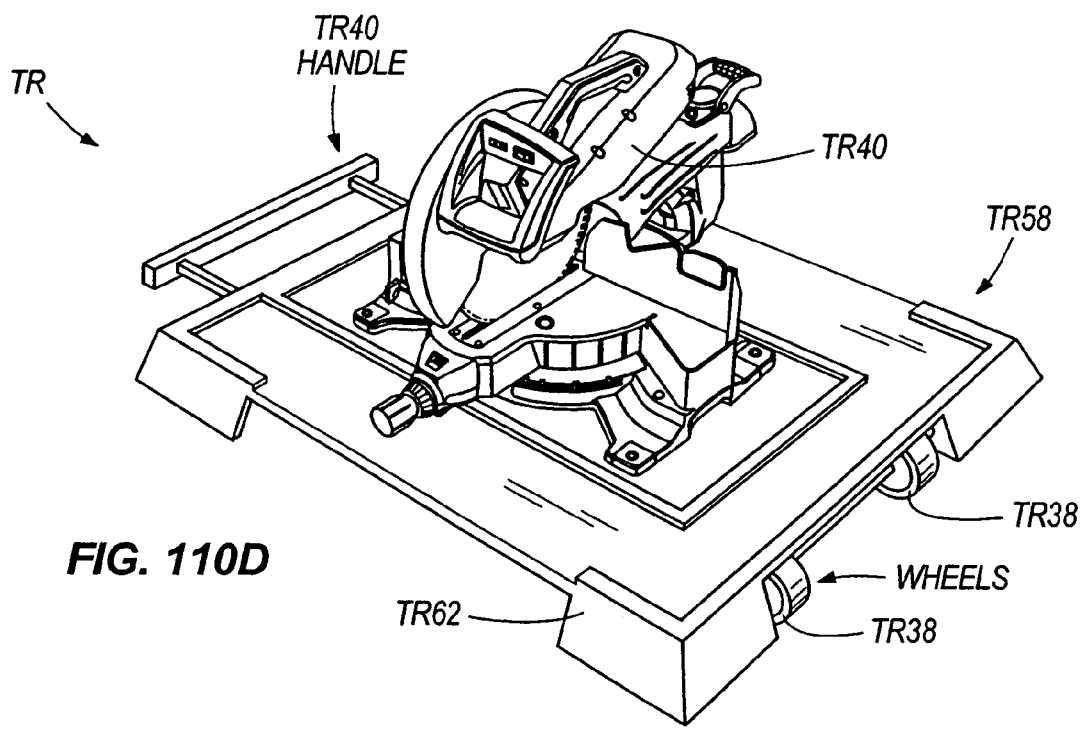
Figure 110E:
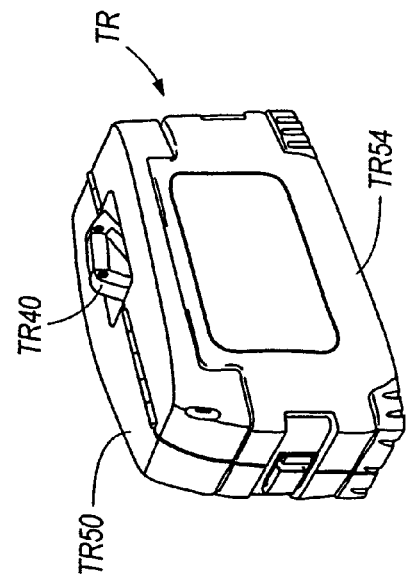
Figure 110F:
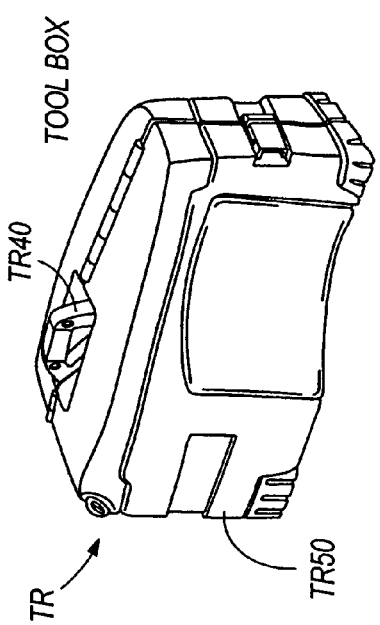
Figure 110G:
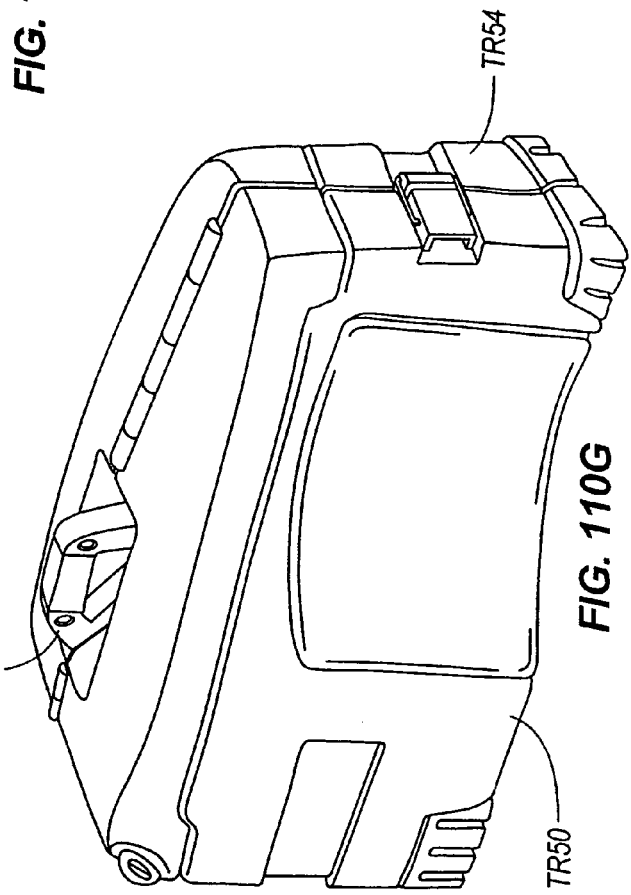

As shown in FIG. 110D, the transport arrangement TR may be provided by an open dolly-type apparatus TR58. This apparatus TR58 includes a frame TR62 on which the saw 10 is secured. Wheels TR38 are provided on the frame TR62, and the frame TR62 includes a handle TR42.

A locking arrangement (not shown) may be provided for holding the saw 10 in position on the frame TR62. For example, straps may be provided to hold the saw 10 in place. In other constructions, movable retainer surfaces (e.g., pivotable arms) may engage surfaces on the saw 10 to hold it in place and may be moved out of to allow removal of the saw 10. Also, a removable cover (not shown) may be provided to cover the saw 10.

Battery

In some constructions (not shown), the saw 10 may be operable to charge power tool batteries and/or may be powered by a power tool battery. The battery charging portion of the saw 10 may be similar to that disclosed in U.S. Patent Application Publication No. U.S. 2003/0090234 A1, published May 15, 2003 (Ser. No. 10/289,621, filed Nov. 7, 2002), the entire contents of which are hereby incorporated by reference.

In general, the battery charger portion would be constructed for a heavy-duty use in a harsh working environment in which the saw 10 is being used. The charger portion may be operable to support and charge multiple voltage batteries such as, for example, 12V-50V, or similar power tool or other equipment batteries of various chemistries (NiCd, NiMH, Li-based, etc.).

The saw 10 may include one or more battery ports (e.g., on the base T14, on the saw unit D14, etc.) on which a battery is supported on the saw 10. A battery charging circuit may be supported by the saw 10 (e.g., in the base T14, in the motor housing D26) and may be electrically connected between the power source (e.g., AC line power) and the battery port to supply power to the battery to charge the battery.

In some constructions, the battery may also be operable to power the saw 10. Power may be supplied from the battery through the battery port to the motor D18 and/or other components of the saw 10 to power the motor D18 and/or components of the saw 10. In some constructions, a separate battery power port may be provided on another portion of the saw 10. In such a construction, the battery would be mounted on the battery power port and would supply power to the motor D18 and/or other components of the saw 10.

Information about the battery and/or the battery charger portion (e.g., remaining battery capacity, the status of battery charging, etc.) may be communicated to the user through the digital display arrangement or digital readout arrangement R or through a separate indicator assembly (e.g., a charging status indicator such as that on existing battery chargers, a fuel gauge on the battery, etc.).

It should be understood that the various independent aspects of the present invention discussed above may be utilized independently of one another or in combination with one or more other independent aspects of the invention.

We claim:

1. A power tool comprising:
    a housing including a base and a table pivotably coupled to the base;
    a drive unit supported by the housing for pivoting movement about an axis, the drive unit being operable to drive a tool element to work on a work piece;
    a locking assembly operable to lock the drive unit in an angular position relative to the housing, the locking assembly including
        a brake surface defined by one of the housing and the drive unit,
        a brake member supported by the other of the housing and the drive unit, the brake member being movable relative to the brake surface between a braking position, in which the brake member applies a friction force to the brake surface to lock the drive unit in an angular position relative to the housing, and a release position, in which the drive unit is movable relative to the housing,
        a biasing member operable to bias the brake member to the braking position,
        an actuator assembly operable to cause movement of the brake member at least from the braking position to the release position;
    a detent assembly operable to position the drive unit relative to the housing in a selected angular position, the detent assembly including
        a detent projection supported on one of the housing and the drive unit, and
        a detent recess defined by the other of the housing and the drive unit, the projection being engageable in the recess to position the drive unit relative to the housing in the selected angular position, wherein the detent assembly has a detent engaged condition, in which the projection engages the recess, and a disengaged condition, in which the detent does not engage the recess, and wherein the locking assembly is operable when the detent assembly is in the engaged position and in the disengaged position;

a detent condition sensor operable to sense whether the detent assembly is in the engaged condition or in the disengaged condition;
a position sensor operable to sense an angular position of the drive unit relative to the housing;
a display operable to display the angular position to an operator; and
a controller communicating between the position sensor and the display, the controller receiving from the position sensor position information corresponding to an angular position of the table relative to the base, the controller transmitting a signal to the display to cause the display to indicate to the user display information corresponding to the position information, and wherein the controller receives from the detent condition sensor detent condition information corresponding to the condition of the detent assembly, the controller being operable to calibrate the signal transmitted to the display based on the detent condition information.

2. The power tool of claim 1, wherein the actuator is operable to disengage the detent assembly and cause movement of the brake member against the bias of the biasing member at least from the braking position to the release position.

3. The power tool of claim 1, wherein the actuator is operable to maintain the detent assembly in the disengaged condition, and wherein the actuator is operable to maintain the brake member in the release position.

4. The power tool of claim 1, wherein the actuator is movable between a first position, in which the detent assembly is in the disengaged condition and the brake member is in the release position, and a second position, in which at least one of the detent assembly is in the detent engaged condition and the brake member is in the braking position.

5. The power tool of claim 4, wherein the detent assembly is in the detent engaged condition and the brake member is in the braking position when the actuator is in the second position.

6. The power tool of claim 5, wherein the actuator is movable to an intermediate position between the first and second positions, wherein the detent assembly is in the detent engaged condition when the actuator is in the intermediate position, and wherein the brake member is in the release position when the actuator is in the intermediate position.

7. The power tool of claim 1, wherein the table is pivotable relative to the base about a second axis, and wherein the drive unit is supported by the housing for pivoting movement about the first axis substantially normal to the second axis.

8. The power tool of claim 1, wherein the actuator is positioned toward the front of the power tool.

9. The power tool of claim 1, wherein the actuator is positioned toward the rear of the power tool.

10. The power tool of claim 1, wherein the drive unit is operable to drive the tool element about a second axis, and wherein the actuator is positioned forward of the second axis toward the front of the power tool.

11. The power tool of claim 1, wherein the drive unit is operable to drive the tool element about a second axis, and wherein the actuator is positioned rearward of the second axis toward the rear of the power tool.

12. The power tool of claim 1, wherein the detent assembly and the brake member are operably coupled to the actuator by a common linkage mechanism.

13. The power tool of claim 12, wherein the linkage mechanism includes a cable.

14. The power tool of claim 1, further comprising a brake disk having the brake surface thereon, wherein the brake member includes a caliper having a brake pad, and wherein the biasing member is operable to engage the brake pad with the brake disk to lock the drive unit in an angular position relative to the housing.

15. The power tool of claim 14, wherein the biasing member includes a spring, and wherein the actuator is operable to compress the spring in the release position to disengage the brake pad from the brake disk.

16. The power tool of claim 14, wherein the brake disk is secured to the table, and wherein the caliper is secured to the drive unit.

17. The power tool of claim 1, wherein the detent recess is defined in the brake surface.

18. The power tool of claim 17, further comprising a brake disk having the brake surface thereon, wherein the detent recess is defined in the brake disk.

19. The power tool of claim 1, wherein the actuator is operable to move the brake member from the braking position to the release position, and wherein the biasing member is operable to move the brake member from the release position to the braking position.

20. The power tool of claim 1, wherein the power tool includes a saw.

* * * * *